Figure 1:
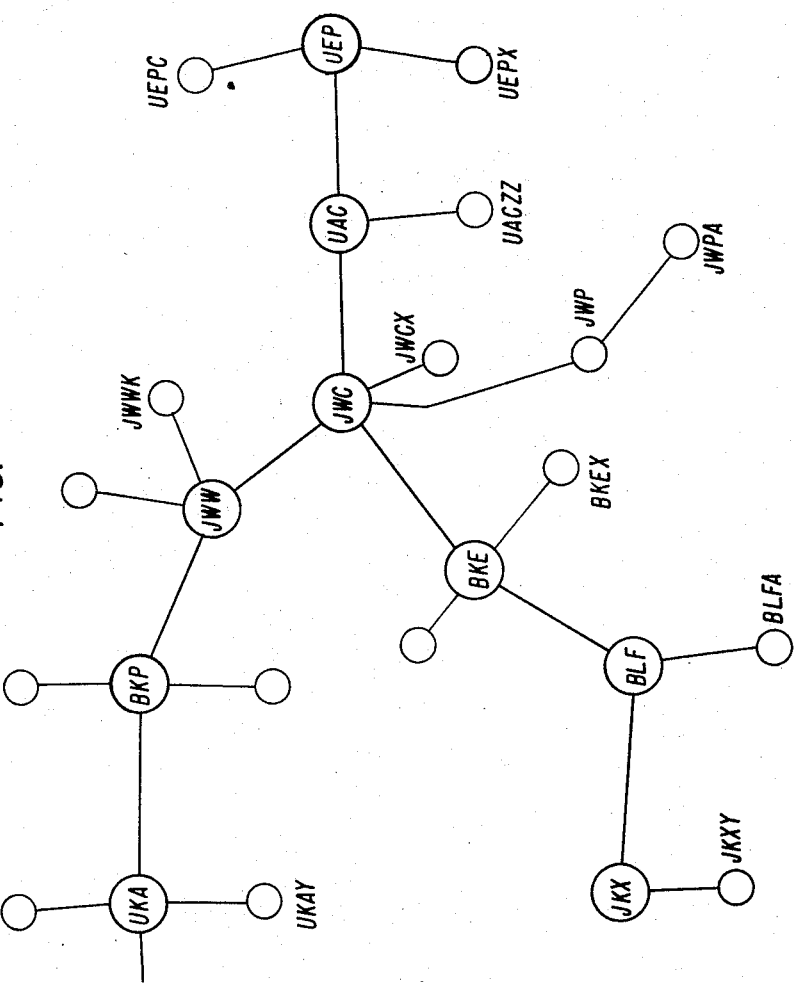

July 26, 1960

R. C. STILES 2,946,843

AUTOMATIC TELEGRAPH SWITCHING SYSTEM
WITH MULTIPLE CALL PROCESSING

Filed Oct. 21, 1953

91 Sheets-Sheet 1

INVENTOR.
RICHARD C. STILES
BY
Smith, Olsen, Baird & Gulbrandsen
ATTYS.

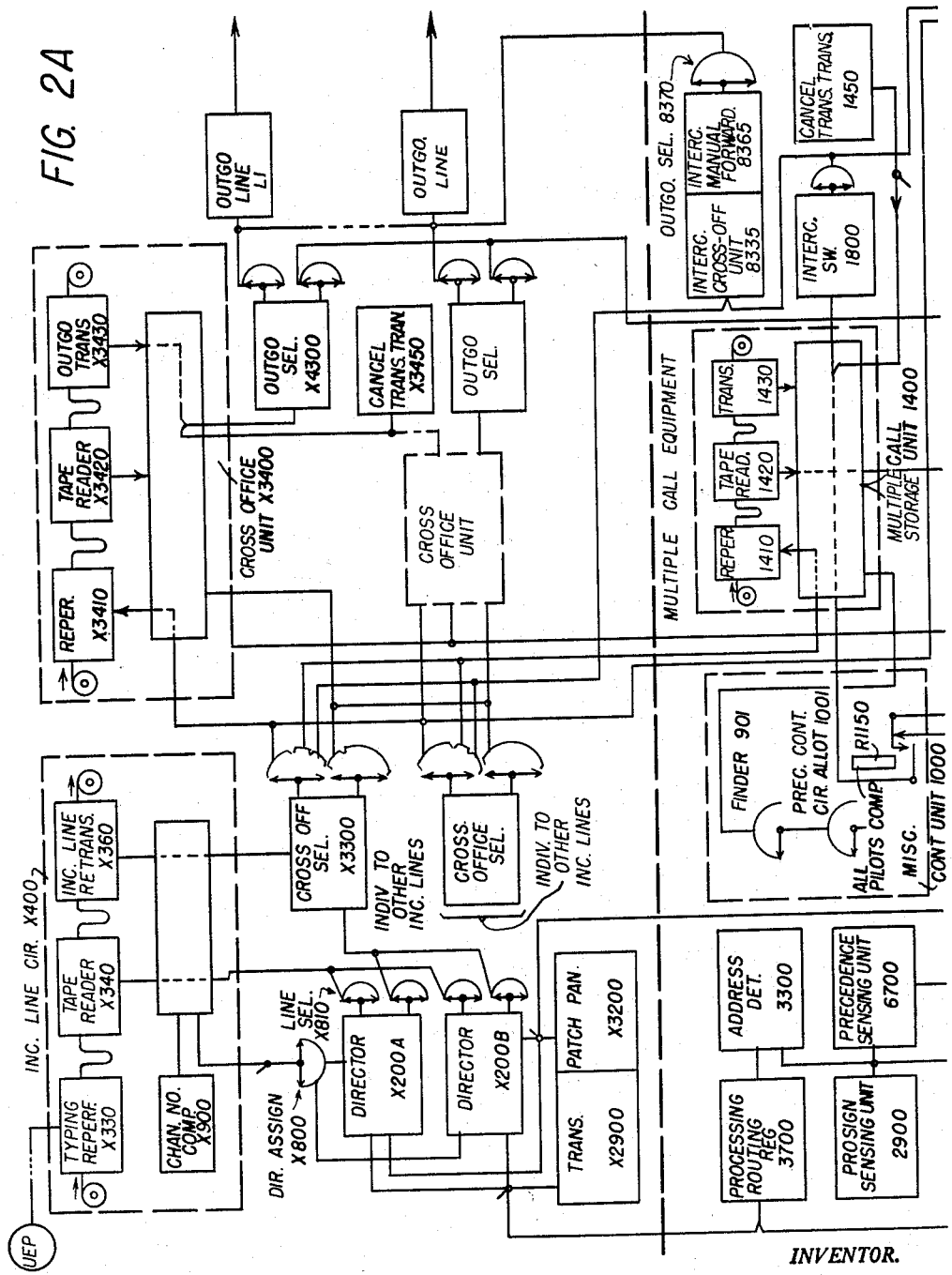

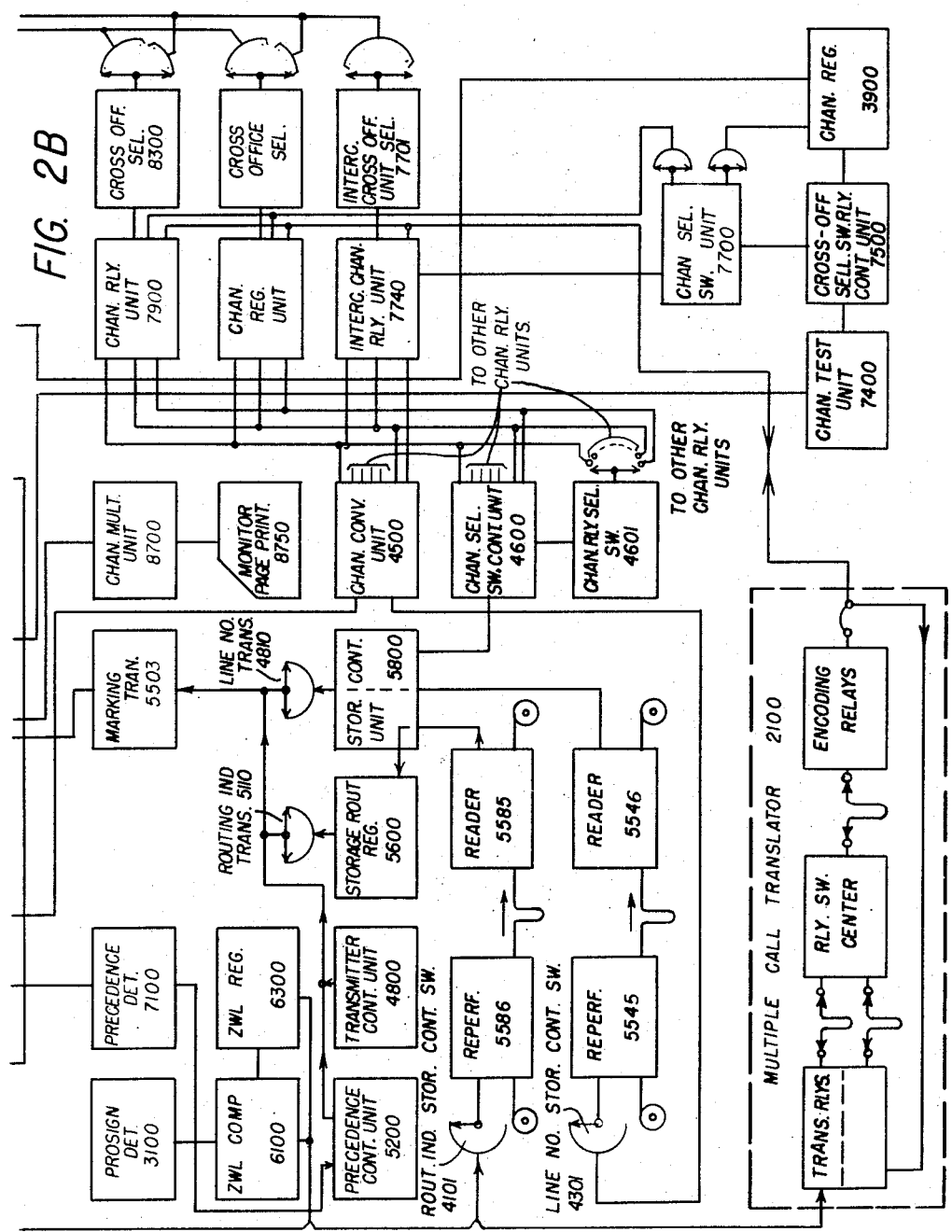

INVENTOR.
RICHARD C. STILES

INVENTOR.
RICHARD C. STILES

INVENTOR.
RICHARD C. STILES

INVENTOR.
RICHARD C. STILES

July 26, 1960

R. C. STILES 2,946,843

AUTOMATIC TELEGRAPH SWITCHING SYSTEM
WITH MULTIPLE CALL PROCESSING

Filed Oct. 21, 1953

91 Sheets-Sheet 20

INVENTOR.
RICHARD C. STILES
BY
Smith, Olsen, Baird & Gulbrandsen
ATTYS.

INVENTOR.
RICHARD C. STILES

INVENTOR.
RICHARD C. STILES

INVENTOR.
RICHARD G STILES

INVENTOR.
RICHARD C. STILES

July 26, 1960 R. C. STILES 2,946,843
AUTOMATIC TELEGRAPH SWITCHING SYSTEM
WITH MULTIPLE CALL PROCESSING
Filed Oct. 21, 1953 91 Sheets-Sheet 37
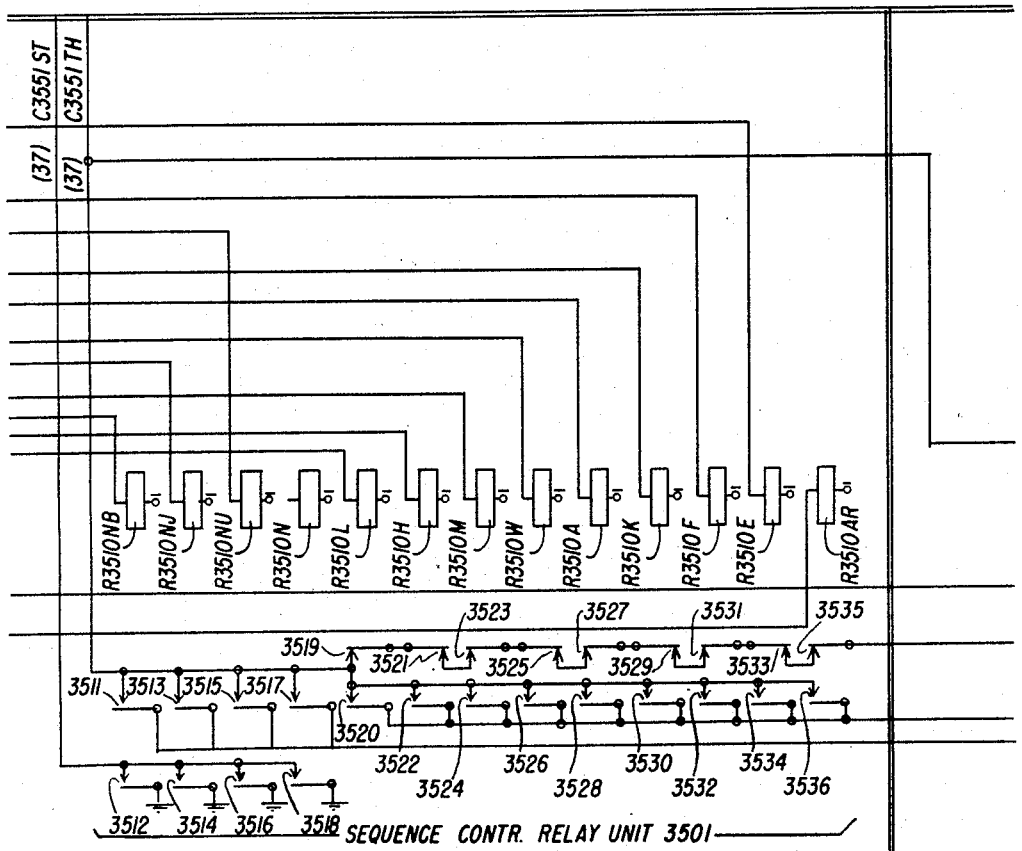
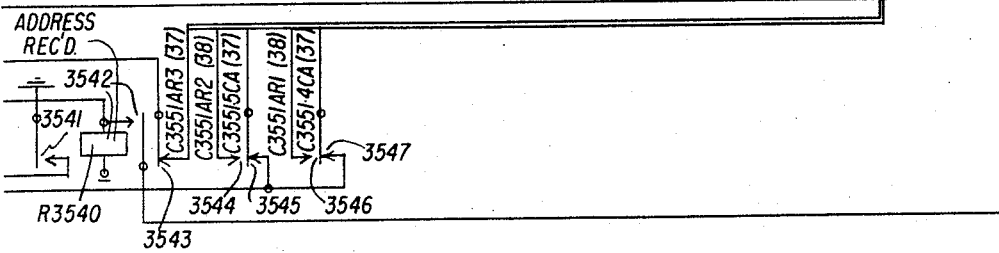
FIG. 35
INVENTOR.
RICHARD C. STILES
BY
Smith, Olsen, Baird & Gulbrandsen
ATTYS.

INVENTOR.
RICHARD C. STILES

July 26, 1960     R. C. STILES     2,946,843
AUTOMATIC TELEGRAPH SWITCHING SYSTEM
WITH MULTIPLE CALL PROCESSING
Filed Oct. 21, 1953     91 Sheets-Sheet 42

INVENTOR.
RICHARD C. STILES
BY
Smith, Olsen, Baird & Gulbrandsen
ATTYS.

INVENTOR.
RICHARD C. STILES

INVENTOR.
RICHARD C. STILES

INVENTOR.
RICHARD C. STILES

INVENTOR.
RICHARD C. STILES

INVENTOR.
RICHARD C. STILES

INVENTOR.
RICHARD C. STILES

INVENTOR.
RICHARD C. STILES

INVENTOR.
RICHARD C. STILES

July 26, 1960

R. C. STILES 2,946,843

AUTOMATIC TELEGRAPH SWITCHING SYSTEM
WITH MULTIPLE CALL PROCESSING

Filed Oct. 21, 1953

91 Sheets-Sheet 73

INVENTOR.
RICHARD C. STILES
BY
Smith, Olsen, Baird & Gulbrandsen
ATTYS.

PRECEDENCE DETECTOR 7100

INVENTOR.
RICHARD C. STILES

July 26, 1960

R. C. STILES 2,946,843

AUTOMATIC TELEGRAPH SWITCHING SYSTEM WITH MULTIPLE CALL PROCESSING

Filed Oct. 21, 1953

91 Sheets-Sheet 89

PROSIGN DETERMINATION UNIT 8400

INVENTOR.
RICHARD C. STILES
BY
ATTYS.

INVENTOR.
RICHARD C. STILES

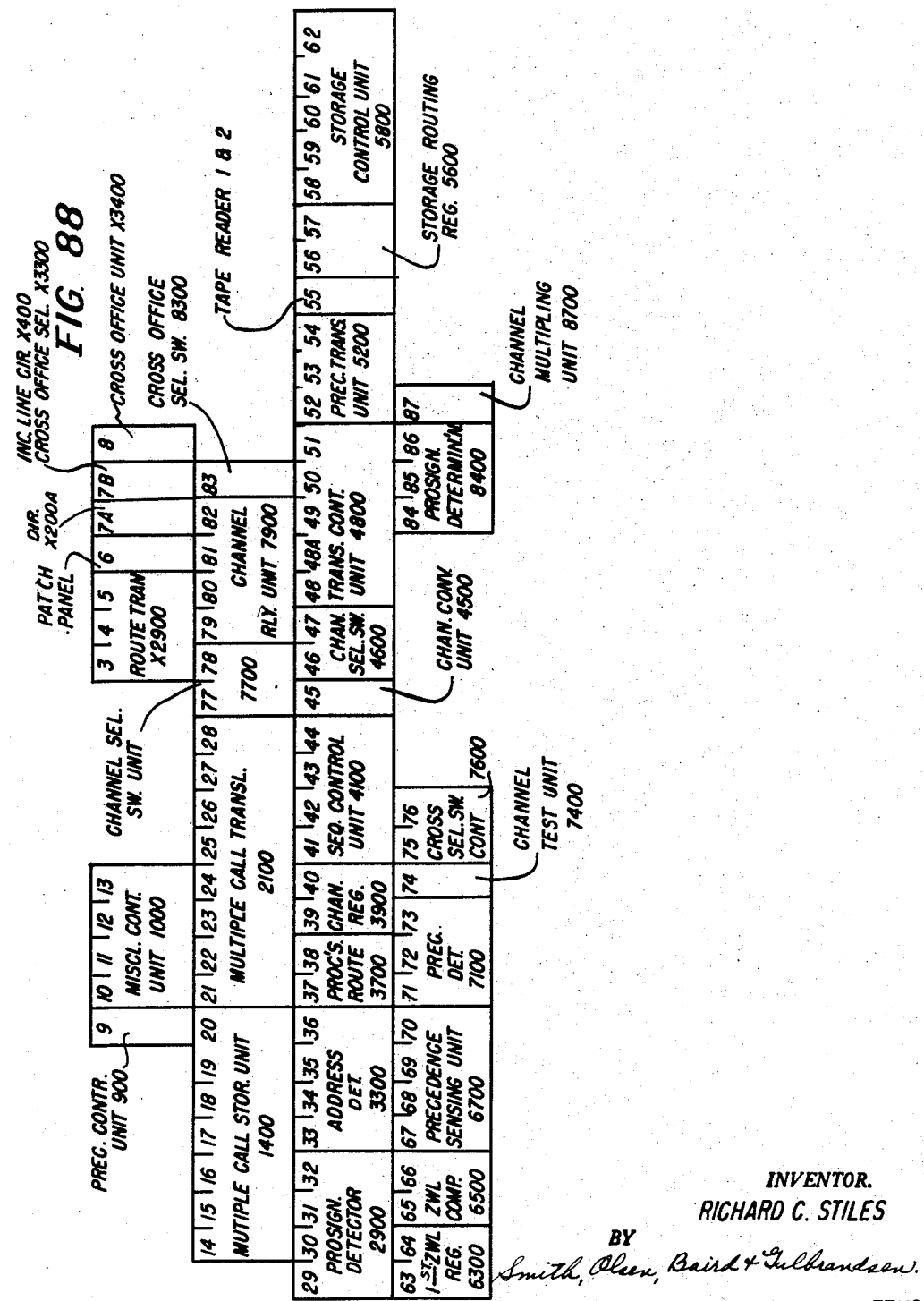

United States Patent Office 2,946,843
Patented July 26, 1960

2,946,843

AUTOMATIC TELEGRAPH SWITCHING SYSTEM WITH MULTIPLE CALL PROCESSING

Richard C. Stiles, La Grange, Ill., assignor to Automatic Electric Laboratories, Inc., a corporation of Delaware Filed Oct. 21, 1953, Ser. No. 387,354

35 Claims. (Cl. 178—2)

The present invention relates in general to automatic telegraph switching systems of the type disclosed in the Stiles application Serial No. 260,854, filed December 10, 1951, now issued on September 3, 1957, as Patent 2,805,283, and more particularly to improvements in such systems whereby each received telegraph message containing multiple address destinations is automatically processed and retransmitted in the direction of each of the destinations indicated on the message.

It is contemplated that the automatic telegraph switching system of the present invention will serve extremely large territories which may be divided, for example, into 17,576 geographical areas individually identified by three character or letter codes, in which each of the three characters may be any one of the twenty-six letters in the alphabet. Consequently, each of the geographical areas may be provided with a central exchange or relay switching center identified by an individual three letter code. Furthermore, each of the above noted geographical areas served by a relay switching center may be further divided, for example, into 676 local stations individually identified by the three character or letter code of the area and an additional one or two character or letter code in which each of the additional characters of the local code may also be any one of the twenty-six letters of the alphabet. By employing the five character or letter code any local telegraph station, which will be referred to hereinafter as a tributary station, of 11,881,376 stations in the large territory may be individually identified. It will be apparent to those skilled in the art that a third character or letter may be added to the local code of a tributary station, for example, if it is deemed necessary to increase the total number of individually identifiable stations in each of the areas served by the central exchanges or relay switching centers.

In a telegraph switching network arranged in this manner, each telegraph message originating at any tributary station in the network will be preceded by an address portion or routing indicator which will include the identity of the particular called tributary station to which the message is to be transmitted. In the present invention, these messages will be automatically switched through the various relay switching centers of the network until the message is finally automatically transmitted to the selected called tributary station.

In certain telegraph systems the switching operations required to direct telegraph messages from an originating or calling station to a particular called station are manually performed by operators provided at the different switching centers of the network. Accordingly, an operator at the originating station will transmit the message to the nearest manual switching center by means of a printing telegraph transmitter. At the manual switching center the message is received on a typing reperforator which simultaneously types the message as it perforates a tape. The operator handling messages received at the switching center over the particular incoming line then reads the address portion of the message to determine the ultimate destination of the message. Thereafter, the operator removes the tape from the reperforating mechanism and conveys it to another operator handling messages that must be transmitted over a particular outgoing line to reach its destination. The manner in which the message on the perforated tape is conveyed from the receiving operator to the transmitting operator is a matter of local practice and in some cases the messages are personally carried by the receiving operator and in other cases they may be carried by a clerk who must see to it that the messages are given to the operator at the proper retransmitting position. At the transmiting operator position the perforated tape may be inserted into a tape transmitter which will then automatically retransmit that message to the next manual switching point where the same manual procedure is followed to extend the particular message toward its ultimate destination.

In this type of manual operation, the entire message must be received and perforated on the tape before it can be processed in the manner noted above. Consequently, there is considerable delay before the receiving operator can sever the tape and have it conveyed to the proper transmitting operator for retransmission toward its ultimate destination. Furthermore, the various lines in the manual switching center are not utilized in an efficient and economical manner since the available circuit time for each of the lines is not fully utilized. Furthermore, the number of operators required to handle messages of any manual switching center varies with the volume of traffic to be handled at any particular time. Obviously, the amount of traffic is variable and difficult to predict and, consequently, the number of operators on duty at any particular time may be inadequate to manually handle a sudden increase in the volume of traffic or, on the other hand, there may be insufficient traffic to keep the operators on duty busy.

In the event that the foregoing message is of the multiple call type, having a plurality of addressees, the perforated tape is taken to a special transmitting operator position. At the special position, a new heading is manually prepared for each retransmission of the message in accordance with the destination identified by each of the addressees. Therefore, as many headings are prepared as there are addressees and after each heading is transmitted, the entire original message is then retransmitted. Since only one retransmission of the received message can be taken care of at a time by the manual operator, considerable delay is encountered between the retransmission of the message to the first addressee and the retransmission of the message to the last addressee appearing on the message.

Another procedure involves the use of a plurality of typing reperforators which the manual operator operates one at a time to produce specific message headings for each message to be retransmitted. After all of the headings have been prepared by the different reperforators, the reperforators are then simultaneously controlled by the operator in accordance with the received original message to thereby produce separate tapes, each with a different heading. The separate tapes are then independently fed into the respective outgoing line transmitters associated with the outgoing lines over which the different messages must be transmitted so that the entire message including its heading is retransmitted to each of the addressees named in the message.

The present automatic telegraph switching system is arranged so that received mesages are automatically processed in accordance with the address portion of the message. It should be noted, however, that the switching operations performed by the apparatus at a switching center are controlled by the address portion of the message to automatically select a particular outgoing line over which the message is to be transmitted, during the time interval that the body portion of the particular message is still being received over the incoming line. Thus, in processing the address information, the automatic switching apparatus in the switching center determines and selects the proper outgoing line over which the received message is to be ultimately transmitted.

Also, the automatic switching apparatus controls a retransmitting mechanism associated with the incoming line so that the entire received message, including the address information thereon, may be transferred to and temporarily stored in a reperforator mechanism which is temporarily associated with the selected outgoing line. The last-mentioned reperforator and transmitter cooperate to transmit the entire message including the address portion thereof over the selected outgoing line. Other messages received over incoming lines having address portions thereon indicating that they are also to be transmitted over the last-mentioned outgoing line will also be stored in the reperforator associated with that outgoing line. With this arrangement, a plurality of separate messages received over different incoming lines and which are to be transmitted over a particular outgoing line, may be temporarily stored in the same reperforator mechanism. Consequently, several messages may be transmitted one after another over the selected outgoing line until all of the stored messages have been retransmitted. Thereafter, the particular reperforator is returned to a common pool where it may again be associated with any one of the outgoing lines for reperforating and retransmitting further messages.

Each relay switching center of the telegraph switching system is arranged to terminate incoming lines from individual local tributary stations served by the associated relay center and to terminate incoming trunk lines from other relay switching centers of the system. Each relay switching center also has access to outgoing lines extending to individual local tributary stations served by the associated relay center and to outgoing lines extending to other relay switching centers to the system. Since it is not practicable to provide direct lines between all of the relay switching centers of the system, each relay center is arranged so that it will automatically process the incoming messages to retransmit them directly to local tributary stations or to retransmit them to the next relay swiching center in the appropriate direction for extending the message toward the proper called area and tributary station.

The above operations are performed in connection with each received telegraph message having a single address destination or routing indicator thereon and are described in detail in the above noted Stiles patent. The present automatic telegraph switching system is also arranged so that it will automatically process multiple call messages, each of which contains a plurality of address identifying codes or routing indicators identifying a plurality of called tributary stations to which each received multiple call message must be transmitted by the relay switching center receiving such a message. In prior systems multiple call messages have been processed by manual operators who must see to it that the same incoming message is individually retransmitted to each of the addresses appearing on the message.

Each multiple call message in the present system contains a special multiple address code, referred to as a multiple call indicator, that indicates to the switching apparatus in the switching center receiving the message that it will be held responsible for the retransmission of the multiple call message over outgoing lines extending in the direction of the destinations identified by the plurality of routing indicators. In order to handle the multiple call message, the switching centers are provided with multiple call switching apparatus that is automatically selected whenever an incoming multiple call message is received. In other words, the incoming multiple call message is handled on the same basis as any single address message until the apparatus detects the multiple call indicator, which in this system is indicated by a three letter code ZVA. When this multiple call symbol is detected, the apparatus normally used in handling single address messages automatically connects with the multiple call switching equipment and causes the entire message, as received over the incoming line, to be retransmitted to and stored in a tape reperforator associated with the multiple call equipment. Thereafter, the apparatus normally utilized in handling and procesing single address messages is released for use in connection with the processing of additional messages received over the incoming line.

The multiple call storage unit, in which the received multiple call message is now temporarily stored, analyzes the message. For this purpose, tape reading apparatus is provided that senses the tape produced by the tape reperforator and transmits various items of information appearing thereon to the multiple call processing equipment. Such items of information include the precedence indicator identifying the class or priority rating of the received message, the routing indicator identifying the relay switching center that is responsible for the retransmission of the multiple call message, special handling instructions in the form of special codes, and the routing indicators identifying the tributary stations or destinations of the message appearing on the message which are temporarily stored in the processing equipment for subsequent use.

As the tape reader senses the routing indicator or address of the first of a plurality of routing indicators, it is translated into a three digit number identifying the particular outgoing line over which the message must be transmitted and it selects a channel relay unit individually corresponding to the identified outgoing line. Thereafter, the selected channel relay unit is either connected to a storage unit called a cross-office unit, which has been previously associated with the identified outgoing line or it is connected to an available cross-office unit selected from a pool of such units and the selected cross-office unit is associated with the identified outgoing line. In either event, the selected cross-office unit is held in readiness to subsequently store on tape the message to be retransmitted over the outgoing line. In the meantime, the routing indicator and its corresponding outgoing line number are transmitted respectively to a routing indicator tape storage device and a line number tape storage device where the information is perforated on associated tapes for further use.

Each routing indicator appearing in the original multiple call message is processed in this manner thereby selecting as many different channel relay units and associated cross-office units as are necessary to ultimately retransmit the message over the respective identified outgoing lines extending in the direction of the destinations corresponding to the different routing indicators.

After the last of the routing indicators has been processed in this manner, a start-of-message indicator, followed by the precedence indicator, is transmitted simultaneously through each of the channel relay units actually used in processing the different routing indicators to their associated cross-office units. Thereafter, specific message handling instructions, referred to hereinafter as the pilot heading information, are transmitted through only those channel relay units to their associated cross-office units that have been selected two or more times to process two or more routing indicators that must be transmitted over the same outgoing line to reach the desired destinations. Thus, if the multiple call message is to be transmitted over a particular outgoing line to ultimately reach two or more different destinations identified by two or more different routing indicators, pilot heading information regarding the handling of the message at a designated subsequent relay switching center (included as part of the pilot heading information) will also be transmitted with the original message. The pilot heading information is automatically manufactured by the multiple call equipment and includes special codes for controlling the switching apparatus at the designated subsequent relay switching center so that the original message that follows the pilot heading information will be routed to the proper destinations.

In the present system, the codes that may be included in the pilot heading information are the multiple call indicator ZVA for the purpose of controlling the apparatus at a designated relay switching center to process the received message on the basis of a multiple call message; the prosign ZWL which will appear immediately after the multiple call indicator ZVA for the purpose of controlling the apparatus at the designated relay switching center so that it will not process the routing indicators listed immediately following the prosign ZWL and so that it will process all of the routing indicators, except those listed in the pilot heading instructions, appearing in the original message; and the network prosigns UUU, BBB or JJJ, one of which will be substituted in place of the prosign ZWL, if possible, for the purpose of controlling the apparatus at the designated relay switching center so that it will process only those routing indicators appearing in the original message that contain a first letter corresponding to the letter appearing three times in the network prosign and so that it will prevent the processing of the routing indicators having different first letters.

Following the transmission of the foregoing pilot heading instructions, the routing indicators stored in the routing indicator tape storage device and the corresponding line number stored in the line number tape storage device are withdrawn from the respective devices. The line number is utilized to identify the channel relay unit and associated cross-office unit to which the corresponding routing indicator is to be transmitted. Thus, each of the routing indicators stored in the routing indicator tape storage device is distributed one at a time to only the cross-office unit that is associated with the outgoing line identified by the corresponding line number stored in the line number tape storage device.

After the last routing indicator has been withdrawn from the routing indicator tape storage device, a connection is completed between the transmitter in the multiple call storage unit and all of the channel relay units and their associated cross-office units that have been used in processing the message. The entire original message as it appears on the tape in the multiple call storage unit is then fed through the transmitter and is simultaneously transmitted to all of the above noted cross-office units. Each cross-office unit has now produced a perforated tape which is utilized, as soon as the outgoing line to which it is connected becomes available, to independently retransmit the original message preceded by the new pilot heading information over the outgoing line.

When the above message is received at the relay switching center terminating the outgoing line, the switching apparatus thereat will be controlled in accordance with the pilot heading information appearing on the message in order to process the message in the manner described above so that it may be further retransmitted toward its ultimate destinations. If the outgoing line terminates at the desired tributary station, the message will have reached the station identified by the corresponding routing indicators appearing in the original message.

It is the main object of the present invention to provide an improved automatic telegraph system of the type described, wherein multiple address messages, each having a plurality of address codes or routing indicators therein, will automatically be routed in such a manner that each of the destinations identified by listed address codes or routing indicators will receive an individual message.

It is another object of the present invention to provide an automatic telegraph switching system which is arranged to respond to an incoming telegraph message of the multiple address type having a plurality of different address codes or routing indicators listed thereon and to reproduce therefrom an individual message for transmission over each of a plurality of outgoing lines, including all of the information appearing in the original message and any additional information that may be necessary to control apparatus at subsequent switching centers to reproduce one or more additional messages for transmission to certain identified addresses so that each of the addresses listed in the original message will ultimately receive an individual message.

It is still another object of the invention to provide in each relay switching center of an automatic telegraph switching system, apparatus which is controllable by an incoming telegraph message of the multiple address type to reproduce the original received message for retransmission over each of a plurality of selected outgoing lines and to automatically produce a heading for each of the reproduced messages to indicate to another switching center, the specific identity of one or more addresses appearing in the original message that must be processed by the apparatus at the said other switching center to produce one or more additional messages to further route the message received thereat so that a message will ultimately be received at each of the specific addresses listed in the heading of the received message.

It is still another object of the invention to provide in each relay switching center of an automatic telegraph switching system facilities for producing a message heading for each message reproduced and retransmitted over an outgoing line and including in each heading the identity of the particular relay switching center that is responsible for further processing the message received thereat and including either a list of the address codes or routing indicators that must not be processed to produce additional messages for retransmission or a code identifying particular address codes or routing indicators appearing in the original that must be processed to produced additional messages for retransmission.

It is still another object of the invention to provide in each relay switching center of an automatic telegraph switching system facilities for analyzing a multiple call message having a plurality of address codes or routing indicators listed thereon and reproducing a single address message for retransmission over each outgoing line to be used by only one of the address codes or routing indicators and reproducing a multiple address message for retransmission over each outgoing line to be used by two or more of the address codes or routing indicators.

It is still another object of the invention to provide common equipment for processing multiple address messages to determine the different outgoing lines over which the message must be retransmitted and for routing an entire multiple address message to the intercept operator position if outgoing lines have not been determined or for transmitting a message cancellation code, if a determination has been made of said different outgoing lines, over each of said outgoing lines before routing the entire multiple address message to the intercept operator position.

It is still another object of the invention to provide in a telegraph system of the type noted facilities for automatically producing the special codes to instruct an identified relay switching center to retransmit the message received thereat to all addresses of a group except those which are separately listed or to instruct an identified relay switching center to retransmit the message received thereat to only those addresses identified by codes having a specified network identifying character depending upon which one of a plurality of the special codes can be profitably employed in retransmission of the message.

It is still another object of the invention to provide in a telegraph switching system having facilities for automatically processing and routing each message of the multiple address type in accordance with each of a plurality of address identifying codes or routing indicators listed in the message, registering apparatus for storing any one of a plurality of network prosigns and facilities for comparing each routing indicator code in the received message with the network prosign stored in the register apparatus and for preventing the routing of the routing indicator codes in the received message which are not identified with the network corresponding to the registered network prosign.

It is still another object of the invention to provide in a telegraph switching system having facilities at each relay switching center of the system for automatically processing and routing each message of the multiple address type in accordance with each of a plurality of address identifying codes or routing indicators listed in the message and for determining and designating another particular relay switching center in the system that is to retransmit the message received thereat as a single address message or that is to retransmit the received message thereat as a plurality of individual messages over a corresponding plurality of outgoing lines.

It is still another object of the invention to provide in a telegraph switching system having facilities at each relay switching center in the system for automatically processing and routing each message of the multiple address type in accordance with each of a plurality of address identifying codes or routing indicators appearing in the message over specific outgoing lines in directions that will ultimately reach each address, storage apparatus to temporarily store each routing indicator in the multiple address message and to store the identity of the outgoing line over which a message must be transmitted to ultimately reach the corresponding routing indicator, a monitor printing telegraph device for making a record of each stored routing indicator and its outgoing line identity, and means for permitting retransmission of each stored routing indicator over its identified line and for preventing the retransmission of the identity of each of the outgoing lines.

It is still another object of the invention to provide in a telegraph switching system having facilities at each relay switching center in the system for automatically processing and routing each message of the multiple address type in accordance with each of a plurality of address identifying codes or routing indicators appearing in the message over specific outgoing lines in directions that will ultimately reach each address, storage apparatus to temporarily store each routing indicator in the multiple address message and to store the identity of the outgoing line over which a message must be transmitted to ultimately reach the corresponding routing indicator, and means for withdrawing from said storage apparatus each address code and its associated line number in order to retransmit each stored address code over the particular outgoing line identified by its associated line number.

It is still another object of the present invention to provide in an automatic telegraph switching system having a plurality of different switching centers and telegraph stations connected to the different centers, facilities at each switching center for processing a received multiple address message which includes a first translator for determining each outgoing line over which the message must be retransmitted to reach each address appearing in the message, a second translator for determining, if required, the next switching center that must again process the message received over each of the determined outgoing lines in order to again retransmit the message one or more times to reach particular stations, and retransmitting the original received message once over each determined outgoing line preceded by the identity of the next switching center which must also process the particular message received thereat.

It is still another object of the present invention to provide in an automatic telegraph switching system, facilities for counting each address code or routing indicator appearing in each multiple address telegraph message and selecting the different outgoing lines over which the message must be retransmitted to reach the different called telegraph stations identified by the address codes, facilities for counting the number of address codes that select the same outgoing line, facilities for comparing the total number of address codes appearing in the message with the number of address codes that select the same outgoing line, apparatus for retransmitting the original message once over each selected outgoing line, and apparatus for transmitting a special prosign code or message handling instruction over the outgoing line selected by a certain number of the address codes in the message prior to the retransmission of the message thereover.

It is still another object of the present invention to provide in an automatic telegraph switching system arranged to automatically retransmit telegraph messages, facilities for automatically terminating retransmission of a message if the signalling circuit over which the message is being retransmitted is interrupted during retransmission.

It is still another object of the present invention to provid in an automatic telegraph switching system having facilities at each switching center of the system for automatically processing and routing each message of the multiple address type in accordance with each of a plurality of address identifying codes appearing in the message over different outgoing lines determined by the address codes in the direction to ultimately reach each address, facilities for also routing the message to an intercept position if an outgoing line determined by any address code is unavailable to retransmit the message, or to store the message so that it will be retransmitted over the determined outgoing line when it becomes available, in accordance with the precedence code or priority rating of the particular message.

It is still another object of the present invention to provide in an automatic telegraph switching system having facilities at each switching center of the system for automatically processing and routing a multiple address message in accordance with each of a plurality of address codes over different outgoing lines determined by the address codes, apparatus for also routing the message to an intercept position if an outgoing line determined by an address code is unavailable, and apparatus for preceding the retransmission of a message to any outgoing line or intercept position with a special code indicating that the message is to be handled as a multiple address message if two or more address codes determine the same outgoing line or intercept position.

It is still another object of the present invention to provide in an automatic telegraph system, apparatus for registering a start-of-message code of a multiple address telegraph message in order to condition additional apparatus to process the message in accordance with each of a plurality of address codes included in the message to select individual storage devices and for simultaneously retransmitting the original received message to each storage device selected by an address code.

*The general arrangement of the telegraph system*

Figure 89:
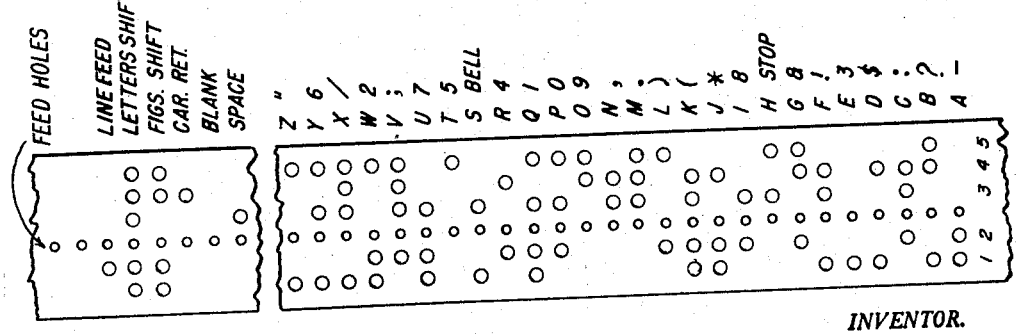
Figure 9:
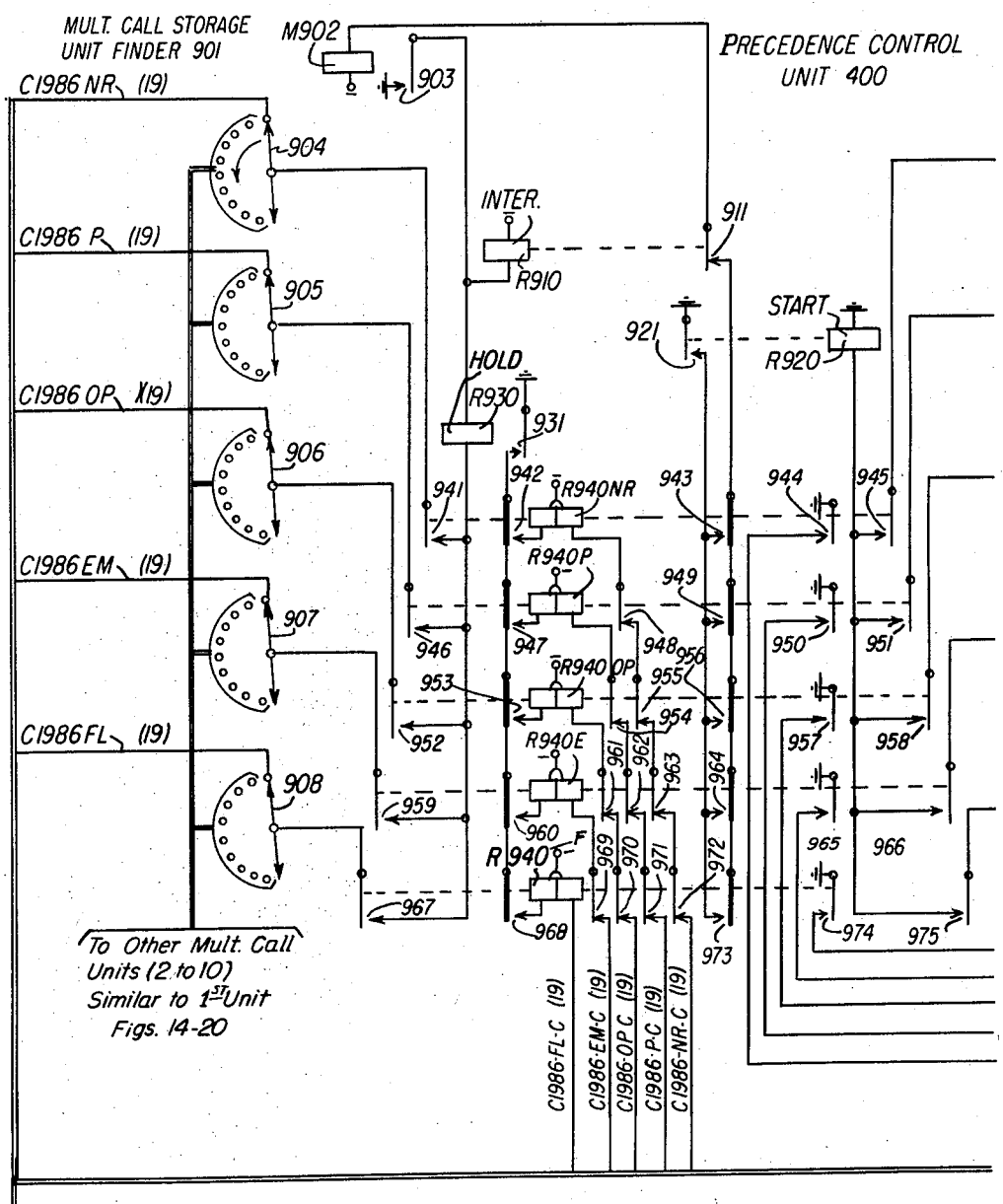
Figure 87:
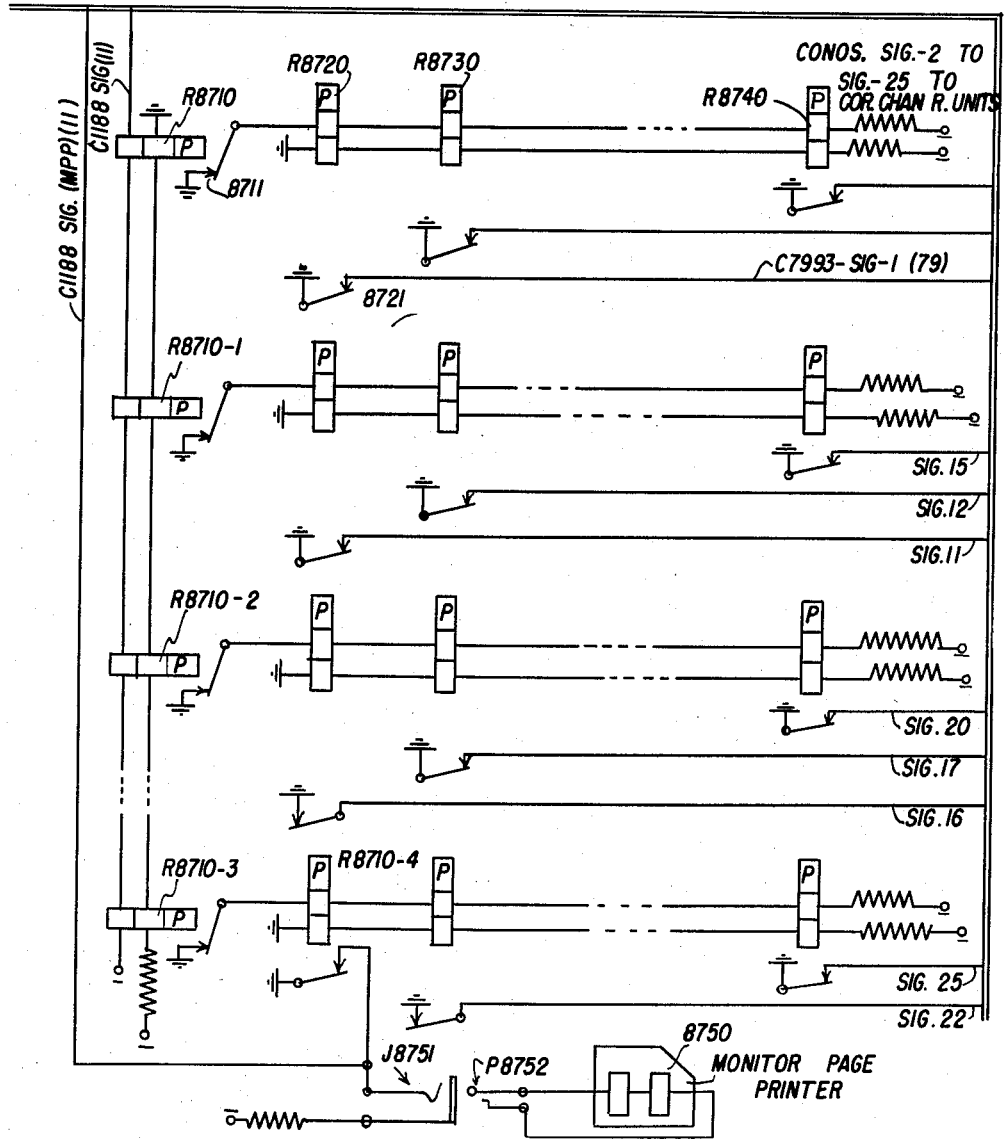

The invention, both as to its organization and method of operation, together with other objects and advantages thereof, will best be understood by reference to the following specification taken in connection with the accompanying drawings in which Fig. 1 is a schematic diagram of a portion of a large area served by an automatic telegraph switching system embodying the present invention; Figs. 2A and 2B taken together illustrate the general trunking arrangement of the telegraph switching apparatus incorporated in the relay switching center UAC of the automatic telegraph switching system; and Figs. 3 to 6, inclusive, 7A, 7B and 8, taken together illustrate the apparatus incorporated in the relay switching center UAC which apparatus is shown in detail in the previously mentioned Stiles application Serial No. 260,854, filed December 10, 1951, now issued on September 3, 1957, as Patent 2,805,283. This apparatus, however, has been slightly modified in order to incorporate therein the various features of the present invention and reference may be had to the above mentioned Stiles application for a more detailed explanation of the operation of the circuits and apparatus which have been schematically illustrated herein to simplify the present application. In order to more readily understand the operation of the present apparatus included in the relay switching center UAC and having incorporated therein the features of the present invention, the respective units of equipment and circuits illustrated in Figs. 3 to 6, inclusive, 7A, 7B and 8, and which are also illustrated and described in the previously mentioned Stiles patent, have been given the same numerical designations as those appearing in the Stiles patent except that the corresponding numerical designations herein are prefixed with the letter X. Figs. 9 to 87, inclusive, taken together illustrate the details of the multiple call switching apparatus included in the relay switching center UAC of the telegraph system which apparatus has incorporated therein the features of the present invention whereby multiple call telegraph messages received by the apparatus illustrated in Figs. 3 to 6, inclusive, 7A, 7B and 8, may be automatically stored, analyzed and then retransmitted to as many different destinations as is indicated by the routing indicators or addresses on a single received multiple call message. Fig. 88 illustrates the mode of combining Figs. 3 to 87, inclusive, to form a unified automatic telegraph switching system for the relay switching center UAC; and Fig. 89 illustrates a portion of a perforated tape bearing all of the code hole designations of a predetermined combinational five-channel code.

Figure 3:
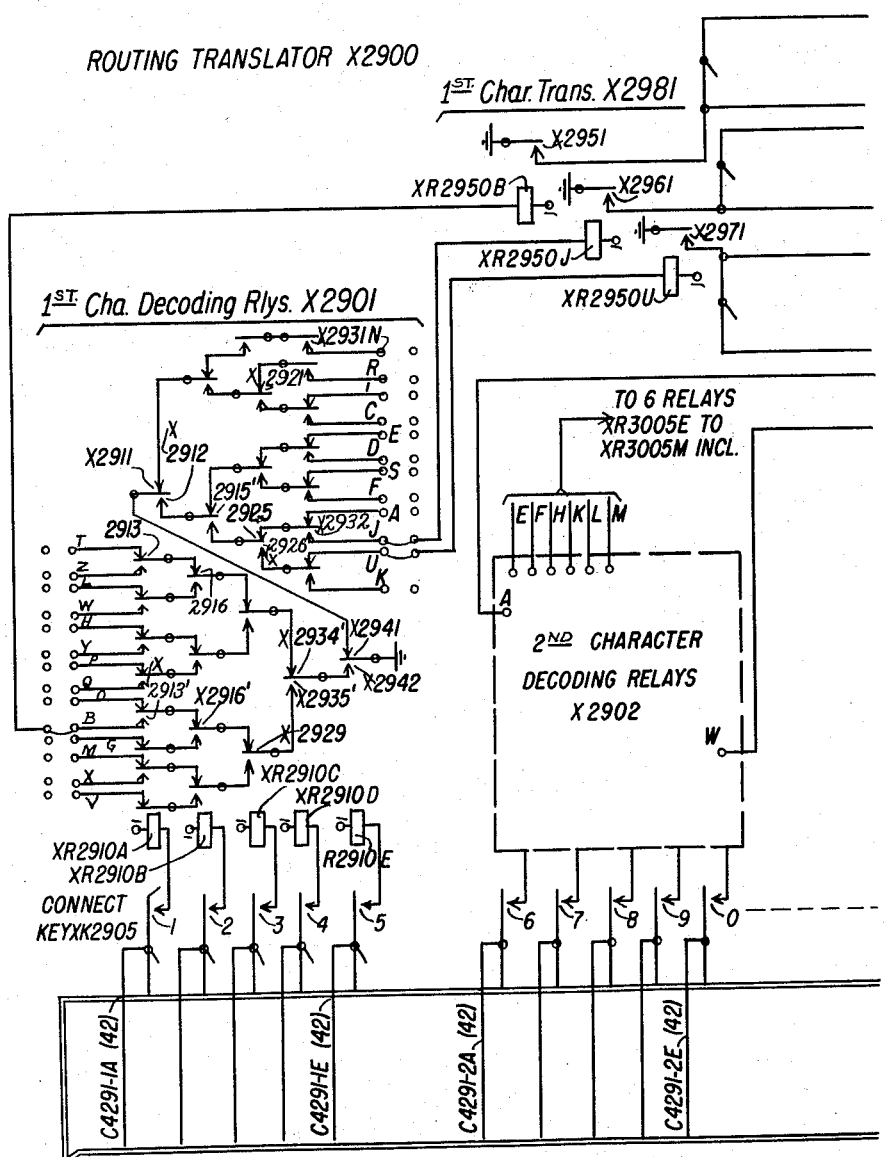
Figure 4:
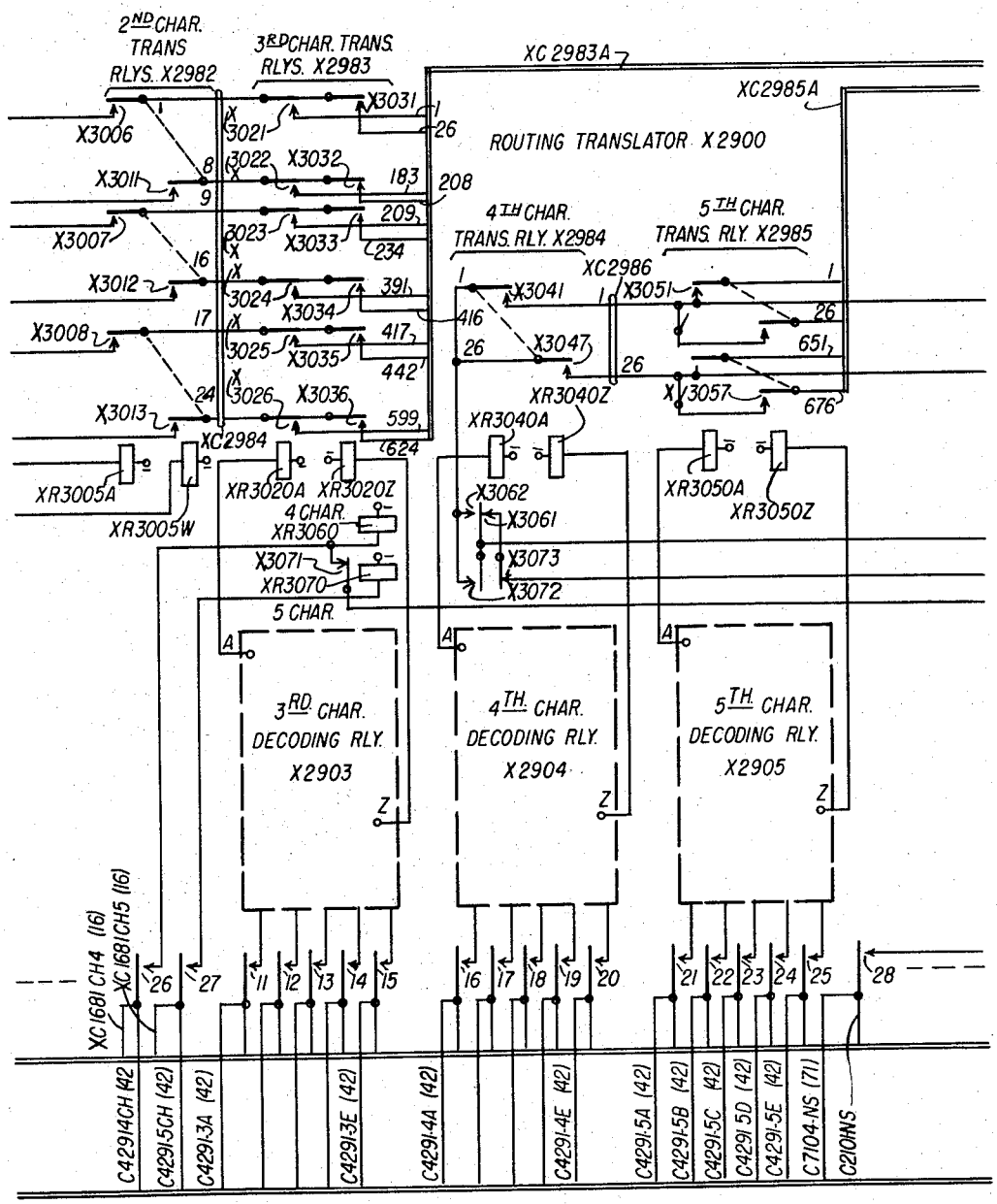
Figure 5:
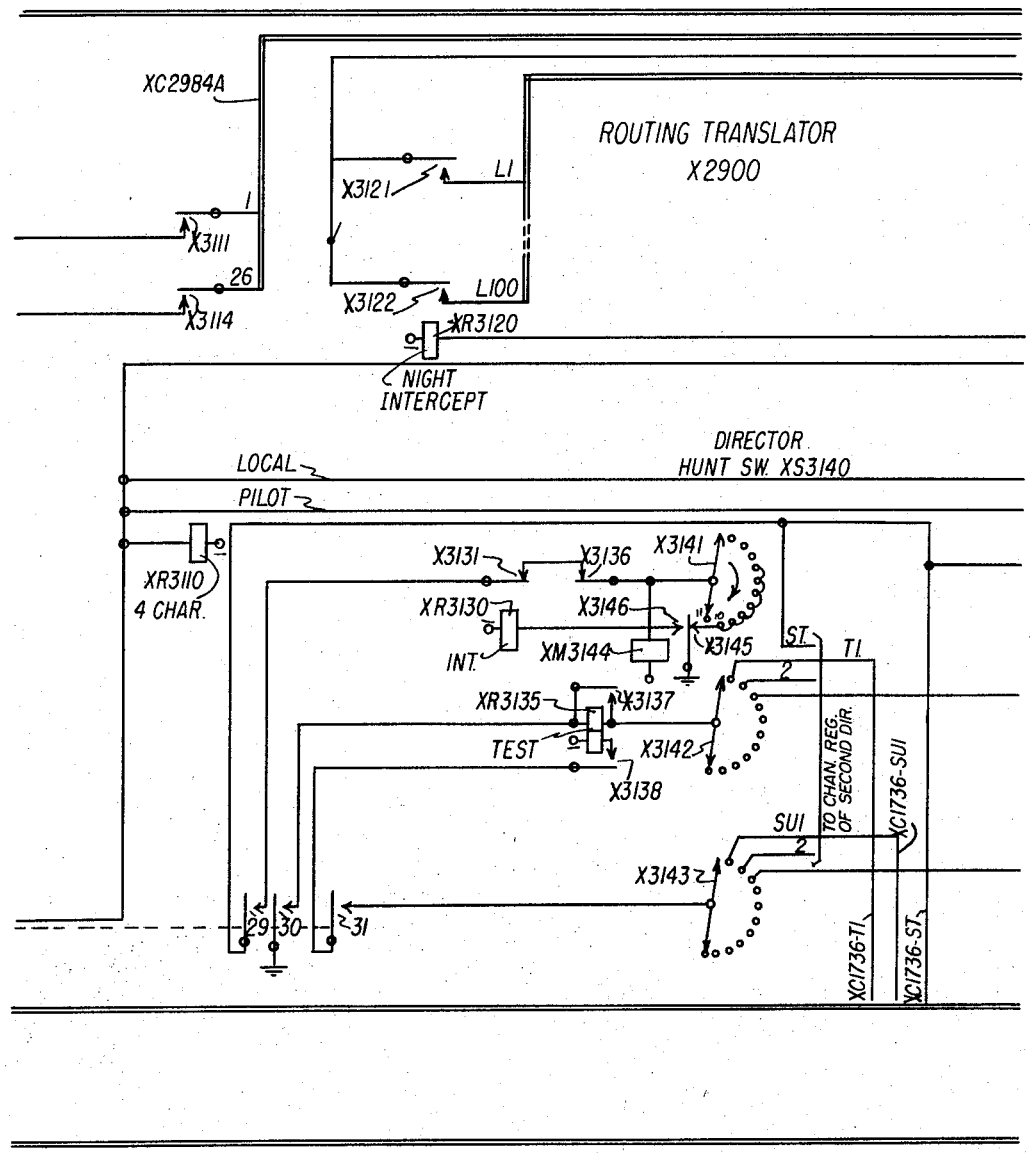

In considering the above mentioned drawings in greater detail it will be seen that Figs. 3 to 5, inclusive, illustrate a routing translator X2900 which is common to a plurality of directors and which is temporarily associated with a calling one of the directors in order to translate the routing or address portion of a received telegraph message so that the message will be retransmitted over the proper outgoing line. This apparatus is also utilized in a case of a multiple call telegraph message to cause the director to select the multiple call switching apparatus illustrated in Figs. 9 to 87, inclusive. Except for the slight modifications in the circuits and apparatus as is required for multiple call operation, the routing translator and patch panel illustrated in Figs. 3 to 6, inclusive, is substantially the same as that disclosed in the previously mentioned Stiles Patent.

Figure 7A:
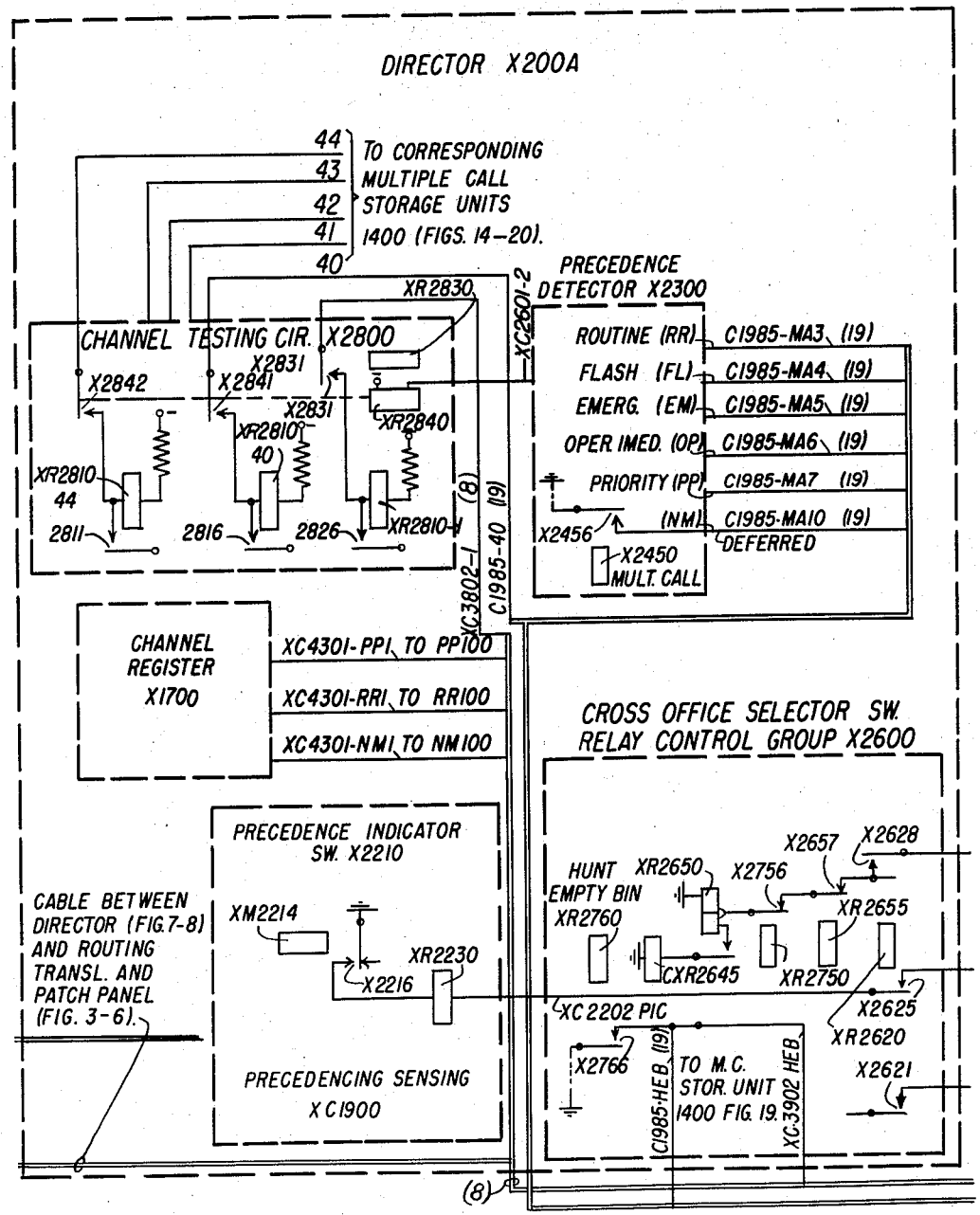
Figure 7B:
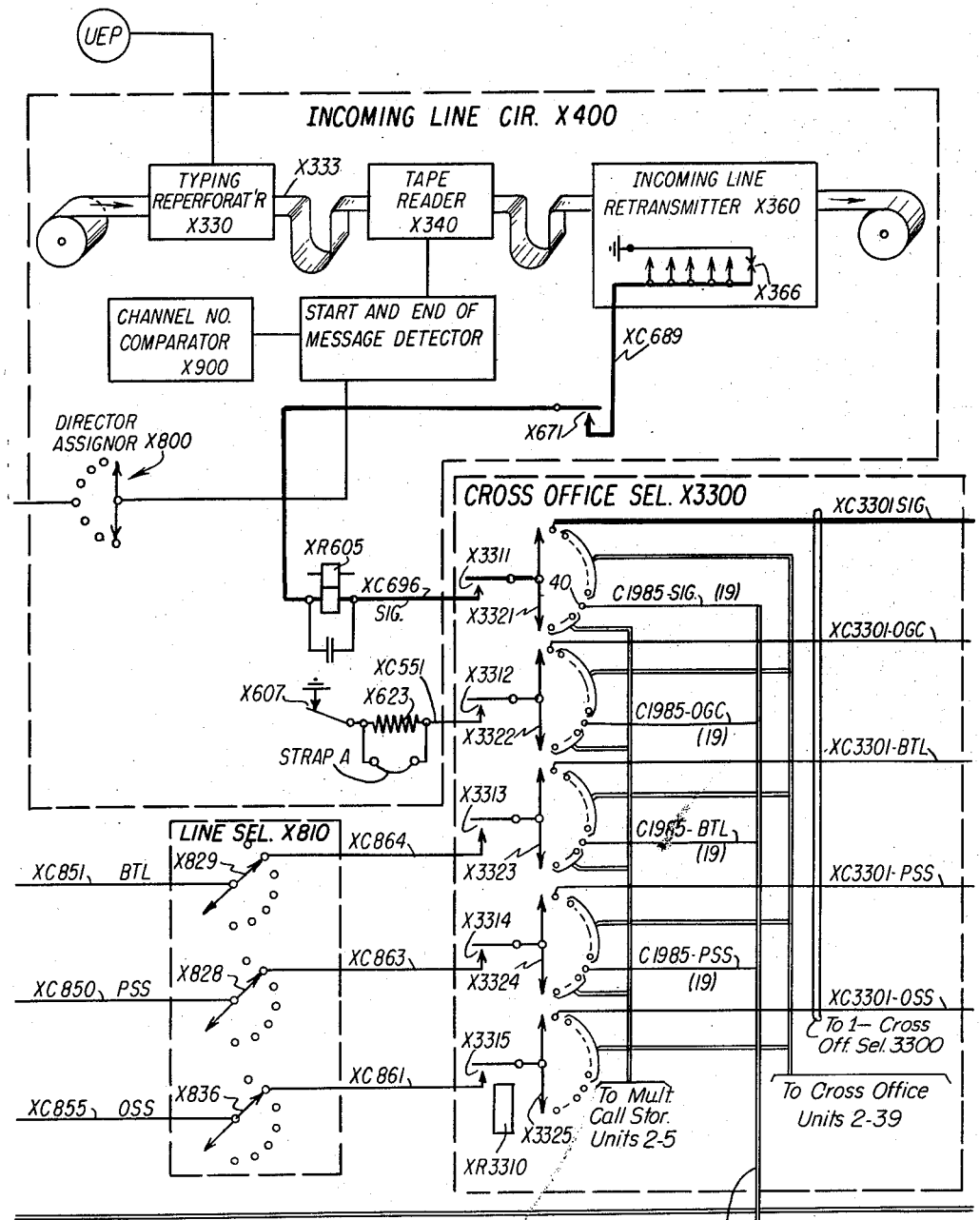
Figure 8:
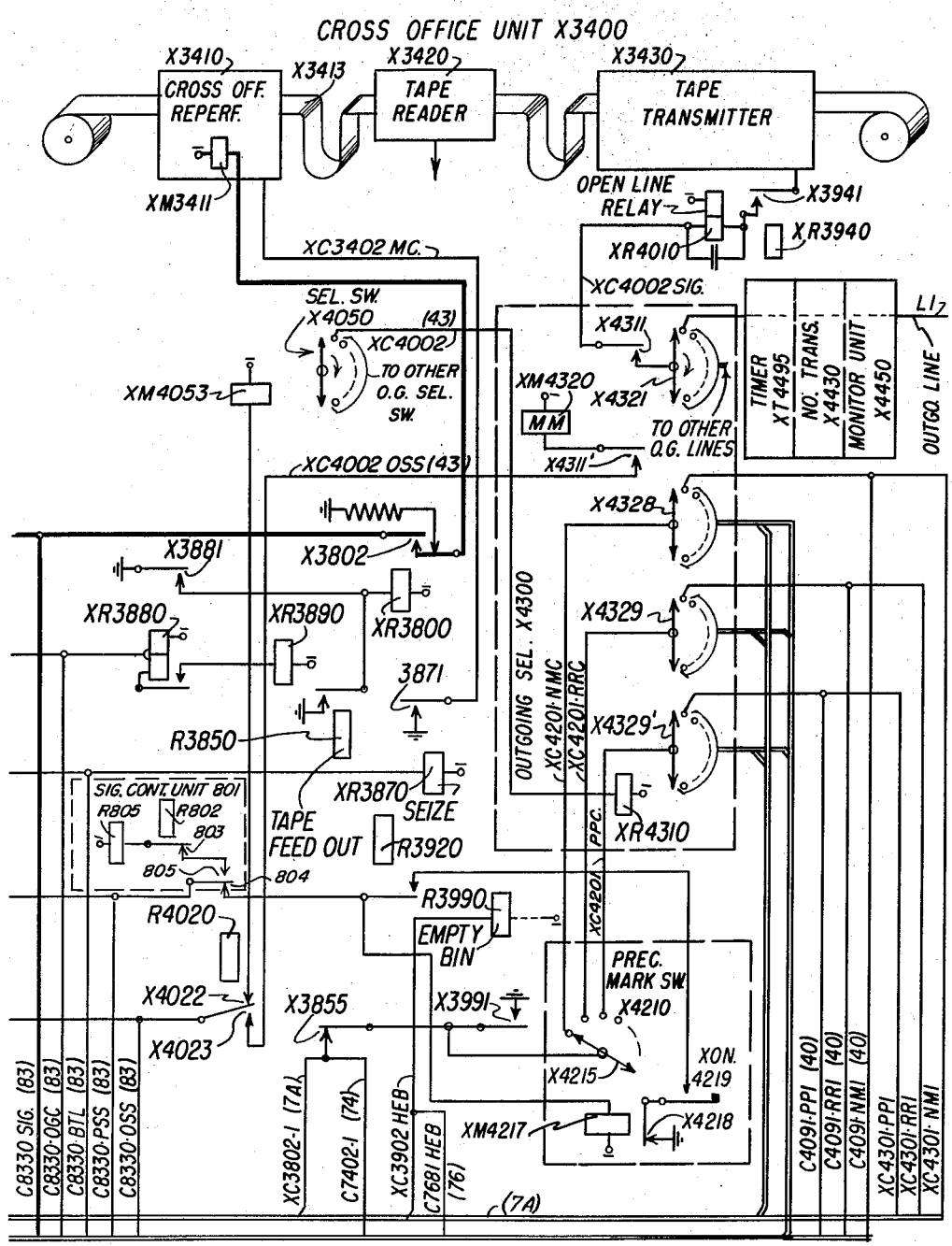

Figs. 7A, 7B, and 8 taken together schematically illustrate sufficient of the details of the incoming line circuit X400, a cross-office selector X3300, a cross-office unit X3400, an outgoing selector X4300 and the director X200A of the previously mentioned Stiles application so that the present invention and the manner in which the multiple call apparatus cooperates with the apparatus of the previously mentioned Stiles patent may be readily understood.

Figure 36:
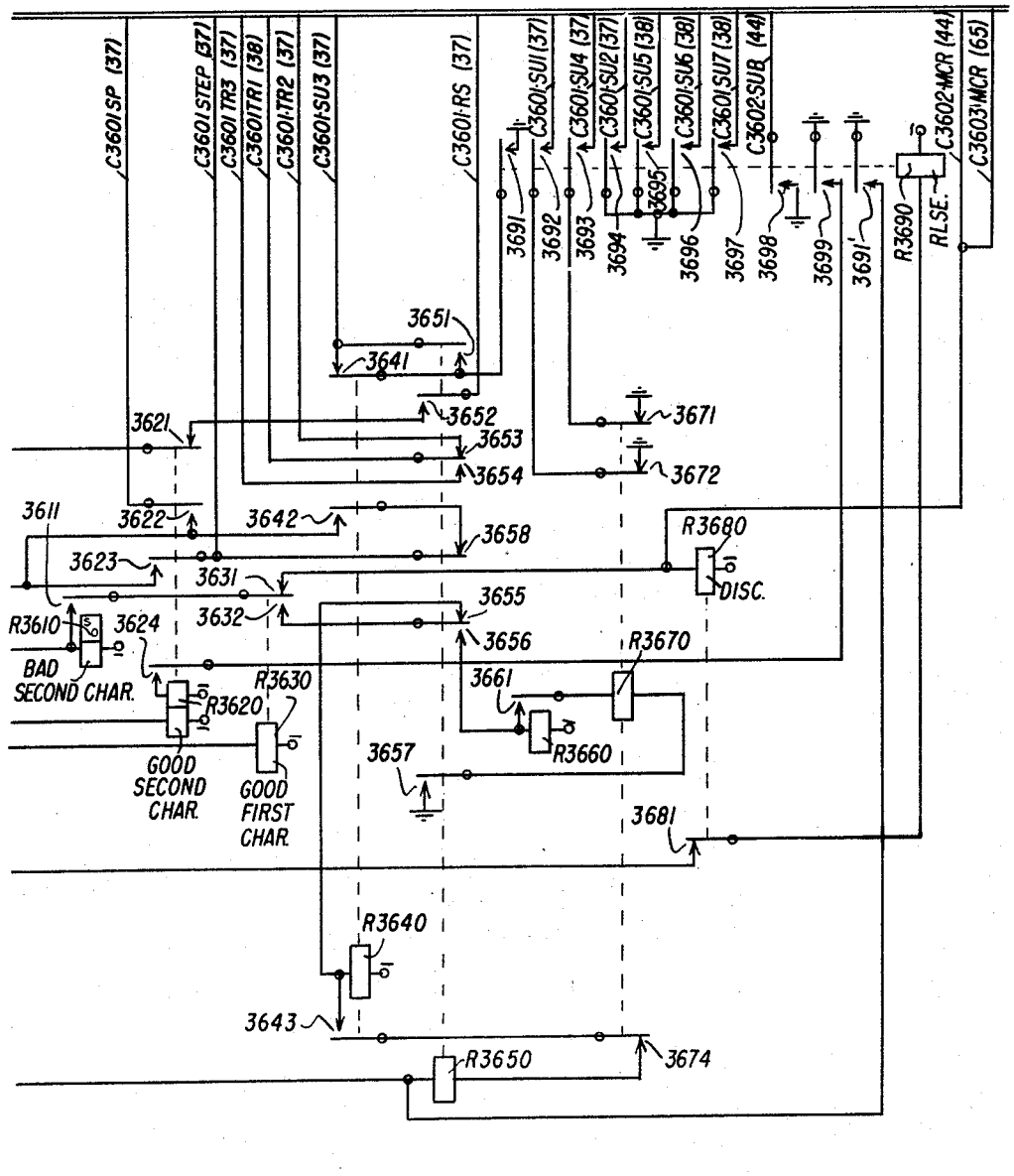
Figure 37:
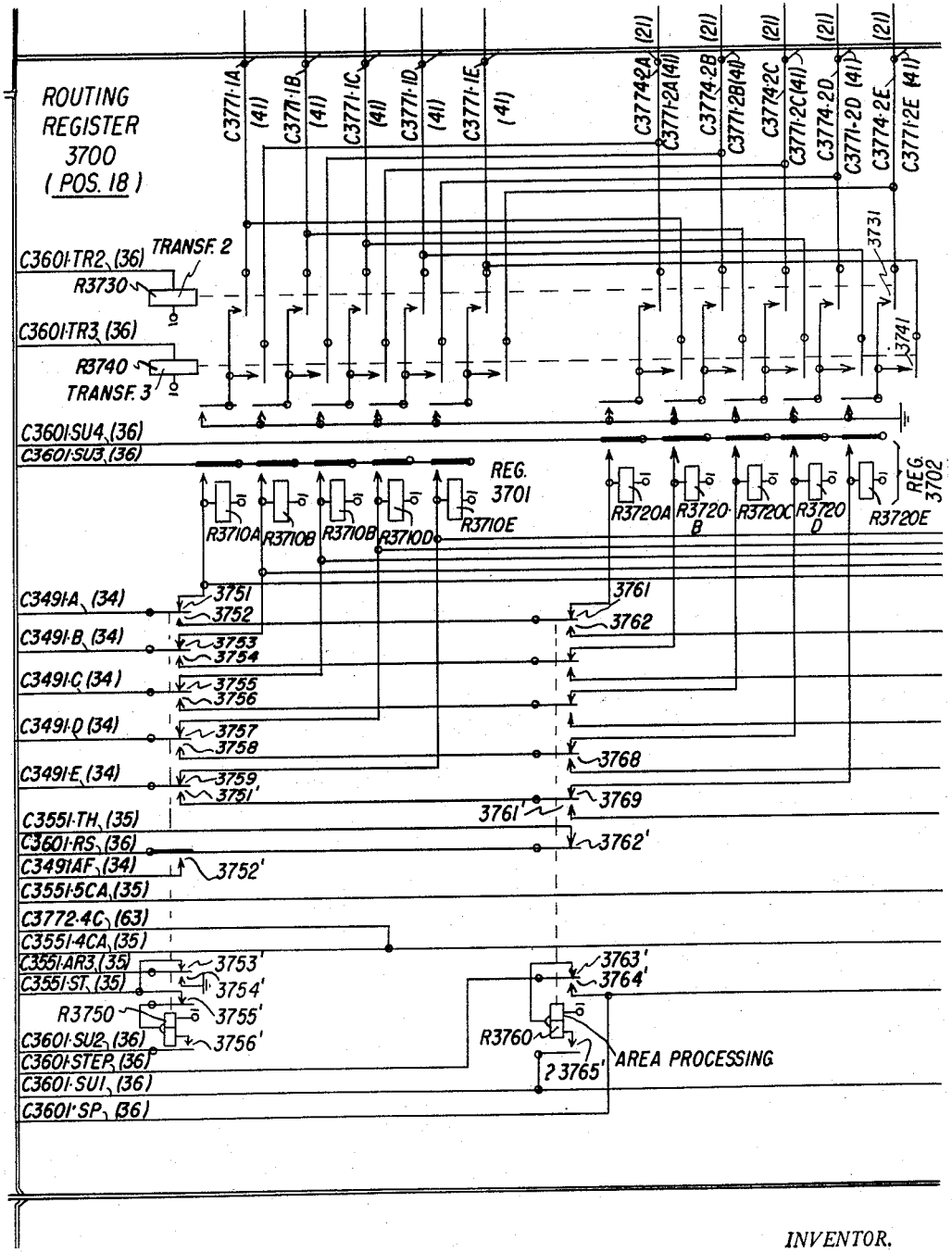
Figure 38:
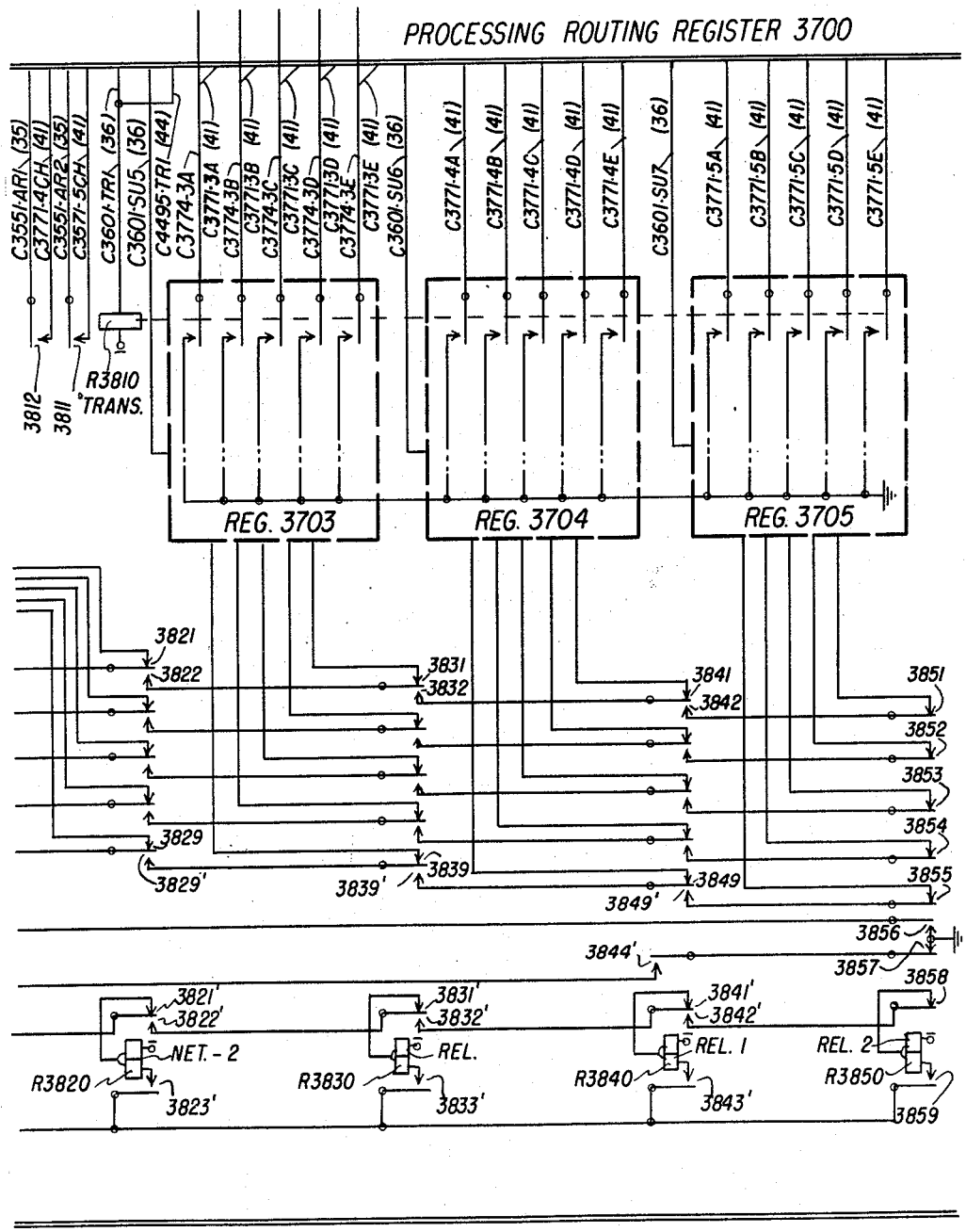
Figure 39:
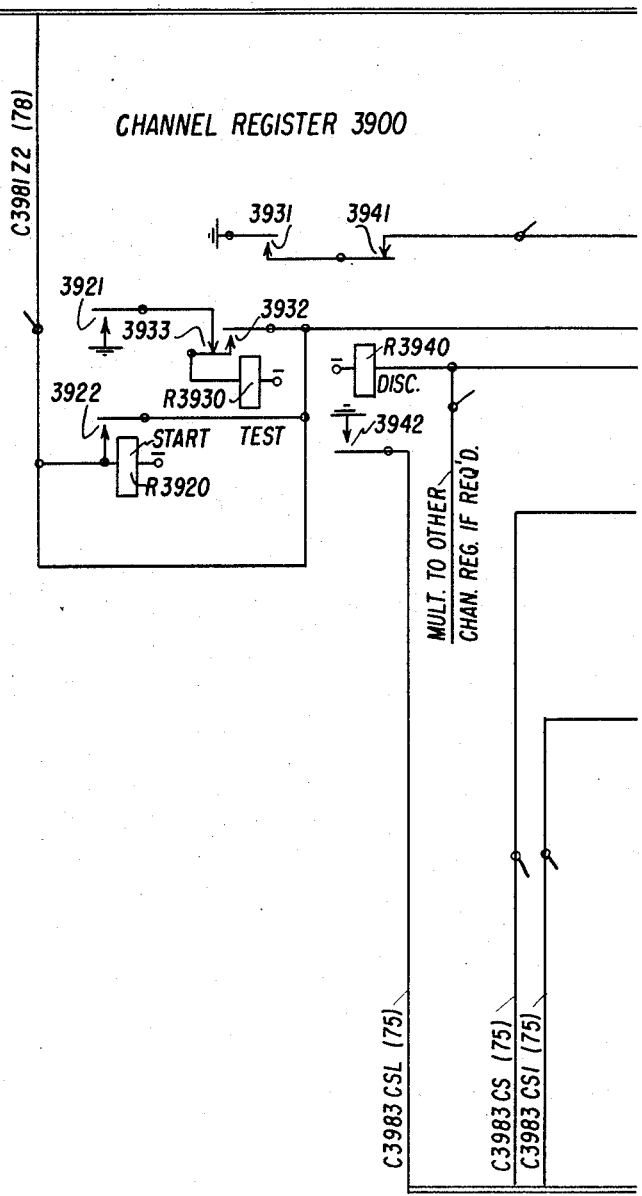
Figure 40:
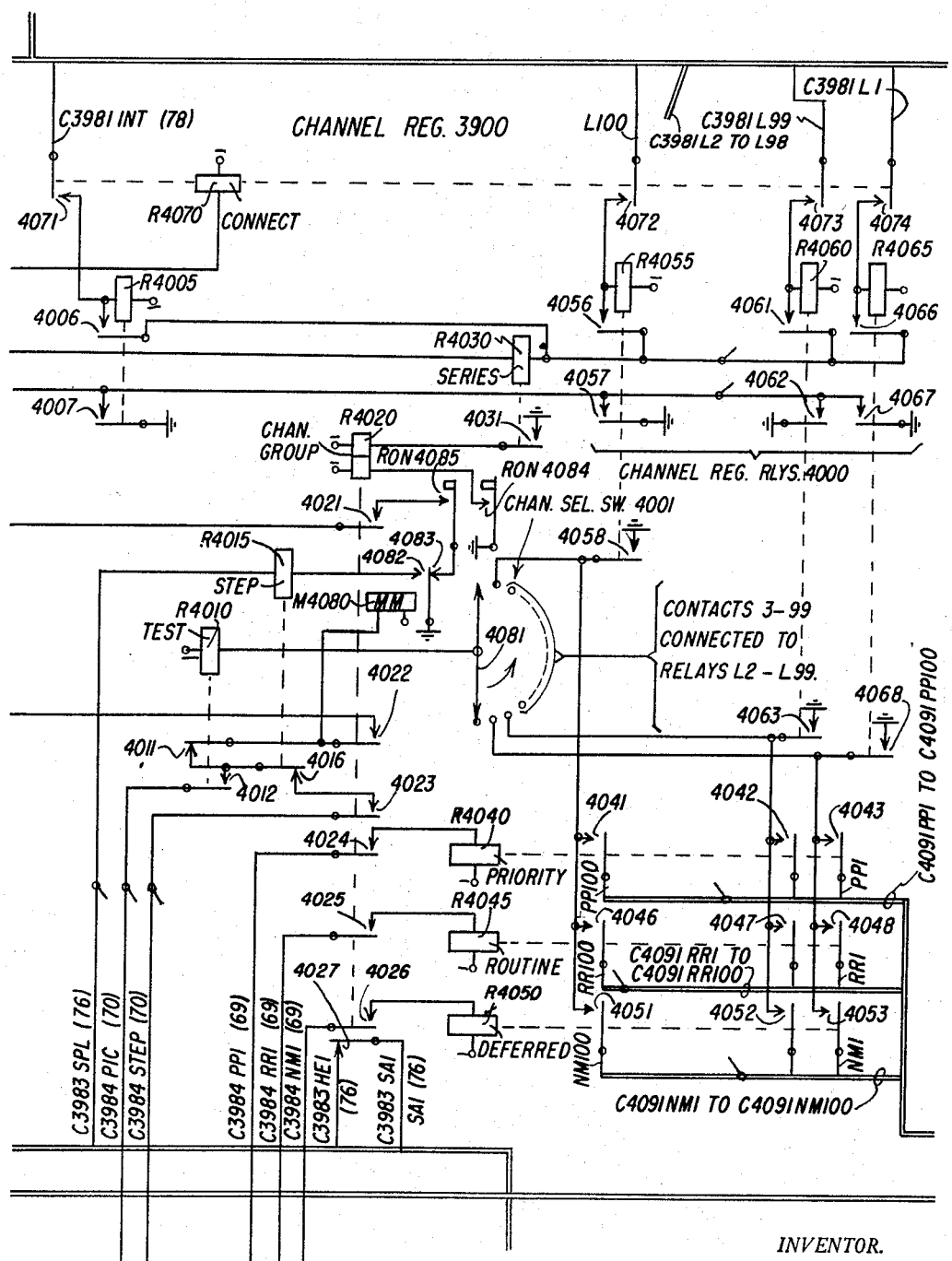
Figure 45:
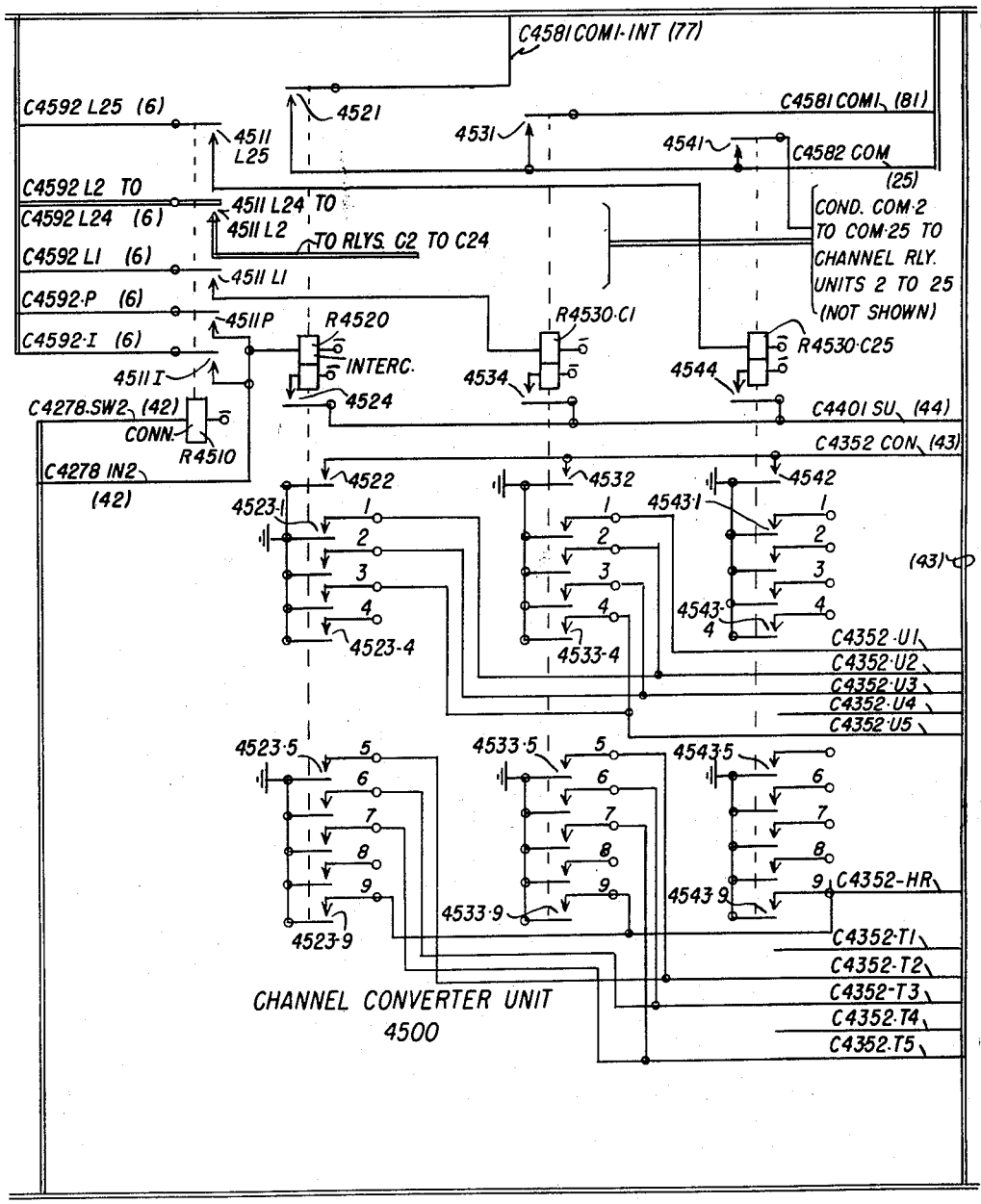
Figure 46:
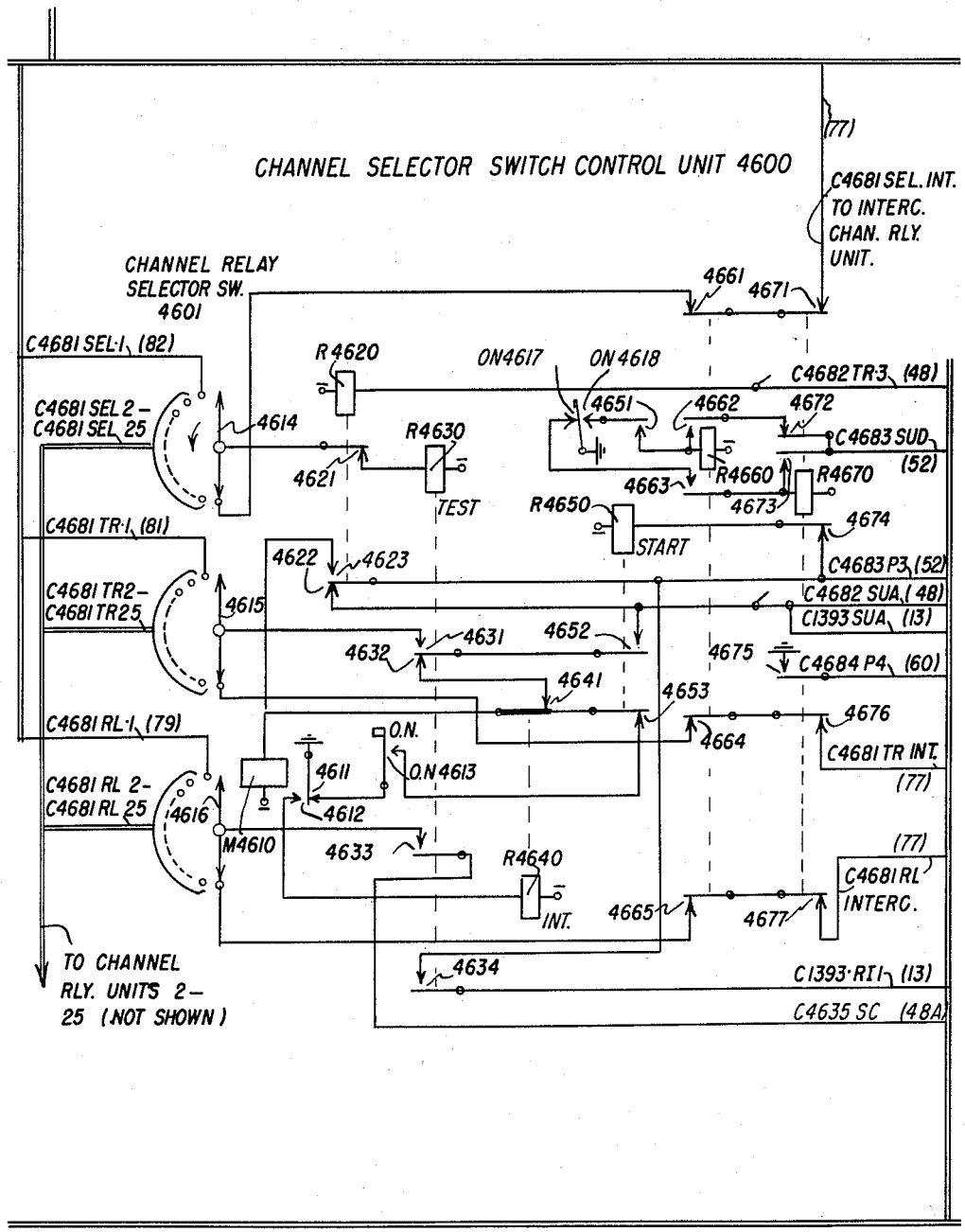
Figure 47:
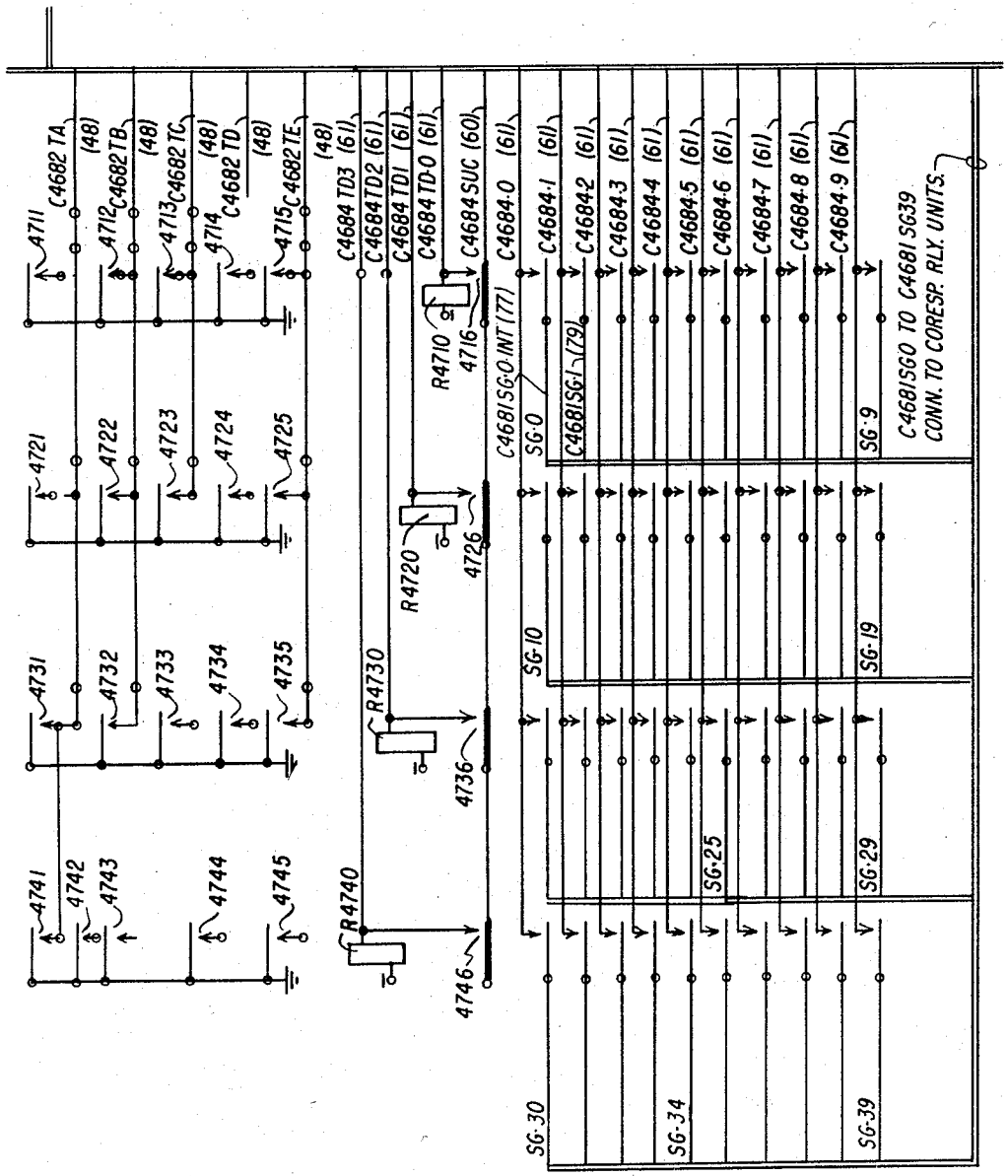
Figure 52:
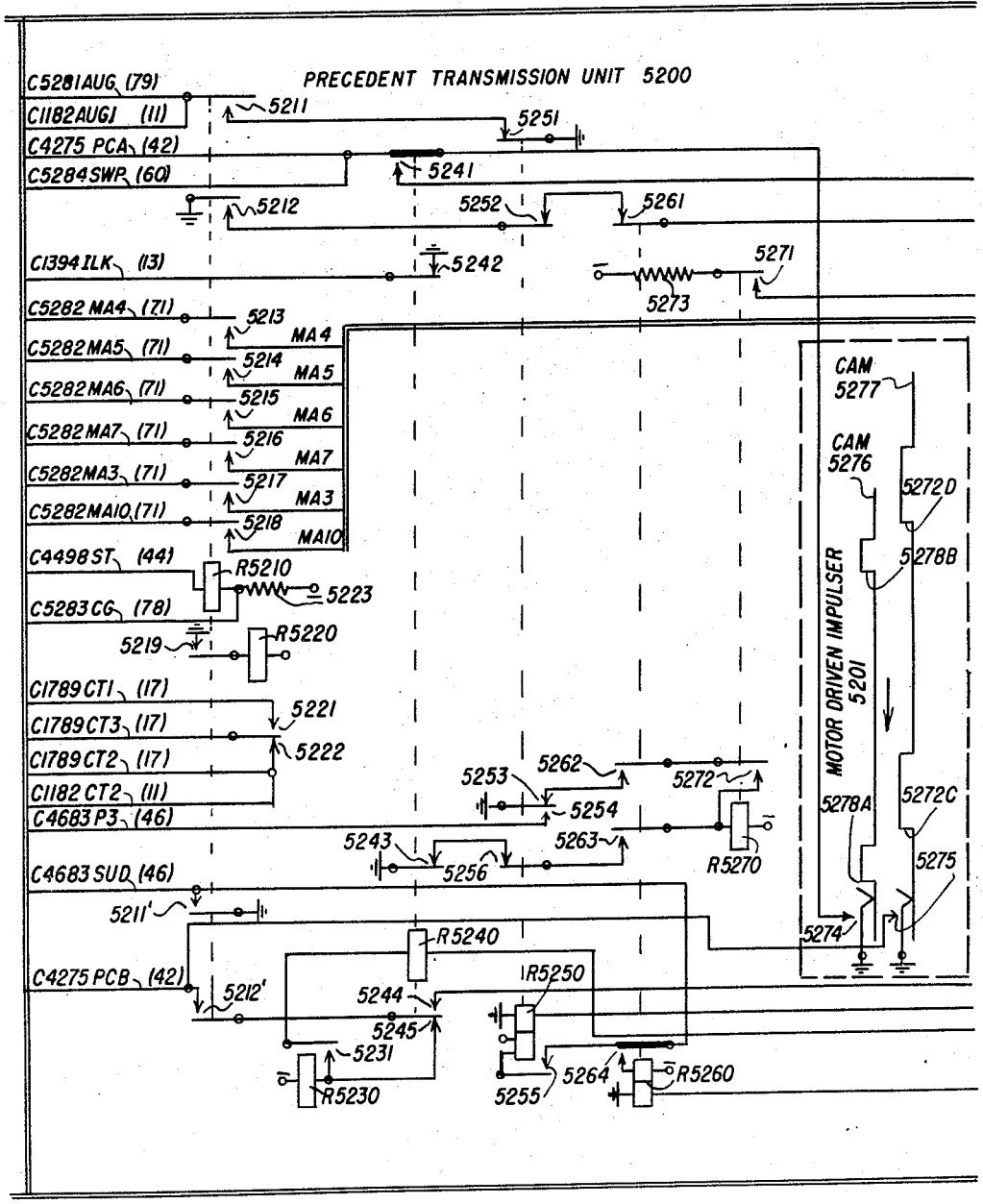
Figure 53:
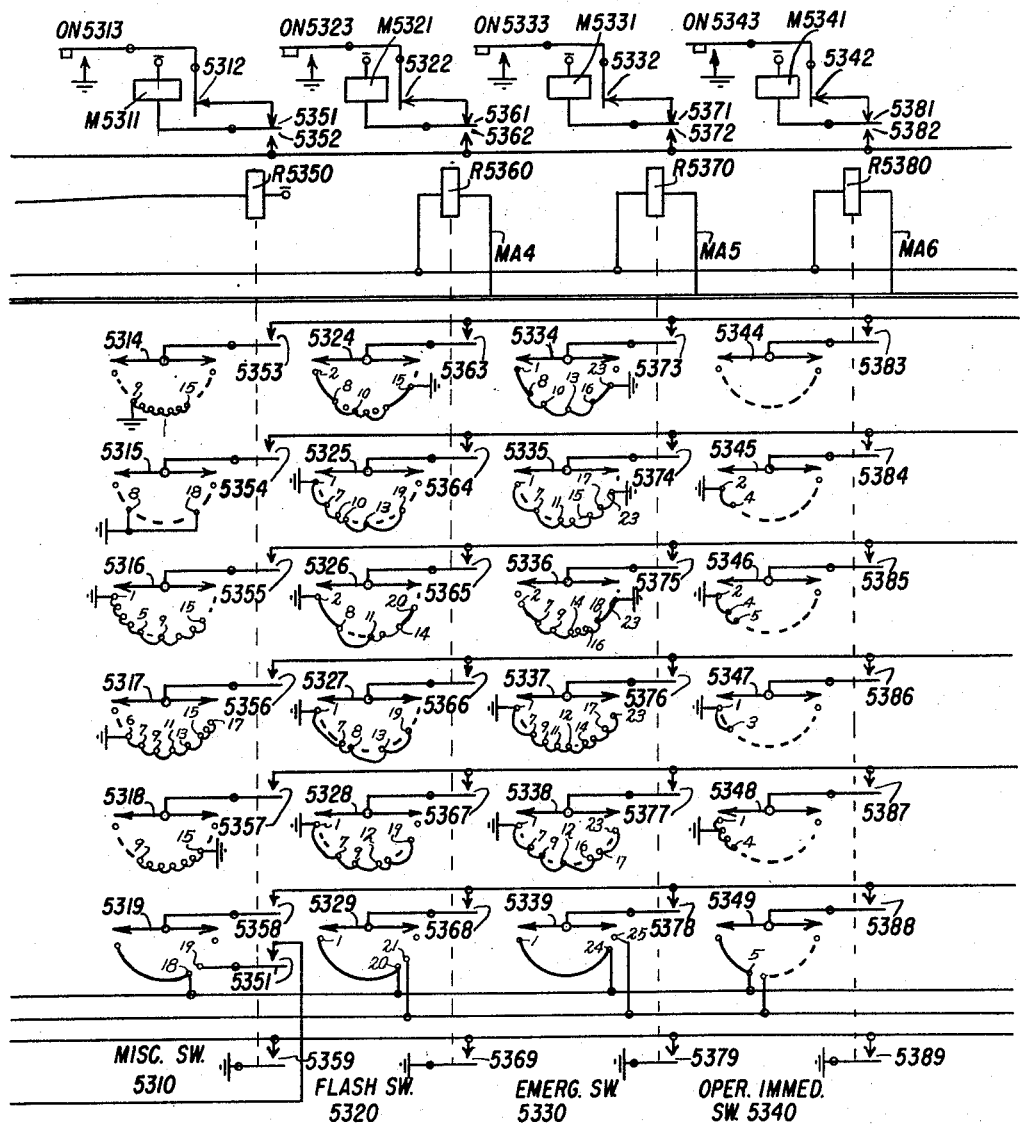
Figure 54:
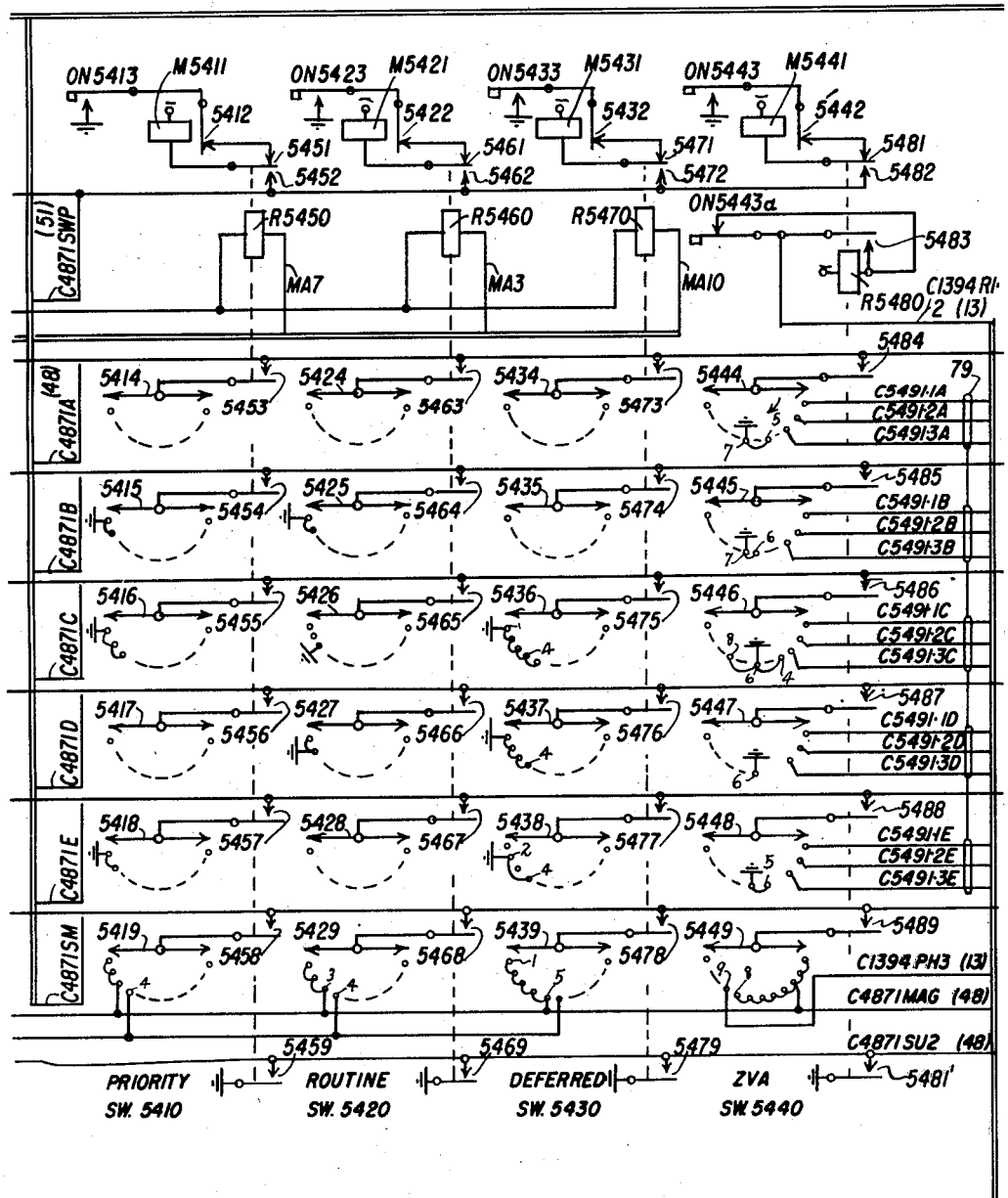
Figure 55:
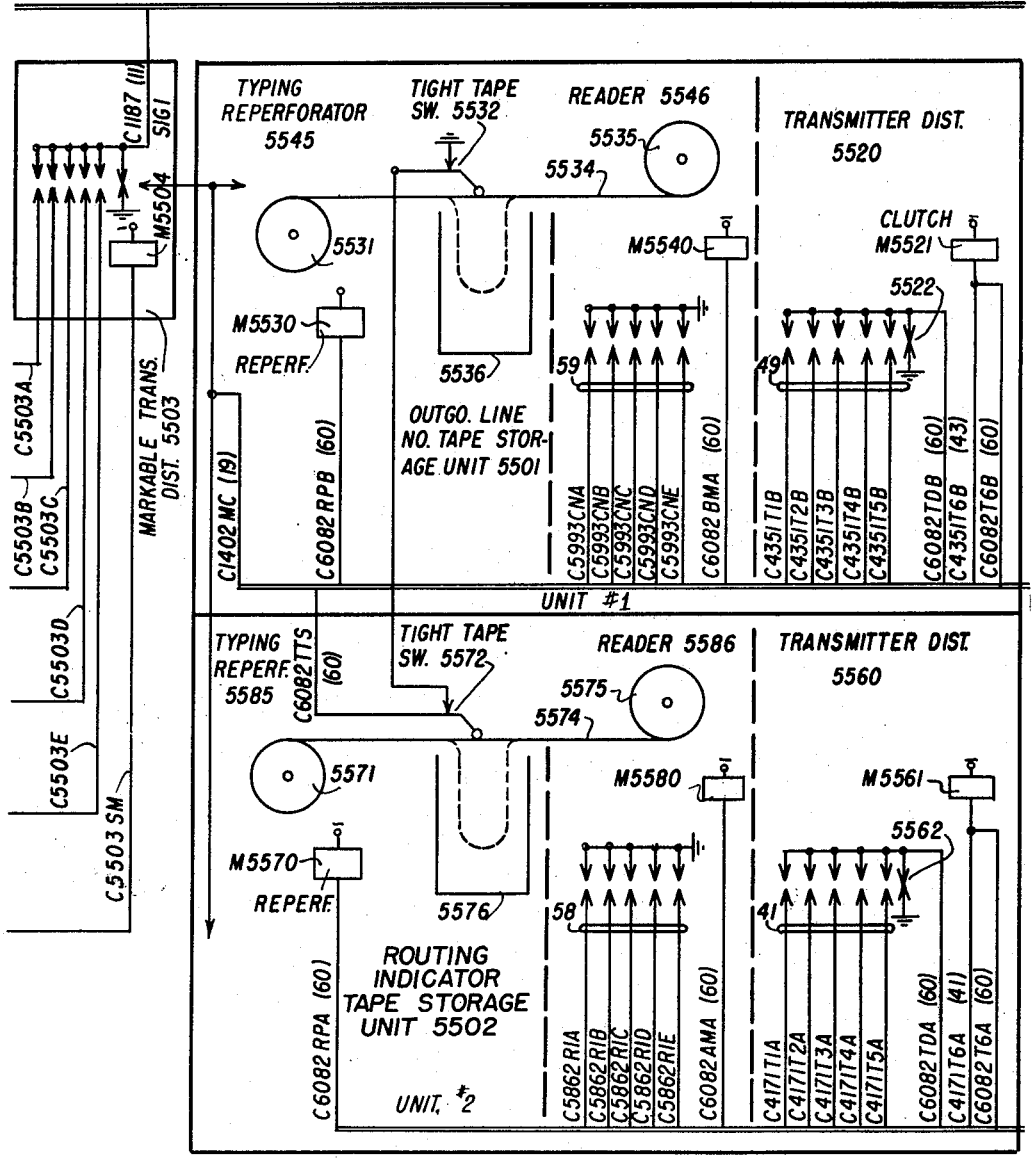
Figure 56:
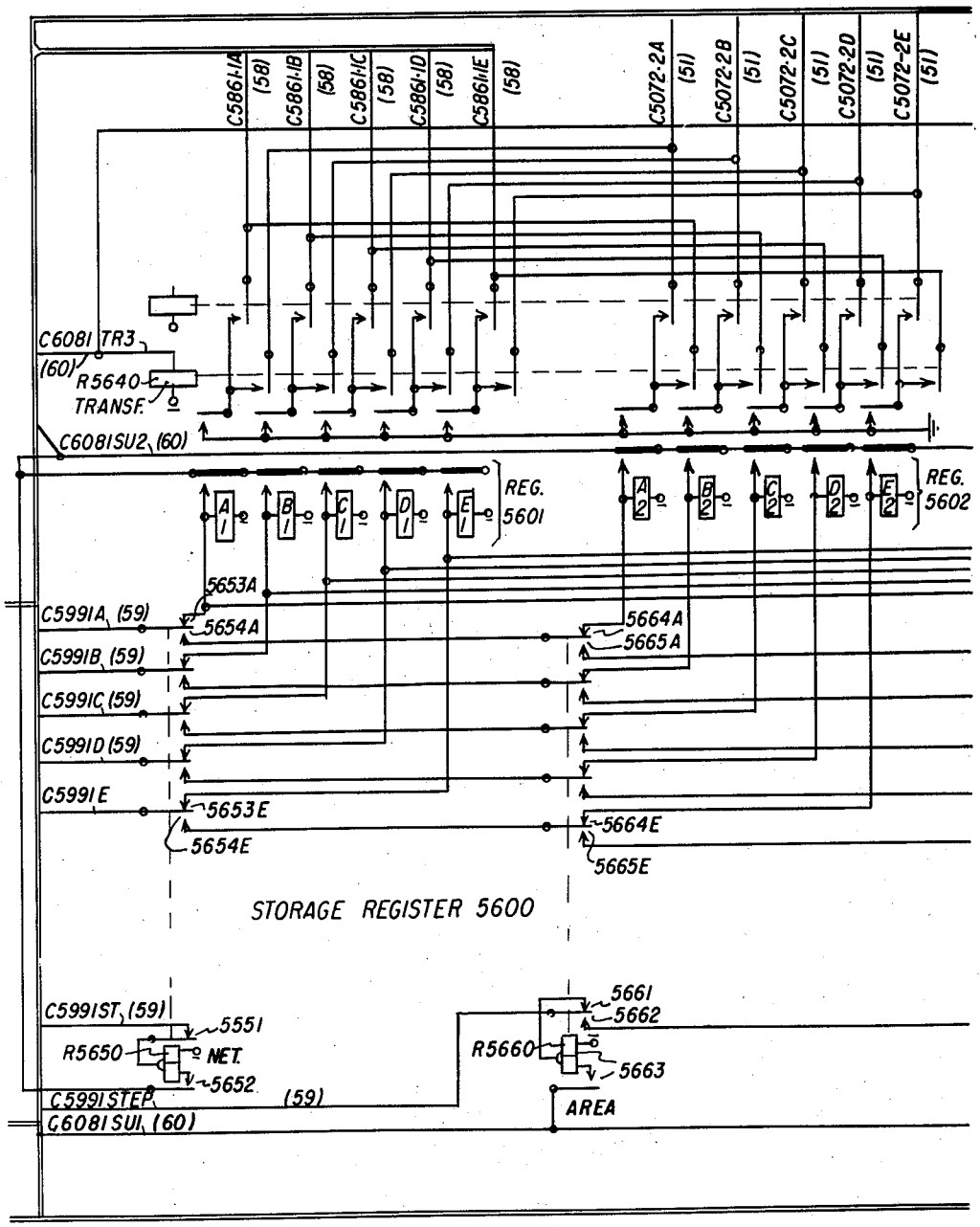
Figure 57:
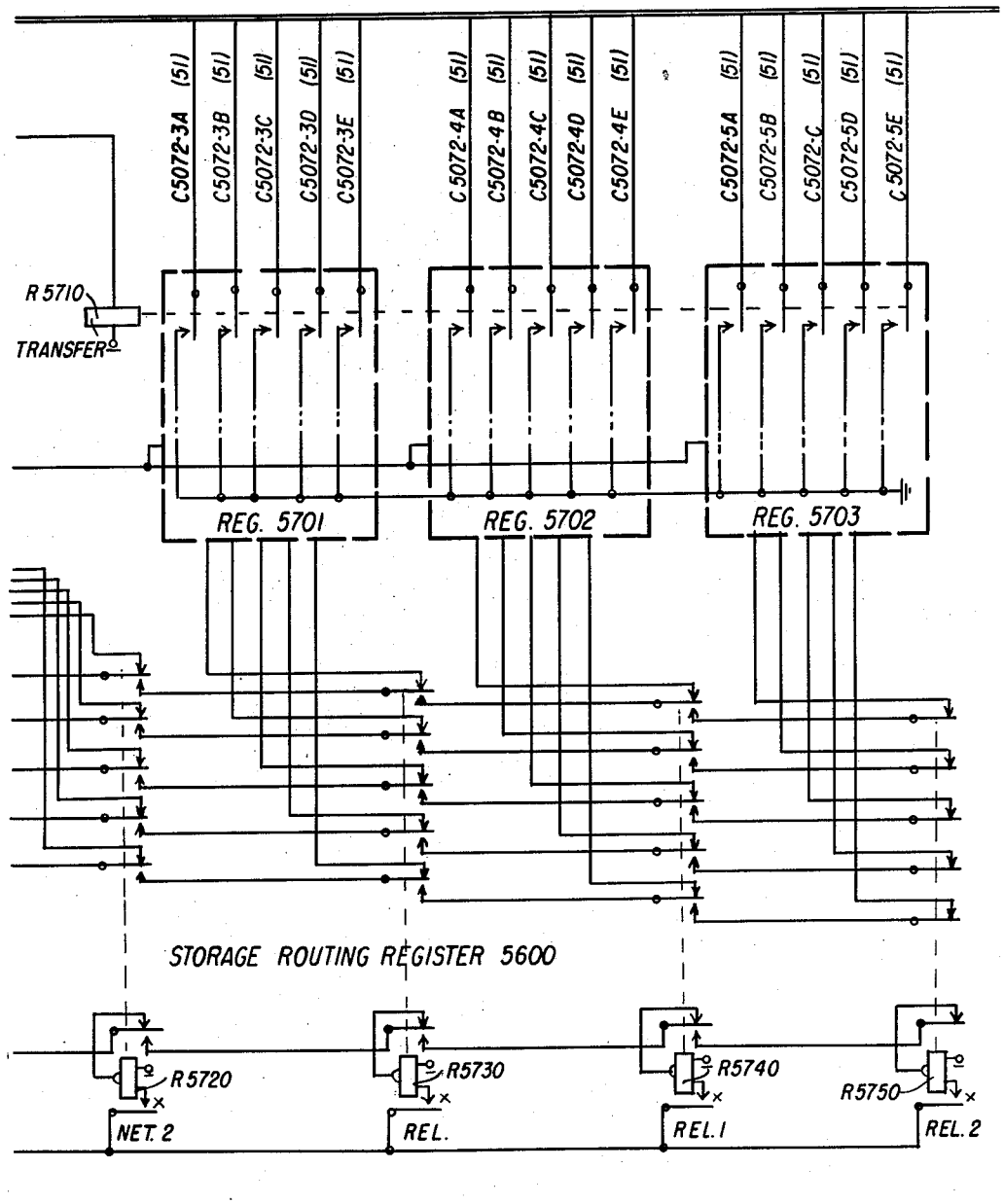
Figure 62:
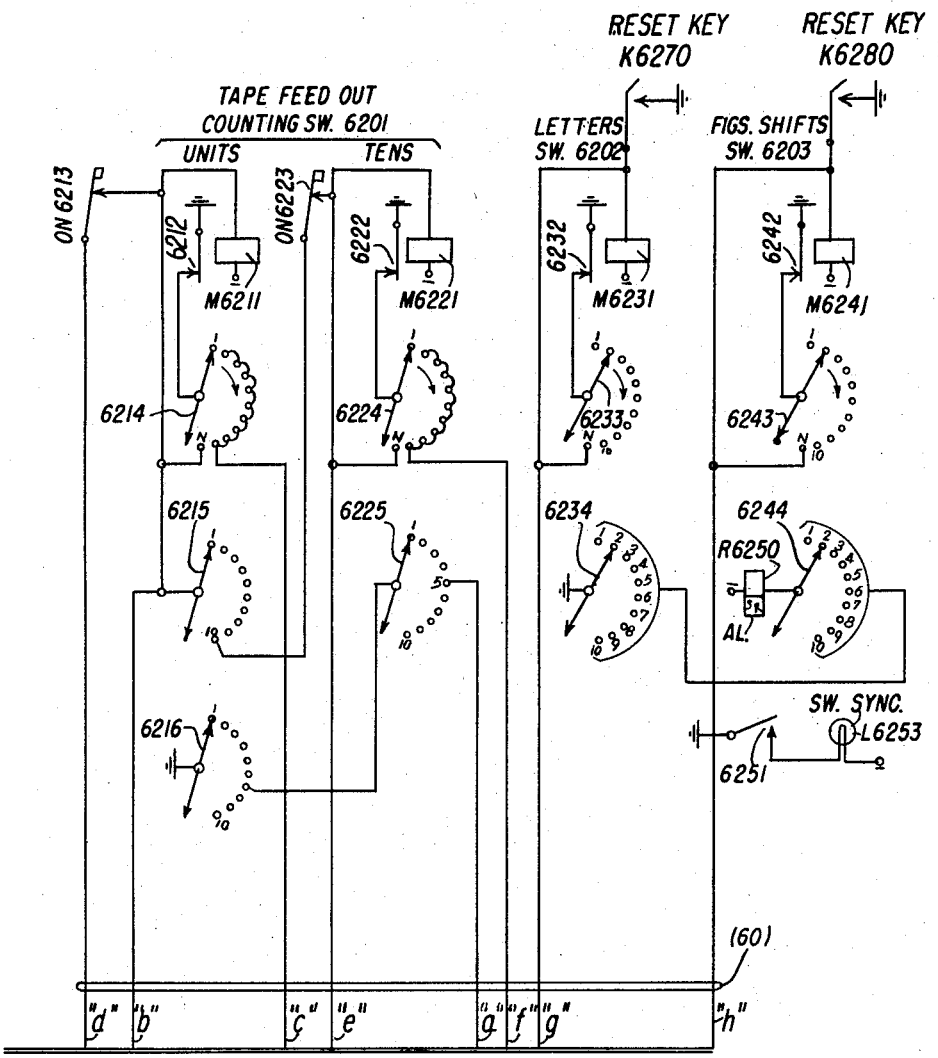
Figure 63:
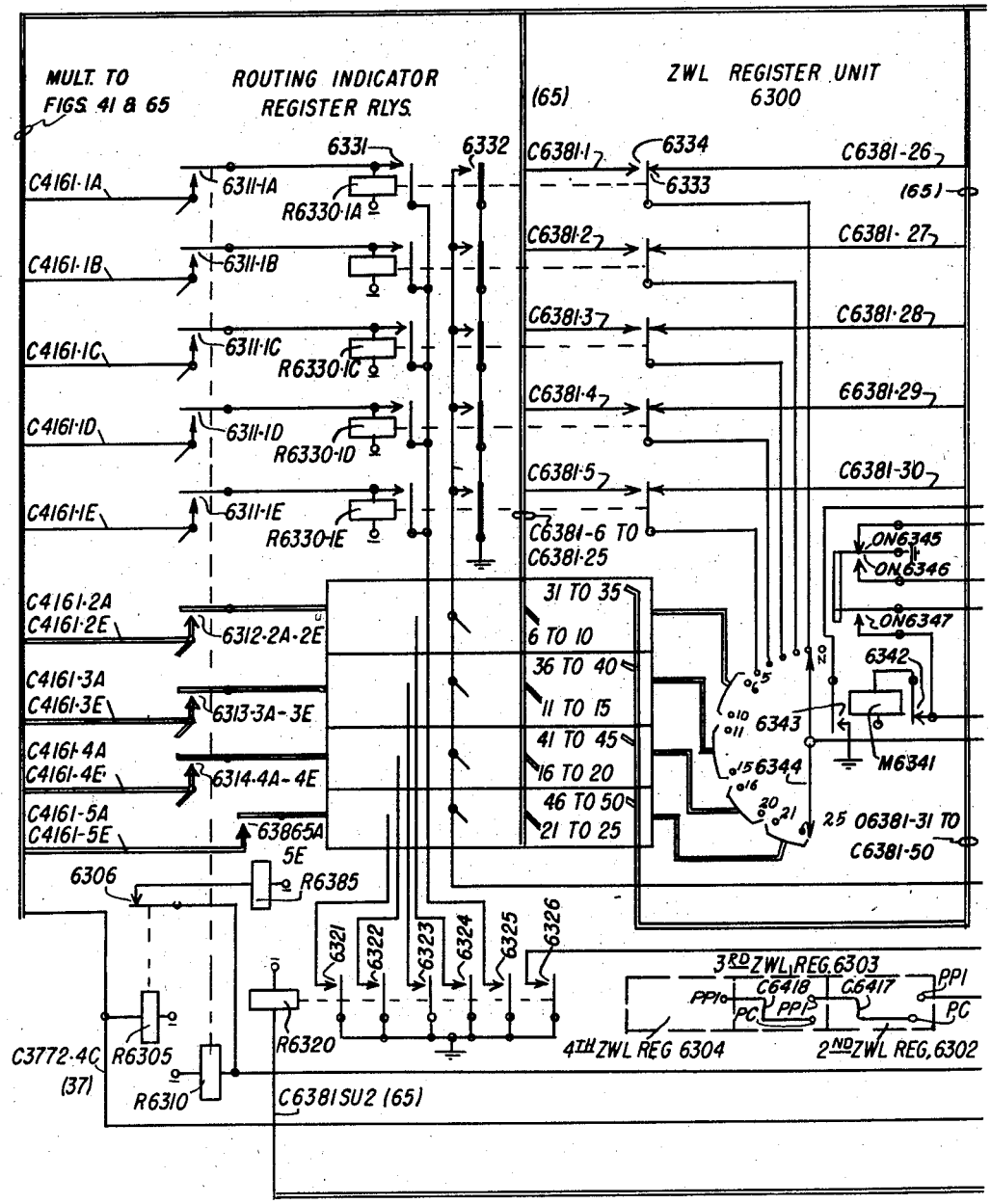
Figure 64:
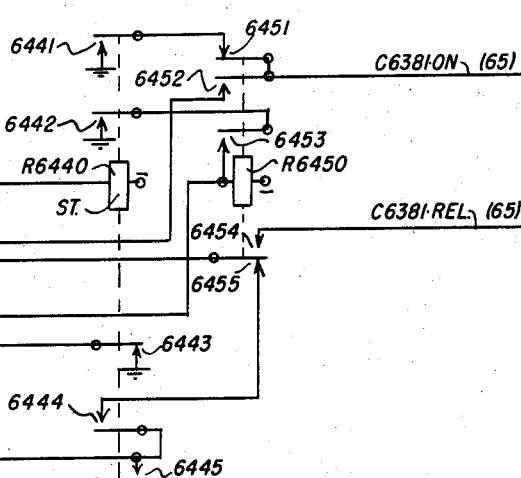
Figure 65:
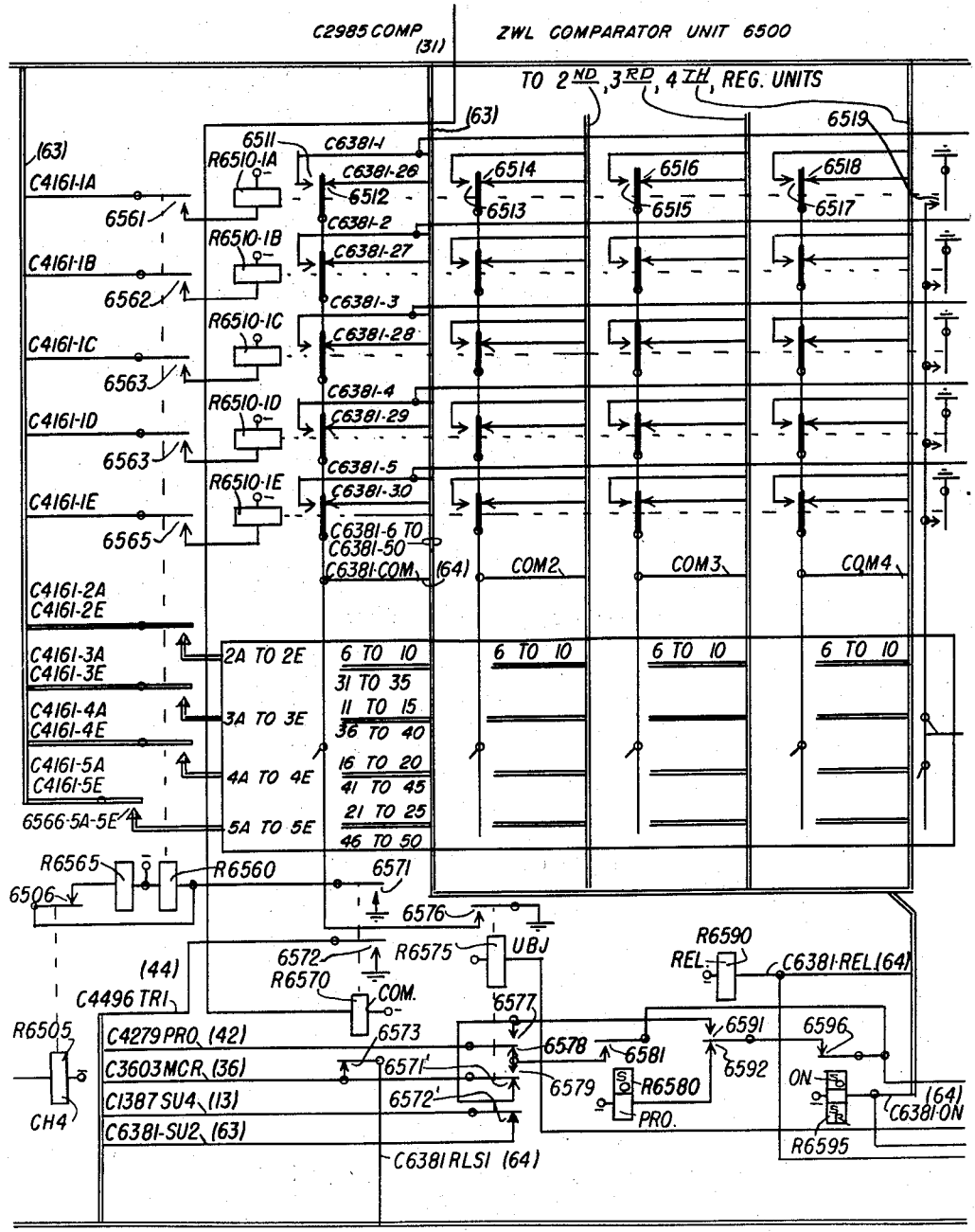
Figure 66:
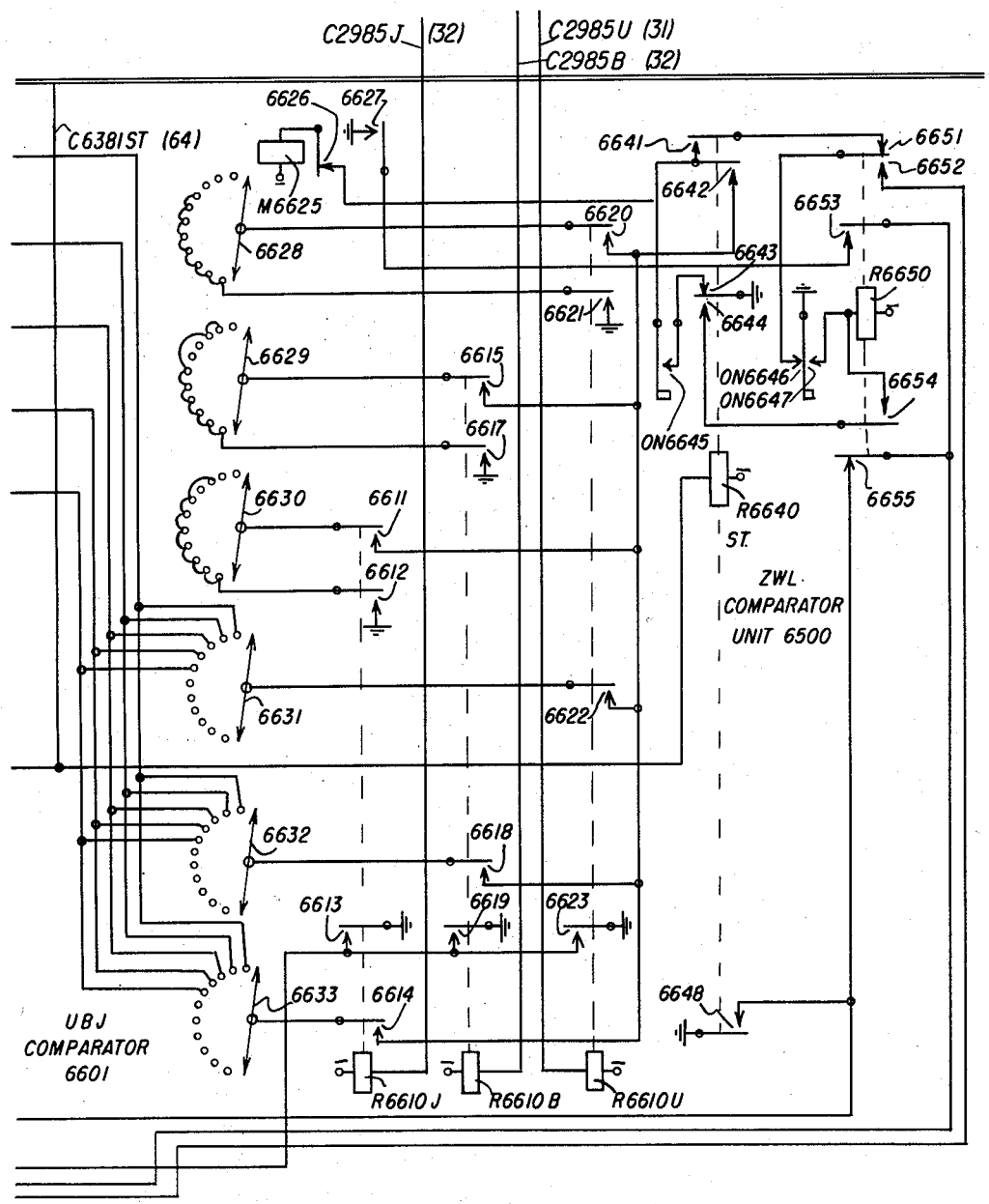
Figure 67:
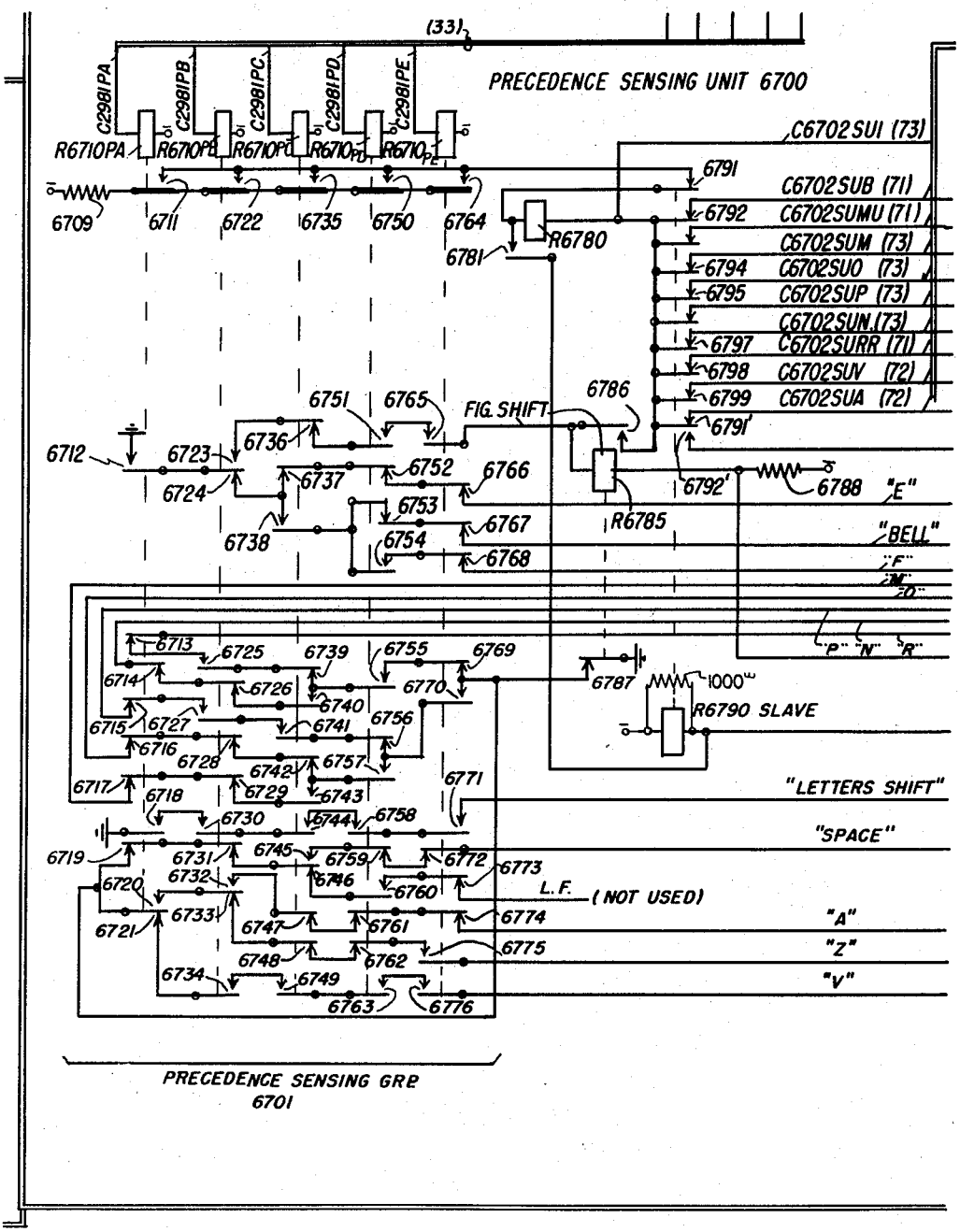
Figure 68:
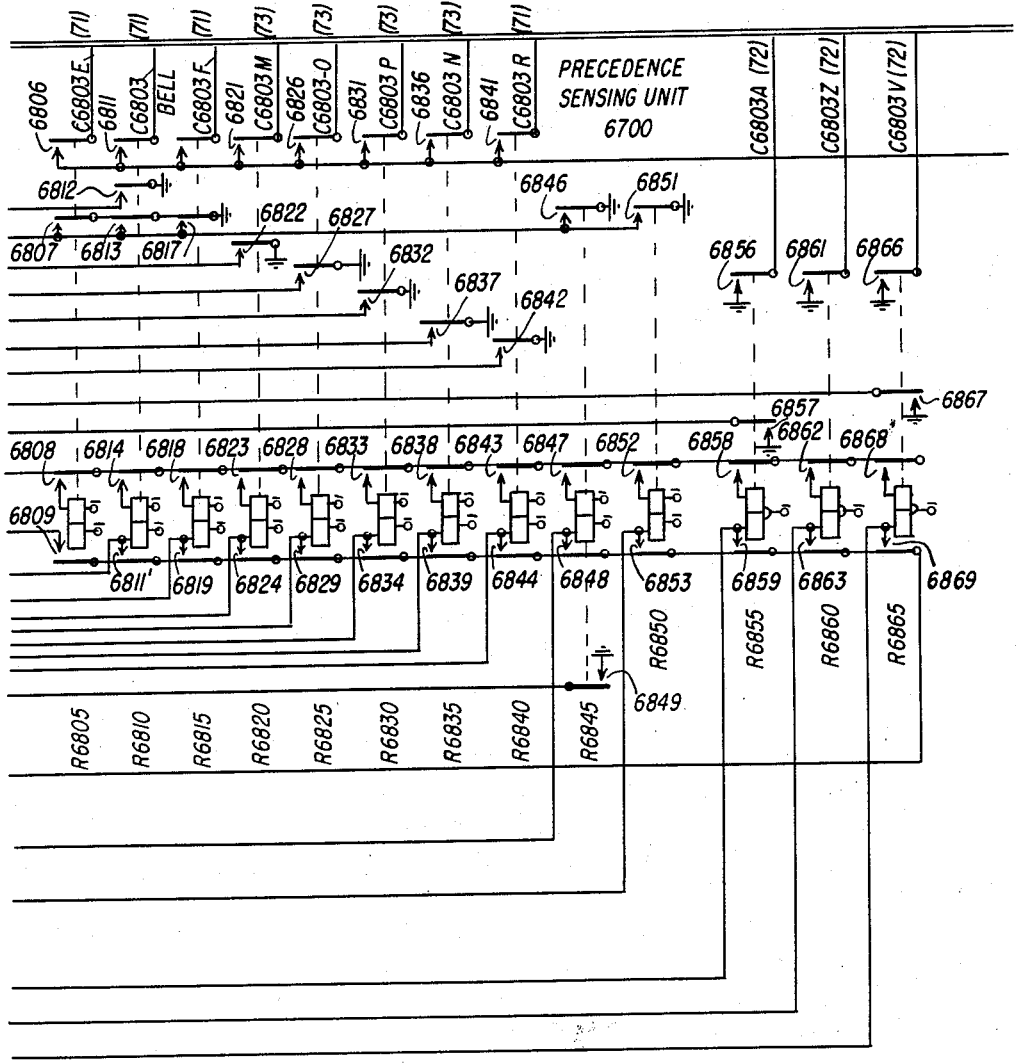
Figure 71:
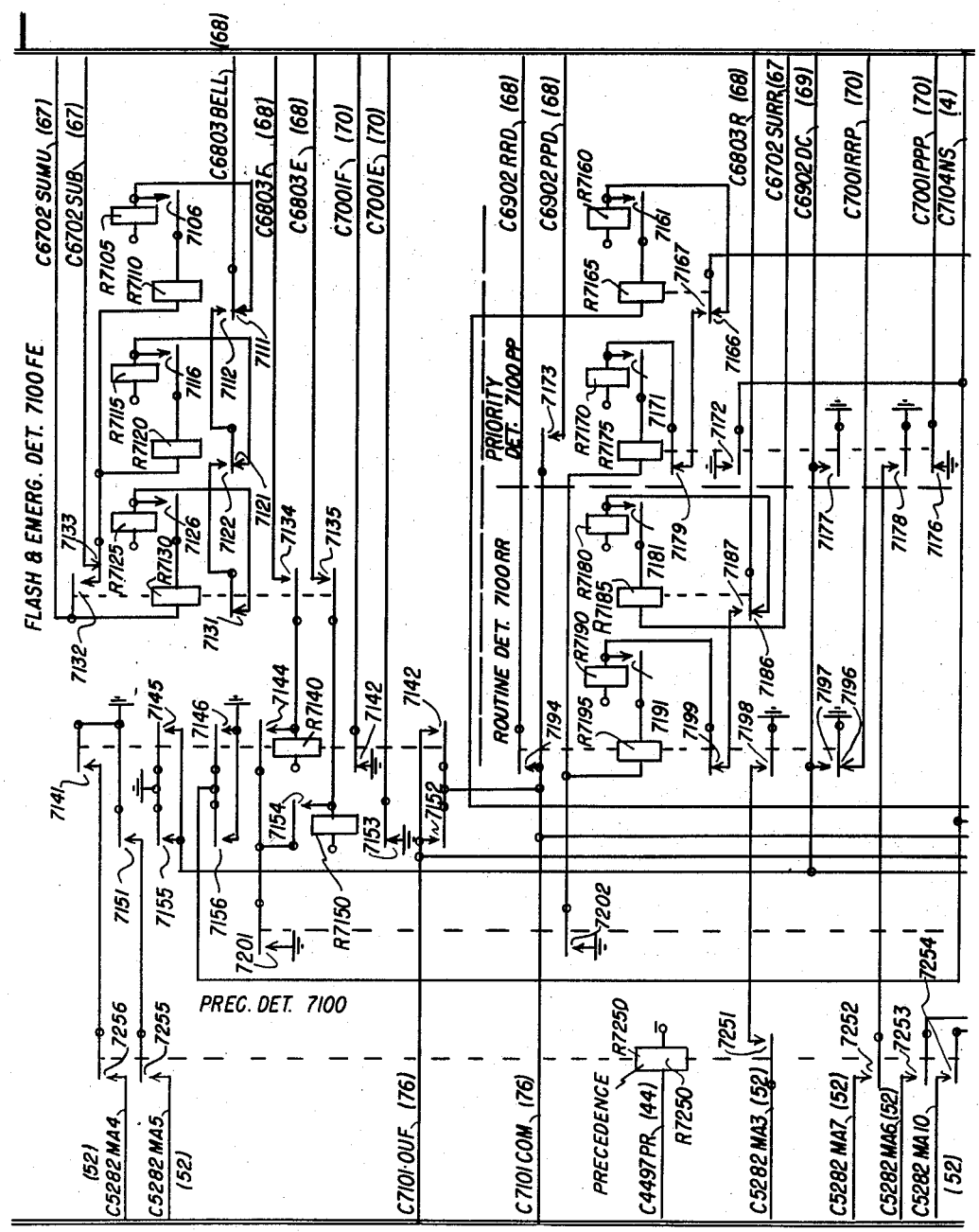
Figure 72:
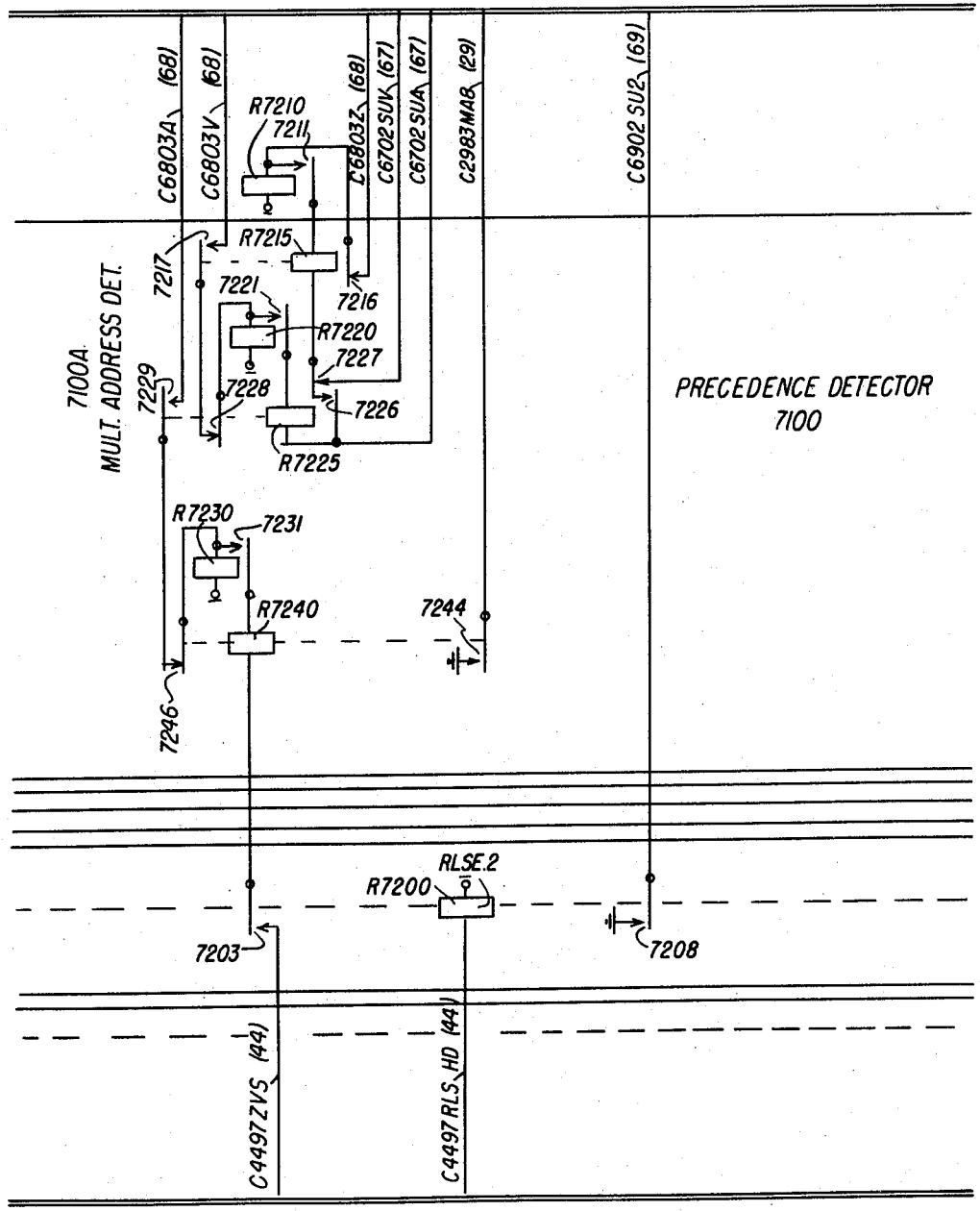
Figure 73:
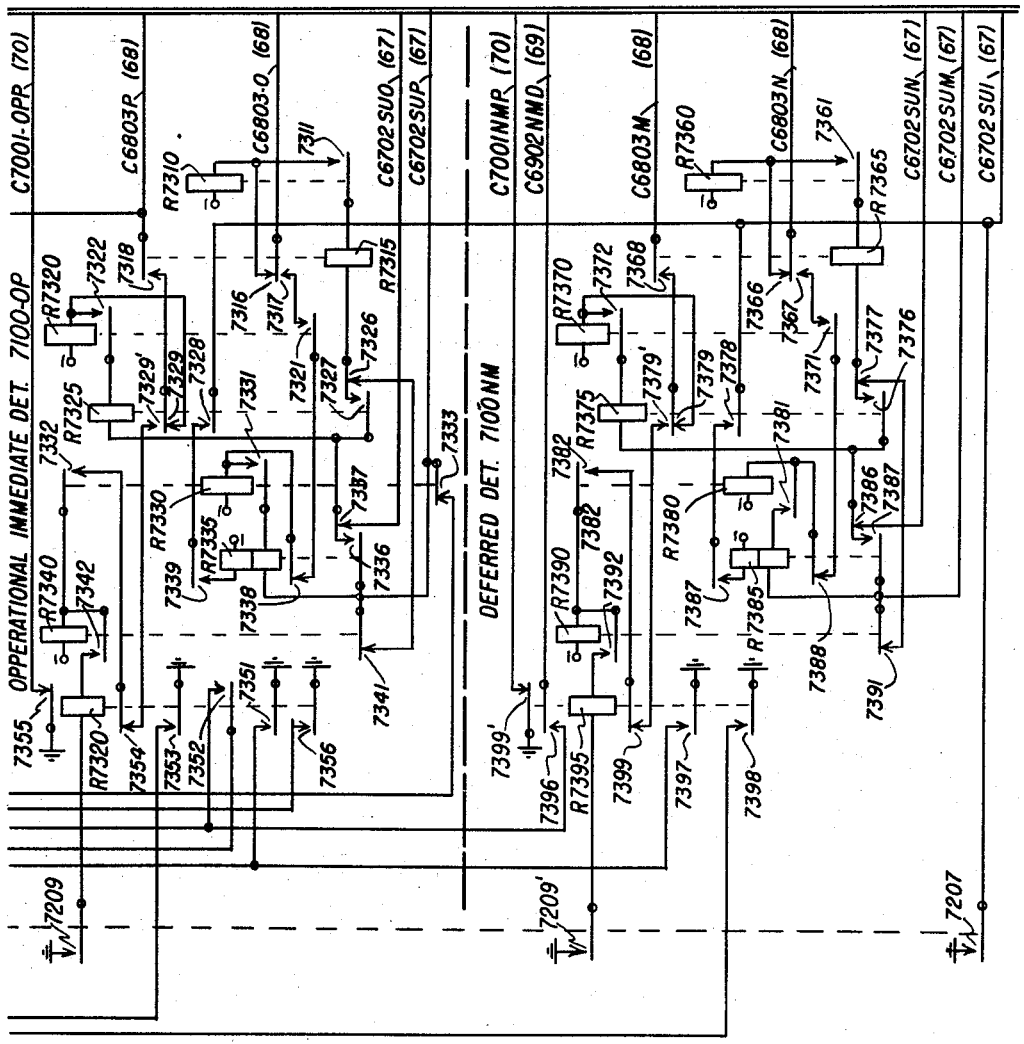
Figure 74:
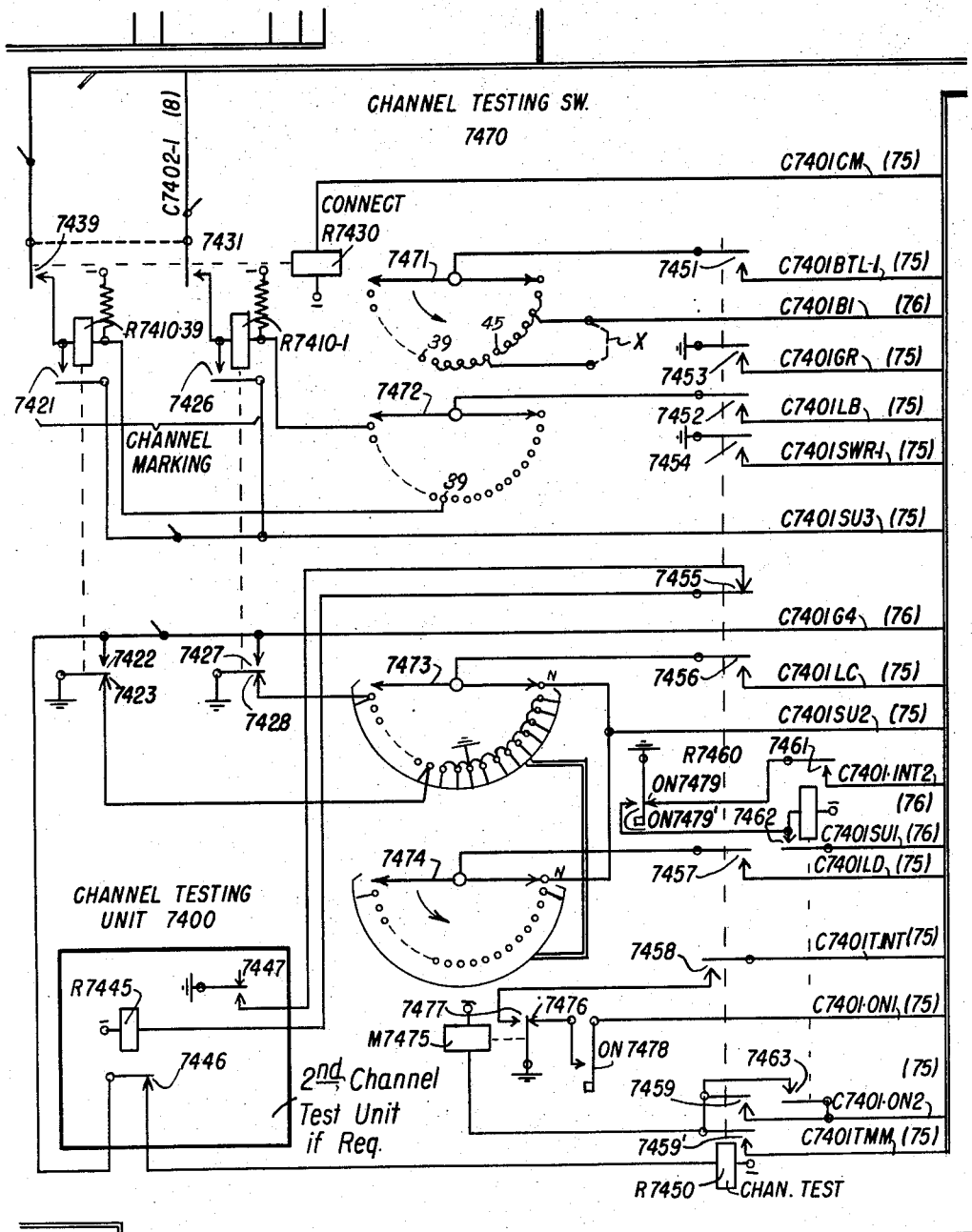
Figure 75:
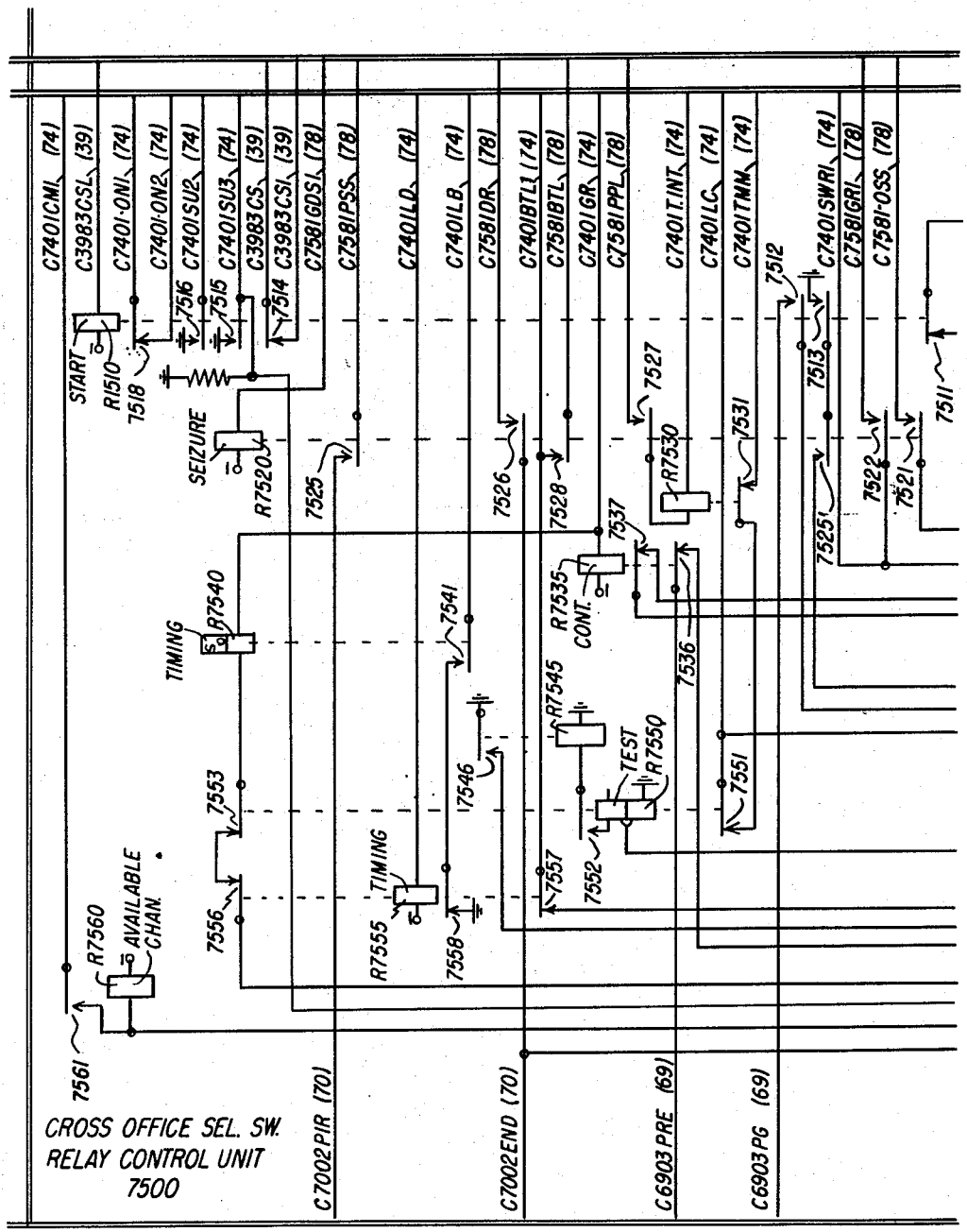
Figure 76:
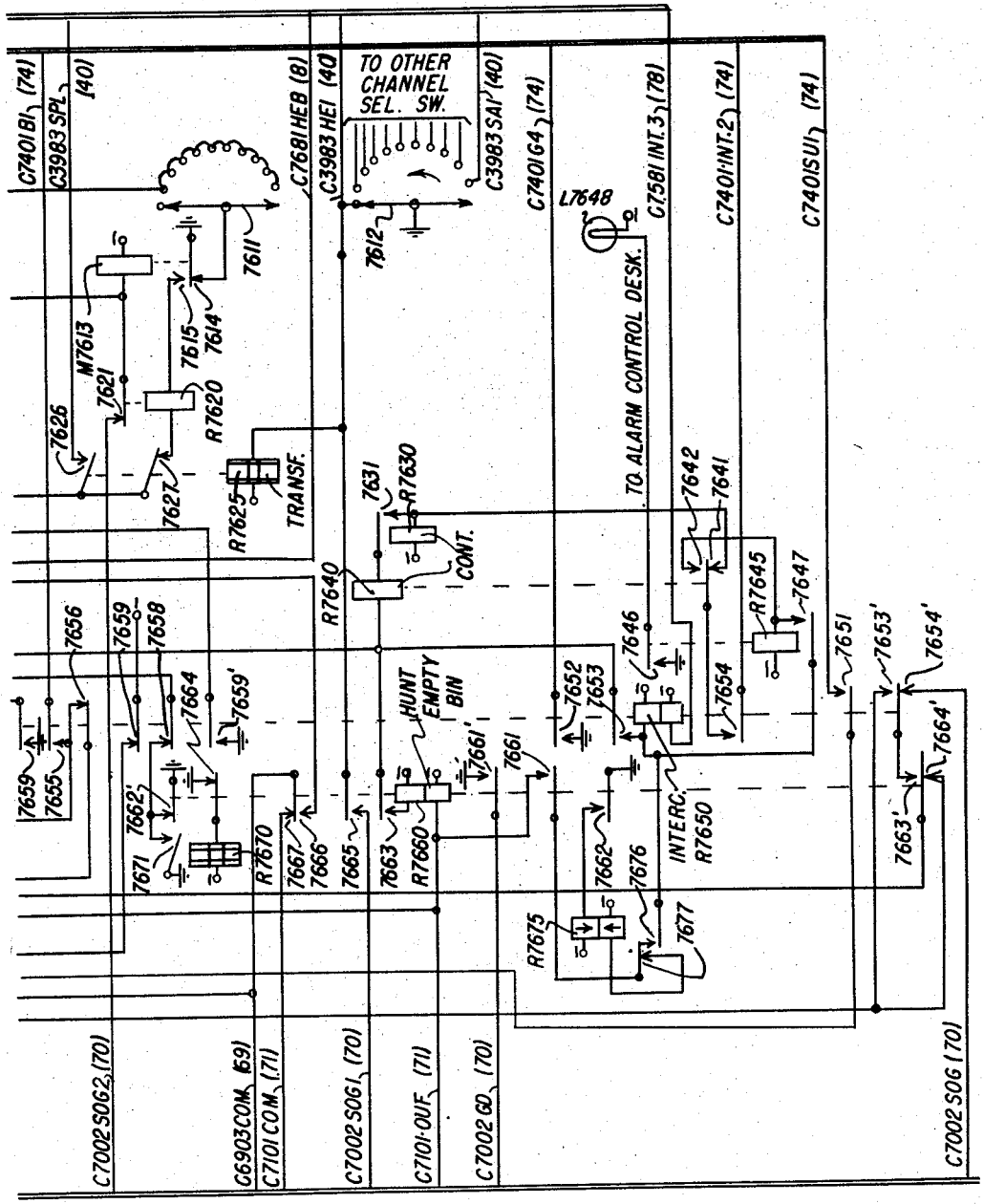
Figure 77:
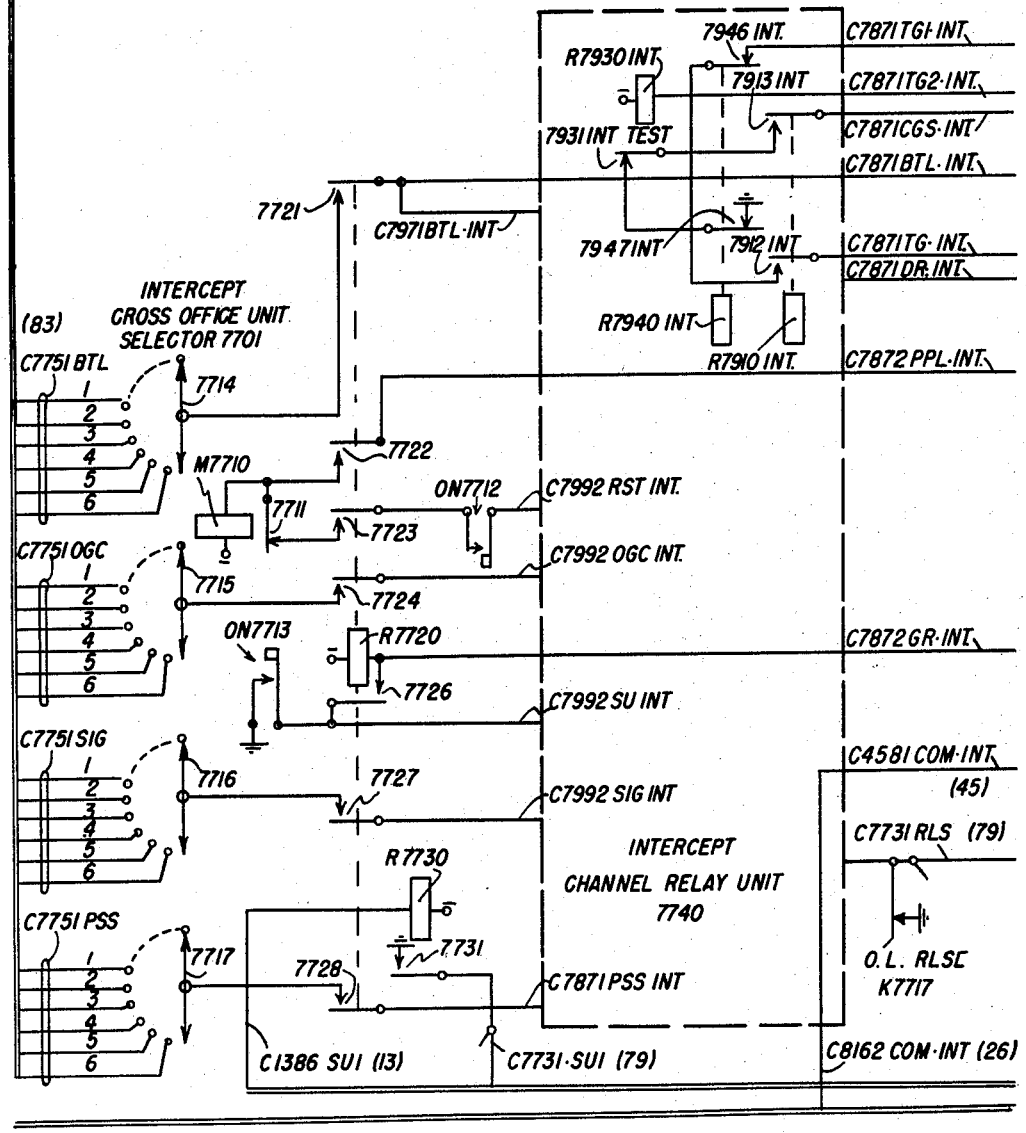
Figure 78:
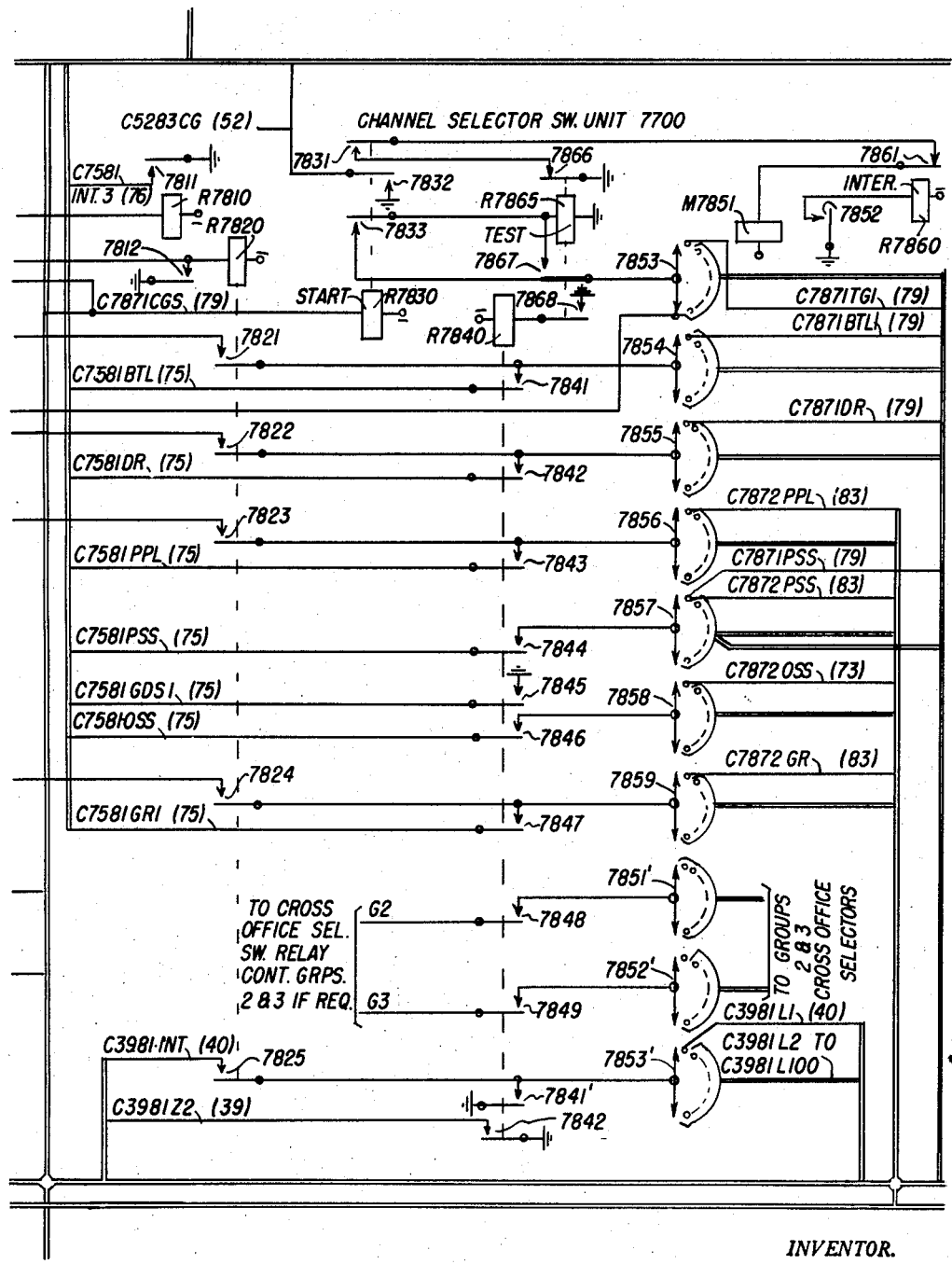
Figure 82:
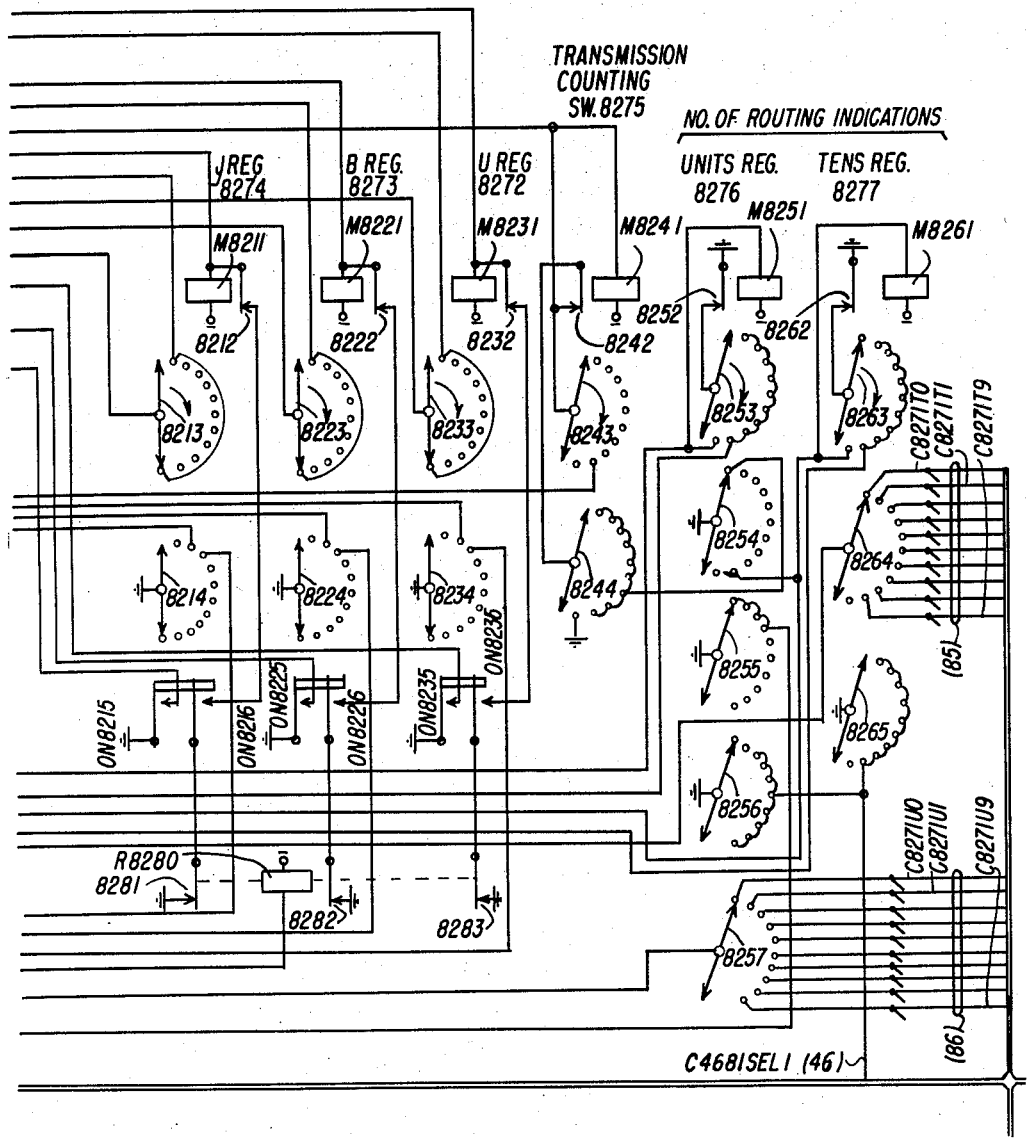
Figure 83:
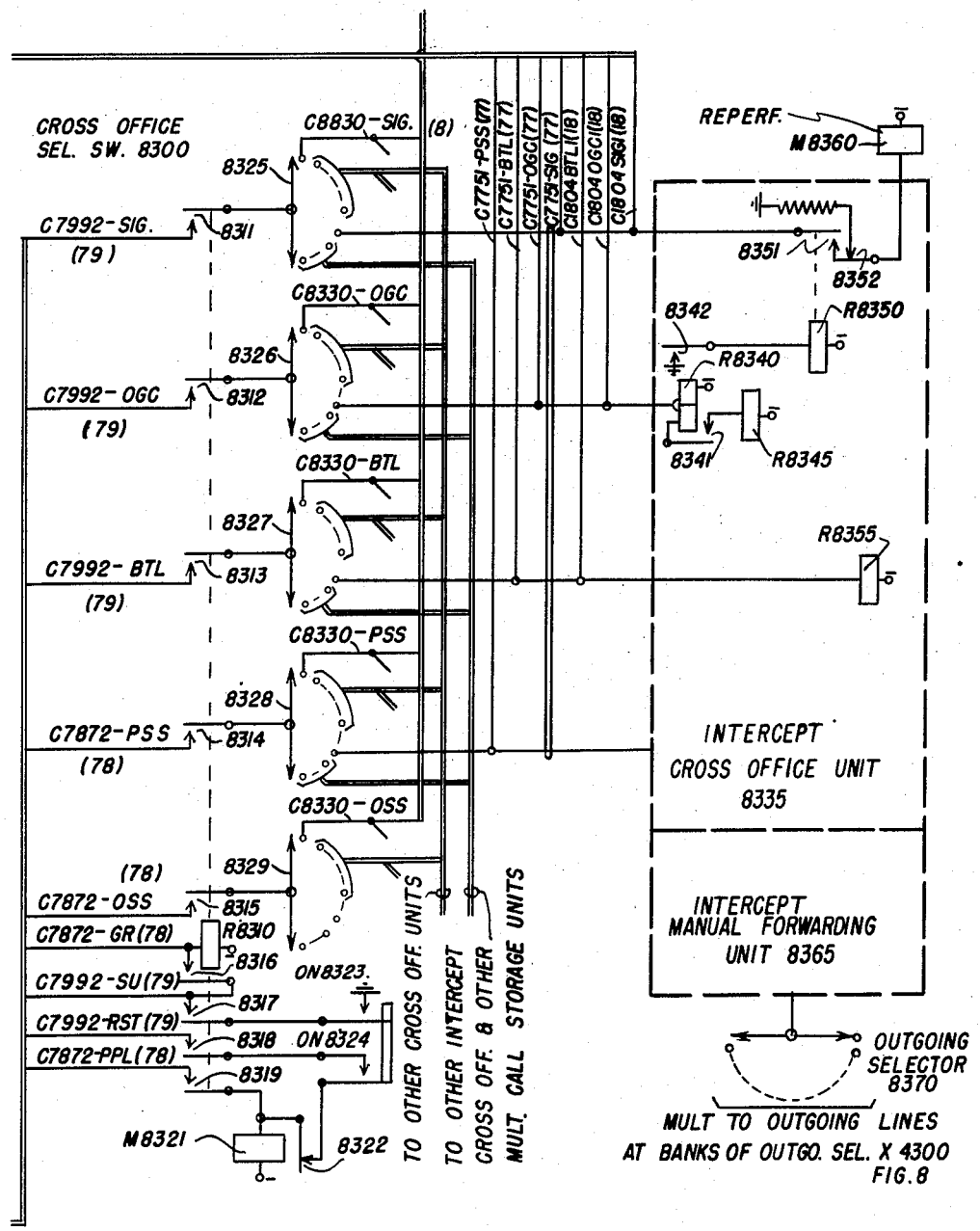
Figure 84:
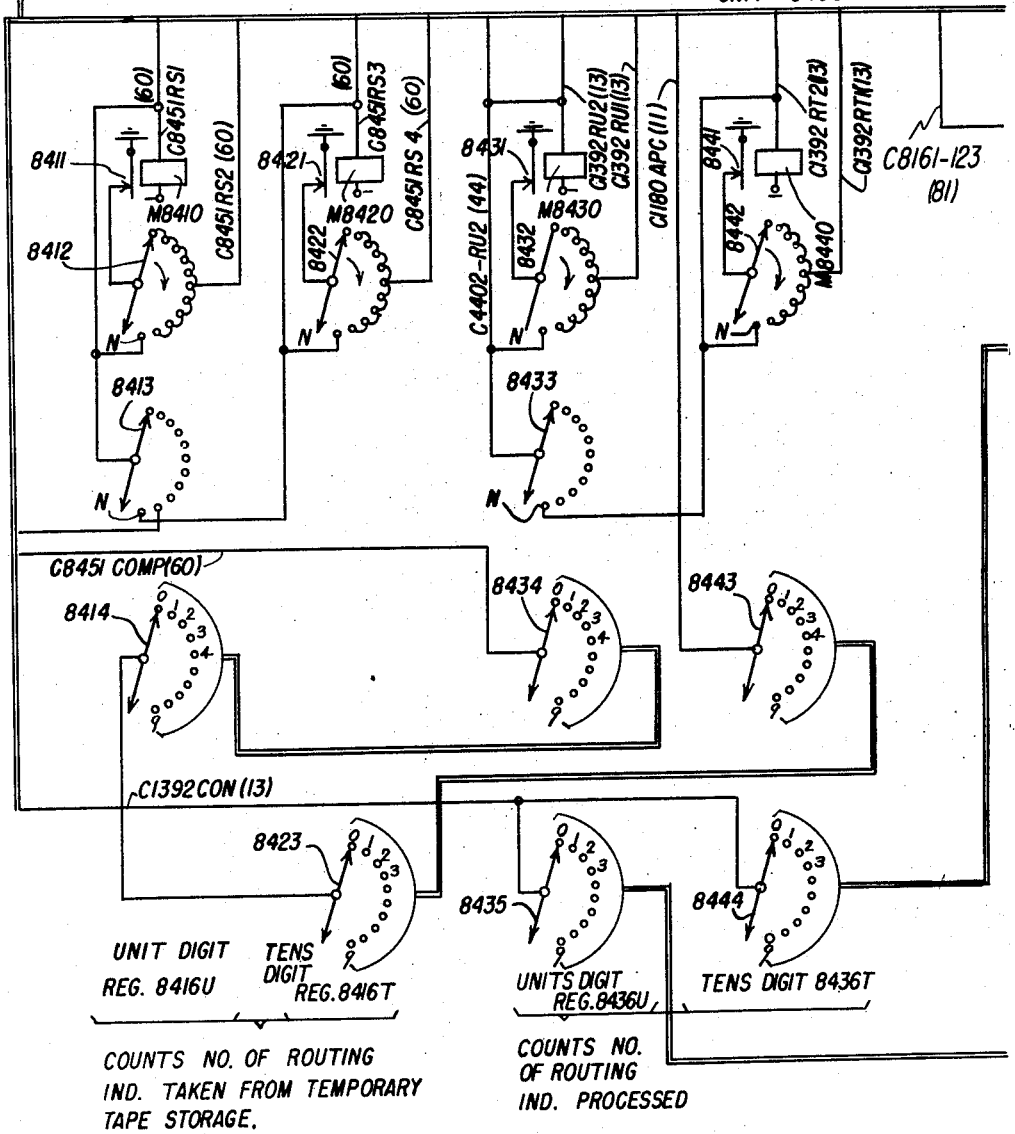
Figure 85:
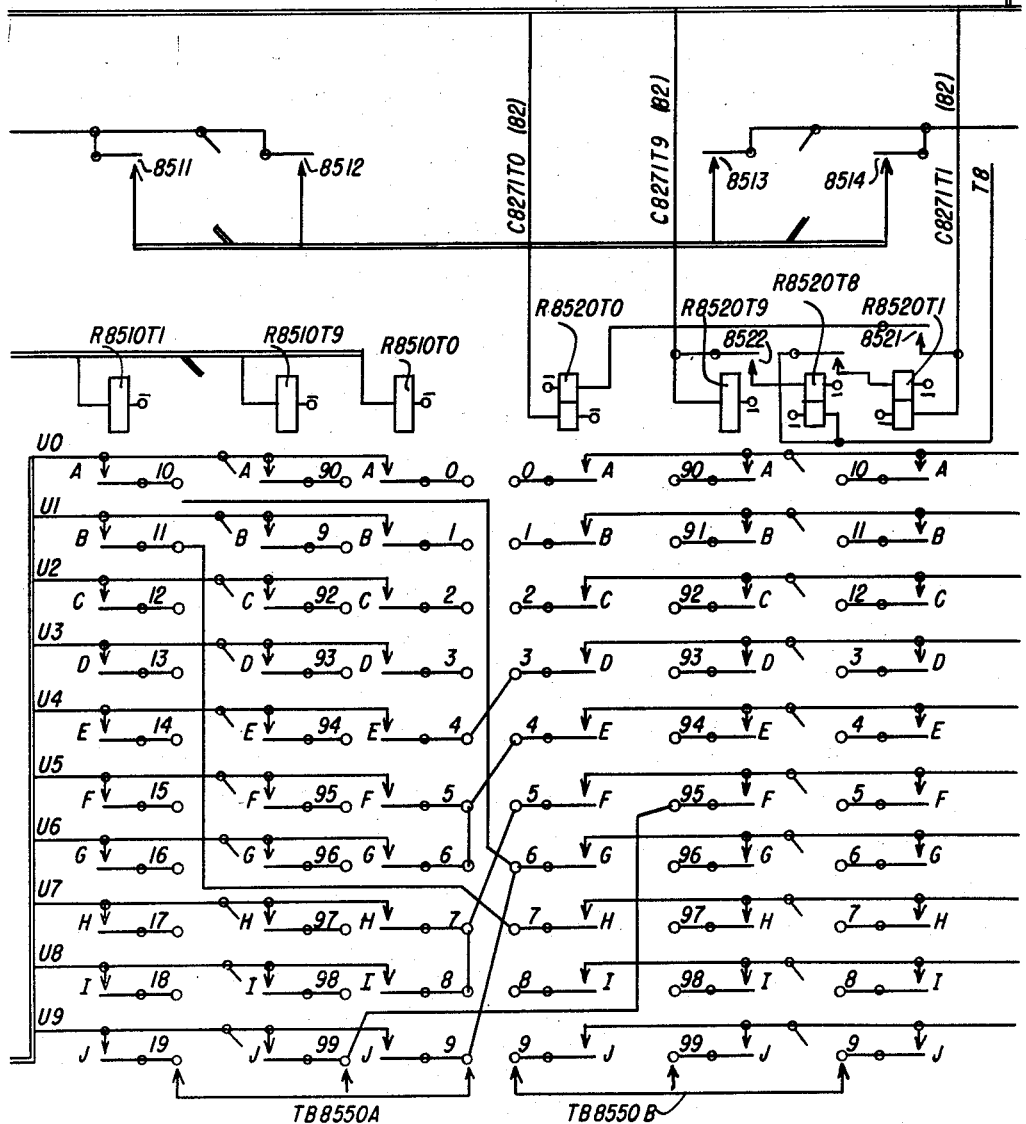
Figure 86:
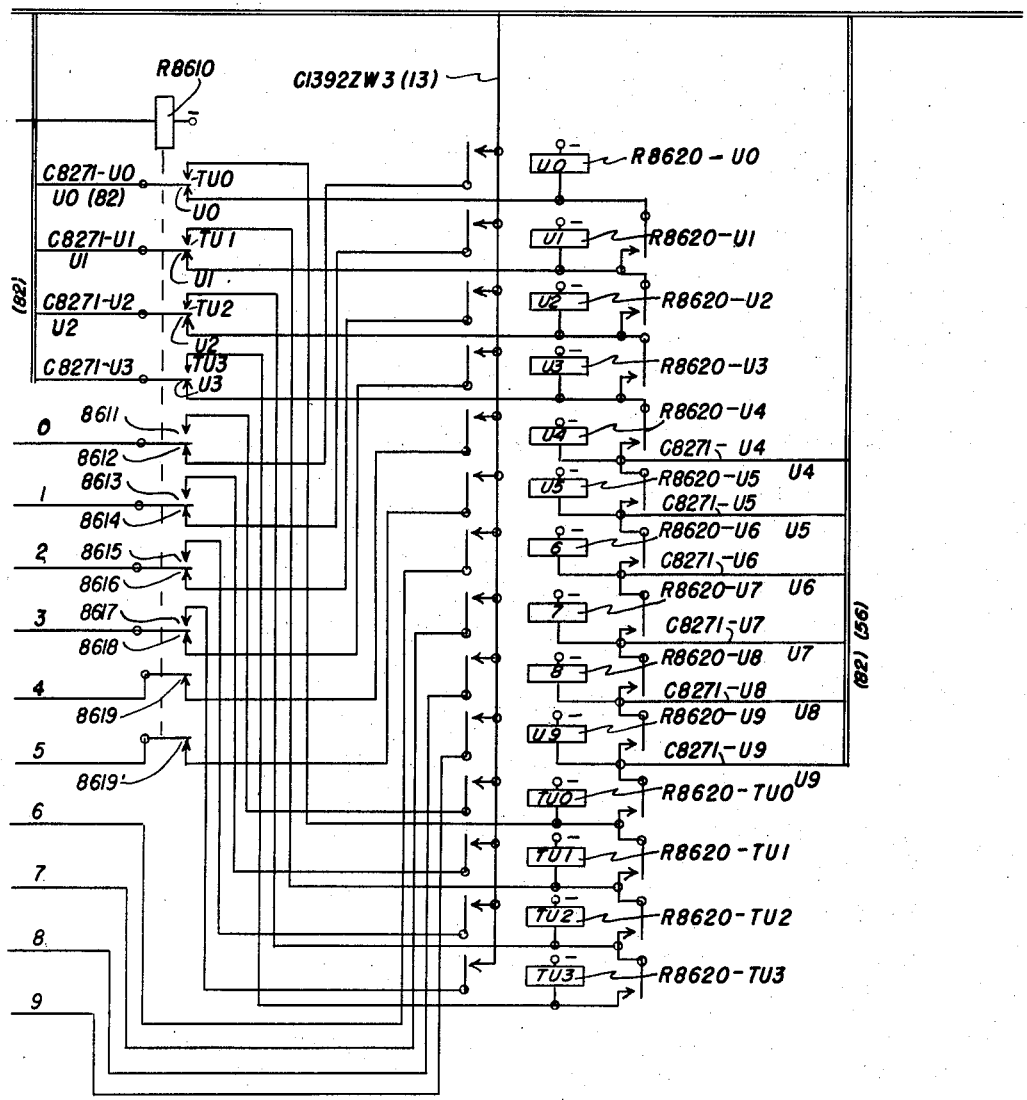

Fig. 9 illustrates the details of the precedence control unit 900; Figs. 10 to 13, inclusive, illustrate the details of the miscellaneous control unit 1000; Figs. 14 to 20, inclusive, illustrate the details of the multiple call storage unit 1400; Figs. 21 to 28, inclusive, illustrate the details of the multiple call translator 2100; Figs. 29 to 32, inclusive, illustrate the details of the prosign detector 2900; Figs. 33 to 36, inclusive, illustrate the details of the address detector 3300; Figs. 37 and 38 illustrate the details of the processing routing register 3700; Figs. 39 and 40 illustrate the details of the channel register 3900; Figs. 41 to 44, inclusive, illustrate the details of the sequence control unit 4100; Fig. 45 illustrates the details of the channel converter unit 4500; Figs. 46 and 47 illustrate the details of the channel selector switch control unit 4600; Figs. 48, 48A and 49 to 51, inclusive, illustrate the details of the transmitter control unit 4800; Figs. 52 to 54, inclusive, illustrate the details of the precedence transmission unit 5200; Fig. 55 illustrates the details of the outgoing line number tape storage unit 5501, the routing indicator tape storage unit 5502 and the markable transmitter distributor 5503; Figs. 56 and 57 illustrate the details of the storage routing register 5600; Figs. 58 to 62, inclusive, illustrate the details of the storage control unit 5800; Figs. 63 and 64 illustrate the details of the ZWL register unit 6300; Figs. 65 and 66 illustrate the details of the ZWL comparator unit 6500; Figs. 67 to 70, inclusive, illustrate the details of the precedence sensing unit 6700; Figs. 71 to 73, inclusive, illustrate the details of the precedence detector 7100; Fig. 74 illustrates the details of the channel testing unit 7400; Figs. 75 and 76 illustrate the details of the cross-office selector switch control unit 7600; Figs. 77 and 78 illustrate the details of the channel selector switch unit 7700; Figs. 79 to 82, inclusive, illustrate the details of the channel relay unit 7900; Fig. 83 illustrates the details of the cross-office selector switch 8300; Figs. 84 to 86, inclusive, illustrate the details of the prosign determination unit 8400; and Fig. 87 illustrates the details of the channel multiplying unit 8700.

Referring now more particularly to Fig. 1 of the drawings, it will be understood that the present automatic telegraph switching apparatus serves, for example, a nation-wide area comprising a plurality of sub-areas. Each sub-area includes at least one relay switching center identified by a three letter code designation and one or more tributary stations identified by four or five letter code designations. More specifically, the nine sub-areas illustrated in Fig. 1 are respectively provided with relay switching centers UEP, UAC, JWC, JWP, JWW, BKP, UKA, BKE, BLF, and JKX. However, it should also be understood that each of the sub-areas, noted above, may be provided with additional relay switching centers identified by three letter code designations. For the purpose of this description, it may be assumed that the United States is divided into nine or more areas; that the relay switching center UEP serves the East Coast sub-areas that the relay switching centers JKX and UKA serve the West Coast sub-areas; and that the relay switching centers therebetween serve the several of the intermediate sub-areas. It should be understood, however, that each of the foregoing areas may be further subdivided so that the United States may be divided into a great many more sub-areas than is illustrated in Fig. 1.

Again considering the trunking arrangement illustrated in Fig. 1 it will be noted that in the East Coast area the relay switching center UEP also serves at least the two tributary stations UEPC and UEPX. Also, the relay switching center UAC serves at least the tributary station UACZZ and it also interconnects with relay switching centers UEP and JWC which may in turn serve corresponding tributary stations. The relay switching center JWC serves the tributary station JWCX. This relay switching center may also be interconnected by way of the relay switching center JWW and BKP to UKA and by way of the relay switching centers BKE and BLF to JKX. Finally, the West Coast switching centers UWP, UKA and JKX respectively serve the tributory stations UKAY and JKXY and they may also be interconnected with the further relay switching centers (not shown)

which in turn may serve other tributary stations (not shown). Each of the relay switching centers are interconnected by means of the schematically illustrated trunk lines and it should be understood that other lines, not shown, may interconnect with other relay switching centers (not shown). It should also be understood, that each relay switching center identified by a three letter code is provided with switching apparatus of the type illustrated in the drawings. Furthermore, it should be understood that the East and West Coast relay switching centers UEP, UKA and JKX, as well as other relay switching centers located in the United States, may be connected by means of radio links or carrier switching apparatus with territories lying outside of the United States.

Each of the tributary stations included in the system is provided with the usual telegraph transmitting apparatus, whereby telegraph messages may be transmitted, in code form containing all of the information necessary to cause the automatic routing of telegraph messages through the illustrated automatic telegraph switching system to the desired destinations. It should also be understood that the telegraph messages originating at the different tributary stations may be addressed in a predetermined manner so that certain of the switching centers involved in handling the messages will be responsible for the retransmission of the message, on a multiple call basis, to a plurality of the destinations identified by the routing indicators appearing on the message. In other words, a relay switching center which has been designated to be responsible for the handling of a particular incoming multiple call telegraph message will automatically function to retransmit as many separate messages as are necessary to cause the single receive message to be sent over the different outgoing lines to reach the plurality of tributary stations named in the original received message.

Since each telegraph switching center of the present automatic telegraph switching system is identified by a three letter code and each of the tributary stations is identified by a four or five letter code, as illustrated in Fig. 1, the automatic switching apparatus provided in the different relay switching centers will analyze the individual routing indicators or code designations identifying the called tributary stations and then cause the messages to be retransmitted over the most direct route to reach the desired destinations. It is contemplated in the present system that the first letter of any code designations of a switching center or tributary station may be any one of the three letters B, J or U which, respectively, indicate different networks and may, for example, represent different military services, such as Navy, Air Corp and Army. The first letter, however, of the code or routing indicator may be any one of the 26 letters of the alphabet.

In the present system, the second letter of any three, four or five letter code designation or routing indicator will be the letters A, E, F, H, K, L, M or W, but it should be understood that all 26 letters of the alphabet may be used as the second letter, if necessary. The third, fourth and fifth letters of the three, four and five letter code designations or routing indicators may be any of the letters of the alphabet. Thus, it will be understood that three, four and five characters or letters identifying a desired relay switching center of tributary station will automatically route a single message by way of certain tandem relay switching centers, or directly, to the particular called destination identified by the code or routing indicator in accordance with a predetermined routing plan. It will further be understood that certain of the messages received at any one switching center may be of the multiple call type. In other words, a single received message may contain a plurality of different codes or routing indicators identifying different called destinations. When this occurs, the single message will be analyzed and then retransmitted over a plurality of different outgoing lines so that each of the call destinations named in the single multiple call message will individually receive the message.

The apparatus incorporated in the relay switching center UAC

As previously noted, each relay switching center in the telegraph system includes automatic switching apparatus substantially identical to the switching apparatus provided in the relay switching center UAC. In the previously mentioned Stiles application, the apparatus illustrated is arranged to handle telepragh messages having a single address or routing indicator. Consequently, the apparatus in that system will respond to a telegraph message having an address or routing indicator of a particular called tributary station and it will automatically function to retransmit the message over an outgoing line which extends in the direction of the called destination. In the above noted Stiles patent, a message having a plurality of called destinations or routing indicators named therein, that is a multiple call message is automatically routed to a mutiple call position where the message is manually handled and retransmitted by the operator thereat to each of the called destinations named on the message. Also, the apparatus provided in the above mentioned Stiles patent is arranged to automatically route messages that cannot be retransmitted to the desired called destination, to an intercept operator position. The intercept operator will then attempt to retransmit the intercepted message to the called destination at some later time.

In the present system the same apparatus provided in the previously mentioned Stiles patent is also utilized to store received messages and to analyze them for retransmission. If the message is provided with a single address or routing indicator, then it will be analyzed and retransmitted to its called destination in the manner explained in the Stiles application. However, if the multiple call message is received containing a plurality of called destinations or routing indicators, then the apparatus, schematically illustrated herein, and disclosed in detail in the previously mentioned Stiles patent, causes the selection of the multiple call switching apparatus illustrated in Figs. 9 to 87, inclusive. The last-mentioned apparatus is shown in detail in the drawings noted and will be subsequently described.

Referring now more particularly to Fig. 2A of the drawings, the telegraph switching apparatus there illustrated is substantially the same as that illustrated in Fig. 2 in the above noted Stiles application and is provided at the relay switching center UAC. This switching apparatus includes a number of incoming line circuits X400 individually associated with incoming lines, such as the incoming line from the relay switching center UEP. Furthermore, each incoming line circuit is individually associated with a cross office selector X3300 which has access to all of the cross office units X3400 and which also has access to all of the multiple call storage units of Fig. 2B and to all of the intercept positions X3330. For example, the incoming line circuit X400 is individually associated with the cross office selector X3300. This selector in turn has access to all of the cross office units X3400, the multiple call storage units 1400 and the intercept operator position X3330.

Furthermore, the switching apparatus includes a group of directors which are individually allotted for use by an incoming line circuit by means of a director assigner. When the allotter assigns a director for use, the director is automatically associated with the incoming line circuit and the associated cross office selector. For example, the director assigner X800 is controlled by a calling incoming line circuit X400 to select an idle one of the directors X200A or X200B and if the director X200A is selected, it controls its individual line selector X810 to find and connect with the calling incoming line circuit X400 and the associated cross office selector X3300.

Furthermore, the switching apparatus comprises a plurality of cross office units which are accessible to all of the cross office selectors and which are individually provided with an outgoing selector having access to each of a plurality of outgoing lines extending from the relay switching center UAC. Also, the cross office selector X3300 has access to a plurality of multiple call storage units, such as the unit 1400, so that multiple calls received by an incoming line circuit will be transmitted to and stored on perforated type in the selected multiple call storage unit. Thus, the cross office selector X3300 has access to all of the cross office units X3400 and the latter mechanism through its individual outgoing selector X4300 transmits messages over any one of a plurality of outgoing lines, such as the outgoing line L1. In the case of a multiple call message, however, the cross office selector X3300 will select one of a plurality of multiple call storage units, such as 1400 and the multiple call message will be retransmitted by the incoming line retransmitter X360 to the reperforator 1410 in the selected multiple call storage unit. Thereafter, the incoming line circuit X400, the cross office selector X3300 and the director X200A will be released and rendered available for additional telegraph messages received from the relay switching center UEP.

Each outgoing line extending from the relay switching center UAC includes a timer, a number transmitter, a send relay and a monitor unit. For example, the outgoing line L1 includes the timer XT4495, the number transmitter X4430, a send relay XR4440 and a monitor unit X4450. Finally, the cross office units, such as the cross office unit X3400, have access to a cancel transmission transmitter X3450 which is common to all of the cross office units in the switching center. This transmitter is provided for the purpose of breaking and canceling the transmission of certain low class precedence messages being transmitted over an outgoing line whenever it is necessary to immediately transmit over the same particular outgoing line certain high class precedence messages.

In the event a multiple call message received on one of the incoming line circuits is routed by one of the directors through a cross office selector to a multiple call storage unit, the message will be stored on a tape by a reperforator mechanism, such as the reperforator 1410, so that the message may be analyzed by the multiple call equipment of Fig. 2B. The multiple call equipment illustrated in Fig. 2B has access through different cross office selectors, including the cross office selector 8300 to the above mentioned cross office units, including the cross office unit X3400. Thus, a plurality of cross office selectors, such as 8300, may select a corresponding plurality of cross office units, such as X3400, so that the multiple call equipment may then transmit to each of the different cross office units X3400 the message that has been stored on the tape produced by the reperforator 1410 in the multiple call storage unit 1400. In the course of the selection of the different cross office units by the multiple call equipment, the associated outgoing selectors, such as the outgoing selector X4300, are operated to select different outgoing lines, whereby the multiple call message stored in the perforated tape at each of the associated cross office units will be retransmitted over the associated outgoing lines to the plurality of desired called destinations.

*Single message telegraph received at the relay switching center UAC*

The switching apparatus incorporated in the relay switching center AUC will be best understood by a consideration of the detailed operation of the various units of apparatus incident to the reception of a telegraph message by the typing reperforator X330. Since the apparatus illustrated in Figs. 3 to 6, inclusive, 7A, 7B and 8 has been schematically illustrated in the drawings, due to the fact that this apparatus is substantially the same as the corresponding apparatus illustrated and described in the previously noted Stiles patent, it will only be necessary to give a brief description of the operation thereof in connection with the processing of a single address telegraph message from the relay switching center UEP.

Referring now to Figs. 7A and 7B, it will be seen that the typing reperforator X3330, schematically illustrated, is arranged to perforate the tape X333 in accordance with the five-channel code illustrated in Fig. 89. This typing reperforator may be of the type disclosed in the United States Patent No. 2,255,794, granted September 16, 1941, to R. A. Lake and it is arranged to produce chadless perforations on the tape so that symbols or characters corresponding to the perforated codes may be simultaneously typed (printed) on the associated tape approximately six spaces or steps behind each of the lateral code perforations therein. Each typing reperforator X330 is provided with a tape storage reel supporting a supply of unperforated tape X333. The tape reader X340 is of the type that is arranged to sense or read the code perforations on the tape X333 and to transmit code signals in accordance with the code perforations to the start and end of message detector and to the director X200A. This tape reader may, for example, be of the type disclosed in the United States Patent No. 2,296,845, granted September 29, 1942, to N. T. Goetz. During the perforation of the tape X333 by the typing reperforator X330 small feed holes are produced therein so that the tape may be moved in predetermined steps as it is perforated and as it is sensed by the tape reader X340 and as it is utilized in controlling the retransmitter X360. In its operation, the tape reader X340 steps the tape X333 one step at a time a longitudinal distance equal to the small feed hole spacings therein and cam control contacts are closed in predetermined code combinations as the tape reader senses the different character code perforations appearing on the lateral spaced apart rows on the tape. In the case of "blank" tape, the five code contacts in the reader remain open during a sensing cycle but one pair of contacts remain closed during each cycle so that each cyclic step of the reader, in advancing the tape, may be counted and registered. Thus, one pair of contacts are closed at the beginning of each sensing cycle of one character and are opened at the end of each sensing cycle, whereas, the remaining contacts which sense the code perforations in the tape are arranged so that they are closed and reopened, in accordance with the code perforations, within the time interval that the cyclic counting pair of contacts remain closed.

The incoming line retransmitter X360 includes apparatus which is substantially the same as the tape reader X340 and it may also be of the type disclosed in the above noted Goetz patent. The retransmitter X360 is arranged so that it will retransmit code signals corresponding to the code perforations on the tape X333 over the signaling conductor XC689 instead of over six sensing conductors as is required by the tape reader X340. Thus, the contacts X366 are normally closed and the remaining five contacts to the left thereof are normally open. At the beginning of a transmitting cycle the contacts X366 are first to open and thereafter the remaining normally opened contacts are controlled in sequence in accordance with the perforated code on the tape X333 so that only one of the five normally open contacts are closed and reopened at a time in a predetermined sequence of each cycle. At the end of the particular transmitting cycle, the contacts X366 are reclosed. This arrangement is well known and is utilized in conventional start-stop telegraph transmitting systems.

The start and end of message detector schematically illustrated in Fig. 7B and included in the incoming line circuit X400, is controlled in accordance with the perforations appearing on the tape X333 by the tape reader X340 in order to detect and to register a start of message indicator and an end of message indicator included in each received message. Also, the start and end of message detector cooperates with the channel number comparator X900 to detect and compare a channel number indicator or message number, which is also perforated on the tape X333, with a channel number which is preregistered in the channel number comparator X900. If a proper start of message indicator is detected and registered and a successful comparison is made between a received channel number indicator and the channel number preregistered in the channel number comparator X900, the incoming line circuit X400 will control the director assigner X800 to select one of a plurality of directors, including the director 200A.

Each of the directors provided in the switching center UAC is identical to the director X200A schematically illustrated in Fig. 7A of the drawings. This director actually includes an address detector (not shown) which is provided to detect and register the address or routing indicator of a message in a routing register (not shown) in the manner shown and described in the previously noted Stiles application. The director also includes a precedence sensing circuit (not shown) which is arranged to detect and register any one of six different class precedence indicators and a multiple call message indicator in the schematically illustrated precedence detector X2300. Also, the director includes a schematically illustrated channel register X1700 which is arranged to register the identity of a particular outgoing line over which a message is to be routed. The identity of the particular outgoing line is determined by the routing translator X2900 illustrated in Figs. 3 to 5, inclusive, and the patch panel X3200 illustrated in Fig. 6 in accordance with the routing indicator or address corresponding to the destination of the message. Also, the director includes a cross-office selector switch relay control group X2600 and a channel testing circuit X2800 which are provided to position the cross-office selector X3300 into engagement with a cross-office unit, such as the cross-office unit X3400, or into engagement with a multiple call storage unit, such as the multiple call storage unit 1400. The selection of a cross office unit is made if the received message is a so-called single address message to route the call over the associated line to the next switching center. However, if the call is a so-called multiple call message wherein the message must be routed to a plurality of different destinations, then the cross office selector X3300 is controlled to select an available multiple call storage unit, such as the unit 1400.

The routing translator X2900 and the patch panel X3200 is common to all of the directors, including the director X200A, which are utilized in the relay switching center to handle all calls received at the switching center over incoming lines from other relay switching centers or tributary stations. The routing translator X2900 translates either a three-character, four-character or five-character address or routing indicator into a particular outgoing line number or designation corresponding to the outgoing line over which a single address message must be transmitted and registers this designation in the channel register X1700 of the detector. However, if the received three-character address or routing indicator identifying a relay switching center is followed by a multiple call code ZVA, the routing translator X2900 is controlled to register in the director X200A the fact that the message must be first routed to the multiple call storage unit 1400 for special processing. The latter apparatus will analyze the entire message and cause the single received multiple call message to be reproduced as many times as is necessary to cause the message to be transmitted over as many outgoing lines as are required to route the call to each of the plurality of address or routing indicators appearing on the single received message.

Each incoming line circuit, such as the incoming line circuit X400 is provided with a cross-off selector, such as the cross office selector X3300 which has access to all of the cross office units, all of the multiple call storage units and to the intercepting operator's position equipment X3330. It will be seen in the description hereinafter that the cross office selectors included in the multiple call equipment also have access to each of the cross office units, including the cross office unit X3400, and to the intercept operator position X3330. In other words, when the multiple call equipment is handling a multiple call it will control the cross office selectors therein to select as many of the cross office units as are necessary for the purpose of routing the multiple call to all of the different destinations.

Each of the cross office units in the relay switching center is identical to the cross office unit X3400 schematically illustrated in Fig. 8. The cross office unit X3400 includes a cross office reperforator X3410, a tape reader X3420, an outgoing tape transmitter X3430, a combination start and end of message detector (not shown), a precedence marking switch X4210 and an outgoing selector switch X4300 having access to the different outgoing lines. Each outgoing line selectable by the selector X4300 includes a timer XT4495, a number transmitter X4430 and a monitor unit X4450. A cancel transmission unit (not shown) is common to all of the cross office units for the purpose of canceling an incompletely transmitted low precedence message whenever it is necessary to obtain control over an outgoing line to transmit thereover a high precedence message.

The cross office reperforator X3410 is arranged so that it will perforate the tape X3430 in accordance with the previously noted five-channel code under control of signals transmitted from the retransmitter X360 associated with the incoming line circuit X400 or in accordance with signals transmitted by a similar retransmitter provided in the multiple call equipment. This typing reperforator is substantially the same as the typing reperforator X330 included in the line circuit X400 and may also be of the type disclosed in the U.S. Patent No. 2,255,794, granted to R. A. Lake on September 15, 1941. Each cross office reperforator X3410 is provided with a tape storage reel supporting a supply of unperforated tape X3413 and is also provided with certain testing mechanism for determining the amount of tape remaining on the associated reel.

The tape reader X3420 as well as the tape transmitter X3430 are identical to the tape reader X340 and the retransmitter X360 associated with the incoming line circuit X400 and they also may be of the type disclosed in the previously noted Goetz Patent No. 2,296,845.

The tape reader X3420 is arranged so that it will detect and register a start of message indicator, an end of message indicator and also will determine the number of operations of the tape reader after a detection has been made of an end of message indicator and also after the detection of a start of message indicator. The details regarding the foregoing operations may be found in the previously noted Stiles patent.

The precedence marking switch X4210 included in the cross office unit X3400 is provided to register any one of six different class precedence indicators and it is also arranged to control other cross office units engaging the same outgoing line to register in the other cross office units the particular precedence of a message which has been registered in the cross offce unit X3400. The cross office unit, however, is arranged so that it may store on the perforated tape X3400 a plurality of low precedence messages of the same class which are to be transmitted over the same outgoing line. Also, it may, under certain conditions, be selected from a so-called pool of available cross office units to store and, subsequently, transmit any particular high class precedence message over a selected outgoing line. In this connection it should be noted that the cancel transmission transmitter (not shown) may be utilized by any cross office unit to break in and cancel the transmission of any low class precedence message whenever a high class precedence message is unable to gain access to an outgoing line that is being used to transmit a low class message. The arrangement of the switching apparatus required to handle multiple call messages will better be understood from a consideration of the detailed operation of the various units of apparatus included in the multiple call equipment in connection with the receipt of a message received from another switching center, for example, the switching center UEP.

*Telegraph message received at the relay switching center UAC*

In order to better understand the manner in which the single address telegraph messages and the multiple address telegraph messages are handled in the relay switching center UAC, it first will be assumed that a single address telegraph message is received from the switching center UEP and that the received message is to be retransmitted to the single tributary station JWPA, served by the relay switching center JWP. Since the detailed description of the operation of the switching apparatus provided in the relay switching center UAC has been given in the previously noted Stiles patent, only a brief description of the handling of this message will be given at present. Each single address telegraph message received over an incoming line includes the following items of information:

| | | |
|---|---|---|
| 1 | XZXZXZX | The start of message indicator. |
| 2 | {ABC (Figures)<br>{014 (Letters) | ABC is a three letter code identifying the particular incoming line. 014 is the number identifying the number of the message received over the incoming line in a given time interval. |
| 3 | NMNM | A deferred precedence indicator. This indicator may be any one of six different precedence indicators. |
| 4 | JWPA | A routing indicator. This indicator may be either a three, four, or five character routing indicator identifying the called relay switching center or tributary station. |
| 5 | | The body of the message. |
| 6 | 26 | The day of the month. |
| 7 | 0145 | The clock time that the message was transmitted over the incoming line from the preceding relay switching center (UEP). |
| 8 | (,,,,,,,) | The end of message indicator is indicated by seven commas. |

The start of message indicator (Item 1) will be referred to hereinafter as the SOM and in all cases this SOM comprises the seven characters noted. Unless these seven characters precede each telegraph message, an alarm signal will be given to indicate that an improper SOM has been detected by the incoming line equipment and the message will not be processed until an attendant has checked the message.

The three digits included in the channel number indicator (Item 2) identifies the incoming line by either two or three letters and the following three digits indicate the number of the message received during a twenty-four hour period. The first message of a twenty-four hour period will be message number 001 and the comparator included in the line circuit will be set to 001 so that a comparison may be made. If a message is lost, the number perforated on the tape will not check with the number preregistered in the channel number comparator and an alarm will be automatically transmitted to indicate this fact.

The precedence indicator (Item 3) identifies the precedence or class of the particular message. Six degrees of precedence are provided in the present system which are indicated respectively in the following manner and order:

A. "Flash" precedence is the highest order and is indicated by five "bell" characters preceding the letters FL.

B. "Emergency" precedence is the second highest and is indicated by five "bell" characters preceding the letters EM.

C. "Operational immediate" precedence is the third highest and is indicated by the characters OPOP.

Each message having any one of the three above noted precedences is referred to as high precedence message and will control the automatic switching apparatus at the relay switching center to automatically interrupt any message of lower precedence if the lower precedence message interferes with or blocks the intermediate transmission of the high class precedence message. In addition to the foregoing, a "flash" message will interrupt an "emergency" message and an "operational immediate" message, and an "emergency" message will interrupt an "operational immediate" message.

D. "Priority" precedence is the fourth highest and is indicated by the characters PP. This class is the highest order of the low class messages but will not interrupt the transmission of a "routine" or a "deferred" precedence message. In other words, if a message of lower precedence is being transmitted over an outgoing line, a "priority" precedence message will not be transmitted over the same line until the lower class message has been completely transmitted.

E. "Routine" precedence is the fifth highest and is indicated by the characters RR. If a "deferred" message is being transmitted over a particular outgoing line, that message will be completely transmitted before the outgoing line can be taken over to transmit a "routine" message and other deferred messages awaiting retransmission over this outgoing line will be delayed until the "routine" precedence message has been transmitted.

F. "Deferred" precedence is the lowest and is indicated by the characters NMNM. Messages having a "deferred" precedence will be transmitted as long as they do not interfere with the transmission of any "routine" or "priority" precedence messages over the same outgoing line and they will be interrupted whenever any high precedence message requires transmission over the same outgoing line.

The precedence detector X2300 included in the director X200A is provided with a precedence detector circuit for detecting and registering each of the above noted six classes of precedence. Depending upon the precedence of the message, the detector will function to control the retransmission of the message.

The routing indicator (Item 4) comprises either 3, 4 or 5 characters identifying the called relay switching center or tributary station to which the message must be retransmitted by the relay switching center UAC.

As previously described in connection with the trunking plan illustrated in Fig. 1, the routing indicator will identify the called relay switching center if it includes only three characters and it will identify the called tributary station if it includes 4 or 5 characters. In the present system each director is provided with route registers for registering any routing indicator. Also, a routing translator X2900 and a patch panel X3200 will control the director to select an outgoing line extending in the direction of the called destination of the particular message.

The body of the message (Item 5) will be automatically retransmitted by the retransmitter X360 to a selected cross office unit, such as X3400, where the entire received message will be perforated on the tape X3413 by the cross office reperforator X3410 for subsequent transmission over the selected outgoing line.

The day of the month (Item 6) and the clock time of the message (Item 7) will also be transmitted to the cross office unit X3400 and reperforated on the tape X3413 by the cross office reperforator X3410 for subsequent retransmission over the selected outgoing line.

The end of message indicator (Item 8) will be referred to hereinafter as the EOM and it includes a "figures shift"

character function, followed by seven commas and then followed by a "letters shift" character function. From the foregoing explanation of Items 1 to 8, inclusive, it will be understood that each single address message received over an incoming line from the relay switching center UEP is preceded by a SOM indicator and is terminated by an EOM indicator. The operation of the switching apparatus in response to the different items noted above will now be briefly described.

When a message of the type noted above is received by the typing reperforator X330, it is perforated on the tape X333 and the tape reader X340 will sense the perforations in the tape. The start of message characters of Item 1 will be registered in the start and end of message detector and incident to this registration a comparison will then be made of the digits 014 (Item 2) identifying the number of the message with the number preregistered in the channel number comparator X900. If the comparison is successful, then the director assigner X800 will select, for example, the director X200A. Thereafter the tape reader X340 will be controlled to register the precedence indicator (Item 3) in the precedence detector X2300 and it will register the routing indicator (Item 4) in the address detector (not shown) of the director X200A.

Figure 6:
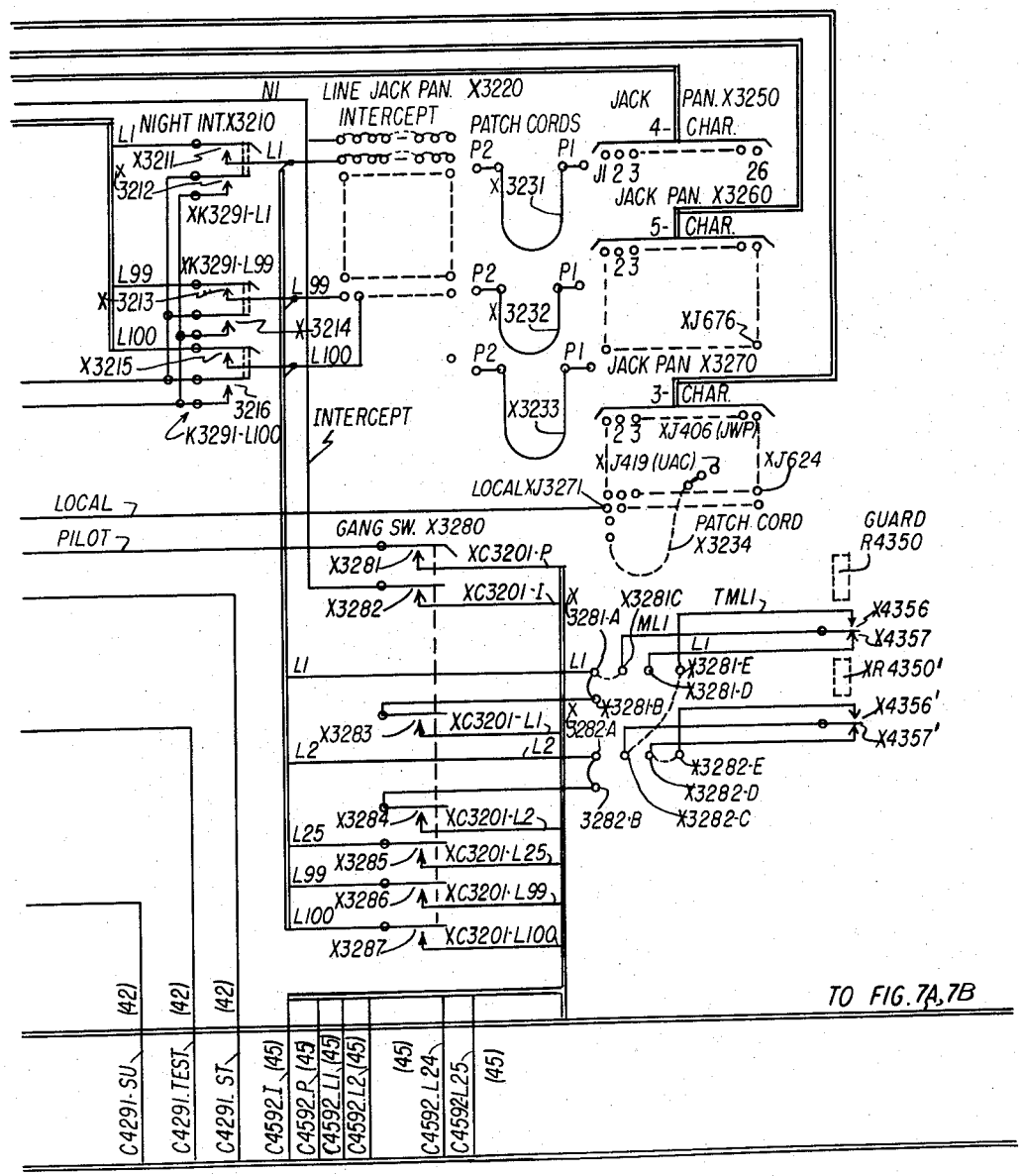

In the present example it has been assumed that the routing indicator JWPA has registered in the address detector. The registration of the foregoing characters will control the routing translator X2900 of Figs. 3 to 5, inclusive, in the manner described in the previously noted Stiles Patent so that a ground potential is applied to the jack J406 on the three character jack panels X3270 (Fig. 6). In this connection is should be noted that the fourth character A of the routing indicator JWPA, although registered in the decoding relay X2904, performs no function at this time. This is due to the fact that the first three characters JWP designate the remotely located relay switching center JWP that serves the tributary station JWPA and that the particular message may be routed to the relay switching center JWP without utilizing the fourth character A registered in the fourth character decoding relay X2904. The jack J406 on the jack panel X3270 will be jumpered by means of a patching cord, such as X3233, to one of the jacks in the line jack panel X3220. The line jack panel includes line jacks for all of the outgoing lines extending from the relay switching center UAC. Consequently, the plug P2 of the patching cord X3233 will be plugged into the line jack corresponding to or identifying the particular outgoing line which in this example is assumed to be the line L1 extending to the relay switching center JWP. This relay switching center is arranged to retransmit the message to the associated tributary station JWPA. The outgoing line L1 selected by the operation of the routing translator X2900 may, for example, cause the operation of an L1 channel register relay in the channel register X1700. The channel register X1700 is provided with as many channel register relays as there are outgoing lines and when the L1 channel relay is operated it will cause the disconnection of the routing translator X2900 and the patch panel X3200 from the director X200A.

When the outgoing line over which the telegraph message is to be transmitted is registered in the channel register X1700, a test is first made by the director X200A to determine whether or not any cross office unit, such as the cross office unit X3400 is associated with the L1 outgoing line and has stored on the tape X3413 a message that has the same deferred precedence as the messags that is being analyzed by the director X200A. Accordingly, the channel register X1700, as a result of the registration of the deferred precedence "NMNM" in the precedence detector X2300, will apply ground potential to one of the one hundred conductors designated XC4301NM1 to XC4301NM100

If it is assumed that the individual conductor

XC4301NM1 is grounded in accordance with the deferred precedence, a circuit will be completed by way of the wiper X4328 of the outgoing selector X4300 (Fig. 8) in engagement with the contact 1 corresponding to the L1 outgoing line. The corresponding contacts of other outgoing selectors, such as the selector X4300, associated with the remaining cross office units in the exchange are multipled together. Consequently, other cross office selectors that have the wiper corresponding to the wiper X4328 in engagement with the bank contact corresponding to the L1 outgoing line, the ground potential noted above will also be applied to the said other outgoing selectors. In the cross office unit X3400 (Fig. 8) the ground potential applied to the wiper X4328 is further extended by way of the conductor XC4201NMC to the contact engaged by the wiper X4215 of the precedence marking switch X4210. In other words, the precedence marking switch X4210 has previously been positioned so that its wiper X4215 engages the contact in its bank indicative of the deferred precedence. The ground potential is further extended from this point by way of the contact X3855 and the conductor XC3802-1 to operate the relay XR2810-1 in the channel testing circuit X2800 (Fig. 7A). The relay XR2810-1 corresponds to the cross-office unit X3400 and there are as many of these relays as there are cross-office units provided in the telegraph switching center. It should also be understood that the ground potential applied to the bank contacts of the outgoing selectors of the said other cross-office units that have the deferred precedence registered therein and are in engagement with the L1 outgoing line will also cause the operation of the corresponding relays, such as XR2810-1, in the channel testing circuit X2800. Since the channel testing circuit X2800 has now registered in the relay XR2810-1, the fact that the cross-office unit X3400 has a deferred precedence message registered therein and is associated with the L1 outgoing line over which the present deferred message is also to be transmitted, it will control the director so that it will operate the cross-office selector X3300 to position its wipers X3321 to X3325, inclusive, into engagement with the conductors extending to the cross-office unit X3400 in order to interconnect the cross-office unit X3400 with the incoming line circuit X400 and with the director X200A.

Inasmuch as the deferred precedence of the present message has been previously registered in the precedence marking switch X4210 of the cross-office unit X3400 and is not necessary to control the director X200A to cause it to transmit the deferred precedence to set the precedence switch X4210 in the cross-office unit X3400. Consequently, at this time the director X200A controls the incoming line circuit X400 to indicate that the entire message, as perforated on the tape X333, may now be retransmitted to the reperforator X3410 in the cross office unit X3400. Since the director X200A has signaled the incoming line circuit X400 that it may transmit the message to the cross office unit X3400, the director X200A is restored to normal and rendered available for use by other incoming line circuits.

Before describing the manner in which the incoming line circuit X400 transmits the entire message to the cross office unit X3400, the operations of the channel register X1700, the cross office selector switch relay control group X2600 and the channel testing circuit X2800 in selecting a cross office unit which has not previously been connected to the desired outgoing line will be described. In other words, the above description assumed that the cross office unit X3400 was connected to the L1 outgoing line over which the message stored in the incoming line circuit X400 is to be transmitted and the cross office unit had the same deferred precedence registered therein as the precedence of the message stored in the incoming line circuit X400. If no cross office unit, such as X3400, is connected to the L1 outgoing line at the time the channel register X1700 applied the testing ground potential to the conductor XC4301NM1 all of the channel testing register relays, such as XR2810–1, remain in their restored positions. It therefore becomes necessary for the director X200A to select, from a pool of empty bin cross office units, one of the units for use in connection with the present message. This is accomplished as a result of the failure of one of the relays XR2810–1 to operate within a predetermined elapsed time interval after the testing ground potential is applied to the conductor XC4301NM1. At the end of the elapsed time interval, the hunt empty bin relay XR2760 in the relay control group X2600 (Fig. 7A) operates and, at its contacts X2766, it applies ground potential to the conductor XC3902HEB extending to the cross office unit X3400 (Fig. 8) in order to operate the empty bin relay XR3990. The conductor XC3902HEB is multiply connected to corresponding conductors of all of the cross office units that have no message stored therein. The relay XR3990, at its contacts X3991, now applies ground potential by way of the contacts X3855 and the conductor XC3802–1 in order to operate the relay XR2810–1 in the channel testing circuit X2800. The corresponding relays in the other cross office units that had no messages stored therein will also operate corresponding relays, such as XR2810–1, to register the corresponding cross office units in the channel testing circuit X2800.

It will be assumed again that the cross office unit X3400 is available and that its storage bin is empty at the present time. Consequently, this fact will be registered in the channel testing circuit X2800 by the operation of the relay XR2810–1. The relay XR2810–1 in operating causes the director X200A to control the cross office selector X3300 to advance its wipers X3321 to X3325, inclusive, into engagement with the bank contacts terminating the conductors extending to the cross office unit X3400. When this operation is accomplished a circuit will be completed for operating the seizure relay XR3870 in the cross office unit X3400. This circuit may be traced from battery by way of the winding of the relay XR3870, conductor XC3301BTL, contact 1 engaged by the wiper X3323 of the cross office selector X3300, contacts X3313, conductor XC864, the bank contact engaged by the wiper X829 of the line selector X810, conductor XC851, contacts X2628, X2657 and X2756 and the upper winding of the cross office test relay XR2650, to ground. In this circuit, both the relay XR3870 and the relay XR2650 operate. At its lower make contact, the relay XR2650 completes a circuit for operating the relay XR2645 in series with its lower winding and the winding of the relay XR3870. The relay XR2645 upon operating now controls a circuit (not shown) whereby the magnet XM2214 of the precedence indicator switch X2210 now transmits, at the contacts X2216, impulses to the magnet XM4217 of the precedence marking switch X4210 in the cross office unit X3400. In other words, the magnet XM2214 will operate and restore a predetermined number of times in accordance with each of the six different precedence indicators that may be registered in the precedence detector X2300 and thereby cause the precedence marking switch X4210 to position its wipers to corresponding bank contacts to register in the cross office unit X3400, the precedence of the present message. This circuit for controlling the transfer of the precedence from the precedence indicator switch X2210 to the precedence marking switch X4210 includes the contacts X2216, winding of the relay XR2230, contacts X2625, conductor XC850, wiper X828, conductor XC863, contacts X3314, wiper X3324, conductor XC3301PSS and the winding of the magnet XM4217, to battery. At the conclusion of the transmission of impulses over the above traced circuit the "deferred" precedence of the present message will be registered in the cross office unit X3400. Any one of the other previously noted five different precedence indicators may be transferred in the above described manner.

The selector switch X4050 provided in the cross office unit X3400 is arranged to select any one of a plurality of outgoing selectors, such as the outgoing selector X4300, if additional outgoing selectors are required to associate the cross office unit X3400 with, for example, more than 100 outgoing lines, such as the outgoing line L1.

Consequently, as soon as the precedence has been registered in the cross office unit X3400, the channel testing circuit X2800 and the channel register circuit X1700 cooperate to transmit a single pulse over the circuit including the contacts X2621, conductor XC855, wiper X836, conductor XC861, contacts X3315, wiper X3325, conductor XC3301–OSS contacts X4022 of the operated relay XR4020, and the magnet XM4053, to battery. This magnet upon operating and restoring in response to one impulse advances its wiper into engagement with the bank contact terminating the conductor XC400 extending to the winding of the connect relay XR4310 in the outgoing selector X4300. In this manner the particular outgoing selector having access to outgoing lines including the outgoing line L1 is selected. If the outgoing selector X4300 did not have access by way of its bank contacts to the particular outgoing line which has been registered in the channel register X1700, then the selector switch X4050 would be operated by additional impulses to select the particular outgoing selector associated with the cross office unit X3400 having access to the desired outgoing line.

After the selector switch X4050 has been controlled in the manner noted above, the relay XR4020 restores to normal to complete the circuit including the contacts X4023, conductor XC4002–OSS, contacts X4311' on the operated connect relay XR4310 and the magnet XM4320, to battery. Accordingly, impulses are now transmitted from the director X200A in the manner previously described to control the magnet XM4320 to position its wipers X4321, etc., into engagement with the outgoing line registered in the channel register X1700. In the present case the L1 outgoing line is registered in the channel register X1700 and causes the magnet XM4320 to position its wipers into engagement with the first contact in the associated contact banks terminating the conductors of the L1 outgoing line. After this operation of the outgoing selector X4300 is completed, the director X200A will transmit the control signal to the incoming line circuit X400 to indicate that the entire message perforated on the tape X333 may now be retransmitted to the reperforator X3410 in the cross office unit X3400. Also, the director X200A will be released from the connection.

From the foregoing it will be understood that the message perforated on the tape X333 in the incoming line circuit X400 including all of the various items of information noted previously will cause the director X200A to select a cross office unit having the same precedence as the received message and which is associated with the outgoing line over which the particular message is to be transmitted. Thus, a cross office unit which is used and has previously stored at least one other message of the same precedence as the message stored on the tape in the incoming line circuit X400 may also be used to store the received message inasmuch as the cross office unit is connected to the proper outgoing line. If on the other hand, no cross office unit is connected to the proper outgoing line or if a cross office unit which is connected to the outgoing line L1 does not have the same precedence registered therein as the received message, the director X200A will function to select an idle cross office unit from the pool of available cross offices units. Also the director will register the precedence of the received message in the selected cross office unit and it will then position the outgoing selector of the selected cross office unit into engagement with the outgoing line over which the message is to be transmitted to the desired destination. In either event, when the director has completed its operation, it signals the incoming line circuit X400 to indicate that it can retransmit the message stored on the tape X333 to the cross office unit X3400.

Referring now to the incoming line circuit X400, it should be understood that when the director gives the signal for retransmission, the contacts X671 will be closed in order to connect the incoming line retransmitter X360 to a circuit including the cross office reperforator X3410 in the selected cross office unit X3400. Before describing this circuit, however, it should be noted that at the contacts X607, the relay XR605 in its operated position completes a circuit including the strap A, conductor XC551, contacts X3312, wiper X3322, conductor XC3301–OGC for operating the relay XR3880. This relay operates and at its lower make contact completes the circuit for operating the relay XR3890. As a further result of the operation of relay XR3880, at its contacts X3881, it completes an obvious circuit for operating the reperforator relay XR3800. The latter relay, at its contacts X3802, completes the previously noted circuit for connecting the cross office reperforator X3410. When this connection is made a circuit is completed from ground at the contacts X366 in the retransmitter X360, conductor XC689, contacts X671, the lower winding of relay XR605, conductor XC696, contacts X3311, wiper X3321, conductor XC3301SIG, contacts X3802, and the winding of the reperforator magnet XM3411, to battery. The magnet XM3411 is now conditioned to control the reperforator X3410 to perforate the tap X3413, in code form, in accordance with the code signals transmitted over the above described circuit under control of the five contacts shown to the left of the contacts X366 in the incoming line retransmitter X360. The entire message appearing on the tape X333 is accordingly retransmitted by the retransmitter X360 to the cross-office reperforator X3410 which perforates its tape X3413. During the retransmission of the message, the tape reader X340 will sense the end-of-message indicator and it will cause a predetermined amount of tape to be automatically fed to the incoming line retransmitter X360 to insure the passage of the end of message indicator perforated on the tape through the retransmitter X360. Thereafter, the incoming line circuit X400 may be restored to normal inasmuch as the message is now stored on the tape X3413 in the cross-office unit X3400.

In the cross-office unit X3400 the tape reader X3420 will sense the tape X3413 in substantially the same manner as the tape reader X340 and when the L1 outgoing line is available for the transmission of the message on the tape X3413, the tape will be fed through the tape transmitter X3430. The tape transmitter in turn will transmit, in code form, the message over a circuit including the contacts X3941, the lower winding of the opening line relay XR4010, conductor XC4002SIG, contacts X4311, wiper X4321, and then by way of the timer XT4495, the number transmitter X4430 and the monitor unit X4450 to the L1 outgoing line.

From the foregoing description it will be appreciated that single address telegraph messages will be automatically analyzed and routed through the switching equipment in the relay switching center UAC to the outgoing line over which the message must be retransmitted to reach its destination. The detailed operation of the equipment and apparatus utilized in conjunction with single address telegraph message may be found in the previously mentioned Stiles application. The above general description has been given in order more readily to understand the description to be given hereinafter regarding the operation of the equipment in connection with multiple address telegraph messages.

*Routing a multiple call message to the multiple call equipment*

A multiple call message having a plurality of routing indicators (addresses) thereon which is received at the relay switching center UAC from the relay switching center UEP is processed by the incoming line circuit X400 and the director X200A in substantially the same manner as a single address message. A multiple call message, however, is a message having in addition to the precedence indicator and routing indicator, a multiple call indicator which is identified by the three letters ZVA. Following the multiple call indicator ZVA, the message contains a list of additional routing indicators (addresses) identifying the different tributary stations to which the received multiple call message must also be transmitted by the apparatus provided in the relay switching center UAC. In the present system, the multiple call message will be automatically analyzed at the switching center that is identified in the message and that is to be held responsible for the retransmission of the message to the tributary stations indicated after the letters ZVA.

There are several different types of multiple call messages and the first type to be considered may, for example, include the following information:

| | | |
|---|---|---|
| 1 | XZXZXZX | The start of message indicator. |
| 2 | ABC (Figs.)<br>014 (Ltrs.) | ABC is a three letter code identifying the particular incoming line. 014 is the number identifying the number of the message received over the incoming line during a predetermined period. |
| 3 | NMNM | A (deferred) precedence indicator. This indicator may be any one of six different precedence indicators. |
| 4 | UAC | The routing indicator identifying the relay switching center that is responsible for the retransmission of the multiple call message to a plurality of destinations. |
| 5 | ZVA | The multiple call message indicator. This indicator following Item 4 indicates that the relay switching center UAC is responsible for retransmission of the received multiple call message to the called tributary stations identified in Item 6. The letters NMNM identify the deferred precedence and is representative of any one of the six previously noted different precedence indicators. |
| 6 | NMNM UACZZ<br>JWCX JKXY<br>UKAY 444 | The following routing indicators are indicative of the four tributary stations to which this message is to be retransmitted by the relay switching center UAC. The digit 4, appearing three times, identifies the number of tributary stations to which the relay switching center UAC must retransmit the message. |
| 7 | | The body of the message. |
| 8 | 26 | The day of the month. |
| 9 | 0145 | The clock time that the message was transmitted over the incoming line from the preceding relay switching center (UEP). |
| 10 | (,,,,,,) | The end of message indicator. |

When a message of the type referred to above is received at the incoming line circuit X400, Items 1 and 2 are detected, in the manner previously described, and if the number competitor X900 is registering digits 014, a successful comparison will be made of the digits 014 appearing in code form on the tape X333. As a result thereof, the director assigner X800 and the line selector X810 are utilized in associating the director X200A with the incoming line circuit X400. Thereafter, the precedence in Item 3 is detected and registered in the manner previously explained and the routing indicator (UAC in the present case) is detected and registered in the address register (not shown). As a result of the registration of the routing indicator UAC identifying the illustrated relay switching center, the routing translator X2900 (Figs. 3 to 5, inclusive) is controlled to register the corresponding characters and will apply ground potential to the jack J419 (Fig. 6). This jack is interconnected by means of a patch cord X3234 to the local jack J3271, whereby, ground potential is further extended by way of the local conductor, contacts X3061 and X3073, contacts X3281 on the gauge switch X3280, and the conductor XC3201P in order to operate a relay in the cross-office selector switch relay control group X2600 which is indicative of a ZVA (multiple) call. However, the operation of the above noted ZVA relay is governed by the registration in the precedence detector X2300, of the multiple call message indicator ZVA.

Accordingly, it should be understood that immediately following the registration of the routing indicator UAC in the director X200A for the purpose of controlling the routing translator X2900, the ZVA characters on the message are detected and registered in the ZVA multiple call register (not shown) provided in the precedence detector X2300. The fact that the ZVA characters have been detected and registered completes the previously described circuit, whereby, the above noted ZVA relay (not shown) is operated under control of the ground potential applied to the pilot conductor by way of the patch panel X3200 (Fig. 6).

At the present time, the deferred precedence indicator NMNM is registered in the precedence detector X2300 and the ZVA multiple call message indicator is also registered therein. This condition causes the multiple call relay XR2450 to operate its contacts to connect with the conductors C1985MA3 to C1985MA7, inclusive, and C1985MA10 to the six different precedence registers in the precedence detector X2300. At its contacts X2456, the relay XR2450 applies ground potential to the conductor C1985MA10 extending to Fig. 19 in order to indicate in the multiple call storage unit 1400 that the present message is of the deferred precedence class. If a multiple call storage unit having another multiple call of the deferred precedence class stored therein is available, then the ground potential on the above noted conductor will control the director X200A to connect with that particular multiple call storage unit.

Figure 17:
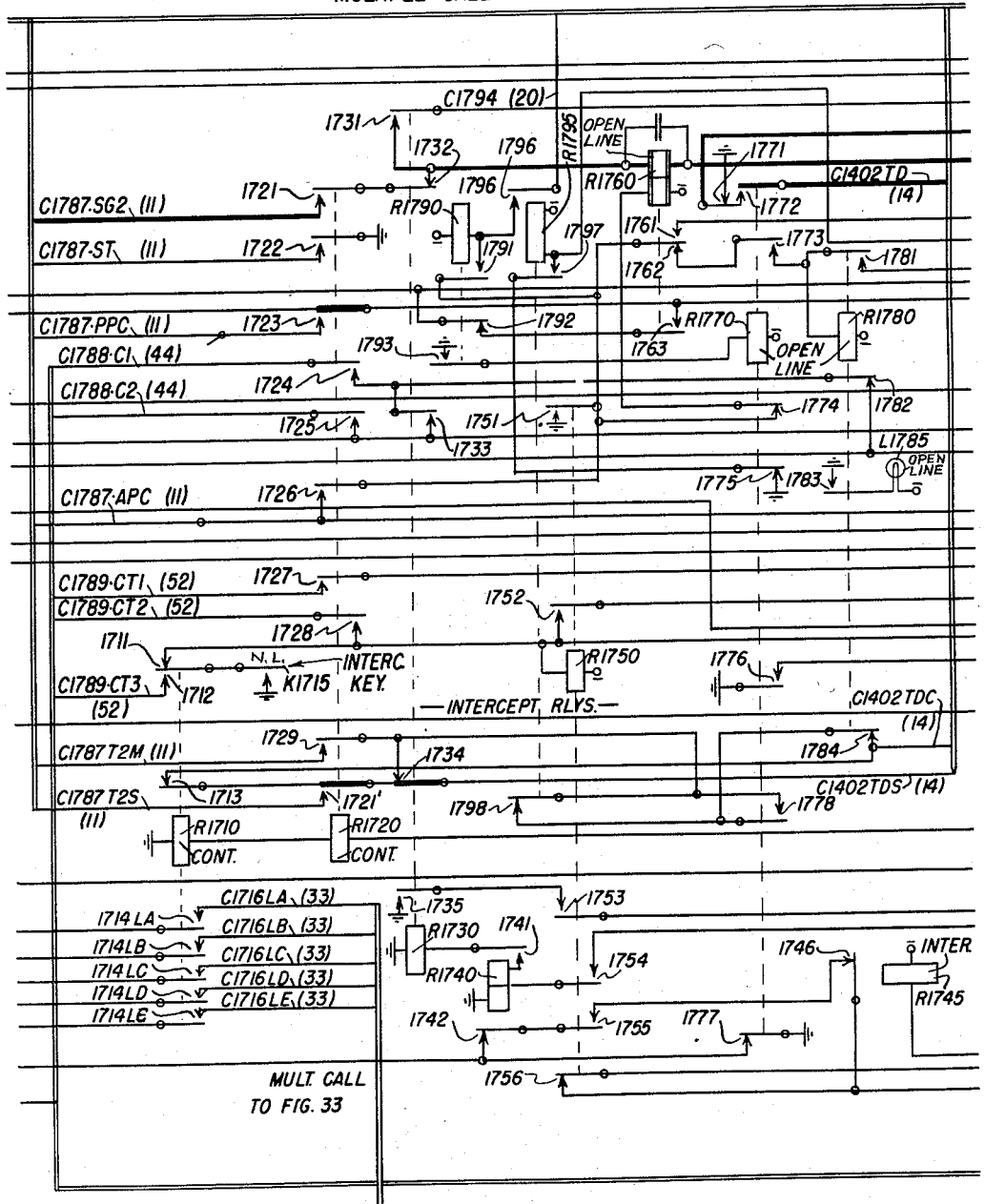
Figure 18:
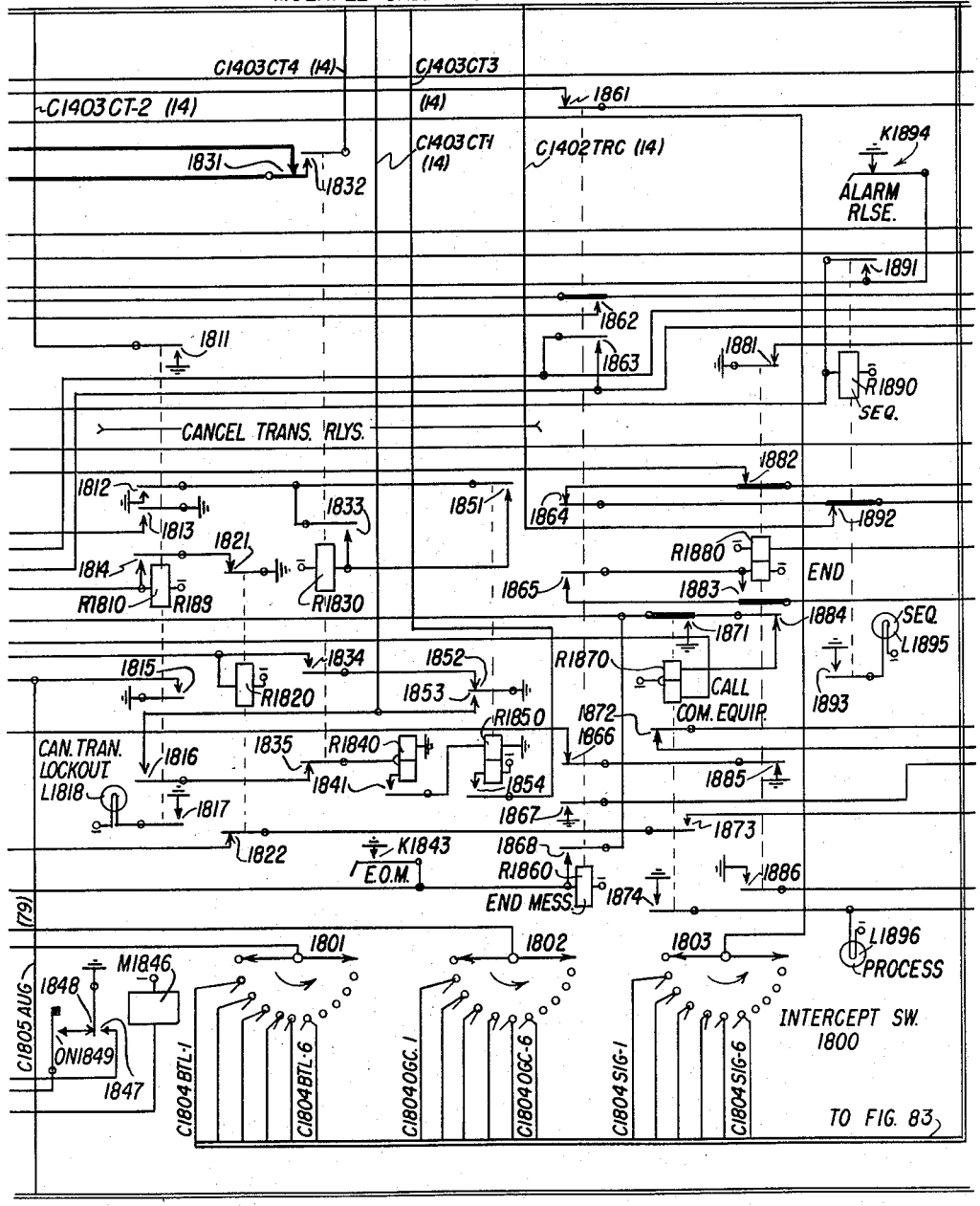
Figure 19:
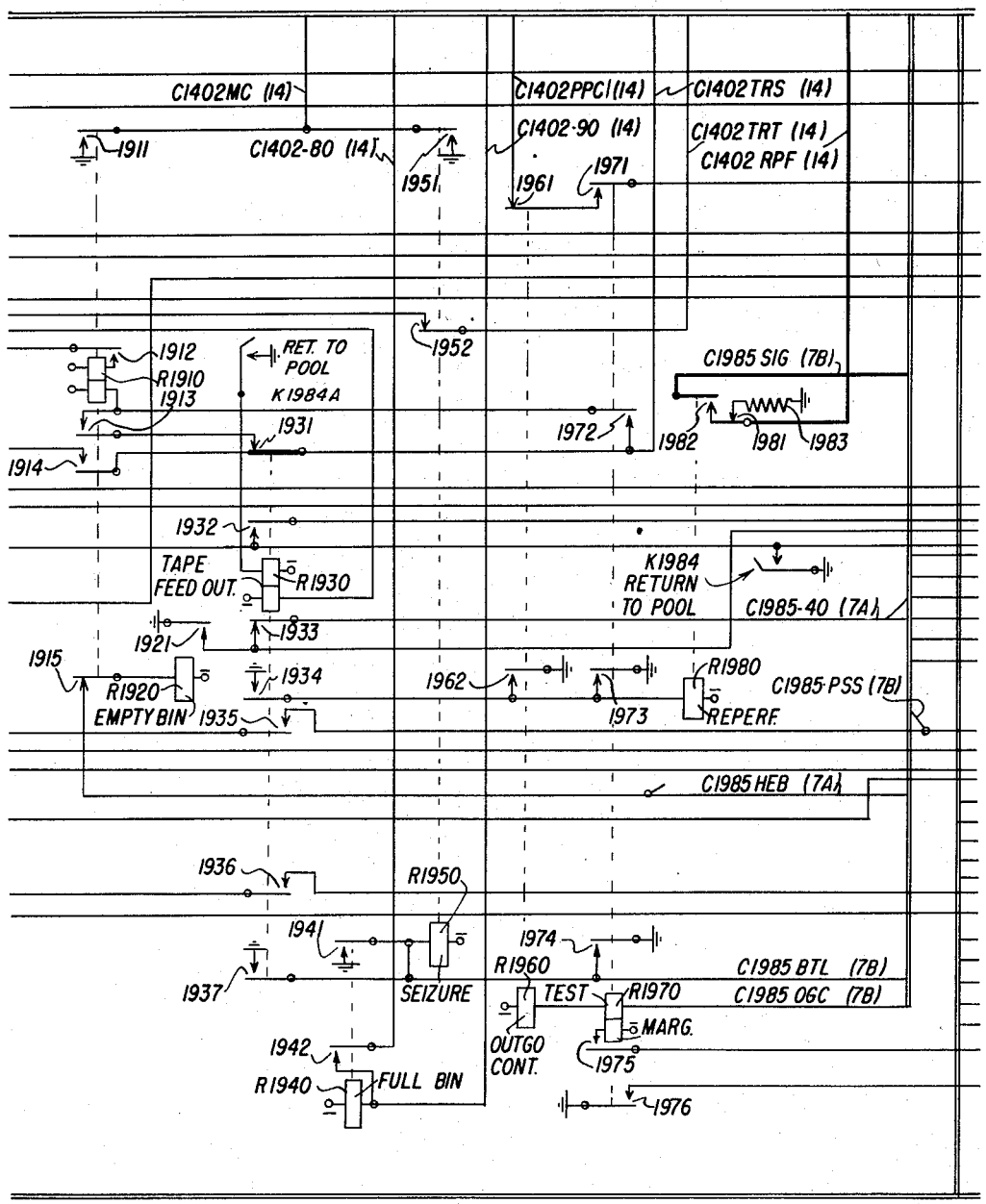
Figure 20:
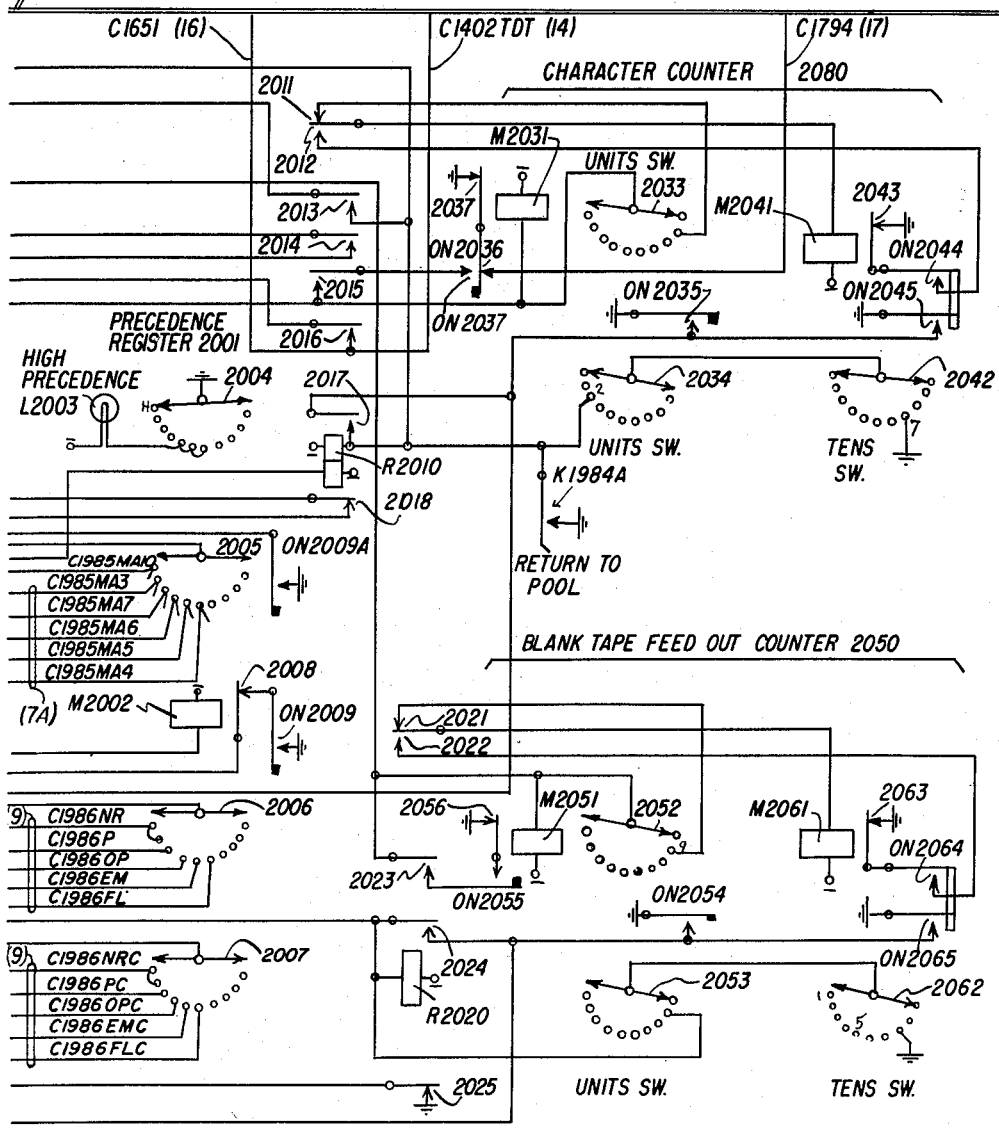

It will now be assumed that five multiple call units, such as the multiple call storage unit 1400 illustrated in Figs. 14 to 20, inclusive, are available for use in handling the present multiple call telegraph message. Accordingly, the director X200A, in the manner previously described, causes the operation of the hunt empty bin relay XR2760 provided in the relay control group X2600. This relay upon operating, at its contacts 2766, applies ground potential to the conductors C1985HEB extending to Fig. 19 and which is multiply connected to corresponding conductors extending to the four other multiple call storage units. This ground potential is also extended by way of the conductor XC3902HEB extending to all of the cross-office units, such as X3400, but this is of no importance in a multiple call message. Referring now to Fig. 19 of the multiple call storage unit 1400, it will be seen that the ground potential applied to the conductor C1985HEB completes a circuit including contacts 1915 for operating the empty bin relay R1920. This relay, at its contacts 1921, applies ground potential by way of the contacts 1933 to the conductor C1985-40 extending to the channel testing circuit X2800 (Fig. 7A) in the director X200A.

Inasmuch as the director X200A has been conditioned by the registration therein of the multiple call indicator ZVA, the relay XR2840 in the channel testing circuit X2800 is operated to connect the five relays XR2810-40 to XR2810-44, inclusive, to five conductors corresponding respectively to the conductor C1985-40 individual to the multiple call storage unit 1400. All of these conductors will be grounded by the corresponding multiple call storage units and will accordingly operate the five relays XR2810-40 to XR2810-44, inclusive. As soon as any one of the above noted relays is operated, the channel testing circuit X2800 operates in the manner described in the previously noted Stiles patent to find the first operated relay and simultaneously therewith, it will cause the wipers X3321 to X3325, inclusive, of the cross-office selector Z3300 to be advanced step-in-step. Consequently, when the operated relay XR2810-40 is found, the wipers of the cross-office selector X3300 will be in engagement with the contacts 40 in the associated contact banks terminating the conductors C1985SIG, OGC, BTL and PSS extending to Fig. 19 of the multiple call storage unit 1400. The next four contact positions in the banks of the cross-office selector X3300 terminate, respectively, corresponding conductors extending to four other multiple call storage units.

When the multiple call storage unit 1400 is found a circuit is completed from ground at the upper winding of the cross-office test relay XR2650 (Fig. 7A) in the relay control group X2600 of the director X200A and then by way of the contacts X2756, X2657 and X2628, conductor XC851, wiper X829, conductor XC864, contacts X3313, wiper X3323, conductor C1985BTL extending to Fig. 19 and the winding of the seizure relay R1950, to battery. The relay R1950 and the relay XR2650 operate over this circuit and immediately thereafter, the relay XR2645 operates in series with the relay R1950 and the lower winding of the relay XR2650. The operation of the relay XR2645 indicates to the director X200A that the multiple call storage unit 1400 has been found. Thereafter, the precedence indicator switch X2210 will transmit pulses to the multiple call storage unit 1400 to register therein the precedence indicator which is stored in the precedence detector X2300.

The magnet M2214 in the precedence indicator switch X2210 is operated a predetermined number of times corresponding respectively to the precedence registered in the precedence detector X2300. Each time the magnet M2214 operates and restores it transmits a pulse over a circuit including its contacts X2216, relay XR2230, conductor XC2202PIC, contacts X2625, conductor XC850, wiper X828, conductor XC863, contacts X3314, wiper X3324 in engagement with the bank contact terminating conductor C1985PSS extending to Fig. 19 and the winding of the magnet M2002, to battery, of the precedence register 2001 in the multiple call storage unit 1400. Each time the magnet M2002 operates and restores its advances its wipers 2004 to 2007 one step in a counter-clockwise direction. If only one pulse is transmitted over the above traced circuit, the wipers will be advanced one step to register the "deferred" precedence (NM); if two pulses are transmitted the wipers will engage contacts 2 to register the "routine" precedence (RR); three pulses will advance the wipers to contact 3 to register the "priority" precedence (PP); four pulses will advance the wipers to contact 4 to register the "operational immediate" precedence (OP); five pulses will advance the wipers to contact 5 to register the "emergency" precedence (EM); and six pulses will advance the wipers to contact 6 to register the "flash" precedence (FL). In this manner, the particular precedence of the message, as registered in the precedence detector X2300, is transferred to the selected multiple call storage unit 1400.

In the foregoing description of the operation of the director X200A in response to a multiple call message, it was assumed that one or more of the multiple call storage units, such as 1400, is available for use and that no other messages have been stored in a multiple call storage unit. In view of the above description of the operation of the precedence register 2001 in the multiple call storage unit 1400, it will be understood that if the storage unit precedence register 2001 had previously been positioned to engage its contacts 1 in accordance with a "deferred" precedence at the time the director X200A applied ground potential to the conductor C1985MA10, then the message being analyzed by the director X200A could be transmitted to the multiple call storage unit 1400 that has already been set to the same precedence as the multiple call message being analyzed. In response to this condition, the ground potential applied to the conductor C1985MA10 by the precedence detector X2300 will be extended to wiper 2005 in engagement with its contact 1 and then over a circuit including the contacts 1933 and the conductor C1985–40 to operate the relay XR2810–40 in the channel testing circuit X2800. This operation, however, would prevent the director X200A from transmitting signals to the multiple call storage unit 1400 corresponding to the precedence of the message registered therein inasmuch as the precedence register 2001 has been previously set in accordance with this precedence. The remaining operations, whereby the director controls the cross-office selector X3300 to connect with the multiple call storage unit 1400 are substantially the same as has been previously described.

After the director X200A has selected a multiple call storage unit, such as 1400, either by selecting it from a group of available units or by selecting the one unit that has its precedence register 2001 set to the same precedence as the message being analyzed by the director, a signal is transmitted to the incoming line circuit X400 to indicate that the latter circuit may start retransmission of the entire message appearing on the tape X333 to the selected multiple call storage unit 1400. However, before proceeding with this description, it should be noted that when the seizure relay R1950 in the multiple call storage unit 1400 operates, it completes, at its contacts 1951, a circuit including the conductor C1402MC extending to Fig. 14 in order to operate the motor start relay R1415. The latter relay, at contacts such as 1416, starts the various motors (not shown) of the tape processing units of Fig. 14.

At this point it may be well to mention that the typing reperforator 1410 includes a perforating magnet M1411 and conventional apparatus (not shown) for perforating the tape 1413 in accordance with the five channel code illustrated in Fig. 89. This typing reperforator is substantially the same as the typing reperforator X330 (Fig. 7B) and may also be of the type disclosed in the Patent No. 2,255,794, granted to R. A. Lake on September 15, 1941. Each typing reperforator 1410 provided that in each of the multiple call storage units, such as 1400, is provided with a tape storage reel 1412 supporting a supply of unperforated tape 1413 and a tape supply testing mechanism 1409 which is arranged to illuminate the tape out alarm lamp L1412 whenever the supply of tape becomes inadequate.

The tape reader 1420 and the transmitter 1430 of the multiple call storage unit 1400 are respectively identical to the tape reader X340 and the retransmitter X360 associated with the incoming line X400 and they also may be of the type disclosed in the Patent No. 2,296,845, granted to M. T. Goetz on September 29, 1942.

As soon as the incoming line circuit X400 receives the signal from the director X200A that it may now retransmit the entire message perforated on the tape X333, the relay XR605 will be operated to complete, at its contacts X607, strap A, conductor XC551, contacts X3312, wiper X3322, conductor C1985–OGC extending to Fig. 19, the low resistance upper winding of the marginal test relay R1970 and the high resistance winding of the outgoing control relay R1960, to battery. In the above circuit it is noted that direct ground potential causes the operation of both the marginal relay R1970 and the relay R1960. However, if the strap A is removed from the above traced circuit the resistance X623 will become effective to prevent the operation of the marginal relay R1970 and to cause the operation of only the relay R1960. If the incoming line circuit X400 is connected to an incoming line which is adapted to receive continuous messages, then the strap A is provided so that both relays R1970 and R1960 are operated. On the other hand, if the messages received by the incoming line circuit X400 may be interrupted for some reason or other, the strap A is omitted so that the resistance X623 prevents operation of the marginal relay R1970. The circuit is arranged in the latter case to apply the direct ground potential in order to operate relay R1970 only after the entire message is received. For the purpose of this description it will be assumed that the strap A is provided and that both the relays R1970 and R1960 are operated.

As soon as the relay R1960 operates it completes, at its contacts 1962, an obvious circuit for operating the reperforator relay R1980 and the latter relay upon operating, at its contacts 1982, connects the conductor C1985SIG to the conductor C1402RPF so that the retransmitter X360 in the incoming line circuit X400 may now retransmit the entire message appearing on the tape X333 to the reperforator 1410. Referring now to the retransmitter X360, it will be seen that a circuit will now be completed from ground at contacts X366, conductor XC689, contacts X671, lower winding of relay XR605, conductor XC696, contacts X3311, wiper X3321, conductor C1985SIG extending to Fig. 19, contacts 1982, conductor C1402RPF extending to Fig. 14 and the winding of the perforate magnet M1411, to battery. The magnet M1411 is held operated over this circuit and is now in condition to control the reperforator 1410 to perforate the tape 1413, in code form, in accordance with the code signals transmitted over the above described circuit under control of the contacts shown to the left of the contacts X366 in the retransmitter X360. Accordingly, the tape retransmitter X360 will continue to operate as the tape X333 is advanced. When the tape reader X340 finally senses the end-of-message indicator (Item 10) which includes a "figures shift" character function followed by seven commas and then a "letters shift" character function, it will control the feed out of the tape X333 to insure the passage of the end-of-message indicator (Item 10) through the retransmitter X360. After all of the items have been retransmitted by the retransmitter X360, the incoming line circuit X400 may be restored to normal and disconnected from the multiple call storage unit 1400.

When the incoming line circuit X400 completes the transmission of the multiple call message to the reperforator 1410 in the multiple call storage unit 1400, it removes the ground potential from the conductor C1985–OGC to permit the restoration of the outgoing control relay R1960 and it opens the signal circuit including the conductor C1985SIG. It should be noted, however, that if the marginal relay R1970 is operated in series with the relay R1960, either immediately upon seizure by a direct ground potential on the conductor C1985 or subsequently operated, it will be locked in its operated position over a circuit including its lower winding, contacts 1975, and ground at contacts 2025. As a further result of the disconnection of the incoming line circuit X400 from the multiple call storage unit 1400, a busy marking ground potential is removed from the conductor C1985BTL but since the marginal relay R1970 is operated, ground potential at the contact 1974 retains the seizure relay R1950 operated and it marks the multiple call storage unit 1400 busy by applying the ground potential to the conductor C1985BTL. At this time the incoming line circuit X400 is restored to normal for use in analyzing another message perforated on the tape X333.

Before discussing the operations resulting from the restoration of the relay R1960 in the multiple call storage unit 1400, it is noted that, at the contacts 1973, the relay R1970 retains the reperforator relay R1980 in its operated position and, at its contacts 1972, it prepares a point in the circuit for operating the start relay R1910. Finally, at its contacts 1971, the relay R1970 prepares a point in the circuit, traced hereinafter, for counting the amount of blank tape fed out by the reperforator 1410.

In the present description it has been assumed that the multiple call storage unit 1400 has been drawn from a pool of empty bin units and as a result thereof, the start relay R1910 cannot be operated until the reperforator 1410 has processed sufficient of the tape 1413. When sufficient tape has been perforated by the perforator magnet M1411, the tape 1413 becomes slack between the reperforator 1410 and the tape reader 1420. As soon as the tape becomes sufficiently slack to permit the tight tape switch 1427 to close its contacts 1422, a circuit is completed which includes the conductor C1402TRS extending to Fig. 19, contacts 1972, and the lower winding of the start relay R1910 in order to operate the latter relay. As soon as this relay operates it closes its contacts 1912, thereby to complete a locking circuit for itself which includes its upper winding and ground potential at the normally closed contacts 1881. Also, at its contacts 1913, the relay R1910 locks itself to the grounded conductor C1402TRS and it extends the ground potential on the last mentioned conductor by way of the contacts 1914, 1643, 1882, the multiply connected contacts 1864, and 2018, contacts 1892, conductor C1402TRC extending to Fig. 14 and the winding of the clutch magnet M1425, to battery. The operation of the clutch magnet M1425 controls the tape reader 1420 to sense the perforations on the tape 1413 and to control the six contacts connected to the conductor C1401RA to RF, inclusive, in accordance with the code perforated on the associated tape.

As a further result of the operation of the start relay R1910, at its contacts 1911, it maintains an additional ground potential on the conductor C1402MC to retain operating the motors of the reperforator 1410, the tape reader 1420 and the retransmitter 1430. Finally, at its contacts 1915, the start relay R1910 interrupts the circuit for the empty bin relay R1920 which now restores to normal to remove the marking ground potential from the conductor C1985-40.

The tape reader 1420 is started, as noted above, as a result of a slack tape condition between the tape reader 1420 and the reperforator 1410. However, if the marginal test relay R1970 is not in its operated position to close its contacts 1972, then the tape reader will not be controlled. In other words, in a system in which the incoming line circuit X400 includes the previously noted resistance X623 in the circuit for operating relays R1960 and R1970, the latter relay is not operated until after the entire message has been transmitted to and reperforated by the reperforator 1410. When this occurs, a direct ground potential is substituted for the resistance ground potential, whereupon, the relay R1970 will operate and lock in its operated position. Thereafter, the outgoing control relay R1960 will be restored incident to the disconnection of the incoming line circuit 400 from the multiple call storage unit 1400.

*Inserting blank tape between messages*

When the relay R1960 is restored and the relay R1970 is retained operated, it is necessary to introduce a definite amount of blank tape, for the purpose of insuring the release of certain common equipment described hereinafter, between successive messages transmitted to the multiple call storage unit 1400. This blank tape will be sufficient to bridge the tight tape distance between the reperforator 1410 and the tape reader 1420 less approximately sixteen character spaces provided at the end of a message. Inasmuch as the position of the tape switches can not be exactly determined to the last character, eighty blank spaces has been selected as an arbitrary amount of blank tape to be inserted between successive messages. Accordingly, the blank tape feedout counter 2050 (Fig. 20) has its tens and units switches wired to count eighty blank spaces. It should be noted that when the tape reader 1420 is first started to sense the characters of a start of message indicator, the transmitter 1430 is also started (assuming that slack tape has been introduced between the tape reader 1420 and the transmitter 1430). Consequently, where the entire tape is blank between the reperforator 1410 and the transmitter 1430, most of the blank tape is pulled through the transmitter before the common equipment is seized as will be described hereinafter. The blank tape that remains bridges the spacing between the start of a new message (which may have been moved past the tape reader 1420 when the transmitter 1430 is stopped) and the transmitter 1430.

The foregoing operation is accomplished in the manner now to be described. When the complete message has been transmitted from the incoming line circuit X400 to the reperforator 1410 in the multiple call storage unit 1400, the incoming line circuit disconnects itself from the multiple call storage unit 1400 in the manner previously described, whereby, the circuit including the signal conductor C1985SIG is interrupted. Also, at this time the circuit including the conductor C1985-OGC is interrupted to cause the release of the outgoing control relay R1960. The marginal relay R1970, however, remains in its operated position having been locked to ground at contacts 2025. The reperforator relay R1980 remains operated under control of ground at contacts 1973. With the relay R1970 operated and the relay R1960 restored, a circuit is completed for controlling the magnet M2051 of the blank tape feed-out counter 2050. This circuit may be traced from battery by way of the magnet M2051, contacts 1971 and 1961, conductor C1402PPC-1 extending to Fig. 14 and the pulse per character contacts 1435 on the reperforator 1410, to ground. These contacts are closed once during each operating cycle of the reperforator 1410 in advancing the tape 1413 step-by-step therethrough. Since the reperforator relay R1980 is operated and the signal circuit through its contacts 1982 is open by the disconnection of the incoming line circuit X400, the reperforator magnet M1411 restores to normal to cause the reperforator 1410 to automatically feed out blank tape. Each time a blank is fed out by the reperforator 1410, the pulse per character contacts 1435 are closed and opened in order to operate and restore the magnet M2051 of the counter 2050. The counting of the pulses transmitted by the contacts 1435 will continue until the marginal relay R1970 is restored to normal.

Referring now to the blank tape feed-out counter 2050, it will be seen that after the magnet M2050 has counted nine pulses, its wipers 2052 and 2053 will be in engagement with the contacts 9. When the next pulse is transmitted to the units switch magnet M2051, it will also be extended by way of the wiper 2052 in engagement with the contact 9, contacts 2021 and the winding of the tens switch magnet M2061, to battery. Thus, when the tenth pulse is received by the magnet M2051, the magnet M2061 will also operate and at the end of the pulse, the magnet M2051 will restore to advance its wipers 2052 and 2053 into engagement with the contacts 10 and the tens switch magnet M2061 upon restoring will advance its wipers one step into engagement with the first set of contacts. Thus, the tens switch of the counter 2050 will register the tens digit 1, and the units switch 2051 will register the units digit 0. From the foregoing it will be understood that each time the units switch takes ten steps, the ten switch will take one step. At the end of eighty steps, i.e., the counting of eighty blank character spaces, the wiper 2062 will be in engagement with contact 8, the wiper 2053 will be in engagement with the contact 10 to thereby complete an obvious circuit for operating the relay R2020.

During the operation of the units and tens switches of the counter 2050, certain off-normal contacts are closed as long as the wipers of the associated switch are not in engagement with the contacts 10. Thus, the off-normal contacts ON2054 and ON2055 are closed as long as the wipers 2052 and 2053 are not in engagement with the contacts 10. Also, the off-normal contacts ON2064 and ON2065 are closed as long as the wiper 2062 is not in engagement with the contact 10. Since the wipers 2052 and 2053 are in engagement with the contacts 10 when fifty pulses have been counted, the off-normal contacts 2054 and 2055 are open. However, the off-normal contacts ON2064 and 2065 are closed to complete a self-interrupting circuit for restoring the wipers of the tens switch M2061 to normal. At the off-normal contacts ON2065, ground potential is applied by way of the contacts 2024 to retain the relay R2020 in its operated position during the return of the counter 2050 to its normal position. At the contacts 2063 a self-interrupting circuit is completed for the magnet M2061 which includes the contacts ON2064 and ON2022. Each time the magnet M2061 operates, it interrupts its own circuit, at its contacts 2063, and thus advances the wiper 2062 an additional step. As soon as the wiper 2062 has been advanced step-by-step into engagement with its contact 10, the off-normal contacts ON2064 are opened to terminate the self-interrupting circuit for the magnet M2061 and the off-normal contacts ON2065 are opened in order to restore the relay R2020 to normal.

As noted above, the relay R2020 operates as soon as eighty blank spaces have been counted by the blank tape feedout counter 2050 and interrupts, at its contacts 2025 the locking circuit for the marginal relay R1970 which also restores to normal. The first thing that occurs as a result of the restoration of the relay R1970 is that, at its contacts 1971, it opens the pulsing circuit over which the pulses were transmitted to the counter 2050. Also, at its contacts 1972, it opens a point in initial operating circuit for the start relay R1910, but this relay remains in its operated position over the locking circuit including its upper winding. At its contacts 1973, the relay R1970 interrupts the circuit for the reperforator relay R1980. The relay R1980 now restores to normal and, at its contacts 1981, it applies ground potential by way of the resistor 1983 to the conductor C1402RPF in order to reoperate the perforate magnet M1411 and thereby stop the feed out of blank tape by the reperforator 1410. At its contacts 1974, the relay R1970 removes the busy marking ground potential from the conductor C1985BTL in order to render the multiple call storage unit 1400 selectable to store another multiple call having a "deferred" precedence. Also, at the contacts 1974, the circuit for the seizure relay R1950 is interrupted thereby to restore the latter relay. Finally, at its contacts 1976, it opens a point in the locking circuit for the relay R2020. The latter relay will restore either in response to the removal of ground at the contacts 1976 or in response to the restoration of the units switch and the tens switch of the counter 2050, whichever occurs last.

At least eighty blank spaces have now been placed in the tape 1413 between the end-of-message indicator of one message and a start-of-message indicator of a following message.

*Detecting a start of message indicator in the multiple call storage unit 1400*

It was pointed out previously that the slack condition of the tape 1413 caused the operation of the start relay R1910 provided the marginal relay R1970 was in its operated position. The operated condition of the start relay R1910 in turn completed the circuit for the tape reader clutch magnet M1425 in order to initiate the sensing operation of the tape reader 1420. The conductors C1401RA to RF, inclusive, are respectively connected to contacts on the tape reader 1420 that are controlled by sensing pins in accordance with the character perforations appearing in the tape 1413. Thus, the five conductors C1401RA to C1401RE, inclusive, will be grounded by the associated contacts of the tape reader in code combinations in the same order that the character perforations on the tape are fed through the tape reader 1420. These codes are illustrated in Fig. 89 of the drawings. The sixth conductor C1401RF is grounded by the associated contacts of the tape reader at the beginning of each operating or sensing cycle and ground is not removed from this conductor until the reading of each character (letter, number, space, carriage return, line feed, figure shift, letter shift, or blank) has been completed by the tape reader 1420. The six conductors C1401RA to C1401RF, inclusive, are connected respectively to the windings of the sensing relays R1510, R1520, R1530, R1540, R1550 and R1570 in the sensing unit 1501. The first five relays named above will be operated in accordance with the different code combinations and the last mentioned relay R1570 will be operated during the time the tape reader 1420 senses a character.

Each message received by the reperforator 1410 is provided with a start-of-message indicator (XZXZXZX) as previously noted. However, preceding this SOM, the tape is first perforated with five "space" characters followed by two "carriage return" characters and one "line feed" character. These perforations precede the message for the purpose of providing the necessary controls for operating a conventional page printer typewriter, but they perform no controls at this stage in the operation of the apparatus in the present relay switching center. In other words, the relays in the sensing unit 1501 will operate and restore in accordance with the cord perforations but they will perform no switching controls in the multiple call storage unit 1400 except that the relay R1560, at its contacts 1564, will control the character counter 2030 to count the number of characters (not blanks) sensed by the sensing unit 1501.

The next item of information appearing on the perforated tape 3413 is the start of message indicator comprising the seven characters XZXZXZX. The perforations indicative of the first character X sensed by the tape reader 1420 applies ground potential to the conductors C1401RA, RC, RD, and RE in order to operate the relays R1510, R1530, R1540 and R1550, respectively. Also, the conductor C1401RF is grounded in order to operate the relay R1570. The latter relay, at its contacts 1578, completes an operating circuit for the relay R1560 which includes ground at the contacts 1518, 1528, 1538, 1548 or 1558 of any one of the operated relays R1510 to R1550, inclusive. In other words, if any one of the five noted relays are operated at the time the relay R1570 operates, the relay R1560 will operate in order to complete, at its contacts 1567, a locking circuit for any one or more of the operated relays R1510 to R1550, inclusive.

In the present case the character X causes the operation of relays R1510, R1530, R1540 and R1550 and they in turn are locked under control of the contacts 1567 of the operated relay R1560. At this time a circuit is completed for operating the first counting relay R1590–1. This circuit includes battery, the winding of relay R1590–1, contacts 1594, 1587, the X conductor, contacts 1556, 1546, 1536, 1526, 1516 and 1576, to ground. Each time the X character is sensed by the sensing unit 1501, the relays therein are all operated to ground the above noted X conductor. As soon as the relay R1590–1 operates, it locks itself by way of its contacts 1591, the winding of the second counting relay R1590–2, contacts 1601, 1611, 1635, the Z hold conductor, contacts 1581 and the multiple contacts 1563 and 1573, to ground. The last-mentioned contacts, however, are not closed to complete this locking circuit until the relay R1570 is restored to normal.

At the end of the sensing of the first character X the tape reader 1420 will have completed its first cycle of operation and remove ground potential from the conductors C1401RA to C1401RF, inclusive. As a result thereof, the relay R1570 first restores to normal to interrupt, at its contacts 1578, the circuit for the relay R1560 and the latter relay, at its contacts 1567, interrupts the locking circuit for all of the operated ones of the relays R1510 to R1550, inclusive. As soon as the relay R1570 restores, as noted above, it completes, at its contacts 1573, the locking circuit for the first counting relay R1590–1 which includes the winding of the second counting relay R1590–2. Accordingly, the latter relay now operates, The relay R1590-2 upon operating, at its contacts 1595, prepares a circuit for operating the third counting relay R1590-3 provided the Z conductor is grounded in response to the sensing of a Z character by the sensing unit 1501. Also, at the contacts 1593, the relay R1590-2 prepares a point in the circuit for subsequently operating the fifth counting relay R1590-5 in response to the third character X.

The second SOM character is the character Z. When this character is sensed by the tape reader 1420, the relays R1510, R1550 and R1570 are operated and the latter relay causes the relay R1560 to operate and lock the relays R1510 and R1550 in their operated positions. Since the relays R1510 and R1550 are now operated, they maintain a ground potential on the Z hold conductor in order to retain the two counting relays R1590-1 and R1590-2 in their operated positions in spite of the fact that the contacts 1563 and 1574 have now been opened. This circuit for retaining the ground potential on the Z hold conductor includes the contacts 1581, 1551, 1541, 1531, 1521 and 1511 and ground at the multiply connected contacts 1518 and 1558. Also, at this time, the Z conductor is grounded in order to operate the third counting relay R1590-3. This circuit includes battery, winding of relay R1590-3, contacts 1604, 1595 and 1589, the Z conductor, contacts 1557, 1547, 1537, 1527, 1517 and 1576 to ground. The relay R1590-3, upon operating, prepares a point in a circuit for locking itself in series with the fourth counting relay R1590-4 by way of the contacts 1596, winding of relay R1590-4, contacts 1607, 1618 and 1636, the X hold conductor, contacts 1583 and in multiple contacts 1574 and 1565, to ground. This locking circuit, as previously noted, will become effective as soon as the relay R1570 restores at the end of the sensing of the second character Z. When this sensing cycle is completed, the relays R1510, R1550, R1560 and R1570 restore to normal, whereupon, the fourth counting relay R1590-4 is operated in series with the third counting relay R1590-3. Incident to the operation of the fourth counting relay R1590-4, at its contacts 1601 and 1602, it transfers the locking circuit for the first two counting relays R1590-1 and R1590-2 from the circuit including the previously noted Z hold conductor to a circuit including contacts 1607, 1618 and 1636 and the grounded X hold conductor. Accordingly, the first four counting relays R1590-1 to R1590-4 are now locked to the X hold conductor.

The sensing of the third character X, the fourth character Z, fifth character X, the sixth character Z and the seventh character X are each accomplished in substantially the same manner as has been described above. However, the fifth counting relay R1590-5 will operate at the beginning of the sensing of the third character X and the sixth counting relay R1590-6 will lock in series therewith at the end of the sensing of the third character. The fourth character Z will cause the operation of the seventh counting relay R1590-7 and at the end of the sensing of this character, the latter relay will lock in series with the eighth counting relay R1590-8. The fifth character X will cause the operation of the ninth counting relay R1590-9 and at the end of the sensing of this character, the latter relay will lock in series with the tenth counting relay R1590-10. The sixth character Z will cause the operation of the eleventh counting relay R1590-11 and at the end of the sensing of this character, the latter relay will lock itself in series with the twelfth counting relay R1590-12. At this point it should be noted that the latter relay locks itself in its operated position over a circuit including its lower winding, contacts 1631 and 1623, and ground. The seventh character X will now complete the operating circuit for the thirteenth counting relay R1590-13. This circuit may be traced from battery by way of the relay R1590-13, contacts 1628, 1649, 1581', 1624, 1617', 1609, 1604', 1593 and 1587, the X conductor, contacts 1556, 1546, 1536, 1526, 1516 and 1576, to ground. The relay R1590-13 upon operating, first closes its X contacts 1638 thereby to lock itself in its operated position over a circuit including its winding, contacts 1647, 1638 and 1587, to the ground at X conductor. This circuit is independent of all of the various contacts of the other operated counting relays. At the end of the sensing of the seventh character X, the relay R1590-13 locks itself in series with the relay R1590-14 over a circuit including contacts 1637, the winding of relay R1590-14, contacts 1866 and 1885 to ground. Relay R1590-14 also operates over this series circuit.

As a further result of the operation of relay R1590-13, at its contacts 1636, it interrupts a point in the locking circuit for the counting relays R1590-1 to R1590-12, inclusive. However, the counting relay R1590-12 will be retained operated over the locking circuit including its lower winding until the counting relay R1590-10 restores and opens its contacts 1623.

From the foregoing it will be appreciated that the start-of-message indicator XZXZXZX will cause the fourteen counting relays to operate in pairs provided the seven characters are sensed in the exact order named and it is the operation of the fourteenth counting relay R1590-14 that indicates the characters of the SOM have been detected and registered in the proper sequence.

At this point it should be noted that the thirteenth counting relay R1590-13 operates before the fourteenth counting relay R1590-14.

Consequently, at its contacts 1634, the relay R1590-13 completes a circuit which may be traced from ground, contacts 1885, 1866, 1634 and 1639, and the upper winding of the relay R2010, to battery, in order to operate the last mentioned relay. The only function that relay R2010 has, if it is operated at this time under control of the thirteenth counting relay R1590-13, is to cause the tens and units switches of the character counter 2030 to restore to their normal positions as will be explained hereinafter. The relay R2010 is also controllable from the character counter 2030 in the event that 72 characters have been counted before the thirteenth counting relay R1590-13 is operated. When this condition exists, certain alarms are transmitted to indicate that a start-of-message indicator was not detected and registered before the completion of the counting of 75 characters sensed by the tape reader 1420.

Figure 15:
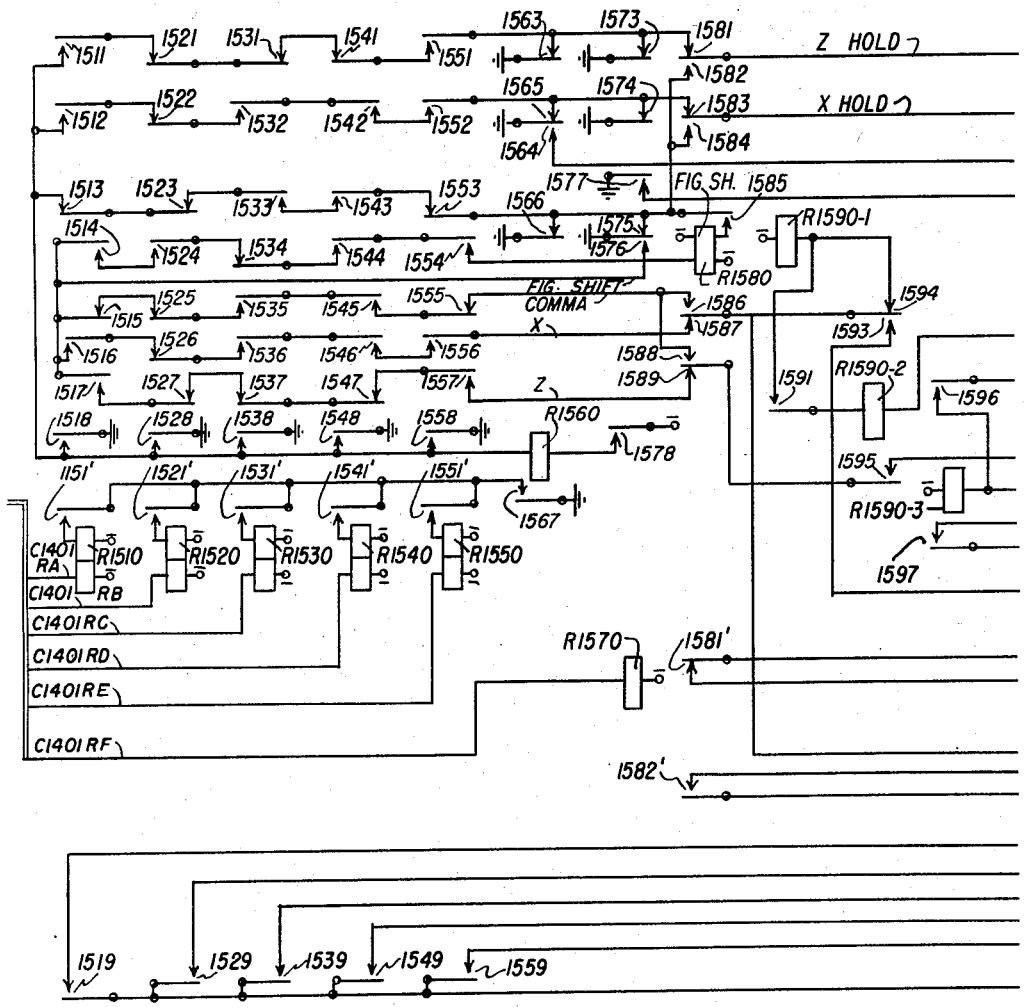
Figure 16:
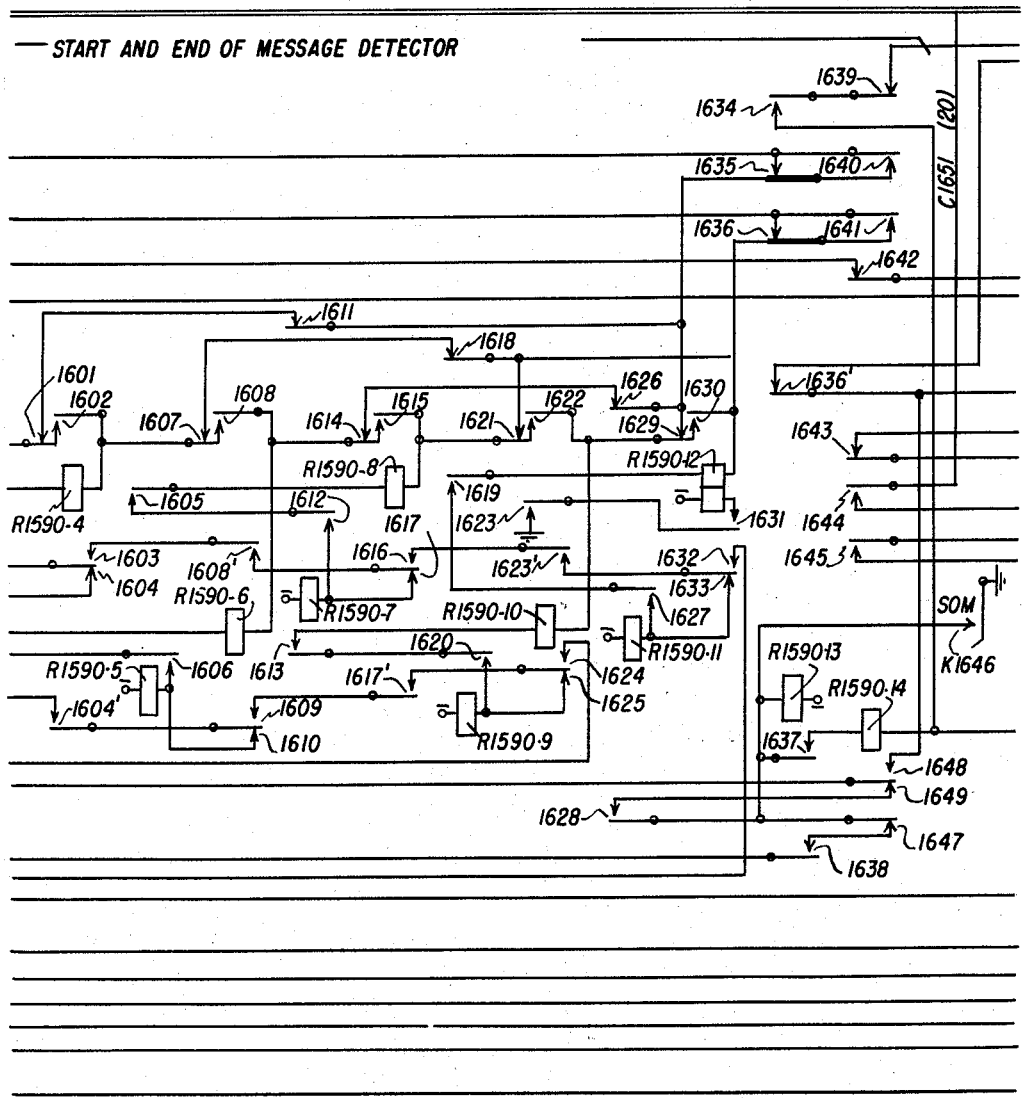

Before describing the operations of the character counter 2030 and the controls performed by the relay R2010, it will be recalled that the fourteenth counting relay R1590-14 operated shortly following the operation of the thirteenth counting relay R1590-13. The relay R1590-14 upon operating, at its contacts 1643, interrupts a point in the previously described circuit including the conductor C1402TRC in order to restore the clutch magnet M1425 to normal and thus terminate further sensing of the tape by the tape reader 1420. In other words, the sensing operation of the tape reader 1420 is stopped as soon as the start-of-message indicator has been successfully detected and registered in the start and end of message detector (Figs. 15 and 16).

As a further result of the operation of relay R1590-14, at its contacts 1644, it completes a circuit for operating the call common equipment relay R1870 provided a tight tape condition exists between the tape reader 1420 and the transmitter 1430. In other words, the common equipment necessary for handling the multiple call stored in the multiple call storage unit 1400 is called into use by the operation of relay R1870 and the latter relay does not operate until the SOM indicator has been properly detected and registered and a tight tape condition exists at the tape switch 1432 between the tape reader 1420 and the transmitter 1430.

Finally, at the contacts 1645, the relay R1590-14 completes a point in the incomplete circuit of the tape feed-out relay R1930. This circuit, however, is only completed in the event that a tight tape condition should be encountered by the tape switch 1427 between the reperforator 1410 and the tape reader 1420.

In this connection it should be noted that the physical distance between perforating mechanism of the typing reperforator 1410 and the sensing pins of the tape reader 1420, as measured on a tight tape, is approximately 83 character spacings, and that the physical distance between the sensing pins on the tape reader 1420 and the sensing pins on the transmitter 1430, as measured on a tight tape, is approximately 66 characters.

In the above description it was pointed out that the tape reader clutch magnet M1425 was actuated under control of the contacts 1422 on the tape switch 1427, as soon as the start relay R1910 operated and the tape 1413 was in a slack condition. It was also noted that the tape reader 1420 sensed certain preliminary characters preceding a start of message indicator and then sensed the seven characters of a start of message indicator. This created a slack tape condition between the tape reader 1420 and the transmitter 1430. As a result of the last mentioned slack tape condition, the tape switch 1432 closed its contacts 1434 and thereby completed a circuit including the conductor C1402TDS extending to Fig. 17, contacts 1713, conductor C1402TDC extending to Fig. 14, and the winding of the clutch magnet M1427 of the transmitter 1430, to battery. The magnet M1427 now operates to feed the tape between the transmitter and the tape reader until a tight tape condition is again created. In other words, a tight tape condition is maintained between the tape reader 1420 and the transmitter 1430 during the time that a message is being processed my the common equipment in the manner described hereinafter. As soon as this tight tape condition is created, following the operation of the fourteenth counting relay, a circuit is completed which may be traced from ground at the tight tape contacts 1433 on the tape switch 1432, conductor C1402TDT extending to Fig. 20, conductor C1651 extending to Fig. 16, contacts 1644, and the lower winding of the call common equipment relay R1870, to battery. The relay R1870 operates and, at its contacts 1871, completes a locking circuit for itself including its upper winding and the contacts 1884.

The control exercised by the operation of the call common equipment relay R1870 will be given after the description of the operation of the character counter 2030.

*Operation of the character counter 2030*

In the previous description of the operation of the relays in the sensing unit 1501 of the multiple call storage unit 1400, it was pointed out that the relay R1560 operated whenever one or more of the five relays R1510 to R1550, inclusive, operated in sensing a character perforated on the tape 1413. A blank space appearing on the tape is the only character that fails to operate any one of the five relays noted. Each time the relay R1560 operates it completes, at its contacts 1564, a circuit including contacts 1642 (assuming that an SOM has not, as yet, been detected) for operating the magnet M2031 of the unit switch in the character counter 2030. It is apparent that the magnet M2031 will operate and restore each time any character, except a "blank," is sensed by the sensing unit 1501. Each time the magnet M2031 operates and restores it advances its wipers 2033 and 2034 one step in a counter-clockwise direction. After nine characters have been counted, the wiper 2033 will be in engagement with the contact 9, whereby, the operating circuit for the magnet M2031, in response to the tenth pulse, is extended by way of the wiper 2033, the engaged contact 9, contacts 2011 and the winding of the tens switch magnet M2041, to battery. The two magnets will now operate in series and at the end of the tenth pulse or character, the magnets restore to normal, whereby, the units switch magnet M2031 advances its wipers back into engagement with the tenth contacts and the tens switch magnet M2041 advances its wiper 2042 one step in a counter-clockwise direction into engagement with the contact 1. Thus, it will be seen that the tens switch magnet M2041 will advance its wiper once for every ten steps of the wipers 2033 and 2034 of the units switch. At the end of the counting of 72 pulses or characters, the wipers 2033 and 2034 will be in engagement with the contacts 2 and the wiper 2042 will be in engagement with the contact 7 to complete a circuit for operating the relay R2010. Normally, the SOM indicator will be detected and registered by the operation of the counting relay R1590–14 before 72 characters have been counted by the tens and units switches of the character counter 2030. As previously noted, the relay R1590–13, at its contacts 1634, will complete the previously traced circuit operating the relay R2010. If the latter relay is operated before 72 characters have been counted by the character counter 2030, a self-interrupting circuit will be completed for the units switch magnet M2031 and the tens switch magnet M2041. The character counter 2030 is substantially the same as the blank tape feed out counter 2050. Accordingly, it will be understood that the off-normal contacts ON2035 and ON2036 are closed whenever the wipers 2033 and 2034 are not standing in engagement with the contacts 10 in the associated contact banks. Also, the off-normal contacts ON2044 and ON2045 are closed whenever the wiper 2042 of the tens switch is not standing in engagement with the contact 10. Therefore, when the relay R2010 operates and closes its contacts 2015, a self-interrupting circuit is completed for the magnet M2031 which includes the winding of the magnet, contacts 2015, ON2036 and 2037. The magnet operates when this circuit is completed and interrupts its own circuit, at its contacts 2037, to advance its wipers an additional step in the counter-clockwise direction. As long as the contact ON2036 remains closed the above mentioned self-interrupting circuit is retained. During this period, the off-normal contacts ON2035 retain the relay R2010 in its operated position over a locking circuit including its contacts 2017. When the wipers 2033 and 2034 engage the contacts 10 in the associated contact banks, the off-normal contacts ON2036 are opened to interrupt the self-interrupting circuit for the magnet M2031 and one point in the locking circuit for relay R2010 is interrupted at the contacts ON2035. The self-interrupting circuit for restoring the wiper 2042 of the tens switch is substantially the same as the circuit for the units switch and includes the winding of the magnet M2041, contacts 2012, ON2044 and 2043. Accordingly, the magnet M2041 is self-interruptedly operated until the wiper 2042 again engages the contact 10, whereupon, the off-normal contacts ON2044 are opened to terminate the rotary stepping and the off-normal contacts ON2045 are opened to restore the relay R2010 to normal.

In view of the foregoing it will be understood that the relay R2010 merely performs the function of controlling the restoration of the two switches of the character counter 2030 if an SOM is detected and registered prior to the counting of 72 characters by the counter 2030. If on the other hand, the character counter 2030 counts 72 characters before the relay R2010 is operated by the detection of an SOM, the circuit including ground at contacts 7 of the tens switch, wiper 2042 and 2034, the contacts 2 engaged thereby and the upper winding of the relay R2010 and battery, is completed. The relay R2010 operates and locks itself by way of its contacts 2017 to ground at the off-normal contacts ON2035 and ON2045. At this time, however, the relay R2010 completes, at its contacts 2013, a circuit including contacts 1861, 1636' (relay R1590–13 has failed to operate before 72 characters have been counted) for operating the sequence relay R1890. The relay R1890 in turn, at its contacts 1891, locks itself in its operated position to ground at the alarm release key K1894. As a further result of the operation of relay R1890, at its contacts 1892, it interrupts a point in the previously traced circuit including the conductor C1402TRC extending to Fig. 14 in order to terminate further sensing operation of the tape reader 1420. As a further result of the operation of the sequence relay R1890, at its contacts 1893, it illuminates the sequence lamp L1895 to indicate to the exchange attendant that a fault has occurred in the start-of-message indicator. The attendant or operator in the exchange in responding to the alarm signal can determine by reading the tape 1413 that a mutilated or improper SOM has been received. A repairman may then be notified that improper perforations are being made by the reperforator or that some other fault has caused the improper perforations. If the message can be successfully transmitted without the proper start-of-message indicator, the alarm release key K1894 may be momentarily actuated by the exchange attendant in order to release sequence relay R1890. The relay R1890 upon restoring, at its contacts 1892, recloses the circuit including the conductor C1402TRC thereby to control the clutch magnet M1425 of the tape reader 1420. This will cause the tape reader to continue sensing the tape. Also, at its contacts 1893, the relay R1890 extinguishes the sequence alarm lamp L1895.

In addition to the foregoing, the exchange attendant must also momentarily actuate the SOM key K1646 (Fig. 16) to complete the circuit for the thirteenth counting relay R1590–13. Upon the release of the key K1646, the fourteenth counting relay R1590–14 will operate in series with the thirteenth counting relay in the manner previously described. Thus, it will be seen that the momentary actuation of the key K1646 will control the last two counting relays to simulate the correct reading of a start-of-message indicator and will thereby permit the multiple call storage unit 1400 to continue to handle the message in a normal manner.

In the previous description it was pointed out that the relay R2010 operated as a result of the counting of 72 characters by the character counter 2030. Since the units switch and tens switch of this counter are in an off-normal position, the operation of the relay R2010, in addition to controlling the alarm circuit, at its contacts 2013, also completes, at its contacts 2012 and 2015, circuits for restoring the tens and units switches of the character counter 2030 to their normal positions. The circuit for restoring the units switch includes battery, winding of the magnet M2031, contacts 2015, ON2036 and 2037, and ground. The magnet M2031 is self-interruptedly operated over this circuit until its wipers 2033 and 2034 return to the contacts 10 at which time the off-normal contacts ON2036 are open to interrupt the self-interrupting circuit. When the wipers 2033 and 2034 engage the contacts 10, the off-normal contacts ON2035 are also opened to interrupt one of the points in the multiple locking circuit for the upper winding of the relay R2010.

The self-interrupting circuit for the magnet M2041 of the tens switch includes battery, the winding of magnet M2041, contacts 2012, ON2044, and 2043 and ground. Consequently, the wiper 2042 is advanced step-by-step each time the magnet M2041 is operated and restored until the wiper engages the contact 10. When this contact position is reached, the off-normal contacts ON2044 are opened to terminate the self-interrupting circuit for the magnet M2041 and the off-normal contacts ON2045 are opened to interrupt the last point in the multiple locking circuit for the relay R2010, which now restores to normal.

Attention is directed to the fact that when the relay R2010 initially operates in response to the counting of 72 characters by the character counter 2030, it controls the alarm circuit, at its contacts 2013, and it simultaneously completes the two above described self-interrupting circuits for the magnets M2041 and M2031 of the tens and units switches of the counter 2030. Normally, the relay R2010, will be restored to normal before the attendant has had an opportunity to respond to the alarm signal.

*Multiple call storage unit 1400 calls for the multiple call common equipment*

In the previous description it was pointed out that when a start-of-message indicator is detected and registered, in the multiple call storage unit 1400, the thirteenth and fourteenth counting relays R1590–13 and R1590–14 operate and that, at the contacts 1644, a circuit was completed for operating the call common equipment relay R1870. It was also pointed out that, at the contacts 1643, the fourteenth counting relay R1590–14 opened a point in the circuit including the conductor C1402TRC in order to restore the clutch magnet M1425 of the tape reader 1420 and thereby to terminate further reading of the tape by the latter mechanism.

Referring now to the relay R1870 it will be seen that, at its contacts 1871, it completes a locking circuit for its upper winding which includes the contacts 1884. As a further result of the operation of the relay R1870, at its contacts 1873, it connects ground potential by way of the windings of the relay R1710 and R1720, contacts 1822 and 1873 to the wiper 2006 of the precedence register 2001. Also, at its contacts 1874, the relay R1870 connects direct ground potential to the wiper 2007 of the precedence register 2001 and to illuminate the process lamp L1896 to indicate that the multiple call storage unit 1400 is processing a multiple call message stored therein. Finally, at its contacts 1872, the relay R1870, opens an additional point in the restoring circuit for the magnet M2002.

It will be recalled that the precedence register 2001 has been selectively positioned into engagement with contacts in the associated banks corresponding to the precedence of the message which is being analyzed by the multiple call storage unit 1400. In the present example, it has been assumed that a "deferred" precedence message is being analyzed. Consequently, the wipers 2004 to 2007, inclusive, are in engagement with the contacts 1 in the associated contact banks. The wipers will be in engagement with contacts 2 if a "routine" message is being analyzed; the wipers will be in engagement with the contacts 3 if a "priority" message is being analyzed; the wipers will be in engagement with the contacts 4 if an "operational immediate" message is being analyzed; the wipers will be in engagement with the contacts 5 if an "emergency" message is being analyzed; and the wipers will be in engagement with the contacts 6 if a "flash" message is being analyzed. With the wiper 2004 in engagement with contacts 4, 5 or 6 the high precedence lamp L2003 will be illuminated to indicate a high precedence message.

In view of the foregoing, it will be seen that the ground potential through the windings of the relays R1710 and R1720 will now be extended by way of the wiper 2006 to the conductor C1986NR and the ground potential applied to the wiper 2007 will be extended by way of the conductor C1986NR–C whenever a "deferred" or a "routine" message is being analyzed. The conductors C1986NR and C1986NR–C extend to the precedence control unit 900 illustrated in Fig. 9. It should be noted that the other conductors accessible to the wipers 2006 and 2007 also extend to the precedence control unit 900 of Fig. 9.

Referring to Fig. 9, it will be seen that the multiple call storage unit finder 901 has access by way of its wiper 904 to 908, inclusive, to a plurality of multiple call storage units, such as the unit 1400 illustrated in Figs. 14 to 20, inclusive. The multiple call storage unit finder 901 functions as an allotter between the common equipment and the different storage units. It should also be noted that the five conductors C1906NR–C, P–C, OP–C, EM–C and FL–C are multiply connected to all of the multiple call storage units and including the multiple call storage unit 1400.

The direct ground potential applied to the conductor C1986NR-C (Fig. 9) from the multiple call storage unit 1400 is extended by way of the contacts 972, 963, 955 and 948 and the right-hand winding of the relay R940NR, to battery. If the wipers 904 to 908, inclusive, of the finder 901 are in engagement with the contacts 1, as illustrated, the ground potential applied to the conductor C1986NR through the winding of the relays R1710 and R1720 of the multiple call storage unit 1400 will be extended by way of the wiper 904, contacts 941 of the now operated relay R940NR, windings of relays R930 and R910, respectively, to battery. The relay R930 operates and, at its contacts 931, completes a locking circuit including the contacts 942 and the left-hand winding of the relay R940NR to retain the latter relay operated. Also, the relay R910 operates over the above noted circuit and opens its contacts 911 to prevent the magnet M902 of the finder 901 from advancing the above noted wipers. Thus, no rotary stepping of the wipers 904 to 908, inclusive, is necessary if the wipers happen to be standing on the contact terminating the conductors of the multiple call unit that requires use of the common equipment.

However, if the wipers of the finder 901 are standing in engagement with some other contact at the time the relay R940NR operates, it is necessary to control the finder 901 to find the particular calling multiple call storage unit 1400. This is accomplished by controlling the miscellaneous control unit 1000 of Figs. 10 to 13, inclusive, to connect with one of a plurality of precedence control units, such as the unit 900 of Fig. 9. As soon as the relay R940NR operates it closes its contacts 944 in order to complete a circuit including the contacts 1043, 1044, 1045 and 1039 for operating the relay R1020NM. The latter relay upon operating, at its contacts 1025, completes a circuit for operating the magnet M1002 of the precedence control circuit allotter 1001. This circuit may be traced from battery by way of the winding of the magnet M1002, contacts 1011, 1025, 1111 and 1131 to ground potential at the busy key (part of the busy key shown in Fig. 69). The magnet M1002 operates over this circuit and, at its contacts 1003, connects the ground potential at the busy key to the winding of the relay R1010. The relay R1010 operates and, at its contacts 1011, interrupts the circuit of the magnet M1002 which now restores to normal and opens the circuit, at its contacts 1003, of the relay R1010 which also restores to normal to complete, at its contacts 1011, the circuit for again operating the magnet M1002. This interaction between the magnet M1002 and the interrupter 2 relay R1010 continues until the wipers 1004 to 1008, inclusive, encounter the bank contacts terminating the conductors extending to the precedence control unit 900 (Fig. 9).

When this occurs, the relay R1010 is held in its operated position over a circuit which may be traced from battery by way of the winding of the relay R1010, contacts 1142, winding of the interrupter relay 1 relay R1050, contacts 1030, wiper 1004 in engagement with the contact 1, contacts 945 of the operated relay R940NR and the winding of the start relay R920, to ground. The start relay R920 and the interrupter 1 relay R1050 operate over this circuit and the interrupter 2 relay R1010 is retained in its operated position, the latter relay preventing the magnet M1002 from further advancing the wipers 1004 to 1008, inclusive. As soon as the interrupter 1 relay R1050 operates, it completes a locking circuit, including the contacts 1051 and 1035 for the upper winding of the relay R1020NM.

As soon as the start relay R920 operates in series with the relay R1050 it completes, at its contacts 921, a circuit including contacts 943 and 911 for operating the magnet M902. The magnet M902 in turn, at its contacts 903, completes a circuit for operating the interrupter relay R910, and the latter relay, at its contacts 911, interrupts the circuit of the magnet M902. The latter magnet now restores to normal and interrupts, at its contacts 903, the circuit for the relay R910 which also restores to normal. The interaction between the magnet M902 and the interrupter relay R910 continues until the wipers 904 to 908, inclusive, engage the contacts in the associated contact bank terminating the conductors of the calling multiple call storage unit 1400. As previously noted, the ground potential on the conductor C1986NR when engaged by the wiper 904 is extended by way of the winding of the hold relay R930 and the winding of the interrupter relay R910, to battery. The relay R930, at its contacts 931, completes the locking circuit including the contacts 942 for the left-hand winding of relay R940NR. The relay R910 is now held in its operated position and prevents the magnet M902 from advancing the wipers 904 to 908, inclusive, an additional step.

From the foregoing, it will be understood that if the wipers of the finder 901 do not engage the calling multiple call storage unit 1400, the precedence control unit 900 will, in turn, control the miscellaneous control unit 1000 so that the precedence control circuit allotter 1000 will be operated to find the particular calling precedence control unit 900. It also will be understood that when the allotter 1000 finds the precedence control unit 900, the magnet M902 of the finder 901 will advance its wipers until it finds the calling multiple call storage unit 1400. When the latter circuit is found, the control relays R1710 and R1720 in the multiple call unit 1400 will operate in series with the hold relay R930 and the interrupter relay R910 in the precedence control unit 900. These relays in operating will connect the multiple call storage unit 1400 to the common multiple call equipment in the manner to be described hereinafter.

From the foregoing description of the operation of the precedence control unit 900 and the allotter 1001, it was assumed that the multiple call storage unit 1400 having the "deferred" precedence registered therein required connection with the common equipment. It was also assumed that the precedence control unit 900 was available for controlling the calling multiple call unit 1400. However, inasmuch as the precedence control unit 900 has access to at least ten different multiple call units, it may be simultaneously controlled from several calling multiple call storage units. Thus, the calling multiple call unit 1400 applies direct ground potential to the conductor C1986NR-C to operate the relay R940NR due to the fact that a "deferred" or a "routine" message has been stored in the storage unit 1400. If another multiple call unit with a higher precedence message therein grounds any one of the conductors C1986P-C, C1986-OP-C, C1986EM-C or C1986FL-C, the corresponding relays in the precedence control unit 900 will operate. The operating circuits for the respective relays R940NR, R940P, R940-OP and R940E are carried through the break contacts 972, 971, 970 and 969, respectively, of the relay R940F. The last mentioned relay is representative of the highest precedence class which is "flash." Each of the remaining relays are provided with similar contacts which are arranged to interrupt the circuits for each of the relays named in the decreasing order of the importance of the different classes of precedence. Thus, the relay R940NR will restore to normal if any one of the higher class relays are operated; the relay R940P will be restored to normal if any of the higher classes of relays are operated; the relay R940-OP will restore to normal if either the relay R940E or R940F is operated; and finally, the relay R940E will restore to normal if the "flash" relay R940F is operated. Each of the five relays noted above control circuits similar to the circuits controlled by the relay R940NR and will control the precedence unit 900 to connect with the calling multiple call storage unit that has the highest class of call registered therein so that a high precedence multiple call will be processed before a lower precedence multiple call. However, if a low class call is locked into the precedence control unit 900 before one of the higher class precedence relays R940, etc., is operated, the common equipment will be utilized until the message of the locked-in precedence is completely processed and retransmitted.

The miscellaneous control unit 1000 is provided with relays R1020NM, P, OP, EM and FL which correspond respectively to the relays R940NR, P, OP, E and F. Each of the relays R1020, etc., are controllable in substantially the same manner as the relays in the precedence control unit 900 to permit a higher class precedence message to take control of the unit if two calling multiple call storage units having two different precedences simultaneously seize the unit 900.

*Processing the message stored in the multiple call storage unit 1400*

As soon as the precedence control unit 900 finds and connects with the multiple call storage unit 1400, the relays R1710 and R1720 therein are operated in series with the relays R930 and R910 and the precedence control unit 900. These relays are provided to connect the storage unit 1400 to the common equipment and to again start the tape reader 1420.

Referring to relay R1710, it will be seen that as soon as this relay operates it interrupts, at its contacts 1713, the previously traced circuit including the conductors C1402TDS and C1402TDC in order to restore the clutch magnet M1427 of the transmitter 1430 to normal. This will prevent the transmitter from operating even though a slack tape condition may subsequently be introduced between the tape reader 1420 and the transmitter 1430.

As a further result of the operation of relay R1710, at its contacts 1714LA, LB, LC, LD and LE, it connects the conductors C1716LA to LE, inclusive, to the respective contacts 1519, 1529, 1539, 1549 and 1559 on the relays in the sensing unit 1501. The conductors C1716LA to C1716LE, inclusive, extend to the address detector 3300 in Figs. 33 to 36, inclusive. It may be well to mention at this time as the contacts 1519, 1529, 1539, 1549 and 1559 are closed by the operation of the corresponding relays in the sensing unit 1501 as the tape reader 1420 senses the perforated tape 1413, the conductors C1716LA to C1716LE, inclusive, will be marked in corresponding code combinations in order to transfer information detected by the sensing unit 1501 to the address detector 3300. This operation will be described subsequently.

Figure 11:
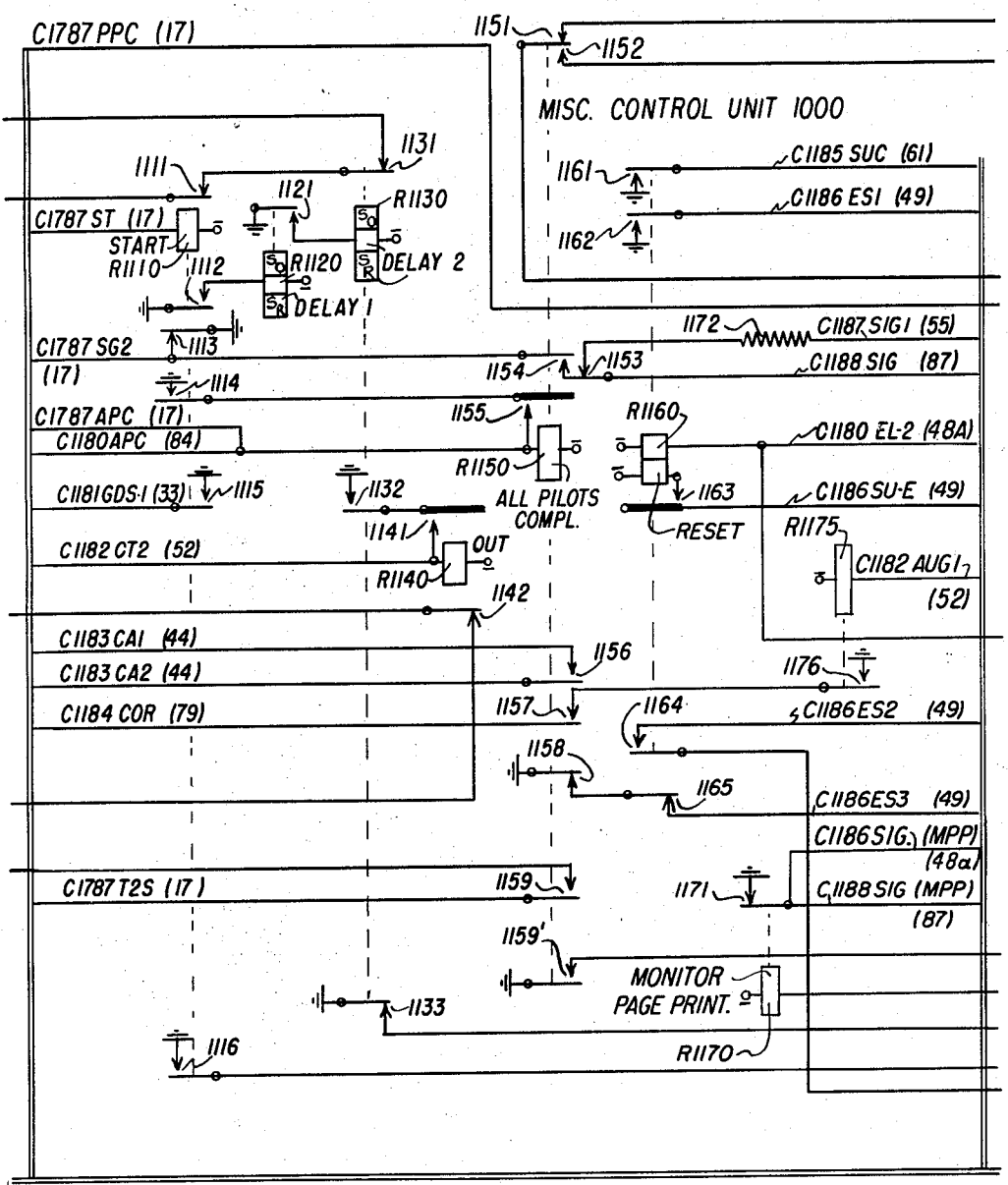

When the relay R1720 in the multiple call storage unit 1400 operates, as previously noted, at its contacts 1722, it applies ground potential to the conductor C1787ST extending to Fig. 11 in order to operate the start relay R1110 in the miscellaneous control unit 1000. As soon as the start relay R1110 operates its interrupts, at its contacts 1111, a further point in the circuit for the magnet M1002 of the allotter 1001. Also, at its contacts 1112, the relay R1110 completes a circuit for the delay 1 relay R1120. The relay R1120 operates and completes, at its contacts 1121, an obvious circuit for operating the delay 2 relay R1130. The latter relay, at its contacts 1131, opens a further point in the circuit for the magnet M1002; at its contacts 1132, it completes a point in an incomplete locking circuit for the cut relay R1140; and, at its contacts 1133, it interrupts the energizing circuit for the printer count over relay R1230. The last mentioned relay is normally in its operated position and upon seizure of the miscellaneous control unit 1000 restores to normal in order to interrupt, at its various contacts 1231 to 1237, inclusive, points in the restoring circuits for the character counters 1201 and 1251. As a further result of the restoration of the relay R1230, at its contacts 1239, it prepares a point in the incomplete circuit for the monitor page printer control relay R1170.

The relays R1120 and R1130 are of the slow-to-operate and slow-to-release type and provide a delay condition which is utilized during the release of the apparatus. Also, at its contacts 1113, the start relay R1110 removes the ground potential from the conductor C1787SG-2 extending to Fig. 17 for the purpose to be described hereinafter. At its contacts 1114, the relay R1110 prepares a point in a circuit for subsequently locking the all-pilots-complete relay R1150 in its operated position and, at its contacts 1116, it completes the circuit including the contacts 1239 for operating the monitor page printer control relay R1170. At its contacts 1171, the relay R1170 removes ground potential from the conductor C1188SIG (MPP) extending to Fig. 87 thereby to render the monitor page printer 8750 operable under control of the relay R8720-4, and it removes ground potential from the conductor C1186SIG (MPP) extending to Fig. 48A. Also, at its contacts 1116, the relay R1110 completes a circuit including contacts 1384 for operating the delay relay R1370. Finally, at its contacts 1115, the start relay R1110 applies ground potential to the conductor C1181GDS-1 extending to Fig. 33 in order to operate the connect relay R3310 in the address detector 3300.

Figure 32:
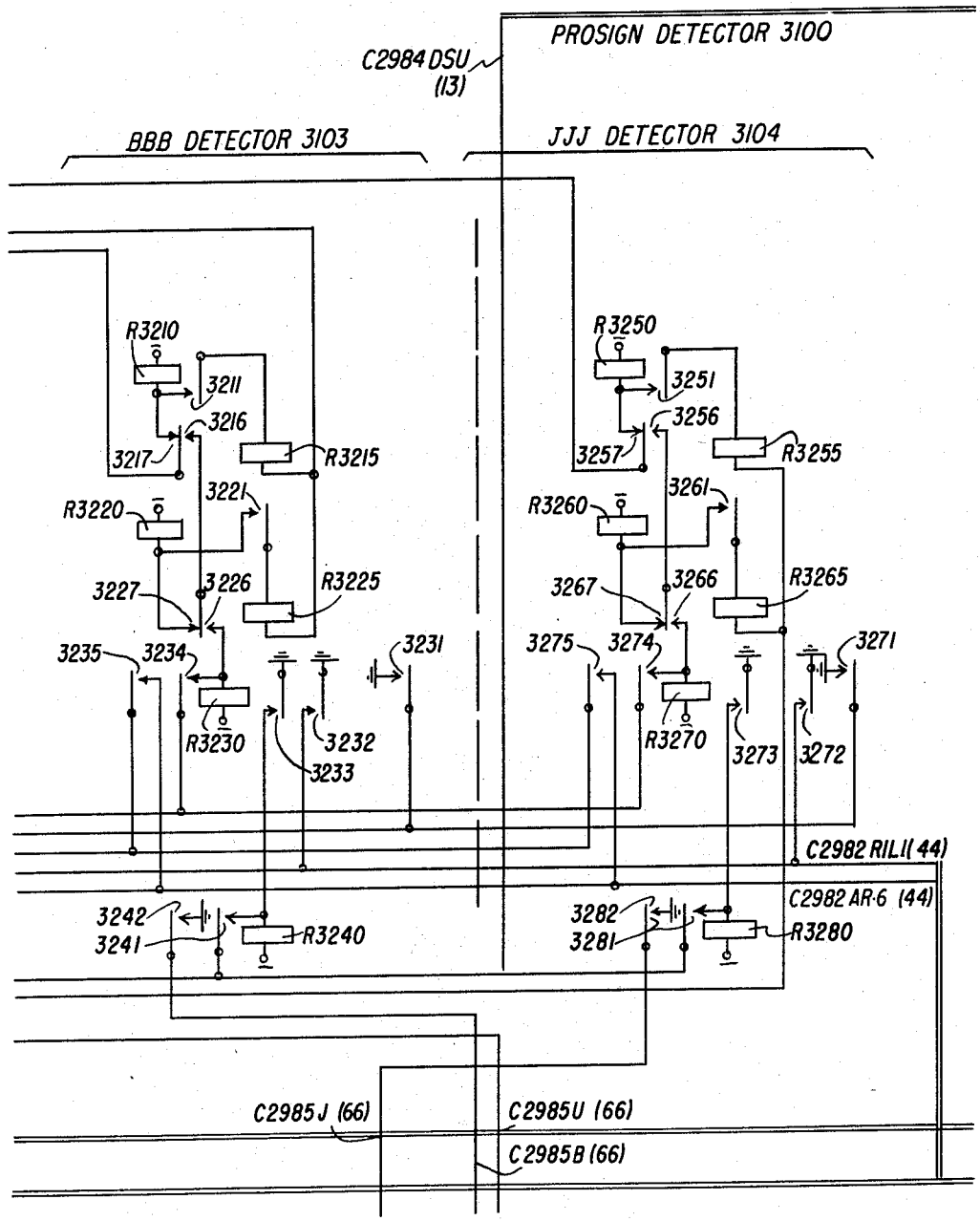
Figure 33:
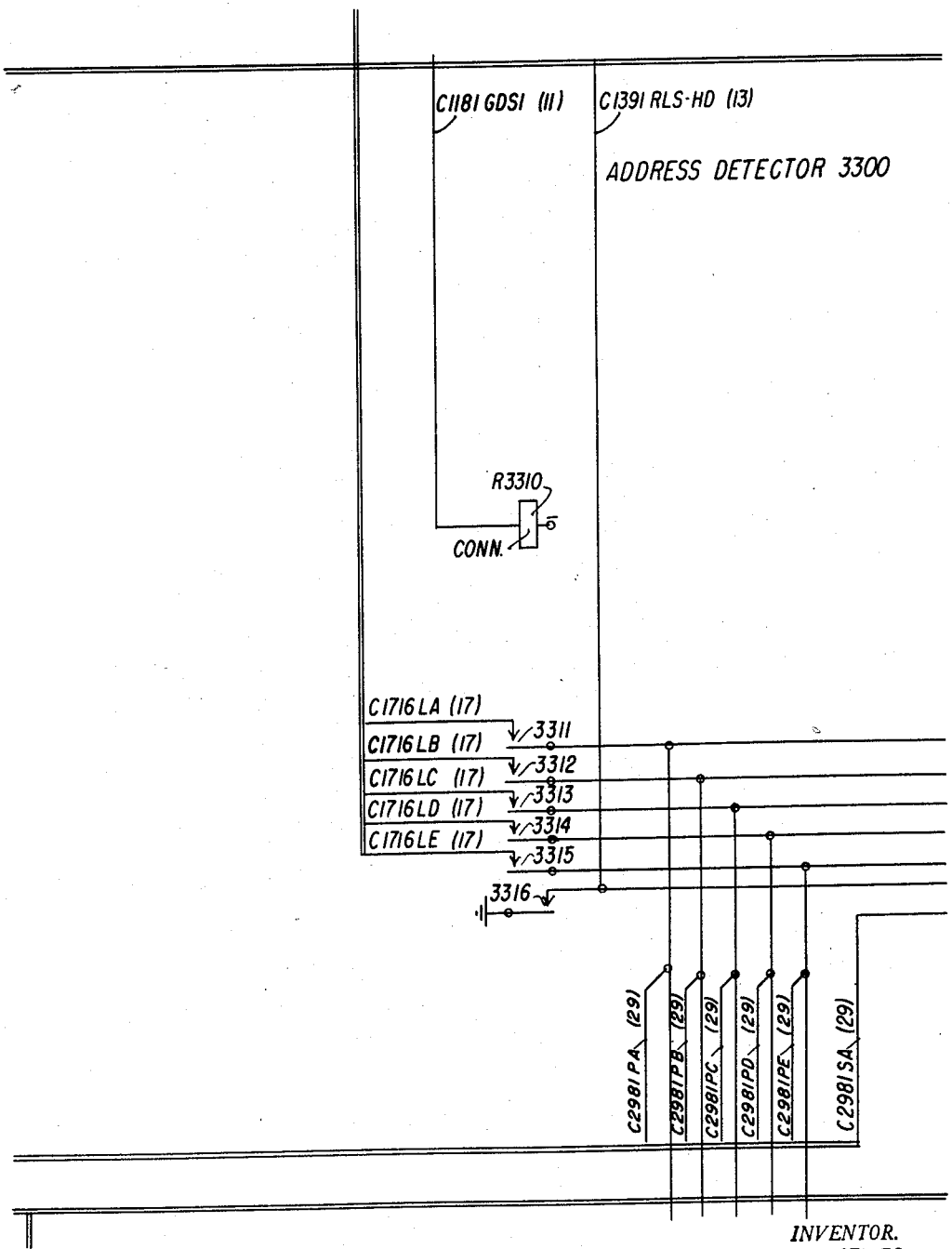

Referring now to Fig. 33 it will be seen that the relay R3310, at its contacts 3311 to 3315, inclusive, further extend the conductors C1716LA to C1716LE, inclusive, from the multiple call storage unit 1400 to the contacts on the address connect relay R3410; to the prosign sensing unit 2901 of the prosign detector 2900 illustrated in Figs. 29 to 32, inclusive; and to the precedence sensing unit 6700 illustrated in Figs. 67 to 70, inclusive.

As a further result of the operation of the connect relay R3310, it completes a circuit including its contacts 3316 and the contacts 3681 for operating the release relay R3690 in the address detector 3300. The relay R3690 upon operating, at its various contacts, applies ground potential to various seal-up (locking) conductors.

Figure 13:
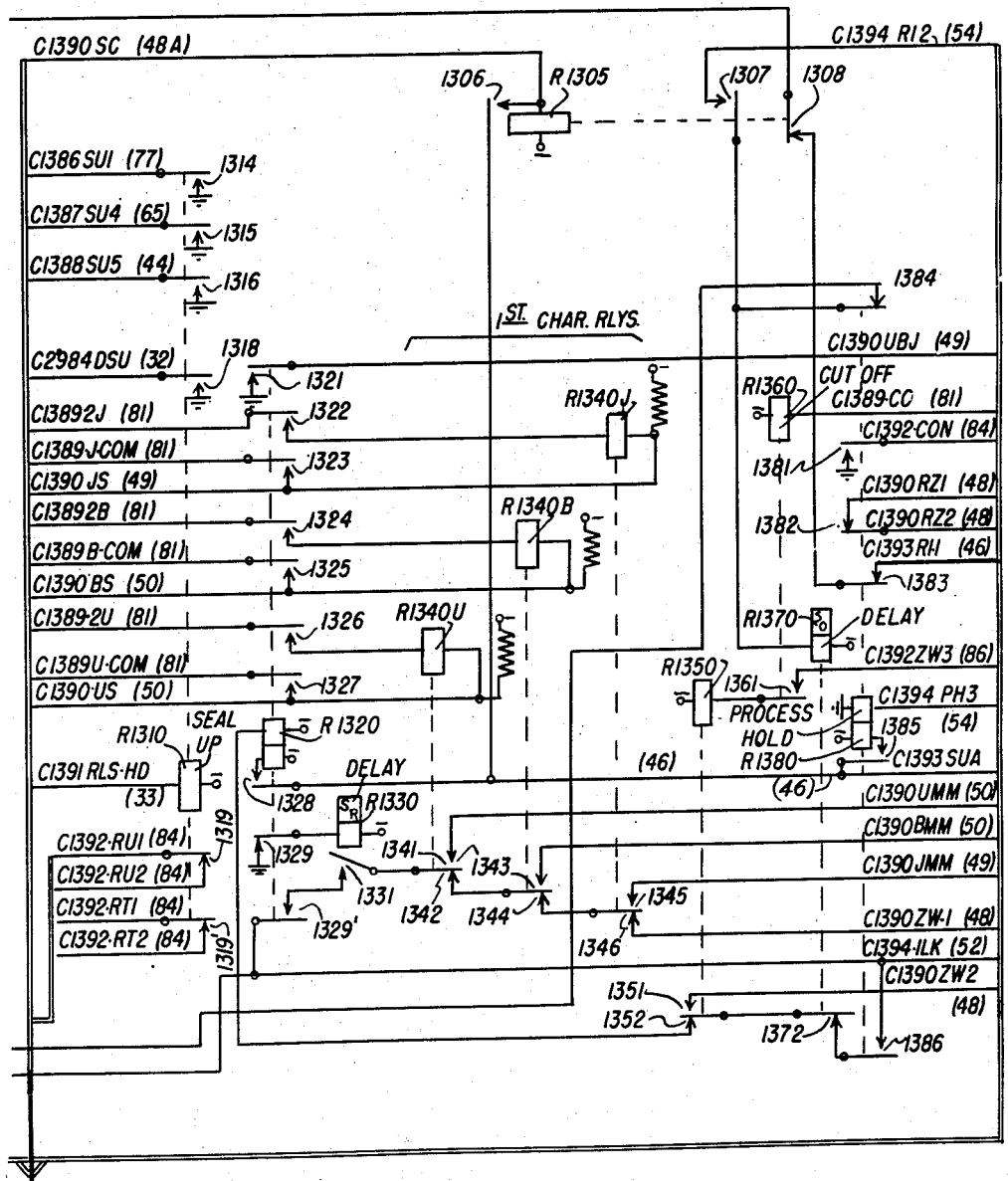

As a further result of the operation of relay R3310, at its contacts 3316, it also applies ground potential to the conductor C1391RLS-HD extending to Fig. 13 in order to operate the seal-up relay R1310. The latter relay, at its various contacts, provides ground potential to various seal-up (locking) conductors.

At the present time the multiple call storage unit 1400 is connected to the precedence sensing unit 6700; the prosign detector 2900; and the address detector 3300 in the common equipment so that a detection and registration may be made of the precedence of the message to be handled by the multiple call equipment; of the prosign of the message, if one is provided and of the routing indicators or addresses of the multiple call message. Accordingly, it is now essential that the tape reader 1420 be restarted to sense the next item of information appearing on the perforated tape.

In order to restart the tape reader 1420, the control relay R1720 upon operating in the manner previously described completes, at its contacts 1724 and 1725, a circuit including the sequence control unit 4100 (Figs. 41 to 44, inclusive) for operating the clutch magnet of the tape reader 1420 and thus restart the reading operation. This circuit may be traced from battery through the winding of the clutch magnet M1425 (Fig. 14) conductor C1402TRC extending to Fig. 18, contacts 1892, contacts 1864 and 2018 in multiple, contacts 1882, 1782 and 1724, conductor C1788C1 extending to Fig. 44, contacts 4411, 4462, 4473 and 4416, conductor C1788C2 extending to Fig. 17, contacts 1725 and 1914, conductor C1402TRS extending to Fig. 14, and the contacts 1422 to ground on the tape switch 1427 of the tape reader 1420.

The tape reader will now sense the characters of Item 2 which includes the three letter code (ABC) identifying the particular incoming line, a "figures shift" code designation, the digits 014 representing the number of the message received over the above identified incoming line, and then a "letters shift" code designation.

Figure 29:
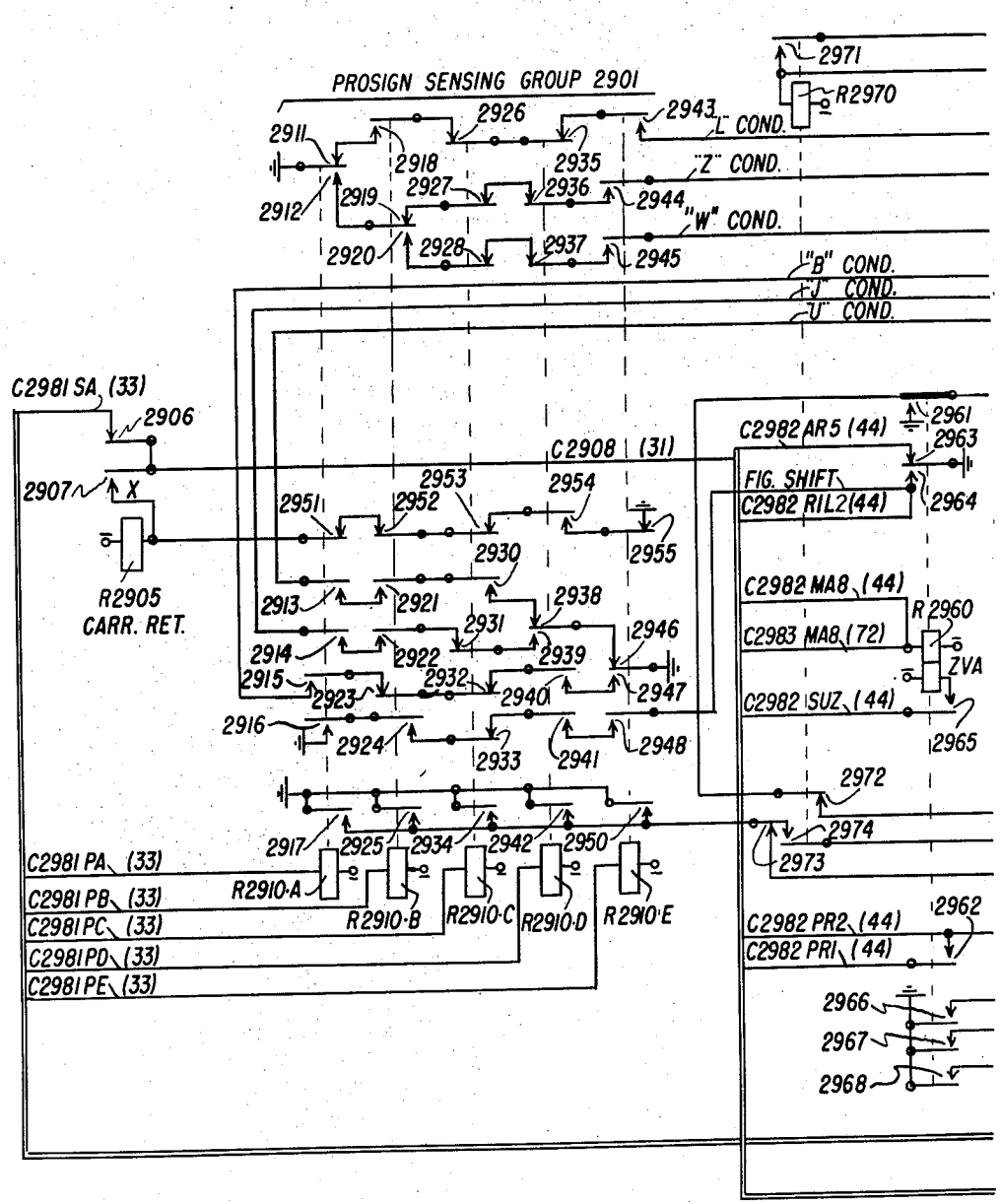
Figure 30:
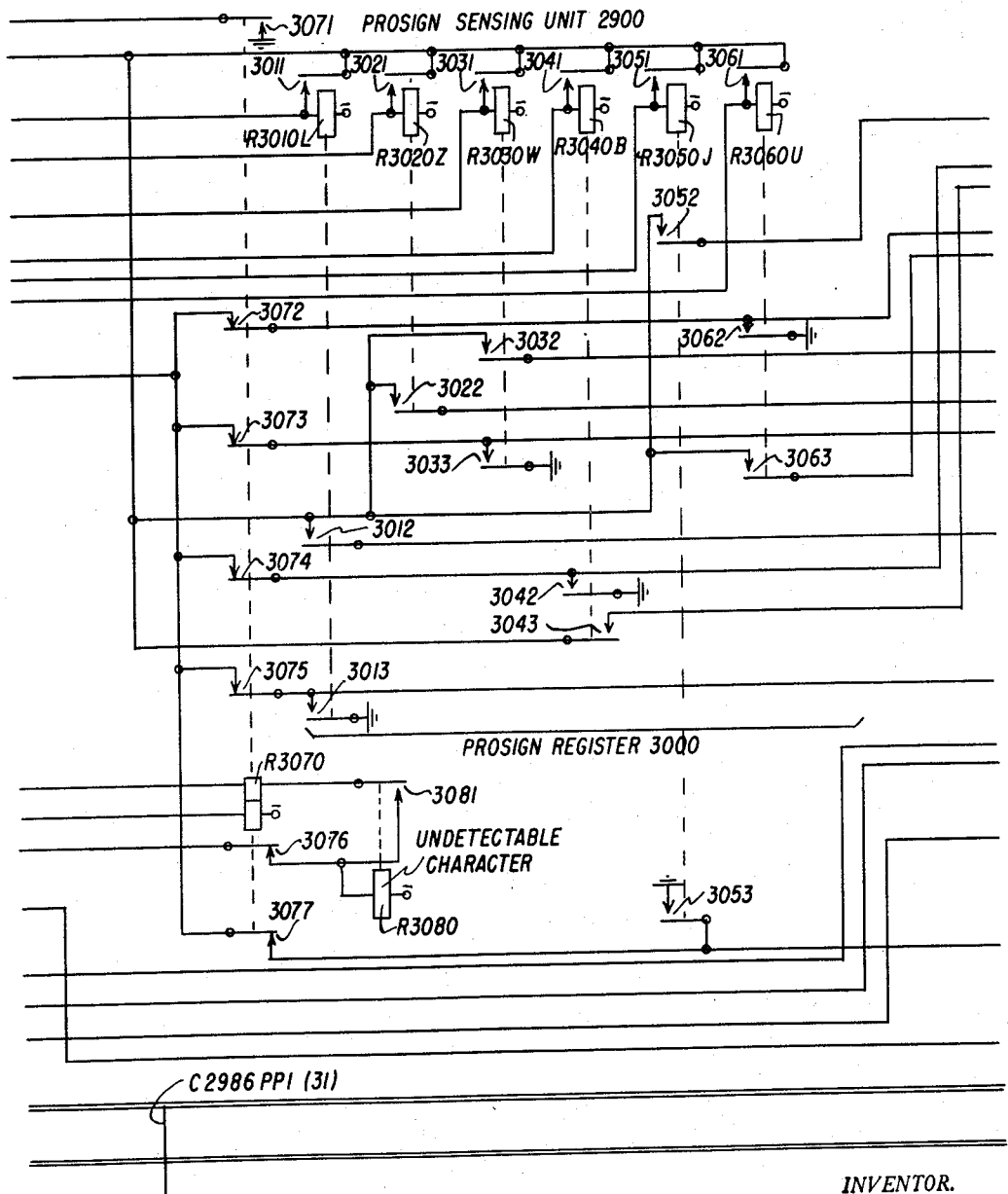
Figure 31:
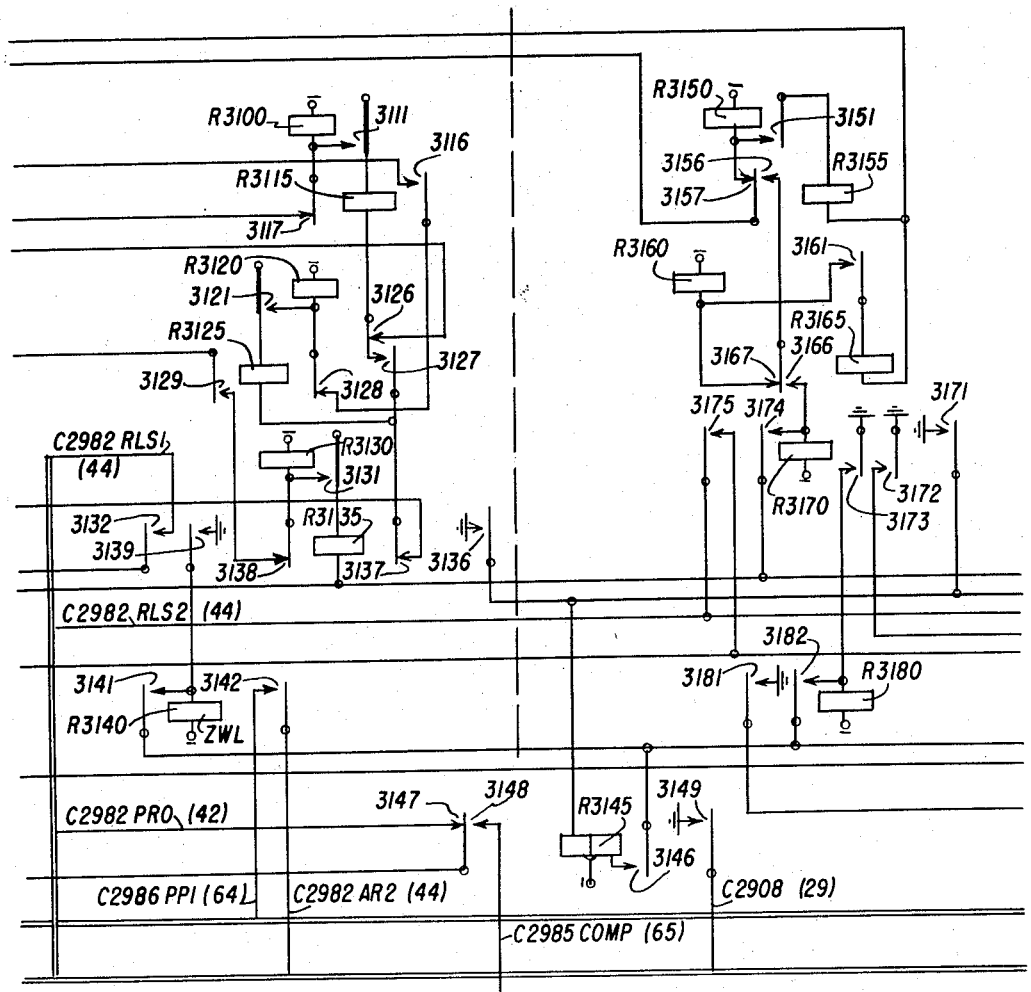

The above Item 2 of the message will control the relays in the sensing unit 1501 of the multiple call storage unit 1400 in the usual manner but the information of Item 2 is not used. At the contacts 1519, 1529, 1539, 1549, and 1559, the relays in the sensing unit 1501 will also repeat the information of Item 2 over the conductors C1716LA to C1716LE, inclusive, to the relays of the precedence sensing group 6701 (Fig. 67) and to the relays in the prosign sensing group 2901 (Fig. 29). Although the relays in both the precedence sensing group 6701 and in the prosign sensing unit 2901 will respond to the code markings on the associated conductors in accordance with the information comprising Item 2 of the multiple call message, no controls will be registered in the associated equipment. The operation of the precedence sensing unit 6700 under control of the relays in the precedence sensing group 6701 will now be described inasmuch as the tape reader will now sense Item 3 on the perforated tape which includes the precedence indicator NMNM of the received multiple call message. The relays in the prosign sensing unit 2901 will also respond to the precedence indicator of Item 3 but the information will be ignored by the prosign sensing unit 2900. The operation of the prosign detector 2900 to detect and register the prosigns ZWL, UUU, BBB or JJJ will be described hereinafter later under the heading "Operation of the prosign unit 2900" inasmuch as the present message does not include any one of the above noted prosigns.

*Operation of the character counter 1251*

At the time the relays R1710 and R1720 operated to indicate that the multiple call storage unit 1400 is connected to the common equipment, the relay R1710, at its contacts 1713, interrupted a circuit including the conductors C1402TDC and TDS to prevent operation of the transmitter 1430. Normally, this circuit will be opened prior to the operation of relay R1710 by a tight tape condition between the tape reader 1420 and the transmitter 1430 after the sensing of the start-of-message indicator. The relay R1720 upon operating, at its contacts 1723, completes a circuit which may be traced from the contacts 1577 on the relay R1570 in the sensing unit 1501, conductor C1787PPC extending to Fig. 11, contacts 1233 (relay R1230 being restored) contacts 1151, and the winding of the magnet M1255 of the units digit register 1252 to battery. This circuit is arranged so that the contacts 1577 are closed and reopened each time the realy R1570 responds to the sensing of a character by the tape reader 1420. In other words, each time any character is sensed by the tape reader, the relay R1570 will operate and restore in the manner previously described. Consequently, the magnet M1255 will also operate and restore in response to the sensing of each character. This circuit, however, is not effective until after a start-of-message indicator has been detected and registered and the common equipment has been connected to the multiple call storage unit 1400.

Normally, the tape between the tape reader 1420 and the transmitter 1430 will be in a tight tape condition at the time the above mentioned circuit becomes effective so that each character sensed thereafter will be registered in the units, tens and hundreds digits registers 1252, 1253 and 1254 of the character counter 1251. The wipers 1257 to 1259, inclusive, of the units digit register 1252 normally engages the contacts 1; the wipers 1262 to 1264 of the tens digit register 1253 normally engages the contacts 9; and, the wiper 1272 and 1273 of the hundreds digit register 1254 normally engage the contacts 7. The contacts 1 to 10, inclusive, of each of the wiper sets of the above noted registers represent respectively the digits 0 and 1 to 9, inclusive. Thus, the wipers of the hundreds, tens and units register 1254, 1253 and 1252 effectively preregister the number 086. Thus, the character counter 1251 has been preset to register 86 reading cycles or characters before any characters have actually been counted. Actually, the tight tape distance between the tape reader 1420 and the transmitter 1430 is approximately 66 character spacings so that the preregistered 86 character spacings on the character counter 1251 will be ample to make certain that all of the perforated tape between the tape reader and the transmitter will ultimately be fed through the transmitter before either the reading cycle or the transmitting cycle is terminated with respect to the message being processed.

Each character that is sensed subsequent to the registration of the start-of-message indicator is now counted and registered by the character counter 1251. Each time that the wiper 1258 of the units digit register 1252 engages contact 10, the magnet M1260 of the tens digit register 1253 will also operate in multiple with the magnet M1255 of the units digit register 1252. Each time the wiper 1263 of the tens digit register 1253 engages contact 10, it completes a circuit for operating the magnet M1270 in the hundreds digit register 1254 in multiple with the magnet M1260 and the magnet M1255.

With this arrangement in mind, it will be understood that when the sensing unit 1501 is controlled by the tape reader 1420 during the processing of the Items 2 to 6, inclusive, of the multiple call message, each of the characters will be counted and registered in the character counter 1251. However, when all of the routing indicators appearing in Item 6 have been processed by the multiple call equipment, the all-pilots-complete relay R1150 will operate to interrupt, at its contacts 1151, the impulsing circuit to the character counter 1251 and to transfer, at its contacts 1152, the impulsing circuit to the character counter 1201. The units, tens and hundreds digit registers 1252 to 1254, inclusive, of the character counter 1251 will now be in a position that will indicate the total count of all of the characters employed in Items 2 to 6, inclusive, of the multiple call message plus the 86 characters preregistered in the character counter 1251 at the time the counting of characters was started.

The operation of the character counter 1201 will be described hereinafter under the heading "All pilots completed."

*Operation of the precedence sensing unit 6700*

The next item of information appearing on the tape and sensed by the tape reader 1420 is the precedence indicator of Item 3 which indicates the priority of the multiple call message being processed. This item of information appears on the perforated tape 1413 following the channel number indicator (Item 2) and is preceded by two "carriage return" functions and one "line feed" function. The carriage return and line feed functions operated the relays of the sensing unit 1501 and the relays in the precedence sensing group 6701 but they are not registered in the precedence sensing unit 6700. It should be understood, however, that the "carriage return" and "line feed" functions appearing on the tape are inserted between certain of the items of information of a message for the purpose of controlling a conventional automatic typewriter mechanism and under certain conditions the monitor page printer 8750.

The precedence indicator of a message indicates the importance of the multiple call message being processed and may be any one of the previously described six degrees of precedence. The six different degrees of precedence in the declining order of importance are identified by the following code symbols:

(a) "Flash" is indicated by five "Bell" characters followed by the characters of the letters FL.

(b) "Emergency" is indicated by five "Bell" characters followed by the characters of the letters EM.

(c) "Operational Immediate" is indicated by the character of the letters OPOP.

(d) "Priority" is indicated by the letters PP.

(e) "Routine" is indicated by the character of the letters RR.

(f) "Deferred" is indicated by the characters NMNM.

In order to detect the different degrees of precedence, the precedence detector 7100 (Figs. 71 to 73, inclusive) is provided with an individual detector circuit for each degree of precedence except for "flash" and "emergency" which are detected and registered by the common flash and emergency detector 7100FE. The operational immediate precedence detector 7100-OP will detect and register the "operational immediate" precedence indicator; the priority detector 7100PP will detect and register the "priority" indicator; the routine detector 7100RR will detect and register the "routine" precedence indicator; and the deferred detector 7100NM will detect and register the deferred precedence indicator. The precedence detector 7100 is also provided with a multiple address detector 7100MA for detecting and registering a ZVA multiple call indicator appearing on the message being processed by the multiple call equipment.

The operation of the different detectors in the precedence detector 7100 is controlled by the precedence sensing unit 6700 of Figs. 67 to 70, inclusive. In the previous description of the tape reader 1420, it was pointed out that the various conductors C1401RA to RE, inclusive, are grounded in code combinations in accordance with the code appearing in Fig. 89 of the drawings. The grounding of the above mentioned conductors control the five relays R1510 to R1550, inclusive. At the contacts 1519, 1529, 1539, 1549 and 1559, the relays R1510 to R1550, inclusive, will mark the conductors C1716LA to C1716LE, inclusive, in order to operate the five relays R6710PA to R6710PE, inclusive, in the precedence sensing unit 6700. The circuit for controlling the above noted relays in the precedence sensing unit 6700 may be traced from battery, by way of the windings of the above noted relays, the associated conductors C2981PA to C2981PE, inclusive, extending to Fig. 33, the contacts 3311 to 3315, inclusive, the conductors C1717LA to C1716LE, inclusive, extending to Fig. 17, the contacts 1714LA to 1714LE, inclusive, the contacts 1519 to 1559, respectively, and ground at contacts 1777. Consequently, the relays R6710PA to R6710PE, inclusive, will be operated in combinations in accordance with the corresponding operations of relays R1510 to R1550, inclusive, under control of the tape reader 1420. The characters of the precedence indicator perforated on the tape 1413 will be sensed by the tape reader 1420 to control the relays in the sensing unit 1501 and will be repeated over the conductors of the above described circuits to the sensing relays R6710PA to R6710PE, inclusive, in the precedence sensing group 6701.

The operation of the precedence sensing unit 6700 and the associated precedence detector 7100 to detect and register the character of the different precedence indicators will now be described.

*Detecting the "deferred" precedence indicator (NMNM)*

It will now be assumed that the tape reader 1420 has sensed the first character N of a "deferred" precedence indicator (NMNM). As a result thereof, the conductors C1401RC and C1401RD will be grounded in order to operate the relays R1530 and R1540 and the latter relay at the contacts 1539 and 1549 will operate the relays R6710PC and R6710PD in the precedence sensing unit 6700. During the cycle of the operation of the tape reader 1420 to sense the character N the relays R1560 and R1570 in the sensing unit 1501 will operate in the manner previously described but this is of no importance at this time.

The sensing relays R6710PC and R6710PD, at their contacts 6740 and 6755, complete a circuit including ground at the contacts 6787, contacts 6769, 6755, 6740, 6726 and 6714, the "N" conductor, the lower winding of N relay R6835, to battery. The N relay R6835 now operates and extends the operating ground potential by way of its contacts 6839 and the winding of the slave relay R6790, to battery, in order to operate the latter relay. Also, at its contacts 6836, the N relay R6835 applies ground potential at the contacts 6912 to the conductor C6803N extending to Fig. 73, and then by way of the contacts 7366 and the winding of the relay R7360, to battery. The relay R7360 operates and, at its contacts 7361, prepares a point in a circuit for operating the relay R7365 in series therewith as soon as ground potential is removed from the conductor C6803N. Also, at its contacts 6837, the relay R6835 applies ground potential to the conductor C6702SUN extending to Fig. 73 but at the present time this performs no operating control.

When the relay R6790 operates in multiple with the circuit for the lower winding of the N relay R6835, it opens its contacts 6791 to 6799, inclusive, and contacts 6791' in order to disconnect the associated conductors from the grounded conductor C6702SU2. Finally, at its contacts 6792', the relay R6790 completes a locking circuit which includes battery, the upper winding of the N relays R6835, contacts 6838 and 6791', conductor C6702SU1 extending to Fig. 73 and ground at the contacts 7207. Thus, the N relay R6835 is locked in its operated position under control of the contacts 7207 under control of the operated release 2 relay R7200 in the precedence detector 7100 (Figs. 71 to 73, inclusive). At this time it may be well to mention the fact that the relay R7200 was operated over a circuit including the conductor C4497RLS-HD extending to Fig. 44, contacts 4463, conductor C1388SU5 extending to Fig. 13, and ground at contacts 1316 of the operated seal-up relay R1310. In other words, the seal-up relay R1310 was operated at the time the connect relay R3310 connected the multiple call storage unit 1400 to the precedence sensing unit 6700 and, at its contacts 3316, it completed the operating circuit for the release 2 relay R7200 in the precedence detector 7100. Consequently, the relay R7200, at its contacts 7207, maintains ground potential on the conductor C6702SU1 extending to Fig. 67.

In addition to the foregoing, the ground potential on the conductor C6702SU1 is extended by way of the winding of the relay R6780, contacts 6791, and any one of the contacts 6711, 6722, 6735, 6750 or 6764 and the resistor 6709, to battery, in order to operate the relay R6780 each time a character is sensed by the relays in the precedence sensing group 6701. When the latter relays restore, the relay R6780 locks itself in series with relay R6790. However, the latter relay will remain operated and the relay R6780 will be restored if the character sensed is registered by the operation of one of the relays in the registers 6801 or 6802. A detailed description of the operation of relay R6780 and R6790 in connection with the sensing of an improper character by the precedence sensing group 6701 is described hereinafter under the heading "Preventing false operation of the precedence sensing unit 6700 and the precedence detector 7100."

At the completion of the sensing cycle by the tape reader 1420 of the first precedence indicator N, the operated relays in the sensing relays 1501 are restored to normal and as a result thereof, the operated relays R6710PC and R6710PD in the precedence sensing group 6701 are also restored to normal. At the contacts 6740 and 6755, the latter relays interrupt the intial operating circuit for the lower winding of the N relay R6835 and the multiple operating circuit for the relay R6790. The relay R6790 now restores to normal and the contacts on this relay are accordingly restored to the positions illustrated in the drawings. Incident to the restoration of the relay R6790, it interrupts, at its contacts 6792', a point in the previously traced locking circuit including the upper winding of the N relay R6835, whereupon, the latter relay restores to normal and removes the operating ground potential for operating the relay R7360 from the conductor C6803N. However, at its contacts 6794, the relay R6790 connects the ground potential on the conductor C6702SU1 by way of the contacts 6794, conductor C6702SUM extending to Fig. 73 and then by way of the contacts 7391 and 7377, the winding of relay R7365, contacts 7361, and the winding of relay R7360, to battery. Thus, the ground potential applied to the conductor C6702SUM upon the restoration of relay R6790, completes the operating circuit for relay R7365 and maintains the relay R7360 operated in series therewith. In other words, the first character N of the "deferred" indicator NMNM controls the relays in the precedence sensing group 6701 so that the N relay R6835 operates the relay R7360 in the deferred detector 7100NM and at the end of the sensing cycle, the N relay R6835 restores to normal so that the relay R7365 in the deferred detector 7100NM will operate in series with the relay R7360. In this manner the first N character has been detected and registered in the precedence detector 7100 and the deferred detector 7100NM is conditioned to respond to the second character M of the "deferred" indicator NMNM.

The tape reader 1420 now senses the next or second character M of the precedence indicator NMNM, whereby, the relays R6710PC, PD and PE in the precedence sensing group 6701 are operated. At this time a circuit including contacts 6787, 6770, 6757, 6743, 6729, 6717 and the M conductor is completed for operating the M relay R6820, and upon operating, the latter relay, at its contacts 6824, completes the multiple circuit for operating the relay R6790 and for shunting down the relay R6780. As soon as the relay R6790 operates it completes, at its contacts 6792', the locking circuit including the grounded conductor C6702SU1 and the contacts 6823 for locking the M relay R6820 in its operated position. Although the relay R6790 removes ground potential from the conductor C6702SUM, at its contacts 6794, the conductor C6702SUM will be grounded at the contacts 6822 of the operated M relay R6820. Thus, the relays R7360 and R7365 in the detector 7100NM are retained in their operated positions by the ground potentional on the conductor C6702SUM. As a further result of the operation of the M relay R6820, at its contacts 6821, it applies ground potential to the conductor C6803M extending to Fig. 73 and then by way of the contacts 7368 and 7379 in order to operate the relay R7370.

At the end of the sensing of the second character M of the "deferred" indicator NMNM, the operated relays in the precedence sensing group 6701 restore to normal to interrupt the circuit for the lower winding of the M relay R6820 and the winding of the relay R6790. The latter relay restores and at its contacts 6791', interrupts the locking circuit for the relay R6820 which now restores to normal and, at its contacts 6794 and 6797, it applies ground potential to the conductors C6702SUM and C6702SUN extending to Fig. 73. In Fig. 73 the ground potential on the conductor C6702SUM performs no function at this time and the ground potential on the conductor C6702SUN is extended by way of the contacts 7386, the winding of relay R7375, contacts 7372, and the winding of relay R7370, to battery, and it is also extended by way of the contacts 7386, 7376, winding of relay R7365, contacts 7361 and the winding of relay R7360, to battery. Thus, the relay R7370 is retained in its operated position; the relay R7375 is operated and locked in series therewith to register the second character M and the relays R7365 and R7360 are retained operated to register the first character N of the "deferred" indicator NMNM.

The third character N of the "deferred" precedence indicator NMNM is now sensed by the tape reader 1420 and as a result thereof, the relays in the precedence sensing group 6701, the relays R6835 and R6790 are operated as previously described, whereby, ground potential is applied by way of the conductor C6803N extending to Fig. 73 and then by way of the contacts 7367, 7371 and 7388 in order to operate the relay R7380 in the deferred detector 7100NM. Also, at the contacts 6837, ground potential is applied to the conductor C6702SUN extending to Fig. 73 in order to maintain the relays R7370 and R7375 in their operated positions by way of the contacts 7386 and in order to maintain the relays R7360 and R7365 in their operated positions by way of the contacts 7386 and 7376.

At the end of the sensing of the third character N of the "deferred" indicator NMNM the various sensing relays will be restored to normal and will cause the restoration of both the relays R6835 and R6790. As a result thereof, relay R6790, at its contacts 6794, will reapply ground potential to the conductor C6702SUM extending to Fig. 73 and then by way of the winding of the relay R7385, contacts 7381 and the winding of the relay R7380, to battery. Accordingly, the relay R7380 will be retained in its operated position and the relay R7385 will now operate and lock in series therewith. This action, however, does not take place until the relay R6835 restores to normal and removes the ground potential from the conductor C6803N. Also, the ground potential applied to the conductor C6702SUM is extended by way of the contacts 7387 in order to transfer the locking circuits for the relays R7360, R7365, R7370 and R7375 from the conductor C6702SUN to the conductor C6702SUM. Accordingly, the third character N of the "deferred" indicator NMNM is now registered in the deferred detector 7100NM.

The tape reader 1420 now senses the last or fourth character M of the "deferred" precedence indicator NMNM in substantially the same manner as has been previously described, whereby, the M relay R6820 and the relay R6790 are operated. The relay R6820 retains the holding ground potential on the conductor C6702SUM and, at the contacts 6821, it applies a second pulse of ground potential to the conductor C6803M extending to Fig. 73. In Fig. 73, the second pulse of ground potential is now extended by way of the conductor C6803M, contacts 7368, 7379, 7399 and 7382 and the winding of the relay R7390, to battery.

At the end of the sensing cycle of the fourth character M of the precedence indicator NMNM, the tape reader 1420 restores the various sensing relays and the relays R6820 and R6790 in the precedence sensing unit 6700. As soon as the M relay R6820 restores and removes ground potential from the conductor C6803M, relay R7390 locks itself in its operated position over a circuit including its contacts 7392, the winding of relay R7395 and ground at contacts 7209'. The relay R7395 operates in series with the relay R7390 and registers the fact that the four characters NMNM of the "deferred" precedence indicator have been detected and registered in the proper sequence in the deferred detector 7100NM.

Figure 69:
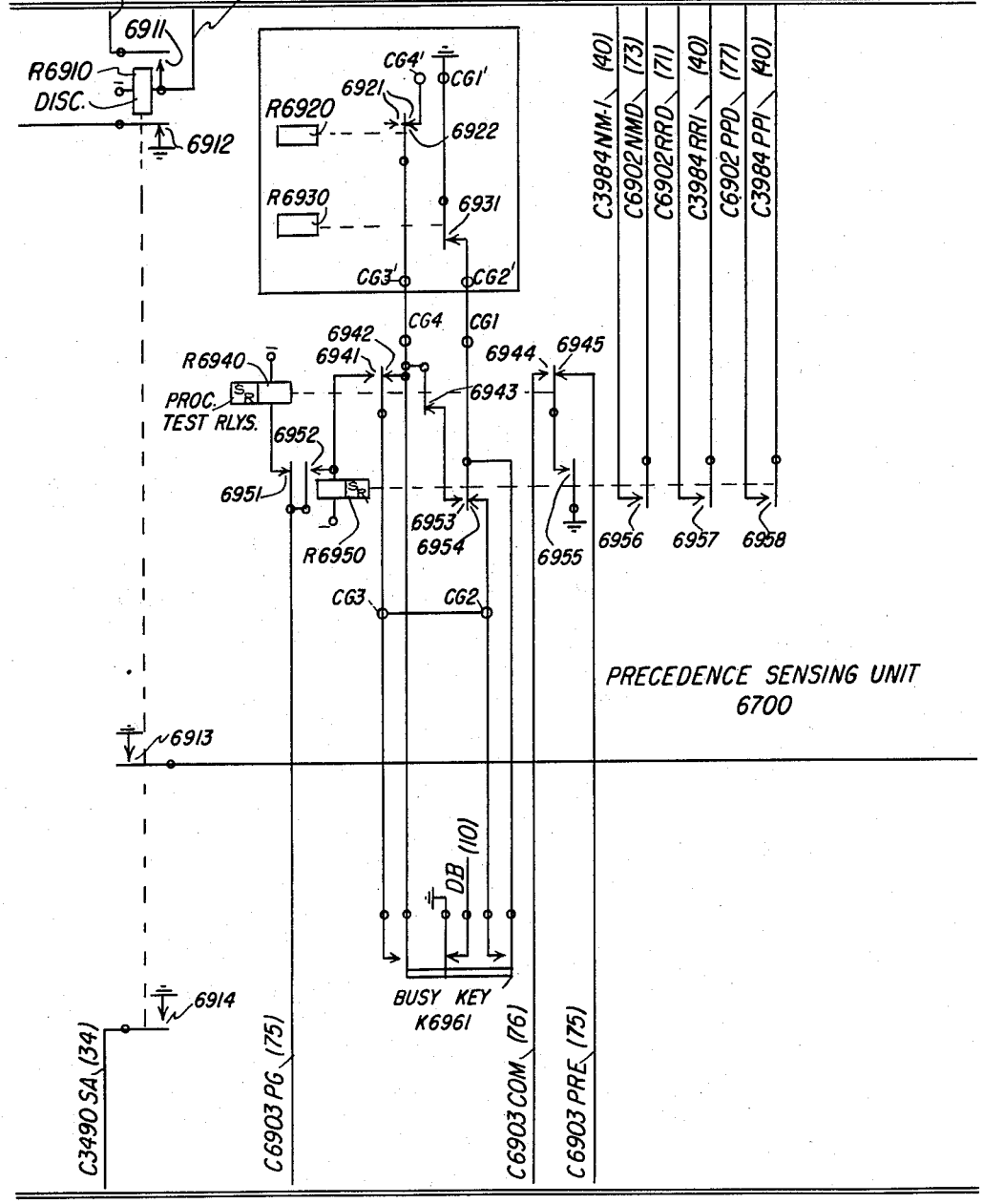

As soon as the relay R7395 in the deferred detector 7100NM operates, it completes, at its contacts 7397, a circuit including the conductor C6902DC extending to Fig. 69 in order to operate the disconnect relay R6910 in the precedence sensing unit 6700. The relay R6910, at its contacts 6911, locks itself by way of the conductor C6902SU2 extending to Fig. 72 to ground potential at the contacts 7208 of the operated release 2 relay R7200. As a further result of the operation of the relay R6910, at its contacts 6912, it disconnects the marking ground potential from the upper contacts of the eight relays R6805 to R6840, inclusive, in the precedence register 6801. Therefore, if any of the precedence register relays noted above are operated incident to the sensing of succeeding characters by the tape reader 1420, no control will be exercised over the relays included in the different detectors of the precedence detector 7100. At its contacts 6913, the relay R6910 completes a circuit, including the home contact engaged by the wiper 7012 of the precedence indicator switch 7010 for operating the slow-to-operate test relay R7020. The relay R7020 operates and conditions the precedence indicator switch 7010 so that it may subsequently be operated to search for an unmarked contact in the associated contact bank corresponding to the "deferred" precedence now registered in the deferred detector 7100NM. As a final result of the operation of the disconnect relay R6910, at its contacts 6914, it applies ground potential to the conductor C3490SA extending to Fig. 34 in order to operate the address connect relay R3410 in the address detector 3300. The relay R3410 upon operating, at its contacts 3411 to 3415, inclusive, connects to the sensing relays in the address sensing unit 3401 to the conductors C1716LA to LE, inclusive, extending to the tape reader 1420. At this instant, the relays in the address sensing unit 3401, the relays in the precedence sensing group 6701 and the relays in the prosign sensing group 2901 are connected in multiple to the sensing conductors C1716LA to C1716LE, inclusive.

Figure 70:
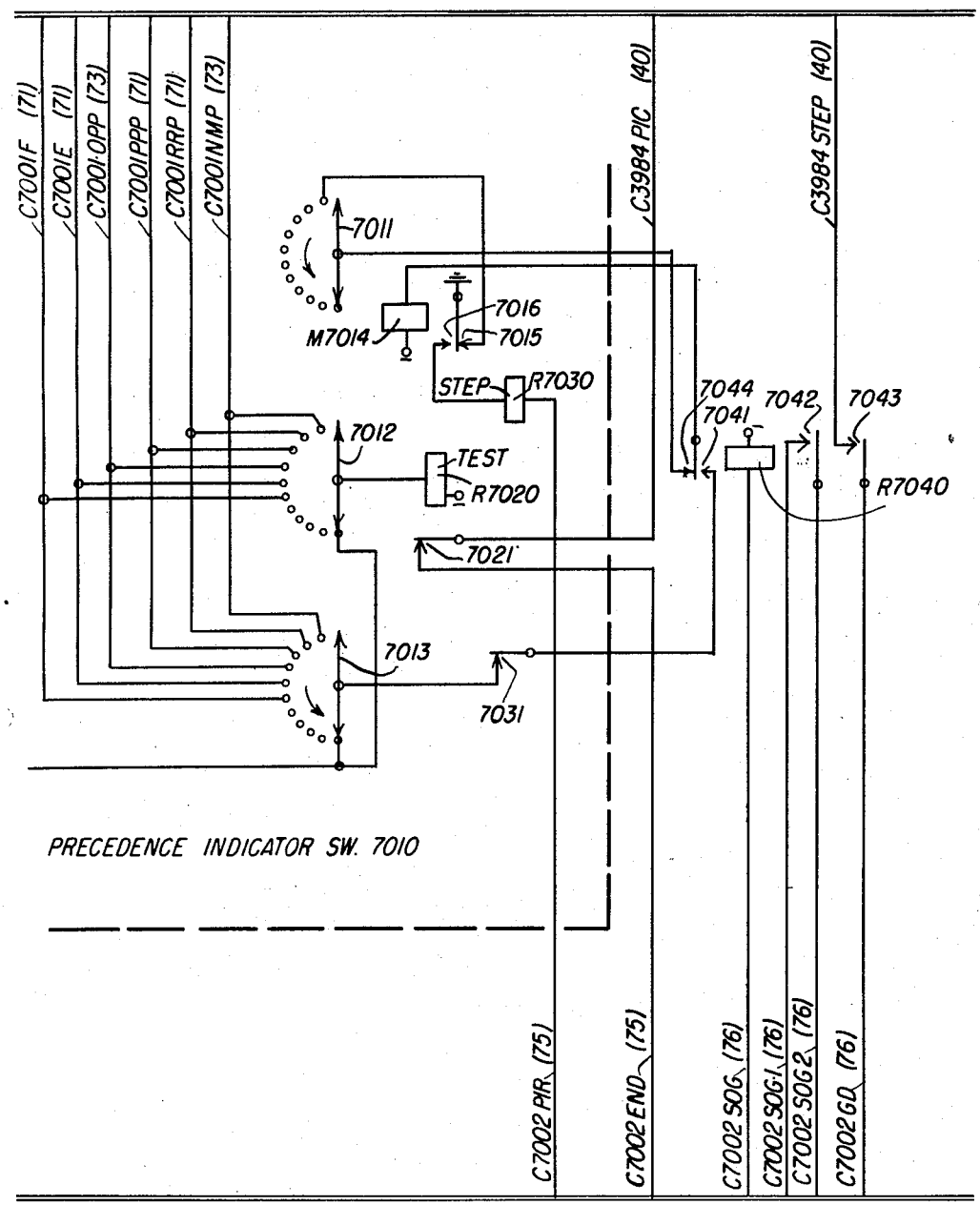

Referring again to Fig. 73 it will be seen that when the relay R7395 operates in response to the registration of the fourth character M of the "deferred" precedence indicator NMNM it removes, at its contacts 7399', ground potential from the conductor C7001NMP extending to Fig. 70 and terminating in contacts 1 accessible to the wiper 7012 and 7013 of the precedence indicator switch 7010. The precedence indicator switch 7010 terminates six conductors, each of which is indicative of one of the six degrees of precedence which may be detected and registered in the precedence detector 7100. The remaining five precedence detectors in the precedence detector 7100 will ground the associated conductors in the bank contacts 2 to 6, inclusive, accessible to the wipers 7012 and 7013 to indicate that the five remaining precedence indicators have not been detected at this time.

Referring again to the deferred detector 7100NM (Fig. 73) it will be noted that all of the relays therein are held in their operated positions after the four characters NMNM have been detected and registered. If the four characters are not received in the sequence indicated or if some other character is detected at any point during the sensing sequence of the "deferred" precedence indicator NMNM, all of the operated relays in the deferred detector 7100NM will automatically restore to normal. This is accomplished by removing the locking ground potential, during a sensing cycle, from either one or both of the locking conductors C6702SUN and C6702SUM. However, if an N character is received out of sequence, for example, at a time when an M character is to be detected, it is essential that all of the operated ones of the relays in the deferred detector 7100NM be restored to normal and that the first pair of relays R7360 and R7365 be reoperated to anticipate that the last N character received may be the first character of a new sequence of proper NMNM characters.

In order to describe the above mentioned condition it would be assumed that the deferred detector 7100NM has been operated in the manner previously described to detect the first three characters NMN of the deferred precedence indicator. Thus, the first three pairs of relays R7360—R7365, R7370—R7375 and R7380—R7385 are operated and locked to the grounded conductor C6702SUM. In addition thereto the relay R7385 will be locked in its operated position over a circuit including its left-hand winding, contacts 7387 and 7378 to the grounded conductor C6702SU1. The deferred detector 7100NM must now detect and register the fourth character M of the "deferred" precedence indicator NMNM. However, if any other characters are received at this time by the precedence sensing unit 6700, the M relay 6820 will not be operated to apply the operating ground potential to the conductor C6803M and it will not apply, at its contacts 6822, the locking ground potential to the conductor C6702SUM for the operated relays in the detector 7100NM. Also, the relay R6790 will operate upon the detection of any other character and, at its contacts 6794, will remove the final holding ground potential from the conductor C6702SUM extending to Fig. 73. Accordingly, all of the operated relays in the deferred detector 7100NM that are locked to the conductor C6702SUM will now restore to normal.

The above described operations, whereby the operated relays in the deferred detector 7100NM restore to normal, also applies if the fourth character detected by the precedence sensing unit 6700 is the character N instead of the character M. However, after all of the operated relays in the detector 7100NM restore to normal, the ground potential applied to the conductor C6803N by the operated N relay R6835 will cause the first pair of relays R7360 and R7365 to reoperate in the manner previously described. In other words, the detector 7100NM is immediately conditioned to anticipate the detection of a proper sequence of NMNM characters of a new sequence.

Immediately following the sensing of the fourth character M of the "deferred" precedence indicator NMNM, the tape reader 1420 senses a "space" character on the perforated tape 1413 which separates the precedence indicator from the following routing indicator. As a result of the sensing of the "space" character the relay R6710C in the precedence sensing group 6701 will operate to close its contacts 6745 and thereby to apply ground potential to the "space" conductor to operate the space relay R6850 and in multiple therewith, the relay R6790. The relay R6850 locks itself by way of its contacts 6852 and contacts 6792' to the grounded conductor C6702SU1. Also, at its contacts 6851, it applies ground potential to the conductor C6702SUM extending to Fig. 71 but this is of no importance at this time. The relay R6790, however, in operating, at its contacts 6794, removes ground potential from the conductor C6702SUM extending to Fig. 73 in order to interrupt the locking circuit for the relays R7360, R7365, R7370, R7375, R7380 and R7385 which all restore to normal in substantially the order named. The last two relays R7390 and R7395 in the deferred detector 7100NM are locked to the contacts 7209' of the operated release 2 relay R720 in order to continue to register the successful detection of the "deferred" precedence indicator NMNM.

The next item of information to be sensed by the tape reader 1420 is the routing indicator identifying the switching center that is to be held responsible for the retransmission of the present multiple call telegraph message to a plurality of destinations or addresses identified by the routing indicators included in the message. However, before continuing with the description of the operations whereby a routing indicator is detected and registered the operations of the precedence sensing unit 6700 and the precedence detector 7100 to detect different precedence indicators will be given.

*Detecting a "routine" precedence indicator (RR)*

The detection of the "routine" precedence indicator, comprising the two characters RR, is substantially the same as the detection of the "deferred" precedence indicator NMNM, except that in the precedence sensing unit 6700, the R relay R6840 is operated twice, in multiple with the relay R6790. The R relay R6840 is energized over a circuit including the contacts 6787, 6769, 6755, 6739, 6725 and 6713. The relays R6710PB and R6710PD are energized under control of the tape reader 1420 as it senses the perforations on the associated tape indicative of the character R. The first time the relay R6840 operates it completes, at its contacts 6841, a circuit including the conductor C6803R extending to Fig. 71, contacts 7186 and the winding of the relay R7180, to battery. At the end of the sensing cycle, the relays R6840 and R6790 restore to normal so that the ground potential on the conductor C6702SU1 is extended by way of the contact 6798, conductor C6702SURR extending to Fig. 71, winding of relay R7185, contacts 7181 and winding of relay R7180, to battery. Thus, the first pair of relays R7180 and R7185 in the routine detector 7100RR are operated and locked to register the first R character of the "routine" precedence indicator RR.

The next time the R relay R6840 is operated in multiple with the relay R6790, at its contacts 6842, it retains the locking ground potential on the conductor C6702SURR and, at its contacts 6841, it applies a second pulse of ground potential to the conductor C6803 extending to Fig. 71 and then by way of the contacts 7187 and 7199 and the winding of the relay R7190, to battery. At the end of the sensing cycle of the second R character, the relays R6840 and R6790 restore to normal and the relay R7190 locks itself by way of the contacts 7191, and the winding of the relay R7195 to ground potential at contacts 7202 of the operated release 2 relay R7200. Thus, the two pairs of relays R7180—R7185 and R7190—R7195 are operated in response to the detection and registration of two RR characters indicative of the "routine" precedence indicator. At its contacts 7196, the relay R7195 removes ground potential from the conductor C7001RRP extending to Fig. 70 and terminating in the contacts 2 accessible to the wipers 7012 and 7013 of the precedence indicator switch 7010. This indicates to the precedence indicator switch 7010 that the "routine" precedence indicator RR has been detected and registered. Also, at the contacts 7197, the relay R7195 applies ground potential to the conductor C6902DC extending to Fig. 69 in order to operate the disconnect relay R6910 in the precedence sensing unit 6700. The relay R6910, upon operating, performs the same controls that have been described hereinbefore in connection with the detection and registration of the "deferred" precedence indicator NMNM in the deferred detector 7100NM. The routine detector 7100RR is substantially the same as the deferred detector 7100NM in that the relays R7180 and R7185 therein will automatically restore to normal in the event that the relays in the precedence sensing group 6701 fail to sense two successive R characters indicative of the "routine" precedence indicator.

Immediately following the detection and registration of the "routine" precedence indicator RR the tape reader 1420 will sense a "space" character function, in the manner previously described, whereby the relays in the precedence sensing group 6701 will apply ground potential to the "space" conductor and cause the operation of the space R6850 in multiple with the relay R6790. The operation of these relays at this time and in particular, the operation of relay R6790 removes ground potential from the conductor C6702SURR extending to Fig. 71 thereby to interrupt the locking circuit for the two relays R7180 and R7185 which now restore to normal. However, the relays R7190 and R7195 remain operated under control of the contacts 7202 on the operated relay R7200. In other words, the successful detection and registration of the "routine" precedence indicator RR is retained registered until after the release 2 relay R7200 restores to normal.

The next item of information to be sensed by the tape reader 1420 is the routing indicator identifying the switching center that is to be held responsible for the retransmission of the multiple call message to the different destinations named in the message. However, before continuing the description, whereby, the routing indicator is detected and registered, the detection of another precedence indicator will be described.

*Detecting a "priority" precedence indicator (PP)*

It will now be assumed that the tape reader 1420 senses the two characters PP indicative of a "priority" precedence indicator. As a result thereof, the relays R6710PB, PC and PE in the precedence sensing group 6701 will be operated in substantially the same manner as has been previously described in order to operate the P relay R6830 over the "P" conductor by closing the contacts 6727, 6741 and 6770. The relay R6790 operates in multiple with the relay R6830, as previously noted. At the contacts 6831, the relay R6830 applies ground potential to the conductor C6803P extending to Fig. 73 and then by way of the contacts 7176 in order to operate the relay R7160 in Fig. 71. At the end of the sensing of the first character P, the relays R6830 and R6790 restore to normal. However, the relay R7160 in the priority detector 7100PP now locks itself over a circuit including its contacts 7161, winding of the relay R7165, contacts 7133, conductor C6703SUP extending to Fig. 67, contacts 6796, and the grounded conductor C6702SU1. The relay R7165 operates in series with the relay R7160 and prepares, at its contacts 7167, a point in the circuit for operating the relay R7170. The second time the P relay R6830 operates in multiple with the relay R6790 the ground potential is again applied to the conductor C6803P in order this time to operate the relay R7170 in the priority detector 7100PP. At the end of the sensing of the second character P, the relays R6830 and R6790 restore to normal, and the relay R7170 locks itself in its operated position over a circuit including its contacts 7171 and the winding of relay R7175 to ground at the contacts 7202 of the operated relay R7200. Accordingly, the relays R7170 and R7175 are locked in their operated positions to register the successful detection of the characters PP indicative of the "priority" precedence indicator.

It should be noted, however, that during the time the P relay R6830 is operated to register the second character P, at its contacts 6832, it retains the locking ground potential on the conductor C6702SUP in order to hold the relays R7160 and R7165 in their operated positions. Since the "priority" indicator has been successfully registered, the relay R7175, at its contacts 7177, now applies ground potential to the conductor C6902DC in order to operate the disconnect relay R6910 in the manner previously described. Also, at its contacts 7176, the relay R7175 removes ground potential from the conductor C7001PP extending to Fig. 70 and terminating in the contacts 3 accessible to the wiper 7012 and 7013 in order to indicate to the precedence indicator switch 7010 that the "priority" precedence indicator PP has been detected and registered in the priority detector 7100PP.

It should be noted, however, that in the event that any character other than the character P is sensed as the second character of the priority indicator PP, then the operated relays R7160 and R7165 will be automatically restored to normal in substantially the same manner as has been described previously in connection with the operation of the routine detector 7100RR and the deferred detector 7100NM.

Immediately following the successful detection of the "priority" precedence indicator PP, the tape reader 1420 senses a space" character function and thereby causes the operation of the space relay R6850 and the relay R6790 in the manner previously described. The operation of these relays at this time removes the holding ground potential from the conductor C6702SUP to permit the first pair of relays R7160 and R7165 in the priority detector 7100PP to restore to normal. The second pair of relays R1710 and R7175, however, remain locked in their operated positions to continue to register a successful detection of the priority" precedence indicator PP.

The next item of information to be sensed by the tape reader 1420 is the routing indicator identifying the switching center that is to be held responsible for the retransmission of the multiple call message to the different tributary stations or destinations contained in the message. However, before continuing with the description whereby a routing indicator is detected and registered, the operation of the precedence sensing unit 6700 to detect an "operational immediate" precedence indicator OPOP will now be described.

*Determing an "operational immediate" precedence indicator (OPOP)*

It will now be assumed that the tape reader 1420 senses the characters OPOP of an "operational immediate" precedence indicator. As a result of the sensing of the first character O, the relays R6710PD and R6710PE in the precedence sensing group 6701 will close the contacts 6757 and 6770 in order to apply ground potential to the "O" conductor to operate the O relay R6825 in multiple with the relay R6790. At its contacts 6826, the relay R6825 applies ground potential to the conductor C6803-O extending to Fig. 73 and then by way of the contacts 7316 in order to operate the relay R7310 in the detector 7100-OP At the end of the sensing of the first character O, the operated relays in the precedence sensing group 6701 will cause the relays R6825 and R6790 to restore to normal. At this time the relay R7310 locks itself by way of the contacts 7311, winding of the relay R7315, contacts 7326 and 7341, conductor C6702SUP extending to Fig. 67, contacts 6796 and the grounded conductor C6702SU1.

In response to the sensing of the second character P of the "operational immediate" precedence indicator OPOP, the relays R6710PB, R6710PC and R6710PE in the precedence sensing group 6701 are operated and at their contacts 6727, 6741 and 6770 apply ground potential to the "P" conductor in order to operate the P relay R6830 in multiple with the relay R6790. At its contacts 6832, the relay R6830 retains the locking ground potential on the conductor C6702SUP to prevent the restoration of relay 7310 and R7315. At its contacts 6831, the relay R6830 applies ground potential to the conductor C6803P extending to Fig. 73 and then by way of the contacts 7318 and 7329 and the winding of the relay R7320, to battery. Inasmuch as the second character P of the "operational immediate" precedence indicator OPOP is identical to the first character P of the priority" precedence indicator PP, the ground potential applied to the conductor C6803P to operate relay R7320 is also extended over a branch circuit by way of the contacts 7166 to the winding of relay R7160. Accordingly, both the relays R7320 and R7160 now operate.

At the end of the sensing of the second character P of the "operational immediate" precedence indicator OPOP, the relays R6830 and R6790 restore to normal. At its contacts 6795, the relay R6790 now extends the ground potential on the conductor C6702SU1 by way of the conductor C6702SU0 extending to Fig. 73, contacts 7337, winding of the relay R7325, contacts 7322, and the winding of the relay R7320, to battery. The relay R7320 remains in its operated position and the relay R7325 operates in series therewtih. As soon as the last mentioned relay operates, at its contacts 7326 and 7327, it transfers the locking circuit for the relays R7310 and R7315 from the previously traced circuit including the grounded conductor C6702SUP to the grounded conductor C6702SU0. Also, at its contacts 6796, the relay R6790 retains ground potential on the conductor C6702SUP and causes the relay R7160 in the priority detector 7100PP to lock itself over a circuit including contacts 7161, the winding of relay R7165, contacts 7333 to the grounded conductor C6702SUP.

At the present time the first pair of relays R7310 and R7315 have been operated to register the first character O and the relays R7320 and R7325 have been operated to register the second character P of the operational immediate precedence indicator OPOP in the operational immediate detector 7100-OP. In addition to the foregoing, the first pair of relays R7160 and R7165 in the priority detector 7100PP have been operated by the character P whereby the last mentioned detector assumes that it will next receive the second character P of a "priority" precedence indicator PP.

As noted above, the third character sensed by the tape reader 1420 is the character O of the "operational immediate" precedence indicator OPOP. Accordingly, the O relay R6825 and the relay R6790 in the precedence sensing unit 6700 are again operated. This time, the O relay R6825, at its contacts 6727, applies ground potential to the conductor C6702SU0 extending to Fig. 73 to hold the relays R7310, R7315, R7320 and R7325 in their operated positions. At this time, the relay R6790 in operating, removes ground potential, at its contacts 6796, from the conductor C6702SUP extending to Fig. 73 and thereby interrupt the locking circuit for the first pair of relays R7160 and R7165 in the priority detector 7100PP which now restore to normal. In other words, the failure to detect and register in succession two P characters has caused the operated relays in the priority detector 7100PP to restore to normal. As a further result of the operation of relay R6825, at its contacts 6826, it applies ground potential to the conductor C6803-O extending to Fig. 73 and then by way of the contacts 7317, 7321 and 7338 in order to operate the relay R7330.

At the end of the sensing of the third character O of the "operational immediate" precedence indicator OPOP, the relays R6825 and R6790 restore to normal. At this time, the locking circuit for the relay R7330 is completed by way of the contacts 7331 and the winding of the relay R7335 to the conductor C6702SUP which is now grounded through the contacts 6796 of the restored relay R6790. The relay R7335 operates in series with the relay R7330 and transfers the locking circuit for the relays R7310, R7315, R7320 and R7325 from the conductor C6702SU0 to the conductor C6702SUP.

When the precedence sensing group 6701 is controlled by the tape reader 1420 in accordance with the fourth character P of the operational immediate precedence indicator OPOP, the P relay R6830 is operated in multiple with the relay R6790 in the manner previously explained. At its contacts 6831, the relay R6830 applies ground potential to the conductor C6803P extending to Fig. 73 and then by way of the contacts 7318, 7329′, 7354 and 7332 in order to operate the relay R7340 in the detector 7100-OP. Also, over a branch circuit, the relay R7160 in the priority detector 7100PP is operated in the manner previously explained. Also, at its contacts 6832, the relay R6830 applies ground potential to the conductor C6702SUP extending to Fig. 73 in order to retain operated the three pairs of relays R7310—R7315, R7320—R7325 and R7330—R7335.

At the end of the sensing of the final P character of the "operational immediate" precedence indicator OPOP, the P relay R6830 and the relay R6790 in the precedence sensing unit 6700 restore to normal in the manner previously explained, whereby, ground potential is reapplied at the contacts 6796 to the conductor C6702SUM extending to Fig. 73 and ground potential is removed from the conductor C6803P. The relay R7340 now locks itself by way of its contacts 7342 and the winding of relay R7350 to ground at contacts 7209 on the operated release 2 relay R7200. In Fig. 73 the ground potential on the conductor C6702SUM retains the three pairs of relays noted above in their operated positions but since the contacts 7333 have been opened by the relay R7330 no locking ground is provided for the relays R7160 and R7165 in the priority detector 7100PP and, consequently, the relay R7160 restores to normal.

At the present time the characters OPOP of the operational immediate precedence indicator have been successfully detected and registered in the detector 7100-OP. As soon as the relay R7350 operates it completes, at its contacts 7351, a circuit for applying ground potential to the conductor C6902DC extending to Fig. 69 in order to operate the disconnect relay R6910 in the manner previously described. Also, at its contacts 7356 it applies ground potential to the conductor C7104NS extending to Fig. 4 for the purpose to be described hereinafter. Finally, at its contacts 7355, the relay R7350 removes the marking ground potential from the conductor C7001–OPP extending to Fig. 70 and terminating in the contacts 4 accessible to the wipers 7012 and 7013 in order to indicate to the precedence indicator switch 7010 that the "operational immediate" precedence indicator OPOP has been registered.

The operational immediate detector 7100–OP is substantially identical with the deferred detector 7100NM. Accordingly, it will be understood that if any character is received that breaks the sequence in the detection and registration of the characters OPOP, the operated relays in the detector 7100–OP will restore to normal as described in connection with the deferred detector 7100NM. Furthermore, if an O character is received in sequence when the relays in the detector 7100–OP are conditioned to receive a P character, the operated relays will all restore to normal and the first pair of relays R7310 and R7315 will reoperate, in the manner previously described, to register a possible first O character of a new sequence of OPOP characters. Since the foregoing operations of the detector 7100–OP is substantially the same as the operation of the deferred detector 7100NM it is not deemed necessary to repeat the detailed operations thereof.

Immediately following the detection and registration of the "operational immediate" precedence indicator OPOP, the tape reader 1420 senses a "space" character function and thereby causes the relays in the precedence sensing group 6701 to apply ground potential to the "space" conductor in order to operate the space relay R6850 and in multiple therewith, the relay R6790. As a result thereof, ground potential is now removed, at the contacts 6796, by the relay R6790 from the conductor C6702SUP extending to Fig. 73. The removal of ground potential from this conductor interrupts the locking circuits for the three pairs of relays R7310—R7315, R7320—R7325 and R7330—R7335 in order now to restore these relays to normal. However, since the last pair of relays R7340—R7350 are locked in their operated positions under control of the contacts 7209 on the operated relay R7200, they remain in their operated positions to continue to register the successful detection of the "operational immediate" indicator OPOP.

It may be well to mention at this time that at the contacts 7352, the operated relay R7350 in the detector 7100–OP connects the conductor C7101COM to the conductor C7107–OUF. This same operation is performed in the event that the contacts 7142 or 7152 in the flash and emergency detector 7100FE are closed. The connection of the two conductors, as noted above, will indicate to the multiple call equipment that one of the three highest precedence indicators have been registered in the precedence detector 7100. Any one of three highest precedence indicators must be handled immediately without waiting for completion of the transmission of another message having any one of the three lower precedence indicators over an outgoing line which is to be used to transmit the high precedence message.

It will be understood from the subsequent description that the deferred detector 7100NM, the routine detector 7100RR and the priority detector 7100PP merely connect the conductor C7101COM by way of the respective contacts 7396, 7194 or 7173 to the respective conductors C6902NMD, C6902RRD or C6902PPD for the purpose of determining whether the message of the particular precedence which has been received may be stored in a cross-office until that has been positioned to the desired outgoing line and has stored therein one or more messages having the same precedence as the present message.

The next item of information sensed by the tape reader 1420 is the routing indicator identifying the switching center that is to be held responsible for the retransmission of the particular multiple call message. However, before describing this operation, the operations of the precedence sensing unit 6700 to detect and register an "emergency" precedence indicator will now be described.

*Detecting an "emergency" precedence indicator (bell bell bell bell bell EM)*

It will now be assumed that at the tape reader 1420, a figures shift character that precedes five "bell" characters of an "emergency" precedence indicator (bell bell bell bell bell EM) is first. As a result thereof, the relay R6710PA, PB, PD and PE all operate to close the contacts 6712, 6713, 6751 and 6765 respectively, to gorund the "figures shift" conductor and complete the operating circuit for the figures shift relay R6785 by way of the resistor 6788, and battery. Upon operating, the relay R6785 locks itself by way of its contacts 6786 to the grounded conductor C6702SU1 over a circuit which is independent of its initial operating circuit. Also, at its contacts 6787, the relay R6785 removes ground potential from the different sets of contacts on the relays in the precedence sensing group 6701 in order to prevent any of the circuits from being completed therethrough for operating the M relay R6820, the O relay R6825, the P relay R6830, the N relay R6835, the R relay R6840, the space relay R6850, the A relay R6855, the Z relay R6860 and the V relay R6865. Consequently, as long as the relay R6785 remains in its operated position, it prevents subsequent operation of the relays in the relay sensing group 6701 from operating any one of the above noted relays to register a corresponding character.

The next character sensed by the tape reader 1420 is the first of five "bell" characters which will thereby cause the operation of the relays R6710PA and R6710PC in the precedence sensing group 6701. At the contacts 6712 and 6738, the above noted relays in their operated positions apply ground potential to the "bell" conductor in order to operate the bell relay R6810. As soon as the relay R6810 operates it completes, at its contacts 6811', the previously described circuit for operating the relay R6790. The latter relay upon operating, at its contacts 6792', completes the locking circuit for the upper winding of the bell relay R6810 from the grounded conductor C6702SU1. As a further result of the operation of relay R6810, at its contacts 6811, it applies ground potential to the conductor C6803BELL extending to Fig. 71 and then by way of the contacts 7111 in order to operate the relay R7105.

At the end of the sensing of the first "bell" character by the tape reader 1420, the relays R6710PA, R6710PC, R6790 and R6810 all restore to normal. Incident to the restoration of the relay R6790, at its contacts 6792, it applies the ground potential on the conductor C6702SU1, to the conductor C6702SUB extending to Fig. 71. In Fig. 71 the ground potential is further extended by way of the contacts 7133, the winding of the relay R7110, contacts 7106, and the winding of relay R7105, to battery, thereby to retain the relay R7105 in its operated position and to operate in series therewith, the relay R7110. Thus, the relays R7105 and R7110 operate to register the first bell character in the flash and emergency detector 7100FE.

The second bell character sensed by the tape reader 1420 controls the relays in the precedence sensing group 6701 in the manner previously described, whereby, a second ground pulse is applied to the conductor C6803BELL in order now to complete a circuit, including the contacts 7112 and 7121, for operating the relay R7115. At the end of the sensing of the second bell character, the ground potential is removed from the conductor C6803BELL and the relay R7115 now locks itself, by way of its contacts 7116, in series with the winding of the relay R7120, contacts 7133, conductor C6702SUB extending to Fig. 67, contacts 6792 of the now restored relay R6790 and the grounded conductor C6702SU1. The relay R7120 operates over this circuit in series with the relay R7115 in order now to register the second bell character in the flash and emergency detector 7100FE.

In response to the sensing of the third bell character by the tape reader 1420, the relays reoperate in the manner previously described thereby to transmit a third ground impulse over a circuit including the conductor C6803BELL, contacts 7112, 7122 and 7131 in order to operate the relay R7125. At the end of the sensing cycle of the third bell character, the relay R7125 locks itself in series with the relay R7130 to the conductor C6702SUMU extending to Fig. 67 and then by way of the contacts 6793 of the now restored relay R6790 to the grounded conductor C6702SU1. It should be noted that the relay R7130 upon operating in series with the relay R7125 transfers, at its contacts 7132 and 7133, the locking circuits for the first two pairs of relays R7105—R7110, and R7115—R7120 from the grounded conductor C6720SUB to the conductor C6702SUMU. Thus, the third bell character is now registered in the flash and emergency detector 7100FE.

The last two bell characters of the five bell characters sensed by the tape reader 1420 control the various relays in the precedence sensing group 6701 as well as the relay R6810 and R6790 in the manner previously explained. However, the last two bell characters, in effect, are absorbed by the flash and emergency detector 7100FE since additional pairs of relays for registering the last two bell characters are not provided. The locking circuit for the three pairs of operated relays in the detector 7100FE is retained by the application of ground potential on the conductor C6702SUMU either by the contacts 6813 of the operated bell relay R6810 or by the contacts 6792 of the restored relay R6790.

After any three, four or five bell characters have been sensed in sequence by the tape reader 1420, the flash and emergency detector 7100FE is conditioned to respond to the character E of the emergency indicator. However, between the last bell character and the character E, a "letters shift" character function is perforated on the tape to change the setting of any electric typewriter from a figures shift position to the letters shift position. It is understood that the bell characters are type instead of the letter S (see Fig. 89) due to the fact that the bell characters are preceded by the "figures shift" character function. Therefore, in order to restore the typewriter to the letters shift position, the "letters shift" character function is perforated on the tape after the last or fifth bell character.

When the "letters shift" character function is sensed by the tape reader 1420 it causes all of the relays R6710PA to R6710PE, inclusive, to operate and complete at their respective contacts 6718, 6730, 6744, 6758 and 6771, a circuit for applying ground potential by way of the "letters shift" conductor to operate the letters shift relay R6845. The circuit for operating the last mentioned is further extended by way of the contacts 6848 in order to operate the slave relay R6790. The relay R6790 upon operating removes the locking ground potential, at its contacts 6792, from the conductor C6702SUMU extending to Fig. 71 but in the meantime, the relay R6845, at its contacts 6846, retains the locking ground potential on this conductor. Consequently, the relays in the flash and emergency detector 7100FE remain in their locked positions. Also, at its contacts 6849, the relay R6845 shunts the figures shift relay R6785 which now restores to normal. At the end of the sensing cycle of the "letters shift" character function, the relays R6845 and R6790 restore to normal thereby to retain the relays in the flash and emergency detector 7100FE operated, in the manner previously explained.

The tape reader 1420 now senses the character E and thereby completes a circuit for operating the relay R6710PA in the precedence sensing group 6701. At its contacts 6712, the relays R6710PA now completes a circuit including the "E" conductor for operating the E relay R6805 and in multiple therewith, the slave relay R6790. The relay R6805, at its contacts 6806, now applies a ground potential to the conductor C6803E extending to Fig. 71 and then by way of the contacts 7135 in order to operate the emergency relay R7150. The latter relay, at its contacts 7154, now locks itself in its operated position to ground at contacts 7201 on the operated relay R7200.

At the end of the sensing cycle of the E character, the various operated relays in the precedence sensing unit 6700 restores to normal in the manner previously described, whereby the contacts 6793 retain the locking ground potential on the conductor C6702SUMU. This retains the relays R7105 to R7130 in their operated positions.

The flash and emergency detector 7100FE is quite similar to the remaining detectors in the precedence detector 7100 in that the operated relays R7105 to R7130 will be restored to normal in the event that the relays in the precedence sensing group 6701 fail to sense the three successive "bell" characters of the five bell characters sensed by the tape reader 1420. In other words, if any character other than "bell" is sensed as a second or third character, the relays R7105 to R7120 will be restored to normal due to the fact that the ground potential will be removed from the locking conductor C6702SUB during a portion of the sensing cycle. Also, if any character other than "bell," "E," "F," or "letters shift" if received after the third bell character is detected, ground potential will also be removed from the conductor C6702SUMU and will cause the relays R7105 to R7130 to restore to normal. Consequently, in order to detect an "emergency" or a "flash" precedence indicator, it is necessary to receive at least three successive "bell" characters and then followed by an E or an F character. The E character, as described above, operates and locks the emergency relay R7150 to indicate that an "emergency" precedence indicator has been successfully registered in the detector 7100FE.

As a further result of the operation of the emergency relay R7150, at its contacts 7155, it applies ground potential to the conductor C6902DC extending to Fig. 69 in order to operate the disconnect relay R6910 in the manner previously described. Also, at its contacts 7153, the relay R7130 removes ground potential from the conductor C7001E extending to Fig. 70 and terminating in the contacts 5 accessible to the wipers 7012 and 7013 of the precedence indicator switch 7010 (Fig. 70) to indicate that the "emergency" precedence indicator has been registered in the detector 7100FE.

During the sensing operation of the "emergency" precedence indicator (five bell characters followed by the letters EM) it was assumed that a "figures shift" character function preceded the indicator and that the "letters shift" character function was inserted between the last bell character and the letter E. However, if during the preparation of this message at its original transmitting station, the operator fails to include the "figures shift" and "letters shift" character functions, the precedence sensing unit 6700 and the precedence detector 7100 will operate to detect an "emergency" indicator. In other words, the fact that the figures shift relay R6785 in the precedence sensing unit 6700 is not operated prior to the sensing of the bell characters and the fact that the letters shift relay R6845 is not operated after the last bell character is sensed will not prevent the detection and registration of an "emergency" or "flash" precedence indicator.

In the above description of the operation of the flash and emergency detector 7100FE it was assumed that the three bell characters are received in sequence and cause the relays R7105 to R7130 to be locked to the grounded conductor C6702SUMU. If a "space" character is interposed between the successive bell characters, the operated ones of the relays R7105 to R7120 will restore to normal. In order to avoid this and to take care of the inadvertent perforation of the "space" character function, as noted above, the windings of the relays R7110 and R7120, which are shown connected to the conductor C6702SUB by way of the contacts 7133, could instead be connected directly to the conductor C6702SUMU. With this arrangement, the relays would operate in response to the successive bell charter and they would remain locked in their operated positions even though "space" character functions were interposed therebetween. This condition will prevail only if the "figures shift" character is not used.

Normally, the E character of the emergency precedence indicator will be followed by the M character and the tape reader 1420 will operate the relays R6710PC, PD and PE in the precedence sensing group 6701, and the M relay R6820 and the slave relay R6790 will operate in the normal maner. However, due to the fact that the disconnect relay R6910 has operated and removed the ground potential at the contacts 6912 from the contacts 6821 on the M relay R6820, the M character is merely absorbed at this time by the relays in the precedence sensing unit 6700. Also, if any other character is sensed by the precedence sensing unit 6700, the slave relay R6790 will also be operated and, as previously explained, it opens its contacts to remove the holding ground potentials from the operated relays R7105 to R7130 in the detector 7100FE in order to restore these relays to normal. Since the emergency relay R7150 is operated and locked to the contacts 7201, the emergency precedence indicator is retained registered in the detector 7100FE.

*Detecting a "flash" precedence indicator (bell bell bell bell bell FL)*

The detailed description of the flash and emergency detector 7100FE to detect and register a "flash" precedence indicator sensed by the tape reader 1420 and the precedence sensing unit 6700 is exactly the same as has been described above in connection with the detection of an "emergency" precedence indicator. The first three "bell" characters are registered by the successive operation of the three pairs of relays R7105—R7110, R7115—R7120 and R7125—R7130. The last two of the five bell characters, however, are absorbed in the manner previously described and, thereafter, the "F" character sensed by the tape reader 1420 controls the relays in the precedence sensing group 6701 to operate the F relay R6815 and in multiple therewith, the slave relay R6790 in the precedence sensing unit 6700. In sensing the "F" character, the relays R6710PA, PC and PD are operated to close the respective contacts 6712, 6738 and 6754 to complete the circuit including the "F" conductor for operating the F relay R6815. At its contacts 6816, the relay R6820 applies ground potential to the conductor C6803F extending to Fig. 71 and then by way of the contacts 7134 and the winding of the flash relay R7140, to battery. The relay R7140, at its contacts 7144, locks itself in its operated position to ground at contacts 7102 of the operated relay R7200. Also, at the contacts 6817, the relay R6815 retains the locking ground potential on the conductor C6702SUMU (the relay R6790 having been operated) in order to retain the three pairs of relays R7105 to R7130, inclusive, in the detector 7100FE in their operated positions.

As soon as the flash relay R7140 operates, it removes ground potential, at the contacts 7143, from the conductor C7001F extending to Fig. 70 and terminating in the contacts 6 accessible to the wiper 7012 and 7013 of the precedence indicator switch 7010 in order to indicate that the "flash" precedence indicator has been successfully registered in the flash and emergency detector 7100FE. The remaining contacts controlled in response to the operation of the flash relay R7140 perform the same function as has been previously described in connection with the operation of the emergency relay R7150.

*Detecting a multiple call indicator (ZVA)*

Inasmuch as the precedence detector 7100 is also provided with the multiple address detector 7100A it is deemed advisable at this time to describe the operation thereof, although the multiple call indicator ZVA is not sensed by the tape reader 1420 until after the sensing of a routing indicator which will determine the switching center that is to be held responsible for the routing of a multiple call message to a plurality of called tributary stations or destinations. In other words, when a multiple call message is received, the multiple call indicator ZVA will appear on the tape immediately following the particular routing indicator identifying the relay switching center that is to process the message. In processing the message the designated relay switching center will see to it that the message will ultimately be transmitted to the different destinations identified by the different routing indicators appearing on the tape following the multiple call indicator ZVA.

In view of the foregoing, it will be assumed that the tape reader 1420, the relays in the precedence sensing group 6701 and the relays in the multiple address register 6802, sequentially respond to the characters ZVA appearing on the perforated tape. In accordance with the code illustrated in Fig. 89, the character Z sensed by the tape reader 1420 causes the operation of the relays R6710PA and R6710PE in the precedence sensing group 6701. At the contacts 6720 and 6775, the above noted relays complete a circuit, whereby, ground potential is extended by way of the "Z" conductor for operating the Z relay R6870 and in multiple therewith, the slave relay R6790. The relay R6860 upon operating, at its contacts 6861, applies ground potential to the conductor C6803Z extending to Fig. 72 and then by way of the contacts 7216 in order to operate the relay R7210 in the multiple address detector 7100MA.

It may be well to mention at this time that the three relays in the multiple address register 6802 may be independently operated to register the characters ZVA in the multiple address detector 7100MA even though one of the other detectors in the precedence detector 7100 has been previously operated, (during the sensing of the present message) to register the particular precedence indicator of the message.

At the end of the sensing cycle of the Z character, the operated relays in the precedence sensing group 6701 restore to normal and the Z relay R6860 and the slave relay R6790 restore to normal. At the contacts 6799, the relay R6790 reapplies ground potential to the conductor C6702SUV extending to Fig. 72 and then by way of the contacts 7227, the winding of relay R7215, contacts 7211 and the winding of relay R7210, to battery. This locking circuit for the relay R7210 is completed before the initial operating ground therefor is removed from the conductor C6803Z by the restoration of relay R6860 and the relay R7215 operates in series with the relay R7210.

In response to the sensing of the second character V of the multiple call indicator ZVA, the relays R6710PB, PC, PD and PE in the precedence sensing group 6701 are operated. At the respective contacts 6734, 6749, 6763 and 6776 of these relays, ground potential is applied to the "V" conductor in order to operate the V relay R6865 and in multiple therewith, the slave relay R6790. At its contacts 6867, the relay R6865 retains the holding ground potential on the conductor C6702SUV extending to Fig. 72 before the relay R6790 operates. Also, at its contacts 6866, the relay R6865 applies ground potential to the conductor C6803V extending to Fig. 72 and then by way of the contacts 7217 and 7228 and the winding of the relay R7220, to battery in order to operate the latter relay.

At the end of the sensing cycle of the character V the operated relays in the precedence sensing group 6701, the slave relay R6790, and the V relay R6865 restore to normal. The relay R6790, at its contacts 6799 and 6791', reapplies ground potential to the conductors C6702SUV and SUA extending to Fig. 72 in order to retain the first pair of relays R7210—R7215 in their operated positions and in order to complete the locking circuit by way of the conductor C6702SUA, the winding of the relay R7225 and the contacts 7221, for the relay R7220. The relay R7225 operates in series with the relay R7220 and, at its contacts 7226 and 7227 transfers the locking circuit for the first pair of relays R7210—R7215 from the grounded conductor C6702SUV to the grounded conductor C6702SUA.

In response to the sensing of the third character A of the multiple call indicator ZVA, the relays R6710PA and PB in the precedence sensing group 6701 are operated and at the respective contacts 6720 and 6732, these relays apply ground potential to the "A" conductor in order to operate the A relay R6855 and, in multiple therewith, the slave relay R6790. At its contacts 6857, the relay R6855 applies ground potential to the conductor C6702SUA before the slave relay R6790 operates and thereby retains the first two pairs of relays R7210—R7215 and R7220—R7225 in the multiple address detector 7100MA in the operated positions. Also, at the contacts 6856, the relay R6855 applies ground potential to the conductor C6803A extending to Fig. 72 and then by way of the contacts 7229 and 7246 in order to operate the relay R7230. As soon as this relay operates it locks itself by way of its contacts 7231, the winding of relay R7240, contacts 7203 of the operated relay R7200, conductor C4497–ZVS extending to Fig. 44 and ground at the contacts 4486. The relay R7240 operates in series with the relay R7230 and, at its contacts 7244, applies ground potential to the conductor C2983MA8 extending to Fig. 29 in order to operate the ZVA relay R2960 in the prosign sensing unit 2900. In Fig. 29 it will be seen that the ground potential applied to the conductor C2983MA8 to operate the ZVA relay R2960 is also extended by way of the conductor C2982MA8 extending to Fig. 44 in order to operate the Z1 relay R4485 in the sequence control unit 4100. The controls exercised in response to the operations of the ZVA relay R2960 in the prosign sensing unit 2900 and the Z1 relay R4485 in the sequence control unit 4100 (Fig. 44) will be described hereinafter.

At the end of the sensing cycle of the character A, the operated relays in the precedence sensing group 6701, the relay R6790 and the relay R6855 restore to normal. Until another character function is received from the tape reader 1420 to operate one or more of the relays in the precedence sensing group 6701, the slave relay R6790 will remain in its restored position to hold the locking ground potential on the conductor C6702SUA extending to Fig. 72 in order to retain the first two pairs of relays R7210—R7215 and R7220—R7225 in their operated positions. However, as soon as the relay R6790 operates in multiple with any one of the relays in the precedence register 6801 or in the multiple address register 6802, the locking ground potential will be removed from the conductor C6702SUA to permit the above noted two pairs of relays to restore to normal. However, the relays R7230 and R7240 will remain locked in their operated positions to the grounded conductor C4497ZVS until ground is removed therefrom or until the release 2 relay R7220 restores to normal.

In the above description of the operation of the relays in the multiple address detector 7100MA it was assumed that the ZVA characters were received in the sequence noted and that no "space" characters or other characters were interposed therebetween. It should be understood, however, from the previous description of the mode of the operation of the various detectors in the precedence detector 7100 that if the ZVA characters are not received in the precise sequence or order, the operated relays in the detector 7100MA will automatically restore to normal. It should also be understood from the previous description that if the first Z character is repeated as a second or a third character in the sequence, all of the operated relays in the multiple address detector 7100MA will restore to normal. The first pair of relays R7110—R7115 will, however, be reoperated to register the repeated Z character as the first character of a new sequence of ZVA characters.

*Preventing false operation of the precedence sensing unit 6700 and the precedence detector 7100*

Before proceeding with the description of the operation following the successful registration of a precedence indicator in the precedence detector 7100, a description will first be given of the operation of the relays in the precedence unit 6700 to prevent the precedence detector 7100 from responding to signals transmitted to the precedence sensing group 6701 which correspond to either two or three letters codes identifying the incoming channel or lines over which the message has been received by the relay switching center UAC or which correspond to three digit codes identifying the number of the particular message that is received over the identified incoming channel or line or which correspond to plural letter codes which may not be acceptable as proper letters for any particular registerable precedence indicator.

In this connection it will be recalled that the multiple call message received at the relay switching center UAC included a start-of-message indicator comprising the characters XZXZXZX (Item 1) and that the multiple call equipment in responding to the seven characters noted above, control certain multiple call processing apparatus so that the precedence sensing unit 6700 is associated with the tape reader 1420 in the multiple call storage unit 1400. The next item of information that is actually sensed by the tape reader 1420 is Item 2, previously noted, which includes the letters ABC identifying the incoming channel or line over which the message is received, followed by a "figures shift" character function, then a three-digit channel or line number 014, and finally a "letters shift" character function. However, in the foregoing description of the operation of the precedence sensing unit 6700 to detect and register any one of the previously mentioned six different precedence indicators in the precedence detector 7100 which is ordinarily Item 3 of the multiple call message, the information of Item 2 of the message was omitted.

When the tape reader 1420 senses the three letters, which in the present example are the letters ABC, identifying an incoming channel or line, the relays in the precedence sensing group 6701 will operate in code combinations in accordance with Fig. 89 in the manner previously described. The letter A sensed by the tape reader will cause the operation of the relays R6710PA and PB, as previously described, by closing the contacts 6720 and 6732 and will thereby cause the operation of the A relay R6855 and the relay R6790, as previously noted. However, due to the fact that the precedence detector 7100 can only accept the letter A following the previous registration of the letter Z in the multiple address detector 7100MA, the operations of relays R6855 and R6790 perform no controls at this time. The second letter B of the channel indicator (Item 2) will operate the relays R6710PA, PD and PE. Since no corresponding relay is provided in either the precedence register 6801 or the multiple address detector 6802, this letter does not operate any relays in the last mentioned registers.

The sensing of the third character C of the channel indicator ABC (Item 2) will operate the relays R6710PB, PC and PD in the precedence sensing group 6701. As in the case of the sensing of the letter B, the precedence register 6801 and the multiple address register 6802 do not respond, inasmuch as no corresponding relay is provided therein.

At this time it is necessary to digress in order to explain the function of contacts 6711, 6722, 6735, 6750 and 6764 provided respectively on the relays R6710PA, PB, PC, PD and PE. Whenever one or more of the relays noted above closes one or more of the above noted contacts, a circuit is completed from battery, by way of the resistor 6709, contacts 6791, the winding of relay R6780, and the grounded conductor C6702SU-1. The relay R6780 operates and prepares, at its contacts 6781, a point in a locking circuit for itself which is completed as soon as its initial operating circuit is interrupted by the restoration of the operated ones of the relays in the precedence sensing group 6701. Accordingly, when the battery potential through the resistor 6709 is removed from the circuit including the winding of relay R6780, the locking circuit becomes effective from the grounded conductor C6702SU-1 through the winding of relay R6780, contacts 6781 and the winding of the slave relay R6790, to battery. The relay R6790 operates at this time and, at its contacts 6791, opens a point in the previously described initial operating circuit for relay R6780. Thus, the relays R6780 and R6790 remain locked in their operated positions over a circuit which is independent of the circuit including the contacts 6711, 6722, 6735, 6750 or 6764. Whenever the two relays R6780 and R6790 are locked in their operated positions in the manner described above, they will remain in their locked positions as long as the relays in the precedence sensing group 6701 are controlled in accordance with code combinations corresponding to letters or digits or other character functions that are not identified by corresponding relays in the precedence register 6801 or in the multiple address register 6802.

In view of the foregoing, it will be appreciated that the relays in the precedence sensing group 6701 may be operated and restored in accordance with different unacceptable characters but the relays R6780 and R6790 will remain in their operated positions. As soon as the relays in the precedence sensing group 6701 are operated in accordance with a character corresponding to one of the relays provided in the precedence register 6801 or the multiple address register 6802, the relays R6780 and R6790 will be unlocked to permit their restoration incident to the completion of the sensing of the particular character.

In order to explain this operation, it will be assumed that the relays R6780 and R6790 are locked in series to the grounded conductor C6702SU-1 in the manner described above. If the relay R6710PA is now operated in response to the sensing of the character E by the tape reader 1420, a circuit will be completed from ground at contacts 6712, contacts 6724, 6737, 6752, 6766, and the "E" conductor in order to operate the E relay R6805. This relay, at its contacts 6809, further extends the ground potential on the "E" conductor to retain the slave relay R6790 in its operated position. However, the operating ground potential for the relay R6790 is further extended over the circuit including contacts 6781 and thereby shunts the relay R6780 which now restores to normal. At the end of the sensing cycle of the character E, the relay R6710PA restores to normal and thereby removes the ground potential from the "E" conductor to cause the restoration of the E relay R6805 and the slave relay R6790. Consequently, the relays R6780 and R6790 are now restored to normal so that characters which are acceptable by the precedence register 6801 and the multiple address register 6802 will be registered in the manner described hereinbefore.

In describing the operation of the precedence sensing unit 6700 in response to the sensing of the characters ABC (Item 2) of the channel indicator, it was pointed out that the characters B and C were not acceptable by the registers 6801 and 6802. Consequently, the relays R6780 and R6790 were operated in response to the sensing of the character B and remained operated thereafter.

The "figures shift" character function of Item 2 of the multiple call message is now sensed by the tape reader 1420 and causes the operation of relays R6710PA, PB, PD and PE in the precedence sensing group 6701. At the respective contacts 6712, 6723, 6751 and 6765, a circuit including the "figures shift" conductor, the winding of the figures shift relay R6785, the resistor 6788, and battery, is completed for operating the relay R6785. This relay upon operating, locks itself by way of its contacts 6786 to the grounded conductor C6702SU-1. As a further result of the operation of the figures shift relay R6785, at its contacts 6787, it removes ground potential from the contacts on the relays in the precedence sensing group 6701 which are utilized in completing circuits for grounding the conductors F, M, O, P, N, R, A, Z, V, and "space." Accordingly, once the figures shift relay R6755 has been operated, the relays in the relay sensing group 6701 can no longer control the relays corresponding to the above noted conductors in the precedence register 6801 and the multiple address register 6802 until the figures shift relay R6785 is again restored to normal. This can only be done by sensing a "letters shift" character or by removing ground potential from the conductor C6702SU-1.

As the tape reader 1420 senses the digits 014 included in Item 2 of the multiple call message and following the sensing of the "figures shift" character function, the relays in the precedence sensing group 6701 will respond in the normal manner but they will not perform any operating controls of the remaining relays in the precedence sensing unit 6701. It is noted that the relays R6780, R6785 and R6790 are still locked to the conductor C6702SU-1.

Following the sensing of the three digits 014, the tape reader 1420 then senses the "letters shift" character function included in Item 2 of the multiple call message. When this occurs, all of the relays in the precedence sensing group 6701 operate to complete at the respective contacts 6718, 6730, 6744, 6758 and 6771, a circuit including the "letters shift" conductor for operating the letters shift relay R6845. This relay upon operating, at its contacts 6848, extends the ground potential on the "letters shift" conductor to the winding of the slave relay R6790 to hold the latter relay in its operated position and to the winding of the relay R6780 in order to restore the last mentioned relay. As a further result of the operation of the letters shift relay R6845, at its contacts 6849, it completes a shunting circuit for restoring the figures shift relay R6785. As soon as the relay R6785 restores, it reconnects the ground potential, at the contacts 6787, to enable the relays in the precedence sensing group 6701 to again control all of the relays in the registers 6801 and 6802.

In further explanation of the reason for operating the figures shift relay R6785 during the sensing of the digits identifying the number (Item 2) of a multiple call message, attention is directed to the fact that the perforations on the tape sensed by the tape reader 1420 which correspond to the various digits 1 to 9 and 0 also correspond to predetermined letters as is apparent in Fig. 89. Since it is necessary to utilize three-digit numbers to identify the different messages in the sequence that they are received, it is impossible to avoid the use of digits which do not correspond to certain of the letters of the different predetermined precedence indicators. Consequently, by operating the figures shift relay R6785 prior to the sensing of the digits, the false operation of the relays in the precedence detector 7100 is prevented.

*Detecting the routing indicator UAC*

In the previous description of the operation of the precedence detector 7100, it was pointed out that when any one of the precedence indicators were registered in the different detectors 7100NM, 7100RR, 7100PP, 7100-OP or 7100FE a ground potential was applied to the conductor C692DC extending to Fig. 69 in order to operate the disconnect relay R6910 in the precedence unit 6700.

Figure 34:
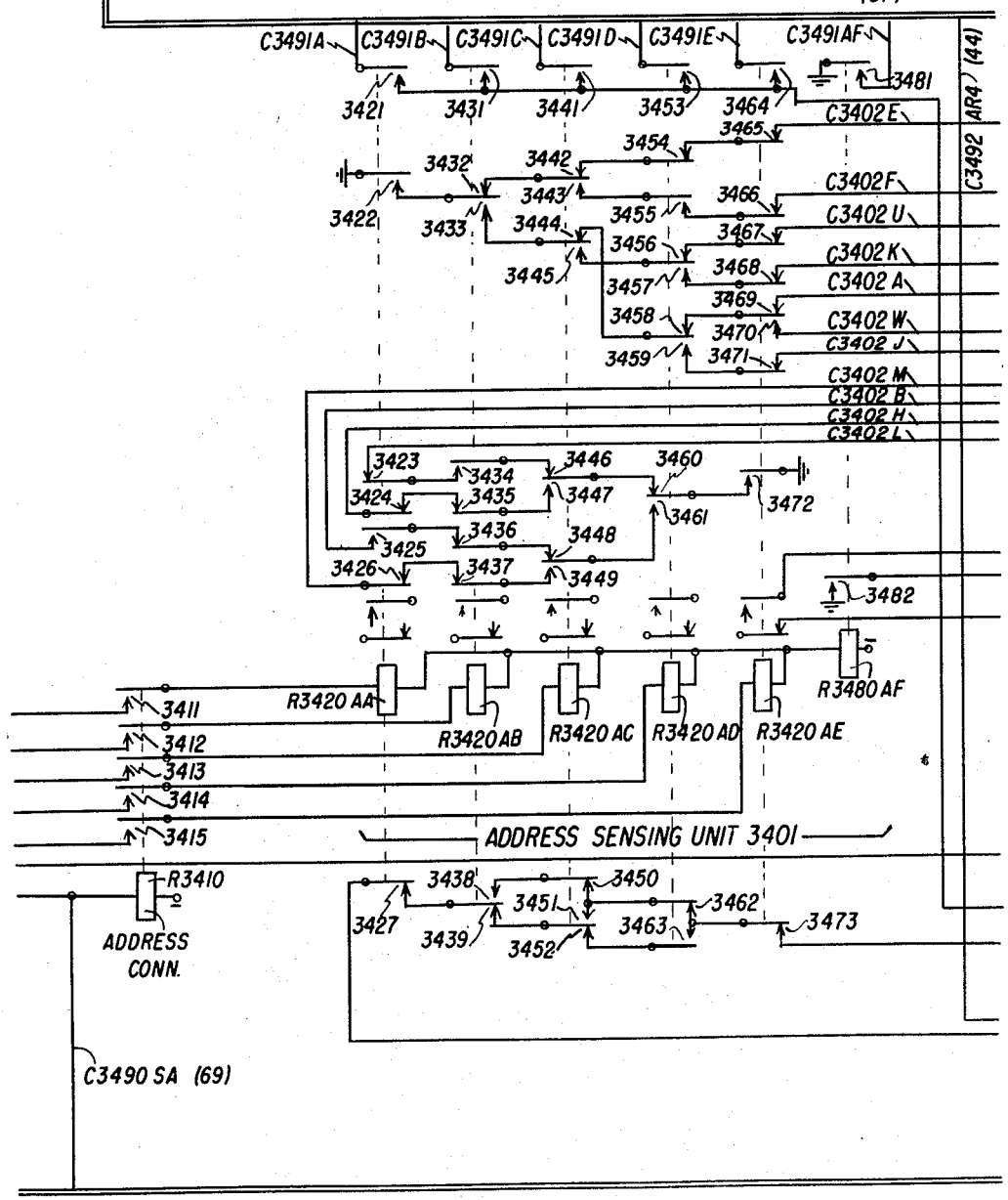

This relay, at its contacts 6914, applied ground potential to the conductor C3490SA extending to Fig. 34 in order to operate the address connect relay R3410. The latter relay, at its various contacts, connects the relays in the address sensing unit 3401 in multiple with the corresponding relays in the precedence sensing group 6701 to the marking conductors C1716LA to C1716LE, inclusive. Accordingly, the address sensing unit 3401, as well as the precedence sensing group 6701 will be controlled as the tape reader 1420 senses the routing indicator UAC of Item 4 of the multiple call message. This item appears on the tape, sensed by the tape reader 1420, immediately after the precedence indicator of Item 3 which in the present case is the deferred indicator NMNM. The routing indicator UAC of the multiple call message (Item 4) identifies the relay switching center that has received the present multiple call message.

In order to detect and register the letters included in a routing indicator, the common equipment of the multiple call processing apparatus includes the address detector 3300 of Figs. 33 to 36, inclusive, and the processing routing register 3700 of Figs. 37 and 38. These units of equipment cooperate to register each of the three, four or five letters of a routing indicator that is perforated on the tape 1413 and which is sensed by the tape reader 1420 to determine whether the first three letters of a routing indicator correspond to an available relay switching center. Furthermore, the address detector 3300 and the processing routing register 3700 cooperate to control the multiple call translator 2100 of Figs. 21 to 28, inclusive, and the sequence control unit 4100 of Figs. 41 to 44, inclusive, in the manner to be described hereinafter.

Although the relays in the precedence sensing group 6701 of the precedence sensing unit 6700 are now connected in mutiple with the relays of the address sensing unit 3401 in the address detector 3300, the precedence sensing unit 6700 in responding to the sensing of different letters of the routing indicators by the tape reader 1420 perform no function in connection with the detection and registration of such routing indicators. However, the address detector 3300 will be selectively controlled in accordance with the different letters of the routing indicators.

Referring now to the address detector 3300 (Figs. 33 to 36, inclusive) it will be seen that the relays R3420AA, AB, AC, AD and AE are controlled, in substantially the same manner as the corresponding relays in the precedence sensing group 6701, by the tape reader 1420 and but in addition thereto, the relay R3480AF will operate in series with any one of the above noted relays R3420AA, etc. The above noted relays in the address sensing nnit 3401 are selectively controlled in accordance with the codes of the different characters on the perforated tape 1413 and they perform various operations, whereby, the address detector 3300 and the processing routing register 3700 will sense and register the characters forming a three, four or five letter routing indicator. The sequence control relay unit 3501, included in the address detector 3300, is provided to determine whether the first and the second characters sensed by the address sensing unit 3401 are good first and second characters and are sensed in the proper sequence.

In the sequence control relay unit 3501, the relays R3510NB, NJ, NU and N have been illustrated. The first three relays, noted above, are connected to the pyramid contacts on the relays in the address sensing unit 3401 and they operate only in response to the sensing of the letters B, J and U respectively. The relay R3510N is representative of an additional character which may be added in the future as a new first character of a routine indicator. If additional relays, such as the relay R3510N are required to increase the capacity of the switching system they will be connected to the pyramid contacts on the relays in the address sensing unit 3401 so that they will be operated in accordance with the perforated codes of corresponding letter.

The address sensing unit 3401 is also arranged so that it will control, through the pyramid contact arrangement, any one of the eight sequence control relays R3510A, E, F, H, K, L, M and W. These relays respectively indicate the corresponding second letter in a routing indicator. The relay R3510AR is representative of any of the other letters in the alphabet which may be added as second letters in a routing indicator. It should be understood that this relay and all of the other added relays representing second letters of a routing indicator will also be connected through the pyramid contacts on the relays in the address sensing unit 3401 in substantially the same manner as has been illustrated.

Referring now to the processing routing register 3700 (Figs. 37 and 38) associated with the address detector 3300, it will be seen that it is provided with five registers 3701 to 3705, inclusive. Each of the above registers includes five relays, such as R3710A to R3710E, inclusive, which are operated individually or in combinations to register the letters sensed by the relays in the address sensing unit 3401. As each letter is sensed, it is sequentially registered in the registers 3701 to 3705, inclusive. This is made possible under control of the relays R3750, R3760, R3820, R3830, R3840 and R3850 which are sequentially operated in a predetermined order to connect up the relays of the registers 3701 to 3705, inclusive, in the corresponding order.

The processing routing register 3700 is provided normally to register a second letter in the register 3702, but, if this letter is not acceptable as a "good" second letter, but is instead acceptable as a "good" first letter of a routing indicator, it will be retained in the registers 3702 so that the next or third letter, if it appears to be a good second letter, may then be registered in the first register 3701. Thus, the processing routing register 3700 is arranged so that it will register a sensed second letter of a routing indicator in the second register 3702 either as a good second letter or as a good first letter.

The present system is also arranged so that the first letter of a routing indicator must be one of the three letters B, J or U, it being understood, of course, that this may be increased to the twenty-six letters of the alphabet, if necessary, by adding appropriate relays in the sequence control relay unit 3501. Also, the present system is arranged so that the second letter of a routing indicator must be any one of the eight letters A, E, F, H, K, L, M or W. If a second letter sensed by the address sensing group 3401 is any other letter than the eight noted above, it will not be acceptable as a good second letter. However, if the second character happens to be one of the three letters B, J or U, it will be accepted and registered as a good first character in the second register 3702 as previously noted.

The routing indicator UAC (Item 4) of the multiple call message identifies the relay switching center UAC which has received the present multiple call message. Consequently, the first letter U of the routing indicator UAC is sensed by the tape reader 1420 in the manner previously described and thereby causes the operation of the relays R3420AA, AB and AC and in multiple therewith, the relay R3480AF. At the contacts 3422, 3433 and 3445, the relays R3420AA, AB and AC apply ground potential by way of the contacts 3456 and 3467, the conductor C3402U and the winding of relay R3510NU, to battery. Thus, it is apparent that the first character U of the routing indicator UAC is a good first character and is acceptable by the address detector 3300. However, it should be noted that if the first character of the routing indicator is either the letter B or the letter J, the corresponding relays R3510NB or R3510NJ would operate under control of the relays in the address sensing unit 3401. The relays R3510NB, NJ and NU are provided with contacts which are multiply connected and, consequently, each of the above relays perform the same operating controls.

The relay R3510NU operates and, at its contacts, 3516, it applies ground potential to the start conductor C3551ST extending to Fig. 37, then by way of the contacts 3555' and the upper winding of the network relay R3750, to battery. The network relay R3750 is of the two-step type and in response to the energizing circuit including its upper winding, it closes only its X contacts 3756' thereby to provide a locking circuit which will include its upper and lower windings when the ground potential is subsequently removed from the conductor C3551ST. The conductor C3601SU2 extending to Fig. 36, has been grounded at the contacts 3694 of the now operated release relay R3690 (Fig. 36). The ground potential applied to the conductor C3551ST in order to operate the relay R3750 in its first step is also extended by way of the contacts 3753', conductor C3551AR3 extending to Fig. 35, contacts 3543 to the make contacts 3421, 3431, 3441, 3453 and 3464 of the respective sensing relays in the address sensing unit 3401.

As previously pointed out, the contacts 3421, 3431 and 3441 have been closed incident to the operation of the relays R3420AA, AB and AC in accordance with the first letter U of the routing indicator. Therefore, the ground potential on the above noted contacts is further extended by way of the conductors C3491A, B and C, extending to Fig. 37 and then by way of the respective contacts 3751, 3573 and 3755 in order to operate the relays R3710A, B and C in the register 3701. The operation of the above noted relays registers the letter U in the register 3701. As soon as the relays R3710A, B and C operate, they immediately lock in their operated positions over a circuit including their respective inner-upper make contacts to the conductor C3601SU3 extending to Fig. 36 and then by way of the contacts 3641 and 3691, to ground. It should be noted that if the relays in the address sensing unit 3401 are operated in response to the sensing of either the letter B or J as a first character of a routing indicator, the register 3701 in the processing routing register 3700 will be operated to register the corresponding letter in the same manner as described above.

At the conclusion of the sensing of the first character U in the routing indicator UAC, the tape reader 1420 will cause the operated relays in the address sensing unit 3401 to restore to normal. As a result thereof, the relay R3410NU in the sequence control relay unit 3501 will also restore to normal. As soon as the last mentioned relay restores it interrupted, at its contacts 3516, the circuit for applying ground potential to the start conductor C3551ST. Therefore, the ground potential is removed from the initial operating circuit for the network relay R3750 and the latter relay operates fully over the previously described locking circuit including both its upper and lower windings and the ground conductor C3601SU2.

Incident to the full operation of relay R3750, at its contacts 3751 to 3759 and 3751', it transfers the conductors C3491A to C3491E, inclusive, from the register relays in the first register 3701 to circuits including the relays in the second register 3702. Thus, the second register 3702 is connected so that it will register the second character of the routing indicator under control of the relays in the address sensing unit 3401.

The tape reader 1420 now senses the second character A of the routing indicator UAC perforated on the associated tape whereupon the relays in the address sensing unit 3401 are operated in accordance with the letter A. Accordingly, the relays R3420AA and AB operate in series with the relay R3480AF. At the contacts 3422 and 3433, the relays R3420AA and AB extend ground potential to the conductor C3402A in order to operate the relay R3510A in the sequence control relay unit 3501. Since the letter A is a good second character, the relay R3510A, at its contacts 3528, now connects the winding of the good second character relay R3620 to the conductor C3551TH extending to Fig. 37 and then by way of the contacts 3762' and 3752' and the conductor C3491AF extending to Fig. 34 to ground at contacts 3481 of the operated relay R3480AF. The relay R3620 operates over this circuit and locks itself over a separate circuit, including its upper winding and its contacts 3624, to ground at contacts 3699. Thus, the good second character A is registered in the address detector 3300 by the operation of relay R3620. It should be mentioned at this time that the circuit for operating the good second character relay R3620 will be completed if any one of the relays, such as R3510A, is operated in accordance with a second character of a routing indicator. However, if any one of the above noted relays fails to operate in response to the second character of a routing indicator, a circuit will instead be completed for the bad second character relay R3610. The latter operation, however, will be described subsequently.

As a further result of the operation of the good second character relay R3620, at its contacts 3623, it extends the ground potential at the contacts 3482 to the conductor C3601STEP extending to Fig. 37 and then by way of the contacts 3763' and the upper winding of the area relay R3760, to battery. The relay R3760 is also of the two-step type and operates only its X contacts 3765' to prepare a locking circuit for itself including the grounded conductor C3601SU1 extending to Fig. 36. As a further result of the operation of the relay R3620, at its contacts 3622, it connects the ground potential at the contacts 3482 to the conductor C3601SP extending to Fig. 37 and then by way of the contacts 3821' and the upper winding of the network 2 relay R3820, to battery. The last mentioned relay is also of the two-step type and closes only its X contacts 3833' to prepare a locking circuit for itself which includes the upper and lower windings of the relay in series and the grounded conductor C3601SU1.

Since the network relay R3750, at its contacts 3754', has applied ground potential to the conductor C3551AR3, it retains ground potential on the upper make contacts of the sensing relay R3420AA to AE, inclusive, in the manner previously described. Accordingly, the contacts 3421 and 3431 have been closed by the operation of the corresponding relays in accordance with the second letter A of the routing indicator thereby to apply ground potential to the conductors C3491A and B extending to Fig. 37, contacts 3752 and 3754, contacts 3761 and 3763 and the windings of relays R3702A and B in the second register 3702, to battery. The last mentioned relays now operate and lock in their operated positions over a circuit including their inner-upper contacts and the grounded conductor 3C601SU3. Consequently, the good second character A of the routing indicator UAC is now registered in the second register 3702 of the processing routing register 3700.

In view of the foregoing, it should be apparent that any of the other seven good second characters, E, F, H, K, L, M and W may also be registered in the second register 3702 in the same manner. Also, it is apparent that other good second characters may be provided by supplying additional relays, such as the relay R3510AR and corresponding circuit connections.

At the end of the sensing cycle of the second character A of the routing indicator UAC, the tape reader 1420 causes the restoration of the operated relays in the address sensing unit 3401 and the restoration of the relay R3510A in the sequence control relay unit 3501. As soon as the relay R3510A restores to normal it interrupts, at its contacts 3528, the previously traced initial operating circuit for the good second character relay R3620 but the latter relay remains locked in its operated position to ground at contacts 3699. As a result of the restoration of relay R3480AF, at its contacts 3482, it simultaneously removes ground potential from the conductor C3601STEP and C3601SP extending to Fig. 37 thereby to cause the area relay R3760 and the network 2 relay R3820 to operate fully over circuits including, in series, the upper and lower windings of the respective relays. All of the contacts on the above noted relays are now actuated so that the circuits including the conductor C3491A to E, inclusive, are now transferred from the second register 3702 to the third register 3703. At the contacts 3764' and 3822' the relays R3760 and R3820 transfer the conductor C3601STEP to the circuit including the winding of the relay R3830.

The tape reader 1420 now senses the third character C of the routing indicator UAC and in the previously described manner causes the relays R3420AB, AC and AD to operate in series with the relay R3480AF. In the present system, the third character of a routing indicator may be any one of the twenty-six letters of the alphabet. If the third character sensed by the address sensing unit 3401 corresponds to any good first or second character, corresponding relay included in the sequence control unit 3501 will operate but it will perform no controls at this time. In other words, as the relays in the address sensing unit 3401 operate in response to third, fourth and fifth characters of a routing indicator (after the successful registration of good first and second characters) they merely register the corresponding letters in the third, fourth and fifth registers 3703, 3704 and 3705 of the processing routing register 3700.

In the present example, the letter C is sensed by the relays in the address sensing unit 3401 and, consequently, the relays R3420AB, AC and AD, at the contacts 3421, 3441 and 3453, extend ground potentials by way of the conductors C3491B, C and D thereby to register the letter C, in substantially the same manner as has been previously described, in the third register 3703. The operated relays (not shown) in the register 3703 will lock to the conductor C3601SU5 extending to Fig. 36 and which is grounded at the contacts 3695. As soon as the relay R3480AF operates, at its contacts 3482, it applies ground potential by way of the contacts 3623 to the step conductor C3601STEP extending to Fig. 37 and then by way of the contacts 3764', 3822' and 3831' in order to operate the relay R3830 in its first step to close only its X contacts 3833'.

At the end of the sensing cycle of the third character C of the routing indicator UAC the operated relays in the address sensing unit 3401 restore to normal. At the contacts 3482, the relay R3480AF removes ground potential from the above traced circuit including the conductor C3601STEP in order to permit the relay R3830 to be energized over the circuit including both of its windings, the X contacts 3833' and the grounded conductor C3601SU1. Accordingly, the relay R3830 now operates fully and transfers the circuits including the conductors C3491A to E, inclusive, from the third register 3703 to the fourth register 3704. Also, at its contacts 3832', the relay R3830 transfers the conductor C3601STEP to the circuit including the upper winding of the relay R3840. Accordingly, the address detector 3300 and the processing routing register 3700 have now been controlled to register the three routing digits UAC identifying the relay switching center including the switching apparatus illustrated in the drawings and which is held responsible for the retransmission of the particular multiple call to all of the destinations included in Item 6 of the multiple call message.

*Sensing the "space" character immediately following the routing indicator UAC*

Immediately following the perforations on the tape corresponding to the three letter routing indicator UAC identifying the present switching center, the perforations corresponding to a "space" function appears on the tape between the last letter of the routing indicator and the first letter of the multiple call message indicator ZVA. When the "space" character function is sensed by the tape reader 1420, the relay R3420AC in the address sensing unit 3401 is operated in substantially the same manner as has been previously described. At its contacts 3451, the relay R3420AC attempts to complete a circuit for the address received relay R3540 which may be traced from battery through the winding of the relay, contacts 3473, 3462, 3451, 3439, 3427, and then by way of the multiply connected contacts 3545 and 3547 to the conductors C3551–5CA and C3551–4CA extending to the processing routing register 3700. However, these conductors are not grounded at this time due to the fact that only three characters have been registered in the processing routing register 3700. As a further result of the operation of relay R3420AC, at its contacts 3441, ground potential is applied by way of the conductor C3491C extending to Fig. 37 and thereby registers the "space" character function in the fourth register 3704.

At the end of the sensing of the "space" character function, the relay R3420AC and the relay R3480AF restore to their normal positions. At the contacts 3482, the relay R3480AF removes ground potential from the step conductor C3601STEP and thereby causes the relay R3840 in the register 3700 to operate fully in the manner previously described, whereby, the fifth register 3705 is connected to the conductor C3491A to E, inclusive.

Although the present routing indicator described above includes only the three characters UAC, it should be appreciated from the foregoing description of the operation of the address detector 3300 and the processing routing register 3700 that a fourth letter of a four character routing indicator could be registered in the register 3704 instead of the "space" character function described above.

In the event a fifth character of a five letter routing indicator is sensed by the tape reader, the address sensing unit 3401 will operate in the manner previously described to register such a fifth character in the fifth register 3705 of the processing routing register 3700. Thus, it will be apparent that three, four or five letter routing indicators may be registered in the processing routing register 3700 under control of the address detector 3300. If either a "line feed," a "space" or a "carriage return" function is received after a four or a five letter routing indicator, the address received relay R3540 will operate to indicate that a complete address has been received and registered. When the "space" function is received following the third letter of a three letter routing indicator, such as UAC, the address received relay R3540 does not operate.

The multiple call routing indicator ZVA is now sensed by the tape reader 1420 in order to control the precedence sensing unit 6700 and the precedence detector 7100 to register the character ZVA in the multiple address detector 7100MA in the manner previously described. During the time that the precedence sensing unit 6700 is successively controlled by the letters ZVA sensed by the tape reader 1420, the relays in the address sensing unit 3401 will also be controlled in accordance with the corresponding characters. Consequently, the letter Z may be registered in the register 3705 of the processing routing register 3700 but this is of no importance at this time because the apparatus is only concerned with registering the three digits identifying UAC of the routing indicator identifying the present switching center. Also, the relays in the address sensing unit 3401 will be controlled in accordance with the letters V and A of the multiple address indicator ZVA but they are merely absorbed in the address detector 3300.

Since the foregoing description has been concerned with the operations of the address detector 3300 and the processing routing register 3700, a description will be given regarding the operations of these units of equipment when the first two characters of a routing indicator are not received in the expected and proper sequence. This description will be given before the discussion regarding the registration of the multiple call indicator ZVA and the controls exercised thereby.

Detecting a routing indicator which includes a "good" first character followed by a second character which is a "good" first character but not usable as a second character In the foregoing description of the address detector 3300, it was pointed out that a good first character, such as B, J or U, may be registered in the register 3701 of the processing routing register 3700. It was also pointed out that a good second character, either A, E, F, H, K, L, M, or W may be registered in the second register 3702. It was also pointed out that a third, fourth and fifth character of a routing indicator comprising any one of the twenty-six letters of the alphabet may be successively registered in the register 3703, 3704 and 3705. One of the special features of the address detector 3300 comprises the arrangement, whereby, the second character of a routing indicator, which does not happen to be any one of the above eight characters, will be registered in the second register 3702 provided it is the character B, J or U which, of course, is useable as a good first character of a routing indicator. This feature anticipates the possibility that a routing indicator being sensed by the address detector 3300 may include a useable first character B, J or U followed by a second character which is not any one of the eight second characters previously noted, but which may be any one of the characters B, J or U and could be used as the first character of a complete new routing indicator. Therefore, it is essential that the second character, although not useable as a good second character, may be registered in the second register 3702 as a good first character in order that successive third, fourth and fifth characters may be registered respectively in the first register 3071, the third register 3703, the fourth register 3704 and the fifth register 3705.

In order to describe this feature, it will be assumed that the tape reader has sensed the good first character U, in the manner previously described, and that it has been registered in the first register 3701. If the address detector 3300 is now controlled in accordance with another letter U or the letters B or J, one of the relays R3510U, B or J will be operated. Since the second letter being sensed by the detector 3300 is a good first character, but not useable as a second character, a circuit will now be completed for operating the good first character relay R3630. This circuit may be traced from battery, by way of the winding of the relay R3630, one of the contacts 3511, 3513 or 3515, conductor C3551TH extending to Fig. 37, contacts 3767' and 3752', conductor C3491AF extending to Fig. 34 and ground at contacts 3481 of the operated relay R3480AF. The latter relay, it will be recalled, operates in series with any one of the relays R3420AA to AE, inclusive, in response to any character sensed by the tape reader 1420.

The ground potential on the conductor C3551TH is also extended by way of the contacts 3519, 3521, 3523, 3525, 3527, 3529, 3531, 3533 and 3535 in order to operate the bad second character relay R3610. Normally, when a good second character is received, one of the contacts in the above traced circuit will be opened to prevent the operation of relay R3610. As soon as the relay R3630 operates, as previously noted, it prepares, at its contacts 3632, a point in the circuit for operating the relay R3640. Accordingly, when the slow to operate bad character relay R3610 operates, it completes, at its contacts 3611, a circuit for connecting its operating ground potential by way of the contacts 3611, 3632 and 3655 for operating the relay R3640. The latter relay upon operating, at its contacts 3641, disconnects the ground potential, at the contacts 3691, from the conductor C3601SU3 extending to Fig. 37 in order to restore the operated relays in the register 3701 that have been locked to this grounded conductor. Consequently, the good first character U that has been registered in the register 3701 is now abandoned. At its contacts 3642, the relay R3640 now connects the ground, at contacts 3482, by way of the contacts 3642 and 3658, the conductor C3601STEP extending to Fig. 37, contacts 3763' and the upper winding of the area relay R3760, to battery. The latter relay operates in its first-step to close only its X contacts 3765'.

Since the relays in the address sensing unit 3401 are at the present time operated in accordance with the second received character U, the corresponding letter will now be registered in the second register 3702 in the manner previously described. The operated relays in the second register 3702 will lock to the grounded conductor C3601SU4. Accordingly, a good first character U is now registered in the second register 3702 and the good first character previously received and which was registered in the first register 3701 is abandoned.

At the end of the sensing of the second character U, the operated relays in the address sensing unit 3401, the relay R3480AF and the relay R3510NU all restore to normal. Incident to the restoration of the relay R3480AF ground potential, at the contacts 3482, is removed from the conductor C3601STEP thereby causing the area relay R3760 to operate fully over the previously traced circuit including its upper and lower windings and its X contacts 3765'. This relay transfers the conductor C3491A to E, inclusive, from the second register 3702 back to the first register 3701 by way of normally closed contacts on the restored relay R3820. It being noted at this time that the relay R3820 has not been operated in its first step due to the fact that the relay R3620 has failed to operate during the sensing of the second character U. As a further result of the restoration of the relay R3480AF, at its contacts 3481, it removes ground potential from the conductor C3491AF extending to Fig. 37 and, consequently, from the conductor C3551TH. Accordingly, the relays R3610 and R3630 now restore to normal.

The relay R3640 (Fig. 36) which was initially operated through contacts on the relays R3630 and R3610 by the ground potential on the conductor C3551TH now locks itself over a circuit including contacts 3643, 3674, the winding of relay R3650 and ground at contacts 3691'. The relay R3650 operates in series with the relay R3640. The relay R3650 upon operating, at its contacts 3651, reapplies the holding ground potential to the conductor C3601SU3 in order to provide a locking potential for the relays in the register 3701. At its contacts 3652, the relay R3650 connects the conductor C3601RS to the conductor C3551TH, and, at its contacts 3653 and 3654, it disconnects the conductor C3601TR1 from the conductor C3601TR2 and connects the first metioned conductor to the conductor C3601TR3. Also, at its contacts 3658, the relay R3650 opens a point in the previously traced circuit for transmitting a pulse over the conductor C3601STEP. Finally at its contacts 3656, the relay R3650 prepares a point in the circuit for operating the relay R3660 in the event that the third character sensed by the address sensing unit 3406 is again not useable as a second character.

Figure 41:
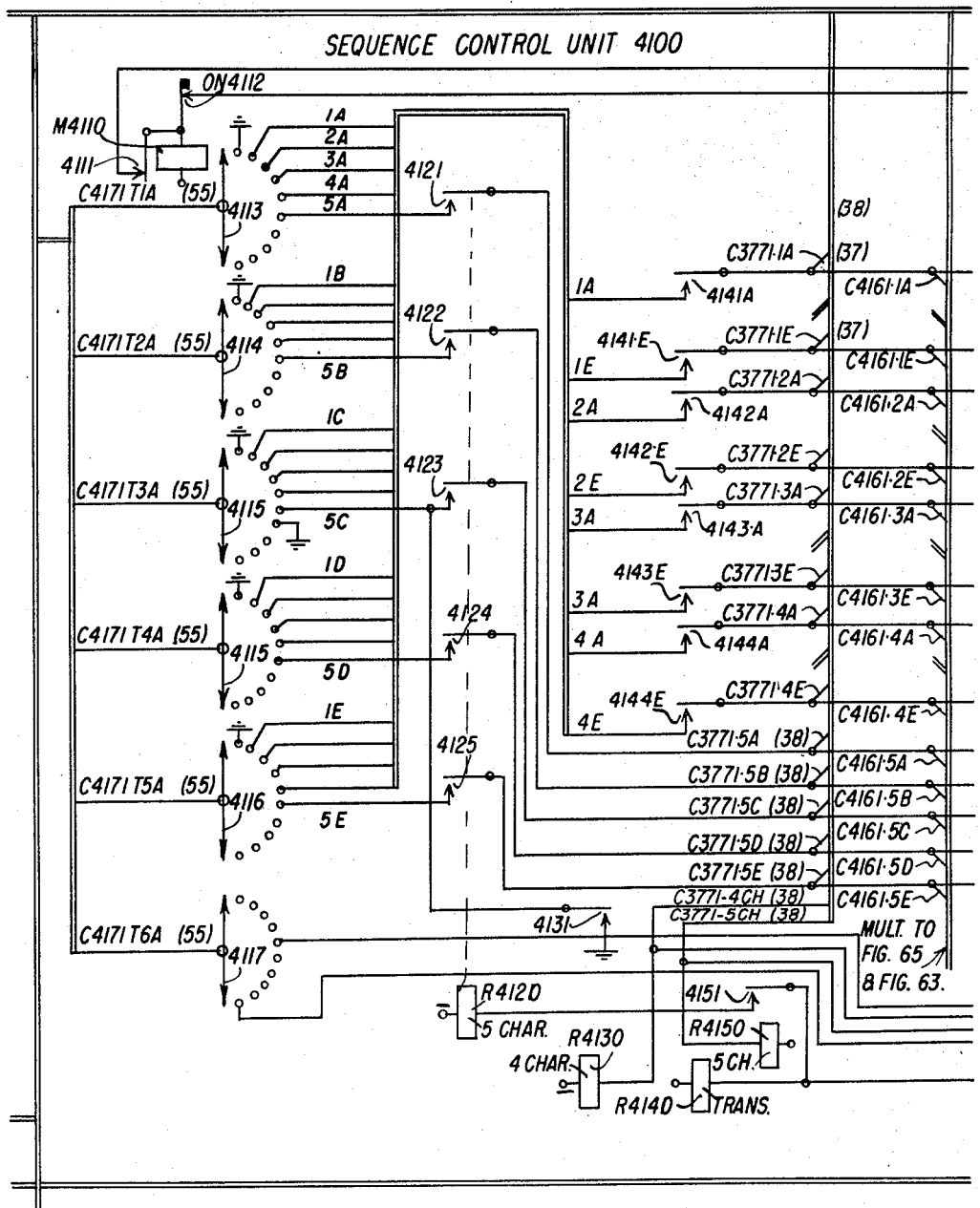

At the present time the second received character U of a routing indicator is registered in the second register 3701 as a good first character. When the processing routing register 3700 is subsequently connected to the multiple call translator 2100, the transfer 3 relay R3740 will be operated to connect the markings corresponding to the character U registered in the second register 3702 to the conductors extending to the first character decoding relays 2101 in the multiple call translator 2100 and to the conductors C3771-1A to 1E, inclusive, extending to the sequence control unit 4100 (Fig. 41). Thus, the good first character U registered in the second register 3702 will be properly transferred to and registered in the first character decoding relays 2101 in the multiple call translator 2100.

The third character in the sequence of the routing indicator being sensed by the tape reader 1420 will now be registered in the first register 3701 instead of in the third register 3703 of the processing routing register 3700 due to the fact that the network 2 relay R3820 is still in its restored position. However, it should be understood that the third character of the sequence must now be a good second character A, E, F, H, K, L, M or W.

Consequently, it will now be assumed that the third character sensed by the tape reader 1420 is the good second character A, whereupon the relays in the address sensing unit 3401 operate in the manner previously explained to cause the operation of the relays R3510A in the sequence control relay unit 3501. At the contacts 3527, the relay R3510 interrupts a point in an incomplete circuit to prevent the operation of the bad second character relay R3610 and it prepares, at its contacts 3528, a point in the circuit for operating the good second character relay R3620. At this time the relay R3480AF, at its contacts 3481, applies ground potential by way of the conductor C3491AF extending to Fig. 37, contacts 3752′, conductor C3601RS extending to Fig. 36, contacts 3652, 3621 and contacts 3528 in order to operate the good second character relay R3620. The latter relay, at its contacts 3624, immediately locks itself in its operated position to ground at contacts 3699 and, at its contacts 3623, it reconnects ground potential to the conductor C3601STEP extending to Fig. 37 in order now to operate the network 2 relay R3820 in its first step. The operated relays in the address sensing unit 3401 will now apply marking ground potentials to the conductor C3401A to E, inclusive, in order to register the good second character A in the first register 3701. The operated relays in the register 3701 in turn will lock in their operated positions to the grounded conductor C3601SU3.

At the present time the third character in the sequence sensed by the tape reader 1420 is now registered in the first register 3701 as a good second character of the routing indicator; and the second character in the sequence is now registered in the second register 3702 as a good first character. The remaining characters of the routing indicator sensed by the tape reader 1420 will now be registered respectively in the third, fourth and fifth registers 3703, 3704 and 3705 in the manner previously explained. However, as previously noted, the routing indicator may be fully registered after either the registration of three, four or five characters in the corresponding registers in the processing routing register 3700.

In the foregoing description it was assumed that the second character of the routing indicator is not acceptable as a good second character but is acceptable as a good first character and as a result thereof, the first character is discarded from the first register 3701 and the second character is registered in the second register 3702 as a good first character. Thereafter, the third received character which is acceptable as a good second character of a routing indicator is registered in the first register 3701 and the following characters are registered in the third, fourth and fifth registers 3703 to 3705, inclusive.

It will again be assumed, that the first character of the routing indicator is a good first character and is registered in the register 3701 and that the second character sensed by the tape reader 1420 is not useable as a good second character but is useable as a good first character in the manner explained above. Consequently, the circuits operate as described to register the second character (a good first character) and the second register 3702 and the previously registered first character is discarded from the first register 3701.

At this stage of the operation of the address detector 3300 and the processing routing register 3700, the relays R3750 and R3760 in the processing routing register 3700 are fully operated. Also, the relays R3640 and R3650 in the address detector 3300 are in their operated positions and locked under control of the operated release relay R3690. If the next character sensed by the tape reader 1420 is also a good first character, for example the character U, the relays in the address sensing unit 3401 will operate to again cause the operation of the relay R3510NU in the sequence control relay unit 3501. This relay upon operating, at its contacts 3515, completes a circuit for operating the good first character relay R3630 over a circuit which may be traced from battery, winding of relay R3630, contacts 3515, 3621 and 3652, conductor C3601RS extending to Fig. 37, contacts 3752′, conductor C3491AF extending to Fig. 34 and ground at contacts 3481. Also, at this time, the bad second character relay R3610 is operated in multiple with the relay R3630. Accordingly, the operating ground potential for the relay R3610 is further extended by way of the contacts 3611, 3632 and 3656 in order to operate the relay R3660.

As a further result of the operation of the relays in the address sensing unit 3401, the conductors C3491A to E, inclusive, are now marked with ground potential in accordance with the character U and since the relays R3750 and R3760 are in their operated positions, the circuit is completed for reoperating the relays in the first register 3701 to register the good first character U. These relays now lock to the grounded conductor C3601SU3.

At the end of the sensing of this third character U which is a good first character and has been registered in the first register 3701, the operating relays in the address sensing unit 3401 and the relay R3510NU restore to normal. As soon as the relay R3480AF removes ground potential from the conductor C3491AF, the relays R3610 and R3630 restore to normal. Ordinarily, the relay R3480AF, at its contacts 3482, will apply ground potential to the conductor C3601STEP extending to Fig. 37 in order at this time to operate the network 2 relay R3820 in its first step. However, the contacts 3623 and 3622 are opened since the relay R3620 has not been operated and the contacts 3658 are open due to the fact that the relay R3650 is in its operated position. Therefore, no stepping pulse is transmitted to operate the network 2 relay R3820 at this time. As soon as the operating ground potential for the relays R3610 and R3660 is removed, at the contacts 3481, by the restoration of relay R3480AF, the relay R3660 locks itself over a circuit including contacts 3661, the winding of relay R3670 and ground at contacts 3657. In this locking circuit the relay R3670 operates in series with the relay R3660. As a result thereof, at the contacts 3671 and 3672, the relay R3670 removes ground potential from the conductors C3601SU–1 and C3601SU–4 extending to Fig. 37. In Fig. 37 the removal of ground potential from the conductor C3601SU–1 opens the locking circuit for the relay R3760 (and any other relays locked to this conductor) which restores to normal to connect the relays of the second register 3701 to the marking conductors C3491A to C3491E, inclusive. The removal of ground potential from the conductor C3601SU–4 causes the operated ones of the register relays in the second register 3702 to restore to normal. Finally, at the contacts 3674, the relay R3670 interrupts the locking circuit for the relays R3640 and R3650 so that the last-mentioned relays now restore to normal. At the contacts 3657, the relay R3650 interrupts the locking circuit for the relays R3650 and R3670 so that at the present time all of the relays, except the release relay R3690, illustrated in Fig. 36 are in their restored position.

In view of the foregoing, it will be understood that in response to the successive sensing of three good first characters, such as the character U, B or J, the first character U will be registered in the first register 3701; the second character U will be registered in the second register 3702; and at the same time the character registered in the first register 3701 will be discarded; and the third character U will be reregistered in the first register 3701 and at the same time the second register 3702 will be restored to normal to discard the character stored therein. At this time the address detector 3300 and the processing routing register 3700 are in condition to register the following characters of a possible routing indicator in the manner previously explained.

It will now be assumed that a good first character is registered in the register 3701 in the manner previously explained and that a character is sensed which is not acceptable as either a good second character or as a good first character of a routing indicator. As a result thereof, the good first character registered in the register 3701 will be discarded or, if at this time a good first character happens to be registered in the second register 3702 it will also be discarded.

For example, if a good character U is registered in the register 3701 and the relays in the address sensing unit 3401 are operated in accordance with a character not acceptable as a first or a second character of a routing indicator, all of the relays in the sequence control relay unit 3501 remain in their restored positions. Since a character has been sensed, however, at least two of the relays in the address sensing unit 3401 will be in their operated positions. Under this condition, the relay R3480AF, at the contacts 3481, applies ground potential by way of the conductor C3491AF extending to Fig. 37, contacts 3752', 3762', conductor C3551TH extending to Fig. 35, contacts 3519, 3521, 3523, 3525, 3527, 3529, 3531, 3533 and 3535 in order to operate the bad second character relay 3610. Since the relay R3630 is not operated under this condition, the relay R3610 extends its operating ground potential by way of its contacts 3611 and the contacts 3631 to the winding of the disconnect relay R3680, to battery. The latter relay operates and, at its contacts 3681, interrupts the circuit for the release relay R3690 and the latter relay, upon restoring, removes ground potential from the various holding circuits previously described in order to restore all of the operated relays in the processing routing register 3700. At the end of the sensing cycle of the particular character which is not useable as either a first or second character of a routing indicator, the relays in the address sensing unit 3401 restore to normal and cause the restoration of the bad second character relay R3610 and the disconnect relay R3680. Incident to the restoration of the disconnect relay R3680, it again completes, at its contacts 3681, the previously traced circuit for operating the release relay R3690 in order to reestablish the various locking ground potentials for the various locking circuits included in the address detector 3300 and the processing routing register 3700. The last mentioned units are fully restored to normal and are thus reconditioned to detect and register a new sequence of characters of a routing indicator sensed by the tape reader 1420.

*Registering the multiple call message indicator ZVA in the multiple address detector 7100MA*

In the multiple call message being described, the ZVA multiple call message indicator of Item 5 immediately follows the three character routing indicator UAC of Item 4. As previously described, the character UAC of the routing indicator are at the present time registered in the first, second and third registers 3701, 3702 and 3703 in the processing routing register 3700 and the "space" character function may also be registered in the fourth register 3704. The tape reader 1420 now senses the three characters ZVA of the multiple call message indicator in the order named and transmits signals corresponding to these characters to the relays in the address sensing unit 3401 in the address detector 3300, to the relays in the precedence sensing group 6701 in the precedence sensing unit 6700, and to the relays in the prosign sensing group 3901 in the prosign sensing unit 3900. All of the sensing relays in the three above noted units are controlled by the characters ZVA but they are only effective in the precedence sensing unit 6700.

In the previous description of the operation of the precedence sensing unit 6700 in conjunction with the registration of the precedence indicator of a particular message in the precedence detector 7100, a description was given at that time under the heading "Detecting a multiple address indicator (ZVA)" of the operation of the multiple address detector 7100MA. In view of the foregoing, it will be understood that following the registration of the routing indicator UAC, the multiple call message indicator ZVA is then registered in the multiple call register 7100MA (Fig. 72). The relays R7210 and R7215 are operated in response to the sensing of the character Z; the relays R7220 and R7225 are operated in response to the sensing of the character V; and the relays R7230 and R7240 operated in response to the sensing of the character A. The last mentioned relays are locked in their operated positions over a circuit including battery, the winding of relay R7230, contacts 7231, winding of relay R7240, contacts 7203, conductor C4497ZVS extending to Fig. 44 and contacts 4486, to ground.

The relays R7240 and R7230 will remain in their operated positions until the holding ground potential is removed from the conductor C4497ZVS or until the release relay R7200 is subsequently restored to normal. As soon as the relay R7240 operates it completes, at its contacts 7244, a circuit which may be traced from ground, conductor C2983MA8 extending to Fig. 29, in order to operate the ZVA relay R2960 in the prosign sensing unit 2900. The operating ground potential on the conductor C2983MA8 is further extended by way of the conductor C2982MA8 extending to Fig. 44 in order to operate the Z1 relay R4485 in the sequence control unit 4100. The latter relay upon operating locks itself by way of the contacts 4488, 4492, 4442 and 4463 to the grounded conductor C1388SU–5 extending to Fig. 13.

Figure 44:
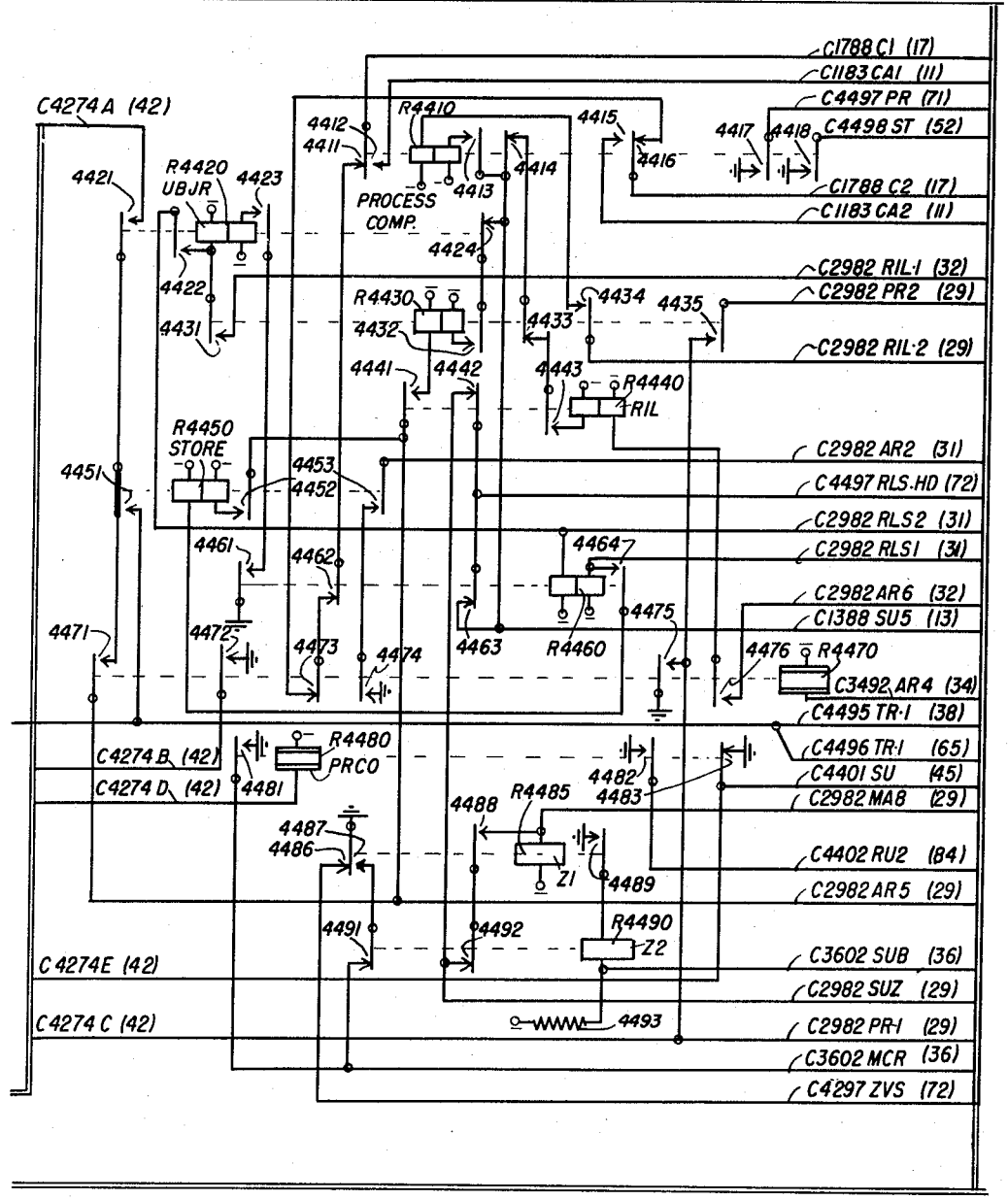

When the ZVA relay R2960 in the prosign sensing unit 2900 operates, as mentioned above, in response to the registration of a ZVA multiple call message indicator, it also completes a locking circuit for itself which includes its lower winding, the contacts 2965, the conductor C2982SUZ extending to Fig. 44 and then by way of the contacts 4442 and 4463 to the grounded conductor C1388SU5. Therefore, the Z1 relay R4485 in the sequence control unit 4100 and the ZVA relay R2960 in the prosign sensing unit 2900 are both locked in their operated positions to the grounded conductor C1388SU–5.

Consideration will now be given of the controls exercised by the operation of the Z1 relay R4485. At its contacts 4486, the relay R4485 removes the locking ground potential from the conductor C4297ZVS extending to Fig. 72 and thereby causes the relays R7230 and R7240 in the multiple address detector 7100MA to restore to normal. It should be noted that the other relays R7210 to R7225 in the multiple address detector 7100MA will restore to normal as soon as ground potential is removed from the locking conductor C6702SUA by the precedence sensing unit 6700. As a further result of the operation of relay R4485, at its contacts 4487, ground potential is extended by way of the contacts 4491, conductor C3602MCR extending to Fig. 36 and the winding of the disconnect relay R3680, to battery. The relay R3680 in the address detector 3300 now operates and, at its contacts 3681, interrupts the circuit for the release relay R3690 which now restores to normal. At its various contacts, the release relay R3690 removes the various holding ground potentials from locking circuits included operated relays in the address detector 3300 and in the processing routing register 3700. In particular, it is noted that at the contacts 3691, 3693, 3695, 3696 and 3697, ground potential is removed from the respective conductors C3601SU-3 to SU-7, inclusive, extending to the respective registers 3701 to 3705, inclusive, in the processing routing register 3700. The removal of the locking ground potentials from these conductors will restore the above noted registers to normal and thus discard the characters registered therein. In this particular case, the three characters of the routing indicator UAC registered in the three registers 3701 to 3703, inclusive, the "space" character registered in the fourth register 3704, and the Z character registered in the fifth register 3705 will be discarded.

As a further result of the operation of the Z1 relay R4485, at its contacts 4489, it connects ground potential by way of the winding of the Z2 relay R4490, the resistor 4493, and battery. This circuit for the relay R4490 cannot be completed until the shunting ground potential is removed from the conductor C3602SUB incident to the restoration of the release relay R3690 noted above. In other words, the Z2 relay R4490 cannot operate until the address detector 3300 has been restored to normal.

As soon as the shunting ground potential is removed from the conductor C3602SUB, the Z2 relay R4490 operates over the circuit described above. At its contacts 4491, the relay R4490 interrupts the previously described circuit including the conductor C3602MCR extending to Fig. 36 thereby to cause the restoration of the disconnect relay R3680. The latter relay upon restoring to normal, at its contacts 3681, recompletes the circuit for the release relay R3690 so that the address detector 3300 and the processing routing register 3700 are again conditioned to respond to characters sensed by the tape reader 1420. As a further result of the operation of the Z2 relay R4490, at its contacts 4492, it interrupts the locking circuit for the Z1 relay R4485 which also restores to normal. The latter relay, at its contacts 4489, interrupts the locking circuit for the Z2 relay R4490 which also restores to normal if it has not been previously restored by the resubstitution of the shunting ground on the conductor C3602SUB.

From the foregoing, it will be understood that the operation of the Z1 relay R4485 incident to the registration of the multiple call indicator ZVA causes the address detector 3300 and the processing routing register 3700 to restore, whereby, any routing indicator that is at this time registered in the processing routing register 3700 will be discarded. Thereafter, the Z2 R4490 relay will operate to recondition the address detector 3300 and the processing routing register 3700 for further operation and to cause the restoration of both the relays R4485 and R4490.

*Conditioning the prosign sensing unit 2900 and the prosign detector 3100 for operation*

In the previous description it was pointed out that the ZVA relay R2960 in the prosign sensing unit 2900 operated incident to the detection of a multiple call message indicator ZVA. This relay locked itself in its operated position to the conductor C2982SUZ and prepared points in other circuits which will be described at the proper time. Fundamentally, the relay R2960 prepares, at its various contacts, circuits whereby the prosign sensing unit 2900 and the prosign detector 3100 detect and register different prosign indicators, such as ZWL, BBB, UUU or JJJ, which will normally appear on the message following the ZVA multiple call indicator noted above. In the message being described, however, no prosign indicator is provided and, consequently, no detection and registration will take place in the prosign sensing unit 2900 and the prosign detector 3100. Accordingly, at this time, it may be noted that the relays in the prosign sensing group 3901 are arranged so that they will control the prosign register 3000 to register the prosign ZWL in the detector 3100; the prosign UUU in the detector 3101, the prosign BBB in the detector 3102 or the prosign JJJ in the detector 3103. The detailed operations that take place in response to the sensing of any one of the foregoing prosign indicators by the tape reader 1420 will be discussed subsequently under the heading "Operation of the prosign sensing unit 2900 and the prosign detector 3100" in conjunction with a multiple call message that includes one of the prosign indicators.

*Sensing the routing indicators identifying the tributary stations to which the present multiple call message must be transmitted*

The item of information that appears on the multiple call message being discussed is Item 6 and includes the following:

NMNM UACZZ JWCX JKXY UYAY FIGS 444

The above information is sensed by the tape reader 1420 in the manner previously described and it should be noted that the deferred precedence indicator NMNM appears on the message a second time. This information has been previously sensed by the precedence sensing unit 6700 and registered in the deferred detector 7100NM in the precedence detector 7100. Since the precedence indicator has previously been registered in connection with this multiple call message, the disconnect relay R6910 has been operated and, at its contacts 6912, has removed the operating ground potential from the upper contacts of the precedence register relays 6801. In view of the foregoing, it will be understood that when the relays of the precedence sensing group 6701 are reoperated in accordance with the deferred precedence indicator NMNM they will go through their operating cycles in the manner previously explained and they will control the relays in the precedence register 6801. However, the operating cycles of the relays will not control the deferred detector 7100NM due to the fact that the ground potential is removed at the contacts 6912 as noted above.

The tape reader 1420 now senses the "space" character following the deferred indicator NMNM. The sensing relays in the precedence sensing group 6701, the sensing relays in the address sensing unit 3401 and the sensing relays in the prosign sensing group 2901 will all operate in accordance with the space character sensed by the tape reader 1420 but this is of no importance at this time.

Thereafter, the tape reader 1420 will sense the five characters UACZZ of the routing indicator of Item 6 noted above. At this time, the relays in the address sensing unit 3401 will be successively operated in accordance with the characters UACZZ in the manner previously described, whereby, these characters will be respectively registered in the first, second, third, fourth and fifth registers 3701 to 3705, inclusive, in the processing routing register 3700 in substantially the same manner as has been described above in conjunction with the operation of the address detector 3300 and the processing routing register 3700 to register the routing indicator UAC.

After the characters UACZZ are thus registered, the tape reader 1420 again senses the "space" character following this routing indicator. In the address sensing unit 3401, the relay R3420AC operates in series with the relay R3480AF in the manner previously described. At the contacts 3451, the relay R3420AC now completes an operating circuit for the address received relay R3540. The last mentioned relay operates at this time due to the fact that at least four characters of a routing indicator have been registered in the processing routing register 3700. This circuit may be traced from battery, by way of the winding of relay R3540, contacts 3473, 3462, 3451, 3439, 3427 and either by way of the contacts 3547 and the conductor C3551-4CA or by way of the contacts 3545 and the conductor C3551-5CA, depending upon whether a four or a five character routing indicator has been registered in the processing routing register 3700. Referring now to Fig. 37, it will be seen that the conductor C3551-4CA will be grounded by way of the contacts 3844' on the relay R3840 (operated if four characters are registered) and contacts 3857. Also, if five characters have been registered in the processing routing register 3700 the conductor C3551–5CA will be grounded at the contacts 3856 by operation of the relay R3850. In either event, the address received relay R3540 now operates.

As soon as the relay R3540 operates, it locks itself by way of its contacts 3542, to ground at contacts 3691' on the operated release relay R3690. This relay in operating indicates that a complete address (routing indicator) has been received and properly registered.

As a further result of the operation of relay R3540, at its contacts 3543, it disconnects the grounded conductor C3551AR3 from the circuit including the uppermost contacts on the relays in the address sensing unit 3401 thereby to prevent further operations of these relays from controlling the registers in the processing routing register 3700. Also, at its contacts 3544 and 3546, the relay R3540 prepares points in two circuits, traced hereinafter, for operating either the four character relay R4130 or the five character relay R4150 (Fig. 41) in the sequence control unit 4100 depending upon whether or not a four or five character routing indicator has been registered in the processing routing register 3700. Finally, at the contacts 3541, the relay R3540 applies ground potential by way of the conductor C3492AR4 extending to Fig. 44 in order to operate the address received relay R4470 in the sequence control unit 4100.

Referring now to Fig. 44 of the sequence control unit 4100, it will be seen that when the relay R4470 operates it interrupts, at its contacts 4473, a circuit which includes the conductors C1788C1 and C1788C2 extending to Fig. 17. The above mentioned conductors are included in the circuit for controlling the magnet M1425 in the tape reader 1420, and the reader will now stop reading the associated tape 1413. In other words, as soon as the tape reader 1420 senses the "space" character following the routing indicator UACZZ the address complete relay R3540 operates and in turn causes the operation of the relay R4470 and the latter relay, at its contacts 4473, opens the circuit for the magnet M1425 to terminate the reading operation of the tape reader 1420. These conductors, however, will be subsequently interconnected to restart the reading operation of the tape reader 1420 as soon as the routing indicator UACZZ has been processed by the multiple call apparatus.

Figure 42:
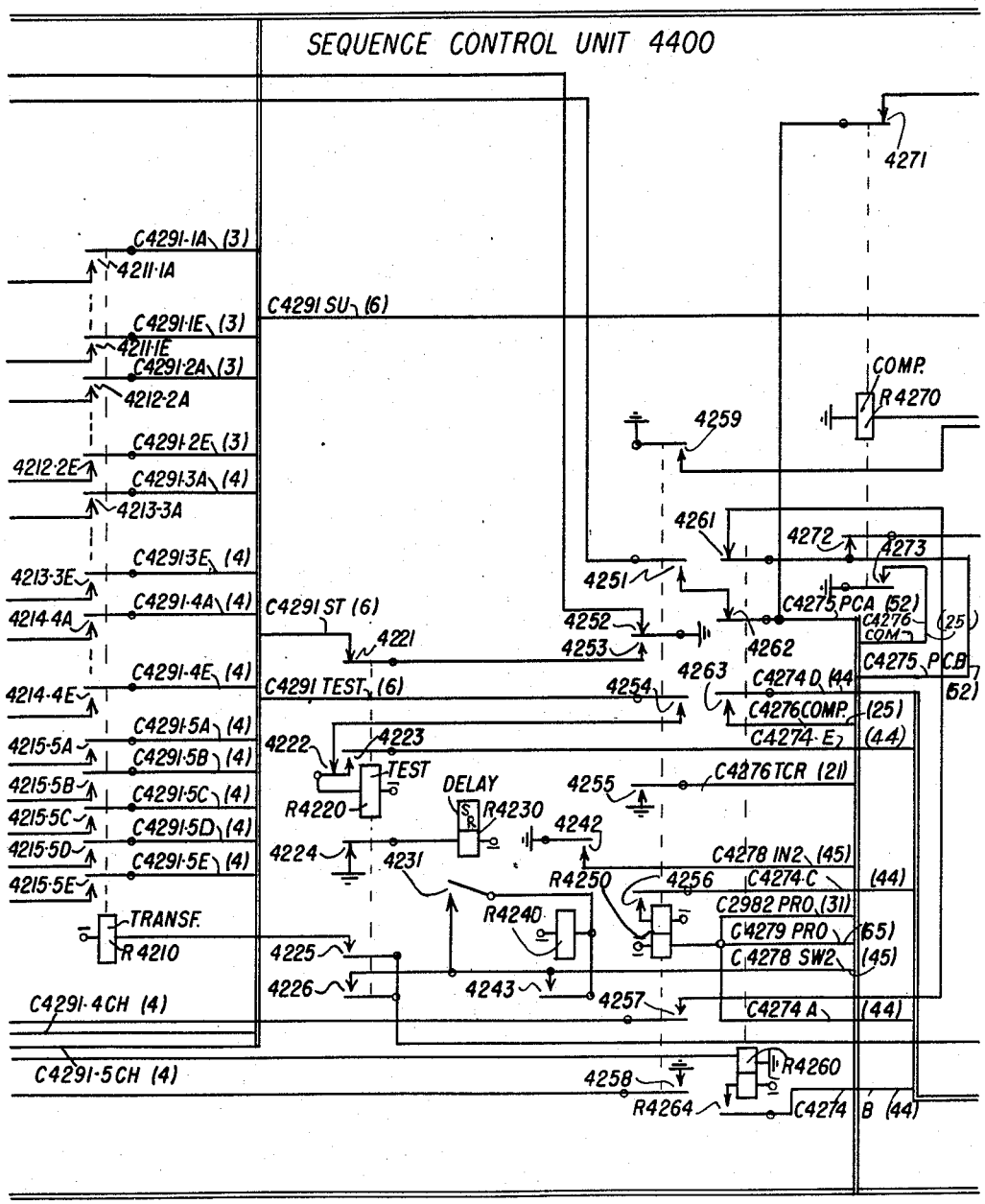

Returning again to the operation of the relay R4470, it will be noted that, at its contacts 4475, it applies ground potential by way of the conductor C2982PR1 extending to Fig. 29, contacts 2962 of the operated ZVA relay R2960, contacts 3147 and conductor C2982PR0 extending to Fig. 42 in order to operate the process relay R4250 in the sequence control unit 4100. The last mentioned relay, upon operating, locks itself in its operated position over a circuit including its upper winding, the contacts 4256, conductor C4274C extending to Fig. 44 to ground at contacts 4475. Thus, the process relay R4250 is locked in its operated position over a circuit which is independent of the initial operating circuit including the conductor C2982PR1.

Also, at the contacts 4476, the relay R4470 completes a circuit for operating the RIL relay R4440. This circuit may be traced from battery by way of the right hand winding of relay R4440, contacts 4476, conductor C2982AR6 extending to Fig. 32 and contacts 2968 on the operated ZVA relay R2960, to ground.

From the foregoing it will be appreciated that the relay R4470 upon operating completed the circuit for operating the process relay R4250 and it also completed the operating circuit for the RIL relay R4440. The remaining contacts on the relay R4470 merely prepares circuits which are not effective at the present time. The controls exercised by the operation of the RIL relay R4440 will be described before the controls exercised by the operation of the process relay R4250 are discussed.

Referring now to the RIL relay R4440 (Fig. 44) it will be seen that this relay locks itself in its operated position over a circuit which may be traced from battery by way of the left hand winding of the relay, contacts 4443, 4433 and 4414 and the grounded conductor C1388SU 5 extending to Fig. 13. The last mentioned conductor remains grounded until the seal-up relay R1320 (Fig. 13) restores to normal. As a further result of the operation of the relay R4440, at its contacts 4442, it disconnects the ground potential on the conductor C1388SU5 from the conductor C2982SUZ extending to Fig. 29 thereby to interrupt a point in the locking circuit for the ZVA relay R2960. Finally, at its contacts 4441, the relay R4440 prepares a point in the circuit for subsequently operating the RS relay R4430 in the sequence control unit 4100.

As noted above, the locking circuit for the ZVA relay R2960 (Fig. 29) is interrupted incident to the operation of the RIL relay R4440. The ZVA relay R2960 now restores to normal and interrupts at its contacts 2962, a point in the initial operating circuit for the process relay R4250 but the latter relay, as previously noted, remains in its operated position over an independent locking circuit. Also, at its contacts 2963, the relay R2960 applies ground potential to the conductor C2982AR5 extending to Fig. 44 to complete the circuit including contacts 4441 for operating the RS relay R4430. The only other contacts on the relay R2960 that is of any significance at this time are the contacts 2968 which merely open a point in the previously traced initial operating circuit for the right hand winding of the RIL relay R4440. As previously noted, however, the relay R4440 is locked in its operated position over the circuit including its left-hand winding.

Referring now to the RS relay R4430 (Fig. 44) it will be seen that this relay upon operating, incident to the operation of relay R4440, locks itself in its operated position over a circuit including battery, its right-hand winding, contacts 4432 and 4424 to the grounded conductor C1388SU5. Also, at its contacts 4431 and 4434, the relay R4430 prepares points in circuits for subsequently operating UBJR relay R4420 and the process complete relay R4410. At the contacts 4435, the relay R4430 connects the ground potential at the contacts 4475 by way of the conductor C2981PR2 extending to Fig. 29, contacts 3147, and conductor C2982PR0 extending to Fig. 42 in order to replace an operating ground potential on the lower winding of the operated process relay R4250. Finally, at its contacts 4433, the RS relay R4430 interrupts a point in the locking circuit for the left-hand winding of the RIL relay R4440 which now restores to normal. The latter relay, upon restoring, now extends the gorund potential on the conductor C1388SU5 to the conductor C2982SUZ extending to Fig. 29 to again prepare a point in the locking circuit for the ZVA relay R2960 which will become effective if the latter relay is reoperated.

During the above sequence of operation of the address received relay R4470, the RIL relay R4440, the RS relay R4430 and the restoration of the RIL relay R4440, the process relay R4250 operated to perform several different operating controls in the multiple call equipment. These controls will now be described.

*Transferring the routing indicator registered in the register 3700 to the tape storage unit 5502*

When the process relay R4250 in the sequence control unit 4100 operates, as noted above, it performs several operating controls in the multiple call equipment which will be separately described. Generally stated, the operation of the process relay R4250 causes the association of the routing translator X2900 (Figs. 3 to 6) normally used in connection with single address messages, with the multiple call equipment so that each of the routing indicators registered in the processing routing register 3700 may be transferred to the routing translator X2900.

Thereafter, a three-digit number, identifying the outgoing line over which the multiple call message is to be transmitted to ultimately reach the destination identified by the routing indicator, is registered in the channel converter 4500 and subsequently stored in the outgoing line tape storage unit 5501.

The operation of the process relay R4250 also causes the association of the multiple call translator 2100 with the processing routing register 3700 so that each routing indicator, as it is successively registered in the processing routing register 3700, may be processed.

Also, the process relay R4250 causes the routing indicator registered in the processing routing register 3700 to be perforated on a tape and stored in the routing indicator tape storage unit 5502. The association of the multiple call translator 2100 with the processing routing register 3700 will first be described.

As soon as the process relay R4250 closes its contacts 4259, ground potential is extended by way of the conductor C4495TR1 extending to Fig. 38 in order to operate the transfer 1 relay R3810. In multiple with the relay R3810 a circuit will also be completed for operating the transfer 2 relay R3730 if the first and second characters of the routing indicator are respectively registered in the first and second registers 3701 and 3702, or for operating the transfer 3 relay R3740 if the first and second characters of the routing indicator are registered respectively in the second and first registers 3702 and 3701. Referring to Fig. 38, it will be seen that the ground potential on the conductor C4495TR1 that operates the transfer 1 relay R3810 is also extended by way of the conductor C3601TR1 to Fig. 36 and then by way of the normally closed contacts 3653, conductor C3601TR2 extending to Fig. 37 in order to operate the transfer 2 relay R3730. In this circuit the contacts 3653 will be closed if the first and second characters of the routing indicator are registered respectively in the first and second registers 3701 and 3702. On the other hand, if the contacts 3653 are opened and the contacts 3654 are closed, the ground potential on the conductor C3601TR1 will be extended by way of the conductor C3601TR3 to Fig. 37 in order to operate the transfer 3 relay R3740. Thus, it will be seen that if the transfer 1 and 2 relays R3810 and R3830 are operated, the marking ground potentials at the upper make contacts on the registers 3701 to 3705, inclusive, will be applied to the conductors C3771–1A to 1E, 2A to 2E, 3A to 3E, 4A to 4E and 5A to 5E extending to the sequence control unit 4100 (Fig. 41). Also, the marking ground potentials on the first, second and third registers 3701 to 3703, inclusive, will be applied to the conductors C3774–1A to 1E, 2A to 2E and 3A to 2E extending to the first, second and third character decoding relays 2101 to 2103, inclusive, in the multiple call translator 2100.

If the transfer 3 relay R3740 is operated in multiple with the transfer 1 relay R3810, instead of the transfer 2 relay R3730, the marking potentials at the upper make contacts on the second register 3701 will be applied to the conductor C3771–1A to 1E and C3774–1A to 1E, and the marking potentials at the upper make contact on the first register 3701 will be applied to the conductor C3771–2A to 2E and C3774–2A to 2E. Thus, a reversal is provided in the connections between the marking conductors of the first and second registers 3701 and 3702 so that the first charatcer of a routing indicator, even though registered in the second register 3702, will be applied to the first set of marking conductors and the second character of the routing indicator registered in the first register 3701 will be applied to the second set of marking conductors.

Figure 21:
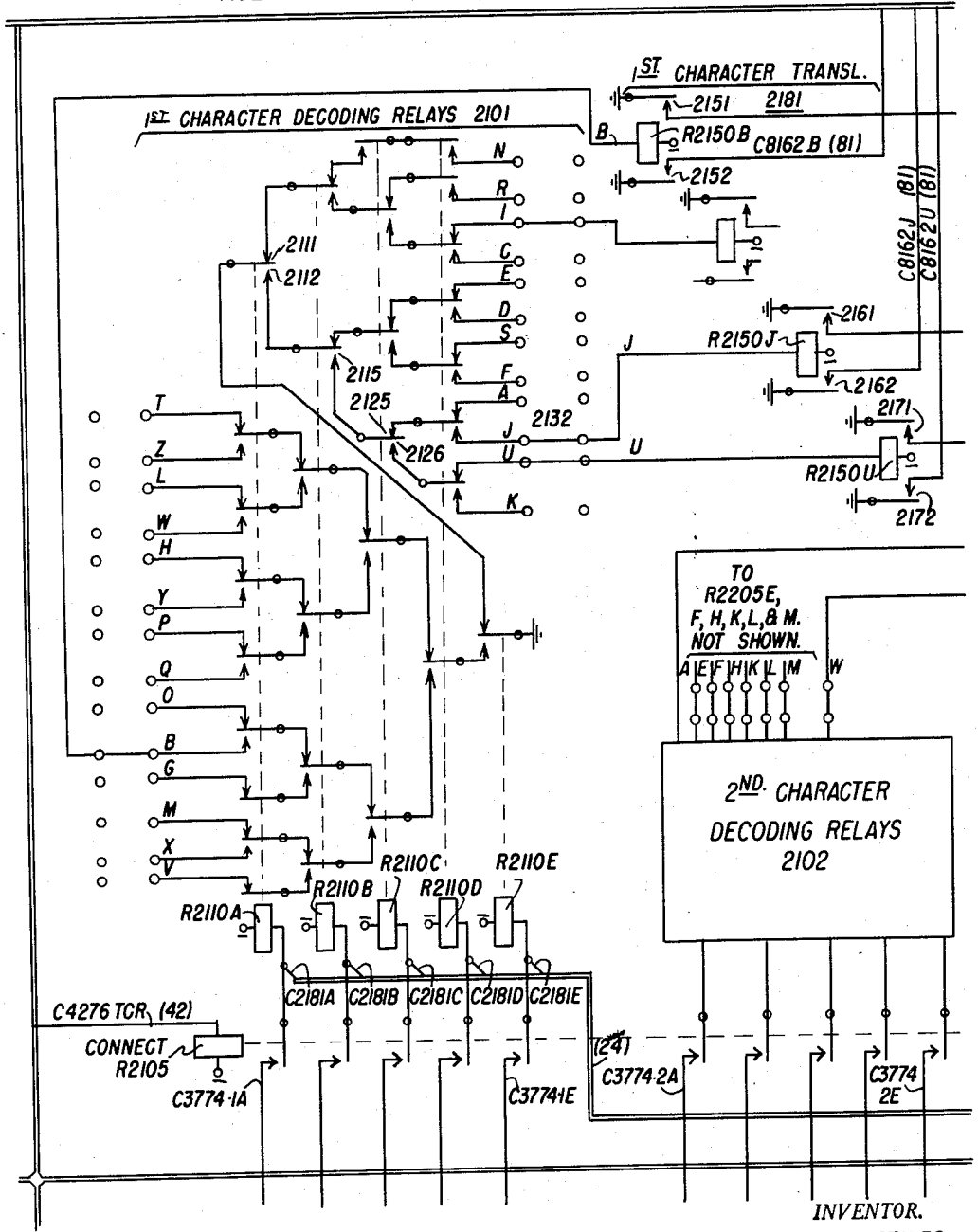
Figure 22:
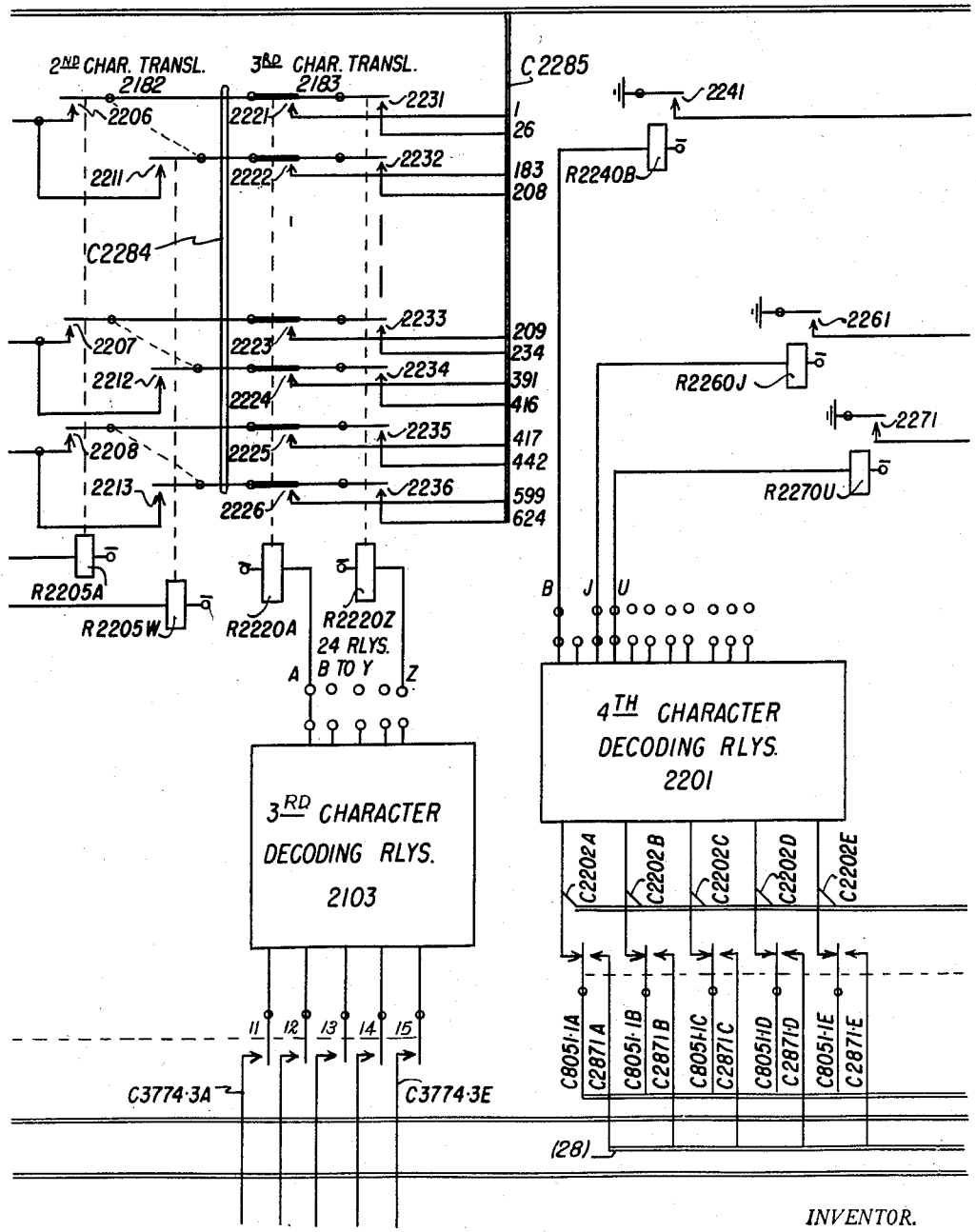

At the contacts 4255, the process relay R4250 applies ground potential to the conductor C4276TCR extending to Fig. 21 in order to operate the connect relay R2105 in the multiple call translator 2100. This relay, at its various contacts 1 to 15, inclusive, connects the three sets of five conductors C3774–1A to 1E, 2A to 2E, and 3A to 3E, to the five relays in the respective first, second and third character decoding relays 2101, 2102 and 2103. Thus, the three characters registered in the registers 3701 to 3703, inclusive, in the processing routing register 3700 are transferred to and registered in the corresponding relays in the first, second and third character decoding relays 2101, 2102 and 2103. The operation of the multiple call translator 2100 in response to the registration of the first three characters of any routing indicator in the first, second and third character decoding relays 2101, 2102 and 2103 will be described under the heading "Operation of the multiple call translator 2100."

In the above description it was pointed out that the transfer 1 relay R3810 closed the three sets of contacts shown to the right thereof in order to connect the three registers 3703 to 3705, inclusive, to certain marking conductors. Also, at the time the relay R3810 operated, it closed its contacts 3811 and 3812 in order to operate the four character relay R4130 or the five character relay R4150 in Fig. 41 of the sequence control unit 4100 depending upon whether or not a four or five character routing indicator is registered in the processing routing register 3700.

If a four character routing indicator is registered in the processing routing register 3700, a circuit will be completed for operating the four character relay R4130 which may be traced from battery, winding of relay R4130, conductor C3771–4CH extending to Fig. 38, contacts 3812 of the transfer 1 relay R3810, conductor C3551AR1 extending to Fig. 35, contacts 3546, conductor C3551–4CA extending to Fig. 37, contacts 3844' and 3857 to ground. It will be noted that in this circuit it is assumed that the relay R3840 is in its operated position and has closed its contacts 3844' to indicate that four characters have been registered in the processing routing register 3700. If on the other hand, a five character code is registered in the register 3700, the relay R3850 will also be operated and will accordingly open its contacts 3857 to prevent the completion of the above traced circuit for the four charatcer relay R4130. Instead, at the contacts 3856, the relay R3850 will now extend ground potential by way of the conductor C3551–5CA extending to Fig. 35, contacts 3544, conductor C3551AR2 extending to Fig. 38, contacts 3811 of the operated transfer 1 relay R3810, conductor C3571–5CH extending to Fig. 41 in order to operate the five character relay R4150.

If it is assumed that the five character relay R4150 is operated, it will close its contacts 4151 so that the ground potential at the contacts 4258 on the operated process relay R4250 will now complete obvious circuits for operating the relay R4120 in multiple with the transfer relay R4140. At its contacts 4141A to E, 4142A to E, 4143A to E and 4144A to E, the relay R4140 connects the four sets of marking conductors C4771–1A to 1E, 2A to 2E, 3A to 3E, 4A to 4E to the bank contacts of the routing indicator storage control switch 4101. In other words, the four characters registered respectively in the first four registers 3701 to 3704, inclusive, will now be marked, in code form, in the bank contacts accessible to the wipers of the control switch 4101. The fifth set of marking conductors C3771–5A to 5E, inclusive, will also be connected to the bank contacts accessible to the wipers of the routing indicator storage control switch 4101 by way of contacts 4121 to 4125 on the operated relay R4120. The last mentioned relay, however, will only be operated if an indication has been given to the sequence control unit 4100 that five characters have been registered in the processing routing register 3700 and has caused the operation of the relay R4150. If only four characters are registered in the processing routing register 3700, then the four character relay R4130 is operated instead of the five character relays R4150 and R4120 and the transfer relay R4140 will only connect the four sets of marking conductors noted above to the bank contacts of the routing indicator storage control switch 4101. The contacts normally terminating the fifth set of marking conductors C3771–5A to 5E in the case of a four character routing indicator will remain unmarked except for the ground potential applied to the bank contact 6 accessible to the wiper 4114 of the switch 4101, at the contacts 4131 on the operated four character relay R4130. This marking potential on the single bank contact for the fifth set of marking conductors will simulate the registration of a "space" character function in the fifth register 3705. In this manner, a positive indication is made that no fifth character has been registered when in fact a four character routing indicator is registered in the processing routing register 3700.

At the present time the bank contacts accessible to the wipers 4113 to 4116, inclusive, of the routing indicator storage control switch 4101 are marked in code form in accordance with the five characters UACZZ registered respectively in the five registers 3701 to 3705, inclusive. The control switch 4101 is also controlled by the operation of the process relay R4250 so that these five characters will now be transferred to the routing indicator tape storage unit 5502 and perforated on the associated tape 5574. This operation is controlled through the contacts 4251 of the process relay R4250.

In Fig. 52 there is schematically illustrated a continuously operating motor driven impulser 5201 which is provided with two cams 5276 and 5277 and two sets of contacts 5274 and 5275 which are respectively controlled by the above noted cams. The cams 5276 and 5277 move in the direction of the arrow at a predetermined rate and, as illustrated, the raised portion 5278A on the cam 5276 will close the contacts 5274 for 20 milli-seconds and the raised portion 5278B will actuate the contacts 5274, 200 milli-seconds after the first raised portion 5278A controlled the contacts. On the cam 5277, the raised portion 5872C will close the contacts 5275, 10 milli-seconds after the contacts 5274 have been opened and it will retain the contacts 5275 closed for 50 milli-seconds. The second raised portion 5272D on the cam 5277 will repeat the operation 200 milli-seconds after the contacts 5275 are first closed by the raised portion 5272C. The timed relationship between the pulses applied to the conductors connected to the contacts 5274 and 5275 will be continuously maintained.

In view of the foregoing it will be understood that the contacts 5274 will apply ground pulses to the conductor C4275PCA extending to Fig. 42, at intervals of 200 milli-seconds and each pulse will be retained on the conductor for 20 milliseconds. It will also be understood that the contacts 5275 will apply ground pulses to the conductor C4275PCB extending to Fig. 42, 10 milli-seconds after each pulse has been terminated on the conductor C4275PCA and will be retained on the conductor C4275PCB for 50 milli-seconds.

Referring now to Fig. 42 it will be seen that the first ground pulse applied to the conductor C4275PCA from the motor driven impulser 5201, as above stated, is extended by way of the contacts 4262 and 4251 in order to operate the motor magnet M4110 of the routing indicator storage control switch 4101. At the termination of the ground pulse on the conductor C4275PCA, the magnet M4110 restores to normal and advances its wipers 4113 to 4117, inclusive, one step in a clockwise direction into engagement with the contacts 1. In this position each of the wipers 4113 to 4116, inclusive, engage grounded contacts, whereby, ground potential is extended over the conductors C4171T1A to C4171T5A extending to Fig. 55.

Referring now to Fig. 55, it will be seen that the conductors C4171T1A to C4171T5A terminate in individual contacts in the transmitter distributor 5560. The sixth conductor C4171T6A is connected to the wiper 4117 of the routing indicator storage control switch 4101 and to the clutch magnet M5561 of the transmitter distributor 5560.

Ten milli-seconds after the pulse on the conductor C4275PCA has been terminated at the contact 5274, the contacts 5275 are closed to apply the ground pulse to the conductor C4275PCB. In Fig. 42 it will be seen that the ground pulse on the conductor C4275PCB is extended by way of the contacts 4261 and 4257 to the bank contacts 1 to 9, inclusive, accessible to the wiper 4117. Since the wiper 4117 is now in engagement with the contact 1, this ground pulse is further extended by way of the conductor C4171T6A extending to Fig. 55 in order to operate the clutch magnet M5561 of the transmitter distributor 5560.

The transmitter distributor 5560 is substantially identical to the mechanism disclosed in the previously noted U.S. Patent No. 2,296,845, granted September 29, 1942, to N. T. Goetz. Briefly stated, the mechanism includes a shaft which carries seven cams, each with a depression. The cams are fixed to the shaft so that the depressions are in spiral order and they close corresponding contacts in sequential order. Thus, each of the cams controls a pair of make contacts, except the first contact 5562 which is permanently grounded and normally closed. The next five contacts to the left thereof, are normally opened and are closed in sequential order to connect with the five conductors C4171T1A to C4171T5A, respectively in the order named.

Normally, a transmitter distributor of the type referred to in the above mentioned Goetz patent has five make contacts permanently grounded and includes corresponding tape sensing pins which are raised upwardly in sequential order to sense the associated tape for the code perforations therein. A pin that finds a perforation in the associated tape moves far enough to allow an associated lever, in falling into its associated cam depression during the sequence cycle, to close its make contact and thereby transmit a ground pulse over a control conductor. The transmitter distributor 5560, however, has been modified so that it will convert code markings on the conductors C4171T1A to T5A, inclusive, corresponding to a stored routing indicator into electrical impulses that can be utilized in actuating a typing reperforator. Accordingly, the transmitter distributor 5560 does not require the use of an associated tape to control its operation and the associated sensing pins in the transmitter distributor 5560 will always move the maximum distance during each cycle of operation. Each make contact (shown to the left of contacts 5562) closes in sequential order and depending upon the ground potentials encountered on the respective conductor C4171T1A to T5A, the characters marked in code form on the conductors will be transmitted over the conductor C6082TDA and the conductor C6082RPA to control the reperforator magnet M5570 of the typing reperforator 5585. Each time the clutch magnet M5561 is controlled, the holding ground at the contacts 5562 for the perforator magnet M5570 is removed therefrom and the contacts shown to the left of contacts 5562 are closed in sequential order during each cycle of operation of the transmitter distributor 5560 to permit the markings on the conductors C4171T1A to C4171T5A to sequentially control the reperforator magnet M5570. Thus, the typing reperforator 5585 will perforate the associated tape 5574 in code form in accordance with the characters of the routing indicator stored in the processing routing register 3700 in accordance with the code illustrated in Fig. 89. In this connection it should be understood that the typing reperforator 5585 is the same as the reperforator 1410 (shown in Fig. 14) and the typing reperforator X330 illustrated in Fig. 7B.

Referring again to the routing indicator storage control switch 4101 it will be recalled that its wipers 4113 to 4116, inclusive, will engage the grounded contacts 1 so that ground potential is now applied to the five conductors C4171T1A to C4171T5A, inclusive. The motor driven impulser 5201 now applies the ground potential by way of the conductor C4275PCB to the conductor C4171T6A in order to operate the clutch magnet M5561. As soon as the clutch magnet is operated, the transmitter distributor 5560 operates through a single cycle. At the beginning of the cycle, the ground at the contacts 5562 is removed from the conductor C6082TDA and during the remaining portion of the cycle, the contacts to the left thereof will close in sequence so that short ground impulses are sequentially transmitted from the grounded conductors C4171T1A to C4171T5A over the conductor C6082TDA. At the end of the cycle of operation, the ground potential at the contacts 5562 is reapplied to the conductor C6082TDA and the ground pulse for controlling the clutch magnet M5561 will be removed from the conductor C4171T6A by the motor driven impulser 5201. The conductor C6082TDA extends to Fig. 60 and returns by way of the conductor C6082RPA extending to Fig. 55 to the winding of the reperforator magnet M5570. Therefore, during the single cycle of operation of the transmitter distributor 5560 the reperforator magnet M5570 will be sequentially operated in accordance with the code markings on the conductor C4171T1A to T5A so that the corresponding code perforations will be made in the tape 5574. Since all five conductors are grounded at this time, the perforations on the tape 5574 will indicate "letters shift" character function.

The next time the motor driven impulser 5201 transmits a pulse over the conductor C4201PCA, the magnet M4110 of the routing indicator storage control switch 4101 advances its wipers into engagement with the contacts 2. In the present example, these contacts are marked in code form in accordance with the first character U of the routing indicator UACZZ. Accordingly, the next time the pulse appears on the conductor C4275PCB under control of the motor driven impulser the transmitter distributor 5560 again operates through a single cycle so that the reperforator magnet M5570 will now perforate its tape in accordance with the first character U of the routing indicator UACZZ.

The next four steps of the wipers of the routing indicator storage control switch 4101 will cause the transmitter distributor 5560 to control the typing reperforator 5585, whereby, the five characters of the routing indicator UACZZ will be perforated on the tape 5574, in the manner described above. When the wipers of the routing indicator storage control switch 4101 are advanced from engagement with the contacts 6 into engagement with the contact 7, the wipers 4114 will apply ground potential to the conductor C4171T3A so that the next cycle of operation of the transmitter distributor 5560 will cause the typing reperforator 5585 to perforate its tape 5574 in accordance with a "space" character function. As the wipers of the routing indicator storage control switch 4101 are advanced over the contact positions 8 and 9 the five conductors C4171T1A to T5A, inclusive, will be ungrounded and the transmitter distributor 5560 and typing reperforator 5585 will be controlled to perforate the normal feed holes in the tape 5574 but no other code perforations will be made and will thereby indicate two "blank" character functions on the associated tape.

When the next pulse is transmitted by the motor driven impulser to the magnet M4110, the wipers 4113 to 4117, inclusive, will be advanced from the contacts 9 into engagement with the contacts 10. When this occurs, the conductor C4171T6A is disconnected from the pulsing conductor C4275PCB and is connected to the transmitter control relay R4260. Thus, a circuit is now completed from ground by way of the upper winding of the relay R4260, wiper 4117, conductor C4171T6A extending to Fig. 55 and the winding of the clutch magnet M5561, to battery. In this circuit the magnet M5561 does not operate due to high resistance of the relay R4260. However, the latter relay operates and, at its contacts 4264, completes a locking circuit for itself which includes its lower winding, contacts 4264, conductor C4274B extending to Fig. 44 and contacts 4472 on the operated relay R4470, to ground. As soon as the relay R4260 operates it opens its contacts 4261 and 4262 in order to disconnect the conductors C4275PCB and PCA respectively from the bank contacts accessible to the wiper 4117 and from the winding of the magnet M4110 on the routing indicator storage control switch 4101. Thus, further control of the last mentioned switch and also control of the routing indicator tape storage unit 5502 by the motor driven impulser 5201 is terminated for the time being.

In view of the foregoing, it will be understood that the five characters of the first routing indicator UACZZ registered in the processing routing register 3700 have been transferred to and stored on the tape 5574 in the routing indicator tape storage unit 5502.

*Associating the routing translator X2900 with the multiple call equipment*

Referring again to the process relay R4250 (Fig. 42) it will be recalled that this relay caused the transfer of the registered routing indicator UACZZ from the processing routing register 3700 to the multiple call translator 2100; and it also caused the transfer of the routing indicator UACZZ from the processing routing register 3700 by way of the routing indicator storage control switch 4100 to the routing indicator tape storage unit 5502 where the routing indicator is stored on the tape 5574 in perforated code form. In addition to the foregoing, the process relay R4250 upon operating, at its contacts 4253, applies ground potential by way of the contacts 4221, the conductor C4291ST extending to Fig. 6, contacts 29 on the actuated connect key XK2905, contacts X3131 and X3136 and the winding of the magnet XM3144, to battery. The director hunting switch XS3140 (Fig. 5) is automatically operated when the above mentioned start circuit is completed to find and connect with the multiple call equipment that is being utilized in the present multiple call. The particular multiple call equipment being utilized is marked in the bank contacts accessible to the wipers X3142 of the director hunting switch XS3140 over the following circuit: Battery winding of the test relay R4220 (Fig. 42), contacts 4222, 4254, conductor C4291TEST extending to Fig. 6 and terminating, for example, in the contact 3 in the bank accessible to the wiper X3142.

The first time the magnet XM3144 (Fig. 5) operates over the previously traced start circuit, it closes its contacts X3146 to complete an obvious circuit for operating the interrupter relay XR3130. The latter relay, upon operating, interrupts the initial circuit for the magnet XM3144, at its contacts X3131, whereupon, the magnet restores to normal and opens the circuit for the interrupter relay XR3130. The latter relay now restores to normal and again completes, at its contacts X3131, the circuit for operating the magnet XM3144. Each time the magnet restores to normal it causes its wipers X3141 to X3243 to advance one step in the clockwise direction. Thus, these wipers are advanced step-by-step until the wiper X3142 engages the contact 3 which is marked with battery potential through the winding of the test relay R4220 (Fig. 42). When this occurs, the battery potential is further extended by way of the upper winding of the test relay XR3135 to ground at contacts 30 on the actuated connect key XK2905. The test relay XR3135 now operates and, at its contacts X3136, opens the point in the previously traced circuit for controlling the operation of the magnet XM3144. Consequently, the wipers X3141 to X3143 are brought to rest in engagement with the contacts 3 in the associated contact banks.

It should be noted that as soon as the test relay XR3135 operates, it first closes its X contacts X3138 in order to fully operate the relay over the circuit including its lower winding. Thereafter, the remaining contacts X3136 and X3137 are actuated in a normal manner. The locking circuit for the lower winding for the relay XR3135 includes the contacts X3138, contacts 31 of the actuated connect key XK2905, wiper X3143 in engagement with the contact 3, conductor C4291SU extending to Fig. 42 and contacts 4337, to ground.

As a further result of the operation of the test relay XR3135, at its contacts X3137, it shunts out its high resistance upper winding thereby to enable the test relay R4220, to now operate. The test relay R4220 (Fig. 42) upon operating, opens its initial operating circuit at its contacts 4222, and substantially simultaneously therewith it completes, at its contacts 4223, a locking circuit for itself which includes the conductor C4274E extending to Fig. 44 and ground at the contacts 4483. As a further result of the operation of the test relay R4220, at its contacts 4221, it opens a further point in the previously traced start circuit for the director hunting switch XS3140.

At the present time the routing translator X2900 and the associated patch panel X3200 are now held available for the exlusive use of the multiple call equipment being described and, consequently, it cannot be used by the directors, such as the director X200A, as long as it is being used by the multiple call equipment.

As a further result of the operation of the test relay R4220, at its contacts 4225, it completes a circuit including ground at contacts 4338 for operating the transfer relay R4210. The latter relay upon operating causes the routing indicator UACZZ which is registered in the processing routing register 3700 and marked on the conductors C3771–1A to 1E, 2A to 2E, 3A to 3E, 4A to 4E and 5A to 5E to be transferred by way of its contacts 4211–1A to 1E, 4212–2A to 2E, 4213–3A to 3E, 4214–4A to 4E, and 4215–5A to 5E to the conductors C4291–1A to 1E, 2A to 2E, 3A to 3E, 4A to 4E and 5A to 5E which terminate respectively in the first, second, third, fourth and fifth character decoding relays X2901 to X2905, inclusive, in the routing translator X2900. Thus, the operation of the transfer relay R4210 transfers the five characters UACZZ registered in the processing routing register 3700 to the corresponding registers (character decoding relays) provided in the routing register X2900.

The routing translator X2900 in conjunction with the patch panel X3200 will translate the five character routing indicator UACZZ registered in the decoding relays X2901 to X2905, inclusive, into a line number which identifies the particular outgoing line over which the multiple call message is to be transmitted to reach the tributary stations identified by the routing indicator UACZZ.

Before describing this operation, however, it should be noted that as a further result of the operation of the test relay R4220 (Fig. 42) at its contacts 4226, it completes a circuit for connecting the channel converter unit 4500 (Fig. 45) to the patch panel X3200 (Fig. 6) so that the line number of the outgoing line determined by the operation of the translator X2900 will be transferred to the channel converter unit 4500. The circuit for accomplishing the above noted connection includes ground at contacts 4338 (Fig. 43), contacts 4226 of the operated test relay R4220, conductor C4278SW2 extending to Fig. 45 and the winding of the connect relay R4510, to battery.

As soon as the connect relay R4510 operates, it closes all of its contacts in order to connect the relays in the channel converter unit 4500 to the marking conductors terminating in the patch panel X3200 (Fig. 6). As illustrated, in the channel converter unit 4500 (Fig. 45), the intercept relay R4520 is connected by way of the contacts 4511–I and 4511–P to the intercept and pilot conductors C4592–I and 4592–P extending to Fig. 6. In Fig. 6 the last mentioned conductors are respectively multipled with the conductors XC3201–I and XC3201–P. The relay R4530C1 and the relay R4540C25 respectively correspond to the first and last of twenty-five relays, only two of which have been shown. The relay R4530C1 is connected by way of the contacts 4511L1 to the conductor C4592L1 extending to Fig. 6 where it is connected to the conductor XC3201L1. The relay R4540C25 is connected by way of the contacts 4511L25 and the conductor C4592L25 extending to Fig. 6 where it is connected to the conductor XC3201L25. The remaining 23 relays R4530C2 to C24, inclusive (not shown), are substantially identical to the relays R4530C1 and R4530C25 and are provided with similar contacts. These relays are also connected respectively to conductors C4592L2 to L24 extending to Fig. 6, through corresponding contacts of the operated connect relay R4510, where they are connected to the respective conductors XC3201L2 to XC3201L24 associated with the patch panel X3200. It should be noted, however, that although the gang switch X3280 (Fig. 6) is provided with conductors XC3201L26 to L100 to indicate that at least one-hundred outgoing lines are available for use in transmitting messages to other destinations, in the present description it will be assumed that only 25 outgoing lines are provided. When each additional outgoing line is provided, then corresponding relays will be provided in the channel converter unit 4500.

Referring again to the channel converter unit 4500 (Fig. 45) it will be seen that each of the relays R4520 intercept and R4530C1 to C25 is provided with a plurality of make contacts. Generally stated, the contacts on these relays are utilized to indicate, in code form, the hundreds, tens and units digits identifying a particular outgoing line (L1 to L25) as determined by the operation of the routing translator X2900.

When a routing indicator is processed through the routing translator X2900 and the patch panel X3200, the channel converter unit 4500 will register, by operation of one of the relays R4530C1 to C25, the identity of the corresponding outgoing line determined by the routing translator X2900. The operated relay is used to seize the particular channel relay unit, such as the channel relay unit 7900 (Figs. 79 to 82), which corresponds individually to a particular outgoing line that has been designated by the routing translator X2900. The operated one of the relays R4530C1 to C25 also marks the hundreds, tens and units digit corresponding to the identified outgoing line number so that the three-digit number will be perforated and stored on a tape. Each register relay, such as the relays R4530C1 to C25 is provided with four make contacts, such as the contacts 4533–1 to 4 which may be strapped to one or more of the conductors in the group of conductors C4352U1 to U5, inclusive, in code form, in accordance with any one of the units digits 1 to 9 and 0 as is illustrated in Fig. 89. Also, each of the relays is provided with four additional contacts 4533–5 to 8, inclusive, which may be strapped to one or more of the conductors C4352–T1 to T5, inclusive, in code form, to mark the last mentioned conductors in accordance with any one of the tens digits 1 to 9 and 0. Each of the relays is provided with a make contact, such as 4533–9, which is strapped to the conductor C4352HR if it is necessary to provide a hundreds digit 1 to identify the hundreds digit of a three digit number identifying any particular outgoing line. If no hundreds digit is required, then the strap is omitted from the conductor C4352HR.

In further consideration of the channel converter unit 4500, it is noted that the intercept relay R4520 is substantially identical to the 25 relays R4530C1 to C25. However, the relay R4520 is operated under control of the routing translator X2900 through the associated patch panel X3200 if an intercept translation is made or when the routing translator X2900 fails to provide a translation for the channel converter unit 4500. In the latter case, the failure-to-translate condition is registered if a predetermined time period has elapsed and no translation has been registered in the channel converter unit 4500. This operation will be described under the heading "Routing a stored multiple call message to intercept."

The routing translator X2900 and the patch panel X3200

At the outset it is noted that the routing translator X2900 (Figs. 3 to 5, inclusive) and the patch panel X3200 (Fig. 6) is exactly the same as the routing translator 2900 and the patch panel 3200 illustrated in Figs. 29 to 32, inclusive, of the previously noted Stiles application and that each designation is provided with the prefix X for convenience. In this connection, attention is directed to the fact that the second, third, fourth and fifth decoding relays X2902 to X2905, inclusive, are exactly the same as the fully illustrated first character decoding relays X2901. Thus, each set of decoding relays includes five register relays XR2910A to E, inclusive, provided with pyramid contact sets, whereby, circuits may be completed to mark conductors corresponding to each of the twenty-six letters in the alphabet in accordance with the code perforations illustrated in Fig. 89. In the present system, the first character of any routing indicator includes any one of the three letters B, J and U and, consequently, the first character translate relays X2981 include only the relays XR2950B, J and U which correspond respectively to the three possible first letters of a routing indicator. It is apparent, however, that all twenty-six letters could be utilized as first character letters of a routing indicator by providing corresponding relays in the first character translate relays X2981.

The second character translate relays X2982 include eight possible second letter characters of a routing indicator which, in the present system, have been illustrated to be the letters A, E, F, H, K, L, M and W. When the second character decoding relays X2902 are operated individually or in combinations in accordance with any one of the above noted letters they complete circuits for operating corresponding ones of the eight relays included in the second character translate relays X2982. Only two of these relays have been illustrated and have been designated XR3005A and XR3005W, corresponding to the first and last letters A and W of the eight letters noted above. In order to simplify the illustration including the various contacts on these relays, only the contacts X3006 to X3008, inclusive, on the relay XR3005A and the contacts X3011 to X3013, inclusive, on the relay XR3005W have been illustrated. It should be understood, however, that similar contacts are also provided on the remaining six relays (not shown) thus providing facilities for selecting any one of twenty-four different conductors in the cable XC2984 by the selective operation of any one of the three relays in the first character translate relays X2981 and any one of the eight relays in the second character translate relays X2982.

The third character translate relays X2983 includes twenty-six relays A to Z, inclusive, only the first and last of which have been shown and designated XR3020A and XR3020Z. The relay XR3020A is provided with contacts X3021 to X3026, inclusive, which terminate respectively the conductors 1, 8, 9, 16, 17 and 24 in the cable XC2984. It should be understood, however, that this relay is provided with additional contacts terminating respectively each of the remaining conductors included in the cable XC2984. In addition to the foregoing, the conductor 1 in the cable XC2984 is multiply connected to a set of contacts, such as X3031, on each of the remaining twenty-five relays in the third character translate relay X2983. Contacts X3031 on the relay XR3020Z represents the twenty-five different sets of contacts through which the conductor 1 in the cable XC2984 may also be connected by the selective operations of any one of the relays XR3020B to XR3020Z, inclusive. In other words, the conductor 1 in the cable XC2984 may be pyramided into twenty-six separate markings through the make contacts on the twenty-six relays XR3020A to Z, inclusive. The same arrangement is provided for each of the conductors 2 to 24, inclusive, in the cable XC2984 so that the twenty-four conductors may be pyramided through contacts on the twenty-six relays in the third character translate X2983 into 624 separate marking conductors in the cable XC2983A. The 624 marking conductors in the cable XC2983A terminate in 624 separate jacks provided on the three character jack panel X3270 in the patch panel X3200, whereby, any one of the above noted jacks may be individually selected in accordance with the selective operation of one relay in each of the first, second and third character translate relays X2981 to X2983.

Referring now to the fourth character translate relays X2984 it will be seen that only the relays XR3040A and Z are illustrated, but it should be understood that the twenty-four additional relays B to Y, inclusive (not shown), are also provided. Each of the twenty-six relays is provided with a set of contacts, such as X3041 and X3047, illustrated respectively on the relays XR3040A and Z. Accordingly, twenty-six marking conductors are provided in the cable XC2986 which are connected respectively through make contacts, such as X3111 and X3114, on the four character relay XR3110 in order to connect the twenty-six individual conductors in the cable XC2986 to the corresponding twenty-six conductors in the cable XC2984A. The twenty-six conductors in the cable XC2984A terminate in individual jacks on the four character jack panel X3250 in the patch panel X3200.

In addition to the foregoing, the twenty-six marking conductors in the cable XC2986 are each connected to make contacts on each of twenty-six relays in the fifth character translate relays X2985. The first and last of the twenty-six relays have been designated XR3050A and XR3050Z. The conductor 1 in the cable XC2986 is connected to contacts X3051 on the relay XR3050A and it is multiply connected to corresponding make contacts on each of the remaining twenty-five relays in the fifth character translate relays X2985. Thus, the marking conductor 1 in the cable XC2986 may be pyramided into any one of twenty-six different marking conductors by the selective operation of any one of the twenty-six relays in the fifth character translate relay X2985. Since each of the twenty-six marking conductors in the cable XC2986 is connected in a similar manner through make contacts on the different relays in the fifth character translate relay X2985, 676 separate marking conductors are provided in the cable XC2985A which may be selected by the selective operation of one of the relays in the fourth and one of the relays in the fifth character translate relays X2984 and X2985. The 676 marking conductors are connected by way of the cable XC2985A to 676 individual jacks provided on the five character jack panel X3260 in the patch panel X3200.

In addition to the third, fourth and fifth jack panels X3270, X3250 and X3260, the patch panel X3200 also includes a line jack panel X3220 which terminates conductors corresponding respectively to one hundred separate outgoing lines extending from the relay switching center UAC. Since some of the outgoing lines may be utilized to route telegraph messages to a number of destinations by way of a number of relay switching centers, such outgoing lines are multiply connected to a plurality of line jacks provided in the jack panel X3220. The L1 outgoing line, for example, has been illustrated as being multiply connected to a plurality of line jacks. Thus, a number of jacks in a three character jack panel X3270 may be connected by means of the patch cords, such as X3233, to the multiply connected jacks terminating the L1 outgoing line, if the routing indicators corresponding to the three character jacks indicate that such messages must be routed over the L1 outgoing line. Outgoing lines that extend to tributary stations, for example, which are local to the relay switching center UAC are only provided with single jacks inasmuch as a single outgoing line will normally handle all of the traffic to the corresponding tributary station. In the present example, the L99 and L100 outgoing lines have been terminated in single line jacks in the jack panel X3220. The line jack panel X3220 also includes a plurality of intercept jacks which are multiply connected so that a plurality of the jacks in the third, fourth and fifth character jack panels may be connected to intercept by means of the double ended patch cord, such as X3231, X3232 and X3233. Finally, the three character jack panel X3270 is provided with a local jack XJ3271 which is utilized to interconnect the three character jack in the jack panel X3270 which corresponds to the first three characters UAC of the present switching center or of any one of its tributary stations having four or five character routing indicators, the first three letters of which are UAC. In conclusion, it should be understood that the patch cords X3231 to X3234, inclusive, are provided in order to readily connect the various jacks in the third, fourth or fifth character jack panels with any one of the L1 to L100 line jacks provided in the line jack panel X3220 and with the intercept jacks.

In the present multiple call message, the five characters UACZZ have been registered respectively in the five sets of decoding relays X2901 to X2905, inclusive, by the processing routing register 3700. Since five characters have been registered therein, a circuit has also been completed for operating the five character relays XR3070 (Fig. 4) in order to indicate to the routing translator X2900 that five characters have been registered. If four characters instead of five are registered as the routing indicator, then the four character relays XR3060 is operated and in the event that only three characters of a routing indicator have been registered, then both of the relays XR3060 and XR3070 will remain in their restored positions. The circuit for operating the five character relay XR3070 includes battery, winding of the relay, contacts 27 of the actuated connect key XK2905, conductor C4291-5CH extending to Fig. 42 and the conductor C3771-5CH extending to Fig. 38. It will be recalled that the last mentioned conductor was grounded in order to operate the five character relay R4150 (Fig. 41) and, consequently, completed a multiple circuit for operating the five character relay XR3070 (Fig. 4). If the four character relay R4130, instead of the five character relay R4150, is actuated, then the operating ground potential on the conductor C3771-4CH is extended by way of the conductor C4291-4CH to Fig. 4 in order to operate the four character relay XR3060 in the routing translator X2900.

With the character U registered in the first character decoding relays X2901, a circuit will be completed from ground, at the contacts X2941, through the set of pyramid contacts to operate the relay XR2950U. The latter relay, at its contacts X2971, will extend ground potential to the contacts X3008 on the relay XR3005A which has been operated due to the fact that the second character A of the routing indicator has been registered in the second character decoding relays X2902. Since the character C is registered in the third character decoding relay X2903, the C relay (not shown) similar to the relay XR3020A is operated so that a circuit is completed for grounding the conductor 419 in the cable XC2983A. This conductor terminates in the jack XJ419 (UAC) in the three character jack panel X3270 which corresponds to the present relay switching center UAC. The ground potential is further extended by way of a patch cord, such as X3234, to the local jack XJ3271, inasmuch as the present message is to be routed to a tributary station in the area served by the relay switching center UAC.

Normally, all of the local messages received at the relay switching center UAC include the routing indicator UAC and also a fourth, or a fourth and fifth, character designating the particular tributary station. In the present example, the fourth character Z registered in the fourth character decoding relay X2904 has caused the operation of the relay XR3040Z and the fifth character Z registered in the fifth character decoding relay X2905 has caused the operation of the relay XR3050Z.

The ground potential applied to the local jack XJ3271, as noted above, is extended to the contacts 3072 of the operated relay XR3070, contacts X3047 of the operated relay XR3040Z, conductor 26 in the cable XC2986, contacts X3057 on the operate relay XR3050Z conductor 676 in the cable XC2985A to the jack XJ676 in the five character jack panel X3260. The jack XJ676 may be connected by means of a patch cord, such as X3233, to any one of the line jacks L1 to L100 depending upon the identity of the particular outgoing line over which the message must be transmitted to reach a tributary station UACZZ.

For the present description, it will be assumed that the jack XJ676 in the five character jack panel X3260 is connected, by means of a patching cord, to the line jack terminating the conductor L1. Accordingly, the ground potential is further extended by way of the L1 conductor to the terminals X3281A, X3281B, contacts X3283 on the gang switch X3280, conductor XC3201L1, which is multiply connected to the conductor C4592L1 extending to Fig. 45, contacts 4511L1 and the upper winding of relay R4530C1, to battery. The relay R4530C1 operates and immediately locks itself in its operated position over a circuit including its lower winding, contacts 4534, conductor C4401SU extending to Fig. 44 and ground at contacts 4483.

The first important operation performed by the relay R4530C1 is to release the relays of the routing translator X2900, since the particular routing indicator UACZZ registered therein has been translated into an outgoing line designation L1 and has been registered in the channel converter unit 4500 by the operation of relay R4530C1. Thus, at the contacts 4532, the relay R4530C1 connects ground potential by way of the conductor C4352CON extending to Fig. 43 in order to operate, in multiple, the connect relays R4330 and R4340 in the sequence control unit 4100. As soon as the relay R4330 operates, the contacts 4332 to 4336, inclusive, connect the tens digit marking conductors C4352T1 to T5, inclusive, from the channel converter unit 4500 (Fig. 45) to the contacts 3 in the banks accessible to the wipers 4312 to 4316, inclusive, of the line number storage control switch 4301. The relay R4340, at its contacts 4342 to 4346, inclusive, connects the units marking conductors C4352U1 to U5, inclusive, from the channel converter unit 4500 (Fig. 45) to the contacts 4 in the banks accessible to the wipers 4312 to 4316, inclusive, of the line number storage control switch 4100. Accordingly, the tens and units digits, which are marked in code form by the operation of the relay R4530C1 in the channel converter unit 4500 are now extended to predetermined contacts on the line number storage control switch 4301 and will be transmitted to and stored on the tape 5534 in the outgoing line number tape storage unit 5501 in the manner to be described hereinafter.

As a further result of the operation of the connect relay R4330, at its contacts 4337, it removes ground potential from the conductor C4291SU extending to Fig. 6 in order to restore the test relay XR3135 in the director hunting switch XS3140 so the latter mechanism may be again utilized to search for the director or, as disclosed in the previously mentioned Stiles application, to search for another sequence control unit, such as 4100, requiring the use of the routing translator X2900 and the patch panel X3200. Simultaneously, with the release of the above mentioned test relay XR3135, the contacts 4338 on the relay R4330 interrupt the circuit including the contacts 4225, in order to restore the transfer relay R4210 and to interrupt the circuit including the contacts 4226 and the conductor C4278SW2 extending to Fig. 45, in order to restore the connect relay R4510. The restoration of the transfer relay R4210 disconnects, at its various contacts, the processing routing register 3700 from the character decoding relays X2901 to X2905, inclusive, in the routing translator X2900. Consequently, all of the relays, except the five character relay XR3070, in the routing translator X2900 now restore to normal. The relay XR3070 will restore immediately thereafter as will be subsequently described.

As soon as the connect relay R4510 in the channel converter unit 4500 restores to normal, as noted above, it will disconnect the various relays therein from the conductors extending to the patch panel X3200, but the operated relays in the channel converter unit 4500, such as the relay R4530C1 remains locked in its operated position to the conductor C4401SU until the hundreds, tens and units digits, marked by the various strappings on the associated contacts, has been transferred to and stored in the outgoing line number tape storage unit 5501.

*Transferring the number of the outgoing line from the channel converter unit 4500 to the outgoing line number tape storage unit 5501*

In the above description regarding the operation of the channel converter unit 4500, it was pointed out that the relay R4530C1 was operated as a result of the translation of the routing indicator UACZZ by the routing translator X2900 into the identity of the outgoing line over which the message must be transmitted to ultimately reach its destination. The relay R4530C1 caused the operation of relays R4330 and R4340 so that the marking conductors in the channel converter unit 4500 are extended to the bank contacts of the line number storage control switch 4301. This operation caused the disconnection of the routing translator X2900 and the patch panel X3200, as previously described.

In addition to the foregoing, the relay R4330, at its contacts 4331, connects the winding of the magnet M4310 by way of the contacts 4271 to the conductor C4275PCA so that the pulses transmitted by the motor driven impulser 5201 (Fig. 52) will now control the stepping of the wipers of the line number storage control switch 4301. Also, the relay R4340 upon operating, at its contacts 4347, connects the bank contacts 1 to 9, inclusive, accessible to the wiper 4316 to a circuit including the contacts 4272 and the conductor C4275PCB so that the motor driven impulser 5201 can transmit pulses over the conductor C4351T6B extending to Fig. 55 to periodically operate the clutch magnet M5521 of the transmitter distributor 5520 in the outgoing line number tape storage unit 5501. The operation of the outgoing line number tape storage unit 5501 will be precisely the same as the previously described operation of the routing indicator tape storage unit 5502.

The first pulse transmitted to the magnet M4310 causes the magnet to operate and restore and thereby advance its wipers 4312 to 4317, inclusive, one step in a clockwise direction into engagement with the contacts 1 in the associated contact banks. At this time, ground potential applied to the contacts 1 engaged by the wipers 4312, 4313, 4315 and 4316 will apply ground potential to the conductor C4351T1B, T2B, T4B and T5B extending to Fig. 55 to mark these conductors in code form in accordance with the "figures shift" character function. Immediately thereafter, the ground pulse applied to the conductor C4275PCB by the motor driven impulser 5201 will be extended by way of the wiper 4317, conductor C4351T6B extending to Fig. 55 in order to operate the clutch magnet M5521. Since the transmitter distributor 5520 is exactly the same as the transmitter distributor 5560 it will be appreciated that the various contacts terminate in the conductors C4351T1B to T5B, inclusive, will be sequentially connected to the conductor C6082TDB extending to Fig. 60, then by way of the conductor C6082RPB, extending back to Fig. 55 in order to operate the reperforator magnet M5530. During the cycle of operation of the clutch magnet M5521, the reperforator magnet M5530 will be sequentially operated so that the code perforations corresponding to the markings on the conductor C4351T1B to T5B, inclusive, will be perforated on the tape 5534. The first cycle of operation will cause the code perforations corresponding to the "figures shift" character function to be perforated on the tape 5534.

The next pulse transmitted from the motor driven impulser 5201 over the conductor C4375PCA will again operate and restore the magnet M4310 so that its wipers will be in engagement with the contacts 2. In this position, the wipers 4313, 4314 and 4316 engage permanently grounded contacts. The wiper 4312 in contact position 2 engages the contact terminating the conductor C4352HR which will be grounded by the operated relay R4530C1 only if the hundreds digit 1 is necessary to identify the number of the outgoing line. If the line number has a hundreds digit 0, then the conductor C4352HR will not be grounded by the operation of the relay R4530C1. In either event, the next time a pulse appears on the conductor C4575PCB, the outgoing line number tape storage unit 5501 will be operated, in the manner previously noted, so that either the code perforations corresponding to the hundreds digit 0 or the hundreds digit 1 will be perforated on the tape 5534. It will be assumed from this description that the conductor C4352HR is grounded at the contacts 4533–9 by the relay R4530C1 so that the hundreds digit 1 is perforated in code form on the tape 5534 when the wipers 4312 to 4317 engage the contacts 2.

The next pulse transmitted over the conductor C4275PCA controls the magnet M4310 to operate and restore and thereby advance its wipers 4312 to 4317, inclusive, an additional step into engagement with the contacts 3. In this position the wipers 4312 to 4316, inclusive, will engage the contacts terminating the conductors C4352T1 to T5, inclusive, which are marked with ground potential in accodrance with the tens digit identifying the outgoing line over which the particular message must be transmitted to the tributary station UACZZ. As previously noted, the contacts 4533–1 to 4533–4 on the relay R4530C1 may be strapped to the above noted conductors, in code form, in accordance with any one of the digits 1 to 9 and 0. In the present example, it will be assumed that the conductors C4352T2, C4352T3 and C4352T5 of the five conductors will be marked with ground potential in code form in accordance with the digit 0. Accordingly, the ground potential on these three conductors will be further extended by way of the wipers 4313, 4314 and 4316 to the conductors C4351T2B, T3B and T5B so that when the next pulse transmitted over the conductors C4275PCB it will control the transmitter distributor 5520 to operate through a single cycle and thereby cause the reperforator magnet M5530 in the typing reperforator 5540 to perforate the associated tape in accordance with the digit 0.

The next pulse received over the conductor C4275PCA will again cause the magnet M4310 to advance its wiper an additional step into engagement with the contacts 4 terminating the units marking conductors C4352U1 to U5, inclusive. These conductors may be marked in code form by contacts 4533–1 to 4 on the relay R4530C1 to indicate any units digit 1 to 9 and 0. In the present example, it is assumed that the conductors C4352U1, U2, U3 and U5 are grounded in accordance with the units digit 1. Consequently, when the next pulse is transmitted over the conductor C4275PCB, the transmitter distributor 5520 and the typing reperforator 5545 will be controlled so that the tape 5534 will be perforated in accordance with the units digit 1.

Pulses are transmitted at spaced intervals over the conductor C4275PCA to the magnet M4310 so that the wipers are advanced step-by-step from the contacts 4 over the contacts 5 to 7, inclusive. As each step is taken a pulse is also transmitted over the conductor C4275PCB so that the transmitter distributor 5520 will be operated through a single cycle. Since only the wiper 4313 engages grounded contacts 5 to 7 three "space" character function will be successively perforated on the associated tape by the reperforator 5545. The wipers 4312 to 4316, inclusive, will then be advanced step-by-step into engagement with the associated contacts 8 and 9, but inasmuch as these contacts are not grounded, the typing reperforate 5545 will be successively operated to perforate the associated tape with only a "feed" hold (see Fig. 89) to indicate a "blank" character function. Thus, three "space" and two "blank" character functions will appear in the order named on the tape 5534 following the units digit of the three digit number 101 identifying the particular outgoing line over which the message must be transmitted to the tributary station UACZZ.

When the next pulse is received over the conductor C4275PCA, the magnet M4310 advances its wipers an additional step into engagement with the contacts 10. In position 10, the wiper 4317 connects the clutch magnet M5521 of the transmitter distributor 5520 by way of the conductor C4351T6B extending to Fig. 43, wiper 4317, engaged contact 10, and the winding of the complete relay R4270, to ground. The relay R4270 operates over this circuit but due to its resistance, the magnet M5521 does not operate. The relay R4270, at its contacts 4271, interrupts a point in the circuit of the magnet M4310 in order to terminate the transmission of further pulses thereto from the conductor C4275PCA. Also, at its contacts 4272, the relay R4270 disconnects the pulse conductor C4275PCB from the multiply connected bank contacts accessible to the wiper 4317. Finally, at its contacts 4273, the relay R4270 extends ground potential by way of the conductor C4276COM extending to Fig. 25, contacts 2533 and 2525, conductor C4276COMP extending to Fig. 42, contacts 4263, conductor C4274D extending to Fig. 44 in order to complete a circuit for operating the PRCP relay R4480 to indicate that the processing of the particular routing indicator UACZZ has been completed.

*The multiple call translator 2100*

At the present time the operation of the process relay R4250 in the sequence control unit 4100 has caused the registration of the first routing indicator UACZZ of the multiple call message stored in the processing routing register 3700 to be transferred to and stored on the tape of the routing indicator tape storage unit 5502. The relay R4250 has also caused the routing indicator UACZZ to be translated by the routing translator X2900 and the patch panel X3200 into a single control identifying a particular outgoing line which is stored in the channel converter unit 4500. The latter unit in turn has translated the outgoing line identification into a three digit number and this number has been transferred to and stored on tape in the outgoing line number tape storage unit 5501. In addition to the foregoing, the process relay R4250 in the sequence control unit 4100 has controlled the processing routing register 3700 so that the three characters UAC, of the five character routing indicator UACZZ, are transferred to and stored respectively in the first, second and third character decoding relays 2101, 2102 and 2103 of the multiple call translator 2100 (Figs. 21 to 28, inclusive).

In view of the foregoing, it will be understood that the relays R2110A, B and C in the first character decoding relays 2101 have been operated to register the first character U; relays (not shown), which are the same as the relays R2110A to E, inclusive, in the second character decoding relays 2102 have been operated to register the second character A; and relays (not shown), which are also the same as the relays R2110A to E, inclusive, in the third character decoding relays 2103 have been operated to register the third character C. Attention is directed to the fact that the conductor C2181A to E, inclusive, are connected respectively to the conductors over which the relays R2110A to E, inclusive, may be operated and they are also connected to the windings of the five relays R2404A to E, inclusive, illustrated in Fig. 24. Accordingly, the relays R2404A, B and C will be operated in multiple with the relays R2110A, B, and C to also register the first character U.

Before continuing with the detailed description of the operation of the multiple call translator 2100, the general description of the circuits and apparatus therein will first be given.

Figure 26:
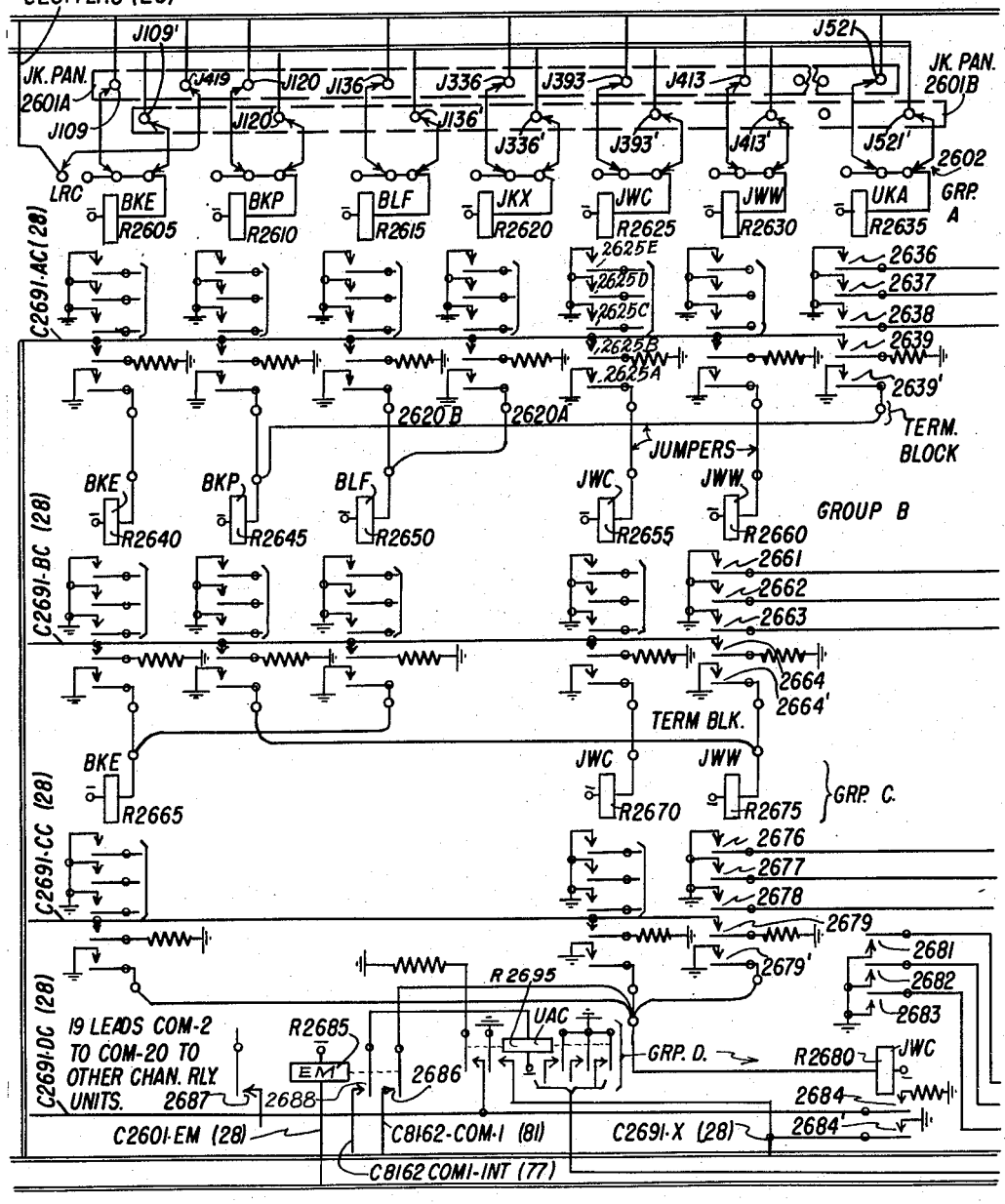
Figure 27:
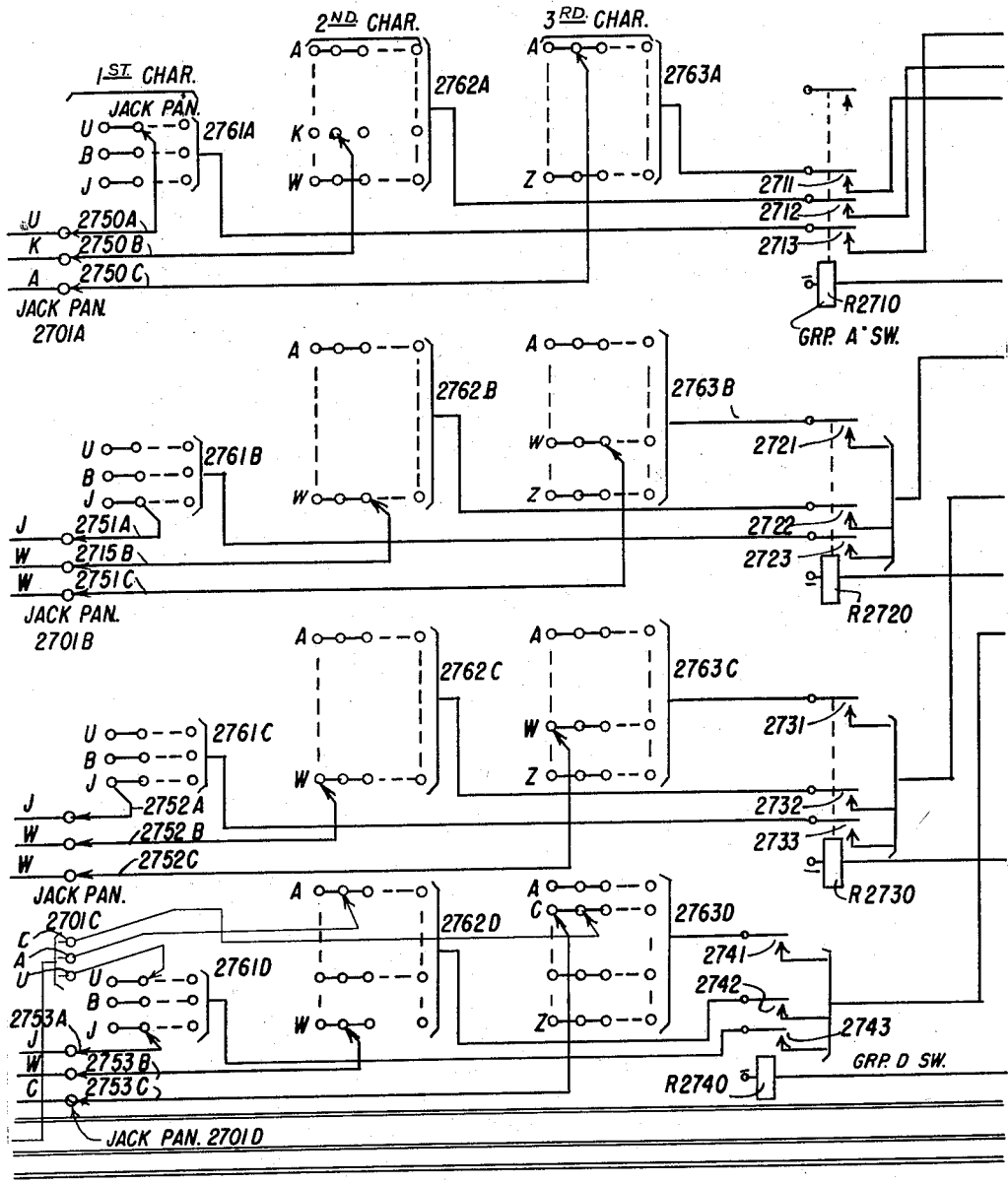

As previously noted, one portion of the translator 2100 includes the first, second and third character decoding relays 2101 to 2103, inclusive, and as each character is registered in each of these units, it in turn causes the operation of the respective first, second and third character translate relays 2181, 2182 and 2183 in the same manner as explained previously in connection with the operation of the routing translator X2900. By operating only one of the three relays in the first character translate relays 2181, by operating one of the eight relays in the second character translate relays 2182, and by operating one of the relays in the third character translate relays 2183, one of 624 conductors in the cable C2285 may be selected. These conductors terminate respectively in correspondingly numbered jacks in the jack panel 2601A (Fig. 26). It should be understood that if a fourth relay is provided in the first character translate relays 2181 and a ninth relay is provided in the second character translate relays 2182, corresponding respectively to additional first and second characters of a routing indicator, the contacts on these relays would be connected through additional contacts on the third character translate relays 2183 so that the number of jacks on the jack panel 2601A would now be increased to 936. Thus, each jack on the jack panel 2601A corresponds to a different combination of three letter routing indicators that may be registered in the first portion of the translator 2100 comprising the first, second and third character decoding relays 2101 to 2103, inclusive.

The second portion of the multiple call translator 2100, including the fourth, fifth and sixth character decoding relays 2201, 2202 and 2203 and the associated fourth, fifth and sixth translate relays 2281 to 2283, inclusive, are exactly the same as the corresponding apparatus in the first portion of the translator 2100. These two portions of the multiple call translator 2100 may, for convenience, be identified as the first translator and the second translator. The second translator is provided with 624 conductors in the cable C2385 which also terminate in the 624 jacks provided on the jack panel 2601B.

It may be well to mention at this time that the first portion of the translator comprising the units 2101 to 2103 and 2181 to 2183 will be utilized to translate routing indicators, one at a time, as they are registered therein. The second portion of the translator is, at times, utilized to compare a previously registered routing indicator with a new routing indicator.

Referring now to Fig. 26 it will be seen that for the present system, the Group A relays shown at the upper portion of the drawing and designated as R2605 to R2635 correspond respectively to each of the relay switch centers shown to the left of the relay switching center UAC in Fig. 1 of the drawings. In each system, the number of relays in Group A will correspond to the number of relay switching systems accessible over outgoing lines from the relay switching center UAC. However, the tributary stations will not have corresponding relays in the Group A. By referring to the trunking diagram of Fig. 1 it will be seen that the furthest relay switching centers to the left are the relay switching centers UKA and JKX. Therefore, in the Group B relays of Fig. 26 the relays corresponding to the switching centers of Group A are also included but the relays corresponding to the relay switching centers UKA and JKX are omitted. In Group C, the relays corresponding to the relay switching centers BKP and BLF are omitted, as well as the relays corresponding to the relay switching centers UKA and JKX. Finally, in Group D, all of the relays except the relay corresponding to the relay switching center JWC has been omitted. This arrangement of the Groups A, B, C and D relays will be utilized in the subsequent description so that a registration will be made of the particular relay switching center which may be held responsible for retransmission of a multiple call message to two or more other switching centers.

More specifically, if a multiple call message received at relay switching center UAC which must be transmitted to, for example, the relay switching centers UKA and JKX, the multiple call translator 2100 in the relay switching center UAC will automatically analyze the routing indicators UKA and JKX included in the message and will automatically establish a new heading or pilot information for the multiple call message which must be transmitted to the relay switching center JWC. That is, when the single message is transmitted from the relay switching center UAC over the outgoing line to the relay switching center JWC, the message will include a pilot information, directing the relay switching center JWC to automatically handle the message as a multiple call message and to transmit the message substantially simultaneously over two different outgoing lines toward the switching centers UKA and JKX. Thus, the relay switching center JWC is automatically selected as the logical switching center to be held responsible for the retransmission of the multiple call message to the two relay switching centers UKA and JKX.

Referring again to Fig. 26 it will be seen that the BKE relay R2605, which corresponds to the switching center BKE, is connected to a plurality of multiply connected jacks. The jack on the jack panel 2601A and B that correspond to the relay switching center BKE are respectively numbered J109 and J109'. Therefore, plug ended patch cords are respectively pluged into the jacks J109 and J109' and into the multiply connected jacks terminating the BKE relay R2605. The remaining relays in Group A are connected in a similar manner so that plug ended patch cords may be utilized to interconnect the relays corresponding to the different relay switching centers with the correspondingly numbered jacks in the jack panels 2601A and B.

Referring to the relay R2635 which is representative of the relay switching center UKA, it will be seen that the make contacts 2636 to 2638 on this relay are connected to three jacks U, K and A on the jack panel 2701A. The remaining relays in Group A are provided with similar make contacts which respectively terminate in jacks (not shown) on the jack panel 2701A which are also representative of the three letters of each of the corresponding relay switching centers. All of the jacks on the jack panel 2701A are, in turn interconnected by double ended patch cords, such as 2750A to C, inclusive, to the respective first, second and third character jack panels 2761A, 2762A, 2763A. The jack panel 2761A includes a plurality of U, B and J jacks representative respectively of the three possible first characters U, B and J of a routing indicator. As illustrated the jack U on the panel 2701A is connected to the jack U on the panel 2761A by means of the double ended patch cord 2750A. The corresponding jacks on the jack panel 2701A of all of the first characters identified by the remaining relays in Group A are also interconnected by patch cords to correspondingly lettered jacks on the first character plug panel 2761A.

The second character jack panel 2762A is provided with a plurality of multiply connected jacks A, E, F, H, K, L, M, W corresponding respectively to the possible second letters of routing indicators. As illustrated, the jack K on the jack panel 2701A is interconnected by the patch cord 2750B to one of the K jacks on the panel 2762A. All other corresponding jacks on the panel 2701A representing the second character of routing indicators are also interconnected to correspondingly lettered jacks on the panel 2762A.

Finally, the third character jack panel 2763A is provided with a plurality of multiply connected jacks A to Z, inclusive, corresponding to the twenty-six letters of the alphabet. The third character A of the routing indicator UKA terminating in the jack panel 2701A is interconnected by the patch cord 2750C to one of the A jacks on the jack panel 2763A.

The Group B, Group C and Group D relays (Fig. 26) are provided with corresponding make contacts which terminate on individual jack on the jack panels 2701B, C and D in the same manner as described above and they, in turn, are connected by patch cords to the respective first, second and third character jack panels, 2761B, to 2763B and 2761C to 2763C, 2761D and 2763D, inclusive. From the foregoing, it will be seen that the relays in Group A (Fig. 26) are interconnected by way of certain of their make contacts to jacks on the first, second and third character jack panels 2761A, 2762A and 2763A which correspond to the three letters identified by each of the relays. The same arrangement is provided for the Groups B, C and D relays and the corresponding jack panels.

The first character jack panel 2761A includes three conductors, corresponding to the respective jacks U, B and J, which are connected through three contacts, such as 2713 on the Group A switching relay R2710, to three Group A encoding relays, such as R2850-1. The relay R2850-1 is representative of the first character U. The relays R2850-2 and 3 (now shown) are the same as relay R2850-1 and are representative of the first characters B and J. The eight jacks A, E, F, H, K, L, M, and W on the second character jack panel 2762A are connected by means of eight conductors through eight contacts, such as the contact 2712 to eight Group A encoding relays, such as the relay R2850-4. As illustrated, the relay R2850-4 is representative of the second character A and there are seven additional relays corresponding to the seven remaining second character letters. Finally, the twenty-six jacks corresponding to the letters A to Z, inclusive, on the third character jack panel 2763A are connected through twenty-six contacts, such as the contacts 2711, to 26 Group A encoding relays, such as the relay R2850-37. The relay R2850-37 is representative of the third character Z. Each of the encoding relays R2850-1 to R2850-37 in Group A is provided wth five make contacts which terminate in five terminals A to E, inclusive, on the terminal block TB2861A. The five contacts shown below the U relay R2850-1 will apply ground potential to the five terminals A to E, inclusive, on the terminal block TB2861A. Since this relay is representative of the letter U it is contemplated that certain of the five terminals will be strapped to one or more of the terminals terminating the conductors C2871A to E, inclusive, so that the last mentioned conductors will be marked, in accordance with the code of Fig. 89, with the letter U. Thus, the A, B, and C terminals on the terminal block TB2861A will be strapped to the terminals on terminal block TB2862B terminating the conductors C2871A, B and C. Each set of contacts on the encoding relay in Group A representative of the three first characters U, B and J will be strapped between the terminal blocks TB2861A and TB2862 B in accordance with respective first letters U, B and J of a routing indicator. The eight encoding relays, such as R2850-4 corresponding to the previously noted eight letters of the second character of routing indicators will also be strapped between the terminals A1 to E1 on the terminal block TB2861A and the terminals on the terminal block TB2862B terminating the conductors C2872A to E so that each of the possible second characters of routing indicators will be marked in code form on the conductors C2872A to E. Finally, the twenty-six encoding relays, such as R2850-37 representative of the twenty-sx possible third characters of routing indicators are strapped between the terminals A2 to E2 on the terminal block TB2861A and the terminals o nthe terminal block TB2862B terminating the conductor C2873A to E so that any third character of a routing indicator may be marked in code form on the conductors C2873A to E.

The Group B, C and D encoding relays (Fig. 28) are exactly the same as the Group A encoding relays noted above and their make contacts are jumpered so that the respective first, second and third characters of each Group B, C and D encoding relays are jumpered to the corresponding first, second and third groups of code marking conductors C2871A to E, C2872A to E and C2873A to E in exactly the same manner as has been explained above.

Figure 23:
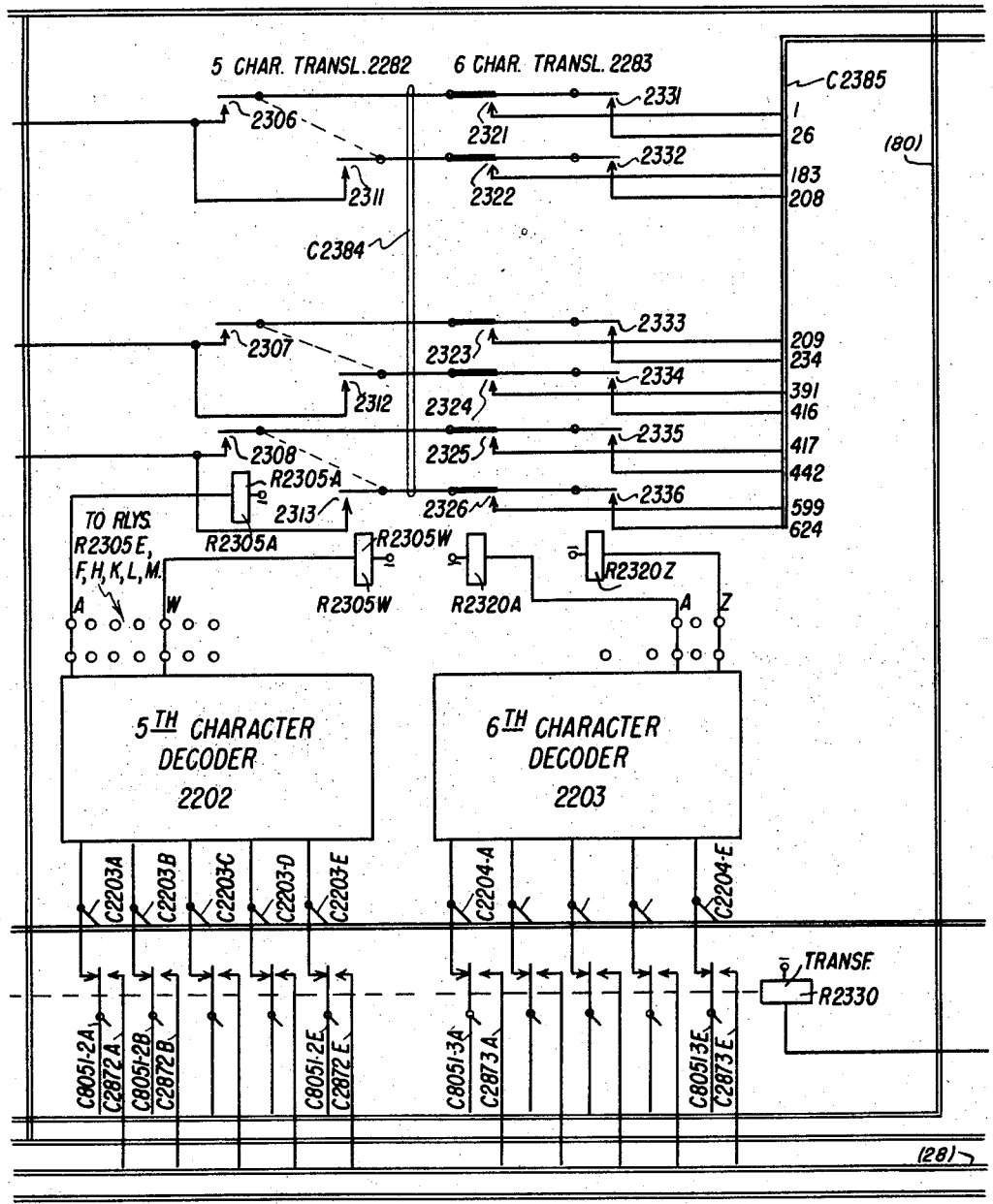
Figure 28:
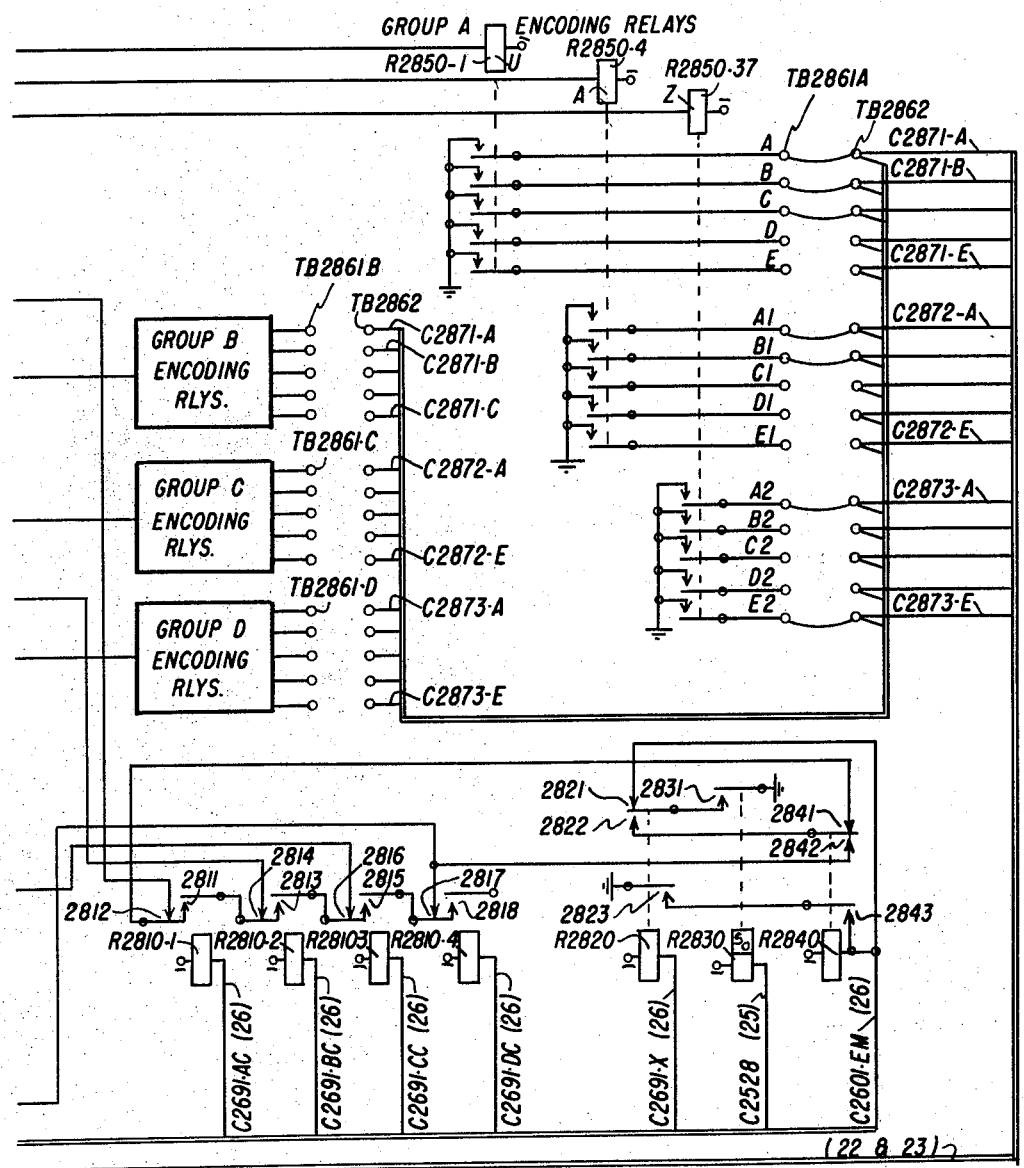

The three sets of five conductors C2871A to E, C2872A to E and C2873A to E, inclusive, of Fig. 28 terminate in make contacts on the transfer relay R2330 of Fig. 23. If the transfer relay R2330 is in an operated position the three characters marked on these conductors in accordance with the operated condition of either the Groups A, B, C or D encoding relays will be transferred by way of the conductors C8051–1A to 1E, 2A to 2E, and 3A to 3E to and registered in the particular channel relay unit, such as the channel relay unit 7900 illustrated in Figs. 79 to 82, inclusive, that is selected by an operated relay in the channel converter unit 4500. The present system is provided with as many channel relay units as there are outgoing lines extending from the relay switching center UAC and each channel relay unit corresponds to its own outgoing line. There is also an intercept channel relay unit 7740, schematically illustrated in Fig. 77, which is substantially the same as the channel relay unit 7900, and is used to intercept multiple call messages which, for some reason, cannot be routed to the one or more of the destinations identified by one or more routing indicators listed in the message.

From the subsequent description of the operation of the system, it will be seen that the first time the first portion of the multiple call translator 2100 analyzes a three digit routing indicator, it causes a three letter routing indicator, which may be the same or a different routing indicator than the one first registered in the translator 2100, to be stored in the channel relay unit, such as 7900, corresponding to the outgoing line over which the message must be transmitted to reach the destination indentified by the routing indicator. When the translator 2100 registers the next routing indicator in the first portion thereof that is also to be transmitted over the same outgoing line, the first routing indicator stored in the corresponding channel relay unit will be transferred back to the second portion of the translator 2100 so that a comparison may be made between the routing indicator registered in the first portion and the routing indicator registered in the second portion of the translator 2100. If the comparison indicates that one message may be transmitted to an intermediate relay switching center, the multiple call translator 2100 will function to register the identity of that relay switching center in the corresponding channel relay unit. The identified intermediate relay switching center will then function to retransmit the received message over one or more outgoing lines so that it will reach the destinations identified by certain of the tributary station routing indicators.

Operation of the multiple call translator 2100

As described under the heading "The multiple call translator 2100" the three characters UAC of the five character routing indicator UACZZ are registered respectively in the first, second and third character decoding relays 2101 to 2103, inclusive. The relays in the first character decoding relays 2101 are operated, in code form, in accordance with the first character U so that through the various contacts on the relays, a circuit is completed for operating the relay R2150U in the first character translate relays 2181. The relays in the second character decoding relays 2102 are operated, in code form, in accordance with the second character A and, in the same manner, complete an operating circuit for the relay R2205A in the second character translate relays 2182. The third character decoding relays 2103 are operated, in code form, in accordance with the third character C and, consequently, cause the operation of the relay R2220C (not shown) in the third character translate relays 2183. As a result of the operation of the relay noted in each of the first, second and third translate relays 2181 to 2183, inclusive, the conductor 419 (not shown) in the cable C2285, and representative of the three characters UAC, is grounded. Since this conductor terminates in the jack J419 on the jack panel 2601–A the jack is also grounded at this time.

The relay switching center UAC is the particular center that is handling the present call and, consequently, the jack J419 is interconnected by a patch cord with the jack LRC. The jack LRC is representative of a local call and terminates the conductor C2571–LRC extending to Fig. 25 where it is connected to the winding of the registration complete relay R2530. The relay R2530 (Fig. 25) operates at this time in order to cut-off the translator comparison process which normally takes place if any other group of three characters is registered in the multiple call translator 2100. Since the tributary station identified by the five characters UACZZ is reached directly over an outgoing line from the relay switching center UAC, as is best illustrated in Fig. 1, the selection of a relay center to be addressed in connection with the present multiple call message to the tributary station UACZZ is not required and the operation of the registration complete relay R2530 effectively cuts off the comparison process of the multiple call translator 2100.

As soon as the relay R2530 operates it prepares, at its contacts 2533, a circuit for connecting the conductor C4276COM to the conductor C4276COMP as soon as a channel relay unit, such as 7900, is seized and causes the operation of the channel unit connect relay R2520.

In order to describe the manner in which the channel unit connect relay R2520 is operated it will be necessary to again return to the channel converter unit 4500 (Fig. 45). It will be recalled that in connection with the processing of the routing indicator UACZZ, the routing translator X2900 operated the relay R4530–C1 in the channel converter unit 4500 and that the latter relay translated the particular outgoing line designation L1 into the three digit line number designation 101 and the last-mentioned three digit designation was perforated on the tape associated with the routing indicator line number perforator 5501. At the time the relay R4530–C1 operated it closed its contacts 4531 to select the channel relay unit, such as the unit 7900, which is identified with the particular L1 outgoing line having the three digit designation 101. The conductor C4582–COM, connected to the contacts 4531, extends to Fig. 25 where it terminates in the make contacts 2514 on the relay R2510. The last mentioned relay operated under control of at least one of the translator No. 1 common relays R2404–A to R2404–E which are in turn operated in response to the registration of the first character U in the first character decoding relays 2101. Therefore, the relay R2510 applies ground potential by way of its contacts 2514, conductor C4582COM extending to Fig. 45, contacts 4531 of the operated relay R4530–C1, conductor C4581COM–1 extending to Fig. 81 in order to operate, in multiple, the translator connect relay R8010, the seizure relay R8130 and the relay R8150 in the channel relay unit 7900 which corresponds to the L1 outgoing line having the three digit designation 101.

Figure 81:
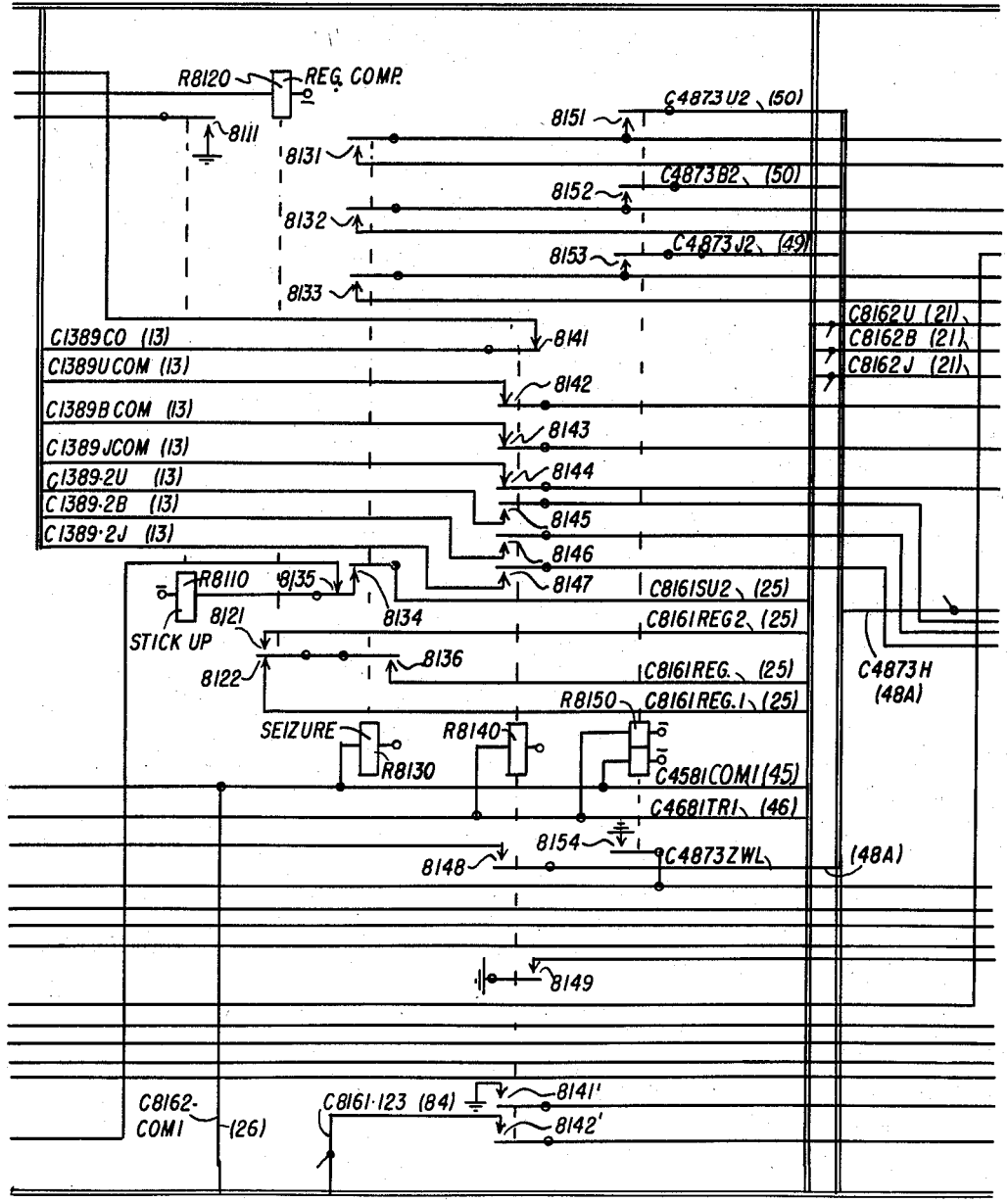

As a further result of the operation of the relay R2510, at its contacts 2513, it applies ground potential by way of the conductor C8161REG extending to Fig. 81 and terminating in the make contact 8136 on the seizure relay R8130.

As soon as the relays R8010, R8130 and R8150 in the channel relay unit 7900 operate, they condition the unit for further operation so that the routing indicator determined by the multiple call translator through its encoding relays will be stored in the corresponding channel relay unit 7900. In the present call the routing indicator need not be stored in the channel relay unit 7900 since the unit corresponds to an outgoing line extending directly to the tributary station UACZZ. The relay R8130, upon operating, connects the winding of the stick-up relay R8110 to the conductor C8161SU2 extending to Fig. 25 where this conductor is normally grounded at the contacts 2552. The relay R8110 operates over this circuit and, at its contacts 8111, provides a holding ground potential for locking operated ones of the relays in the register relays 8001. As a further result of the operation of relay R8130, it connects the grounded conductor C8161REG, by way of the contacts 8136 and 8122, conductor C8161REG1 extending to Fig. 25 in order to operate the channel unit connect relay R2520.

The relay R2520 (Fig. 25) upon operating locks itself over the circuit including its lower winding and contacts 2523 and 2511. At this time, the contacts 2525 are closed and since the contacts 2533 have been closed by the operation of relay R2530, the conductor C4276COM and C4276COMP extending to Fig. 42 are interconnected to transmit a signal to the sequence control unit 4100 to indicate that the multiple call translator 2100 may be released since it is not necessary to store the three characters UAC of the tributary station routing indicator UACZZ in the individual channel relay unit 7900.

Figure 25:
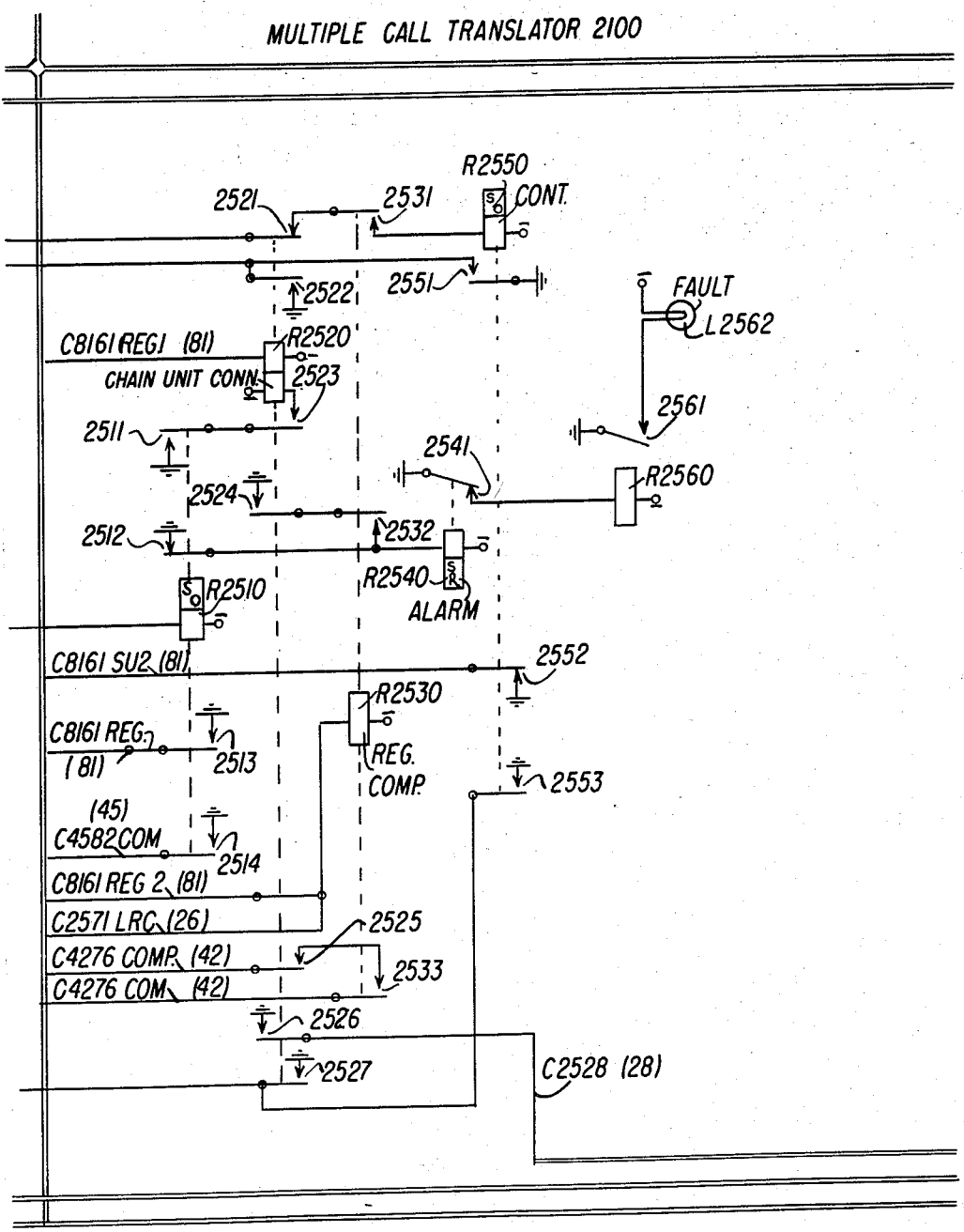

Referring to Fig. 42 it will be seen that the complete relay R4270 is in its operated position (previously described) and, at its contacts 4273, connects ground potential to the conductor C4276COM extending to Fig. 25, contacts 2533 and 2525, conductor C4276COMP extending to Fig. 42, contacts 4263, conductor C4274D extending to Fig. 44 and the winding of the PRCO relay R4480, to battery. The operation of the last mentioned relay at this time is the indication to the sequence control unit 4100 that it may release the multiple call translator 2100.

As soon as the PRCO relay R4480 operates, at its contacts 4482, it applies ground potential to the conductor C4402–RU2 extending to Fig. 84 in order to complete the operating circuit for the magnet M8430 to condition the magnet so that upon its subsequent restoration it will advance its wipers one step to register a count of the fact that one routing indicator of a multiple call message is processed by the multiple call translator 2100, the PRCO relay R4480 will operate and thus each processed routing indicator is counted and stored on the units digit register 8436U in the prosign determination unit 8400.

As a further result of the operation of the PRCO relay R4480, at its contacts 4483, it removes ground potential from the conductor C4274E extending to Fig. 42, in order to restore the test relay R4220. Also, the ground at the contacts 4483 is removed from the conductor C4401SU extending to Fig. 45 in order to restore the operated relay R4530–C1 in the channel converter unit 4500.

Finally, at its contacts 4481, the PRCO relay R4480 applies ground potential to the conductor C3602–MCR extending to Fig. 36 in order to operate the disconnect relay R3680 in the address detector 3300. At this time the relay R3680 interrupts, at its contacts 3681, the circuit for the release relay R3690. The latter relay in restoring removes the locking ground potentials from the conductors extending to the processing routing register 3700 to restore the operated relays therein. Thus, at this time, the five characters of the routing indicator UACZZ stored in the registers 3701 to 3705, inclusive, are discarded. Also, at this time the relay R3690 in restoring, at its contacts 3699, interrupts the circuit for the relay R3620 which now restores to normal and, at the contacts 3691', it interrupts the locking circuit for the address received relay R3540 which also restores to normal. Referring now to the address received relay R3540, it removes ground potential from the conductor C3492–AR4 extending to Fig. 44 in order to restore the AR relay R4470 in the sequence control unit 4100.

As soon as the relay R4470 restores, it interrupts, at its contacts 4475, a point in the locking circuit including the conductor C4274C extending to Fig. 42 in order to restore the process relay R4250. As soon as the relay R4250 restores, it interrupts, at its contacts 4259, the previously described circuit for the relays R3810 and R3730 which now restore to normal to disconnect the processing routing register 3700. At its contacts 4252, the relay R4250 completes a circuit including the off-normal contacts ON4112 and contacts 4111 for operating the magnet M4110. The magnet restores to normal under control of its contacts 4111 and advances its wipers 4113 to 4117 from contacts 10 to the illustrated home contact positions. In this position of the wipers the off-normal contacts ON4112 are opened, but they are closed when the wipers are in any other position. When the wiper 4117 disengages the contact 10 the previously described circuit for the upper winding of the relay R4260 is interrupted but the relay does not restore until the locking circuit including its lower winding is interrupted. At its contacts 4255, the relay R4250 removes ground from the conductor C4276TCR extending to Fig. 21 in order to restore the relay R2105 and thus disconnects the multiple call translator 2100 from the processing routing register 3700. Finally, at its contacts 4258, the relay R4250 interrupts the circuit for the relay R4140 which restores to normal.

In Fig. 44, the RS relay R4430 remains in its operated position over a locking circuit including its right-hand winding, the contacts 4432 and 4424 to the grounded conductor C1388SU–5 extending to Fig. 13.

Figure 43:
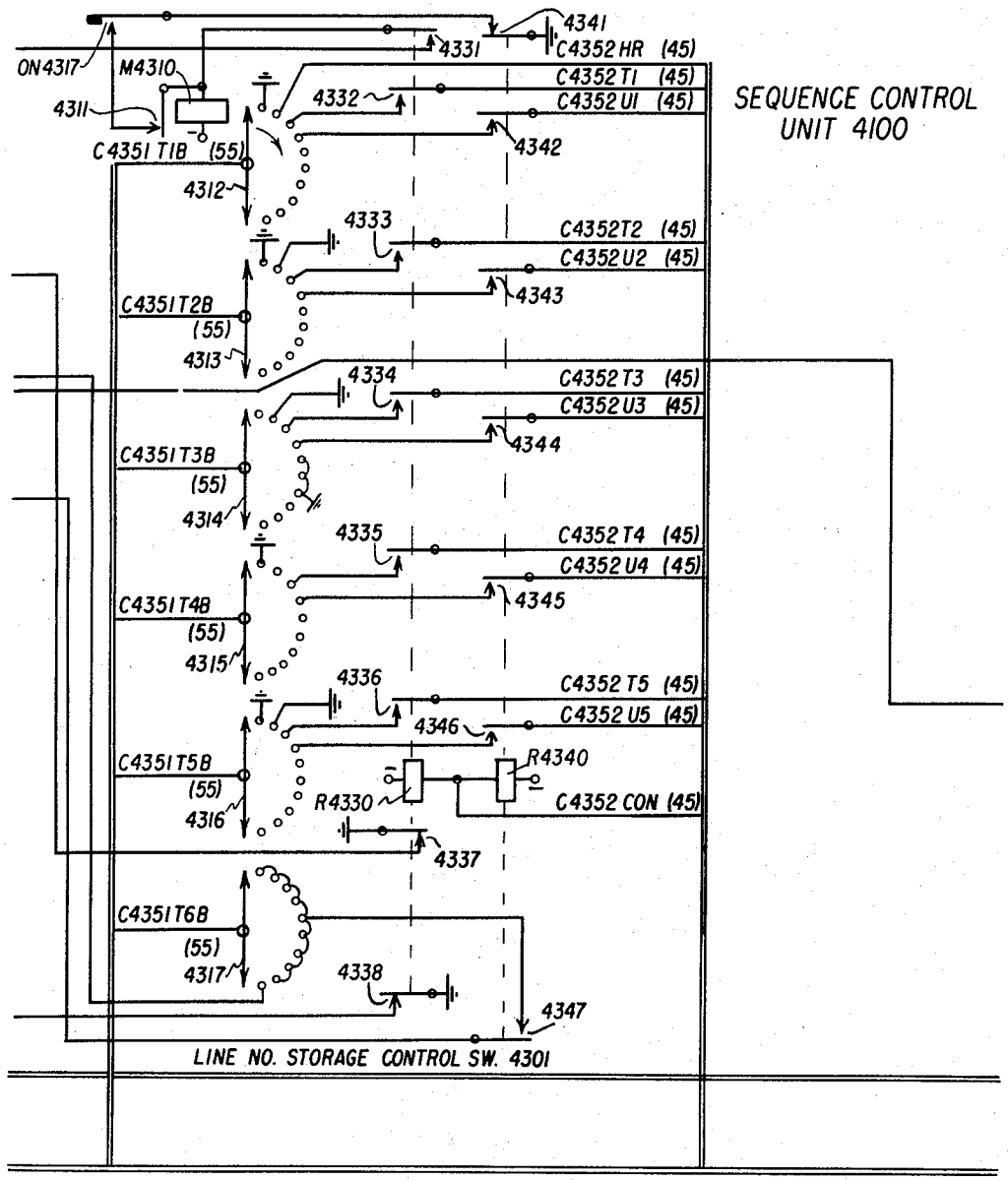

Returning again to the channel converter unit 4500 it will be seen that the relay R4530C1 upon restoring removes, at its contacts 4532, ground potential from the conductor C4352CON extending to Fig. 43 in order to restore the connect relays R4330 and R4340. Also, at its contacts 4531, the relay R4530C1 disconnects the grounded conductor C4582COM from the conductor C4581COM1 extending to Fig. 81 in order now to restore the relays R8010, R8130 and R8150. As soon as the relay R4340 restores, as noted above, it completes a circuit including contacts 4341, ON4317 and 4311 for operating the magnet M4310 which restores to normal, as soon as it opens its contacts 4311, to advance its wipers 4312 to 4317 from contacts 10 to the illustrated home contact positions. When this position is reached, the off-normal contacts ON4317 are opened, but they are closed when the wipers are in any other position. When the wiper 4317 disengages contact 10 the previously described circuit for the relay R4270 is interrupted and the relay restores to normal.

Referring now to the channel relay unit 7900 (Figs. 79 to 82) it may be well to mention at this time that when the relay R8150 initially operated it completed, at its contacts 8154, a circuit for operating the magnet M8251 of the units register 8276. The units register and tens register 8276 and 8277 are provided in each of the channel relay units, such as 7900, to register the number of routing indicators utilized in connection with each particular channel relay unit. Therefore, when the relay R8150 subsequently restores, as noted above, it opens its contacts 8154 to restore the magnet M8251 and causes it to advance its wipers 8253 to 8257, inclusive, one step in a clockwise direction to register the units digit 1 indicative of the fact that one routing indicator has been processed hrough the channel relay unit 7900. Since the channel relay unit 7900 is individually identified with a particular outgoing line, it will cause its units register 8276 to register an additional digit indicative of each routing indicator that must be transmitted over the particular outgoing line. After nine units digits have been counted by the units digit register 8276, the wiper 8254 thereof will be in engagement with the contacts 10 to prepare an obvious circuit for the magnet M8261 of the tens register 8277. Therefore, when the tenth unit digit is counted and the magnets M8251 and M8261 operate and restore. The wipers of the register 8276 will be returned to the first contact position to register the digit 0 and the wiper 8254 will interrupt the circuit for the magnet M8261 so that the tens register 8277 will advance its wipers one step in a clockwise direction to register the tens digit 1. Consequently, each time the units register 8276 counts ten units digits, the tens register 8277 will advance an additional step to register the different tens digits.

Also, in the channel relay unit 7900 it should be noted that when the translator connect relay R8010 initially operates it closes its contacts 8011 in order to connect the grounded conductor C7731SU1 from Fig. 77 to the winding of the start relay R7910. The relay R7910 operates and, at its contacts 7918, locks itself to the grounded conductor C7731SU1 over a circuit which is independent of the contacts 8011. Consequently the subsequent restoration of the relay R8010 does not interfere with the locked condition of the start relay R7910.

It should also be observed that before the seizure relay R8130 initially operates as previously described, the ground potential on the conductor C7731SU1 completes the operating circuit for the stick-up relay R8110. During the time that the seizure relay R8130 is in its operated position, the circuit for the stick-up relay R8110 is maintained by the ground potential on the conductor C8161SU2 and when the relay R8130 restores as noted above, the circuit for retaining the stick-up relay R8110 in its operated position is returned again to the grounded conductor C7731SU1. There are other operations performed in the channel relay unit 7900 as a result of the operation of the relay R7910 but these operations will be best understood in connection with the description of the operation of the channel relay unit 7900 in transmitting the routing indicators over the corresponding outgoing line.

Referring again to the AR relay R4470 (Fig. 44) in the sequence control unit 4100, it will be seen that, at its contacts 4472, it removes ground potential from the conductor C4274B extending to Fig. 42 in order to restore the translate control relay R4260 unless the latter relay has been restored by the contacts 4273 on relay R4270. The latter relay upon restoring, at its contacts 4263, interrupts the circuit including the conductor C4274D thereby to cause the restoration of the PRCO relay R4480. At its contacts 4473, the relay R4470 reconnects the conductors C1788C1 and C1788C2 extending to Fig. 17 in order to complete the circuit for the clutch magnet in the tape reader 1420 (Fig. 14) associated with the multiple call storage unit 1400 which is handling the present multiple call message. The next routing indicator appearing on the perforated tape 1413 may now be sensed by the tape reader 1420 and transmitted to the address detector 3300 in the manner previously described.

*Sensing the second routing indicator appearing on the message stored in the multiple call storage unit 1400*

Figure 14:
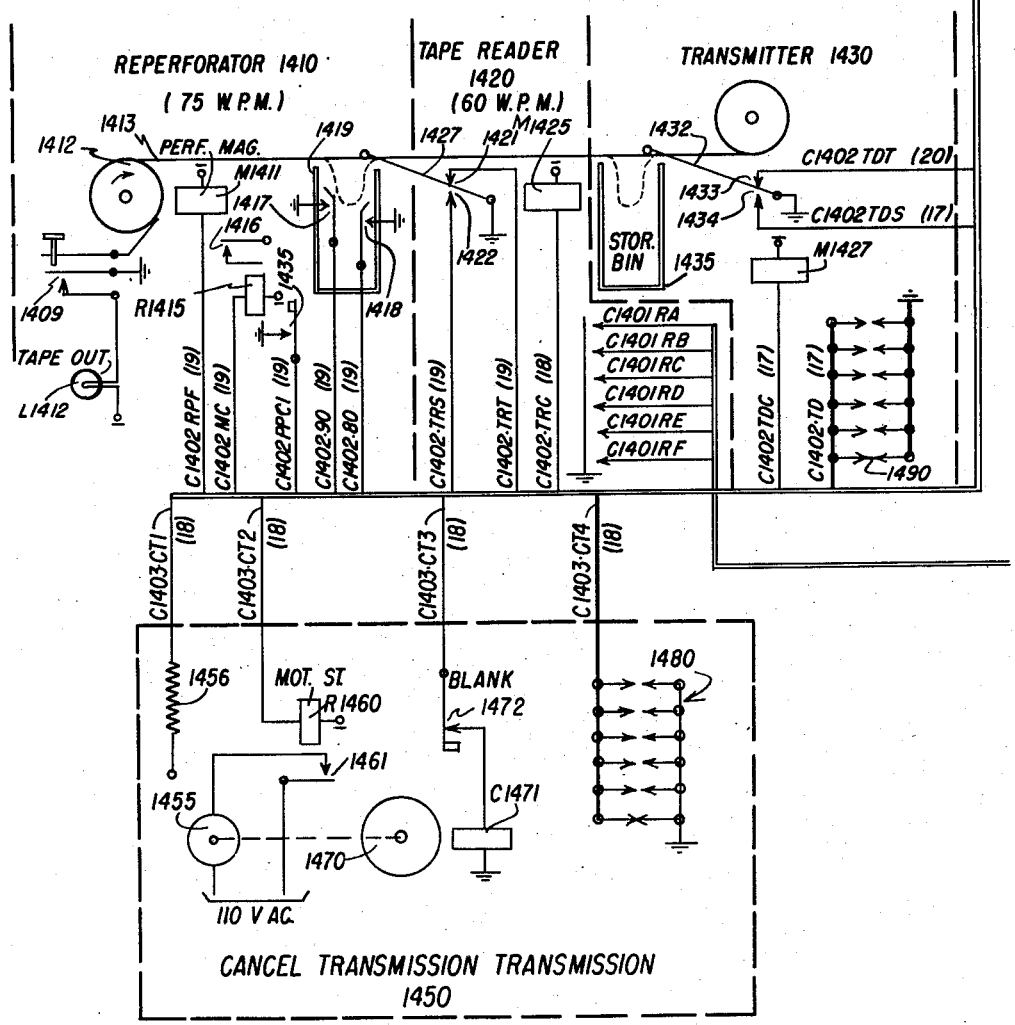

The circuit for reoperating the tape reader 1420 so that the second routing indicator appearing on the message on the tape 1413 may be traced from battery by way of the clutch magnet M1425, conductor C1402TRC extending to Fig. 18, contacts 1892, 1864, 1882, 1782 and 1724, conductor C1788C1 extending to Fig. 44, contacts 4411, 4462 and 4473 (relay R4470 in its restored position as previously noted) contacts 4416, conductor C1788C2 extending to Fig. 17, contacts 1725 and 1914, conductor C1402TRS extending to Fig. 14 and the contacts 1422, to ground, on the tape switch 1427. Thus, the clutch magnet M1425 is reoperated to sense the second routing indicator on the tape 1413. It may be well to mention at this time that during the processing of the first routing indicator UACZZ, the tape reader 1420 was blocked against operation, by contacts 4473 on relay R4470, until the processing of that routing indicator was completed.

It will be recalled that the item of information that appears on the multiple call message being described is Item 6 and includes the following information:

NMNM UACZZ JWCX JKXY UKAY
FIGS 444

At the present time the tape 1413 in the multiple call storage unit 1400 containing the above noted items has been fed past the sensing pins of the tape reader 1420 to a point where the letter J on the second routing indicator JWCX will be sensed by the address detector 3300 and registered in the processing routing register 3700.

Since this operation is substantially the same as previously described, only a general description will be given. Accordingly, the tape reader 1420 now senses, in succession, the characters JWCX followed by the "space" function and transmits code signals corresponding to these characters to the sensing unit 1501. The relays in the sensing unit 1501 repeat the code signals by way of the contacts 1519, 1529, etc., over the conductor C1716LA to LE, inclusive, to the relays in the address sensing unit 3401. These code signals are also transmitted to the relays of the precedence sensing unit 6700 and to the relays of the prosign sensing unit 2900. However, the relays in the precedence sensing unit 6700 and in the prosign sensing unit 2900, although responding to the signals corresponding to the characters of the second routing indicator, do not register the same, inasmuch as the characters do not correspond to any acceptable precedence indicator nor do they correspond to any acceptable prosign indicator which may be received by the last-mentioned sensing units. However, in the address detector 3300, the four characters JWCX are sensed in the proper sequence and are registered respectively in the first, second, third and fourth registers 3701 to 3704, inclusive, in the processing routing register 3700. This operation is substantially identical to the description previously given in connection with the sensing and registration of the routing indicator UACZZ.

After the four characters JWCX have been registered in the processing routing register 3700, the address sensing relay unit 3401 responds to the "space" character function and thereby causes the relay R3420AC therein to operate and complete the previously described circuit for operating the address received relay R3540. This relay, upon operating, locks itself in its operated position to ground at contacts 3691' and, at its contacts 3541, it completes a circuit including the conductor C3492AR4 extending to Fig. 44 in order to reoperate the AR relay R4470. The latter relay, at its contacts 4474, immediately interrupts the previously described circuit including the conductors C1788C1 and C1788C2 in order to terminate further sensing of the associated tape by the tape reader 1420.

The multiple call equipment is now ready to analyze the second routing indicator JWCX and to cause the first three characters JWC to be registered in a channel relay unit, such as 7900, if a relay switching center corresponding to the characters JWC can be reached directly from the present relay switching center UAC. If such a relay switching center is not directly available over an outgoing line, the multiple call equipment will then function in analyzing the routing indicator JWCX to register in an appropriate channel relay unit the three characters of a relay switching center that can be reached from the relay switching center UAC and which can be held responsible for retransmitting the message toward the desired destination.

When the AR relay R4470 operated its contacts 4473 to terminate further sensing of the tape by the tape reader 1420, it applies the ground potential, at its contacts 4475, by way of the contacts 4435 (relay R4430 locked in its operated position) conductor C2982–PR2 extending to Fig. 29, contacts 3147, conductor C2982–PRO extending to Fig. 42 in order to reoperate the process relay R4250 a second time, so that the four characters JWCX of the second routing indicator may be processed by the multiple call equipment. The relay R4250 locks itself in its operated position over a circuit including its upper winding and the conductor C4274C extending to Fig. 44 and ground at contacts 4475.

As soon as the process relay R4250 operates it completes, at its contacts 4259, a circuit including the conductor C4295TR1 extending to Fig. 38, in order to operate the transfer 1 relay R3810, and conductor C3601TR1 extending to Fig. 36, contacts 3653 and conductor C3601TR2 extending to Fig. 37, in order to operate the transfer relay R3730. The operation of the last mentioned relays connect the marking conductors of the registers 3701 to 3705, inclusive, to various conductors extending to the sequence control unit 4100 and to various conductors extending to the multiple call translator 2100. Also, at its contacts 3812, the transfer 1 relay R3810 completes the previously traced circuit for operating the four character relay R4130 in the sequence control unit 4100 in multiple with the four character relays XR3060 and XR3110 in the routing translator X2900 (Figs. 3 to 5, inclusive).

As a further result of the operation of the process relay R4250 it completes, at its contacts 4258, the circuit for operating the transfer relay R4140 so that the marking conductors from the registers 3701 to 3704, inclusive, are connected through its various contacts to the bank contacts on the routing indicator storage control switch 4101, in the manner previously described.

Also, the process relay R4250, at its contacts 4255, applies ground potential to the conductor C4276TCR extending to Fig. 21 in order to operate the connect relay R2105 to connect the first, second and third character decoding relays 2101 to 2103 in the multiple call translator 2100 to the marking conductors of the first, second and third registers 3701 to 3703 in the processing routing register 3700.

At the contacts 4253 and 4254, the process relay R4250 completes circuits, previously described, whereby the routing translator X2900 is associated with the sequence control unit 4100 in the multiple call equipment so that the routing indicator JWCX stored in the routing register 3700 is transferred to store in the first, second, third and fourth character decoding relays X2901 to X2904, inclusive, in the routing translator X2900. Thus, the contacts 4253 on the process relay R4250 apply ground potential to the start conductor C4291ST extending to Fig. 6 so that the director hunting switch XS3140 will rotate its wipers to select the particular calling multiple call equipment. When the selection is made, the test relay R4220 operates to interrupt the start circuit and to complete, at its contacts 4225, the circuit for operating the transfer relay R4210. The characters JWCX stored in the processing routing register 3700 are now transferred to the routing translator X2900 through the contacts on the relay R4210. At the contacts 4226, the test relay R4220 completes a circuit including the conductor C4278SW2 extending to Fig. 45 in order to operate the connect relay R4510. The last mentioned relay, as previously described, connects the various relays in the channel converter unit 4500 to the various outgoing line marking conductors on the patch panel X3200 associated with the routing translator X2900.

Referring now to the routing translator X2900 (Figs. 3 to 5, inclusive,) and the patch panel X3200 (Fig. 6) it will be understood from the previous description of these units that the characters JWCX are registered respectively in the first, second, third and fourth character decoding relays X2901 to X2904, inclusive, and that inasmuch as the routing indicator comprises four characters instead of five characters, the four character relays XR3060 and XR3110 are operated. The various pyramid sets of contacts included in the four sets of decoding relays noted above, complete circuits for operating respectively, relays in the first, second, third and fourth character translating relays X2981 to X2984, inclusive, which correspond individually to the character registered in the associated decoding relays. Thus, the relay XR2950J will be operated in accordance with the first character J; the relay XR3005W will be operated in accordance with the second character W; the relay XR3020C (not shown) will be operated in accordance with the third character C; and finally, the relay XR3040X (not shown) will be operated in accordance with the fourth character X. The operation of the fourth character relay XR3040X in the fourth character translate relay X2984 is of no importance in the present operation of the routing translator X2900 since only the first three characters of the registered routing indicator are necessary in determining the outgoing line over which the message must be transmitted to reach the relay switching center JWC that is directly connected to the tributary station identified by the characters JWCX.

In accordance with the contacts controlled by the operated relays in the first, second and third character translate relays X2981 to X2983, inclusive, a particular one of the conductors in the cable XC2983A extending to the three character jack panel X3270 will be grounded. The jack in this jack panel terminating the grounded conductor will be interconnected by means of one of the patch cords, such as X3233, to one of the jacks in the line jack panel X3220 which corresponds to the particular outgoing line over which a message must be transmitted to reach the relay switching center JWC.

For the purpose of this description it will again be assumed that the jack on the panel X3270 corresponding to the three characters JWC is interconnected, by means of one of the patch cords, to one of the L1 jacks on the jack panel X3220. Consequently, ground potential is extended over the L1 conductor (Fig. 6) in order to operate the relay R4530C1 in the channel converter unit 4500 in the manner previously described. Although it has been assumed that the same relay R4530C1 has been operated in the channel converter unit 4500 it should be understood that at any one of the 25 relays in the channel converter unit 4500 may be operated at this time depending upon the manner in which the patch cords are utilized in interconnecting the three character jack corresponding to the routing indicator JWC to one of the line jacks on the line jack panel X3220.

As soon as the relay R4530C1 operates, it locks itself to the grounded conductor C4401SU; it marks the hundreds, tens and units marking conductors C4352HR, C4352T1 to T5 and C4352U1 to U5 extending to Fig. 43 in accordance with the hundreds digit 1 and the particular tens and units digit to provide a three digit number identifying the particular outgoing line over which the multiple call message must be transmitted to ultimately reach the tributary station JWCX. Also, the relay R4530C1, at its contacts 4531, completes the previously traced circuit for operating the relays R8010, R8130 and R8150 in the channel relay unit 7900. It is assumed in the present instance that the channel relay unit 7900 is the particular unit that corresponds to the outgoing line over which the message must be transmitted. In this connection it would be understood that each relay, such as R4530C1 to R4530C25, corresponds to an individual channel relay unit, such as 7900, and that the intercept relay R4220 corresponds to the intercept channel relay unit 7740.

The various hundreds, tens and units conductors of the channel converter unit 4500 extend to Fig. 43 where they terminate in the bank contacts accessible to the wipers of the line number storage control switch 4301. In this connection it is noted that the relay R4530C1, at its contacts 4532, grounds the conductor C4352CON extending to Fig. 43 in order to operate the connect relays R4330 and R4340 and these relays, through their various contacts, connect the marking conductors to the bank contacts of the control switch 4301. Also, at the contacts 4337, the relay R4330 now removes ground potential from the conductor C4391SU extending to Fig. 6 in order to release the director hunting switch XS3140 for further operation. At its contacts 4338, the relay R4330 now releases the transfer relay R4210, in order to disconnect the routing translator X2900 from the processing routing register 3700, and it also releases the connect relay R4510 in the channel converter unit 4500, in order to disconnect the various relays therein from the routing translator X2900. Thus, the routing translator X2900 is rendered available for use in another translation.

Referring again to the line number storage control switch 4301 (Fig. 43) it will be recalled that this switch by way of its magnet M4310 advances its wipers 4312 to 4317 step-by-step over the contacts 1 to 9, inclusive, in the associated banks whereby the "figures shift" character function, followed by the hundreds, the tens and the units digits, marked on these conductors by the relay R4530C1 in the channel converter unit 4500, and then followed by three "space" and two "blank" character functions, are transferred by way of the transmitter distributor 5520 so that they are perforated on the tape 5534 by the typing reperforator 5545 in the manner previously described. At this time the typing reperforator 5545 has been controlled twice to perforate on the associated tape 5534, the three digit number indicative of the outgoing line over which the message of the first routing indicator UACZZ must be transmitted and the three digit number indicative of the outgoing line over which the message of the second routing indicator JWCX must be transmitted. When the wiper 4317 engages contact 10 the circuit is completed for operating the relay R4270.

While the foregoing operations are being performed by the translator X2900, the channel converter unit 4500, the line number storage control switch 4301 and the outgoing line number tape storage unit 5501, the routing indicator control switch 4101 (Fig. 41) is also operating to transfer the routing indicators JWCX from the processing routing register 3700 to the typing reperforator 5585 in the routing indicator tape storage unit 5502. In other words, the process relay R4250, at its contacts 4251, completes the circuit for the magnet M4110 so that it is operated to advance its wipers 4113 to 4117 step-by-step over the associated contacts 1 to 9, inclusive. As the wipers are advanced over the various contacts a "letters shift" character function followed by the routing indicator JWCX, two "space" and then two "blank" character functions are sent to the transmitter distributor 5560 and perforated on the tape 5574 by the typing reperforator 5585. At this time the typing reperforator 5585 has perforated the tape 5574 in accordance with the first routing indicator UACZZ and in accordance with the second routing indicator JWCX. When the wiper 4117 engages contact 10 the previously described circuit is completed for operating the translation complete relay R4260.

At the same time that the line number storage control switch 4301 and the routing indicator storage control switch 4101 are operating to control the outgoing line tape storage unit 5501 and the routing indicator tape storage unit 5502 in the manner noted above, the multiple call translator 2100 is also operating to process the registered routing indicator JWCX. These operations are all controlled incident to the operation of the process relay R4250. Thus, when the contacts 4255 are closed to cause the connect relay R2105 to associate the multiple call translator 2100 with the process routing register 3700, the first three characters JWC of the four character routing indicator JWCX registered therein are transferred to and registered in the first, second and third character decoding relays 2101 to 2103, inclusive. Through the pyramid sets of contacts on the respective decoding relays, circuits will be completed for operating corresponding relays in the first, second and third character translate relays 2181 to 2183, inclusive. Thus, the relays R2150J, R2205W in the first and second character translate relays 2181 and 2182 are operated and the relay R2220C (not shown) in the third character translate relays 2183 is operated. In their operated positions, these relays through series connected contacts will extend ground, at the contacts 2161, by way of the conductor 393 in the cable C2285 to the jack J393 on the jack panel 2601A. This conductor is individual to and corresponds to the routing indicator JWC registered in the multiple call translator 2100. The 624 conductors in the cable C2285 terminate in individual jacks on the jack panel 2601A (Fig. 26). The jack J393, which corresponds to the routing indicator JWC, is interconnected by means of a patching cord to a circuit including the winding of the JWC relay R2625 in the Group A relays of Fig. 26.

There are as many Group A relays provided as there are relay switching centers in the telegraph switching system. Inasmuch as ground potential is applied to the jack J393 on the jack panel 2601A in accordance with the registered routing indicator JWC the corresponding relay R2625 is operated. At its contacts 2625A, the relay R2625 completes an obvious circuit for operating the JWC relay R2655 in Group B, the latter relay, at its corresponding contacts, completes an obvious circuit for operating the JWC relay R2670 in Group C, and the latter relay, at its corresponding contacts, completes an obvious circuit for operating the JWC relay R2680 in Group D. Each of the four JWC relays noted above have been provided with five sets of make contacts which are similarly connected and arranged. To provide facilities for readily interconnecting the contacts, such as 2625A, of each of the relays in Group A with the windings of certain of the relays in Group B, terminal blocks may be provided which are arranged with a jumper field whereby jumpers may be utilized for controlling the respective relays.

As a further result of the operation of the JWC relay R2625 in Group A, at its contacts 2625B it applies ground potential through a resistor to the conductor C2691AC extending to Fig. 28 and the winding of the chain relay R2810–1, to battery. The resistor included in this circuit is sufficient to prevent the operation of relay R2810–1. However, it may be well to mention at this time that if two relays, such as R2625, are simultaneously operated in Group A, then two resistors will be connected in multiple to the conductor C2691AC thereby reducing the total resistance in the circuit for the chain relay R2810–1 sufficiently to permit the relay to operate. In the present example, however, only one relay has been operated in Group A. Corresponding circuits are completed by the JWC relays in Groups B, C and D for the respective chain relays R2810–2 to R2810–4, inclusive. But in each case, only one of the relays has been operated in the Groups B, C and D and, consequently, all of the chain relays R2810–1 to R2810–4, inclusive, remain in their restored positions. Furthermore, the JWC relay R2625 in Group A is provided with the contacts 2625C, D and E which are connected respectively to jacks on the jack panel 2701A. Patching cords, such as the patching cords 2750A, B and C, are utilized to jumper the last-mentioned jacks to the first, second and third character jack panels 2761A, 2762A and 2763A in such a manner that the jack J, the jack W and the jack C in the respective jack panels are grounded.

The corresponding contacts on the JWC relays R2655, R2670 and R2680 in Groups B, C and D terminate in corresponding jacks on the jack panels 2701B, C and D and are interconnected, by means of corresponding patching cords, to corresponding J, W and C jacks on the panels 2761B to D, 2762B to D and 2763B to D. For a better understanding of the manner in which the contacts on the JWC relays in each of the groups is connected to the associated first, second and third character panels 2761A to C, 2762A to C and 2763A to C reference may be had to the corresponding contacts, jack panels, etc., as shown in connection with the JWC relay R2680 in Group D.

As soon as the JWC relay R2680 in Group D operates in the chain circuit including the JWC relays of Groups A, B and C, it completed, at its contacts 2684' a circuit including the conductor C2691X extending to Fig. 28 in order to operate the relay R2820. The latter relay, at its contacts 2822, prepares a point in the circuit for subsequently controlling either the Group A, B, C or D switching relays R2710, R2720, R2730 or R2740 depending upon the operated or unoperated conditions of the chain relays R2810-1 to R2810-4, inclusive. This circuit, however, is under the control of the slow-to-operate relay R2830.

At the present time the characters JWC identified by the corresponding relays in Groups A, B, C and D (Fig. 26) have been marked on the first, second and third character jack panels 2761A to D, 2762A to D and 2763A to D. These three characters must now be transferred to and registered in the particular channel relay unit, such as 7900, which is identified by the operated relay R4530C1 in the channel converter unit 4500 (Fig. 45). It will be recalled that the relay R4530C1 was operated and locked to the conductor C4401SU in accordance with the operation of the routing translator X2900. The transfer of the characters JWC registered by the operated JWC relays R2625, R2655, R2670 and R2680 in the multiple call translator 2100, to the particular channel relay unit, such as 7900, will now be explained.

Figure 24:
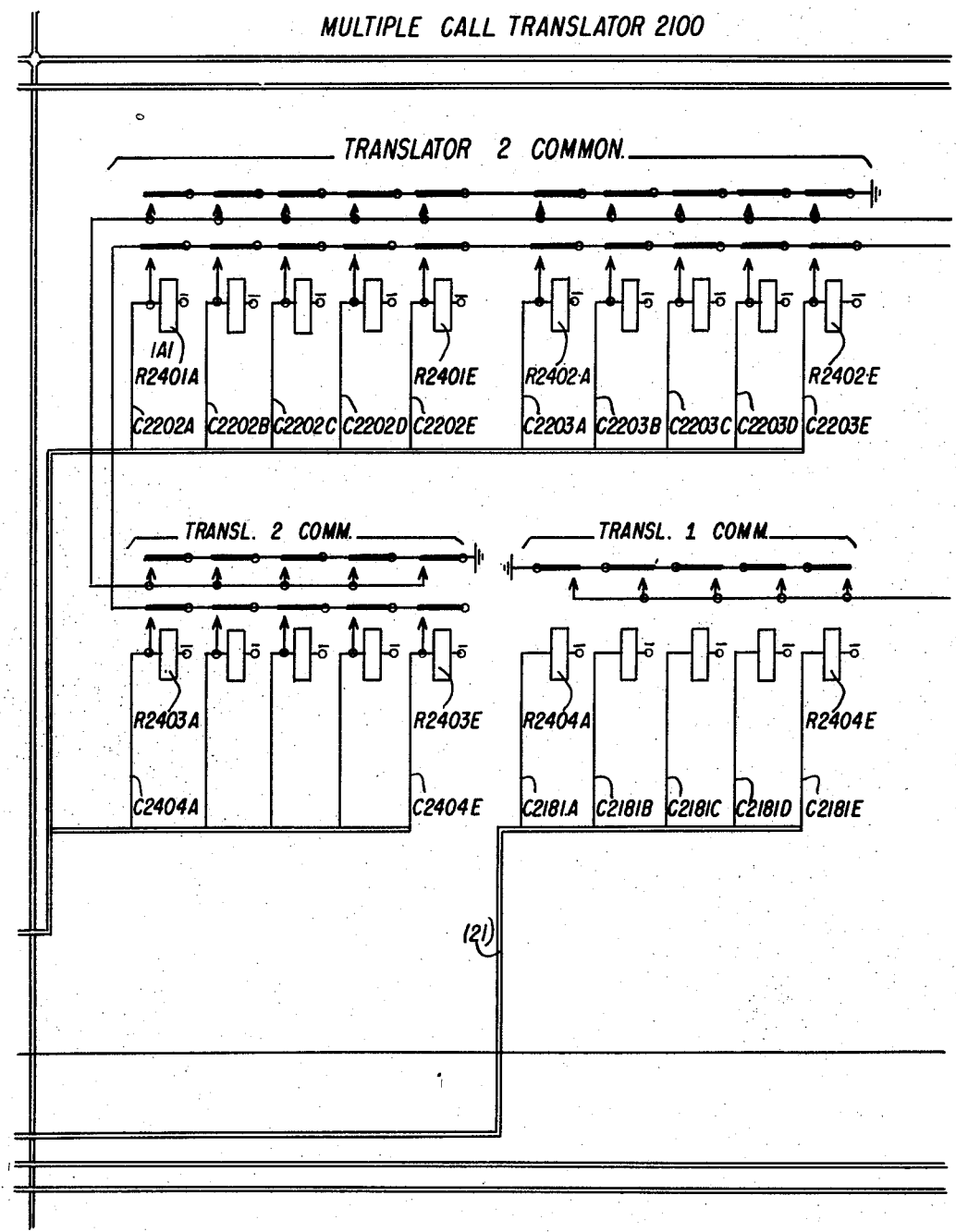

At the time the first character J of the routing indicator JWCX was transferred from the routing register 3700 to the first character decoding relays 2101, it was also transferred by way of the conductors C2181A to E, inclusive, to the relays R2404A to E in the translator 1 common relays of Fig. 24. As long as one of the relays R2404A to E is operated, an obvious circuit will be completed for operating the relay R2510 (Fig. 25). As soon as the relay R2510 operates, at its contacts 2514, it applies ground potential to the conductor C4582COM extending to Fig. 45. Since the relay R4530C1 in the channel converter unit 4500 is in its operated position, the ground potential is further extended by way of the contacts 4531, conductor C4581COM1 extending to Fig. 81 in order to operate, in multiple, the relays R8010, R8130 and R8150 in the channel relay unit 7900. It should be understood, however, that the channel relay unit 7900 (Figs. 79 to 82) is one of a plurality of such units and the particular illustrated unit 7900 is assumed to be the one that has been selected by the channel converter unit 4500 and that it is identified with a particular outgoing line.

As a further result of the operation of relay R2510, at its contacts 2513, it now extends ground potential by way of the conductor C8161REG (multiply connected to all of the channel relay units, such as 7900) extending to Fig. 81, contacts 8136 of the operated relay R8130 (which relay is operated in only the channel relay unit 7900 and is in its restored position in all of the other channel relay units) contacts 8122, conductor C8161REG1 extending to Fig. 25, and the winding of the channel unit control relay R2520, to battery. The last-mentioned relay now operates and locks itself, over a circuit including its lower winding, to ground at contacts 2511.

As soon as the relay R2520 operates, as noted above, it completes, at its contacts 2526, a circuit, including the conductor C2528 extending to Fig. 28, for operating the slow-to-operate relay R2830. Also, at its contacts 2527, the relay R2520 completes an obvious circuit for operating the transfer relay R2330.

At the present time the channel relay unit 7900 is the only one of such units that is connected to the multiple call translator 2100. This is accomplished at the present time by the operation of the translator connect relay R8010 (Fig. 80) in the channel relay unit 7900. This relay, at its various contacts, connects the five first character register relays R8020-1A to 1E, the five second character register relays R8030-2A to 2E and the five third character register relays R8040-3A to 3E to the corresponding conductors C8051-1A to 1E, 2A to 2E and 3A to 3E extending to Figs. 22 and 23 and then by way of the various make contacts (closed by operation of the transfer relay R2330) conductor C2871-A to E, C2872A to E and C2873A to E extending to Fig. 28, where the fifteen conductors terminate in terminals on the terminal block TB2862B. Although the fifteen conductors C8051-1A to 3E, inclusive, are multiply connected to all of the channel relay units, such as the unit 7900, the channel relay unit 7900 is the only one connected to these conductors incident to the operation of its relay R8010.

Referring now to the relay R2830 (Fig. 28) in the multiple call translator 2100, which was operated under control of the contacts 2526 on the channel unit connect relay R2530 it will be seen that it completes a circuit including the contacts 2831, 2822, 2841 and 2812 (the relay R2810-1 being in its restored position) in order to operate the Group A switching relay R2710. This relay is provided with 37 contacts, only three of which have been shown. Three contacts represented by the contacts 2713 correspond to the three first characters UBJ, eight contacts represented by the contacts 2712 correspond to the eight second characters A, E, F, H, K, L, M and W; and twenty-six additional contacts represented by the contacts 2711 correspond to the twenty-six third characters A to Z. Each of these contacts is connected respectively to an individual Group A encoding relay, such as the first, second and third character encoding relays R2850-1, R2850-4 and R2850-37.

At the present time the characters JWC are marked respectively in the jack panels 2761A, 2762A and 2763A under control of the operated JWC relay R2625. Consequently, the marking ground potentials of the three characters noted are further extended by way of corresponding contacts on the operated Group A switching relay R2710 to operate the respective first character J encoding relay, such as 2850-1, the second character W encoding relay, such as the relay R2850-4, and the third character C encoding relay, such as the relay R2850-37. The three operated relays through five sets of make contacts, provided on each of these relays, apply ground potential to three sets of terminals on the terminal block TB2861A. The three sets of terminals of the three operated Group A encoding relays are cross-connected or strapped in a predetermined manner to the terminals on the terminal block TB2862B so that the first character J is marked in code form on the first group of marking conductors C2871A to E, inclusive, the second character W is marked in code form on the second group of marking conductors C2872A to E, inclusive, and the third character C is marked in code form on the third group of marking conductors C2873A to E, inclusive. Consequently, the characters JWC marked in code form on the last-mentioned three groups of conductors complete operating circuits for the respective first, second and third character register relays in the register 8001 (Fig. 80) in the channel register unit 7900. Thus, the relays in the register 8001 are operated in the code form and are immediately locked by way of their associated make contacts to ground at the contacts 8111. At this time it should be noted that the stick-up relay R8110 provided in each of the channel register units, such as the unit 7900, is initially operated over circuits including the grounded conductor C7731SU–1. In the illustrated channel relay unit 7900 being used at the present time, the stick-up relay R8110 is held in its operated position over a circuit including the contacts 8134 and the grounded conductor C8161SU–2 and the ground potential at contacts 8111 is effective to lock the operated relays in the register 8001 to register therein, in code form, the three characters JWC of the routing indicator JWCX.

Also, at the time the translator connect relay R8010 operated, it closed its contacts 8011 to complete the circuit for operating the start relay R7910 which upon operating locks itself by way of its contacts 7918 to the ground potential on the conductor C7731SU–1. In other words, the channel relay unit 7900 is now locked in an operated condition to indicate that a routing indicator identifying a particular relay switching center has been registered therein. Further operations controlled by the start relay R7910, whereby the cross-office selector switch 8300, which is individually associated with the channel relay unit 7900, and is operated to select one of the cross-office units will be described hereinafter.

When the seizure relay R8130 operated in multiple with the relays R8010 and R8150, as previously described, at its contacts 8134, it transferred the circuit for the stick-up relay R8110 from the grounded conductor C7731SU–1 to the grounded conductor C8161SU–2. Consequently, the relay R8110 remains in its operated position. As a further result of the operation of the relay R8130, it closes its contacts 8131, 8132 and 8133 in order to connect the windings of the magnets of the U, B and J registers 8272, 8273 and 8274 to circuits including the conductors C8162U, B and J extending to Fig. 21. In Fig. 21 it will be recalled that the relay R2150J in the first character translate relays 2181 was operated. Consequently, at its contacts 2162, it applies ground potential by way of the conductor C8162J extending to Fig. 81, wiper 8213, contacts 8133 and the winding of the magnet M8211, to battery in order to operate the same. Of course, if either the relay R2150B or R2150U in the first character translate relays 2181 is operated, the corresponding register 8273 or 8272 in the channel relay unit 7900 is also operated. When the above circuit is subsequently opened by the restoration of the seizure relay R8130 or by the restoration of the relay R8150J in the translator 2100, the circuit for the magnet M8211 of the J register 8274 will be interrupted and the magnet will restore and thus advance its wipers 8213 and 8214 one step in a clockwise direction to register the fact that one routing indicator having a first character J has been processed to the channel relay unit 7900.

Also, when the relay R8150 operated in multiple with the relays R8130 and R8010 it completed, at its contacts 8154, a circuit for operating the magnet M8251 of the units register 8276 for the purpose of indicating the units digit of the number of routing indicators to be sent over a particular outgoing line. Upon the subsequent interruptions of the above mentioned circuit, for example, by the restoration of relay R8150, the magnet M8251 will restore and advance its wipers one step in a clockwise direction into engagement with the contacts 1 to register the units digit 1 identifying the fact that one routing indicator has been processed to the channel relay unit 7900.

Although other operations are being performed under control of the channel relay unit 7900, for example, in response to the operation of the start relay R7910, which operations will be described hereinafter, the fact that at least one routing indicator has been registered in the register 8001 of the channel relay unit 7900 is indicated by the operated condition of the relay R8120. This relay will remain operated as long as any one of the register relays in the register 8001 has been operated and it will indicate that the registration has been completed. As soon as the relay R8120 operates, it interrupts, at its contacts 8122, the previously described initial operating circuit for the relay R2520 (Fig. 25) in the multiple call translator 2100. This relay, however, is retained in its operated position over a separate locking circuit including its lower winding. Furthermore, at its contacts 8121, the relay R8120 now connects the grounded conductor C8161REG to the conductor C8161REG2 extending to Fig. 25 in order to operate the registration complete relay R2530.

As soon as the relay R2530 operates, as noted above, it completes, at its contacts 2533, a circuit whereby the conductors C4276COM and C4276COMP extending to Fig. 42 are interconnected. When these conductors are interconnected, a circuit is completed from ground at contacts 4273 (the relays R4270 having been operated in the meantime) and then by way of the conductor C4276COM extending to Fig. 25, contacts 2533 and 2525, conductor C4276COMP extending to Fig. 42, contacts 4263, and conductor C4274D extending to Fig. 44, in order to operate the PRCO relay R4480 in the sequence control unit 4100. The operation of the last-mentioned relay is in fact a signal from the channel relay unit 7900 that the multiple call translator 2100 may be released.

As soon as the PRCO relay R4480 operates it completes, at its contacts 4481, a circuit including the conductor C3602MCR extending to Fig. 36 in order to operate the disconnect relay R3680 whereby the address detector 3300, the processing routing register 3700, and the operated relays in the first, second and third character decoding relays 2101 to 2103, inclusive, in the multiple call translator 2100 are all restored to normal. Also, over a circuit including the contacts 4482 and the conductor C4402RU2 extending to Fig. 84, the magnet M8430 of the units digit register 8436U is operated whereby a count will be registered of the number of routing indicators that have been processed by the sequence control unit 4100.

Finally, at its contacts 4483, the relay R4480 removes ground potential from the conductor C4274E extending to Fig. 42 in order to restore the test relay R4220. Also, the ground, at the contacts 4483, is removed from the conductor C4401SU extending to Fig. 45 in order to restore the operated relay R4530C1 in the channel converter unit 4500.

When the relay R3680 in the address detector 3300 operates, as noted above, it causes the restoration of the release relay R3690 so that locking ground potentials are removed from various operated relays in the processing routing register 3700. Thus, the processing routing register 3700 is restored to normal and discards the four character routing indicator JWCX stored therein. Simultaneously therewith, this routing indicator is discarded from the multiple call translator 2100. As a further result of the restoration of the release relay R3690 in the address detector 3300 at its contacts 3691' it interrupts the circuit for the address received relay R3540 which also restores and, at its contacts 3541, removes ground potential from the conductor C3492AR4 extending to Fig. 44 thereby to restore the AR relay R4470 in the sequence control unit 4100.

As soon as the relay R4470 restores it interrupts, at its contacts 4475, a point in the circuit including the conductor C4274C extending to Fig. 42 thereby to restore the process relay R4250 in the sequence control unit 4100. As a further result of the restoration of the relay R4470, at its contacts 4472, it removes ground potential from the conductor C4472B extending to Fig. 42 in order to restore the translate control relay R4260. The latter relay in turn, at its contacts 4263, interrupts the circuit including conductor C4274D thereby to restore the PRCO relay R4480. Finally, at its contacts 4473, the relay R4470 reconnects the conductor C1788C1 and C1788C2 extending to Fig. 17 in order again to complete the circuit for the clutch magnet of the tape reader 1420 (Fig. 14) associated with the multiple call storage unit 1400 which is handling the present multiple call message. The next routing indicator appearing on the perforated tape 1413 will now be sensed by the tape reader 1420 and transmitted to the address detector 3300 in the manner previously described.

Before proceeding with the description of the sensing of the next routing indicator, attention is directed to the channel converter unit 4500 (Fig. 45) wherein the relay R4530C1 also restored to normal under control of the operation of the PRCO relay R4480. As soon as the relay R4530C1 restores, it removes ground potential, at its contacts 4532, from the conductor C4352CON extending to Fig. 43 thereby to restore the connect relays R4330 and R4340 in the sequence control unit 4100. At its contacts 4341, the relay R4340 completes a circuit including off-normal contacts ON4317, contacts 4311 for operating the magnet M4310 which then restores to advance its wipers from the contacts 10 into the illustrated home contact position the off-normal contacts ON4317 are now opened to prevent reoperation of the magnet. As soon as the wiper 4317 steps from contact 10 relay R4270 restores.

Also, the relay R4530C1, at its contacts 4531, disconnects the grounded conductor C4582COM from the conductor C4581COM1 extending to Fig. 81 in order to restore the relays R8010, R8130 and R8150 in the channel relay unit 7900 which has been used in processing the routing indicator JWCX. However, as previously noted, the start relay R7910 in the channel relay unit 7900 is locked in its operated position to indicate that this channel relay unit has been used to register certain routing indicators in its register 8001. Also, the stick-up relay R8110 and the registration complete relay R8120 are retained in their operated positions even though the channel relay unit 7900, for all practical purposes, is temporarily disconnected from the multiple call processing equipment and will only be called into use when another routing indicator is processed that must also be transmitted over the particular outgoing line identified by the particular channel relay unit 7900. In passing, it should also be noted that each operation and restoration of the relay R8150 in response to each seizure and disconnection of the channel relay unit 7900, at its contacts 8154, will operate and restore the magnet M8251 in the unit register 8276 to register therein the number of times the particular channel relay unit 7900 has been selected in processing a routing indicator. In the present case, it has been assumed that the channel relay unit 7900 has been used a first time in connection with the processing of the routing indicator JWCX and, consequently, the units register 8276 will advance its wipers one step to register the units digit 1.

*Sensing the third routing indicator appearing on the message stored in the multiple call storage unit 1400*

As previously described, when the AR relay R4470 restores to normal at the end of the processing of a particular routing indicator it closes its contacts 4473 to interconnect the conductors C1788C1 and C1788C2, whereby, the clutch magnet M1425 of the tape reader 1420 is reoperated to sense the third routing indicator appearing upon the associated tape.

It will be recalled that the item of information that appears on the multiple call message being described is Item 6 and includes the following information:

NMNM UACZZ JWCX JKXY UKAY FIGS 444

At the present time the tape 1413 in the multiple call storage unit 1400 containing the above noted information has been fed past the sensing pins to a point where the letter J of the third routing indicator JKXY will be sensed and registered by the address detector 3300. Before proceeding with this operation, reference should be made to Fig. 1, which illustrates the various routes over which messages may be routed from the relay switching center UAC (which is assumed to be the switching center handling the present multiple call message) to other relay switching centers and tributary stations. At the outset, it is noted, that the tributary station UACZZ is directly connected to the relay switching center UAC. Thus, the multiple call message will be transmitted directly from the relay switching center UAC to the tributary station UACZZ. The second routing indicator JWCX identifies a tributary station which is directly connected to the relay switching center JWC and, consequently, the multiple call message will be transmitted from the relay switching center UAC directly to the relay switching center JWC which center, in turn, will transmit the multiple call message to its tributary station JWCX. The next routing indicator JKXY identifies the tributary station which is directly connected to the relay switching center JKX. The last mentioned center is reached from the relay switching center UAC through the relay switching centers JWC, BKE and BLF. The fourth routing indicator UKAY identifies a tributary station which is directly connected to the relay switching center UKA and is reached from the relay switching center UAC through the relay switching centers JWC, JWW and BKP. In the present system, it is apparent that the multiple call message transmitted from the relay switching center UAC can be transmitted once, to the relay switching center JWC, which center, in turn, can transmit three separate messages to ultimately reach the tributary stations JWCX, JKXY and UKAY. The last mentioned three messages may be simultaneously produced by the relay switching center JWC. However, in the relay switching center UAC, it will be necessary to provide a heading on the multiple call message transmitted to the relay switching center JWC to indicate that it will be held responsible for the retransmission of the one received multiple call message to each of the tributary stations JWCX, JKXY and UKAY. The manner in which this is accomplished will be understood from the following description, whereby, the multiple call apparatus in the relay switching center analyzes and processes the routing indicators JKXY and UKAY appearing in Item 6 above.

When the tape reader 1420 is restarted to sense the third routing indicator JKXY and the "space" character function appearing immediately after the letter Y, it will transmit code signals in the manner previously described to the sensing unit 1501. The relays in the sensing unit 1501 will repeat these code signals over the conductors C1716–LA to LE, inclusive, to the relays in the address sensing unit 3401 and to the relays in the precedence sensing unit 6700 and to the relays in the prosign sensing unit 2900. Although the sensing relays in the precedence sensing unit 6700 and the prosign sensing unit 2900 respond to the signals corresponding to the characters JKXY, these characters are not registered by these units because the characters do not correspond to any precedence indicator or to any prosign indicator.

In the address detector 3300 (Figs. 33 to 36) the four characters JKXY are sensed by the relays in the address sensing unit 3401 in the proper sequence and are registered respectively in the first, second, third and fourth registers 3701 to 3704, inclusive, in the processing routing register 3700 (Figs. 37 and 38). This operation is substantially identical to the operation previously given in connection with the sensing and registration of the routing indicator UACZZ.

After the four characters JKXY have been registered, the address sensing relay unit 3401 responds to the "space" character function whereby the relay R3420AC is operated to complete the previously traced circuit for operating the address received relay R3540. This relay locks itself in its operated position and, at its contacts 3541, again completes the circuit including the conductor C3492AR4 for operating the AR relay R4470 (Fig. 44)

in the sequence control unit 4100. The relay R4470 upon operating, at its contacts 4473, disconnects the conductors C1788C1 and C1788C2 in order again to terminate the sensing of the associated tape by the tape reader 1420.

The multiple call equipment is now ready to analyze the third routing indicator JKXY, as will be seen from the subsequent description, and to cause the comparison of the first three characters JKX of the routing indicator JKXY with the three characters JWC which are at the present time stored in the channel relay unit 7900. This comparison is made at this time inasmuch as the tributary station JKXY is reached over the same outgoing line extending to the relay switching center JWC.

When the AR relay R4470 operates, it also applies ground potential, at its contacts 4475, by way of the contacts 4435 of the operated relay R4430, conductor C2982PR2 extending to Fig. 29, contacts 3147, and conductor C2982PR0 extending to Fig. 42 in order to reoperate the process relay R4250 a third time so that the four characters JKXY of the third routing indicator may be processed. The relay R4250 locks itself in its operated position over a circuit including its upper winding, contacts 4256 and the grounded conductor C4274C extending to Fig. 44.

When the process relay R4250 reoperates, as noted above, three separate analyses are made of the routing indicator JKXY stored in the processing routing register 3700:

(1) The routing indicator JKXY is transferred to the routing translator X2900 where it is translated through the associated patch panel X3200 into a signal for operating one of the relays in the channel converter unit 4500 identifying a particular channel relay unit, such as 7400, corresponding to a particular outgoing line. A three digit designation identifying a particular outgoing line over which the multiple call message must be transmitted is marked, by the operated relay in the channel converter unit 4500, in the banks of the line number storage control switch 4301 and the latter switch, in testing the marked contacts, controls the outgoing line number tape storage unit 5501 to perforate the associated tape in accordance with the particular three digit outgoing line number.

(2) The four character routing indicator JKXY registered in the processing routing indicator 3700 is marked in the banks of the routing indicator storage control switch 4101 and the latter switch, in testing the marked contacts, controls the routing indicator tape storage unit 5502 to perforate its tape with the four characters JKXY of the particular routing indicator.

(3) The routing indicator JKXY registered in the processing routing indicator 3700 is also transferred to the multiple call translator 2100 where it is translated into a three character routing indicator JKX and, in the present instant, compared with the particular routing indicator JWC now stored in the channel relay unit 7900. After this comparison is made, the multiple call translator 2100 automatically functions to again store the same routing indicator JWC or the first three characters JKX of the routing indicator JKXY or a different three character routing indicator (depending upon the route over which the multiple call message is to be transmitted) in the channel relay unit 7900.

In order to accomplish the first analysis described above, the process relay R4250 closes its contacts 4253 and 4254 to cause the association of the routing translator X2900 (Figs. 3 to 6) with the processing routing register 3700 by means of the director hunting switch XS3140. When the association is made, the test relay R4220 operates, as previously described, and in turn causes the operation of the transfer relay R4210. The latter relay, at its various contacts, connects the five registers 3701 to 3705, inclusive, in the processing routing register 3700 to the character decoding relays in the routing translator X2900. Consequently, the four characters JKXY registered in the four registers 3701 to 3704, inclusive, are transferred to and registered in the character decoding relays X2901 to X2904. The last mentioned decoding relays control the associated translating relays whereby a particular jack on the three character jack panel X3270 is selected in accordance with the first three characters JKX. The fourth character Y registered in the fourth character decoding relay X2904 is disregarded in the present analysis of the routing indicator JKXY. Since it has been predetermined in accordance with the trunking diagram that the message to be transmitted to the tributary station JKXY must be transmitted out of the relay switching center UAC over the outgoing line extending to the relay switching center JWC, the selected jack on the jack panel X3270 is jumpered by means of the patch cord to one of the line jacks on the line jack panel X3220.

In the present case, it is assumed that the jumper is made to the L1 outgoing line and, as previously described, causes the operation of the relay R4530C1 in the channel converter unit 4500. It is noted, however, that the connect relay R4510 in this unit is, at the present time, in its operated position. As a result of the operation of relay R4530C1, the hundreds, tens and units marking conductors are marked in accordance with the numerical designation of the L1 outgoing line and the line number storage control switch 4301 is thereafter operated in the manner previously described. As the wipers of the line number storage control switch 4301 advance step-by-step over the associated bank contacts signals are transmitted, in the manner previously described, in accordance with a "figures shift" character function, the hundreds, the tens and the units digits of the three digit number (101) marked in the associated banks and then followed by three "space" and two "blank" functions, to the outgoing line number tape storage unit 5501 where this information is perforated on the tape 5534 in the manner previously described.

The second analysis is controlled at the contacts 4258 incident to the operation of the process relay R4250, which completes the circuit for operating the transfer relay R4140. The last mentioned relay, at its various contacts, connects the registers 3701 to 3704, inclusive, in the processing routing register 3700 to the bank contacts of the routing indicator storage control switch 4101 and since only four characters have been registered for the present routing indicator, the four character relay R4130 is operated to mark one of the bank contacts in accordance with a "space" character function where the normal fifth character of a routing indicator would appear. The last mentioned relay, at its various contacts, connects the registers 3701 to 3704, inclusive, in the processing routing register 3700 to the bank contacts of the routing indicator storage control switch 4101 and since only four characters have been registered for the present routing indicator, the four character relay R4130 is operated to mark one of the bank contacts in accordance with a "space" character function where the normal fifth character of a routing indicator would appear.

The routing indicator storage control switch 4101 now advances its wipers over the associated contact banks and transmits signals comprising a "letters shift" character function, followed by the four characters JKXY and then followed by two "space" and two "blank" functions to the routing indicator tape storage unit 5502 where this information is perforated on the associated tape 5574.

The third analysis of the routing indicator JKXY stored in the processing routing register 3700 is initiated in response to the closing of the contacts 4255 by the operation of the process relay R4250 which contacts complete a circuit including the conductor C4276TCR extending to Fig. 21 for operating the connect relay R2105 in the multiple call translator 2100. This relay connects the first, second and third decoding relays 2101 to 2103, inclusive, to the first, second and third registers 3701 to 3703, inclusive, in the processing routing register 3700 so that the characters JKX stored therein are transferred to and stored in the decoding relays. When this is accomplished, the corresponding relays in the respective first, second and third character translate relays 2181 to 2183, inclusive, are operated and apply ground potential to the conductor 336 in the cable C2285 which terminates in the jack J336 on the jack panel 2601A. The jack J336 of the jack panel 2601A is interconnected, by means of a patching cord, to a jack terminating the winding of the JKX relay R2620 in the Group A relays of Fig. 26. The JKX relay R2620 now operates.

Since the routing indicator JWC has been stored in the register 8001 in the channel relay unit 7900 and since this is the same channel relay unit that has been selected by the operation of relay R4530C1 in the channel converter unit 4500 in response to the registration of the three characters JKX of the routing indicator JKXY in the routing translator X2900, it is now necessary to compare the routing indicators JWC and JKX in the multiple call translator 2100. The transfer of the routing indicator JWC temporarily stored in the register 8011 of the channel relay unit 7900 to the multiple call translator 2100 for the comparison is accomplished under control of the operated condition of relay R4530C1 in the channel converter unit 4500. In other words, at its contacts 4531, the relay R4530C1, upon operating, applies ground potential on the conductor C4582COM to the conductor C4581COM1 extending to Fig. 81 in order to operate the translation connect relay R8010, the seizure relay R8130 ad the relay R8150 in the channel relay unit 7900. Thus the last mentioned unit is seized a second time.

Due to the fact that the register 8001 has been previously operated to register the characters JWC, certain of the register relays therein are operated and locked to ground at contacts 8111 of the operated stick-up relay R8110 and such operated register relays complete circuits for operating the register complete relay R8120. With the register 8001 in a registering condition, the operation of the translation connect relay R8010 connects the operated register relays to the corresponding conductors C8051–1A to 3E, inclusive, extending to Figs. 22 and 23. In the multiple call translator 2100, these conductors are now connected through normally closed contacts on the restored transfer relay R2330 to various register relays in the fourth, fifth and sixth decoding relays 2201 to 2203, inclusive. The transfer relay R2330 has not been operated due to the fact that the contacts 2527 have not been controlled by the channel unit connect relay R2520, and the latter relay cannot operate at the present time since the registration complete relay R8120 has opened its contacts 8122. Therefore, the locking ground potential at the contacts 8111, for the operated ones of the first second and third character register relays in the register 8001 registering the characters JWC, is now extended by way of corresponding contacts on the operated relay R8010, conductors C8051–1A to 3E, inclusive, extending to Figs. 22 and 23, to operate corresponding relays in the respective fourth, fifth and sixth character decoding relays 2201 to 2203, inclusive. The decoding relays 2201 to 203, inclusive, are exactly the same as the decoding relays 2101 to 2103 and they operate corresponding relays in the translating relays 2281 to 2283, inclusive. Thus, when the characters JWC registered in the register 8001 are transferred to the character decoding relays 2201 to 2203, inclusive, the associated fourth, fifth and sixth character translate relays 2281 to 2283, inclusive, are operated in acccordance with the characters JWC to select the conductor 393 in the cable C2385 which is terminated in the jack J393′ in the jack panel 2601B. The jack J393′ is cross-connected to the jack terminating the JWC relay R2625 by means of a patch cord in order to operate the last mentioned relay. At the present time, the JKX relay R2620 and also the JWC relay R2625 in Group A (Fig. 26) are operated.

The two sets of routing indicator characters JKX and JWC will now be compared and depending upon the comparison one or the other of the two sets of routing indicators or possibly a different routing indicator will be reregistered in the register 8001 of the channel relay unit 7900. Before describing the comparison operation, however, it is necessary to remove the JWC registration from the register 8001 and to lock the JWC registration in the fourth, fifth and sixth character decoding relays 2201 to 2203, inclusive. To accomplish the latter operation, it is noted that the translator 2 common relays R2401A to E, R2402A to E and R2403A to E (Fig. 24) are connected respectively to the conductors C2202A to E, C2203A to E and C2204A to E which are multiply connected with each of the five relays of the respective fourth, fifth and sixth character decoding relays 2201 to 2203, inclusive. Consequently, the translator 2 common relays will be operated in multiple with the relays in the decoding units 2201 to 2203, inclusive, when the characters JWC are transferred thereto from the register 8001. As each relay in the translator 2 common relays operates, it completes a circuit including one of its upper (normally open) make contacts for operating the control relay R2550. However, before the latter relay is operated, its circuit must first be prepared at the contacts 2531 on the register complete relay R2530. As a matter of fact, the relay R2530 is at the present time in its operated position due to the fact that a circuit has been completed by way of its winding, conductor C8161REG2 extending to Fig. 81, contacts 8121 and 8136 on the operated relays R8120 and R8130, conductor C8161REG extending to Fig. 25 and ground at contacts 2513 of the operated relay R2510. The latter relay, it will be recalled, operated at the time the character J of the routing indicator JKX was registered in the first character decoding relays 2101. Therefore, when the transfer 2 common relays are operated in accordance with the characters JWC transferred from the register 8001, the ground potential at the upper make contacts of such relays will complete the circuit including contacts 2521 and 2531 for operating the control relay R2550, as previously noted.

As soon as the control relay R2550 operates, it returns ground potential, at its contacts 2551, to lock the operated relays in the translator 2 common relays and to lock operated the corresponding relays in the fourth, fifth and sixth decoding relays 2201 to 2203, inclusive. Also, at the contacts 2553 the relay R2550 completes a circuit for operating the transfer relay R2330 in order to disconnect the operated relays in the register 8001 from the fourth, fifth and sixth character decoding relays 2201 to 2203, inclusive.

As a further result of the operation of relay R2550, at its contacts 2552, it removes ground potential from the conductor C8161SU-2 extending to Fig. 81 in order now to restore the stick-up relay R8110 in the channel relay unit 7900. At the contacts 8111, the stick-up relay R8110 interrupts a point in the locking circuits for all of the operated relays in the register 8001 so that the last mentioned relays will now restore and discard the routing indicator JWC temporarily stored therein. When all of the register relays in the register 8001 restore to normal, they interrupt points in the circuits for operating the registration complete relay R8120. As soon as the relay R8120 restores to normal, it disconnects, at its contacts 8121, the ground potential on the conductor C8161REG from the conductor C8161REG2 extending to Fig. 25 in order to restore the register complete relay R2530 and, at its contacts 8122, it connects the grounded conductor C8161REG to the conductor C8161REG1 extending to Fig. 25 in order to operate the channel unit connect relay R2520.

Referring now to the relay R2520 (Fig. 25) it will be seen that this relay immediately locks itself over a circuit including its lower winding and contacts 2523 to ground at contacts 2511. Also, at its contacts 2522, relay R2520 applies the locking ground potential to the locking circuit for the operated relays in the fourth, fifth and sixth decoding relays 2201 to 2203 and the operated relays in the translator 2 common relays, even though the control relay R2550 subsequently restores to normal. The circuit for the last mentioned relay is opened at the contacts 2531, in response to the restoration of relay R2530, and it is also opened at the contacts 2521, in response to the operation of relay R2520.

The restoration of the control relay R2550 again closes the contacts 2552 in order to reapply ground potential to the conductor C8161SU-2 extending to Fig. 81 thereby to re-operate the stick-up relay R8110. The last mentioned relay in turn prepares, at its contacts 8111, a locking circuit for subsequently operated register relays in the register 8001. As a further result of the restoration of relay R2550, at its contacts 2553, it interrupts a point in the previously mentioned circuit for the transfer relay R2330 but the last mentioned relay is now retained in its operated position from ground at the contacts 2527 on the operated channel unit connect relay R2520.

Further operations in the multiple call translator 2100 depend upon the control exercised in comparing the routing indicators JKX and JWC which are indicated respectively by the operation of relays R2620 and R2625 in the Group A relays of Fig. 26. It will be observed that the JKX relay R2620 in Group A through its contacts 2620A completes an operating circuit for the BLF relay R2650 in Group B. The latter relay, at its lowermost contacts, completes an obvious circuit for operating the BKE relay R2665 in Group C and the relay R2665, at its lowermost contacts completes a circuit for operating the JWC relay R2680 in Group D. By referring to the trunking diagram of Fig. 1, it will be seen that the relay switching center JKX is reached by way of the relay switching center BLF; that the relay switching center BLF is reached by way of the relay switching center BKE; that the relay switching center BKE in turn is reached by the relay switching center JWC; and that the relay switching center JWC may be reached by a direct line from the present relay switching center UAC. Consequently, when the JKX relay R2620 in Group A is operated it completes a chain circuit through relays in Group B, C and D, which relays correspond respectively to the relay switching centers BLF, BKE and JWC. The above mentioned chain circuit is completed to operate the respective relays representing the respective relay switching centers.

The JWC relay R2625 for Group A is also operated as previously described from the grounded jack J393' and, at its contacts 2625A, it operates the JWC relay R2655 in Group B; the last mentioned relay, at its lowermost make contact, operates the JWC relay R2670 in Group C; and the last mentioned relay, at its lowermost make contacts, completes the circuit for operating the JWC relay R2680 in Group D.

From the foregoing, it will be observed that there are two operated relays in Groups A, B and C of Fig. 26 but that in Group D only one relay is operated, which in this case is the JWC relay R2680. The last mentioned relay is indicative of the relay switching center which will be held responsible for the retransmission of the multiple call message to the relay switching center JKX.

Since the JKX relay R2620 and the JWC relay R2625 in Group A are operated, at their respective contacts 2620B and 2625B, these relays connect ground potential through associated resistors to the conductor C2691AC extending to Fig. 28 and then through the winding of the chain relay R2810-1, to battery. If only one resistor is connected in this circuit, the resistance will be high enough to prevent operation of relay R2810-1. Since two resistors are connected in multiple to the conductors C2691AC, the total resistance of the circuit is reduced sufficiently to permit the relay R2810-1 to operate.

In Group B, the BLF relay R2650 and the JWC relay R2655 are operated and they also apply ground potential through associated resistors to the conductor C2691BC extending to Fig. 28 so that the chain relay R2810-2 is operated in the same manner as above described. In Group C, the BKE relay R2665 and the JWC relay R2670 are operated and they also connect ground potential through the associated resistors to the conductor C2691CC extending to Fig. 28 to cause the operation of the chain relay R2810-3 in the manner previously described. Finally, in Group D only the JWC relay R2680 is operated and, at its contacts 2684, it connects ground through the associated resistor to the conductor C2691DC extending to Fig. 28, but due to the fact that only a single resistor is connected to this conductor, the resistance of circuit is high enough to prevent the chain relay R2810-4 from operating. With the chain relays R2810-1, 2 and 3 operated, the Groups A, B and C switching relays R2710, R2720 and R2730 are disconnected and the Group D switching relay R2740 is preferentially selected.

As a further result of the operation of the JWC relay R2680, at its contacts 2684', it applies ground potential to the conductor C2691X extending to Fig. 28 in order to operate the relay R2820. This relay upon operating, at its contacts 2822, prepares a point in the circuit traced hereinafter for operating the Group D switching relay R2740.

Referring again to the channel unit control relay R2520, it will be recalled that this relay operated incident to the discarding of the characters JWC from the register 8001 in the channel relay unit 7900. When the relay R2520 operates it completes, at its contacts 2526, a circuit including the conductor C2528 extending to Fig. 28 in order to operate the relay R2830. At its contacts 2831, the relay R2830 now completes a circuit including the contacts 2822, 2841, 2811, 2813, 2815 and 2817 for operating the Group D switching relay R2740. In the last mentioned circuit it is noted that the selection of the Group A, B, C or D switching relay is dependent upon the operated and restored conditions of the chain relay R2810-1 to 4, inclusive.

As soon as the Group D switching relay R2740 operates it connects, in substantially the same manner as has been previously described, the three conductors of the U, B and J jacks on the first character jack panel 2761D to the corresponding Group D encoding relays (schematically illustrated). Also, the relay R2740 connects the eight conductors of the eight A, E, F, H, K, L, M and W jacks on the second character jack panel 2762D to corresponding Group D encoding relays; and it also connects the 26 conductors of the A to Z, inclusive, jacks on the third character jack panel 2763D to corresponding relays Group D encoding relays. It will be recalled that the Groups A, B, C and D encoding relays each includes 37 separate relays; three relays representing respectively the first characters U, B and J; eight relays representing respectively eight possible second characters, noted above; and the remaining twenty-six relays representing respectively the twenty-six possible third characters A to Z, inclusive. The contact sets on the operated relays in Group D encoding relays are cross-connected between the terminals on the terminal block TB2861D and the terminals on the terminal block TB2862B so that the first character J is marked in code form on the conductors C2871A to E; the second character W is marked on the marking conductors C2872A to E; and, the third character C is marked on code form on the marking conductors C2873A to E.

Inasmuch as the transfer relay R2330 (Fig. 23) is operated, the last mentioned three groups of five conductors are now connected through contacts on the operated relay R2330 to the conductors C8051-1A to 1E, 2A to 2E and 3A to 3E then through make contacts on the operated translation connect relay R8010 to the first, second and third character register relays in the register 8001 (Fig. 80) of the channel relay unit 7900. The three groups of conductors are now marked respectively in accordance with the routing indicator JWC and cause the operation of the various relays in the register 8001 to register the respective characters JWC. The operated relays in the register 8001 are then locked in their operated positions to ground at contacts 8111 and they also complete circuits for operating the registration complete relay R8120, in the manner previously described. As a result of the reoperation of relay R8120, at its contacts 8121, it now connects the grounded conductor C8161REG to the conductor C8161REG2 extending to Fig. 25 thereby to operate the registration complete relay R2530. The operation of the last-mentioned relay is a signal indicative of the fact that the comparison of the two routing indicators JKX and JWC by the multiple call translator 2100 has been completed and that it in turn has caused the registration of the routing indicator JWC in the channel relay unit 7900. In the present example, it will be recalled that the routing indicator JWC was removed from the register 8001 in order to compare the same wtih the routing indicator JKX. Due to the particular trunking arrangement illustrated in Fig. 1, the same characters JWC are again reregistered in the register 8001 of the channel relay unit 7900. It should be understood, however, that if other trunking routes are used, the comparison of the two routing indicators in the multiple call translator 2100 may result in the registration of an entirely new three-character routing indicator in the register 8001.

Referring now to the relay R2530 (Fig. 25) it will be seen that at its contacts 2533, it connects the conductor C4276COM to the conductor C4276COMP. In Fig. 42, the connection of these conductors completes a circuit from ground at contacts 4273 through the contacts 4263 and conductor C4274D extending to Fig. 44 in order again to operate the PRCP relay R4480. The controls exercised incident to the operation of PRCO relay R4480 have been previously described and it in fact causes the restoration and disconnection of certain of the apparatus in the multiple call equipment. Also, it will be recalled that during the releasing cycle of the apparatus, the AR relay R4470 is restored to normal so that it recompletes, at its contacts 4473, the circuit for interconnecting the conductor C1788C1 and the conductor C1788CZ extending to Fig. 17, whereby, the clutch magnet of the tape reader 1420 is reoperated so that the tape reader will again start sensing the perforations on the tape 1413. The AR relay R4470 in restoring to normal also causes the restoration of the process relay R4250 and the translation control relay R4260 in the sequence control unit 4100 to render the same controllable in connection with processing the next routing indicator appearing on the above noted perforated tape.

*Sensing the fourth routing indicator appearing on the message stored in the mutiple call storage unit 1400*

It will be recalled that the item of information that appears on the multiple call message being described is Item 6 and includes the following information:

NMNM UACZZ JWCX JKKY UKAY FIGS 444

At the present time the tape reader 1420 is in condition to sense the portion of the tape containing the perforations of the routing indicator UKAY and the following "space" character function. As the tape reader senses the characters UKAY and the following "space" character function, code signals are transmitted in the manner previously described to the address detector 3300. Although such code signals are also transmitted to the precedence sensing unit 6700 and the prosign sensing unit 2900, such code signals are disregarded by the last mentioned units.

The address sensing unit 3300 (Figs. 33 to 36), in responding to the code signals will register the routing indicator UKAY in the processing routing register 3700 in the manner previously described. Also, the "space" character function transmited to the address detector 3300 will reoperate the address receive relay R3540. As a result of the registration of the routing characters UKAY and the operation of the address deceive relay R3540, the multiple call equipment will again go through the previously described cycle of operation. Generally stated, the routing translator X2900 will again be called into use under control of the process relay R4250. In response to the registration of the first three characters UKA, the routing translator X2900 will ground a particular jack on the three character jack panel X3270. Since the tributary station UKAY may be reached over an outgoing line which extends to the relay switching center JWC, the jack on the three character jack panel 3270 corresponding to the routing indicator UKA will also be jumpered, by means of patch cords, to the L1 outgoing line identifying the outgoing line extending to the relay switching center JWC. The selection of the L1 outgoing line, as previously described, will cause the operation of the relay R4530C1 in the channel converter unit 4500. Thereafter, the three digit numerical designation (101) of the outgoing line is perforated on the tape 5534 of the outgoing tape storage unit 5501 under control of the line number storage control switch 4301.

Also, the process relay R4250 causes the routing indicator storage control switch 4101 to transmit signals to the routing indicator tape storage unit 5502 so that the characters of routing indicator UKAY, stored in the processing routing register 3700, are perforated on the tape 5574.

Finally, the processing relay R4250, at its contacts 4255, initiates the operations, whereby, the first three characters UKA of the routing indicator UKAY stored in the processing routing register 3700 are transferred to the first, second and third character decoding relays 2101 to 2103 in the multiple call translator 2100. These relays in conjunction with the associated translation relays 2181 to 2183, inclusive, will mark the conductor 521 on the cable C2285 indicative of the routing indicator UKA. This conductor terminates in the jack J521 on the jack panel 2601A and is jumpered, by means of a patching cord, to the jack on the panel 2602 individual to operate the UKA relay R2635 in Group A (Fig. 26).

It is now necessary to compare the routing indicator UKA with the routing indicator JWC which has been temporarily stored in the register 8001 in the channel relay unit 7900. The circuits function in the manner previously described, whereby the characters JWC stored in the register 8001 are transferred to the fourth, fifth and sixth character decoding relays 2201 to 2203, inclusive, in the multiple call translator 2100. It should be noted, however, that the comparison is necessary at this time due to the fact that the operated relay R4530C1 again identifies the channel relay unit 7900, which was previously utilized in conjunction with the processing of at least two other routing indicators in the present multiple call message.

If another relay, similar to R4530C1, is operated to identify a different outgoing line, then a different channel relay unit is selected. The multiple call translator 2100 would in the latter case be utilized to compare whatever routing indicator is temporarily stored in the said different channel relay unit with the routing indicator registered in the translator 2100. On the other hand, if the said different channel relay unit is selected for the first time, no comparison can be made, and the routing indicator registered in the first, second and third character decoding relays 2101 to 2103 will be stored directly in the said different channel relay unit.

When the characters JWC are transferred to and stored in the fourth, fifth and sixth character decoding relays 2201 to 2203, inclusive, as noted above, the corresponding character translation relays 2281 to 2283, inclusive, respond in the manner previously described to select the conductor 393 in the cable C2385 extending to Fig. 26 and terminating in the jack J393' in order to again reoperate the JWC relay R2625 in Group A. Furthermore, the registration of the three characters JWC in the character decoding relays 2201 to 2203 will operate corresponding relays in the translator 2 common relays of Fig. 24. Operation of the last-mentioned relays will again control the relay R2550 and the latter relay, at its contacts 2551, will lock the operated relays in the transfer 2 common relays and the operated relays in the character decoding relays 2201 to 2203 in the manner previously described. Also, at the contacts 2553, the relay R2550 will complete the previously described circuit for the transfer relay R2330 so that the marking conductors from the register relays in the register 8001 of the channel relay unit 7900 are disconnected from the circuit including the decoding relays 2201 to 2203 and the translator 2 common relays. As a further result of the operation of relay R2550, ground potential at the contacts 2552 is removed from the conductor C8161SU–2 extending to Fig. 81 thereby to momentarily restore the stick-up relay R8110 so that the routing indicator JWC temporarily stored in the register 8001 will be discarded and to restore the registration complete relay R8120. The restoration of the registration complete relay R8120, will interrupt at its contacts 8121 the circuit of the relay R2530 and it will complete, at its contacts 8122, the circuit for again operating the channel unit connect relay R2520. At this time the relays R2510, R2520, the slow-to-release relay R2540, and the relay R2560 are in their operated positions and the relays R2530 and R2550 are in their restored positions.

Referring now to Fig. 26 of the multiple call translator 2100, it will be seen that the UKA relay R2635 in Group A upon operating, as noted above, completes a circuit at its contacts 2639' for operating the BKP relay R2645 in Group B; the BKP relay R2645 in turn, at its lowermost contact, completes a circuit for operating the JWW relay R2675 in Group C; and the JWW relay R2675, at its contacts 2679', completes a circuit for operating the JWC relay R2680 in Group D. The above noted relays in Groups A, B, C and D are operated in the particular chain circuit to correspond to the particular trunking path over which a telegraph message must be transmitted to reach the relay switching center UKA. For example, by referring to Fig. 1, it will be seen that the relay switching center UKA is reached by way of the relay switching center BKP; the relay switching center BKP is reached by way of the relay switching center JWW; and the relay switching center JWW is reached by way of the relay switching center JWC. The last-mentioned relay switching center in the present example is reached over a direct line from the present relay switching center UAC. Thus, in Fig. 26, the relays corresponding to the above noted switching centers in the respective Groups A to D, inclusive, are operated in the same order, starting from the relay switching center UKA and ending at the relay switching center JWC. In the present system, the relay switching center JWC is the logical choice for handling a multiple call message which must be transmitted therefrom over two separate outgoing trunking paths to the respective relay switching centers JKX and UKA.

The JWC relay R2625 in Group A upon being operated, as noted above, completes a similar chain circuit operation, whereby, the JWC relays in Groups B, C and D are operated. In Group D, however, the JWC relay R2680 is operated over two parallel paths, as noted above. Since Groups A, B and C each have two operated relays representing, in each case, two different relay switching centers, circuits are completed, in the manner previously explained, over the respective conductors C2691AC, BC and CC for operating the corresponding chain relays R2810–1 to R2810–3, inclusive. The chain relay R2810–4, however, is not operated because the resistance connected in the circuit to the conductor C2691DC through the contact 2684 of the JWC relay R2680 is sufficiently high to prevent the relay R2810–4 from operating.

The comparison has now been completed and the Group D switching relay R2740 is operated, over circuits including contacts on the operated relays R2810–1 to 3, R2820 and R2830, in the manner previously described, to connect the jacks on the jack panels 2761D, 2762D and 2763D to the Group D encoding relays, whereby, the characters JWC are respectively marked in code form on the three groups of five conductors C2871A to E, C2872A to E and C2873A to E.

As a result of the marking of the three groups of five conductors, the characters JWC are again registered in the first, second and third character register relays in the register 8001 of the channel relay unit 7900 in the manner previously described. As a result of this registration, the registration complete relay R8120 is reoperated and, at its contacts 8121, completes the circuit for the register relay R2530 (Fig. 25) in order again to complete the operating circuit for the PRCO relay R4480 in the sequence control unit 4100. The operation of the last-mentioned relay causes the restoration of certain of the apparatus in the manner previously described and the subsequent restoration of the AR relay R4470. The latter relay upon restoring releases the process relay R4250 and the transfer control relay R4260. Finally, at its contacts 4473, the relay R4470 interconnects the conductor C1788C1 and C1788C2 extending to Fig. 17 in order to control the tape reader 1420 so that it will again start sensing the items appearing on the associated tape.

*Sensing the "figures shift" character function following the last routing indicator appearing on the message stored in the multiple call storage unit*

It will be recalled that the item of information that appears on the multiple call message being described is the Item 6 and includes the following information:

NMNM  UACZZ  JWCX  JKXY  UKAY
FIGS 444

At the present time the tape reader 1420 has sensed all of the above information up to and including the last routing indicator UKAY and the "space" character function following this routing indicator. The next perforation appearing on the tape is the "figures shift" character function which is transmitted in code form (see Fig. 89) to the sensing relays in the address detector 3300, the precedence sensing unit 6700 and the prosign sensing unit 2900. The code signals corresponding to the "figures shift" character function are sensed by the relays in the address sensing unit 3401 of the address detector 3300. These code signals are also simultaneously sensed by the relays in the precedence sensing group 6701 of the precedence sensing unit 6700, but they are disregarded at this time. The relays in the prosign sensing group 2901 of the prosign sensing unit 2900 are simultaneously operated in multiple with the above noted address detector and precedence sensing unit in accordance with the "figures shift" character function. When this occurs a circuit is completed which may be traced from ground at the contacts 2916 (Fig. 29), contacts 2924, 2933, 2941 and 2948, figures shift conductor C2982RIL2 extending to Fig. 44, contacts 4434 on the operated RS relay R4430 and the left-hand winding of the process complete relay R4410, to battery. This relay upon operating immediately locks itself over a circuit including its right-hand winding and the contacts 4413 to the grounded conductor C1388SU–5.

Thus, the "figures shift" character function appearing near the end of the Item 6 in the message noted above, controls the multiple call equipment so that it registers the fact that all of the routing indicators have been processed. As a further result of the operation of the process complete relay R4410, at its contacts 4411, it disconnects the conductor C1788C1 from the previously traced circuit including conductor C1788C2 in order again to terminate the sensing operation of the tape reader 1420 as soon as the "figures shift" character function has been sensed. At the contacts 4412, the relay R4410 connects the conductor C1788C1 to the conductor C1183CA1 extending to Fig. 11 and at the contacts 4415, the conductor C1788C2 is connected to the conductor C1183CA2 extending to Fig. 11. In Fig. 11 the conductors C1183CA1 and CA2, which are now included in the circuit for controlling the sensing operation of the tape reader 1420, are disconnected until the all-pilots-complete relay R1150 is subsequently operated.

As a further result of the operation of the process complete relay R4410, at its contacts 4418, it applies ground potential to the conductor C4498ST extending to Fig. 52 in order to operate the start relay R5210 and thereby initiate operations of the precedence transmission unit 5200. Finally, at its contacts 4417, the relay R4410 applies ground potential to the conductor C4497PR extending to Fig. 71 in order to control the operation of the precedence relay R7250 (Fig. 71) whereby the precedence registered in the precedence detector 7100 is transferred to the precedence transmission unit 5200. The operations of the precedence transmission unit 5200 and the transfer of the precedence indicator registered in the precedence detector 7100 will be described hereinafter.

Before proceeding with the description of the operation, whereby pilot instructions are created for each of the new messages for the purpose of routing the original multiple call message to subsequent switching centers, it is necessary to consider the operations of the various channel relay units, such as 7900, which are identified with the different outgoing lines to select cross-office units in which the new messages from each of the seized channel relay units may be temporarily stored prior to retransmission over all of the corresponding outgoing lines.

*Operation of the channel selector switch 7700 to select the channel relay unit 7900*

It will be recalled that the start relay R7910 in each seized channel relay unit, such as 7900 (Figs. 79 to 82, inclusive), operated over a circuit including the contacts 8011 and the grounded conductor C7731SU-1 extending to Fig. 77 as soon as the translation control relay R8010 operated in response to the initial seizure of the channel relay unit. The channel relay unit 7900 is one of a plurality of such units and is used in processing the routing indicators of the multiple call message that is to be transmitted over one or more particular outgoing lines. It was assumed in the previous description that the channel relay unit 7900 was first used in processing the first routing indicator UACZZ of item 6 identifying a tributary station served by the present relay switching center UAC and that it was later used in processing the routing indicators JWCX, JKXY and UKAY. However, it should be understood that two different channel relay units are actually used. It will now be assumed that the routing indicator UACZZ, in being processed, utilized one of the channel relay units (not shown) which is the same as the unit 7900. Also, it will now be assumed that the channel relay unit 7900 was first seized and then reused one or more times during the processing of the routing indicators JWCX, JKXY and UKAY. Therefore, the multiple call message will be transmitted once through the channel relay unit 7900 from the present switching center UAC over a single outgoing line to the relay switching center JWC and retransmitted from the last-mentioned center over three different outgoing lines or trunks in the direction of the three tributary stations noted. Consequently, the routing indicator JWC is registered in the register 8001 of the channel relay unit 7900 at the present time in the manner previously explained. Also, the multiple call message will be transmitted through the channel relay unit (not shown), that was used in processing the routing indicator UACZZ, to the corresponding tributary station.

When the start relay R7910 initially operates, it locks itself to the grounded conductor C7731SU-1, by way of its contacts 7918, and remains in its operated position even though the relay R8010 subsequently restores and reoperates each time another routing indicator is processed and compared with the routing indicator JWC temporarily registered in the register 8001. At the contacts 7911, the relay R7910 interrupts a point in an incomplete circuit including the conductor C7992RST extending to Fig. 83 in order to prevent the cross-office selector switch 8300, which is individual to the channel relay unit 7900 and which is operated in a manner to be explained hereinafter, from restoring to normal until after the start relay R7910 is released.

Also, at its contacts 7919, the relay R7910 connects the upper winding of the open line relay R7970 to the conductor C7871DR extending to Fig. 78. However, this circuit operation will be explained in detail hereinafter. Furthermore, at its contacts 7913, the relay R7910 completes a circuit from ground, contacts 7947, 7931, and 7913, conductor C7871CGS extending to Fig. 78 and the winding of the start relay R7830 in the channel selector switch unit 770, to battery. The start relay F7830 will now operate to start the channel relay unit selector 7850 so that it will search for the particular calling channel relay unit 7900. Each channel relay unit that has its start relay R7910 operated will ground the start conductor C7871CGS in this manner.

In order to mark the channel relay unit 7900 as the particular calling unit, the relay R7910, at its contacts 7912, connects battery potential by way of the winding of the test relay R7930, contacts 7946 and 7912, conductor C7871TG1 extending to Fig. 78 and terminating on a particular contact in the bank accessible to the wiper 7853 of the channel relay unit selector 7850. Thus, the last-mentioned selector will search for and find the different channel relay units, such as the unit 7900, that have been marked as calling, one at a time.

Also, at its contacts 7914, the relay R7910 completes a circuit including contacts 8141 and conductor C1389CO extending to Fig. 13 in order to operate the cut-off relay R1360 in the miscellaneous control unit 1000. At its contacts 1361, the relay R1360 prepares a point in the circuit for the ZWL1 relay R1350.

Also, at the contacts 7915 and 7916, the relay R7910 opens points in the self-interrupting restoring circuits for the magnets of the register switches 8276 to 8277, inclusive, illustrated in Fig. 82, in order to prevent these switches from restoring the wipers to the illustrated contact positions until the relay R7910 subsequently restores.

At the contacts 7917, the relay R7910 completes an obvious circuit for operating the relay R8280 and the latter relay at its contacts 8281 to 8283 prevents the magnets of the registers 8274, 8273 and 8272 from restoring the associated wipers to the illustrated contact positions until the relay R7910 subsequently restores to normal.

Referring now to the channel selector switch unit 7700 (Figs. 77 and 78), it will be seen that this unit is provided to associate certain common equipment including the channel register 3900 (Figs. 39 to 40), the channel testing unit 7400 (Fig. 74) and the cross-office selector switch relay control unit 7500 (Figs. 75 and 76) with the channel relay units, such as the unit 7900, one at a time. Thus, the channel selector switch unit 7700 allots the common equipment for the exclusive use of each of the calling channel relay units, such as 7900, for the purpose of controlling the setting of the cross-off selector switch, such as 8300, individually associated with the corresponding channel relay unit, into engagement with a suitable cross-office storage unit, such as the unit X3400 schematically illustrated in Fig. 8. Also, the intercept cross-office unit selector 7701 is individually associated with the single intercept channel relay unit 7740, which is also substantially the same as the channel relay unit 7900. The intercept cross-office unit selector 7701 is provided to select an available one of a plurality of intercept cross-office units, such as 8335, which are substantially the same as the cross-office unit X3400 schematically illustrated in Fig. 8, whenever the intercept channel relay unit 7740 is selected in connection with the processing of a multiple call message.

Referring now to the start relay R7830, it will be recalled that this relay is operated in response to the application of ground potential to the conductor C7871-CGS by a calling one of the channel relay units, such as 7900. As soon as the relay R7830 operates it completes, at its contacts 7831, a circuit from ground, contacts 7866, 7831 and 7861, winding of the magnet M7851, and battery. The magnet M7851 now operates and completes, at its contacts 7852, an obvious circuit for operating the interrupter relay R7860. The last-mentioned relay upon operating, at its contacts 7861, interrupts the circuit for the magnet M7851 which now restores and advances its wipers 7853 to 7859, and 7851' to 7853' one step in a clockwise direction from the home contact position illustrated in the drawings, into engagement with the contacts 1.

Incident to the restoration of the magnet M7851, as noted above, at its contacts 7852, it interrupts the circuit for the relay R7860 which restores and again completes, at its contacts 7861, the above mentioned circuit for the magnet M7851. The above described cycle of operation of the magnet M7851 and the relay R7860 is repeated until the magnet advances the above noted wipers into engagement with a set of contacts in the associated bank terminating the conductors of a calling channel relay unit, such as 7900.

In the present case, it has been assumed that the conductor C7821TG1 is marked to indicate the calling channel relay unit 7900 but it should be understood that another like conductor is also marked by another channel relay unit that has processed the routing indicator UACZZ. Consequently, when the wiper 7853 engages contact 1, a circuit is completed from ground by way of the winding of the test relay R7865, contacts 7833, wiper 7853 and engaged contact 1, conductor C7871TG1 extending to Fig. 79, contacts 7912 and 7946 and the winding of the test relay R7930, to battery. The test relay R7865 in the channel selector switch unit 7700 now operates in series with the test relay R7930 in the channel relay unit 7900. The relay R7865 upon operating interrupts, at the contacts 7866, the above mentioned circuit for the magnet M7851 before the interrupter relay R7860 is able to restore thereby preventing the magnet M7851 from being inadvertently reoperated. Also, at its contacts 7867, the relay R7865 locks itself in its operated position to the previously described circuit including the wiper 7853. Finally, at its contacts 7868, the relay R7865 completes an obvious circuit for operating the switching relay R7840 in order to connect the cross-office selector switch relay control unit 7500 and its associated equipment to the particular calling channel relay unit 7900.

Before continuing with the description of the switching operation of the relay R7840, it should be understood that when the test relay R7930 operates in the channel relay unit 7900 it disconnects, at its contacts 7931, ground potential from the conductor C7871CGS in order now to restore the start relay R7830 in the channel selector switch unit 7700. However, if another channel relay unit, such as 7900, for example, the unit that was utilized in processing the routing indicator UACZZ, is calling ground potential and is retained on the common conductor C7871CGS to prevent restoration of the start relay R7830. In other words, when the channel relay unit 7900 is subsequently disconnected from the channel selector switch unit 7700, the test relay R7865 will be restored to normal so that the channel relay selector 7850 may again be operated to search for the other calling channel relay unit.

At the present time the wipers of the channel relay selector 7850 are in engagement with the contacts 1 and, consequently the wipers 7854, 7855 and 7857 are connected respectively to the conductor C7871BTL1, C7871DR and C7871PSS extending to the channel relay unit 7900. Also, the wipers 7856, 7857, 7858 and 7859 are connected respectively to the conductors C7872PPL, C7872PSS, C7872-OSS and C7272GR extending to the cross-office selector switch 8300 (Fig. 83). The cross-office selector switch 8300 is in fact individual to the channel relay unit 7900 and is utilized to connect the latter unit to an available cross-office unit, such as the unit X3400 schematically illustrated in Fig. 8. Also, the wiper 7853' of the channel relay unit selector 7850 is connected to the conductor C3981L1 extending to the channel register 3900 (Figs. 39 and 40). The channel register 3900 will be controlled over the conductor C3981L1 to indicate the particular outgoing line that the cross-office unit, such X3400 must be associated with to transmit the multiple call message to the destinations identified by the routing indicators which have been processed to the channel relay unit 7900. Although the wipers 7851' and 7852' are illustrated in the drawing, they are not used in the present system since they are for the purpose of controlling the second and third groups of cross-office selector switch relay control units of the type illustrated in Figs. 75 and 76, when such additional groups are required.

Referring again to the switching relay R7840 in the channel selector switch unit 7700, it will be noted that at certain of its various contacts, it connects certain of the previously noted wipers to conductors extending to the cross-office selector switch relay control unit 7500. Also, at its contacts 7845, the relay R7840 completes a circuit including conductor C7581GDS1 extending to Fig. 75, for operating the seizure relay R7520. At the present time, the relay R7520 merely prepares various circuits through its contacts, which circuits are completed during subsequent operation of the equipment. Also, at its contacts 7842', the relay R7840 applies ground potential by way of the conductor C3981Z2 extending to Fig. 39 in order to operate the start relay R3920 in the channel register 3900. Finally, at the contacts 7841', the relay R7840 applies ground potential by way of the wiper 7853' to the conductor C3981L1 extending to Fig. 40 in order to mark the last-mentioned conductor in accordance with the identity of the outgoing line that must be selected to transmit the portion of the mutiple call message being handled by the channel relay unit 7900.

*Operation of the channel register 3900*

As noted above, the start relay R3920 (Fig. 39) operates as soon as the switching relay R7840 of the channel selector switch unit 7700 closes its contacts 7842'. At its contacts 3921, the start relay R3920 completes an obvious circuit for operating the test relay R3930 and, at its contacts 3922, it completes a locking circuit for itself from the grounded conductor C3981Z2. The test relay R3930 in operating interrupts, at is contacts 3933, its initial operating circuit and simultaneously therewith, it locks itself by way of its contacts 3932 to the grounded conductor C3981Z2. Finally, at its contacts 3931, the test relay R3930 completes a circuit including the contacts 3941 for operating the connect relay R4070. The last-mentioned relay is provided with sufficient contacts, such as 4074, to connect register relays, such as the relays R4065, to marking conductors such as the conductor C3981L1 extending to Fig. 78. Each relay, such as the relay R4065, represents a different outgoing line extending from the relay switching center UAC. The relay R4065 indicates the particular outgoing line over which the present multiple call message must be transmitted to ultimately reach the destinations identified by the routing indicators processed by the channel relay unit 7900. The relays R4060 and R4055 are representative of, for example, two other outgoing lines, for example, lines L2 and L100 and the intermediate relays (not shown) are representative of other outgoing lines. Finally, the relay R4005 is representative of an intercepting trunk line which is utilized whenever it is necessary to intercept the multiple call message being processed.

Thus, the connect relay R4070, at its contacts 4074, completes the circuit for operating the relay R4065, representative of the L1 outgoing line over a circuit which may be traced from battery, winding of the relay R4065, contacts 4074, conductor C3981L1 extending to Fig. 78, contact 1 engaged by the wiper 7853', to ground at contacts 7841'. At its contacts 4068, the relay R4065 marks the first bank contact in the channel selector switch 4001 and simultaneously applies a marking ground potential to the open contacts 4043, 4048 and 4053. At its contacts 4066, the relay R4065 prepares a point in the locking circuit for itself which includes the series relay R4030 and the grounded conductor C3981Z2. Finally, at its contacts 4067, the relay R4065 completes an obvious circuit for operating the disconnect relay R3940. The last-mentioned relay upon operating, at is contacts 3941, interrupts the circuit for the connect relay R4070 which relay now restores and disconnects the channel register relays 4000, including the relay R4065, from the marking conductors C3981L1 to L100. The relay R4065 instead of restoring to normal, due to the interruption of its initial operating circuit, now locks itself in its operated position over the above mentioned series circuit including the series relay R4030 which also operates. At its contacts 4031, the series relay R4030 completes a circuit for operating the channel group relay R4020. The controls exercised in response to the operation of the relay R4020 will be explained hereinafter.

As a further result of the operation of the disconnect relay R3940, at its contacts 3942, it applies ground potential by way of the conductor C3983CSL extending to Fig. 75 in order to operate the start relay R7510 in the cross-office selector switch relay control unit 7500 (Figs. 75 and 76). When the start relay R7510 operates, it interrupts, as its contacts 7511, a point in the restoring circuit for the channel register finder 7610; at its contacts 7516 it applies ground potential to the conductor C7410SU-2 extending to Fig. 74 in order to prepare a point in the circuit for stepping the wipers 7473 and 7474 of the channel testing switch 7470 from their off-normal contact positions; and, at its contacts 7512 it completes a circuit for operating the slow-to-release precedence test relay R6940 (Fig. 69) in the precedence sensing unit 6700. The last-mentioned circuit may be traced from ground, contacts 7662', 7658 and 7512, conductor C6903PG extending to Fig. 69, contacts 6951 and the winding of the precedence test relay R6940, to battery.

In the present system, it may be assumed that the relay switching center UAC is provided with two director components in the multiple call equipment and that the precedence sensing unit 6700 is associated with the first of the directors. Consequently, as soon as the relay R6940 operates, at its contacts 6941, it connects the precedence test relay R6950 to a chain circuit including contacts of similar precedence test relays (R6920 and R6930) of the second or last director. The circuit for operating the precedence test relay R6950 may be traced from battery, winding of relay R6950, contacts 6941, terminals CG3 and CG2 of the first director precedence sensing unit 6700, contacts 6954, terminal CG1 of the predecence sensing unit 6700, terminal CG2' of the second or last director precedence sensing unit, such as 6700, contacts 6931 and the grounded terminal CG1' of the precedence sensing unit in the second director. The slow-to-release relay R6950 operates its X contacts 6952 thereby to lock the relay in its operated position to the grounded conductor C6903PG. At is contacts 6951, the relay R6950 interrupts the circuit for the slow-to-release relay R6940; at its contacts 6954, it interrupts a point in its initial operating circuit; at its contacts 6953 it prepares a point in the circuit for operating the precedence test relay R6930 in the predecence sensing unit of the second director; and, at its contacts 6955, it applies ground potential by way of the contacts 6944 to the conductor C6903COM1 extending to Fig. 76. The last-mentioned conductor is grounded during the slow-to-release period of the relay R6940 and as soon as the latter relay fully restores to normal, it transfers, at its contacts 6945, the ground potential from the conductor C6903COM1 to the conductor C6903PRE extending to Fig. 75. Finally, at its contacts 6956, 6957 and 6958, the relay R6950 prepares points in the precedence indicating circuits which will be described hereinafter.

It should be noted, however, that with the precedence test relay R6940 in its restored position and the relay R6950 in its operated position, the ground potential at the terminal CG1' of the precedence sensing unit in the second director is not extended by way of the contacts 6931, the terminals CG2' and CG1, contacts 6953, 6943, terminals CG4 and CG3' to the precedence sensing unit in the second director so that in the event the relay R6920 therein is operated, the contacts 6921 thereof will be closed to complete the circuit (not shown) for operating the relay R6930. It should also be noted at this time that each precedence sensing unit of the directors is provided with a busy key, such as the busy key K6961 which will permit the directors to be withdrawn from service by actuation of the associated busy keys. The make contacts of the busy key K6961 by-passes the contacts 6942 and 6954 so that in the event the busy key is operated, the precedence test relays in the second director will be effective while the precedence test relays of the first director are out of service.

Considering now the circuit including the conductor C6903COM1 extending to Fig. 76 which is grounded during the interval of time that the precedence test relays R6940 and R6950 are in their operated positions, it will be seen that in Fig. 76 an obvious circuit is completed for operating the available channel relay R7560 and a branch circuit is completed by way of the contacts 7667 and the conductor C7101COM extending to Fig. 71 for the purpose to be described hereinafter.

As soon as the relay R7560 (Fig. 75) operates, the operating ground potential on the conductor C6903COM1 is further extended by way of the contacts 7561 and the conductor C7401CM1 extending to Fig. 74 in order to operate the connect relay R7430 in the channel testing unit 7400. The relay R7430, at its contacts 7431 and 7439 and other contacts not shown connects a separate conductor from each cross-office unit, such as the cross-office unit X3400 of Fig. 8, to the channel marking relays, such as R7410–1 to R7410–39. It should be understood, however, that the number of cross-office units, such as X3400, will vary in accordance with the amount of traffic to be handled through the relay switching center UAC. Thus, the channel testing switch 7470, which is shown as a 50 point rotary switch, will be able to control the selection of at least 50 cross-office units. But this switch could easily be enlarged to a 100 point rotary switch to provide facilities for selecting any one of 100 cross-office units if necessary.

As previously noted, the ground potential applied to the conductor C6903COM1 is extended over a branch circuit including the contacts 7667 and the conductor C7101COM extending to Fig. 71. In the precedence detector 7100 (Figs. 71 to 73, inclusive) the deferred detector 7100NM has been operated to register the fact that the predecence indicator NMNM appeared on the tape of the multiple call message being processed and which was stored in the multiple call storage unit 1400. Consequently, the ground potential applied to the conductor C7101COM is extended by way of the contacts 7396 of the relay R7395 (which registers the deferred precedence indicator NMNM), conductor C6902NMD extending to Fig. 69, contacts 6956, conductor C3984NM1 extending to Fig. 40, contacts 4026, and the winding of the multi-contact deferred register relay R4050, to battery. The contacts 4026 in the above described circuit are in their closed position inasmuch as the channel group relay R4020 is in its operated position as previously noted. The deferred relay R4050 may be provided with as many contacts, such as the contacts 4051 to 4053, as are necessary to any one of the different outgoing lines (channels) provided in the relay switching center UAC. In the present arrangement it is assumed that the L1 register relay R4065 is operated and, consequently, at its contacts 4068, it applies ground potential by way of the contacts 4053 to the conductor C4091NM1 extending to Fig. 8 where it marks the L1 outgoing line in the bank contact 1 accessible to the wiper X4328 of the outgoing selector X4300. This conductor is also multiply connected to the corresponding bank contacts of all the outgoing selectors, such as X4300, provided in the relay switching center UAC. The number of outgoing selectors will depend upon the amount of traffic that is handled through the relay switching center.

A number of outgoing selectors, such as the selector X4300 associated with the cross-office unit X3400 (Fig. 8), may have their wipers positioned into engagement with the contacts terminating the L1 outgoing line and the associated cross-office units, such as X3400, may have been previously set to register either a "deferred," "routine" or "priority" precedence indication. This registration is made by the precedence marking switch X4210. Consequently, if the outgoing selector X4300 has already positioned its wipers into engagement with the contacts 1 terminating the L1 outgoing line, the above described ground potential applied to the conductor C4091NM1 by the channel register 3900 will now be further extended by way of the wiper X4328, the conductor XC4201NMC, wiper X4215 of the precedence marking switch X4210, contacts X3855 of the tape feed-out relay XR3850, conductor C7402-1 extending to Fig. 74, contacts 7431, winding of the test relay R7410-1, and its associated resistor, to battery. The test relay R7410-1 in the channel testing switch 7470 operates over this circuit and, at its contacts 7476, locks itself to the conductor C7401SU-3 extending to Fig. 75, to ground at contacts 7515. Thus, the fact that the cross-office unit X3400 (Fig. 8) is associated with the L1 outgoing line over its outgoing selector X4300 and the additional fact that its precedence marking switch X4210 has been preset to register a "deferred" precedence indicator, is registered in the channel testing switch 7470 by the operation of the test relay R7410-1.

It should be noted, however, that the conductor C4091NM1 is multiply connected to all of the remaining outgoing selectors and if any one of the remaining selectors, such as X4300, has its wipers in engagement with the L1 outgoing line and the associated cross-office unit has a deferred precedence indicator registered therein the corresponding test relay in the channel testing unit 7400 will also operate and lock to the conductor C7401SU-3. In this manner the channel testing unit 7400 will be informed as to the identity of the particular cross-office units, such as X3400, that have registered the deferred precedence indicator and that are associated with the L1 outgoing line. It should also be understood that substantially the same operations will be preformed in substantially the same manner in the event that the "routine" or "priority" precedence indicators are registered in the routine detector 7100RR or the priority detector 7100PP.

Referring now to the channel testing unit 7400, it will be seen that when the test relay R7410-1 operates over the circuit described previously, at its contacts 7428, it removes a marking ground potential from the bank contact accessible to the wipers 7473 and 7474 and, at its contacts 7427, it completes a circuit for operating the channel test relay R7450 provided the corresponding channel test relay R7445 in the second channel test unit (not shown) is in its restored position. This circuit may be traced from ground, contacts 7427 and 7446, and the winding of the channel test relay R7450, to battery. Each of the other operated channel marking relays, such as R7410-1, will also complete the above traced circuit and they also remove the marking ground potential from the corresponding bank contacts accessible to the wipers 7473 and 7474. When the relay R7450 operates, it completes, at its contacts 7453, a circuit including the conductor C7401GR extending to Fig. 75 for operating the control relay R7535 in multiple with the slow-to-operate timing relay R7540. The circuit for operating the control relay R7535 is obvious and the circuit for operating the timing relay R7540 includes the grounded conductor C7401GR, winding of the relay R7540, contacts 7553, 7556 and 7659, and battery. As soon as the relay R7535 operates it interrupts, at its contacts 7536, a point in the circuit for operating the hunt empty bin relay R7660. This circuit is interrupted before the slow-to-release precedence test relay R6940 restores to normal.

In other words, if the inquiry ground potential applied to the conductor C6903COM1, during the operated period of both of the test relays R6940 and R6950, fails to cause the operation of one of the channel marking relays R7410-1, etc., due to the fact that no outgoing selector, such as X4300 (Fig. 8), is positioned into engagement with the proper outgoing line, then the channel test relay R7450 and the control relay R7535 and the timing relay 7540 will remain in their restored positions until after the precedence test relay R6940 restores to normal.

In the event that no channel marking relay, such as the relay R7410-1 is operated at this time, the relays R7450, R7535 and R7540 will remain in their restored positions. Consequently, when the slow-to-release precedence test relay R6940 restores to normal after a slight delay, it completes, at its contacts 6945, a circuit for now applying the ground potential at the contacts 6955 by way of the conductor C6903PRE extending to Fig. 75, contacts 7536, and the winding of the hunt empty bin relay R7660, to battery. This relay now operates and immediately locks itself in its operated position over a circuit including its left-hand winding, contacts 7663, 7525' and 7513, to ground. Further operations controlled by the operation of the hunt empty bin relay R7660 will be described hereinafter.

Referring again to the channel testing unit 7400 (Fig. 74) it will be recalled that when the relay R7450 operated it completed, at its contacts 7453, the circuit for operating the control relay R7535 in order to indicate to the cross-office selector switch relay control unit 7500 that at least one cross-office unit, such as X3400, is connected to the proper L1 outgoing line and that at least one of the cross-office units so connected has previously been set to handle a message having the same deferred precedence as the multiple call message being processed. As a further result of the operation of the relay R7450, at its contacts 7459', it completes a circuit for operating the magnet M7475 of the channel testing switch 7470. The last-mentioned circuit may be traced from battery by way of the magnet M7475, contacts 7459', conductor C7401TMM extending to Fig. 75, contacts 7531, 7551, conductor C7401LC extending to Fig. 74, contacts 7456, wiper 7473, in engagement with its normal home contact position and the grounded conductor C7401SU-2. The magnet M7475 operates over this circuit. Simultaneously therewith, the relay R7450 extends to ground potential on the conductor C7401SU-2 over a circuit including the normal home contact position engaged by the wiper 7474 of the channel testing switch 7470, contacts 7457, conductor C7401LD extending to Fig. 75 in order to operate the slow-to-release timing relay R7555 in the unit 7500. As soon as the relay R7555 operates it interrupts at its contacts 7556, a point in the previously traced circuit for operating the slow-to-operate timing relay R7540 before the latter relay has had an opportunity to fully operate.

As a further result of the operation of relay R7450, at its contacts 7454, it now applies ground potential over a circuit including the conductor C7401SWR1 extending to Fig. 75, contacts 7522, conductor C7581GR1 extending to Fig. 78, contacts 7847, wiper 7859 of the channel relay unit selector 7850 in engagement with the contact 1, conductor C7872GR extending to the cross-office selector switch 8300 in order to operate the switching relay R8310. The cross-office selector switch 8300 (Fig. 83) is individually associated with the channel relay unit 7900 of Figs. 79 to 82 and it has access by way of its associated wipers to the schematically illustrated cross-office unit X3400 (Fig. 8), as well as the remaining cross-office units in the exchange and to the intercept cross-office units, such as 8335. The relay R8310 in Fig. 83 operates over the above-mentioned circuit and it prepares a locking circuit for itself which includes its contacts 8316 and 8317 and ground at the off-normal contacts ON8323 on the cross-office selector switch 8300. The off-normal contacts ON8323, as well as ON8324, however, are only closed during the time that the wipers 8325 to 8329, inclusive, are advanced away from their illustrated normal home contact positions.

Referring again to the channel testing unit 7400 of Fig. 74, it will be seen that when the magnet M7475 operates, as previously described, it completes, at its contacts 7477, a circuit including contacts 7458, conductor C7401T-INT extending to Fig. 75, winding of the interrupter relay R7530, contacts 7527, conductor C7581PPL extending to Fig. 78, contacts 7843, wiper 7856 in engagement with the contact 1, conductor C7872PPL extending to Fig. 83, contacts 8319 and the winding of the magnet M8321 of the cross-office selector switch 8300, to battery. In the last-mentioned circuit the interrupter relay R7530 and the magnet M8321 operate in series. The relay R7530, at its contacts 7531, interrupts a point in the previously traced circuit for the magnet M7475 so that it now restores to normal and thereby advances its wipers 7471 to 7474, inclusive, one step in a counter-clockwise direction from the normal home contact position into engagement with the contact 1. As a further result of the restoration of the magnet M7475, at its contacts 7477, it interrupts a point in the above traced series circuit for the interrupter relay R7530 and the magnet M8321. Consequently, the interrupter relay R7530 restores to normal to again complete, at its contacts 7531, the circuit for the magnet M7475. As a result of the restoration of the magnet M8321, the wipers 8325 to 8329, inclusive, are advanced one step in a clockwise direction from the normal home contact positions into engagement with the contact 1. The cycle of operation including the magnet M7475, the interrupter relay R7530 and the magnet M8321 will continue as long as ground potential is encountered by the wipers 7473 and 7474, as they are advanced step-by-step over the associated contact banks. In any event the first step of the wipers of the channel testing switch 7470 and the first step of the wipers of the cross-office selector switch 8300 positions the various wipers into engagement with the contacts 1.

At this point it should be noted that as soon as the wipers of the channel testing switch 7470 are moved from the normal home contact positions into engagement with the contact 1 the off-normal contacts ON7478 and ON7479′ are closed and the off-normal contacts ON7479 are opened. These off-normal contacts remain in the last-mentioned positions until the wipers 7471 to 7474, inclusive, are again returned to their normal home contact positions. Consequently, as soon as the wipers of the channel testing switch 7470 are advanced one step, the off-normal contacts ON7479′ complete an obvious circuit for operating the transfer relay R7460. Finally, when the wiper 7474 advances from its home contact position, it interrupts a point in the previously traced circuit for the slow-to-release timing relay R7555. However, as long as ground potential is encountered by the wiper 7474 the relay R7555 will remain operated.

It will be recalled that the channel marking relay R7410-1 was operated because the cross-office unit X3400 is associated with the proper L1 outgoing line and because the particular cross-office unit has previously been set to handle deferred precedence messages. This relay, at its contacts 7428, removes marking ground potential from the contact 1 accessible to the wiper 7473 and it should be noted that since all of the contacts accessible to the wiper 7473 are multipled to the corresponding contacts accessible to the wiper 7474, the contact 1 accessible to the latter wiper is also ungrounded at this time. The ungrounded condition of the bank contacts 1 now engaged by the wipers 7473 and 7474 indicates to the channel testing switch 7470 that the cross-office unit X3400 is connected to the L1 outgoing line and that the cross-office unit X3400 has its precedence marking switch X4200 positioned to register the deferred precedence indicator, as previously noted. Since the cross-office selector switch 8300 has also advanced its wipers one step into engagement with the contact 1 they now complete circuits including the conductors extending to the cross-office unit X3400 (Fig. 8). In view of the foregoing, it will be appreciated that the advancement of the channel testing switch 7470 to find an ungrounded bank contact indicative of the available cross-office unit X3400, controls the advancement of the wipers of the cross-office selector switch 8300 to select the same cross-office unit X3400.

The channel testing unit 7400 and the cross-office selector switch relay control unit 7500 are now in condition to test the idle or busy condition of the cross-office unit X3400 that is now connected to the channel relay unit 7900. Thus, when no ground is encountered by the wiper 7474 the circuit of the timing relay R7555 is interrupted and upon restoring to normal, at its contacts 7557, it connects the right-hand winding of the cross-office test relay R7550 to the cross-office unit X3400 to determine whether this unit is idle in the sense that it can be utilized to store another message. It should be understood, however, that the cross-office unit X3400 may still be marked as idle to the multiple call equipment even though it may be, at the present time, transmitting a previously stored message over the L1 outgoing line. The absence of ground on the bank contact 1 engaged by the wiper 7473, interrupts the circuit for the magnet M7475 to terminate the stepping of the wipers of the channel testing switch 7470.

It will first be assumed that the associated cross-office unit X3400 schematically illustrated in Fig. 8 is idle at the time the above test is made. When this condition exists in the cross-office unit X3400, a circuit will be completed from ground, right-hand winding of the test relay R7550, contacts 7656, 7557 and 7528, conductor C7581BTL extending to Fig. 78, contacts 7841, wiper 7854, conductor C7871BTL-1 extending to Fig. 79, conductor C7992BTL extending to Fig. 83, contacts 8313, wiper 8327 of the cross-office selector switch 8300, conductor C8330BTL extending to Fig. 8 and the winding of the seizure relay XR3870 in the cross-office unit X3400, to battery. In this circuit the relay XR3870 does not operate due to the high resistance of the right-hand winding of the relay R7550. However, the relay R7550 operates and, at its contacts 7552, connects the low resistance winding of the relay R7545 in series with the low resistance left-hand winding of the relay R7550 to the previously traced circuit including the winding of the seizure relay XR3870. As soon as the last-mentioned circuit is completed, the relays R7545 and XR3870 operate in series with the relay R7550. Thus, all three relays remain in their operated positions.

If it is assumed that the cross-office unit X3400 of Fig. 8 is busy, a direct ground potential will be connected to the conductor XC3301BTL (over a circuit in the cross-office unit X3400 which is not shown) in order to short circuit the test relay R7550 and prevent its operation. The cross-office unit X3400 may be marked busy in this manner, in the event that the unit is being returned to the pool of available cross-office units; or in the event that the associated tape storage bin is full of tape; or in the event that the associated reperforator X3410 is being controlled to automatically feed-out "blank" tape; or in the event that another unit of equipment, such as the multiple call equipment or the incoming line circuit X400 of Fig. 7B is transmitting signals to the cross-office unit X3400. Since the cross-office test relay R7550 is short circuited by any one of the foregoing busy conditions, the relay does not operate and the slow-to-operate timing relay R7540 will subsequently reoperate and, at its contacts 7541, it will complete a circuit for restoring the operated channel marking relay R7410–1 in the channel testing unit 7400. In this connection it should be noted that as soon as the relay R7555 restores to normal to complete, at its contacts 7557, the previously mentioned testing circuit for the relay R7550, it also completes, at its contacts 7556, the previously mentioned circuit for operating the timing relay R7540. Since the test relay R7550 does not operate when the cross-office unit X3400 is busy under any one of the previously mentioned conditions, the timing relay R7550 then operates, as noted above, to complete a circuit which includes ground at contacts 7558, contacts 7541, conductor C7401LB extending to Fig. 74, contacts 7452, wiper 7472, the engaged contact 1, the winding of the channel marking relay R7410–1 to ground either by way of the contacts 7426 and the conductor C7401SU–3 or by way of the contacts 7431 and the conductor C7402–1. The winding of the relay R7410–1 is thus shunted in order to restore the latter relay to normal.

As soon as the relay R7410–1 restores to normal it connects, at its contacts 7428, ground potential by way of the contact 1 engaged by the wipers 7473 and 7474 in order to complete the circuit including the contacts 7456, conductor C7401LC extending to Fig. 75, contacts 7551 and 7531, conductor C7401TMM extending to Fig. 74, contacts 7459' and the winding of the magnet M7475, to battery, and also to complete a circuit including the contacts 7457, conductor C7401LD extending to Fig. 75 for reoperating the timing relay R7555. At this time the relay R7555 interrupts the circuit for the timing relay R7540, at its contacts 7556 and, at its contacts 7558, it disconnects the ground potential from the conductor C7401LB.

The magnet M7475 now reoperates and completes, at its contacts 7477 the previously traced circuit for operating the interrupter relay R7530 in series with the magnet M8321 in the cross-office selector switch 8300. Accordingly, the interrupter relay R7530 upon operating interrupts, at its contacts 7531, the circuit for the magnet M7475 which now restores to normal to advance the wipers 7471 to 7474, inclusive, of the channel testing switch 7470 an additional step. Also, upon restoring, the magnet M7475 interrupts, at its contacts 7477, the previously traced circuit for the interrupter relay R7530 and the magnet M8321. The magnet M8321 upon restoring advances the wipers 8325 to 8329, inclusive, of the cross-office selector switch 8300 an additional step. The wipers of the channel testing switch 7470 are now into engagement with the contacts 2 to determine whether or not the channel testing relay R7410–2 (not shown) is operated and the wipers of the cross-office selector switch 8300 in engagement with the contacts 2 select the next cross-office unit, which is the same as the illustrated cross-office unit X3400 of Fig. 8. Thus, the channel testing switch 7470 and the cross-office selector switch 8300 advances their wipers step-by-step to search for another cross-office unit, which is also connected to the outgoing line L1 and has preregistered therein the same deferred precedence indicator as the message being handled by the multiple call equipment. These switches step in synchronism until another channel testing relay, such as relay R7410–1, is encountered and is in its operated position to indicate that the corresponding cross-office unit is connected to the L1 outgoing line and has the deferred precedence indicator registered therein. However, if the selected cross-office unit X3400 is idle as previously noted, the cross-office test relay R7550 and the relays R7545 and XR3870 are operated to associate the idle cross-office unit with the channel relay unit 7900 of the multiple call equipment.

For the purpose of this description it will be assumed that the cross-office unit X3400 was idle at the time the channel testing switch 7470 tested the first contact in the bank accessible to the wiper 7473 and that the relays R7545 and R7550 in the cross-office selector relay control unit 7500 are operated in series with the seizure relay XR3870 in the cross-office unit X3400. As soon as the relay R7545 operates it completes, at its contacts 7546, a circuit including the contacts 7664' and 7526 for applying ground potential to the conductor C7581DR extending to Fig. 78. In Fig. 78, the ground potential on the conductor C7581DR is further extended by way of the contacts 7842, wiper 7855 in engagement with the contacts 1, conductor C7871DR extending to Fig. 79, contacts 7919 and the lower winding of the open line relay R7970, to battery. The relay R7970 now operates and, at its contacts 7972, completes the circuit for operating the director release relay R7940, from battery by way of the winding of the relay R7940, contacts 7972, conductor C7992SU extending to Fig. 83, contacts 8317 and ground at the off-normal contacts ON8323 in the cross-office selector switch 8300. It may be well to mention at this time that the off-normal contacts ON8323 and ON8324 are closed whenever the wipers 8325 to 8329, inclusive, are not in engagement with their normal home contact positions. It should also be noted at this time that the ground potential at the off-normal contacts ON8323 completes a locking circuit for the relay R8310 by way of the contacts 8317 and 8316. As soon as the director release relay R7940 operates, it locks itself in its operated position, by way of its contacts 7944, to the grounded conductor C7992SU.

As a further result of the operation of the relay R7940, at its contacts 7942, it applies ground potential to the conductor C7992BTL extending to Fig. 83 and then by way of the contacts 8313, wiper 8327, conductor C8330BTL extending to Fig. 8 in order to hold the seizure relay XR3870 in the cross-office unit X3400 in its operated position under control of the channel relay unit 7900.

The ground potential at the contacts 7942 of relay R7940 is also extended by way of the conductor C7871BTL–1 to Fig. 78, wiper 7854, contacts 7841, conductor C7581BTL extending to Fig. 75, contacts 7528, 7559 and 7656 in order to shunt down the relays R7545 and R7750.

Also, the relay R7940, at its contacts 7941, prepares a point in the incomplete circuit for the open line alarm relay R7980 so that in the event the open line relay R7970 should inadvertently be restored to normal an alarm signal will be transmitted to indicate the fault. At the contacts 7943, the relay R7940 also prepares a point in the circuit for applying ground potential to the conductor C7992RST extending to Fig. 83. The last-mentioned circuit, however, is not completed until the contacts 7911 are closed incident to the restoration of the start relay R7910. The grounding of the conductor C7992RST will cause the magnet M8321 of the cross-office selector switch 8300 to be self-interruptedly operated to restore the wipers of the switch to the illustrated normal home contact positions.

At its contacts 7945, the relay R7940 completes a circuit for connecting the lower winding of the open line relay R7970 to the conductor C7992SIG. This circuit may be traced from ground, contacts 7961' and 7945, the lower winding of relay R7970, conductor C7992SIG extending to Fig. 83, contacts 8311, wiper 8325, conductor C8330SIG extending to Fig. 8, contacts X3802 (closed by relay XR8300 as will be described) and the winding of the magnet XM3411, to battery. In other words, the magnet XM3411 and the open line relay R7970 will be maintained in their operated positions so that the cross-office reperforator X3410 in the cross-office unit X3400 will be in condition to respond to subsequent signals transmitted over this circuit.

Furthermore, at the contacts 7946, the relay R7940 interrupts a point in the series circuit for the test relay R7930 and the test relay R7865 in the channel selector switch 7700 so that both relays now restore to normal.

At its contacts 7947, the relay R7940 prevents ground potential from being applied to the conductor C7871CGS extending to Fig. 78 in response to the restoration of the test relay R7930. In other words, the contacts 7947 will prevent the start relay R7830 in the channel selector switch 7700 from being reoperated under control of the present channel relay unit 7900. Other calling channel relay units, however, will retain the start relay R7830 in its operated position until the associated channel relay units have been successively picked-up by the channel selector switch 7700 and connected to appropriate cross-office units, such as X3400, which cross-office units in turn are connected to proper outgoing lines extending in the direction of the relay switching center or tributary station to which the multiple call message must be transmitted. After all of the channel relay units are connected to appropriate cross-office units and designated outgoing lines, the start relay R7830 will be restored to normal and the channel selector switch 7700 will be disconnected from the channel relay units.

At its contacts 7948, the relay R7940 interconnects, the conductor C1184COR extending to the miscellaneous control unit 1000 (Fig. 11) and the conductor C7992–OGC extending to the cross-office selector switch 8300 (Fig. 83). The conductor C1184COR will subsequently be grounded by the miscellaneous control unit 1000 when the all-pilots-complete relay R1150 therein is operated. However, in the meantime, the contacts 7949 are closed by the relay R7940 so that a resistance ground potential is applied by way of the resistor 7933 to the conductor C7992–OGC extending to Fig. 83 and then by way of the contacts 8312, wiper 8326, conductor C8330–OGC extending to Fig. 8 and the upper winding of the relay XR3880, to battery. The relay XR3880 in the cross-office unit X3400 operates at this time and, at its lower make contact, connects the winding of the relay XR3890 to the conductor C8330–OGC. However, due to the high resistance of the resistor 7933 included in the operating circuit for the relay XR3880, the relay XR3890 does not operate at this time. At its contact X3881, the relay XR3880 completes an obvious circuit for operating the reperforator relay XR3800 and the latter relay, at its contacts X3802, connects the magnet XM3411 of the cross-office reperforator X3410 to the conductor C8330SIG, as previously noted. The cross-office reperforator X3410 in the cross-office unit X3400 is now in condition to respond to signal transmitted over the conductor C8330SIG to perforate the tape X3413 accordingly.

Finally, at its contacts 7941', the relay R7940 connects the upper winding of the transmission relay R7960 to the conductor C5281AUG extending to Fig. 52 and to the conductor C1805AUG extending to Fig. 18. Ground potential will be subsequently applied to the conductor C5281AUG after all used channel relay units have been picked-up by the channel selector switch unit 7700 and connected to cross-office units in order to operate the transfer relay R7960 so that its contacts 7961 will be closed to connect the signalling circuit including the lower winding of the open line relay R7970 to the channel multipling unit 8700.

In the foregoing discussion regarding the operation of the relay R7940, it was pointed out that, at its contacts 7946, it interrupted the series circuit including the test relay R7930 and the test relay R7865. The relay R7865 in the channel selector switch 7700 will restore as noted and will again complete a circuit for controlling the magnet M7851 to advance the wipers of the channel relay unit selector 7850 to search for another calling channel relay unit, such as 7900. This searching operation, however, is dependent upon the operated condition of the start relay R7830. After all of the channel relay units, such as 7900, have been picked-up one after another under control of the channel selector switch 7700 and connected by way of their associated cross-office selector switches, such as 8300, to appropriate cross-office units, such as X3400, ground potential will then be removed from the conductor C7811CGS in order to restore the start relay R7830. Restoration of the start relay R7830 terminates further operation of the channel selector switch unit 7700 and, at the contacts 7832, ground potential will be removed from the conductor C5283CG extending to Fig. 52 in order to remove the shunt from the circuit including the winding of the start relay R5210 in the precedence transmission unit 5200. The start relay R5210 will now operate from the ground potential applied to the conductor C4498ST under control of the process complete relay R4410 in the sequence control unit 4100 (Fig. 44) as previously explained.

Before describing the operations in the precedence transmission unit 5200 resulting from the operation of the start relay R5210 therein the disconnection of the common equipment including the channel selector switch unit 7700 from the channel relay unit 7900 will first be described.

It will be recalled that the channel relay unit 7700 opens the circuit for the test relay R7865 in the channel selector switch unit 7700 under control of the director release relay R7940. As previously noted, the test relay R7865 will cause the channel relay unit selector 7850 to search for another calling channel relay unit, such as 7900, if the start relay R7830 is retained in its operated position. However, each time the test relay R7865 restores it interrupts the circuit, at its contacts 7868, for the switching relay R7840. The latter relay in restoring to normal disconnects the common director equipment including the channel selector switch unit 7700 from the channel relay unit 7900 at its various contacts. Thus, at the contacts 7841 to 7844, inclusive, 7846 and 7847, it disconnects the various conductors extending to the cross-office selector switch relay control unit 7500 from the corresponding wipers of the channel relay unit selector 7850. In addition to the foregoing, the relay R7840, at its contacts 7845, removes ground potential from the conductor C7581GDS1 extending to Fig. 75 in order to restore the seizure relay R7520. Also, at its contacts 7841' the relay R7840 removes ground potential from the circuit including the wiper 7853' and the conductor C3981L1 extending to Fig. 40 in order to prevent any one of the channel register relays 4000 in the channel register 3900 (Figs. 39 and 40) from inadvertently reoperating when the disconnect relay R3940 is subsequently restored to normal. Finally, at its contacts 7842' the relay R7840 removes ground potential from the conductor C3981Z2 extending to Fig. 39 in order to cause the restoration of the start relay R3920, the test relay R3930, the series relay R4030 and the channel register relay R4065 to restore to normal. Each of the above noted relays have been locked in their operated positions to the grounded conductor C3981Z2. It need only be mentioned at this time that the series relay R4030 interrupts the circuit for the channel group relay R4020, at its contacts 4031. The last-mentioned relay in restoring disconnects the priority relay R4040, the routine relay R4045 and the deferred relay R4050 from the conductors C8984PP1, C3984RR1 and C3984NM1, respectively. The remaining contacts controlled by the restoration of the channel group relay R4020 perform no important controls at this time. The deferred relay R4050, which relay has been operated from ground potential applied to the conductor C3984NM1, restores to normal and, at its contacts 4053, removes the ground potential at the contacts 4068 from the conductor C4091NM1. Also, the channel register relay R4065 upon restoring in addition to opening its contacts 4068, also, at its contacts 4067, opens the circuit for the disconnect relay R3940 so that the last mentioned relay now restores to normal. The relay R3940 upon restoring, at its contacts 3942, removes ground potential from the conductor C3983CSL extending to Fig. 75 in order now to restore the start relay R7510 in the cross-office selector switch relay control unit 7500.

Referring now to the cross-office selector switch relay control unit 7500 illustrated in Figs. 75 and 76, it will be seen that the release of the start relay R7510 will cause the restoration of certain units of common equipment which were utilized in connecting the channel relay unit 7900 to the cross-office unit X3400 schematically illustrated in Fig. 8. As soon as the start relay R7510 restores to normal, at its contacts 7515, it removes ground potential from the conductor C7401SU-3 extending to Fig. 74 in order to restore any of the operated channel marking relays R7410-1 etc., to normal. Also, at its contacts 7516, it removes ground potential from the conductor C7401SU-2 extending to Fig. 74 and, at its contacts 7518, it interconnects the conductor C7401-ON1 and C7401-ON2 extending to Fig. 74 thereby to complete a self-interrupting home circuit for the magnet M7475 of the channel testing switch 7470.

The homing circuit for the magnet M7475 may be traced from battery by way of the winding of the magnet M7475, contacts 7463, conductor C7401-ON2 extending to Fig. 75, contacts 7518, conductor C7401-ON1 extending to Fig. 74, off-normal contacts ON7478 (closed as long as the wipers of the switch 7470 are in an off-normal position) and contacts 7476, to ground. It should be noted at this time, however, that the channel testing relay R7450 has been restored to normal due to the fact that ground potential has been removed from the operating circuit for the relay incident to the restoration of operated ones of the channel marking relay, such as R7410-1, etc. Consequently, the above traced circuit for the magnet M7475 includes the contacts 7463 of the transfer relay R7460 which is now held in its operated position over a circuit including the off-normal contacts ON7479'. Each time the magnet M7475 operates, it interrupts its own operating circuit at its contacts 7476. The magnet then restores to normal to advance the wipers 7471 to 7474, inclusive, one step in a counter-clockwise direction. Furthermore, the restoration of the magnet M7475 again completes the self-interrupting circuit, at its contacts 7476, whereupon the magnet reoperates and then restores to advance the wipers an additional step. In this manner the magnet M7475 continues to operate and restore until the wipers of the switch 7470 are returned to the normal contact positions illustrated in the drawing. When this position is reached by the wipers, the off-normal contacts ON7478 are opened in order to terminate the self-interrupting operating circuit for the magnet M7475. Also, the off-normal contacts 7479' are opened to restore the transfer relay R7460.

As previously described, the particular channel relay unit 7900 is now connected by way of its individual cross-office selector switch 8300 to the cross-office unit X3400 (Fig. 8). Furthermore, the cross-office unit X3400 is connected to the proper outgoing line and has registered therein the "deferred" precedence indicator corresponding to the precedence of the particular multiple call message being handled by the multiple call equipment. The particular multiple call message that is to be transmitted over the outgoing line will be transmitted to the reperforator X3410 in the cross-office unit X3400 over circuits including the channel relay unit 7900 in the manner to be described hereinafter as the message is simultaneously transmitted by way of other channel relay units, such as 7900, to cross-office units, such as X3400, to which said other channel relay units are connected.

Finally, at the contacts 7512, the start relay R7510 interrupts the circuit including the conductor C6903PG extending to Fig. 69 thereby to restore the precedence test relays R6940 and R6950. Consequently, the ground potential at the contacts 6955 is disconnected from the circuit including conductor C6903COM1 extending to Fig. 69 in order now to restore the available channel relay R7560 in the cross-office selector switch relay control unit 7500 and also to restore the connect relay R7430 in the channel testing switch 7470. If the relay R6940 has already restored at this time, ground will be removed from the conductor C6903PRE.

At the present time, the common equipment, including the cross-office selector switch relay control unit 7500, the channel testing switch 7400, and the channel register 3900 that has been connected to the channel relay unit 7900 by the channel selector switch unit 7700, has been restored to normal and is rendered available for use by other channel relay units, such as 7900, under control of the channel selector switch 7700. It will be apparent from the foregoing description that the channel selector switch unit 7700 will find the different calling ones of the other channel relay units, such as 7900, one at a time and that such channel relay units will be controlled so that their associated cross-office selector switches, such as 8300, will connect to cross-office units, such as X3400, that have been previously connected to the proper outgoing lines over which the multiple call message must be transmitted to reach destination registered in the corresponding channel relay units, in the manner described previously.

In the foregoing description of the operation of the channel relay unit 7900 and the manner in which its cross-office selector switch 8300 is controlled to connect with the appropriate cross-office unit X3400, it was assumed that the cross-office unit X3400 was connected to the proper L1 outgoing line and that it had previously registered therein the "deferred" precedence indicator of the particular multiple call message. Accordingly, it will be appropriate at this time to describe the operations involved when there is no cross-office unit connected to the L1 outgoing line over which the multiple call message in the channel relay unit 7900 must be transmitted.

*Connecting the channel relay unit 7900 to a cross-office unit which is not connected to an outgoing line*

In the foregoing description of the operation of the channel relay unit 7900 and the cross-office selector switch 8300 under control of the cross-office selector switch relay control unit 7500, the channel testing unit 7400, and the channel register 3900, it was assumed that the cross-office unit X3400 was connected to the proper outgoing line and that the precedence indicator previously registered in the cross-office unit corresponded to the "deferred" precedence of the multiple call message. Consequently, the channel register 3900, the cross-office selector switch relay control unit 7500 and the channel testing unit 7400 operated in a particular manner to control the cross-office selector switch 8300, individually associated with the channel relay unit 7900, to select the particular cross-office unit X3400 which, on a previous message, was connected to the desired outgoing line and which had registered in it the "deferred" precedence of the present multiple call message.

If, at the time the test is made no cross-office unit is connected to the desired outgoing line, all of the channel marking relays R7410–1 to R7410–39, inclusive, will remain in their restored positions. Also, these relays will remain in their restored positions if, at the time the test is made, one or more of the cross-office units are connected to the desired outgoing line but they have precedence indicators registered therein which are different from the "deferred" precedence indicator of the present multiple call message. When this occurs, an idle cross-office unit, which has no previous message stored therein, will be selected from a pool of empty bin cross-office units for use in connection with the present multiple call message. The last-mentioned operation will also take place if the precedence of the multiple call message is any one of the three high precedence, such as emergency, flash or operational immediate.

In order to understand the operations involved in the selection of a cross-office unit from the pool of empty bin cross-office units, it will be assumed that the start relay R7910 in the channel relay unit 7900 has been operated and has caused the channel selector switch unit 7700 to connect with the calling channel relay unit 7900 in the manner explained. The channel selector switch unit 7700 will connect the cross-office selector switch relay control unit 7500 to the channel relay unit 7900 in the manner previously explained under control of the switching relay R7840. The latter relay, at its contacts 7845, will complete the previously traced circuit for operating the seizure relay R7520 in the control unit 7500 and at the contacts 7842', the switching relay R7840 applies ground potential to the conductor C3981Z2 extending to Fig. 39 in order to operate the start relay R3920 in the channel register 3900, whereupon the test relay R3930 and the connect relay R4070 in this unit will operate in the manner previously explained. Finally, at its contacts 7841', the switching relay R7840 applies ground potential by way of the wiper 7853' and the conductor C3981L1 extending to Fig. 40 in order to operate the L1 channel register relay R4065. The relay R4065 then operates the relay R3940.

As soon as the test relay R3940 in the channel register 3900 operates, it applies ground potential to the conductor C3983CSL extending to Fig. 75 in order to operate the start relay R7510 in the cross-office selector switch relay control unit 7500.

The foregoing operations have been described in detail hereinbefore and the operations occurring hereafter will be the same as previously explained if the cross-office unit X3400 is connected to the proper outgoing line and has registered therein the same precedence indicator as the multiple call message. However, if it is necessary to select an available cross-office unit from the pool of empty bin cross-office units the start relay R7510, upon operating, will initiate operations whereby the hunt empty bin relay R7660 will ultimately operate. Accordingly, at its contacts 7512, the start relay R7510 will apply ground potential to the conductor C6903PG extending to Fig. 69 in order to operate the precedence test relay R6940 and shortly thereafter, the precedence test relay R6950. During the time that the two above relays are in their operated positions, ground potential, at the contacts 6955, is extended by way of the contact 6944, conductor C6903COM1 extending to Fig. 76 in order to operate the available channel relay R7560 and as soon as the last-mentioned relay is operated, the operating ground potential is further extended by way of the contacts 7561 and the conductor C7401CM1 in order to operate the connect relay R7430 in the channel testing unit 7400. The ground potential applied to the conductor C6903COM1 in Fig. 76 also extended by way of the contacts 7667, conductor C7101COM extending to Fig. 71, contacts 7396 (assuming that the deferred precedence indicator is registered in the deferred detector 7100NM), conductor C6902NMD extending to Fig. 69, contacts 6956, conductor C3984NM1 extending to Fig. 40, contacts 4026 and the winding of the deferred relay R4050, to battery. Substantially, the same circuit will be completed for operating the routine relay R4045 or the priorty relay R4040 if the corresponding precedence is registered in the precedence detector 7100. The relay R4050 now closes all of its contacts and since the L1 channel register relay R4065 is in its operated position, it applies the ground potential at its contacts 4068 by way of its contacts 4053 to the conductor C4091NM1 extending to Fig. 8.

If the outgoing selector X4300 of the cross-office unit X3400 or any other outgoing selector of any other cross-office unit is not connected to the proper L1 outgoing line, all of the channel marking relays in the channel testing unit 7400 will remain in their normal positions. Also, if any of the outgoing selectors, such as X4300, has its wipers in engagement with the contacts terminating the proper L1 outgoing line but the associated precedence marking switch, such as X4210, has its wipers positioned to indicate some precedence indicator other than the registered precedence, the channel marking relays in the channel testing unit 7400 will also remain in their restored positions. Thus, after the inquiry ground test is made of all of the cross-office units and their individual outgoing selector switches, such as X4300, by applying the ground potential to the conductor C4091NM1 and no channel marking relay, such as R7410–1 to R7410–39 is operated in the channel testing unit 7400, then all of the contacts accessible to the wipers 7473 and 7474 of the channel testing switch 7470 will be grounded. Also, the channel testing relay R7450 will remain in its normal position and will prevent the completion of the previously traced operating circuit for the control relay R7535 in the cross-office selector switch relay control unit 7500. Since the last-mentioned relay remains in its restored position, a circuit will subsequently be completed by the restoration of the slow-to-release precedence test relay R6940 for operating the hunt empty bin relay R7660 in the cross-office selector switch relay control unit 7500.

When the relay R6940 subsequently restores to normal, the contacts 6944 are opened to remove the ground potential from the conductor C6903COM1 in order to restore the available channel relay R7560 in the cross-office selector switch relay control unit 7500 and the connect relay R7430 in the channel testing unit 7400. Also, the relays R4050, R4045 or R4040 will restore, depending upon the low precedence registered in the precedence detector 7100. At the contacts 6945, the relay R6940 now connects the ground potential at contacts 6955 by way of the conductor C6903PRE extending to Fig. 75, contacts 7536 and the right-hand winding of the hunt empty bin relay R7660, to battery. However, during the restoring period of the precedence test relay R6940 and before it closes its contacts 6945 to ground the conductor C6903PRE, the channel testing switch 7470 will remain in its normal position unless at least one of the channel marking relays R7410–1 etc., has been operated.

The above described operation of the hunt empty bin relay R7660 occurs whenever a routine, deferred or priority precedence is registered in the precedence detector 7100 and a cross-office unit, such as X3400, is either not connected to the proper outgoing line or, if connected to the proper outgoing line, does not have the precedence registered therein that corresponds to the precedence registered in the precedence detector 7100. The hunt empty bin relay R7660 will also operate in the event an emergency, flash or operational immediate precedence indicator is registered in the precedence detector 7100. In other words, the test to determine whether or not a cross-office unit, such as X3400, meets the foregoing qualifications is omitted. This operation is controlled by the precedence test relays R6940 and R6950 at the time ground potential is applied to the conductor C6903COM1 extending to Fig. 76. In Fig. 76 the ground potential on this conductor operates the relay R7560 and in multiple therewith the relay R7430 in the manner previously explained. Also, the ground potential on the conductor C6903COM1 is also extended by way of contacts 7667, conductor C7101COM extending to Fig. 71 and then to the conductor C7101–OUF either by way of the contacts 7352, 7142 or 7152 if the operational immediate, flash or emergency precedence is registered in the precedence detector 7100. The ground potential thus connected to the conductor C7101–OUF extending to Fig. 76, completes the operating circuit for the hunt empty bin relay R7660.

As soon as the hunt empty bin relay R7660 operates, it immediately locks itself in its operated position over a circuit including its left-hand winding, contacts 7663, 7525′ and 7513 to ground. Also, at the contacts 7662′, the relay R7660 removes ground potential from the conductor C6903PG extending to Fig. 69 in order now to release the precedence test relay R6950 and also the test relay R6940 if it has not, as yet, restored. As a further result of the operation of the relay R7660, at its contacts 7664, it interrupts the circuit for the normally operated slow-to-release relay R7670. At its contacts 7661 and 7662, the relay R7660 simultaneously completes separate energizing circuits for the right and left-hand windings of the differential relay R7675. Since the windings of the relay R7675 are wound in opposition to each other, this relay does not operate at this time. At the contacts 7666, the relay R7660 connects the conductor C6903COM1 by way of the contacts 7537 to the conductor C7681HEB extending to Fig. 8. The last-mentioned conductor is multiple connected to all of the cross-office units, such as the cross-office unit X3400 schematically illustrated in Fig. 8. The ground potential applied to this conductor will be further extended by way of the winding of the empty bin relay XR3990 through contacts (not shown) on a start relay in the cross-office unit X3400, to battery. In all of the cross-office units, such as X3400 that have their associated start relays in a restored position so that the circuit may be completed to battery, as noted above, the associated empty bin relays, such as XR3990, will now operate.

In the above description it was pointed out that the hunt empty bin relay R7660, at its contacts 7662′, removes ground potential from the conductor C6903PG extending to Fig. 69. At this time, the precedence test relay R6950 in the precedence sensing unit 6700 slowly restores to normal in order to prepare, at its contacts 6951, a point in the circuit for reoperating the precedence test relay R6940 and to interrupt, at its contacts 6955, a point in the previously traced circuit including the conductor C6903PRE for operating the hunt empty bin relay R7660. The relay R7660, however, is now locked in its operated position over the previously mentioned circuit including its left-hand winding and, consequently, it does not restore to normal at this time. However, the removal of the operating ground potential from the circuit including the right-hand winding of the relay R7660 also interrupts the circuit for the right-hand winding of the differential relay R7675. The interruption of the energizing circuit for the right-hand winding of relay R7675 cause the relay now to operate over the circuit including the left-hand winding thereof. At this time the operation of relay R7675 is not of particular importance since, at its contacts 7676, it merely prepares a point in the circuit for operating the intercept relay R7650 in the event it should become necessary to route the portion of the multiple call message that is being processed by the channel relay unit 7900 to an intercept cross-office unit, such as 8335.

When the slow-to-release relay R7670 restores to normal, incident to the interruption in its circuit at the contacts 7664 by the relay R7660, it completes, at its contacts 7671, the previously traced circuit including the conductor C6903PG extending to Fig. 75 in order to again operate the precedence test relay R6940. In the previously described manner, the precedence test relay R6940 again completes the circuit for operating the precedence test relay R6950 so that the latter relay, at its contacts 6955, again applies the ground potential to the conductor C6903COM1 extending to Fig. 76. Since the hunt empty bin relay R7650 is now in its operated position, the ground potential applied to the conductor C6903COM1 is further extended by way of the contacts 7666 and 7537 to the conductor C7681HEB extending to the cross-office unit X3400 (assumed to now be included in the pool of empty bin cross-office units) and to all other cross-office units in the pool of empty bin units. Also, the ground potential applied to the conductor C6903COM1 recompletes the circuit for operating the available channel relay R7560 and as soon as the last-mentioned relay operates, the ground potential is extended by way of the contacts 7561 and the conductor C7401CM1 extending to Fig. 74 in order again to operate the connect relay R7430 in the channel testing unit 7400. The last-mentioned relay, at its contacts 7431 to 7439, inclusive, connects the channel marking relays R7410–1 to R7410–39, inclusive, to the conductors C7402–1 extending to the cross-office unit X3400 (Fig. 8), and to the other corresponding cross-office units.

Referring now to Fig. 8, it will be seen that the ground potential applied to the conductor C7681HEB is extended by way of the winding of the empty bin relay XR3990, to battery through contacts (not shown) on a start relay in the cross-office unit X3400. If the start relay (not shown) is in its restored position, the empty bin relay XR3990 will now operate. The corresponding empty bin relay in each of the remaining cross-office units, such as X3400, included in the pool of empty bin cross-office units, will also operate at this time provided the associated start relay in each of the corresponding units is in its restored position. It should be understood that if any cross-office unit is either connected to an outgoing line, such as the line L1, or is being operated under control of its start relay, the empty bin relay in such cross-office units, cannot be operated.

For the purpose of this description, it will now be assumed that the cross-office unit X3400 schematically illustrated in Fig. 8 is available and that its storage bin is empty at the present time. Accordingly, the empty bin relay XR3990 will operate over the above described circuit and, at its contacts X3991, it applies ground potential by way of the contacts X3855 to the conductor C7402–1 extending to Fig. 74 in order now to operate the channel marking relay R7410–1 in the channel testing unit 7400. All other marking relays similar to the relay R7410–1 which are now connected to cross-office units in which the empty bin relay, such as XR3990, has operated, will also operate at this time. Thus, the available cross-office units, such as X3400, in the pool of empty bin cross-office units, will be indicated in the associated channel testing unit 7400 by the operated relays, such as R7410–1.

When the channel marking relay R7410–1 operates, it immediately locks itself by way of its contacts 7426 to the grounded conductor C7401SU–3. Also, at its contacts 7427, the relay R7410–1 completes the previously described operating circuit for the channel test relay R7450. Finally, at its contacts 7428, the relay R7410–1 removes the marking ground potential from the contact 1 accessible to both the wipers 7473 and 7474 of the channel testing switch 7470 in order to mark the cross-office unit X3400 as available for use in handling the multiple call message for the channel relay unit 7900. It should be noted, that the remaining channel marking relays, such as R7410–1, which have been operated to indicate corresponding available cross-office units also remove marking potentials from the corresponding bank contacts accessible to the wipers 7473 and 7474.

The channel testing relay R7450 upon operating completes, at its contacts 7456, the previously traced circuit including the grounded conductor C7401SU–2, the wiper 7473 in its normal position, contacts 7456, conductor C7401LC extending to Fig. 75, contacts 7551 and 7531, conductor C7401TMM extending to Fig. 74, contacts 7459' and the winding of the magnet M7475, to battery. At its contacts 7454, the channel testing relay R7450 completes a circuit including the conductor C7401SWR1 extending to Fig. 75, contacts 7522, conductor C7581GR1 extending to Fig. 78, contacts 7847, wiper 7859, conductor C7872GR extending to Fig. 83 and the winding of the relay R8310, to battery. The relay R8310 now operates and connects the cross-office selector switch 8300 to the channel relay unit 7900. Also, the channel test relay R7450, at its contacts 7457, connects the grounded conductor C7401SU–2 by way of the wiper 7474 in its normal position, contacts 7457, conductors C7401LD extending to Fig. 75 in order now to operate the timing relay R7555.

The magnet M7475 of the channel testing switch 7470 upon operating in the manner previously explained completes the previously traced circuit including the contacts 7477, wiper 7458 and conductor C7401T–INT, the winding of the interrupter relay R7530, contacts 7527, conductor C7581PPL extending to Fig. 78, contacts 7843, wiper 7856, conductor C7872PPL extending to Fig. 83, contacts 8319 and the winding of the magnet M8321, to battery. The details of the operations of the magnet M8321 in the cross-office selector switch 8300 and the magnet M7475 in the channel testing switch 7470 has been described in detail hereinbefore. It should be understood, however, that each time the magnet M7475 operates, it in turn operates the interrupter relay R7530 and in series with the magnet M8321 in the cross-office selector switch 8300 and that each time the interrupter relay R7530 operates, the magnet M7475 will restore to normal in order to restore the relay R7530 and the magnet M8321. In this manner the wipers of the channel testing switch 7470 are advanced step-by-step in a counter-clockwise direction as the wipers of the cross-office selector switch 8300 are advanced step-by-step in a clockwise direction.

In the above description, it has been assumed that the wipers of the channel testing switch 7470 are in the illustrated positions at the time the hunt empty bin relay R7660 operated. This condition occurs whenever the operational immediate, flash or emergency precedence is registered in the precedence detector 7100. In other words, the registration of any one of the above precedence indicators will control the multiple call equipment to select a cross-office unit, such as X3400, from a pool of empty bin units instead of first making an inquiring ground test in attempting to find a cross-office unit that has previously been connected with the proper outgoing line and has the proper precedence registered therein as previously explained. However, it will be recalled that the hunt empty bin relay R7660 is also operated in the event a low precedence, such as routine, deferred or priority is registered in the precedence detector 7100 and no cross-office unit, such as X3400, is found as the wipers of the channel testing switch 7470 and the cross-office selector switch 8300 are advanced over the associated contacts. In other words, the wipers will stop rotating as soon as the last operated channel marking relay, such as R7410–1, is restored to normal due to the fact that the channel testing relay R7450 is restored at that time. The wipers of the cross-office selector switch 8300 will also stop rotating at the same time. The operation of the hunt empty bin relay R7660 will control all of the cross-office units, such as X3400, that are now in the pool of empty bin cross-office units so that the corresponding channel testing relays, such as R7410–1, are operated. The operated ones of these relays will in turn reoperate the channel test relay R7450.

The operation of the relay R7450 again connects the magnet M7475, the interrupter relay R7530 and the magnet M8321, in the manner previously explained, so that the associated wipers will step the same number of steps in searching for one of the cross-office units in the pool. If an available cross-office unit is found the test relay R7550 operates to stop further stepping of the wipers of the channel testing switch 7470 and the wipers of the cross-office selector switch 8300, in the manner previously explained.

If it is assumed that only the channel marking relay R7410–1 is operated at this time and the wipers were in engagement with any one of the contacts 2 to 39 when the stepping action is restarted, the wipers 7471 to 7474 will be advanced to contacts 40 without finding an available cross-office unit. In this position, both the wipers 7473 and 7474 encounter grounded contacts 40. In this manner the stepping circuit for the magnet M7475 is retained and since contacts 40 to 50, inclusive, are grounded, the wipers will be advanced into engagement with the illustrated home contact position. In this position, the circuit for the magnet M7475, the relay R7530 and the magnet M8321 is again completed to advance the wipers into engagement with the contacts 1 where the available cross-office unit X3400 corresponding to the operated relay R7410–1 is found and the searching operation is terminated by the operation of the test relays R7550 and R7545 in series with the seizure relay XR3870 in the selected cross-office unit X3400. Also, the timing relay R7555 restores to normal and shunts down the channel marking relay R7410–1 which, in turn, restores the channel test relay R7450. The last-mentioned operation will be completed at this time even though the cross-office unit X3400 is not available at the time it is found by the stepping of the wipers of the channel testing switch 7470 and the cross-office selector switch 8300.

If it is now assumed that no cross-office unit is found in the pool of empty bin units, the restoration of the channel test relay R7450, at its contacts 7453, opens the circuit for the control relay R7535 and the latter relay, at its contacts 7536, prepares a circuit for operating the intercept relay R7650. In other words, when the slow-acting relay R6940 restores, after time delay of sufficient duration to permit the above described operations to be performed, ground potential is again applied to the conductor C6903PRE extending to Fig. 75. In Fig. 75, the ground potential, applied a second time to the conductor C6903PRE, is extended by way of the contacts 7536, 7661 and 7676 in order to operate the intercept relay R7650. The intercept relay R7650 now controls the channel testing switch 7470 and the cross-office selector switch 8300 to select an available intercept cross-office unit, such as 8335, provided at an intercept operator position so that the channel relay unit 7900 will be connected thereto. It should be understood however, that the intercept cross-office units are substantially the same as the cross-office unit X3400 and that the message processed through the channel relay unit 7900 will be perforated on a tape in the intercept cross-office unit, such as

147

8335, in substantially the same manner as it is perforated on a tape by the cross-office unit X3400.

As soon as the relay R7650 operates, it locks itself by way of the contacts 7653, 7525' and 7513, to ground. As a further result of the operation of relay R7650, at its contacts 7652, it completes a circuit including the conductor C7401G4 extending to Fig. 74 in order to reoperate the channel test relay R7450. At its contacts 7659, the relay R7650 completes a circuit including contacts 7551 and 7531, conductor C7401TMM extending to Fig. 74 and contacts 7459' for operating the magnet M7475. At contacts 7655, relay R7650 connects the test relay R7550 to a circuit including conductor C7401B1 extending to Fig. 74, contacts 45 to 50, inclusive, accessible to the wiper 7471. At the contacts 7657, the relay R7650 opens a point in the circuit for relay R7540 to prevent its opeartion at this time. At its contacts 7658, relay R7650 disconnects ground potential from the circuit including the conductor C6903PG extending to Fig. 69 in order to prevent reoperation of the precedence test relays R6940 and R6950. At its contacts 7659', relay R7650 connects ground potential by way of the contacts 7522, conductor C7581GR1 extending to Fig. 78, contacts 7847, wiper 7859, and conductor C7822GR extending to Fig. 83 in order to retain opearted the relay R8310. At the contacts 7654, the relay R7650 prepares a point in the circuit for subsequently operating the counting relay R7630. At its contacts 7651, relay R7650 applies ground potential to the conductor C7401SU-1 extending to Fig. 74 in order to lock the relay R7460 in its operated position. Finally, at its contacts 7653', relay R7650 prepares a point in the circuit for operating open line relay R7970 in the channel relay unit 7900 when an intercept cross-office unit, such as 8335, is found.

Referring to the channel testing unit 7400 it will be seen that the magnet M7475, at its contacts 7477 connects ground potential over the previously traced circuit including the relay R7530 and the magnet M8321 whereby they interact to search for an available intercept cross-office unit, such as 8335. Thus the wipers of the channel testing switch 7470 and the wipers of the cross-office selector switch 8300 advance step-by-step until the contacts 45 are reached. When this contact position is reached by the wiper 7471, ground potential on the conductor C7401B1 through the right-hand winding of the test relay R7550 is connected by way of the wiper 7471, contacts 7451, conductor C7401BTL1 extending to Fig. 75, contacts 7528, conductor C7581BTL extending to Fig. 78, contacts 7841, wiper 7854, conductor C7871BTL extending to Fig. 79, conductor C7992BTL extending to Fig. 83, contacts 8313, wiper 8327 in engagement with contact 45 and the winding of the seizure relay R8355 in the intercept cross-office unit 8335. The test relay R7550 now operates and connects the relay R7545 to the above circuit in order to operate the seizure relay R8355.

If the intercept cross-office unit 8335 is busy, the above circuit for operating the relay R7550 will not be completed. Therefore, the channel testing switch 7470 and the cross-office selector switch 8300 will continue to operate until an idle intercept cross-office unit, such as 8335, is found on the contact positions 45 to 50.

If all of the intercept cross-office units, such as 8335, are busy the wipers of the channel testing switch 7470 and the wipers of the cross-office selector switch 8300 will advance into the illustrated home contact positions. When this occurs, the off-normal contacts ON7479 will close to apply ground potential by way of the contacts 7461, conductor C7401-INT2 extending to Fig. 76 and contacts 7654 and 7641 in order to operate the counting relay R7630.

The channel testing switch 7470 and the cross-office selector switch 3800 continue to operate and restore, in the manner described above, in an attempt to find, during a second cycle of rotation, an idle intercept cross-

148 office unit, such as 8335. It is noted that when the off-normal contacts ON7479 are opened, in response to the first step of the wipers 7471 to 7474 in the second cycle, the initial operating circuit for the counting relay R7630 is opened, but the relay now locks itself operated by way of a circuit including the contacts 7631, relay R7640 (which also operates) and contacts 7525' and 7513, to ground. If an idle intercept cross-office unit, such as 8335, is not found during the second cycle, the off-normal contacts ON7479 will again close to complete the circuit for operating the alarm relay R7645. The latter relay locks itself by way of contacts 7647, 7653, 7525' and 7513, to ground. Also, at its contacts 7646 a circuit is completed to illuminate the alarm lamp L7648 to indicate the fact that the channel testing switch 7470 has not been able to find a cross-office unit, such as X3400, or an intercept cross-office unit, such as 8335. However, the channel testing switch 7470 and the cross-office selector switch 8300 will continue to search for an idle intercept cross-office unit. If the intercept cross-office unit 8335 is seized the test relays R7550 and R7545 will operate in series with the seizure relay R8355 as explained above. Subsequent operations are the same as described hereinafter in connection with the seizure of a cross-office unit, such as X3400, from the pool of empty bin units.

In order to explain the selection of a cross-office unit from the pool of empty bin units, it will now be assumed that the channel marking relay R7410–1 corresponding to the cross-office unit X3400 is operated when the wipers of the channel testing switch 7470 engage the contacts 1 in the associated banks and that the intercept relay R7650 has not been operated.

Therefore, when the wiper 7473 engages its ungrounded first bank contact, the stepping circuit for the magnet M7475 is interrupted. Also, when the wiper 7474 engages its ungrounded first contact, the previously traced circuit for the timing relay R7555 is interrupted. The latter relay slowly restores to normal and, at its contacts 7556, completes the circuit including the grounded conductor C7401GR, contacts 7553, 7556 and 7657 for operating the timing relay R7540. The latter relay upon operating completes, at its contacts 7541, a circuit including ground at the contacts 7558, conductor C7401LB extending to Fig. 74, contacts 7452, wiper 7472 in engagement with the first contact for short circuiting the channel marking relay R7410–1 which now restores to normal.

Figure 79:
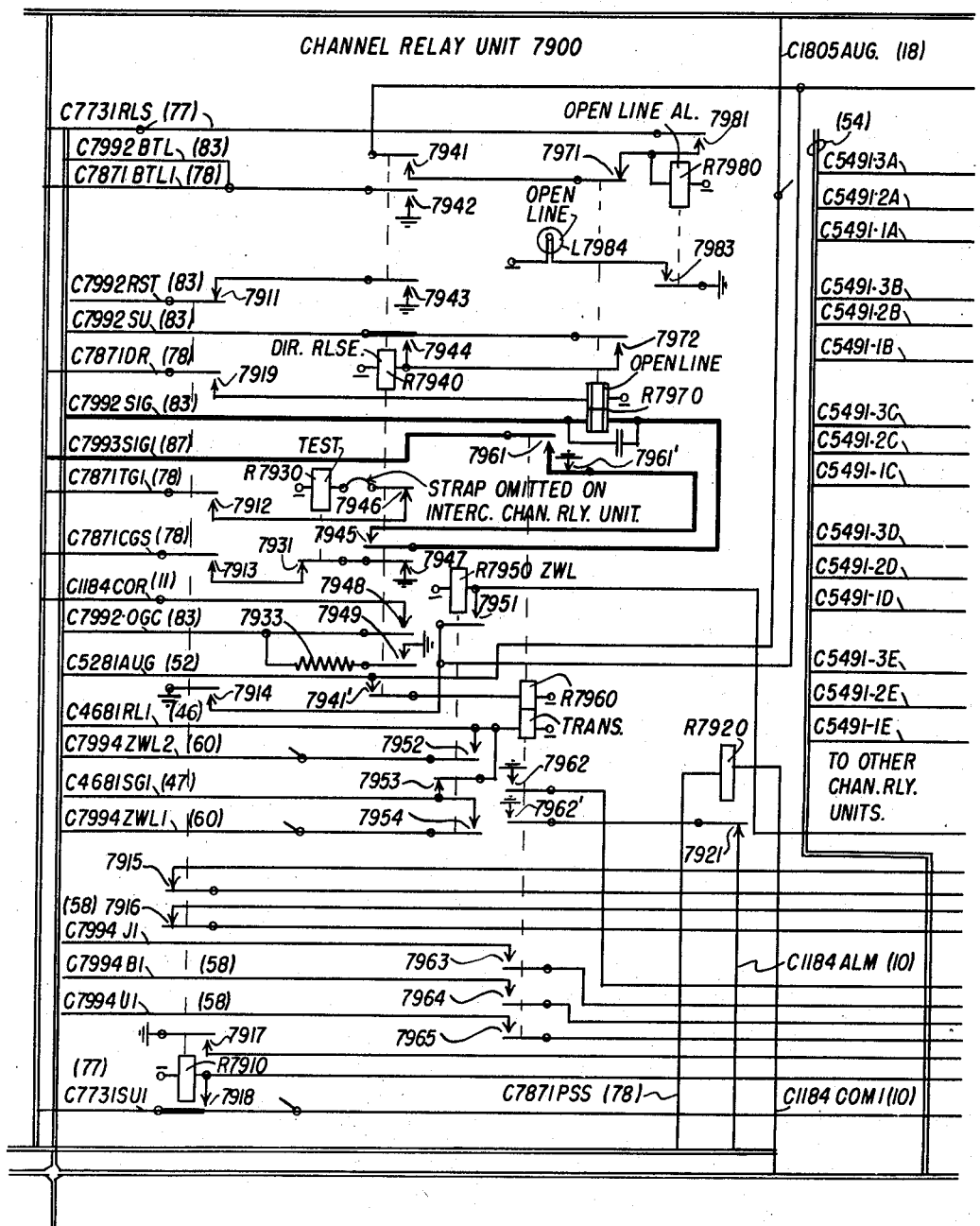
Figure 80:
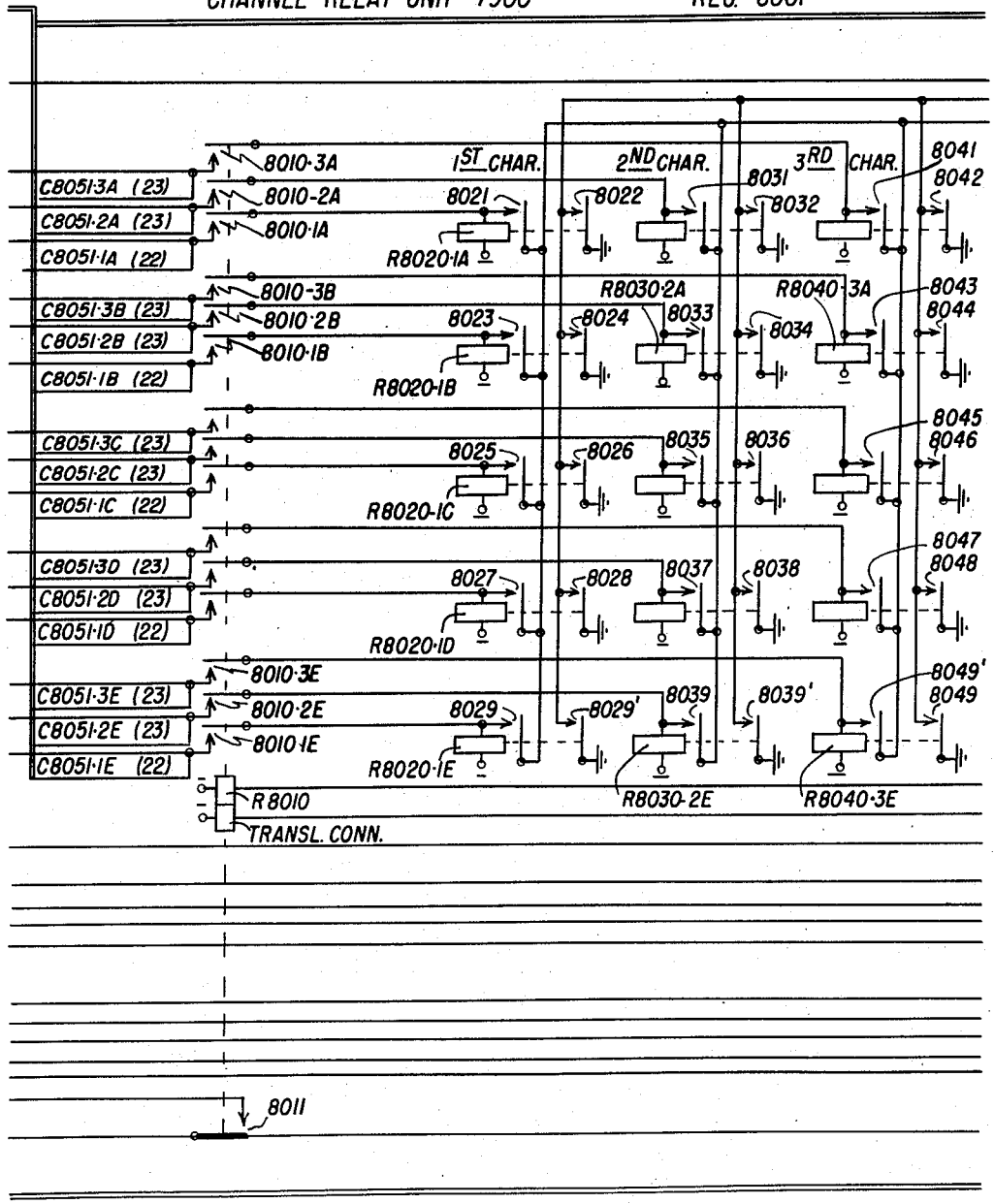

As a further result of the restoration of the timing relay R7555, at its contacts 7557, it connects the right-hand winding of the cross-office test relay R7550 to a circuit including the contacts 7656, 7557 and 7528, conductor C7581BTL extending to Fig. 78, contacts 7841, wiper 7854, conductor C7871BTL1 extending to Fig. 79, conductor C7992BT extending to Fig. 83, contacts 8313, wiper 8327, conductor C8330BTL extending to Fig. 8 and the winding of the seizure relay XR3870 in the cross-office unit X3400, to battery. The relay R7550 in the cross-office selector switch relay control unit 7500 operates, as previously explained, to include the relay R7545 which operates in the series circuit with the seizure relay XR3870.

As a further result of the operation of the relay R7545, at its contacts 7546, it completes a circuit including the contacts 7663' and 7654', conductor C7002SOG extending to Fig. 70 and the winding of the precedence transmission relay R7040, to battery. The relay R7040 upon operating completes, at its contacts 7041, a circuit including ground at the contacts 6913, wiper 7013 of the precedence indicator switch 7010 in engagement with its home contact position, contacts 7031 and 7041 and the winding of the magnet M7014, to battery. The magnet M7014 operates over this circuit and, at its contacts 7016, completes a circuit for operating the magnet XM4217 in the cross-office unit X3400 in series with the stepping relay R7030. In other words, inasmuch as the cross-office unit X3400 has been selected from the pool of empty bin units and no precedence is registered in the precedence marking switch X4210 therein, it is now necessary to transfer the precedence of the multiple call message being considered to the precedence marking switch X4210 so that the precedence indicator will be registered in the cross-office unit X3400. The precedence indicator switch 7010 and the precedence marking switch X4210 are now conditioned to simultaneously advance their respective wipers, the former switch to find the precedence indicator registered in the precedence detector 7100 (Figs. 71 to 73, inclusive) and the latter to register the indicated precedence in the precedence marking switch X4200 in the selected cross-office unit X3400.

When the magnet M7014 operates, it completes a circuit from ground, contacts 7016, winding of the step relay R7030, conductor C7002PIR extending to Fig. 75, contacts 7525, conductor C7581PSS extending to Fig. 78, contacts 7844, wiper 7857, conductor C7872PSS extending to Fig. 83, contacts 8314, wiper 8328, conductor C8330PSS extending to Fig. 8, contacts 804 in the signal control unit 801, and the winding of the magnet XM4217, to battery. The magnet XM4217 operates in series with the stepping relay R7030 over this circuit and, at its contacts 7031, the step relay R7030 interrupts the circuit for the magnet M7014. The magnet M7014 now restores to normal and advances its wipers 7011 and 7013, inclusive, one step in a counter-clockwise direction into engagement with the contact 1 in the associated contact banks. As soon as the above-mentioned wipers are advanced from the home contact positions, the circuit for the test relay R7020, which has been held in its operated position over a circuit including the wiper 7012 and ground at the contacts 6913, is transferred to the contact 1 in the associated contact bank. Also, the initial operating circuit for the magnet M7014 is transferred from the circuit including the wipers 7013 and ground at contacts 6913 to the contact 1 in the associated contact bank. As a further result of the restoration of the magnet M7014, at its contacts 7016, it interrupts the circuit for the stepping relay R7030 and the magnet XM4217 of the precedence marking switch X4210 in the cross-office unit X4300. The magnet XM4217 upon restoring advances its wiper X4215 one step in a clockwise direction from a normal home contact position (not shown) into engagement with the contact 1 in the associated contact bank in order to register the "deferred" precedence.

At this time it may be well to recall the fact that the precedence detector 7100 (Figs. 71 to 73, inclusive) may register any one of six different precedence indicators and that the particular precedence indicator registered therein at this time, marks the bank contacts accessible to the wipers 7012 and 7013 by removing ground potential from the bank contact corresponding to the registered precedence indicator. In the present example, the "deferred" precedence indicator is registered in the deferred detector 7100NM (Fig. 73) and, consequently, the relay R7395 therein is operated and, at its contacts 7399', removes ground potential from the conductor C7001NMP extending to Fig. 70 thereby to remove the marking ground potential from the contact 1 accessible to the wipers 7012 and 7013. The remaining conductors C7001RRP, PPP, E and F, respectively, connected to the contacts 2 to 6, inclusive, accessible to the wiper 7012 and 7013 are grounded at this time by the corresponding detectors in the precedence detector 7100. In view of the foregoing, it will be understood that when the wipers 7011 to 7013, inclusive, of the precedence indicator switch 7010 engage the contacts 1 in the associated contact banks, further stepping of the wipers, under control of the magnet M7014, will be terminated.

It should be understood that if the first contact is grounded indicating that a precedence indicator other than the "deferred" precedence is registered in the precedence detector 7100, the ground potential encountered in the contact 1 of the wiper 7012 will retain the test relay R7020 in its operated position and the ground potential encountered by the wiper 7013 will complete a circuit including the contacts 7031 and 7041 for reoperating the magnet M7014. The magnet upon operating, at its contacts 7016, will again complete the previously traced circuit including the stepping relay R7030 and the magnet XM4217 so that the stepping relay R7030 will operate and cause the magnet M7014 to restore to normal and step the wipers an additional step. Also, the magnet M7014 upon restoring will again interrupt, at its contacts 7016, the circuit for the step relay R7030 and the magnet XM7017. The last-mentioned magnet upon restoring will again advance its wiper X4215 an additional step in a clockwise direction into engagement with the contact 2 in order to register the "routine" indicator in the cross-office unit X3400. In this manner the wiper of the precedence indicator switch 7010 and the wiper of the precedence marking switch X4210 are advanced step-by-step until the precedence indicator corresponding to the one registered in the precedence detector 7100 is transferred to and registered in the precedence marking switch X4210.

In the present multiple call message the "deferred" precedence indicator is registered in the deferred detector 7100NM and as a result thereof, the first contact accessible to the wipers 7012 and 7013 of the precedence indicator switch 7010 is not grounded. Accordingly, the precedence indicator switch 7010 advances its wiper one step from the home contact position into engagement with the contact 1 and the precedence marking switch X4210 in the cross-office unit X3400, also advances its wiper one step into engagement with the contact illustrated in the drawing to register the "deferred" precedence indicator.

As a further result of the operation of the precedence transmission relay R7040 as previously described, at its contacts 7043, it connects the grounded conductor C7002GD to the conductor C3984STEP extending to Fig. 40 and finally, at its contacts 7042, it interconnects the conductor C7002SOG1 with the conductor C7002SOG2 in order to complete a circuit for operating the magnet M7613 in the channel register finder 7610 (Fig. 76).

Before describing the circuits controlled by the contacts 7042 and 7043, by the precedence transmission relay R7040, it should be understood that the channel selector switch 4001 (Fig. 40) has been illustrated to indicate a rotary switch having 100 bank contacts and each of its bank contacts is connected to contacts controlled by different ones of the 100 relays, such as R4065, in the channel register relays 4000. Thus, the channel selecting switch 4001 is provided with facilities for finding any one of the 100 channel register relays that has been operated under control of the channel selector switch unit 7700 associated with a particular channel relay unit 7900. Whenever the channel selecting switch unit 7700 connects with a channel relay unit, such as 7900, the particular contact in the bank accessible to the wiper 7853' is marked so that the corresponding channel register relay (Fig. 40) is operated to identify the outgoing line corresponding to the selected channel relay unit. When the channel selecting switch 4001 is operated to find the contact in its bank that has been marked by an operated channel register relay, such as relay R4065, it will also control the particular outgoing selector, such as the outgoing selector X4300 associated with the cross-office unit, such as X3400, that has been selected. The outgoing selector X4300 has access to the 100 outgoing lines corresponding respectively to the 100 relays of the channel register relay 4000. Consequently, the channel selecting switch 4001 and the outgoing selector X4300 are stepped substantially in synchronism in order to select the outgoing line corresponding to the operated relay in the channel register relay 4000.

In the event that it is necessary to have additional groups of 100 outgoing lines, then it will also be necessary to provide additional channel selector switches, such as 4001 associated with corresponding channel registers, such as 3900. The additional channel registers will be provided with channel register relays, such as 4000, corresponding respectively to each of the additional outgoing lines. Accordingly, if there is more than one channel register switch, such as 4001, a corresponding number of additional outgoing selectors, such as X4300, is provided in each of the cross-office units, such as X3400. Also, each cross-office unit thus provided with additional outgoing selectors will also be provided with a selector switch, such as X4050, for selecting the different outgoing selectors associated with the cross-office unit. The selector switches, such as X4050, will be controlled by the channel register finder 7610 provided in the cross-office selector switch relay control unit 7500.

For the purpose of determining the particular channel selecting switch 4001 that is to be operated to find the group of channel register relays including the particular relay identifying a particular outgoing line marked by the channel selector switch unit 7700, the channel register finder 7610 is provided with a chain circuit through each of the channel selecting switches. Thus, ground potential at the wiper 7612 is normally connected to retain the transfer relay R7625 in its operated position and the conductor C3983HE1 extending to Fig. 40 is connected to contacts corresponding to the contacts 4027 on each channel group relay, such as R4020, individual to the different channel selecting switches. However, when one of the channel register relays, such as R4065 in the group of channel register relays 4000 is operated in series with the series relay R4030, the latter relay, at its contacts 4031, operates the channel group relay R4020 to disconnect the conductor C3983HE1 from the conductor C3983SA1. Thus, if there are two channel selecting switches similar to the switch 4001 one or the other associated channel group relay, such as R4020, will be operated depending upon the group of channel register relays including the operated relay, such as R4065.

In view of the foregoing, it will be appreciated that when the precedence transmission relay R7040 closes its contacts 7042 in the manner previously explained, the magnet M7613 of the channel register finder 7610 will be operated over a circuit which may be traced from battery by way of the winding of the magnet M7613, conductor C7002SOG2, contacts 7042, conductor C7002SOG1, contacts 7665, the home contact position engaged by the wiper 7612, to ground. The magnet M7613 now operates and, at its contacts 7615, completes a circuit including the winding of the interrupter relay R7620, contacts 7627 and 7521, conductor C7581–OSS extending to Fig. 78, contacts 7846, wiper 7858, conductor C7872–OSS extending to Fig. 83, contacts 8315, wiper 8329, conductor C8330–OSS extending to Fig. 8, contacts X4022 and the winding of the magnet XM4053 of the selector switch X4050, to battery. The magnet XM4053 operates in series with the interrupter relay R7620 thereby to condition the selector switch X4050 to advance its wiper one step in a clockwise direction from the home contact position into engagement with contact 1 terminating the conductor XC4002 extending to the relay XR4310 individual to the outgoing selector X4300. The interrupter relay R7620 upon operating interrupts, at its contacts 7621, the initial operating circuit for the magnet M7613. As soon as the magnet M7613 restores, it advances its wipers 7611 and 7612 one step in a counter-clockwise direction from the home contact position into engagement with the contacts 1. As a further result of the restoration of the magnet M7613, at its contacts 7615, it interrupts the series circuit for the relay R7620 and the magnet XM4053. Consequently, the magnet XM4053 restores to normal and advances its wiper into engagement with the contact terminatnig the conductor XC4002 in order to prepare a circuit for operating the connect relay XR4310. Also, the relay R7620 upon restoring again prepares, at its contacts 7621, the circuit for reoperating the magnet M7613. However, reoperation of the magnet M7613 depends upon whether or not its wiper 7612 has now been connected to the channel selecting switch 4001 that is associated with the channel register relay 4000, including the operated relay R4065, indicative of the L1 outgoing line. Thus, the wiper 7612 now applies ground potential to the conductor C3983SA1 extending to Fig. 40 to determine wether or not the channel selecting switch 4001 has been conditioned for operation under control of the channel group relay R4020. If the relay R4020 is in its restored position, the ground potential applied to the above noted conductor is returned by way of the contacts 4027, conductor C3983HE1 extending to Fig. 76, to retain the transfer relay R7625 in its operated position and to again complete the previously traced circuit for operating the magnet M7613. In other words, the channel register finder 7610 will be controlled to advance its wipers an additional step to select the second channel selecting switch similar to 4001 and it will control the selecting switch X4050 associated with the cross-office unit X3400 to advance its wiper an additional step to select the connect relay associated with the second outgoing selector, such as X4300, having access to the second group of 100 outgoing lines.

It will be assumed that the first channel selecting switch 4001 has its channel group relay R4020 operated and, consequently, the contacts 4027 are opened to prevent the above described reoperation of the magnet M7613 and the corresponding reoperation of the magnet XM4053 in the selector switch X4050 of the cross-office unit X3400. In addition to the foregoing, the holding circuit for the transfer relay R7625 is interrupted, whereupon, the latter relay slowly restores to normal to disconnect, at its contacts 7627, the previously described circuit for the interrupter relay R7620 and to connect, at its contacts 7626, the conductor C3983SPL extending to Fig. 40 to the previously traced circuit including the conductor C7881–OSS extending through various units of equipment and finally to the cross-office unit X3400 (Fig. 8) where it appears as conductor C8330–OSS.

*Controlling the outgoing selector X4300 in the cross-office unit X3400*

It will be recalled that the magnet M4080 for the channel selecting switch 4001 (Fig. 40) operated over a circuit which may be traced from battery, magnet M4080, contacts 4011, 4016 and 4023, conductor C3984STEP extending to Fig. 70, contacts 7043, conductor C7002GD extending to Fig. 76, contacts 7661', to ground on the operated hunt empty bin relay R7660. Therefore, when the magnet M4080 operates tt completes, at its contacts 4082, a circuit including the step relay R4015, conductor C3983SPL extending to Fig. 75, contacts 7626 of the now restored transfer relay R7625, contacts 7521, conductor C7581—OSS extending to Fig. 78, contacts 7846, wiper 7858, conductor C7872–OSS extending to Fig. 83, contacts 8315, wiper 8329, conductor C8330–OSS extending to Fig. 8, contacts X4023 of the now restored transfer relay XR4020, conductor XC4002–OSS, contacts X4311' of the now operated relay XR4310 and the winding of the magnet XM4320 of the outgoing selector X4300, to battery. In this circuit both the step relay R4015 associated with the channel selecting switch 4001 and the magnet XM4320 for the outgoing selector X4300 operate in series. It was pointed out that the last-mentioned circuit included the contacts X4023 on the restored transfer relay XR4020 and contacts X4311' on the operated relay XR4310. These relays are controlled incident to the selection of the outgoing selector X4300 by the selector switch X4050 both associated with the cross-office unit X3400 in the manner described in detail in the previously noted Stiles application. Accordingly, when this operation is completed, the transfer relay X4020 restores to normal to transfer the circuit including the conductor C8330–OSS from the magnet XM4053 to the circuit including the magnet XM4320. Furthermore, at the time the transfer relay X4020 restored to normal, it also completed a circuit (not shown) for operating the above-mentioned connect relay XR4310.

Returning again to the previously described series circuit for operating the magnet XM4320 and the relay R4015 associated with the channel selector switch 4001, it will be understood that the magnet XM4320 upon operating, conditions the outgoing selector X4300 to advance the wipers X4321, X4328, X4329 and X4329', as well as other wipers (not shown) in a clockwise direction from the home contact position into engagement with the first set of bank contacts. The first set of bank contacts schematically illustrated by the contact 1 accessible to the wiper X4321, terminates the outgoing line L1.

As soon as the step relay R4015 operates over the above described series circuit it interrupts, at its contacts 4016, the initial operating circuit for the magnet M4080. This magnet now restores to normal and advances its wiper 4081 one step in a counter-clockwise direction from the home contact position into engagement with the contact 1. As a further result of the restoration of the magnet M4080, at its contacts 4082, it interrupts the above described circuit for the step relay R4015 and the magnet XM4320. The magnet XM4320 now restores to normal and advances its wipers from the home contact position one step in a clockwise direction into engagement with the contacts 1 thereby selecting the outgoing line L1. Also, when the step relay R4015 restores to normal, at its contacts 4016, it recompletes the operating circuit for the magnet M4080.

The recompletion of the operating circuit of the magnet M4080, however, is dependent upon whether or not the test relay R4010 has been operated over a circuit including the wiper 4081 and the engaged first contact in the bank of the channel selecting switch 4001. In the present case the relay R4065 is in its operated position and, consequently, the ground potential, at the contacts 4068, completes the operating circuit for the test relay R4010 as soon as the bank contact 1 is selected by the wiper 4081. The latter relay upon operating, at its contacts 4011, interrupts a point in the operating circuit for the magnet M4080 so that the wiper 4081 of the channel selecting switch 4001 remains in engagement with contact 1. Furthermore, the step relay R4015 and the magnet XM4320 will not be operated in order to leave the wipers of the outgoing selector X4300 in engagement with the contacts 1 terminating the L1 outgoing line. It should be understood, however, that if the test relay R4010 is not operated, the magnet M4080, the step relay R4015 and the magnet XM4320 will interact in the manner described above until the test relay R4010 is operated under control of one of the operated channel register relays.

As a further result of the operation of the test relay R4010, at its contacts 4012, it connects the grounded conductor C3984STEP by way of the contacts 4023, 4016 and 4012, conductor C3984PIC extending to Fig. 70 and then by way of the contacts 7021, conductor C7002END extending to Fig. 75, contacts 7526, conductor C7581DR extending to Fig. 78, contacts 7842, wiper 7855, conductor C7871DR extending to Fig. 79, contacts 7919 and the upper winding of the open line relay R7970 in the particular channel relay unit 7900, to battery. The open line relay R7970 now operates in the manner previously described to complete, at its contacts 7972, the operating circuit for the director release relay R7940.

The director release relay R7940 operates and locks itself to the conductor C7992SU in the previously described manner and performs various other controls described previously under the heading "Operation of the channel register 3900." In other words, the channel relay unit 7900 is now connected through its cross-office selector switch 8300 to the cross-office unit X3400 which was selected from the pool of empty bin cross-office units, then controlled to register the precedence of the received multiple call message and then positioned into engagement with the L1 outgoing line over which the multiple call must be transmitted to reach the destination registered in the channel relay unit 7900.

Furthermore, the director release relay R7940, at its contacts 7945, completes the previously traced circuit whereby the lower winding of the open line relay R7970 is connected to the signalling circuit including the conductor C7992SIG and at its contacts 7949 it completes the circuit including the conductor C7992–OGC in order to operate the relay XR3880 in the cross-office unit X3400. The latter relay, at its contacts X3881, operates the reperforator relay XR3800 and the relay XR3800, at its contacts X3802, connects the signalling circuit through the above noted relay R7970 to the magnet XM3411 in the cros-office reperforator X3410.

The operation of the director release relay R7940 also initiates the release of the common equipment that has been utilized in connecting the channel relay unit 7900 to the cross-office unit X3400. The release of this common equipment is substantially the same as has been previously described except that the relays and apparatus utilized only when it is necessary to select a cross-office unit from the pool of empty bin cross-office units must also be restored to normal. With this thought in mind, it will be recalled that the director release relay, at its contacts 7946, interrupts the circuit of the test relay R7865 in the channel selector switch unit 7700 and that the latter relay restores the switching relay R7840.

Accordingly, at the contacts 7845, the relay R7840 removes ground potential from the conductor C7581GDS1 in order to restore the seizure relay R7520; at the contacts 7841', ground potential is removed from the conductor C3981L1 extending to Fig. 40; and at the contacts 7842' ground potential is removed from the conductor C3981Z2 extending to Fig. 39 in order to restore the start relay R3920, the test relay R3930, the series relay R4030 and the relay R4065 which have been locked to the conductor C3981Z2. As a result of the restoration of relay R4065, the circuit for the disconnect relay R3940 is interrupted at contacts 4067, and as a result of the restoration of the series relay R4030, the circuit for the upper winding of the channel group relay R4020 is interrupted at contacts 4031. The disconnect relay R3940, upon restoring interrupts, at its contacts 3942, the previously traced circuit for the start relay R7510 in the cross-office selector switch relay control unit 7500. The relay R7510 now restores to normal and initiates the restoration of the channel register finder 7610, the channel selector switch 4001, the channel testing switch 7470 and the precedence indicator switch 7010.

The circuit for controlling the restoration of the channel register finder 7610 is completed as soon as the start relay R7510 restores and closes its contacts 7511. When this occurs, the magnet M7613 is operated over a circuit including battery, winding of the magnet M7613, contacts 7511, the multiply connected contacts accessible to the wiper 7611 and contacts 7614, to ground. The magnet M7613 operates when this circuit is completed and interrupts its own operating circuit at its contacts 7614. The magnet now restores and advances its wipers 7611 and 7612 one step in a counter-clockwise direction and the contacts 7614 are again closed to repeat the cycle of operation. In this manner the magnet M7613 is operated and restored to advance its wipers 7611 and 7612 step-by-step until they return to the home contact positions. Also, the wiper 7612, upon engaging its home contact position, again completes the circuit for operating the transfer relay R7625.

The start relay R7510 upon restoring also completes a self-interrupting circuit, including its contacts 7514, for restoring the wiper 4081 of the channel selector switch 4001 to its home contact position. In this connection it should be noted that the off-normal contacts RON4084 and RON4085 are closed whenever the wiper 4081 is not in engagement with the illustrated homing contact position. Consequently, the channel group relay R4020 is retained in its operated position over the circuit including its lower winding until the channel selecting switch 4001 is restored to normal. Accordingly, when the contacts 7514 are closed by the restoration of the start relay R7510 a circuit is completed from battery by way of the winding of the magnet M4080, contacts 4022, conductor C3983CS1 extending to Fig. 75, contacts 7514, conductor C3983CS extending to Fig. 39, contacts 4021, off-normal contacts RON4085, and ground at contacts 4083. The magnet M4080 operates over this circuit and interrupts its own operating circuit at its contacts 4083 and accordingly restores to normal to advance its wipers 4081 one step in a counter-clockwise direction. Upon restoring the magnet M4080 again completes its operating circuit by way of its own contact 4083. The above cycle of operation is repeated until the wiper 4081 has been advanced step-by-step over the various contacts and has returned to the normal home contact position. When this position is reached, the off-normal contacts RON4085 are opened to terminate further operation of the magnet M4080 and the off-normal contacts RON4084 are opened in order to restore the channel group relay R4020 to normal.

The start relay R7510, at its contacts 7518, also completes the self-interrupting circuit for the magnet M7475 whereby the wipers of the channel testing switch 7470 are automatically advanced step-by-step until the wipers again return to the illustrated home contact positions. The detailed operation of this circuit has been described previously and will not be repeated at this time.

Finally, the start relay R7510 controls the restoration of the precedence indicator switch 7010 by interrupting, at its contacts 7513, the locking circuit for the hunt empty bin relay R7660. When this occurs the relay R7660 restores to normal and, at its contacts 7663', removes ground potential from the conductor C7002SOG extending to Fig. 70 thereby to restore the precedence transfer relay R7040. This relay upon restoring completes, at its contacts 7044, a self-interrupting circuit for the magnet M7014. This circuit may be traced from battery, winding of the magnet M7014, contacts 7044, wiper 7011 and the engaged contact in the associated bank which is connected to ground at contacts 7015. As long as the wiper 7011 is not in engagement with its illustrated home contact position, the magnet M7014 will operate and restor in the manner previously described until the wipers of the precedence indicator switch are returned to the illustrated home contact position. When this occurs the self-interrupting circuit for the magnet M7014 is interrupted.

All of the common apparatus which was utilized in connecting the channel relay unit 7900 to the cross-office unit X3400, in registering the proper precedence in the connected cross-office unit and in connecting the cross-office unit to the L1 outgoing line has now been restored to normal and has left the channel relay unit 7900 connected to the cross-office unit X3400 through the wipers of the cross-office selector switch 8300. Consequently, the channel relay unit 7900 and the cross-office unit X3400 are now in the same operated condition that has been described previously in connection with the interconnection of the channel relay unit 7900 with a cross-office unit, such as X3400, that has been connected to the proper L1 outgoing line and has been set to register the same "deferred" precedence as the multiple call message being processed.

The channel selector switch unit 7700 has been released from the channel relay unit 7900 and may now be reoperated, in the manner previously described, to pick-up one after another the other channel relay units, such as 7900, that require the use of the common equipment described hereinbefore to select an appropriate cross-office unit, such as X3400, which has been connected to the proper outgoing line and has the proper precedence registered therein or to select a cross-office unit, such as X3400, from the pool of empty bin units, registered therein the proper precedence and connect the same to the outgoing line over which the multiple call message must be transmitted to reach the destination registered in the corresponding channel relay unit.

*Further operation of the common equipment to connect a channel relay unit (7900) with a cross-office unit (X3400)*

In the previous description of the operation of the channel register 3900, the cross-office selector switch relay control unit 7500, the channel testing unit 7400 and the precedence detector 7100, at the time it is associated with a channel relay unit, such as 7900, through the channel selector switch unit 7700, two conditions have been assumed. It was first assumed that the cross-office unit X3400 had been previously connected to the particular L1 outgoing line required by the channel relay unit 7900 to transmit the multiple call message to the determined destination and that the "deferred" precedence, corresponding to the multiple call message being processed, had been registered in the cross-office unit X3400. Under this condition, the multiple call message will be transmitted to and stored in the selected cross-office unit X3400 on a perforated tape with one or more other "deferred" precedence messages of either the single message type or the multiple call message type for subsequent transmission over the L1 outgoing line. In the second assumed condition, it was pointed out in the previous description of operation that if the cross-office units, such as X3400, associated with the L1 outgoing line, are marked busy or cannot immediately receive and store the multiple call message, the above mentioned common equipment in conjunction with the channel relay unit 7900 function to select an idle cross-office unit, such as X3400, from a pool of empty bin units. Under the latter condition, the above noted common equipment first registered in the precedence marking switch X4210 the fact that the multiple call message being handled is of the "deferred" precedence and it thereafter controlled the outgoing selector X4300 associated with the cross-office unit X3400 to connect with the proper L1 outgoing line.

Thus, in the foregoing description it was assumed that the precedence indicator of the multiple call message being handled through the channel relay unit 7900, as well as other similar units, is a "deferred" precedence message. A deferred precedence message is the lowest class of message provided in the system. However, the "routine" and "priority" precedence indicators are respectively rated one and two steps higher than a "deferred" precedence indicator. However, all three are considered as a group as low precedence indicators. Three additional precedence indicators are also handled by the equipment and are identified as "operational immediate," "emergency" and "flash." Each of the last-mentioned indicators are considered as a group as high precedence indicators but the "flash" precedence indicator is rated the highest, whereas, the "operational immediate" precedence indicator is the lowest precedence in the high precedence group.

If either the "routine" or "priority" precedence indicator is registered in the precedence detector 7100, the relays R4045 or R4040 in the channel register 3900 will be operated (instead of the deferred relay R4050) when the inquiry ground test is made to determine whether or not a cross-office unit, such as X3400, is connected to the desired outgoing line that is to be used by the channel relay unit 7900. In either event, the operations involved are substantially the same as those previously described except that the inquiry ground potential is applied to different conductors terminating in the banks of the outgoing selector X3400 to determine the position of the precedence marking switch X4210. If the wiper X4215 of the precedence marking switch X4210 is in engagement with the second bank contact, the "routine" precedence indicator has been previously registered in the cross-office unit X3400 and if the wiper is in engagement with the third bank contact, then the "priority" indicator is registered therein.

In view of the foregoing, it should be understood that the previous detailed description of operation for determining the precedence registered in the cross-office unit X3400 connected to the L1 outgoing line over which the channel relay unit 7900 must transmit the multiple call message to reach the appropriate destination is substantially identical for all three low precedence indicators.

When it is necessary to select an idle cross-office unit, such as X3400, having an empty bin from the pool of available cross-office units in the manner previously described, any one of the six previously noted precedence indicators may be transmitted to and registered in the cross-office unit selected from the pool. This operation has been previously explained insofar as a "deferred" precedence indicator is concerned and the operation is substantially identical when any of the five remaining precedence indicators must be registered in the selected cross-office unit.

All multiple call messages which are processed by the multiple call equipment will be transmitted through as many channel relay units, such as 7900, as are necessary to retransmit the multiple call message to different destinations, identified by the routing indicators, over different outgoing lines, although several destinations may be reached over any one or more of the selected outgoing lines. In any event, multiple call messages having a deferred, routine or priority indicator will cause the common equipment, previously noted, to first make the test to determine whether or not a cross-office unit, such as X3400, is connected to the outgoing line determined by the particular channel relay unit, such as 7900, in use. Thereafter, the common equipment will test the selected cross-office unit to determine whether or not the precedence marking switch X4210 therein is set to the same low precedence marking of the multiple call message. This test, as previously noted, is made in conjunction with the channel testing unit 7400 and if the cross-office units so tested have not registered the proper precedence indicator therein, then the common equipment functions in the manner described previously to select an idle cross-office unit having an empty bin from the pool of such units and to connect the same to the proper outgoing line and to register therein the precedence of the multiple call message.

However, whenever the multiple call message is a high precedence message of either "operational immediate," "emergency" or "flash" no test is made to determine whether or not a cross-office unit is connected to the outgoing line indicated by the channel relay unit, such as 7900. In other words, the registration in the precedence detector 7100 of any one of the above noted high precedence indicators will control the common equipment so that it will find a cross-office unit having an empty bin and it will select the same for the purpose of handling the high precedence multiple call message for the channel relay unit 7900, and it will select other cross-office units with empty bins for use by other channel relay units. Although this operation of the common equipment in selecting a cross-office unit from the pool of empty bin units is the same as previously described in connection with the low precedence message, certain operating features are modified in order to prevent the testing operation normally made to determine whether or not a cross-office unit is connected to the desired outgoing line.

In order more clearly to understand the operations involved in the selections of an idle cross-office unit from the pool of available units, it will again be assumed that the channel selector switch unit 7700 has connected the common equipment to the channel relay unit 7900 in the manner previously explained and that a high precedence message of either the "operational immediate," "emergency" or "flash" precedence has been registered in the precedence detector 7100.

The various operations resulting from the above-mentioned association ultimately cause the start relay R7510 to operate and close its contacts 7512 in the manner previously explained. The contacts 7512 will complete the circuit for grounding the conductor C6903PG extending to Fig. 69 in order to operate the precedence test relays R6940 and R6950. These relays in turn, at their contacts 6944 and 6945, apply ground potential to the conductor C6903COM1 extending to Fig. 76 in order again to complete the previously traced circuit for operating the available channel relay R7560 and the connect relay R7430. Also, the ground potential applied to the conductor C6903COM1 is further extended by way of the contacts 7667, conductor C7101COM extending to Fig. 71 where the ground potential will be returned over the conductor C7101-OUF to Fig. 76 in order to operate the hunt empty bin relay R7660.

In this connection it should be noted that if the operational immediate detector 7100-OP is operated to register this precedence the ground potential on the conductor C7101COM is extended by way of the contacts 7352 to the conductor C7101-OUF. If the emergency precedence is registered in the flash and emergency detector 7100FE then this ground potential on the conductor C7101COM is connected to the conductor C7101-OUF by way of the contacts 7152 and if the flash precedence is registered in this detector, the ground potential is connected by way of the contacts 7142. In any one of the three foregoing conditions, the hunt empty bin relay R7660 will operate before a test can be made to determine whether or not a cross-office unit is connected to the proper outgoing line over which the multiple call message being handled by the channel relay unit 7900 must be transmitted to reach its destination.

As soon as the hunt empty bin relay R7660 operates, it locks itself in its operated position over a circuit including its left-hand winding, contacts 7663 and 7525' and ground at contacts 7513. Thus, it will be seen that the hunt empty bin relay R7660 will immediately operate to prevent any test from being made to determine whether or not a cross-office unit is connected to a desired outgoing line. Any one of the three high precedence indicators used in any multiple call message will therefore cause each and every one of the channel relay units, such as 7900, being used to handle the message to select a cross-office unit, such as X3400, from the pool of empty bin units.

Further operations controlled by the hunt empty bin relay R7660 are exactly the same as has been previously described in that each of the selected cross-office units will be controlled to connect with the particular outgoing line over which the multiple call message must be transmitted by each of the channel relay units. Also, each of the cross-office units will be controlled to register therein the same high precedence indicator as the precedence indicator registered in connection with the particular multiple call message. After each channel relay unit, such as 7900, has been controlled to connect with a cross-office unit, such as X3400, a signal will be given so that pilot heading information will be transmitted to and stored in the tape perforator in each of the selected cross-office units.

*Transmitting pilot heading information to each used channel relay unit and associated cross-office unit*

After the processing of the various routing indicators of a multiple call message has been completed and each channel relay unit, such as 7900, is connected to an appropriate cross-office unit, such as X3400, the relay R7940 is operated in the manner previously described in each of the used channel relay units. Consequently, ground potential is removed from the conductor C7871CGS extending to Fig. 78 in order to restore the start relay R7830 in the channel selecting switch unit 7700. Thus a signal is given that no further use is required of the channel selecting switch unit 7700 by any used channel relay unit. This signal is then conveyed to the precedence transmission unit 5200 (Figs. 52 to 54, inclusive) by removing ground potential from the conductor C5283CG at the contacts 7832 of the start relay R7830.

Referring now to Fig. 52 it will be recalled that an energizing circuit was completed for the winding of the start relay R5210 over a circuit including the start conductor C4498ST after all of the routing indicators of the multiple call message had been processed to appropriate channel relay units, such as 7900. However, the relay was shunted and thus prevented from operating by the ground potential applied to the conductor C5283CG in the manner noted above.

The start relay R5210 operates as soon as the shunt is removed from its operating circuit and it completes an obvious circuit, at its contacts 5219, for operating the slave relay R5220. Thus, the precedence transmission unit 5200 is seized so that certain items of information and the precedence indicator of the multiple call message will be transmitted as part of the pilot heading for the multiple call message, to all cross-office units, such as X3400, that have been connected to the used channel relay units such as 7900.

The relay R5210, at its contacts 5211, applies ground potential over a circuit including contacts 5251 and 5211, conductor C5281AUG extending to Fig. 79, contacts 7941' and the upper winding of the transfer relay R7960, to battery. The transfer relay R7960 performs several operations at this time but the most important operation is controlled by its contacts 7961, whereby, the signalling conductor C7992SIG extending to Fig. 83 and C7993SIG1 extending to Fig. 87, are interconnected through the lower winding of the open line relay R7970. Also, at its contacts 5211, the relay R5210 connects ground to the conductor C1182AUG1 extending to Fig. 11 in order to operate the relay R1175. The operation of the last-mentioned relay is of no importance at this time.

Inasmuch as the pilot heading of the multiple call message must be transmitted to each connected cross-office unit, such as X3400, through each of the used channel relay units, such as 7900, the signalling circuit will be traced from the cross-office unit X3400 (Fig. 8). In Fig. 8, it will be seen that the magnet XM3411 in the cross-office reperforator X3410 is connected to the signalling circuit from battery, winding of the magnet XM3411, contacts X3802, conductor C8330SIG extending to Fig. 83, wiper 8325 of the cross-office selector switch 8300, contacts 8311, conductor C7992SIG extending to Fig. 79, lower winding of the open line relay R7970, contacts 7945 and 7961, conductor C7993SIG1 extending to Fig. 87 and ground at contacts 8721 of the operated relay R8720. In this circuit, the magnet XM3411 in the cross-office reperforator X3410 remains in its operated position and is in a condition to be released in accordance with code signals, to perforate the associated tape X3413 in accordance with information transmitted over this signaling circuit.

Only one signalling circuit has been shown and described for one channel relay unit 7900 and one cross-office unit X3400. However, by referring to Fig. 87, it will be seen that the channel multiplying unit 8700 includes a plurality of groups of relays. For example, the relays R8720, R8730 and R8740 and other relays (not shown) are in one group and are normally held in their operated positions and each relay is provided with a single contact, such as 8721, for applying ground potential to its corresponding signalling conductor, such as C7993–SIG1, which is individual to a corresponding channel relay unit, such as 7900. Several groups of such relays are provided in the channel multipling unit 8700 and are provided with corresponding contacts for controlling signalling circuits extending to corresponding channel relay units. A monitor page printer 8750 is schematically illustrated in the lower portion of Fig. 87 and is connected by means of a plug P8752 and a jack J8751 to the contacts controlled by the relay R8720–4 and to a circuit including the conductor C1188SIG (MPP) extending to Fig. 11. Thus, the monitor page printer 8750 will be controlled to record certain of code signals of all multiple call messages, as well as the pilot message headings for each message transmitted through a used channel relay unit, such as 7900. Another group of relays, including the relays R8710, to R8710–3 are controlled over the signalling conductor C1188SIG extending to Fig. 11. Each of the last-mentioned relays is provided with a contact, such as 8711, for respectively controlling the previously mentioned groups of relays in order to repeat code signals corresponding to the information received over the signalling conductor C1188SIG to the previously mentioned signalling circuits including a conductor, such as the conductor C7993SIG1. All of the relays illustrated in the channel multiplying unit 8700 are of the polarized type and are arranged to quickly restore and reoperate in response to signals received over the conductor C1188SIG.

Since all information pertaining to the multiple call message and the pilot heading added thereto is transmitting over the signalling circuit including the conductor C1188SIG the last-mentioned signalling circuit will now be described. This circuit includes battery, the windings of the relays R8710–3, R8710–2 and R8710–1 and R8710, conductor C1188SIG extending to Fig. 11, contacts 1153, resistor 1172, and conductor C1187SIG1 extending to Fig. 55, to ground in the marking transmitter distributor 5503. Thus, the relays R8710 to R8710–3, inclusive, are retained in their operated positions.

The marking transmitter distributor 5503 is provided with a clutch magnet M5504 which, when operated over the conductor C5503SM, will cause the distributor to complete one cycle of operation, whereby, the contacts connected to the conductors C5503A to E, inclusive, will be closed one after another at spaced intervals in a predetermined sequence to transmit code signals over the conductor C1187SIG1 extending to Fig. 11. During each cycle of operation of the distributor 5503, the ground potential is removed at the normally closed contacts schematically illustrated therein. The code signals marked on the conductors C5503A to E, inclusive, will be in accordance with the code shown in Fig. 89 and the conductors C5503A to E will be marked, respectively, with ground potential in accordance with the code indicated by the perforations in columns 1 to 5, inclusive.

Referring again to the start relay R5210 in the precedence transmission unit 5200, it will be seen that as a further result of its operation, at its contacts 5212, it completes a circuit including the contacts 5252 and 5261 for operating the connect relay R5350. The last-mentioned relay at its contacts 5353 to 5358, inclusive, selectively connects the wipers 5314 to 5319, inclusive, of the miscellaneous switch 5310 to the above mentioned conductors C5503A to E, inclusive, and C5503SM. Also, at its contacts 5352, the relay R5350 prepares a circuit for the magnet M5311 of the miscellaneous switch 5310.

At its contacts 5212', the start relay R5210 completes a circuit for controlling the relay R5230 from the cam contacts 5275 on the motor driven impulser 5201. The cam contacts 5274 on the motor driven impulser 5201 will subsequently be utilized to control the magnet M5311.

Referring now to the motor driven impulser 5201, it will be recalled that this unit is continuously operating so that the high points 5278A, 5278B, etc., on the cam 5276 periodically close the contacts 5274 and so that the high points 5272C, 5272D, etc., on the cam 5277 periodically close the contacts 5275. The time relationship between the closing and opening of the respective contacts 5274 and 5275 is indicated by the relative spacing between the high points on the cams 5276 and 5277, as previously described.

Consequently, when the start relay R5210 closes its contacts 5212' as noted above, the next time that the contacts 5275 on the motor driven impulser 5201 are closed, a circuit is completed for operating the relay R5230. This ground potential is also applied to the conductor C4275PCB extending to Fig. 42, in the manner previously described, but without effect at the present time. The relay R5230 operates over the circuit controlled by the contacts 5275 and, at its contacts 5231, prepares a point in a circuit for locking itself in series with the relay R5240. However, the last-mentioned relay is shunted at this time from ground at contacts 5359 on the operated connect relay R5350. When the contacts 5275 are subsequently opened, the above mentioned shunt circuit is interrupted and the relay R5230 locks itself in series with the relay R5240 and the latter relay now operates from ground the contacts 5359. Thus, the relays R5230 and R5240 operate as pick-up relays under control of the motor driven impulser 5201.

At the contacts 5241, the relay R5240 now connects the circuit including the contacts 5274 of the motor driven impulser 5201 to the winding of the magnet M5311 of the miscellaneous switch 5310. It should be mentioned, however, that the pulses transmitted by the contacts 5274 over the conductor C4275PCA extending to Fig. 42 and over the conductor C5284SWP to Fig. 60 perform no controls at the present time. After a predetermined interval of time, following the opening of the contacts 5275, the contacts 5274 on the impulser 5201 are closed to transmit ground by way of the contacts 5241 and 5352, and the winding of the magnet M5311, to battery, in order to operate the magnet. As soon as the contacts 5274 are opened, the magnet M5311 restores to normal and, in a conventional manner, advances its wipers 5314 to 5319, inclusive, one step in a counter-clockwise direction from the illustrated home contact positions into engagement with the contacts 1. Shortly thereafter, the contacts 5275 on the impulser 5201 are again closed in order this time to transmit a ground pulse by way of the contacts 5212' and 5244, to the multiply connected contacts 1 to 18, inclusive, accessible to the wiper 5319 on the miscellaneous switch 5310. Since the wiper 5319 is now in engagement with the contact 1 the ground potential thereon is further extended by way of the wiper 5319, contacts 5358, conductor C5503SM to the winding of the clutch magnet M5504 on the marking transmitting distributor 5503. Energization of the magnet M5504 causes the distributor 5503 to operate in a single cycle in the manner previously described, whereby, the grounded contact normally connected to the conductor C1187SIG1 is opened and the remaining contacts thereon are closed one after the other so that the conductor C5503A to E, inclusive, are sequentially connected in the order named to the conductor C1187SIG1. Inasmuch as the wipers 5314 to 5318, inclusive, of the miscellaneous switch 5310 are now in engagement with the contacts 1, the ground potential applied to the contact 1 engaged by the wiper 5316 is now connected by way of the contacts 5355 to the conductor C5503C. The remaining conductors C5503A, B, D and E are, at this time, ungrounded by the respective wipers 5314, 5315, 5317 and 5318. As is best illustrated in Fig. 89, the ground potential applied to the conductor C5303C, while the remaining conductors C5503A, B, D and E are ungrounded, will cause the marking transmitter distributor 5503 to transmit code signals indicative of a "space" character function over the signal conductor C1187SIG1 to the channel multipling unit 8700 (Fig. 11).

When the contacts 5275 are opened by the impulser 5201, the ground potential is removed from the above described circuit for controlling the clutch magnet M5504, whereupon, the magnet restores to normal to terminate the first cycle operation of the marking transmitter distributor 5503.

After a predetermined delay, the contacts 5274 of the impulser 5201 are again closed and then reopened to again operate and restore the magnet M5311 of the miscellaneous switch 5310. Consequently, the wipers 5314 to 5319 are advanced from the contacts 1 into engagement with the contact 2. Shortly thereafter, the contacts 5275 are closed and then reopened by the impulser 5201 to again transmit a pulse to the magnet M5504 to initiate the second cycle of operation of the distributor 5503. During the second cycle of operation of the distributor 5503, the conductors C5503A to E, inclusive, will be marked in accordance with the code markings on the contacts 2 now engaged by the wipers 5314 to 5318, inclusive, of the miscellaneous switch 5310. In this position the conductor C5503C is again grounded whereas the remaining conductors C5503A, B, D and E are ungrounded so that code signals corresponding to another "space" character function are transmitted over the signal conductor C1187SIG1 to Fig. 11.

The foregoing described cyclic operation of the miscellaneous switch 5310 and the marking transmitter distributor 5503 continues until the wipers 5314 to 5319, inclusive, finally engage the contacts 19. The information transmitted in code form under control of the marking transmitter distributor 5503 as the above noted wipers are advanced over the successive contacts 1 to 18, inclusive, of the miscellaneous switch 5310, is as follows:

| Bank contacts | Code information |
| --- | --- |
| 1 | space. |
| 2 | Do. |
| 3 | Do. |
| 4 | Do. |
| 5 | Do. |
| 6 | carriage return. |
| 7 | Do. |
| 8 | line feed. |
| 9 | X. |
| 10 | Z. |
| 11 | X. |
| 12 | Z. |
| 13 | X. |
| 14 | Z. |
| 15 | X. |
| 16 | carriage return. |
| 17 | Do. |
| 18 | line feed. |

As previously described, the above items of information are transmitted in code form from the marking transmitter distributor 5503 over a circuit including the conductor C1187SIG1 extending to Fig. 11, resistor 1172, contacts 1153, conductor C1188SIG extending to Fig. 87 and the left-hand windings of the relays R8710, R8710–1 to R8710–3, inclusive, in the channel multipling unit 8700. Accordingly, the above noted relays will restore and reoperate in accordance with the code signals transmitted over the above traced circuit and at their right-hand contacts will repeat the code signals to the four groups of relays shown respectively to the right of each of the relays R8710, etc. At the various break contacts on each of the relays in each of the four groups noted, the code signals are repeated over corresponding signalling circuits to each of the channel relay units, such as 7900 (Figs. 79 to 82, inclusive), that are in use in this multiple call and then over previously described circuits, to each of the cross-office units, such as X3400, which have been connected to the different channel relay units. The signalling circuit for the channel relay unit 7900 and its associated cross-office unit X3400 includes the contacts 8721 on the relay R8720 in the channel multipling unit 8700, conductor C7993SIG1 extending to Fig. 79, contacts 7561 and 7945, winding of the open line relay R7970, conductor C7992SIG extending to Fig. 83, contacts 8311, wiper 8325, conductor C8330SIG extending to Fig. 8, contacts X3802, and magnet XM3411 in the cross-office reperforator X3410. Similar circuits are completed for all other used or connected channel relay units, such as 7900, and associated cross-office units, such as X3400. Accordingly, under control of miscellaneous switch 5310 and the channel multipling unit 8700, five "space" characters, two "carriage return" characters, one "line feed" character, a start-of-message indicator (XZXZXZX), two "carriage return" characters, and one "line feed" character are repeated in the order named through the connected channel relay units, such as 7900, to the associated cross-office units, such as X3400, where the information is perforated on a tape, such as X3413, in each of the units. Also, the relay R8720-4 in the channel multipling unit 8700, at its lower contacts, repeats the above items of information in the order named over an obvious circuit to the monitor page printer 8700, which is provided in the relay switching center handling the present multiple call message, to record certain of the information pertaining to each multiple call message.

After the foregoing information has been transmitted, the magnet M5311 is again operated and restored under control of the impulser 5201 to advance its wiper into engagement with the contacts 19. In this position, a circuit is now completed from ground by way of the lower winding of the relay R5260 (Fig. 52) contacts 5351', wipers 5319 in engagement with its bank contact 19, contacts 5358, conductor C5503SM and the winding of the magnet M5504, to battery. In this circuit the relay R5260 operates, but due to its high resistance, the magnet M5504 does not operate. As soon as the relay R5260 operates, it locks itself in its operated position over a circuit including its upper winding, contacts 5264 and 5211', to ground. The relay R5260, at its contacts 5261, interrupts a point in the previously traced circuit for the connect relay R5350 which now restores to normal. Upon restoring, the relay R5350 disconnects the wipers 5314 to 5319, inclusive, from the previously mentioned marking conductor C5503A to E, inclusive, and SM. Also, at its contacts 5351, the relay R5350 completes a self-interrupting circuit for the magnet M5311 which includes the contacts 5312 and the off-normal contacts ON5313 which are closed whenever the wipers of the miscellaneous switch 5310 are in any position other than the home contact position illustrated in the drawings. Consequently, ground potential is connected by way of the off-normal contacts ON5313, contacts 5311 and 5351 and the winding of the magnet M5311, to battery. The magnet operates over this circuit and immediately interrupts its operating circuit, at its contacts 5312, whereupon, the magnet restores to normal to advance its wipers an additional step in the counter-clockwise direction and to again complete, at its contacts 5312, its own operating circuit. Thus, the magnet M5311 is operated and restored to advance its wipers 5314 to 5319, inclusive, step-by-step in a counter-clockwise direction back to the illustrated home contact position, at which time the off-normal contacts ON5313 are interrupted to terminate the automatic stepping circuit. As a further result of the restoration of the relay R5350, at its contacts 5359, it opens the previously described locking circuit for the relays R5230 and R5240 which now restore to normal.

At the contacts 5241, the relay R5240 disconnects the impulsing contacts 5274 of the impulser 5201 from the previously described circuit for controlling the magnet M5311; at its contacts 5242, it reapplies ground potential to the conductor C1394-ILK extending to Fig. 13, for the purpose to be described hereinafter; and, at its contacts 5243, it completes a circuit including the contacts 5256 and 5263 for operating the relay R5270. The relay R5270 now operates and locks itself over a circuit including its contacts 5272 and the contacts 5262 and 5253, to ground. As a further result of the operation of relay R5270, at its contacts 5271, it completes a circuit for operating one of the six relays R5360, R5370, R5380, R5450, R5460 or R5470 depending upon the precedence registered in the precedence detector 7100.

It should be noted, however, that the relay R5240 upon restoring as noted above, at its contacts 5245, again prepares the circuit including the relay R5230 so that the last-mentioned relay will again be controlled by the contacts 5275 on the motor driven impulser 5201.

*Transmitting the "deferred" precedence indicator pilot heading information to each used channel relay unit and associated cross-office unit*

In processing the present multiple call message it has been assumed that the "deferred" precedence indicator has been registered in the deferred detector 7100NM of the precedence detector 7100. Consequently, the relay R7395 (Fig. 73) is locked in its operated position and, at its contacts 7398, applies ground potential by way of the contacts 7254, conductor C5282MA10 extending to Fig. 52, contacts 5218, conductor MA10 extending to Fig. 54, the winding of the deferred relay R5470, contacts 5271 and the resistor 5273, to battery. The relay R5470 operates at this time in order now to connect the wipers 5434 to 5439, inclusive, of the deferred switch 5430 to the conductors C5503A to E, inclusive, and SM extending to the marking transmitter distributor 5503.

It should be noted, however, that similar circuits may be completed respectively for the flash relay R5360, the emergency relay R5370, the operational immediate relay R5380, the priority relay R5450, or the routine relay R5460 depending upon the precedence of the particular message stored in the different detectors of the precedence detector 7100.

As noted above, the deferred relay R5470 is now in its operated position to connect the deferred switch 5430 to the marking transmitter distributor 5503. Consequently, the next time the contacts 5275 of the impulser 5201 are closed, a circuit is again completed for operating the relay R5230. When the above noted contacts 5275 are reopened, the relay R5230 locks itself in series with the relay R5230, which also operates, to ground at contacts 5479 of the operated deferred relay R5470. The relay R5240 now completes the circuit whereby impulses are transmitted from the contacts 5274 of the impulser 5201 by way of the contacts 5241 and 5472 for operating and restoring the magnet M5431 of the deferred switch 5430. The first time the magnet restores it advances its wipers 5434 to 5439, inclusive, one step in a counter-clockwise direction into engagement with the contacts 1. Shortly thereafter, the contacts 5275 on the motor driven impulser 5201 are again closed in order this time to transmit ground potential by way of the contacts 5212', 5244, wiper 5439 in engagement with the contact 1, contacts 5478, conductor C5503SM and the winding of the magnet M5504, to battery. The marking transmitter distributor 5503 will be controlled over this circuit in the manner previously described to transmit code signals over the conductor C1187SIG1 in accordance with the markings on the various bank contacts accessible to the wipers 5434 to 5438, inclusive, on the deferred switch 5430. The above stepping action of the magnet M5431 under control of the impulser 5201 and the transmission of the impulses to the magnet M5504 of the distributor 5503 continues until all of the information prewired in code form on the bank contacts accessible to the wiper 5534 to 5438, inclusive, is repeated over the above noted signalling conductor.

The foregoing described cyclic operation of the deferred switch 5430 continues until the wiper 5439 finally engages the contact 6. The information transmitted in code form under control of the marking transmitter distributor 5503 as the above noted wipers 5434 to 5439 are advanced step-by-step over the successive contacts 1 to 5, inclusive, of the deferred switch 5430 is as follows:

| Bank contacts | Code information |
| --- | --- |
| 1 | N. |
| 2 | M. |
| 3 | N. |
| 4 | M. |
| 5 | space. |

The above described items of information are transmitted in code form by the marking distributor 5503 over the previously described circuits to the channel multipling unit 8700 where they are repeated through the various used channel relay units, such as 7900, to their associated cross-office units, such as X3400.

Thus, in the present case, the "deferred" precedence indicator (NMNM) is perforated on the tape associated with each of the cross-office units being used in connection with the present multiple call message. Accordingly, the characters NMNM followed by a "space" character function are perforated on the tape in each of the cross-office reperforators, such as X3410, in each of the connected cross-office units, such as X3400.

After the foregoing information has been transmitted in the manner noted above, the impulser 5201 transmits an additional pulse to the magnet M5431 so that the wipers are advanced an additional step into engagement with the contacts 6. In this position a circuit is now completed for operating the relay R5250 over a circuit including its upper winding, wiper 5439, contacts 5478, conductor C5503SM and the winding of the magnet M5504. However, the magnet M5504 does not operate due to the high resistance of the upper winding of relay R5250 but the relay R5250 operates and locks itself over a circuit including its lower winding, contacts 5255 and 5211', to ground. As a further result of the operation of relay R5250, it interrupts, at its contacts 5253, a point in the locking circuit for the relay R5270 and, at its contacts 5256, it interrupts a point in the initial operating circuit for the relay R5270. Accordingly, the last-mentioned relay now restores to normal and, at its contacts 5271, removes the operating battery potential from the circuits for controlling the deferred relay R5470 which now restores to normal. As in the case of the restoration of the connect relay R5350, the relay R5470, at its contacts 5471, completes the self-interrupting circuit for the magnet M5431, whereby the magnet operates and restores to advance its wipers 5434 to 5439, inclusive, step-by-step in a counter-clockwise direction until the wipers engage the home contact positions illustrated in the drawing. At this time, the off-normal contacts ON5433 are opened in order to terminate further stepping of the wipers under control of the magnet M5431.

As a further result of the operation of relay R5250, at its contacts 5254, it applies ground potential to the conductor C4683P3 extending to Fig. 46 in order to initiate the next phase of transmission of information to the used channel relay units and associated cross-office units; and, at its contacts 5251, it removes ground potential from the conductor C5281AUG extending to Fig. 79 to the channel relay unit 7900 and to all other used channel relay units in order to restore the operated transmission relay thereon, such as R7960. Also, the ground potential is removed from the conductor C1182AUG1 extending to Fig. 11 in order to restore the relay R1175 (Fig. 11). However, before describing the next phase of operation of the apparatus, it will be advisable to generally describe the different items of information which are transmitted if other precedence indicators have been registered in the precedence detector 7100.

*Transmitting the "routine" precedence indicator pilot heading information to each used channel relay unit and associated cross-office unit*

In the foregoing description of the operations involved in transmitting the "deferred" precedence indicator pilot heading information, it was assumed that the conductor C5282MA10 was grounded by the registration of a "deferred" precedence indicator in the deferred detector 7100NM of the precedence detector 7100 and, accordingly, caused the operation of the deferred relay R5470. It will now be assumed, however, that the "routine" precedence indicator (RR) is registered in the routine detector 7100RR of the precedence detector 7100 and, consequently, the conductor C5282MA3 is grounded to complete a circuit by way of the contacts 5217, conductor MA3, winding of the routine relay R5460, contacts 5271, resistor 5273, and battery. Thus, the routine relay R5460 prepares at its various contacts, circuits similar to those completed through corresponding contacts on the deferred relay R5470. The magnet M5421 of the routine switch 5420 is operated and restored under control of the impulser 5201 and as the wipers take each step, a pulse is transmitted by way of contacts accessible to the wiper 5429 to control the magnet M5504 of the marking transmitter distributor 5503 in the manner previously described. As the wipers 5424 to 5429, inclusive, are advanced step-by-step in a counter-clockwise direction under control of the magnet M5421, information in code form is repeated through the marking transmitter distributor 5503 to the signalling conductor C1187SIG1 extending to Fig. 11 in the manner previously described. As the above noted wipers are advanced over the successive contacts 1 to 3, inclusive, of the routine switch 5420, the following items of information are transmitted:

| Bank contacts | Code information |
| --- | --- |
| 1 | R. |
| 2 | R. |
| 3 | space. |

Accordingly, it will be understood that if the routine precedence indicator is registered in the precedence detector 7100, the routine switch 5420 will control the marking transmitter distributor 5503 to transmit the "routine" precedence indicator characters RR followed by a "space" character function over the previously described circuits including the used channel relay units, such as 7900, and the associated cross-office units, such as X3400, where this information will be perforated on the tape associated with each of the units.

When the magnet M5421 advances its wipers into engagement with the contact 4, the wiper 5429 will complete the previously described circuit, whereby the relay R5250 is operated in series with the magnet M5504. As previously noted, the magnet M5504 does not operate but the relay R5250 operates and locks itself in its operated position and controls various circuits in the manner previously described, whereby the next phase of operation of the apparatus is initiated.

*Transmitting the "priority" precedence indicator pilot heading information to each used channel relay unit and associated cross-office unit*

It will now be assumed that the priority detector 7100PP in the precedence detector 7100 has applied ground potential to the conductor C5282MA7 to indicate that the "priority" precedence indicator PP has been registered. When this precedence is registered, the priority relay R5450 is operated in substantially the same manner as previously described in order to connect the priority switch 5410 to the marking transmitter distributor 5503. The magnet M5411 is accordingly advanced step-by-step under control of the contacts 5274 on the impulser 5201 in order to transmit the following information through the marking transmitter distributor 5503 to the signalling conductor C1187SIG1 in substantially the same manner as has been previously described. The information transmitted in code form as the wipers 5414 to 5419, inclusive, are advanced step-by-step over the contacts 1 to 3, inclusive, of the priority switch 5410 is as follows:

| Bank contacts | Code information |
|---|---|
| 1 | P. |
| 2 | P. |
| 3 | space. |

The above items of information are transmitted in code form over the previously described circuits to the used channel relay units, such as 7900, and the associated cross-office units, such as X3400, in order to perforate the priority precedence indicator PP followed by a "space" character function on the associated tape.

As soon as the wipers of the priority switch 5410 are advanced with the contacts 4, the wiper 5419 will complete the previously noted circuit, whereby, the relay R5250 is operated in series with the magnet M5504. The last-mentioned magnet, however, does not operate but the relay R5250 controls various circuits, whereby, the next phase of operation of the apparatus is initiated.

*Transmitting the "operational immediate" precedence indicator pilot heading information to each used channel relay unit and associated cross-office unit*

It will now be assumed that the operational immediate detector 7100-OP in the precedence detector 7100 has applied ground potential to the conductor C5282MA6 in order to indicate that the "operational immediate" precedence indicator OPOP has been registered. The operations involved when the "operational immediate" precedence detector is registered is substantially the same as has been previously described above in connection with the "deferred," "routine" and "priority" precedence indicators. In this case, however, the relay R5380 operates to connect the operational immediate switch 5340 to the marking transmitter distributor 5503. The magnet M5341 of this switch will be controlled in the manner previously described by the impulser 5201 to advance its wipers step-by-step in a counterclockwise direction. The information transmitted to the distributor 5503 as the wipers 5344 to 5349, inclusive, are advanced step-by-step over the contacts 1 to 5, inclusive, are as follows:

| Bank contacts | Code information |
|---|---|
| 1 | O. |
| 2 | P. |
| 3 | O. |
| 4 | P. |
| 5 | space. |

Accordingly, the above items of information in the order named are transmitted in code form by way of the marking transmitter distributor 5403 through the channel multipling unit 8700 to all used channel relay units, such as 7900, and associated cross-office units, such as X3400. In the cross-office units the "operational immediate" precedence indicator OPOP followed by a "space" character function are perforated on the associated tape.

When the wipers of the operational immediate switch 5430 are advanced into engagement with the contacts 6, the wiper 5349 completes the previously described circuit, whereby the relay R5250 is operated. The last-mentioned relay locks itself in its operated position and performs the previously described circuit controls, whereby, the next phase of operation of the apparatus is initiated.

*Transmitting the "emergency" precedence indicator pilot heading information to each used channel relay unit and associated cross-office unit*

It will now be assumed that the "emergency" precedence indicator has been registered in the flash and emergency detector 7100FE of the precedence detector 7100 and, consequently, the conductor C5282MA5 is grounded. As a result thereof, the emergency relay R5370 will be operated, instead of the other similar relays previously described, in order to connect the emergency switch 5330 to the marking transmitter distributor 5503. As a result thereof, the magnet M5331 of this switch will be controlled by the impulser 5201 in the manner previously described, whereby, its wipers are advanced step-by-step in a counter-clockwise direction to transmit various items of information to the distributor 5503. The information transmitted in code form under control of the marking transmitter distributor 5503 as the wipers 5334 to 5339, inclusive, are advanced over the successive contacts 1 to 24, inclusive, of the emergency switch 5330 is as follows:

| Bank contacts | Code information |
|---|---|
| 1 | figures shift. |
| 2 | bell. |
| 3 | Do. |
| 4 | Do. |
| 5 | Do. |
| 6 | Do. |
| 7 | letters shift. |
| 8 | E. |
| 9 | M. |
| 10 | E. |
| 11 | R. |
| 12 | G. |
| 13 | E. |
| 14 | N. |
| 15 | C. |
| 16 | Y. |
| 17 | figures shift. |
| 18 | bell. |
| 19 | Do. |
| 20 | Do. |
| 21 | Do. |
| 22 | Do. |
| 23 | letters shift. |
| 24 | space. |

The above items of information are transmitted in code form in the order named through the marking transmitter distributor 5503 and, the channel multipling unit 8700 and the used channel relay units, such as 7900 to the associated cross-office units, such as X3400. Accordingly, the tape associated with each of the connected cross-office units will be perforated in code form with a "figures shift" character function, five "bell" character functions, a "letters shift" character function, "emergency," five "bell" character functions, a "letters shift" character function and then a "space" character function.

When the wipers of the emergency switch 5330 are advanced into engagement with the contacts 25, the wipers 5339 will complete the previously described circuit, whereby, the relay R5250 is operated to perform various circuit controls described previously, whereby the next phase of operation of the apparatus is initiated.

*Transmitting the "flash" precedence indicator pilot heading information to each used channel relay unit and associated cross-office unit*

It will now be assumed that the conductor C5282MA4 has been grounded by the flash and emergency detector 7100FE in the precedence detector 7100 to indicate that a "flash" precedence has been registered. In this case the flash relay R5360 is operated in order to connect the flash switch 5320 to the marking transmitter distributor 5503. Consequently, the magnet M5321 will be controlled by the motor driven impulser 5201 in the manner previously described to advance its wipers step-by-step in a counter-clockwise direction to transmit various items of information to the marking transmitter distributor 5503. The information transmitted in code form under control of the marking transmitter distributor 5503 as the wipers 5324 to 5329, inclusive, are advanced step-by-step over the successive contacts 1 to 20, inclusive, of the flash switch 5320 is as follows:

| Bank contacts | Code information |
|---|---|
| 1 | figures shift. |
| 2 | bell. |
| 3 | Do. |
| 4 | Do. |
| 5 | Do. |
| 6 | Do. |
| 7 | letters shift. |
| 8 | F. |
| 9 | L. |
| 10 | A. |
| 11 | S. |
| 12 | H. |
| 13 | figures shift. |
| 14 | bell. |
| 15 | Do. |
| 16 | Do. |
| 17 | Do. |
| 18 | Do. |
| 19 | letters shift. |
| 20 | space. |

The above items of information are transmitted in code form in the order named under control of the marking transmitter distributor 5503 through the channel multipling unit 8700 and the used channel relay units, such as 7900 to the associated cross-office unit, such as X3400. In each of the connected cross-office units the associated tape will be perforated in code form with the "figures shift" character function, five "bell" character functions, a "letters shift" character function, "flash," "figures shift" character function, five "bells" character functions, "letters shift" character function and a "space" character function.

When the wipers of the flash switch 5320 are advanced into engagement with the contacts 21, the wiper 5329 will complete the previously described circuit, whereby, the relay R5250 is operated. The latter relay performs the previously described circuit controls, whereby, the next phase of operation of the apparatus is initiated.

*Selecting the channel selector switch control unit 4600*

In the present multiple call message, it was assumed that a deferred multiple call message is being handled. The description covering the other five different precedence indicators has no bearing on the multiple call message being described but has been given to clearly illustrate the operations involved when the different precedence indicators are required in connection with the message. Accordingly, it will be recalled that after the "deferred" precedence indicator has been transmitted by the deferred switch 5430, through the marking transmitter distributor 5503, the channel multipling unit 8700, the used channel relay units, such as 7900 and the associated cross-office units, such as X3400, the relay R5250 operated as previously described. At its contacts 5251, the relay R5250 removes ground potential from the conductor C1182AUG1 in order to restore the relay R1175. At the contacts 5251, the relay R5250 also removes ground potential from the conductor C5281AUG extending to Fig. 79 and then by way of the contacts 7941' and the upper winding of the transmission relay R7960, to battery. The conductor C5281AUG is multiply connected to all of the channel relay units, such as 7900, provided in the relay switching center. All such units that have their relays, such as R7940, operated to indicate that the associated channel relay unit is in use will now be disconnected from the signalling circuit from the channel multipling unit 8700 due to the restoration of the transmission relay, such as R7960, in each of the used channel relay units. Thus, in Fig. 79, it will be seen that as soon as the relay R7960 restores, it disconnects, at its contacts 7961, the conductor C7993SIG1 extending to the channel multipling unit 8700 from the previously described signalling circuit including the conductor C7992SIG extending over previously traced circuits to the associated cross-office unit X3400 and instead, at its contacts 7961', applies ground potential to the last-mentioned signalling circuit to retain the same in condition for subsequent transmission of code signals. The same operation occurs in each of the channel relay units in use in the present multiple call message.

As a further result of the restoration of the transmission relay R7960, at its contacts 7962, it removes ground potential from the circuit including the winding of the magnet M8241 of the transmission counting switch 8275. The magnet M8241 upon restoring advances its wipers 8243 and 8244 one step in a clockwise direction. Therefore, the relay R7960 is operated during the transmission of signals through the channel relay unit 7900 and restores when the transmission circuit is to be opened by the restoration of relay R7960. The magnet M8241 also operates and restores under control of the relay R7960 so that an accurate count is kept by the transmission counting switch 8275 of the number of times transmission is effective through the contacts 7961 on the transmission relay R7960 in the associated channel relay unit 7900. When ten counts have been made by the switch 8275, a circuit including the wiper 8243, conductor C4873H extending to Fig. 48A is completed for operating the relay R4885. At its contacts 4886, the relay R4885 connects ground at contacts 4871 to conductor C1186SIG (MPP) extending to Fig. 11 and then by way of the conductor C1188SIG (MPP) extending to Fig. 87 in order to shortout the contacts on the repeating relay R8720-4.

Returning to the relay R5250, it will be recalled that, at its contacts 5254, it applies ground potential by way of the conductor C4683P3 extending to Fig. 46, contacts 4674 and the winding of the relay R4650, to battery. The relay R4650 provided in the channel selector switch control unit 4600 now operates and initiates operations, whereby, the channel selector switch 4601 will select certain of the channel relay units, such as 7900, one at a time so that certain relay switching center routing indicators, as well as certain prosigns, such as ZVA, ZWL, BBB, JJJ or UUU may be transmitted. Also, the channel selector switch control unit 4600 may be used a second time in order to control the transmission of the tributary station routing indicators through certain of the relay units, such as 7900.

At its contacts 4652, the relay R4650, extends the ground potential on the conductor C4683P3 by way of the contacts 4622, 4652, 4632 and 4641, and the winding of the magnet M4610, to battery. The magnet operates over this circuit and, at its contacts 4612, completes the circuit for the interrupter relay R4640. The latter relay now operates and, at its contacts 4641, opens the circuit for the magnet M4610 which now restores to normal and advances its wipers one step in a counter-clockwise direction into engagement with the contacts 1. A test is now made for the relay R4630 to determine whether or not a conductor, such as the conductor C4681SEL1 extending to Fig. 82, has been grounded by the channel relay unit 7900. Actually, at this time the channel relay selector switch 4601 is looking for a channel relay unit, such as 7900, that requires a ZVA multiple call indicator as part of the pilot heading information added to the message to be transmitted to another switching center that must also process the multiple call message for further automatic routing.

In the present description it has been assumed that the channel relay unit 7900 has at least three routing indicators assigned to it for transmission over an L1 outgoing line. These routing indicators, as previously described, are JWCX, JKXY and UKAY which, during the processing operation, were analyzed and caused the routing indicator JWC to be stored in the register 8001 of the channel relay unit 7900. This JWC routing indicator has been stored on relays in the register 8001 and will be used at this time, in connection with a ZVA prosign, to inform the switching center JWC that the message is a ZVA (multiple call) message and that the relay switching center must retransmit the single received multiple call message in the direction of the three different tributary stations mentioned above.

Thus far it has been assumed that the channel relay unit 7900 compared the three routing indicators JWCX, JKXY and UKAY and therefore it has been utilized three times during the processing of the routing indicators. Each time the channel relay unit 7900 is utilized in the processing operation, the relay R8150 operated and restored and as a result thereof, at its contacts 8154, it controlled the magnet M8251 to operate and restore a corresponding number of times. Consequently, the wipers of the units register 8276 were advanced at least three steps indicating the processing of three routing indicators. However, it should be understood that through the medium of the units register 8276 and the tens register 8277 at least as many as 99 routing indicators may be processed in the same manner as the three routing indicators indicated above. Whenever the wiper 8256 of the unit register 8276 is in engagement with its contacts 3 to 10, inclusive, it will apply ground potential to the conductor C4681SEL1 extending to Fig. 46. Thus, whenever two or more routing indicators have been processed through the use of the channel relay unit 7900, the above noted conductor will be grounded. It being noted that the wiper 8265 of the tens register 8277 will also apply ground potential to the conductor C4681SEL1 whenever it is in engagement with any one of its contacts 1 to 9, inclusive. For the purpose of controlling the magnet M8261 of the tens register 8277, the wiper 8254 of the units register 8276 will complete the circuit by way of its contacts 10 for operating the magnet M8261 and each time the wiper 8264 steps off the tenth contact, the magnet M8261 will restore and advance its wiper one step. Thus, for every ten steps of the units register 8276, the tens register 8277 will advance its wipers one step.

The ground potential applied to the conductor C4681-SEL1 by the channel relay unit 7900 marks the first bank contact accessible to the wiper 4614 of the channel relay selector switch 4601 to indicate to the channel selector switch control unit 4600 that this channel relay unit must be selected. Accordingly, as soon as the magnet M4610 advances its wipers 4614 to 4616, inclusive, one step in a counter-clockwise direction, the ground potential on the conductor C4681SEL1 completes a circuit including the wiper 4614 and the contacts 4621 for operating the test relay R4630. The latter relay, at its contacts 4632, now interrupts the stepping circuit for the magnet M4610 and, at its other contacts, performs various operations to be described hereinafter.

The control exercise as a result of the closing of contacts 4634 by the test relay R4630 will first be described. Ground potential on the conductor C4683P3 is extended over a circuit including contacts 4634, conductor C1393RI–1 extending to Fig. 13, contacts 1383 and 1308 and the upper winding of the reset relay R1160, to battery. This relay is provided to control the monitor page printer in order to reset the same so that it will start to print information on a new line of the page and it may be operated at several different times during the processing of the present multiple coil. For example, its operation at the present time is to provide a new line of typing on the monitor page printer 8750 following the previous printing of the start-of-message indicator (XZXZXZX) and the deferred precedence indicator (NMNM). Another condition under which the reset relay R1160 is operated occurs when nine routing indicators have been withdrawn from the routing indicator tape storage unit 5502 and sent to the cross-office unit as part of various pilots. Another condition under which the reset relay R1160 is operated occurs whenever ten routing indicators have been sent out as part of the same pilot. Thus, under the conditions noted above, the monitor page printer 8750 will be independently controlled to reset itself to start printing subsequent information on a new line of the printed page.

The relay R4630, at its contacts 4631, will complete a circuit described hereinafter for operating certain relays in the particular channel relay unit 7900 that has been selected by the channel relay selector switch 4601. Also, at the contacts 4633, an additional circuit will be subsequently completed for the control R7960 in the channel relay unit 7900 whereby that particular channel relay unit signalling circuit including the conductors C7992SIG and C7993SIG1 will be completed to transmit certain information regarding the present message to the associated cross-office unit X3400.

The sequence of operation will best be understood by now describing the controls exercised by the operation of the reset relay R1160 of the miscellaneous control unit 1000.

*Resetting the monitor page printer 8750 to a new line*

Figure 49:
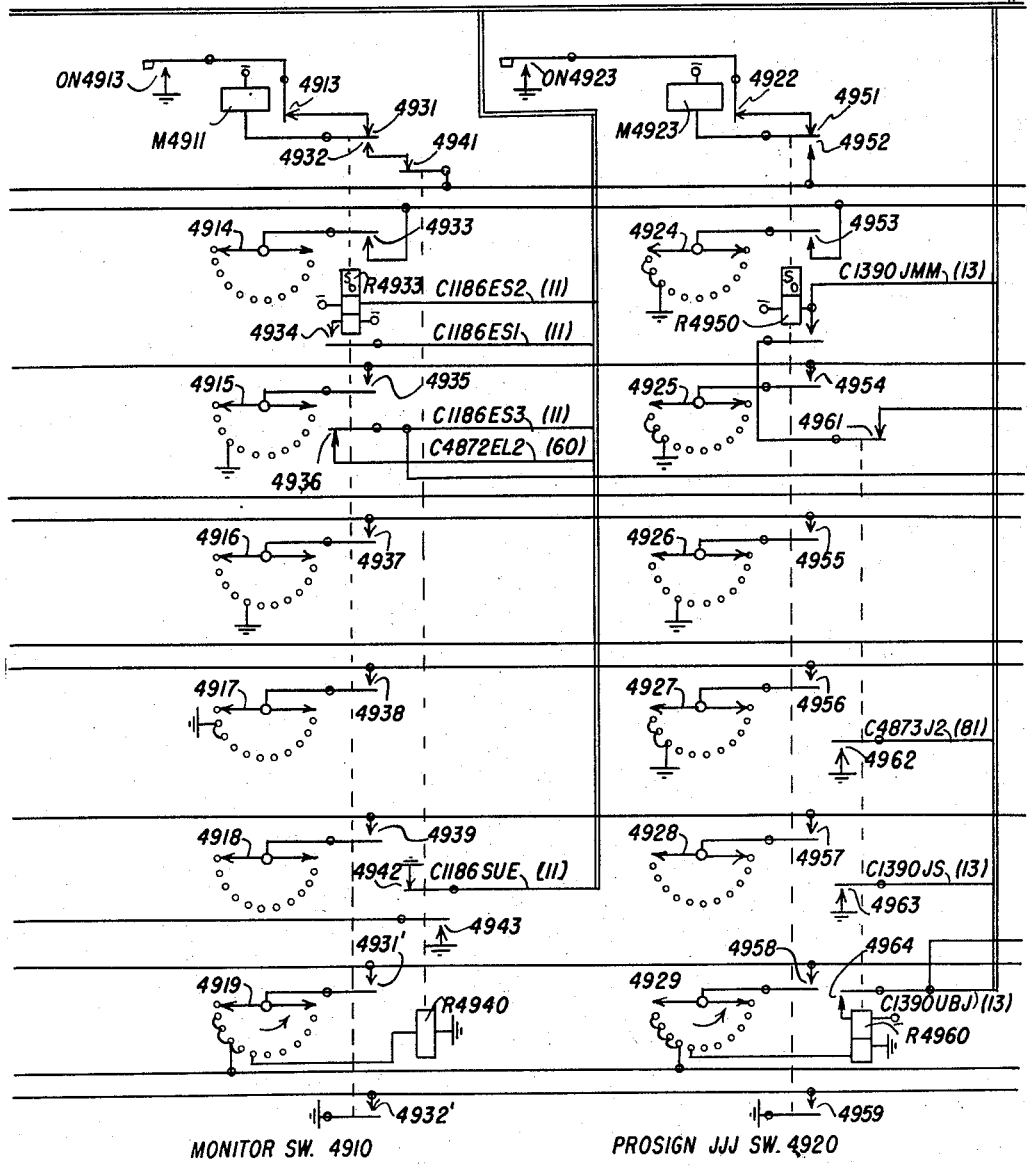

Referring now to Fig. 11, it will be seen that when the reset relay R1160 operates it completes a locking circuit for itself including its lower winding, contacts 1163, conductor C1186SU–E extending to Fig. 49 and ground at contacts 4942. Furthermore, at its contacts 1161, the reset relay R1160 applies ground potential to the conductor C1185SU–C extending to Fig. 61 in order to provide a locking ground potential for various relays in the storage control unit 5800. At its contacts 1162, the relay R1160 applies ground potential to the conductor C1186ES1 extending to Fig. 49 in order to provide a locking ground potential for the relay R4930 which will subsequently be operated. At its contacts 1165, the relay R1160 removes ground potential from the conductor C1186ES3 extending to Fig. 49, but this is of no particular importance at this time. Finally, at its contacts 1164, the relay R1160 completes an operating circuit for the relay R4930 (Fig. 49) in the transmitter control unit 4800.

Referring now to Fig. 49, it will be seen that the circuit for operating the relay R3940 includes battery, the upper winding of the relay, conductor C1186ES2 extending to Fig. 11, contacts 1164, conductor C1394–ILK extending to Fig. 52 and contacts 5242, to ground. The relay R4930 operates over this circuit and, at its contacts 3934, locks itself in its operated position over a circuit including its lower winding and the grounded conductor C1186ES1. In this connection it will be recalled that in Fig. 52 of the precedence transmission unit 5200, the relays R5240 and R5230 were restored to normal when the locking circuit for these relays also opened by the restoration of the relay R5470 at the end of the transmission of the "deferred" precedence indicator (NMNM).

Referring now to Fig. 49 it will be seen that the relay R4930 upon operating connects the magnet M4911 and the wipers of the miscellaneous switch 4910 whereby the stepping of the wipers over the various contacts in the associated banks will transmit code signals corresponding to two "carriage return" character functions, a "line feed" character function and a "space" character function to the monitor page printer 8750. This transmission is made over substantially the same circuits described hereinbefore in connection with the operation of the miscellaneous switch 5310 and the different precedence switches shown in Figs. 53 and 54 of the precedence transmission unit 5200 but this information will not be repeated by the channel multipling unit 8700 through the used channel relay units, such as 7900, because the transmission relay therein, such as R7960, will be restored at this time.

More particularly, at the contacts 4932, the relay R4930 completes a circuit including battery winding of the magnet M4911, contacts 4932 and 4941, conductor C4871SWP extending to Fig. 54, contacts 5241 (Fig. 52) and contacts 5274 to ground on the motor driven impulser 5201.

Referring now to Fig. 52, it will be recalled that the motor driven impulser 5201, at its contacts 5275, operates the relay R5230 and as soon as the contacts 5275 are opened, the relay R5240 operates in series with the relay R5230. At this time the last-mentioned circuit includes the winding of the relay R5230, contacts 5231, winding of the relay R5240, conductor C4871SU–2 extending to Fig. 48 and ground at contacts 4932′ on the operated relay R4930. The relay R5240 upon operating performs the same functions as previously described including the closing of its contacts 5241 so that the next time the contacts 5274 on the motor driven impulser 5201 are closed the above traced circuit will be completed for operating the magnet M4911 of the miscellaneous switch 4910. As a further result of the operation of the relay R5240, at its contacts 5242, it removes ground potential from the conductor C1394–ILK extending to Fig. 13 thereby to interrupt a point in the initial operating circuit for the upper winding of the relay R4930. However, the last-mentioned relay remains operated over the locking circuit including its lower winding, contacts 4934, conductor C1186ES1 extending to Fig. 11, and ground at contacts 1162.

The motor driven impulser 5201 will continue to close and open its contacts 5274 in order to operate and restore the magnet M4911. In between the closing and opening of the last-mentioned contacts, the impulser 5201 will close and open its contacts 5275 to now transmit ground impulses over a circuit including contacts 5212′, 5244, conductor C4871MAG extending to Fig. 48, to certain multipled bank contacts on the various rotary switches on the transmitter control unit 4800 (Figs. 48 to 51, inclusive). Each time the magnet M4911 restores it advances its wipers 4914 to 4919 one step in a counter-clockwise direction. When the wiper 4917 engages its contact 1, it applies ground potential by way of the contacts 4938, conductor C4871D extending to Fig. 54, conductor C5503D extending to the marking transmitter distributor 5503. The remaining wipers 4914 to 4916 and 4918 are ungrounded when they engage contacts 1 in the associated contact banks. Therefore, the next time a pulse is transmitted over the conductor C4871MAG the ground potential is extended by way of the wiper 4919, contacts 4931′, conductor C4871SM extending to Fig. 54, conductor C5503SM and the winding of the clutch magnet M5504, to battery. Thus, the marking transmitter distributor 5503 will transmit in code form signals over the conductor C1187SIG1 extending to Fig. 11 and then by way of the contacts 1153 and the conductor C1188SIG in order to control the relays R8710 to R8710–3, inclusive, in the channel multiplying unit 8700, in the manner previously described. The code signals transmitted with the wipers 4914 to 4918 in engagement with the contacts 1 correspond to a "carriage return" character function in accordance with the code illustrated in Fig. 89 of the drawings.

Each time the magnet M4911 operates and then restores to advance its wipers an additional step. Certain of the wipers 4914 to 4918, inclusive, will encounter-grounded contacts whereby one or more of the conductors C4871A to C4871E are grounded. As previously noted, these conductors extend to Fig. 54 where they are connected respectively to the conductor C5503A to E, inclusive. Also, each time the wipers are advanced an additional step, a ground pulse transmitted over the conductor C4871MAG is extended by way of the wiper 4919, contacts 4931′, conductor C4871SM extending to Fig. 54 and then by way of the conductor C5503SM to the clutch magnet M5504. The last-mentioned magnet in the marking transmitter distributor 5503 will permit the associated contacts to be closed in a predetermined order, as previously explained, to transmit the code signals over the conductor C1187SIG1 to the channel multiping unit 8700.

The information transmitted in code form over the last-mentioned signalling conductor by the marking distributor 5503 as the wipers of the miscellaneous switch 4910 are advanced over the contacts 1 to 4, inclusive, is as follows:

| Bank contacts | Code information |
| --- | --- |
| 1 | carriage return. |
| 2 | Do. |
| 3 | line feed. |
| 4 | space. |

The above information transmitted over the signalling conductor C1188SIG1 to Fig. 11 is further extended by way of the contacts 1153 (Fig. 11) conductor C1188SIG extending to Fig. 87 in order to operate the relays R8710 to R8710–3, inclusive. All of the above noted relays respond to the code information received and at their respective contacts control the different groups of relays R8720, etc. The last-mentioned relays are also provided with contacts, such as 8721, for repeating the code signals over the individually associated signalling conductor, such as C7993SIG1 extending to the channel relay unit 7900 (Fig. 79). It should be noted, however, that in the channel relay unit 7900, as well as all other channel relay units connected to the signalling conductors of the channel multiplying unit 8700, the transmission relay R7960 is in a restored position. For example, in the channel relay unit 7900, the transmission relay R7960 is restored at this time so its contacts 7561 are opened. Thus, the signalling circuit, including the conductor C7993SIG1, is disconnected from the signalling conductor C7992SIG extending by way of Fig. 83 to the associated cross-office unit X3400. Thus, the above noted two "carriage return" functions, the "line feed" character function and the "space" character function are not repeated by the channel multiplying unit 8700 to any used channel relay unit, such as 7900. However, the relay R8720–4 in the channel multiplying unit 8700 (Fig. 87) repeats the above information by way of the jack J8751 and plug P8752 to the monitor page printer 8750. The monitor page printer 8750 in responding to the above noted code signals will return its carriage to normal and make a line space so that subsequent information received will be printed on a new line of the page.

It should be noted at this time that the conductor C1188SIG (MPP) extends to Fig. 11 and under certain conditions is grounded to shunt out the contacts on the relay R8720–4 and will prevent information from being repeated by these contacts to the page printer 8750. However, at the present time the contacts 1171 (Fig. 11) are opened and the conductor C1186SIG (MPP) is not grounded so that the shunting ground potential is removed from the conductor C1188SIG (MPP) extending to Fig. 87.

Referring again to Fig. 49 of the transmitter control unit 4800, it will be seen that after the above coded information has been transmitted to the monitor page printer 8750 the magnet M4911 will operate and restore under control of the motor driven impulser 5201 to advance its wipers into engagement with the contacts 5. When this occurs, a circuit is completed from ground through the winding of the relay R4940, wiper 4919, contacts 4931′, conductor C4871SM extending to Fig. 54, conductor C5503SM and the winding of the magnet M5504, to battery. The relay R4940 operates over this circuit but due to its high resistance it prevents operation of the magnet M5504. At its contacts 4941, the relay R4940 disconnects the magnet M4911 from the previously described impulsing circuit from the motor driven impulser 5201. Also, at its contacts 4942, the relay R4940 removes ground potential from the conductor C1186SU–E extending to Fig. 11 in order to interrupt the locking circuit for the lower winding of the reset relay R1160. The latter relay does not restore to normal immediately inasmuch as the previously traced operating circuit including its upper winding is maintained by ground potential applied to the conductor C1393RI–1. Finally, at its contacts 4943, the relay R4940 completes a circuit including the contacts 4892, conductor C1390SC extending to Fig. 13 in order to operate the relay R1305. The latter relay upon operating, at its contacts 1306, locks itself to the grounded conductor C1393SU–A. A branch of the above mentioned circuit including the contacts 4943 is completed by way of the contacts 4892 to the conductor C4635SC extending to Fig. 46 for the purpose to be described hereinafter.

Returning again to Fig. 13, it will be noted that as soon as the relay R1305 operates, it interrupts, at its contacts 1308, the previously traced circuit including the grounded conductor C1393RI–1 and the upper winding of the reset relay R1160. Consequently, the latter relay now restores to normal and, at its contacts 1162, removes ground potential from the conductor C1186ES1 extending to Fig. 49 in order to interrupt the locking circuit for the lower winding of the relay R4930. The circuit for the upper winding of the last-mentioned relay has previously been interrupted at the contacts 5242 by the relay R5240. The latter relay, it will be recalled, is operated under control of the motor driven impulser 5201 as it controls the stepping of the miscellaneous switch 4910.

As a result of the restoration of the relay R4930, the contacts 4933 to 4939, 4931' and 4932' are opened in order to disconnect the wipers 4914 to 4919 from the conductors C4871A to E and SM and to remove ground potential from the conductor C4871SU–2 to restore the relays R5230 and R5240 in the precedence transmission unit 5200 (Fig. 52). The relay R4940 also restores to normal, due to the fact that the contacts 4931' have been opened. As a further result of the restoration of the relay R4930, at its contacts 4931, it completes the self-interrupting circuit including the off-normal contacts ON4913, whereby the magnet M3911 is operated and restored until the wipers 4914 to 4919 are again returned to the home contact positions illustrated in the drawings. When this occurs, the off-normal contacts ON4913 are opened to interrupt the circuit, it being understood that the off-normal contacts ON4913 are closed whenever the wipers noted above are in any contact position other than the illustrated home contact position. The miscellaneous switch 4910 is now restored to normal and it may be selected at any time for the purpose of controlling the transmission of two "carriage return" character functions, a "line feed" character function and a "space" character function in the order named to the channel multipling unit 8700.

*Transmitting the routing indicator JWC stored in the channel relay unit 7900*

It will be recalled that the channel selector control unit 4600 (Fig. 46) through the medium of the channel relay selector switch 4601 selected the channel relay unit 7900 as the unit that was utilized in processing the three routing indicators JWCX, JKXY and UKAY. The three above noted four character routing indicators, during the processing, cause the three characters JWC to be registered in the register 8001 of the channel relay unit 7900. The routing indicator JWC identifies the relay switching center to which the present multiple call message must be transmitted for retransmission in the direction of the three tributary stations identified above. Consequently, it will be necessary to transmit the characters JWC registered in the channel register unit 7900 to the cross-office unit X3400 associated with the channel relay unit 7900. Thereafter, the prosign ZVA will also be transmitted to indicate that the relay switching center JWC will be held responsible for the retransmission of the present multiple call message to each of the tributary stations JWCX, JKXY, UKAY.

At the time the channel relay selector switch 4600 selected the channel relay unit 7900, the test relay R4630 (Fig. 46) was operated. The closing of the contacts 4634 caused the miscellaneous switch 4910 to transmit the miscellaneous controls to the monitor page printer 8750 so that the last-mentioned unit is now in condition to start a new line of typing as the characters JWC registered in the channel relay unit 7900 are transmitted to the associated cross-office unit X3400.

Referring again to Fig. 49, it will be recalled that when the wiper 4919 of the miscellaneous switch 4910 engaged the contact 5 in its associated contact bank, the relay R4940 operated. The last-mentioned relay, at its contacts 4943, applies ground potential over a circuit including the contacts 4892, conductor C1390SC extending to Fig. 13 in order to operate the relay R1305 (Fig. 13), which locks itself in its operated position to the grounded conductor C1393SUA. Also, the ground potential at the contacts 4943 is extended by way of the contacts 4892, conductor C4635SC extending to Fig. 46, contacts 4633, wiper 4616, conductor C4681RL1 extending to Fig. 79 and the lower winding of the transmission relay R7960, to battery. The transmission relay R7960 in the channel relay unit 7900 is now operated. However, attention is directed to the fact that the corresponding transmission relays in all of the other channel relay units, such as 7900, whether in use in connection with the present multiple call or not, remain in their restored positions.

Although the transmission relay R7960 operated over the above mentioned circuit, including ground at contacts 4943, it will be recalled that the relay R4940 is subsequently restored to normal to remove the initial operating ground potential from both the conductor C1390SC and the conductor C4635SC. When this occurs, the transmission relay R7960 will be locked in its operated position in multiple with the relay R1305 over a circuit which may be traced from battery by way of the lower winding of the relay R7960, conductor C4681RL1 extending to Fig. 46, wiper 4616, contacts 4633, conductor C4635SC extending to Fig. 48A, conductor C1390SC extending to Fig. 13 (in multiple with the winding of the relay R1305), contacts 1306, conductor C1393SUA extending to Fig. 46, contacts 4622, conductor C4682P3 extending to Fig. 52, and contacts 5254, to ground. Thus, the transmission relay R7960 in the channel relay unit 7900 is now locked in its operated position in multiple with the relay R1305 in the miscellaneous control unit 1000 as long as the conductor C1393SUA is grounded.

In the channel relay unit 7900, the transmission relay R7960 completes, at its contacts 7961, the previously described signalling circuit over which signals may now be repeated from the channel multipling unit 8700 to the cross-office unit X3400 associated with the channel relay unit 7900. At the contacts 7962, the transmission relay R7960 again completes the operating circuit for the magnet M8241 of the transmission counting switch 8275 so that an accurate count may be kept of the number of times the transmission relay R7960 is operated and then restored. The magnet M8241 is restored to advance its wipers 8243 and 8244 each time the relay R7960 restores to normal. At the contacts 7963 to 7965, inclusive, the transmission relay R7960 prepares points in a test circuit to be described hereinafter, whereby, a test is made to determine whether or not routing indicators having the first character J, B or U has been processed through the channel relay unit 7900 two times and whether or not a network prosign JJJ, BBB or UUU has been transmitted. The first and second time that each character J, B and U, as a first character of the routing indicator is processed through the channel relay unit 7900, it is registered respectively in the J register 8274, the B register 8273 and the U register 8272 shown in Fig. 82.

As a further result of the operation of the test relay R4630 (Fig. 46), the ground potential on the conductor C4683P3 is extended by way of the contacts 4622, 4652 and 4631, wiper 4615, conductor C4681TR1 extending to Fig. 81 and upper winding of the relay R8150 to battery, the winding of the relay R8140 to battery, and the lower winding of the translation connect relay R8010 to battery, in order to operate the three relays noted in the channel relay unit 7900.

As previously noted, the relays in the register 8001 of the channel relay unit 7900 have been operated in code combinations so that the first, second and third character register relays respectively register the characters JWC. The operated relays have been locked in their operated positions to ground at contacts 8111 on the operated stick-up relay R8110. Therefore, as soon as the relay R8010 operates, at its contacts 8010–1A to 1E, inclusive, 8010–2A to 2E, inclusive, 8010–3A to 3E, inclusive, it connects all fifteen relays in the register 8001 to the conductors C5491–1A to 1E, inclusive, C5491–2A to 2E, inclusive, and C5491–3A to 3E, inclusive, terminating in the bank contacts accessible to the ZVA switch 5440 in Fig. 54. In the register 8001, the first character J is registered in code form by the operated condition of the relays R8020–1A, R8020–1B and R8020–1D. The locking ground potential for the three relays noted is now extended by way of the contact on the operated relay R8010, conductors C5491–1A, 1B and 1D terminating in the contacts 1 accessible to the wipers 5444, 5445 and 5447 of the ZVA switch 5440. The second character W is registered in the register 8001 by the operated condition of the relays R8030–2A, 2B and 2E and the locking ground potential for these relays is applied to the conductors C4991–2A, 2B and 2E terminating in the contacts 2 accessible to the wipers of the ZVA switch 5440. The third character C is registered in the register 8001 by the operated condition of the relays R8040–3B, 3C and 3D and the locking ground potential for these relays is extended by way of the conductors C5491–3B, 3C and 3D to the contacts 3 to the accessible wipers of the ZVA switch 5440.

In view of the foregoing, it will be appreciated that the operation of the relay R8010 cause the relays in the register 8001 to mark the contacts 1, 2 and 3, respectively, accessible to the wipers 5444 to 5448 of the ZVA switch 5440 in accordance with the routing indicator JWC identifying the relay switching center that is to be held responsible for the retransmission of the present multiple call message in the direction of the three tributary stations JWCX, JKXY and UKAY. Remaining contacts 4 to 8, inclusive, accessible to the wipers of the ZVA switch 5440 are marked in accordance with a "space" character function, the "ZVA" multiple call prosign and a "space" character function, in the order named.

In order to transmit the information marked in code form in the bank contacts of the ZVA switch 5440, it is now necessary to operate the relay R5480 in order to connect the wipers 5440 to 5449, inclusive, to the conductors C5503A to E, inclusive, and SM. The relay R5480 is operated over a circuit which best be traced from battery, the winding of the relay R5480, off-normal contacts ON5443a, conductor C1394RI–2 extending to Fig. 13, contacts 1307 on the operated relay R1305, contacts 1384, and ground at contacts 1116 on the operated start relay R1110. Thus, the relay R5480 actually operates as soon as the relay R1305 operated as previously noted. The relay R5480 immediately locks itself by way of its contacts 5483 to the grounded conductor C1394RI–2 over a circuit which is now independent of the off-normal contacts ON5443a included in the initial operating circuit for the relay. As a further result of the operation of the relay R5480, it renders the wipers 5444 to 5449 effective by closing its contacts 5484 to 5489, inclusive; it connects the magnet M5441 to the previously described impulsing circuit from the motor driven impulser 5201, at its contacts 5482; and, at its contacts 5481' it prepares the locking circuit for the relays R5240 and R5230.

The next time the contacts 5275 on the continuously operating motor impulser 5201 are closed, following the operation of the relay R5480, a circuit is completed for operating the relay R5230 and as soon as the operating circuit is opened at the contacts 5275, the relay R5230 locks itself in its operated position in series with the relay R5240 to ground at contacts 5481'. The relay R5240 operates in series with the locking circuit for the relay R5230 to complete the impulsing circuit for the magnet M5441, at its contacts 5241, and to prepare, at its contacts 5244, the impulsing circuit for the magnet M5504 of the marking transmitter distributor 5503.

After the closing of the contacts 5241, the next pulse transmitted by the contacts 5274 on the motor driven impulser 5201 operates and restores the magnet M5441 on the ZVA switch 5440. Operation and then restoration of the magnet M5441 causes the wipers 5444 to 5449, inclusive, to be advanced from the illustrated normal home contact positions into engagement with the contacts 1. In this position the above noted wipers connect the conductors C5491–1A to C5491–1E, inclusive, to the conductor C5503A to E, inclusive, extending to the marking transmitter distributor 5503. Therefore, the code marking on the above noted conductors in accordance with the first character J registered in the register 8001 of the channel relay unit 7900 is marked in the marking transmitter distributor 5503. Also, the wiper 5449 upon engaging the contact 1 connects the impulsing contacts 5275 on the motor driven impulser 5201 to the circuit including the conductor C5503SM so that the next pulse will operate and then restore the magnet M5504. Operation of the magnet M5504 causes the distributor 5503 to transmit code signals corresponding to the character J over the conductor C1187SIG1 extending to Fig. 11, and then by way of the contacts 1153, conductor C1188SIG extending to Fig. 87 in order to control the relays R8710 to R8710–3, accordingly. These relays respectively repeat the code signals corresponding to the character J to all of the channel relay units, such as 7900. However, at the present time, only the channel relay unit 7900 is in condition to receive the repeated signals corresponding to the character J. Thus, at the contacts 8721, the relay R8720 repeats the code signals over the conductor C7993SIG1 extending to Fig. 79, contacts 7961 on the now operated transmission relay R7960, contacts 7945, the lower winding of the open line relay R7970 and then over the previously described circuit including the conductor C7992SIG to the cross-office reperforator X3410 in the cross-office unit X3400 associated with only the channel relay unit 7900. Thus, the character J is now perforated in code form on the tape associated with the cross-office reperforator X3410. Also, the relay R8720–4 in the channel multipling unit 8700 repeats code signals at its lower contact to the monitor page printer 8750 where the character J is printed.

The motor driven impulser 5201, at its contacts 5274, now transmits a second impulse to the magnet M5441 to advance the wipers into engagement with the contacts 2. A pulse is then transmitted by the contacts 5275 of the motor driven impulser 5201 to control the marking distributor 5503 in the manner previously described so that the second character W, marked in code form on the conductors C5491–2A to 2E, inclusive, is repeated by the channel multipling unit 8700 to the cross-office unit X3400 and to the monitor page printer 8750.

When the wipers of the ZVA switch 5440 are advanced into engagement with the contacts 3 in the manner described above, the third character C is transmitted in code form over the previously described circuits to the cross-office unit X3400 and to the monitor page printer 8750.

Although it has been assumed in the present description that the three characters JWC identifying a particular relay switching center are registered in the register 8001 of the channel relay unit 7900, it should be understood that any of the three characters identifying any other relay switching center may be registered in the register 8001 and successively transmitted in the manner described.

The magnet M5441 of the ZVA switch 5440 will now be controlled to advance its wiper step-by-step in the manner described above over the contacts 4 to 8, inclusive, to transmit the information marked in code form on these contacts to the cross-office unit X3400 and to the monitor page printer 8750. Thus, the ZVA switch 5440 transmits the following information:

| Bank contacts | Code information |
| --- | --- |
| 1 | J. |
| 2 | W. |
| 3 | C. |
| 4 | space. |
| 5 | Z. |
| 6 | V. |
| 7 | A. |
| 8 | space. |

In view of the foregoing, it will be understood that the above information is perforated in code form on the tape associated with the cross-office reperforator X3410 in the cross-office unit X3400 and the same information is printed on one line of the page in the monitor page printer 8750.

The next pulse transmitted by the motor driven impulser 5201 to the magnet M5401 advances the wipers 5444 to 5449, inclusive, into engagement with the contacts 9. In this position a circuit is completed from battery, the winding of the magnet M5504, conductor C5503SM, contacts 5489, wiper 5449 in engagement with the contact 9, conductor C1394PH3 extending to Fig. 13 and the uper winding of the relay R1380, to ground. The relay R1380 operates over this circuit but due to the high resistance of its upper winding, the magnet M5504 does not operate. At its contacts 1385, the relay R1380 completes a locking circuit for itself which includes its lower winding and the grounded conductor C1393SUA.

The operation of the relay R1380 terminates the transmission of the information marked on the contact banks accessible to the wipers of the ZVA switch 5440. More specifically, at its contacts 1384, the relay R1380 disconnects the ground potential at the contacts 1116 from the circuit including the contacts 1307 and the conductor C1394RI-2 extending to Fig. 54 in order to restore the relay R5480. Restoration of the relay R5480, at its contacts 5482, disconnects the magnet M5441 from the impulsing circuit previously described and, at its contacts 5481, connects the magnet to a self-interrupting circuit including the off-normal contacts ON5543. The magnet M5441 now operates and restores until its wipers 5444 to 5449 have been advanced step-by-step in a clockwise direction into engagement with the illustrated home contact positions. In this position, the off-normal contacts ON5543 are opened to terminate the self-interrupting circuit for the magnet M5441. Also, the off-normal contacts ON5443a are closed to again prepare the operating circuit for the relay R5480.

At its contacts 1381, the relay R1380 applies ground potential to the conductor C1392COM extending to Fig. 84, in order now to render effective the wipers 8435 and 8444 of the units digit register 8436U and the tens digit register 8436T.

Figure 48:
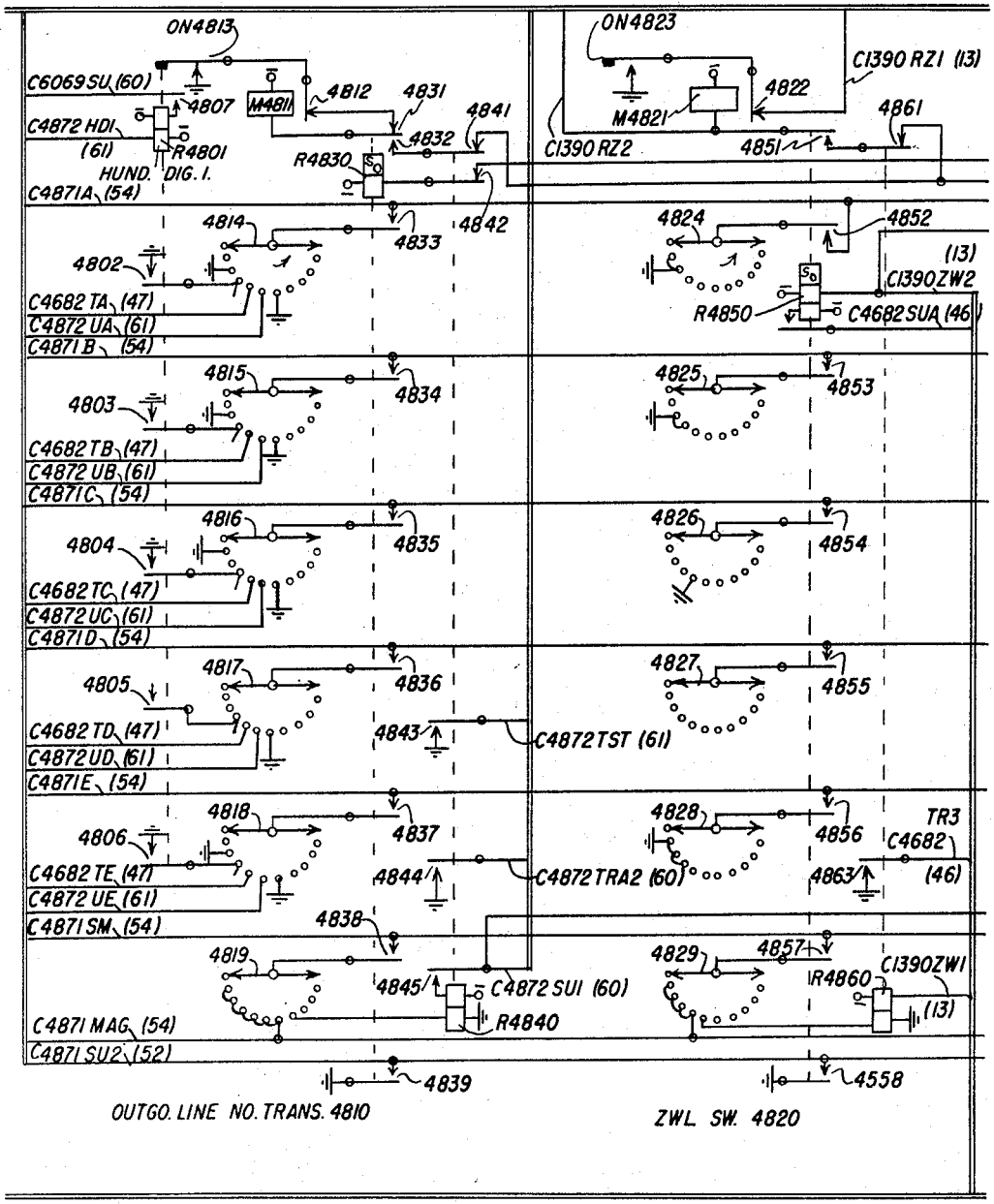
Figure 48A:
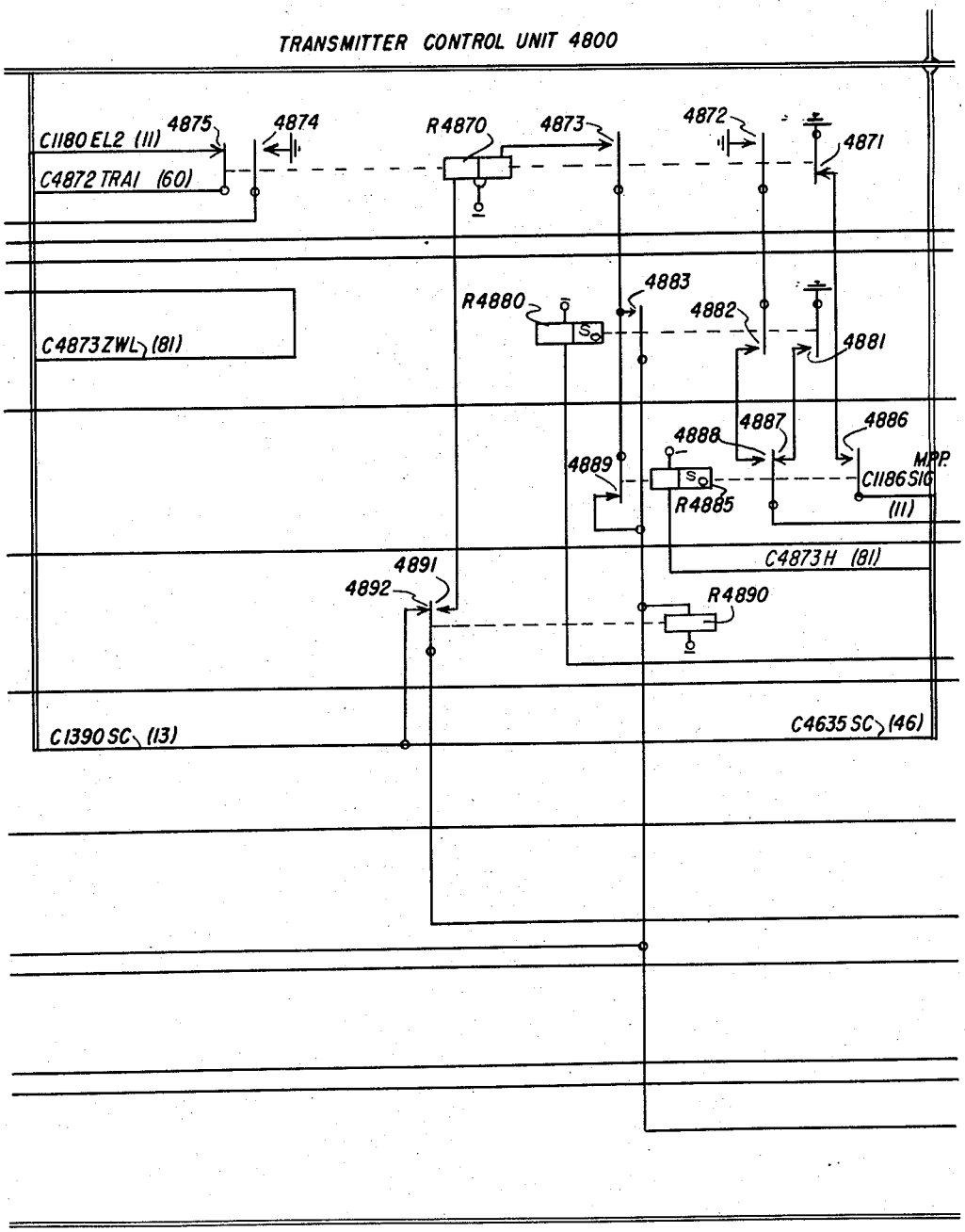

At its contacts 1382, the relay R1380 disconnects the conductor C1390RZ1 from the conductor C1390RZ2, both conductors extending to Fig. 48, thereby to interrupt a point in the self-interrupting circuit for the magnet M4821 of the ZWL switch 4820.

At its contacts 1383, the relay R1380 interrupts a further point in the circuit including the conductor C1393RI-1, which circuit has already been interrupted at the contacts 1308 by the previously described operation of relay R1305. Finally, at its contacts 1386, the relay R1380 prepares a point in the circuit including the conductor C1394-ILK extending to Fig. 53.

As a further result of the restoration of the relay R5480, as noted above, at its contacts 5481', it interrupts the previously described locking circuit for the relays R5230 and R5240 which now restore to normal. The relay R5240, at its contacts 5241, interrupts the circuit including the contacts 5274 on the motor driven impulser 5201 and, at its contacts 5244, it interrupts the circuit including the impulsing contacts 5275 on the impulser 5201. Also, at its contacts 5242 it reapplies ground potential to the conductor C1394-ILK extending to Fig. 13 for the purpose of making a test to determine whether or not a ZWL prosign is to be transmitted.

*Determining whether or not a ZWL prosign should be transmitted in connection with the ZVA pilot heading information*

It will be recalled that at the time the channel selector switch control unit 4600 associated itself with the channel relay unit 7900 through the channel relay selector switch 4601, the test relay R4630 operated. At its contacts 4633 and 4634, the above mentioned relay initiated the operations whereby the relay switching center routing indicator JWC registered in the register 8001 of the channel relay unit 7900 followed by the ZVA prosign are transmitted. Also, at the contacts 4631, the test relay R4630 applied ground potential to the conductor C4681TR1 extending to Fig. 81 in order to operate the relays R8010, R8140 and R8150. The relay R8010 in operating connected the register relays in the register 8001 so that the JWC relay switching center routing indicator is transmitted as previously described. During the time this transmission is being made, the relays R8140 and R8150 prepared circuits for determining whether a ZWL prosign should also be transmitted after the previously mentioned ZVA prosign.

It should be noted that a ZVA prosign following a three character routing indicator identifying a particular relay switching center informs that center that it must process the multiple call message in substantially the same manner as is being described in connection with the present relay switching center UAC to route the multiple call in the direction of certain designated tributary stations. The ZWL prosign is used to inform that relay switching center that it must retransmit the multiple call message to all of the tributary stations identified by the routing indicators listed in the original message, except to those stations that are identified and listed immediately following the ZWL prosign. In the present system, a maximum of four routing indicators may be listed after the ZWL prosign, that need not be processed.

In order to determine whether a ZWL prosign is to be transmitted, the relay R8140 in the channel relay unit 7900 connects the ground potential at its contacts 8149 and 8141' to the wipers 8264 and 8257, respectively. In this connection it should be understood that the units register 8276 is operated and restored each time a routing indicator is processed through the channel relay unit 7900 under control of the contacts 8154 on the relay R8150. In the present example, the channel relay unit 7900 has processed the routing indicators JWCX, JKXY and UKAY and as a result thereof has registered the routing indicator JWC in the register 8001. Consequently, the units register 8276 has been operated three times so that its wipers 8253 to 8257 are in engagement with the contacts 4 in the associated contact banks. The tens register 8277 has not been operated inasmuch as less than ten routing indicators have been processed through the channel relay unit 7900. Therefore, its wipers 8263 to 8265 stand in engagement with the contacts 1 in the associated contact banks. The ground potential applied to the wiper 8264 is now extended by way of the conductor C8271T0 extending to Fig. 85 in order to operate the relay R8520T0. It may be well to mention that the remaining contacts accessible to the wiper 8264 are connected respectively to nine relays, 8521T1 to T9, inclusive, which relays may be individually operated in accordance with the position of the wiper 8264. Each of the tens relays 8520T0 to T9, inclusive (only four of the relays being shown) are provided with ten contacts A to J, inclusive, and each of armature springs of the one hundred contacts noted are connected respectively to one hundred terminals 0 to 99, inclusive, block TB8550B. The corresponding make contacts of each of the ten relays noted are multipled as illustrated to ten separate leads 0 to 9, inclusive, to contacts on certain unit relays R8620U0 to U9, inclusive.

The ground potential applied to the wiper 8257 by the operated relay R8140 is extended over the conductor C8271U3 (the wiper being in engagement with the contact 4) to Fig. 86 and then by way of the contact U3 on the relay TUR to the winding of the relay R8620U3. The relay R8620U3 now operates and, at its right-hand make contact completes a circuit for the relay R8620U2 and the latter relay upon operating, at its right-hand make contacts, completes the operating circuit for the relay R8620U1, and the relay R8620U1 in turn operates relay R8620U0 four relays R8620U0, U1, U2 and U3 are operated when three routing indicators have been processed through the channel relay unit 7900.

The foregoing four relays 8620U0 to U3, inclusive, and the relay R8520T0 remain operated during the time that the routing indicator JWC followed by the prosign ZVA are being transmitted through the channel relay unit 7900 to its associated cross-office unit X3400. After the foregoing information has been transmitted, it will be recalled that the ZVA switch 5440 in engagement with the contacts 9 completed, through its wipers 5449, a circuit including the conductor C1394PH3 extending to Fig. 13 and thereby operated the relay R1380 in Fig. 13. The controls made in response to the operation of the relay R1380 have previously been described but it should be noted that, at the contacts 1381, ground potential is connected by way of the conductor C1392CON extending to Fig. 84 to the wipers 8435 and 8444 on the units and tens digit registers 8436U and 8436T. The units digit register 8436U has been operated to advance its wipers one step each time a routing indicator listed in the original received multiple call message has been processed to a channel relay unit, such as 7900, by the multiple call equipment.

In the present example, the four routing indicators UACZZ, JWCX, JKXY and UKAY have been processed by the multiple call equipment. Therefore, the wipers 8432 to 8435, inclusive, of the units digit register 8436U are in engagement with the contacts 4 in the associated contact banks. It should be understood that each time ten routing indicators are processed the tens digit register 8436T will advance its wipers one step to indicate the corresponding tens digit. In the present example, however, the tens digit 8436T has not been operated and, therefore, its wipers are in engagement with the contacts 0. The ground potential applied to the wiper 8444 of the tens digit register 8436T is extended by way of the conductor terminating in the associated bank contact 0 to operate the relay R8510T0. There are ten relays in the group designated 8510-T0 to T9, inclusive, but only three of the relays are shown.

The ground potential applied to the wiper 8435 of the units digit register 8436U is extended by way of the conductor U4, connected to the contact 4, to the E contacts on the operated relay R8510T0. Each of the ten relays R8510-T0 to T9, inclusive are provided with ten contacts A to J and each of the armature springs of the one hundred contacts are connected respectively to one hundred terminals 0 to 99, inclusive, provided on the terminal block TB8550A. The make contacts of the various armatures noted above are multipled together in groups of ten and connected respectively to the ten conductors U0 to U9, inclusive, terminating in the contacts 0 to 9, inclusive, accessible to the wiper 8435. By selectively operating the tens relay R8510T0 to T9 and by selecting the ten different contacts accessible to the wiper 8435, one hundred different terminals may be identified in the terminal block TB8550A.

The terminal blocks TB8550A and TB8550B provide a strapping or jumper field, whereby, any one of the one hundred terminals on the terminal block TB8550A may be strapped to particular individual terminals on the terminal block TB8550B. As partially illustrated on the drawings, the strapping arrangement between the terminal blocks is such that a ZWL prosign will be utilized if the difference between the number of routing indicators of a multiple call message and the number of routing indicators processed by any single channel relay unit is 1, 2, 3 or 4. In other words, a ZWL prosign will be transmitted and thereafter no more than 1, 2, 3 or 4 routing indicators will be listed to inform the next relay switching center that it must transmit all of the routing indicators of the original multiple call message except the 1, 2, 3 or 4 routing indicators appearing immediately after a ZWL prosign. Thus, strapping between the terminals 11 to 99 on the terminal block TB8550A and the terminals 7 to 95 on the terminal block TB8550B there is a slip of four numbers. The terminals 4 to 10, inclusive, on the terminal block TB8550A are strapped to the terminals 3 to 6 on the terminal block TB8550B in the manner illustrated and the remaining terminals are not strapped.

With the strapping arrangement between the terminal blocks arranged as noted above, the ground potential on the conductor C1392CON is now extended by way of the wiper 8435 the engaged contact 4, conductor U4, contacts E on the operated tens relay R8510T0, terminal 4 on the terminal block TB8550A strapped to terminal 3 on terminal block TB8550B, contact D on the operated tens relay R8520T0, contacts 8618, left-hand contacts of the operated relay R8620U3, conductor C1392ZW3 extending to Fig. 13, contacts 1361, and the winding of the ZWL1 relay R1350, to battery. The relay R1350 now operates and is an indication that a ZWL prosign will be transmitted following the previously noted ZVA prosign.

It should be mentioned at this time that the circuit for the relay R1350 included the contacts 1361 on the cut-off relay R1360. The cut-off relay R1360 is operated at this time over a circuit including the conductor C1389CON extending to Fig. 81 to the contacts 8141. However, at this moment, the relay R8140 is in its operated position and the cut-off relay would normally be in its restored position if only one channel relay unit has been used. In the present multiple call message, however, another channel relay unit, similar to the unit 7900, which was used to process the routing indicator UACZZ, is operated and since the conductor C1389CON is multiple connected to all channel relay units, it is grounded by the other channel relay in use over a circuit including contacts corresponding to the contacts 8141 and 7914 in the channel relay unit 7900.

The operated relay R1350, at its contacts 1351, prepares a circuit which is completed incident to the application of ground potential to the conductor C1394-ILK as previously noted. This ground potential is not applied to this conductor until after the ZWL test has been made and has operated relay R1350. Therefore, the ground potential on the conductor C1394–ILK is extended by way of the contacts 1386, 1372 and 1351, conductor C1390ZW2 extending to Fig. 48 in order to operate the relay R4850 over a circuit including its upper winding. The last-mentioned relay upon operating locks itself over a circuit including its lower winding and its inner make contact, conductor C4682SUA extending to Fig. 46, contacts 4622 and the grounded conductor C4683P3 extending to Fig. 52. It should also be noted that the ground potential applied to the conductor C1390ZW2, in order initially to operate the relay R4850, is also extended over a branch circuit (in Fig. 48) by way of the conductor C4873ZWL extending to Fig. 81, contacts 8148 and the winding of the ZWL relay R7950 in the channel relay unit 7900, to battery. The last-mentioned relay operates over this circuit and, at its contacts 7951, locks itself to ground at contacts 7914. Thus, the relay R7950 remains operated until the start relay R7910 in the channel relay unit 7900 is restored to normal.

In its operated position, the relay R7950 marks the channel relay unit 7900 as one of the units in which a ZWL prosign is used to inform the next relay switching center that all of the routing indicators in the original multiple call message must be retransmitted except those routing indicators listed immediately following the ZWL prosign. The operation of the relay R4850, as noted above, renders the ZWL switch 4820 effective to transmit the ZWL prosign through the channel relay unit 7900 to its associated cross-office unit X3400. However, before describing this operation, it is advisable to further consider the operations involving the determination of whether or not a ZWL prosign is to be used.

Referring again to Figs. 84, 85 and 86, it should be appreciated that if the units digit register 8436U had been operated to indicate that only three routing indicators had been processed in connection with the original multiple call message, then the wiper 8435 would be in engagement with the contact 3 terminating the conductor U3 and no circuit would have been completed between the conductor C1392CON and the conductor C1392ZW3 as previously described. In such an event the ZWL1 relay R1350 could not have been operated and would thereby prevent the transmission of a ZWL prosign. Also, for example, if five or more routing indicators have been processed from the original multiple call message and only three routing indicators had been processed through the channel relay unit 7900, the circuit for the ZWL1 relay R1350 would also have been prevented and no ZWL prosign will be transmitted. It is only possible to transmit the ZWL prosign when the combinations of relays R8510T0 to R8510T9, inclusive, and the relays R8520T0 to R8520T9, inclusive, and the marking on the units digit register R8436U and the operated left-hand make contacts on the relays R8620–U0 to U9, inclusive, will inner-connect the conductor C1392CON and the conductor C1392ZW3 through the strappings between the terminal blocks TB8550A and TB8550B.

Another special arrangement provided in the prosign determining unit 8400 (Figs. 84 to 86, inclusive) pertains to the condition wherein the number of routing indicators of the original multiple call message includes a tens digit which is the same as the tens digit of the number of routing indicators processed through the channel relay unit, such as 7900 being considered. For example, if 11 routing indicators have been processed by the multiple call equipment, the tens digit register 8436T will have its wiper 8444 in engagement with the contact terminating the conductor T1 to complete the operating circuit for the relay R8510T1. The units register relay 8436U will have its wiper 8435 into engagement with the contact terminating the conductor U1 to apply ground potential by way of the B contact on the operated relay R8510T1 to the terminal 11 on the terminal block TB8550A. If the channel relay unit being considered for this assumed condition is the unit 7900 and it has processed, for example, ten routing indicators therethrough, the tens digit register 8277 will have its wiper 8264 in engagement with the contacts terminating the conductor C8271T1 in order to operate the relay R8520T1 and the units register 8276 will have its wiper 8257 in engagement with the contacts terminating the conductor C8271U0. Also, the wiper 8255 on the units register 8276 will extend ground potential by way of the contacts 8142′, conductor C8161–123 extending to Fig. 84, contacts 8511 on the operated tens relay R8510T1, contacts 8514 on the operated tens relay R8520T1 to operate the relay R8610. The relay R8520T1, at its contacts 8521, also causes the operation of the relay R8520T0. With the relay R8610 operated, the ground potential applied to the conductor C8271U0 by the wiper 8257 is now extended by way of the make contact TU0 on the relay R8610 in order to operate the relay R8620TU0. The latter relay, at its right-hand make contact, immediately completes the chain circuit whereby all of the relays illustrated above the relay R8620TU0 are operated one after another. Therefore, conductor C1392ZW3 is connected through the left-hand make contacts of the relays R8620U6 to U9 and R8620TU0 to the make contacts A, G, H, I and J on the operated relay R8520–T1 and T0. Thus, the terminals 10, 16, to 19, 0 and 6 to 9 on the terminal block TB8550B are, for the purpose of the present illustration, connected to the conductor C1392ZW3.

Also, the ground potential on the conductor C1392CON is now connected by way of the B contact on the operated tens relay R8510T1 to the terminal 11 on the terminal block TB8550A which is strapped to the terminal 7 on the terminal block TB8550B. A circuit is now completed between the conductor C1392CON and the conductor C1392ZW3 in order to operate the ZWL1 relay R1350 so that the ZWL prosign will be transmitted.

It will thus be seen from the foregoing arrangement that if eleven routing indicators are processed through the multiple call equipment and ten of these routing indicators are processed through one of the channel relay units, such as 7900, the ZWL1 relay R1350 will be operated over a circuit including the terminals 11 and 7 respectively, provided on the terminal block TB8550A and B. This is possible, due to the fact that the relay R8610 is operated to transfer the conductor, such as C8271U0 to U3, inclusive, from the tens relay R8620U0 to U3, inclusive, to the auxiliary tens relay R8620TU0 to TU3, respectively. At the contacts 8612, 8614, 8616 and 8618, the relay R8610 disconnects certain of the left-hand make contacts on the units relays and, at the contacts 8611, 8613, 8615 and 8617, it connects instead certain left-hand make contacts on the auxiliary unit relays R8620TU0 to TU3, inclusive. Finally, at the contacts 8619 and 8619′, the relay R8610 disconnects the circuit including the left-hand make contacts of the units relays R8620U4 and R8620U5 from the E and F contacts on the tens relay R8520T0 to T9, inclusive.

It will be seen that in the foregoing circuit arrangement of the prosign determination unit 8400, that if twelve routing indicators have been processed and either ten or eleven of such routing indicators have been processed through a given channel relay unit, then the transfer condition exercised by the relay R8610 causes the units relays R8620U7 and R8620U8 to be operated in the chain order to complete a circuit whereby a ZWL prosign will be transmitted. If thirteen routing indicators have been processed by the multiple call equipment on either, ten, eleven or twelve of such routing indicators have been processed by a given channel relay unit, such as 7900, then the units relay R8620U9 will also be operated under the transfer condition exercised by the relay R8610 so that the ZWL prosign will be transmitted. The same arrangement as described above will be repeated for each of the tens groups 20, 30, etc., to 90. It being understood that whenever 18 or 19 (28, 29, etc., to 98, 99) routing indicators are processed by the multiple call equipment on either 10, 11, 12 or 13 (20 to 23, etc., to 90 to 93) routing indicators are processed by any given channel relay unit, the operation of the transfer relay R8610 under such conditions, at its contacts 8619 and 8619', will prevent operation of the units relays R8620U4 and U5 ineffective to cause the transmission of a ZWL prosign.

The pattern followed in the prosign determination unit 8400 is such that no more than four routing indicators may be listed after a ZWL prosign. Consequently, the terminals above 9 on the terminal block TB8550A are strapped respectively with a slip of four to the terminals on terminal block TB8550B. The terminals below ten on the terminal block TB8550A are strapped in the manner shown to the terminals on the terminal block TB8550B.

The pattern of operation of the units relays (R8620) that must be operated when a certain number of routing indicators have been processed through a given channel relay unit, such as 7900, and a predetermined number of routing indicators are included in a message is as follows:

| Number of routing indicators in a message | Number of routing indicators in a given channel relay unit | Relays (R8620) that must operate |
| --- | --- | --- |
| 11 | 10 | U7. |
| 12 | 10, 11 | U8. |
| 13 | 10, 11, 12 | U9. |
| 14 | 10, 11, 12, 13 | TU0. |
| 15 | 11, 12, 13, 14 | TU1, TU1, TU1, U1 Resp. |
| 16 | 12, 13, 14, 15 | TU2, TU2, U2, U2 Resp. |
| 17 | 13, 14, 15, 16 | TU3, U3, U3, U3 Resp. |
| 18 | 14, 15, 16, 17 | U4. |
| 19 | 15, 16, 17, 18 | U5. |
| 20 | 16, 17, 18, 19 | U6. |

The above pattern is repeated for each tens group 20, 30, etc., to 90, inclusive, for the purpose of providing a ZWL prosign.

Returning again to the point in the previous description involving the operation of the relay R4850 to connect the ZWL switch 4820 (Fig. 48), it will be recalled that the relay R4850 operated and locked itself to the conductor C4682SUA because a ZWL prosign is to be transmitted following the transmission of the ZVA prosign previously described.

As soon as the relay R4850 operates, it connects the winding of the magnet M4821 over a circuit including the contacts 4851 and 4861, conductor C4871SWP extending to Fig. 54 and the impulsing contacts 5274 on the motor driven impulser 5201. Also, at its contacts 4852 to 4857, inclusive, it connects the wipers 4824 to 4829, inclusive, on the ZWL switch 4820 over previously described circuits including the conductors C4871A to E and SM extending to Fig. 54 and then by way of the conductors C5503A to E and SM to the marking transmitter distributor 5503. Finally, at its contacts 4858, the relay R4850 applies ground potential by way of the conductor C4871SU-2 extending to Fig. 54 in order to provide the operating circuit for the relay R5240 and, in series therewith, the locking circuit for the relay R5230.

In view of the previous description involving the operation of the motor driven impulser 5201 and the relays R5230 and R5240, whereby, a rotary switch of a switch, such as the ZWL switch 4820, is operated step-by-step to transmit code markings in accordance with information pre-wired in the banks of the switch, the detailed operation of the ZWL switch 4820 will not be repeated at this time, it being understood that the magnet M4821 will operate and restore to advance its wipers 4824 to 4829, inclusive, so that the marking transmitter distributor 5503 will repeat code signals over the conductor C1187SIG1 to the channel multiplying unit 8700 in the manner previously described. The ZWL switch transmits information as it advances its wipers as follows:

| Bank contacts | Code information |
| --- | --- |
| 1 | Z. |
| 2 | W. |
| 3 | L. |
| 4 | space. |

The above information is transmitted in the order named to the channel multiplying unit 8700 where it is repeated over the signalling conductor C7993SIG1 through the channel relay unit 7900 to the reperforator in the cross-office unit X3400 in the same manner as has been described previously. The information is also repeated by the relay R8720-4 to the monitor page printer 8750.

As soon as the wiper 4829 of the ZWL switch 4820 engages contact 5 a circuit is completed for operating the relay R4860 to indicate that the ZWL prosign has been transmitted through the used channel relay unit 7900 and also to the monitor page printer 8750. The operating circuit includes the lower winding of the relay and is the same as has been described previously in connection with, for example, the relay R4940 (Fig. 49). Upon operating the rleay R4860, at its contacts 4863, applies ground potential to the conductor C4682TR3 extending to Fig. 46 in order to operate the relay R4620 in the channel selector switch control unit 4600.

The operation of the relay R4620 in the channel selector switch control unit 4600 causes the associated channel selector switch 4601 to now search for another channel relay unit, such as 7900, that has been utilized in processing two or more of the routing indicators of a multiple call message and, consequently, requires a ZVA prosign. More specifically, the relay R4620 upon operating completes, at its contacts 4623, a circuit including the grounded conductor C4683P3 for operating the magnet M4610. Also, at its contacts, 4621, the relay R4620 interrupts the circuit for the test relay R4630 which now restores to normal. Finally, at its contacts 4622, the relay R4620 disconnects the grounded conductor C4683P3 from the conductors C4682SUA extending to Fig. 48, and C1393SUA extending to Fig. 13.

In Fig. 48 it will be seen that the removal of ground potential from the conductor C4682SUA will permit the relay R4850 now to restore to normal. Consequently, the relay R4850, at its contacts 4851 to 4857, disconnects the ZWL switch 4820 from the previously described circuits whereby the ZWL code signals are transmitted to the channel relay unit 7900 and to the monitor page printer 8750. Furthermore, at its contacts 4858, the relay R4850 removes ground potential from the conductor C4871SU-2 extending to Fig. 54 thereby to interrupt the previously described locking circuit for the relays R5240 and R5230.

The removal of ground potential from the conductor C1393SUA extending to Fig. 13 interrupts the locking circuit for the operated relay R1380, which restores to normal; it interrupts the locking circuit for the relay R1305, which restores to normal; and, it removes ground potential from the circuit including the conductor C1390SC extending to Fig. 48A and conductor C4635SC extending to Fig. 46 in order to restore the transmission relay R7960 in the channel relay unit 7900. The last-mentioned relay, as previously noted, interrupts the signalling circuit, including its contacts 7961, to prevent subsequent signals from being transmitted through the channel relay unit 7900.

Referring again to relay R1380 (Fig. 13) it will be noted that, at its contacts 1384, it recompletes the previously described circuit for operating the delay relay R1370; and, at its contacts 1381, it removes ground potential from the conductor C1392CON extending to Fig. 84 in order to restore the operated tens relay R8510T0. The ground potential on the conductor C1392CON was previously used in conjunction with the jumper field between the terminal block TB8550A and TB8550B to operate, over the conductors C1392ZW3, the ZWL1 relay R1350 to cause transmission of the ZWL prosign.

As a further result of the restoration of the relay R1380, at its contacts 1382, it interconnects the conductors C1390RZ1 and C1390RZ2 extending to Fig. 48 thereby to complete the self-interrupting circuit for the magnet M4821 of the ZWL switch 4820. This self-interrupting circuit includes the off-normal contacts ON4823, which are closed whenever the wipers of the switch are not in the illustrated home contact positions, contacts 4822, the interconnected conductors C1390RZ1 and C1390RZ2 and the winding of the magnet M3821, to battery. The magnet now operates and restores until the wipers 4824 and 4829, inclusive, are advanced step-by-step in a counter-clockwise direction to the illustrated home contact positions. When this occurs, the off-normal contacts ON4823 are opened in order to terminate further operation of the magnet M4821.

In the above description it was pointed out that the relay R4850 restored to normal in order to disconnect the ZWL switch 4820 from the previously described code signalling circuits and in order to restore the relay R4860. Consequently, at the contacts 4863, the relay R4860 removes ground potential from the conductor C4682TR3 extending to Fig. 46 thereby permitting the relay R4620 to restore to normal. As a result thereof, at its contacts 4623, the relay R4620 interrupts the circuit for the magnet M4610 so that the magnet now restores to normal and advances its wipers 4614 to 4616, inclusive, one step in a counter-clockwise direction.

If another channel relay unit, such as 7900, has two or more routing indicators processed therethrough, the corresponding channel relay unit will be marked in the bank contacts accessible to the wiper 4614. Therefore, the magnet M4610 will continue to operate and restore over its original stepping circuit, including the interrupter relay R4640 and ground potential on the conductor C4683P3 until the test relay R4630 is again operated. In other words, the channel relay selector switch 4601 will search for another channel relay unit that is connected to an outgoing line and over which a newly constructed ZVA prosign must be transmitted to a subsequent relay switching center.

As far as the multiple call message being handled at the present relay switching center UAC is concerned, there is no other channel relay unit that has been used to process more than two routing indicators. Therefore, magnet M4610 of the channel relay selector switch 4601 will operate and restore to advance its wipers step-by-step until they reach the illustrated home contact positions. When this occurs, further stepping under control of the magnet M4610 will be terminated. In this connection it will be recalled that the off-normal contacts ON4618 are closed as soon as the wipers 4614 to 4616 are advanced from the illustrated home contact positions and complete a circuit for operating the relay R4660. The latter relay locks itself in its operated position over a circuit including the contacts 4662 and 4672 to the grounded conductor C4683SUD.

When the wipers are again returned to the illustrated home contact positions, the off-normal contacts ON4618 are opened and the off-normal contacts ON4617 are closed. The latter contacts now complete a circuit, including the contacts 4663, for operating the relay R4670 and the latter relay locks itself to the grounded conductor C4683SUD. As a further result of the operation of relay R4670, at its contacts 4672, it interrupts the circuit for relay R4660 and, at its contacts 4674, it interrupts the circuit for the relay R4650. Accordingly, relays R4650 and R4660 now restore to normal. Finally, at its contacts 4675, the relay R4670 applies ground potential to the conductor C4684P4 extending to Fig. 60 in order to operate the start reading relay R6040 in the storage control unit 5800. Operation of the last-mentioned relay is an indication to the multiple call equipment that the channel relay units have all been checked to determine whether or not a ZVA prosign is to be transmitted and also to determine whether or not the ZWL prosign is also to be transmitted. Actually, the relay R6040 in operating will initiate controls whereby the routing indicators temporarily stored on tape in the routing indicator tape storage unit 5502 and the line numbers temporarily stored in the outgoing line number tape storage unit 5501 will be withdrawn therefrom one at a time and processed as will be described hereinafter.

*Determining whether or not a network prosign UUU or BBB or JJJ should be transmitted in connection with the ZVA pilot heading information*

From the previous description regarding the transmission of a ZWL prosign following a ZVA prosign, it should be understood that the ZWL prosign is transmitted if it is possible to reduce the number of routing indicators to be listed after the ZVA prosign. In other words, it is a disadvantage to list all of the routing indicators, following a ZVA prosign, and thus indicate that the responsible relay switching center should process the same, if it is possible to reduce the number of routing indicators by merely listing those routing indicators that should not process. Thus, if it is possible to instruct the relay switching center receiving the message transmitted from the present relay switching center to process all of the routing indicators in the original multiple call message except no more than four listed routing indicators, then a ZWL prosign is transmitted for that purpose. However, if it is necessary to list more than four routing indicators following a ZWL prosign, then the ZWL prosign cannot be used. The last-mentioned condition frequently occurs and for this reason the multiple call equipment is arranged to make a further test of the various routing indicators processed through each channel relay unit for the purpose of reducing the number of such routing indicators to be listed following a ZVA prosign. For example, if all of the routing indicators to be transmitted over a particular outgoing line to a next relay switching center are for tributary stations having a first character U, B or J and no routing indicators having a first character U, B or J are to be transmitted over another outgoing line to another relay switching center, then it is possible to inform the next relay switching center of this fact by a network prosign UUU, BBB or JJJ.

If the network prosign is UUU it will thereby inform a particular relay switching center that it is responsible for the retransmission of only the tributary station routing indicators appearing in the original message that have the first character U; if the network prosign BBB is used, the particular relay switching center will be held responsible for the re-transmission of the tributary station routing indicators appearing in the original message that have the first character B; and, if the network prosign JJJ is used, the particular relay switching center will be held responsible for the retransmission of the tributary station routing indicators appearing in the original message that have the first character J. However, the network prosign UUU cannot be transmitted if the ZWL prosign is used. Furthermore, the order of importance of the network prosigns UUU, BBB and JJJ are as indicated and if the UUU prosign cannot be used, it may be possible to use the BBB prosign, and if that prosign cannot be used, it may be possible to use the JJJ prosign.

In order to describe the operation of the apparatus to make the network prosign tests, it will be assumed that when the ZWL test was made through the prosign determination 8400 (Figs. 84 to 86, inclusive), as previously described, and that ground potential could not be applied to the conductor C1392ZW3 extending to Fig. 13. Consequently, the ZWL1 relay R1350 did not operate. As a result thereof, the ground potential applied to the conductor C1394–ILK from Fig. 52, following the transmission of the ZVA prosign, will not be connected to the conductor C1390ZW2 extendng to Fig. 48 to operate the relay R4850 and cause the ZWL switch 4820 to transmit the ZWL prosign. Instead, however, the ground potential on the conductor C1394–ILK from Fig. 52 is extended to Fig. 13 and then connected by way of the contacts 1386, 1372 and 1352 to the upper winding of the UBJ relay R1350. The latter relay operates at this time and, at its contacts 1382, locks itself to the grounded conductor C1393SUA over a circuit including its lower winding. Upon operating the relay R1320 also interrupts, at its contacts 1329, the normally completed circuit for the delay relay R1330 but due to its slow-to-release characteristics, the relay R1330 does not immediately restore to normal.

At its contacts 1322 to 1327, inclusive, the relay R1320 now connects the relays R1340U, R1340B and R1340J to test circuits, whereby, a determination will be made as to whether or not the network prosign UUU, BBB or JJJ can be transmitted through the connected channel relay unit 7900 to its associated cross-office unit X3400. Finally, at its contacts 1321, the relay R1320 applies ground potential to the conductor C1390UBJ extending to Fig. 49 thereby to provide a locking circuit for the relays R4950, R4960, R5030, R3040, R5050 and R5060 depending upon the subsequent operation of any one or more of the relays noted.

The test circuit for the relay R1340U may be tracted from battery through its associated resistor, winding of the relay R1340U, contacts 1326, conductor C1389–2U extending to Fig. 81, contacts 8145 (relay R8140 being operated in the channel relay unit 7900 at this time) to contacts 2 in the bank accessible to the wiper 8234 on the U register 8272. The battery connected side of the relay R1340U is also extended by way of the contacts 1327, conductor C1389U–COM extending to Fig. 81 to the contacts 8142 which are now open under control of the relay R8140. The conductor C1389U–COM is multiply connected to all of the remaining channel relay units, such as 7900, in the multiple call equipment and if any one of such other channel relay units has its register corresponding to the U register 8272 in an operated condition, then the associated off-normal contacts, such as ON8235 and ON8236 will be operated to ground the multiply connected conductor C1389U–COM. The ground potential applied to this conductor from any other channel relay unit shunt the relay R1340U and prevent its operation. This will inform the channel relay unit 7900 that it cannot transmit a network prosign UUU due to the fact that at least one other tributary station routing indicator having a first character U has been processed through another channel relay unit. In other words, the network prosign UUU cannot be transmitted through the channel relay unit 7900 because all of the tributary station routing indicators having the first character U have not been processed through this unit.

The same test will also be made for the relay R1340B and the relay R1340J by connecting them respectively to the bank contacts accessible to the wipers 8224 and 8214 on the respective B register 8273 and J register 8274 in the channel relay unit 7900. If another channel relay unit has processed at least one tributary station routing indicator having a first character B, the B register, such as 8273, in that channel relay unit will complete the circuit for shunting the relay R1340B (Fig. 13). The same results will occur with respect to the relay R1340J if another channel relay unit has processed a tributary station routing indicator having a first character J.

In order to explain the transmission of a network prosign, it will now be assumed that when the relay R1340U is connected to the conductor C1389–2U that the U register 8272 (Fig. 82) in the channel relay unit 7900 has been operated twice to indicate that at least two tributary station routing indicators having the first character U have been processed therethrough. It will also be assumed that no other channel relay unit, such as 7900, has processed a tributary station routing indicator having the first character U. In this connection it may be well to briefly review the manner in which the U register 8272 is operated to control its wipers during the time that the tributary station routing indicators are being processed through the channel relay unit 7900.

It will be recalled that as an original multiple call message is being processed through the multiple call equipment that each routing indicator appearing in the message is analyzed to determine the outgoing line over which the message must be retransmitted to reach the destination corresponding to the particular routing indicator and thereby to select the channel relay unit, such as 7900, that individually corresponds to the particular outgoing line. At the same time that the particular channel relay unit is identified, it alone is selected and rendered operative to receive a translation, if necessary, of the particular routing indicator being processed. In translating the particular routing indicator being considered the multiple call translator 2100 (Figs. 21 to 28, inclusive) function to register in the register 8001 of the selected channel relay unit, such as 7900, a three character routing indicator identifying the relay switching center that is subsequently to be held responsible for the retransmission of the multiple call message to its ultimate destination. Also, it will be seen from Fig. 21 of the multiple call translator 2100 that the first character decoding relays 2101 in responding to a first character U, B or J will operate respectively the relays R2150U, B or J. Each of the above noted relays is provided with separate lower make contacts 2172, 2152 and 2162 for applying ground potential respectively to the conductors C8162U, B or J extending to Fig. 81. Therefore, each time the first character of a routing indicator being processed through the multiple call translator 2100 is a U, B or J, the corresponding relay operates to transmit a ground pulse over the corresponding conductor to Fig. 81. Actually, the conductors C8162U, B or J are multiply connected to all of the channel relay units, such as 7900, but only one channel relay unit is rendered effective at a time depending upon the outgoing line over which the particular routing indicator is to be transmitted and which individually corresponds to the selected channel relay unit.

Referring now to Fig. 81, it will be seen that the conductors C8162U, B or J terminate in the wipers 8233, 8223 and 8213, respectively, on the U, B and J registers 8272 to 8274. Assuming for the present example that the U conductor C8162U is grounded, a circuit is completed by way of the wiper 8223, the engaged home contact position, contacts 8131 (closed by the operated condition of the relay R8130 each time the channel relay unit 7900 is seized) and the winding of the magnet M8231, to battery. When ground is removed from the conductor C8162U indicating that the routing indicator having a first character U has been processed through the translator 2100, the magnet M8231 advances its wipers one step in a clockwise direction to engage the contacts 1. At this time, the off-normal contacts ON8235 and 8236 are closed but this is of no importance at this time. The next time a pulse is transmitted over the above traced circuit to the magnet M8235, indicating that a second routing indicator having a first character U is being processed through the translator 2100 for the channel relay unit 7900, the wipers 8233 and 8234 are advanced into engagement with the contacts 2. Additional pulses transmitted over the conductor C8162U in response to the translation of additional routing indicators having the first character U for use in connection with the channel relay unit 7900, will no longer control the magnet M8231 because the wiper 8233 is now in engagement with the contact 2. The same operations will be performed by the magnet M8221 of the B register 8273 and by the magnet M8211 of the J register 8274 each time a routing indicator having a first character B and J is processed through the translator 2100 for the channel relay unit 7900. The corresponding U, B and J registers in other channel relay units will also operate in a similar manner if the associated channel relay unit is being used in connection with the routing indicator being processed through the translator 2100.

Returning again to the operations wherein a test is being made to determine whether the network prosign UUU is to be transmitted, it will be seen that the ground potential on the wiper 8234 of the U register 8272 is now extended by way of bank contact 2, contacts 8145, conductor C1389–2U extending to Fig. 13, contacts 1325, winding of the relay R1340U and its associated resistor, to battery. As long as no other channel relay unit has its U register corresponding to the register 8272 in an operated condition, the relay R1340U operates. At its contacts 1341, the relay R1340U prepares a circuit including the conductor C1390UMM extending to Fig. 50, and the upper winding of relay R5030. The slow acting delay relay R1330 slowly restores to normal as previously noted, thus giving ample time for a test to be made to operate either the relay R1340U, R1340B or R1340J in the manner previously noted and when the relay R1330 restores, it applies the ground potential on the conductor C1394–ILK, by way of the contacts 1329′, 1331 and 1341 to the conductor C1390UMM in order now to operate the relay R5030.

Figure 50:
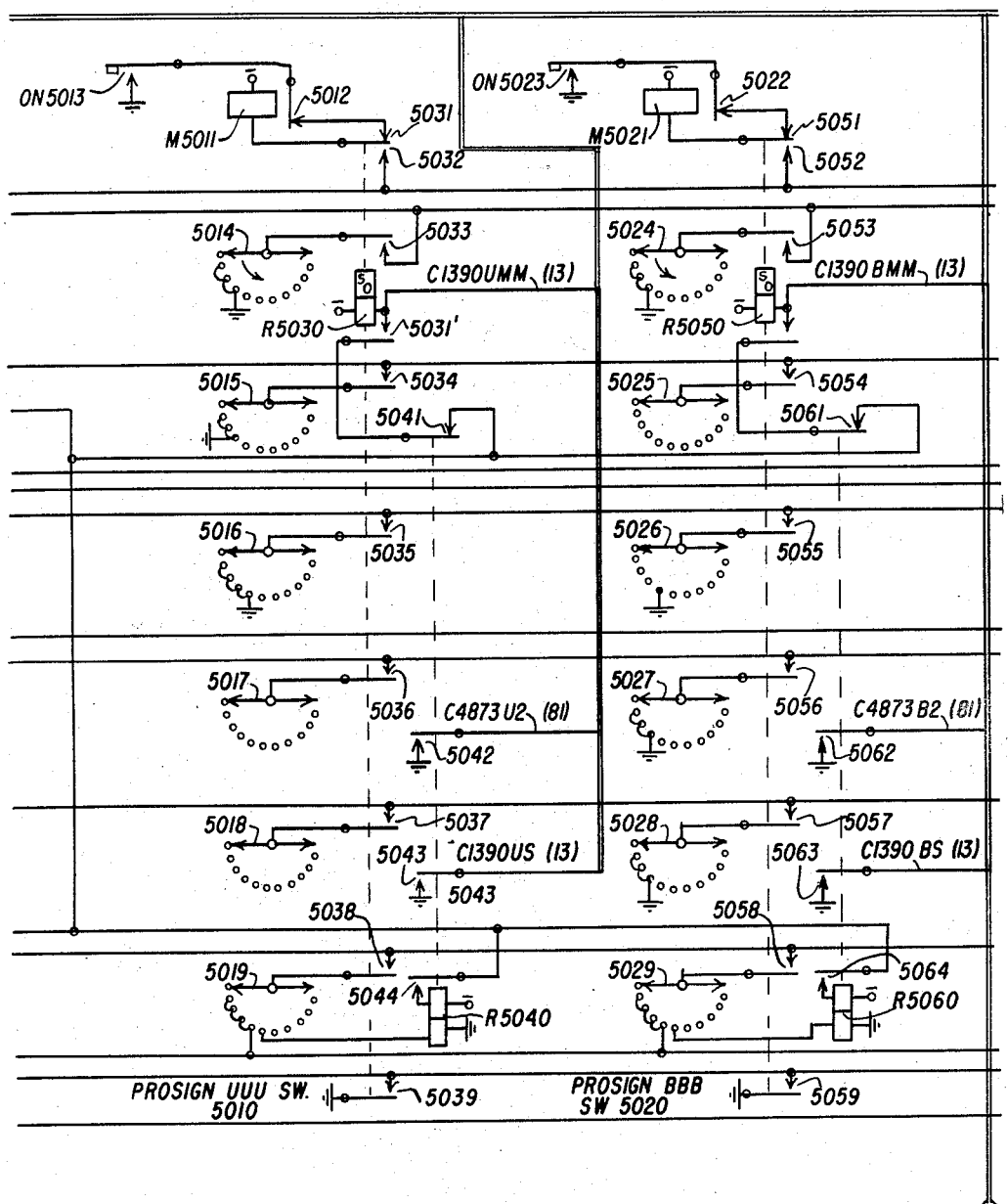

Referring now to Fig. 50 it will be seen that as soon as the relay R5030 operates it locks itself over a circuit including its contacts 5031′ and 5041, to the grounded conductor C1390UBJ extending to Fig. 13. As a further result of the operation of the relay R5030, at its contacts 5032, it connects the magnet M5011 of the prosign U switch 5010 to the conductor C4871SWP extending to Fig. 54 where it is connected to the contacts 5274 on the motor driven impulser 5201. At its contacts 5033 to 5038, inclusive, the wipers 5014 to 5019, inclusive, are connected respectively to the conductor C4871A to E, inclusive, and SM extending to Fig. 54 where they are further extended over the conductor C5503A to E, inclusive, and SM to the marking distributor 5503. The operations now take place under control of the motor driven impulser 5201, in the manner described previously, for example, in connection with the operation of the miscellaneous switch 4910 whereby, the magnet M5011 steps the wipers 5014 to 5019, inclusive, step-by-step in a counterclockwise direction over the associated contact banks to transmit code signals to the marking transmitter distributor 5503.

The bang contacts accessible to the wipers 5014 to 5019 of the prosign U switch 5010 are permanently wired to control the marking transmitter distributor 5503 to transmit in code form the following information:

| Bank contacts | Code information |
| --- | --- |
| 1 | U. |
| 2 | U. |
| 3 | U. |
| 4 | space. |

Thus, the above information is repeated in code form over the conductor C1187SIG1 to the channel multiping unit 8700 where it is again repeated to the monitor page printer 8750 and over the conductor C7993SIG1 through the connected channel relay unit 7900, to the associated cross-office unit X3400.

The next time the magnet M5011 is operated and restored, the wipers 5014 to 5019 are advanced into engagement with the contacts 5 in order now to complete a circuit for the lower winding of the relay R5040 in series with the clutch magnet M5504 of the marking transmitter distributor 5503. This circuit is substantially the same as has been described several times before and it will be understood that the magnet M5504 does not operate because of the high resistance of the lower winding of the relay R5040 but that the latter relay operates and locks itself, at its contacts 5044, to the grounded conductor C1290UBJ over a circuit including its upper winding. As a further result of the operation of relay R5040, at its contacts 5041, it interrupts a point in the locking circuit for the relay R5030 and the latter relay will now restore to normal inasmuch as ground potential has been removed from the conductor C1390UMM. It should be noted that the ground potential was removed from the conductor C1390UMM during the transmission of the characters UUU under control of the prosign U switch 5010, by the contacts 5242 on relay R5240. As a further result of the restoration of the relay R5030, the prosign U switch 5010 is disconnected and the self-interrupting circuit for the magnet M5011 is completed, at the contacts 5031, to step the wipers of the switch to the illustrated home contact positions.

Referring again to the relay R5040, it will be seen that at the contacts 5042, ground potential is connected to the conductor C4873U2 extending to Fig. 81 and then by way of the contacts 8151 in order to operate the magnet M8231 on the U register 8272. This circuit will be subsequently opened upon the restoration of the relay R5040 to permit the magnet M8231 to restore and advance its wipers into engagement with the contacts 3 to indicate that the prosign UUU has been used by the channel relay unit 7900. As a further result of the operation of relay R5040, at its contacts 5043, it applies ground potential to the conductor C1390US extending to Fig. 13 in order now to shunt down the relay R1340U.

The relay R1340U upon restoring, at its contacts 1342, will prepare a circuit including the conductor C1390ZW1 extending to Fig. 48 for operating relay R4860.

However, before describing this circuit, it should also be understood that when the relay R5030 restored to normal, as described above, at its contacts 5039, it interrupted the circuit including the conductor C4871SU–2 extending to Fig. 54 in order now to restore the operated relays R5240 and R5230. When this occurs, the contacts 5242 are again closed to apply ground potential ot the conductor C1394–ILK extending to Fig. 13 and then over a circuit including contacts 1329′, 1331, 1342, 1344 and 1346, conductor C1390ZW1 extending to Fig. 48 and the upper winding of relay R4860, to battery. The relay R4860 now operates and, at its contacts 4863, applies ground potential by way of the conductor C4682TR3 extending to Fig. 46 thereby to operate the relay R4620.

In the channel selector control unit 4600 (Fig. 46) the relay R4620 in operating disconnects the channel relay selector switch 4601 from the channel relay unit 7900, all in the manner previously described, and it removes ground potential from the conductor C4682SUA extending to Fig. 48 and conductor C1393SUA extending to Fig. 19. In Fig. 13 the removal of ground potential from the conductor C1393SUA causes the restoration of the relays R1380 and R1305 all in the manner previously described, and the restoration of the relay R1320.

Referring now to Fig. 13, it will be seen that the restoration of the relay R1320 reoperates relay R1330 and the last-mentioned relay, at its contacts 1331, interrupts the above described circuit for the relay R4860 which also restores to normal. Also, at its contacts 1322 to 1327, inclusive, the relay R1320 disconnects the relays R1340U, B and J from the test circuits for the channel relay unit 7900. Finally, at its contacts 1321, the relay R1320 removes ground potential from the conductor C1390UBJ extending to Fig. 49 thereby to restore the operated relay R5040.

It was assumed in the foregoing description regarding the transmission of the network prosign UUU, that the restoration of the relay R1340U (Fig. 13) completed a circuit including the conductor C1390ZW1 in order to operate the relay R4680. It was also pointed out that the relay R4860 in operating controlled the relay R4620 in the channel selector switch control unit 4600 to select another channel relay unit. However, it is possible to have both the relays R1340U, B or R1340U and J simultaneously operated and under extra-ordinary conditions, all three relays R1340U, B and J may be operated. The last-mentioned condition, however, will only exist in the event that no other channel relay unit, such as 7900, has been utilized in processing the received multiple call message. Therefore, it should be understood that in the event that the relay R1340B is in its operated position at the time the relay R1340U is restored ot normal, the conductor C1390BMM will become effective in the circuit instead of the conductor C1390ZW1. More specifically, it will be recalled that the relay R1340U is restored to normal by the shunting ground potential applied to the conductor C1390US by the operation of relay R5040 at the end of the transmission of the prosign UU by the switch 5010. Assuming that the relay R1340B is operated at this time from the B register 8273 in the channel relay unit 7900, its contacts 1343 will be closed. Therefore, the next time ground potential is reapplied to the conductor C1394–ILK, in the manner previously described, a circuit will be completed by way of the contacts 1329', 1331, 1342 and 1343, conductor C1390BMM extending to Fig. 50 in order to operate the relay R5050. The relay R5050, as well as the relay R4950, is exactly the same as the relay R5030 and performs the same controls with regard to the prosign B switch 5020 as the relay R5030 performs with regard to the prosign U switch 5010. Therefore, it will be understood from the previous description of the prosign U switch 5010 that the prosign B switch 5020 will operate to transmit code signals corresponding to the characters BBB followed by a "space" character function. These code signals will be transmitted by the marking transmitter distributor 5503 to the channel multipling unit 8700 where they are repeated to the monitor page printer 8750 and through the channel relay unit 7900 to its associated cross-office unit X3400.

After the above information is transmitted by the prosign B switch 5020, the associated relay R5060 will operate in substantially the same manner as relay R5040 and, at its contacts 5062, it will extend ground over the conductor C4873B2 to Fig. 81 and then by way of the contacts 8152 to operate the magnet M8221 in the B register 8273. Also, at its contacts 5063, ground potential will be applied by way of the conductor C1390BS extending to Fig. 13 in order now to shunt down the relay R1340B.

If the relay R1340J should also be operated at this time under control of the J register 8274 in the channel relay unit 7900, then, at its contacts 1345, ground potential will be applied to the conductor C1390JMM extending to Fig. 49 in order to operate the relay R4950. This relay performs the same functions with regard to the prosign J switch 4920 as the relays R5030 and R5050 perform with regard to the prosign U switch 5010 and the prosign B switch 5020. In other words, the prosign J switch 4920 is controlled to transmit the characters JJJ followed by a "space" character function over the previously noted signalling circuits, including the marking transmitter distributor 5503 and the channel multipling unit 8700 to the monitor page printer 8750 and also through the used channel relay unit 7900 to its associated cross-office unit X3400. After the foregoing information is transmitted, the prosign J switch 4920 causes the operation of relay R4960 which relay, at its contacts 4962, completes the circuit including the conductor C4873J2 for operating the magnet M8211 of the J register 8274 and, at its contacts 4963, it completes the circuit including the conductor C1390JS for shunting down the relay R1340J. Thereafter, the chain circuit through the contacts 1342, 1344 and 1346 of the now restored relays R1340U, B and J will be completed, in the manner previously described, over the conductor C1390ZW1 in order to operate the relay R4860. The latter relay, it will be recalled, at its contacts 4863, completes the circuit for operating the relay R4620 in the channel selector switch control unit 4600. In other words, the channel selector switch control unit 4600 will now search for another channel relay unit, such as the unit 7900, having two or more routing indicators processed therethrough. Attention is directed to the fact that the relay R4620, at its contacts 4622, removes the ground potential on the conductor C4683P3 from the conductor C1393SUA extending to Fig. 13 in order to restore the operated relays R1380, R1320 and R1305, in the manner previously described in connection with the completion of the transmission of the network prosign UUU.

*Taking the outgoing line numbers and associated routing indicators out of the tape storage units 5501 and 5502*

In the previous heading entitled "Determining whether or not a ZWL prosign should be transmitted in connection with the ZVA pilot heading information" it was pointed out that when all of the channel relay units, such as 7900, have been tested to see whether or not a ZVA signal should be transmitted in connection with the new pilot heading information for a message and whether or not a ZWL should also be transmitted, the channel selector control unit 4600 was restored to normal. As a result thereof, the relay R4670 applied ground potential to the conductor C4884P4 extending to Fig. 60 in order to operate the start reading relay R6040.

Figure 59:
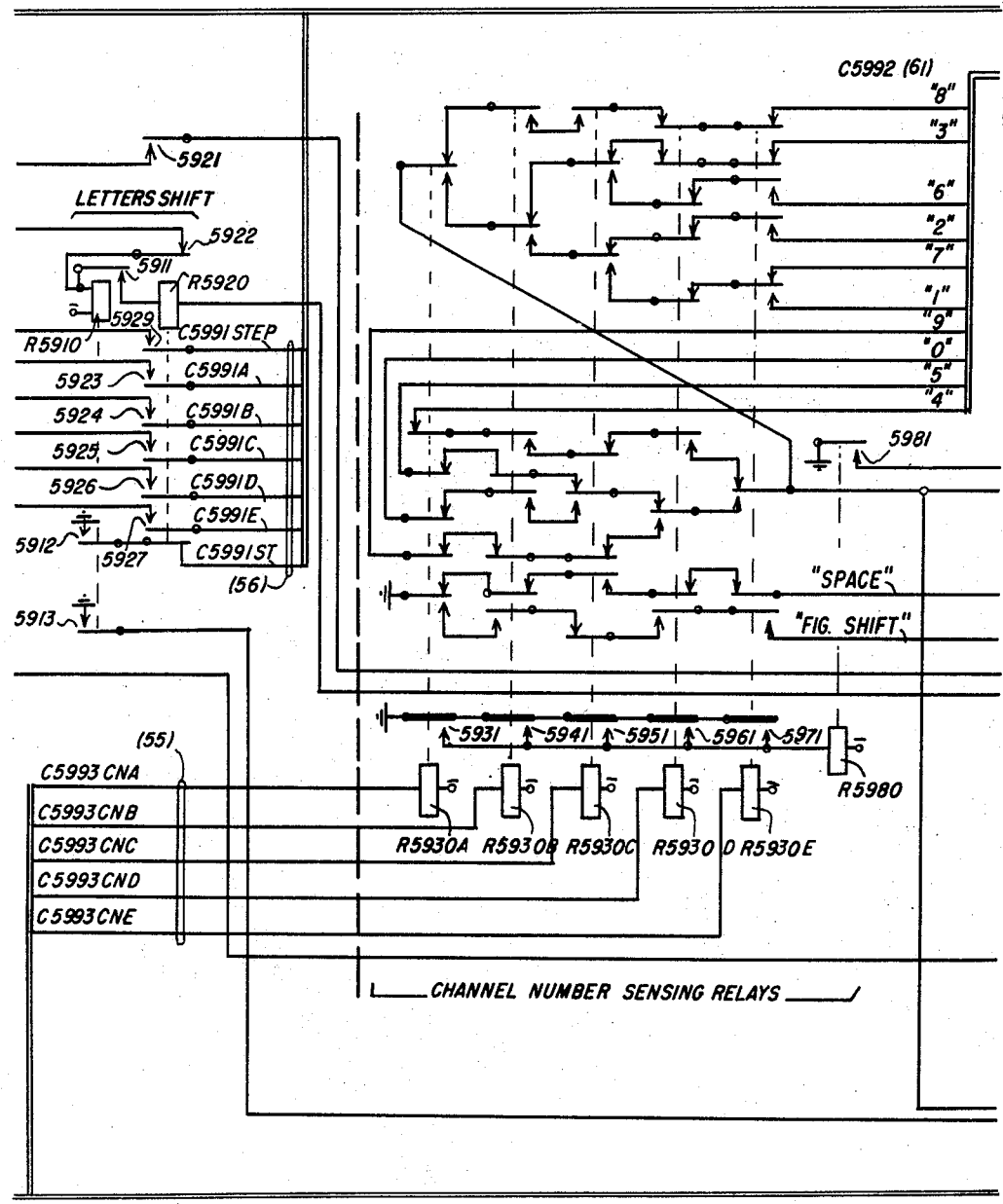
Figure 60:
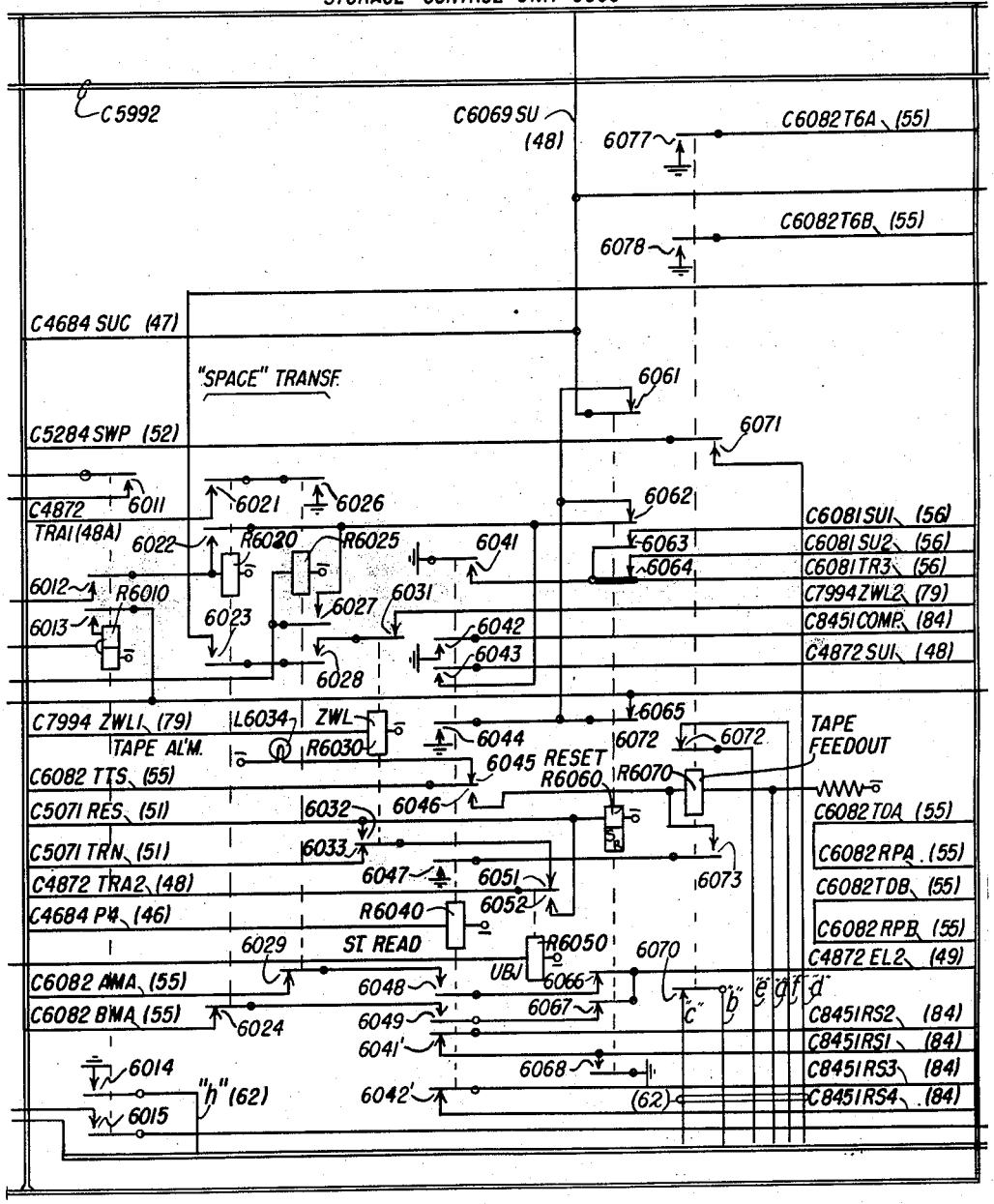

Referring now to Fig. 60, it will be seen that the relay R6040 upon operating initiates circuit controls in the storage control unit 5800 (Figs. 58 to 62, inclusive) whereby, the tape readers 5546 and 5586 associated respectively with the tape storage units 5501 and 5502 are controlled. In this connection it should be understood that during the processing of the address portion of the multiple call message, the different routing indicators appearing thereon are temporarily stored on the tape 5574 of the routing indicator tape storage unit 5502. Also, the outgoing line numbers identifying the outgoing lines over which the message must be transmitted to reach the corresponding routing indicator destinations are temporarily stored on the tape 5534 associated with the outgoing line number tape storage unit 5501. The perforated tape containing the above mentioned information has been accumulated in the storage bins 5536 and 5576 in the respective units and is in a condition to be read by the respective tape readers 5546 and 5586.

At the contacts 6041, the relay R6040 applies ground potential to the conductor C6081SU–1, SU–2 and TR3 all extending to Fig. 56, where the conductors C6081SU–1 and SU–2 provide locking ground potential for various relays and the conductor C6081TR3 completes the operating circuit for the relays R5640 and R5710 in the storage routing register 5600.

At the contacts 6042, the relay R6040 applies ground potential to the conductor C8451COMP extending to Fig. 84 to provide a marking potential on the wiper 8434. At the contacts 6044, the relay R6040 provides a locking circuit for various relays in the storage control unit 5800 and it completes a circuit including contacts 6062, 6043, conductor C4872SU–1 extending to Fig. 48 for operating the relay R4890. At its contacts 6045, the relay R6040 disconnects the tape alarm lamp L6034 from the conductor C6082TTS and, at its contacts 6046, it connects the winding of the relay R6070 to the last-mentioned conductor. The conductor C6082TTS extends to Fig. 55 where it is connected in series through the contacts 5572 and 5532 on the tight tape switches of the storage units 5501 and 5502. At the present time, the tape 5534 and 5575 is in a slack condition and, therefore, the associated tight tape switch contacts 5532 and 5572 are open in order to prevent illumination of the lamp L6034 or operation of relay R6070 at this time. However, if the above noted tapes become tight at any time during the reading cycle by the associated readers 5546 and 5586, the relay R6070 will be operated and will cause automatic feed-out of a predetermined amount of tape as determined by the tape feed-out counting switch 6201 (Fig. 62). At the contacts 6041' and 6042', the relay R6040 interrupts points in the self-interrupting restoring circuits for the magnets M8410 and M8420 as will be described hereinafter.

Finally, at the contacts 6048 and 6049, the relay R6040 completes parallel circuits for operating the magnets M5540 and M5580 of the respective readers 5546 and 5586. Referring to Fig. 55, it will be seen that the magnet M5540 is connected to the conductor C6082BMA and that the magnet M5580 is connected to the conductor C6082AMA. These two conductors extend to Fig. 60 where they are connected by way of the contacts 6024 and 6029, 6049 and 6048, and 6067 and 6066, conductor C4872EL2 extending to Fig. 49, contacts 4936, conductor C1186ES3 extending to Fig. 11, and contacts 1165 and 1158, to ground. Consequently, the magnet M5540 of the tape reader 5546 associated with the outgoing line number tape storage unit 5501 is operated, and, simultaneously therewith, the magnet M5580 of the tape reader 5586 associated with the routing indicator tape storage unit 5502 is also operated. These tape readers are exactly the same as the tape reader 1420 provided in the multiple call storage unit 1400 and they operate in the same manner as has been explained previously.

Figure 58:
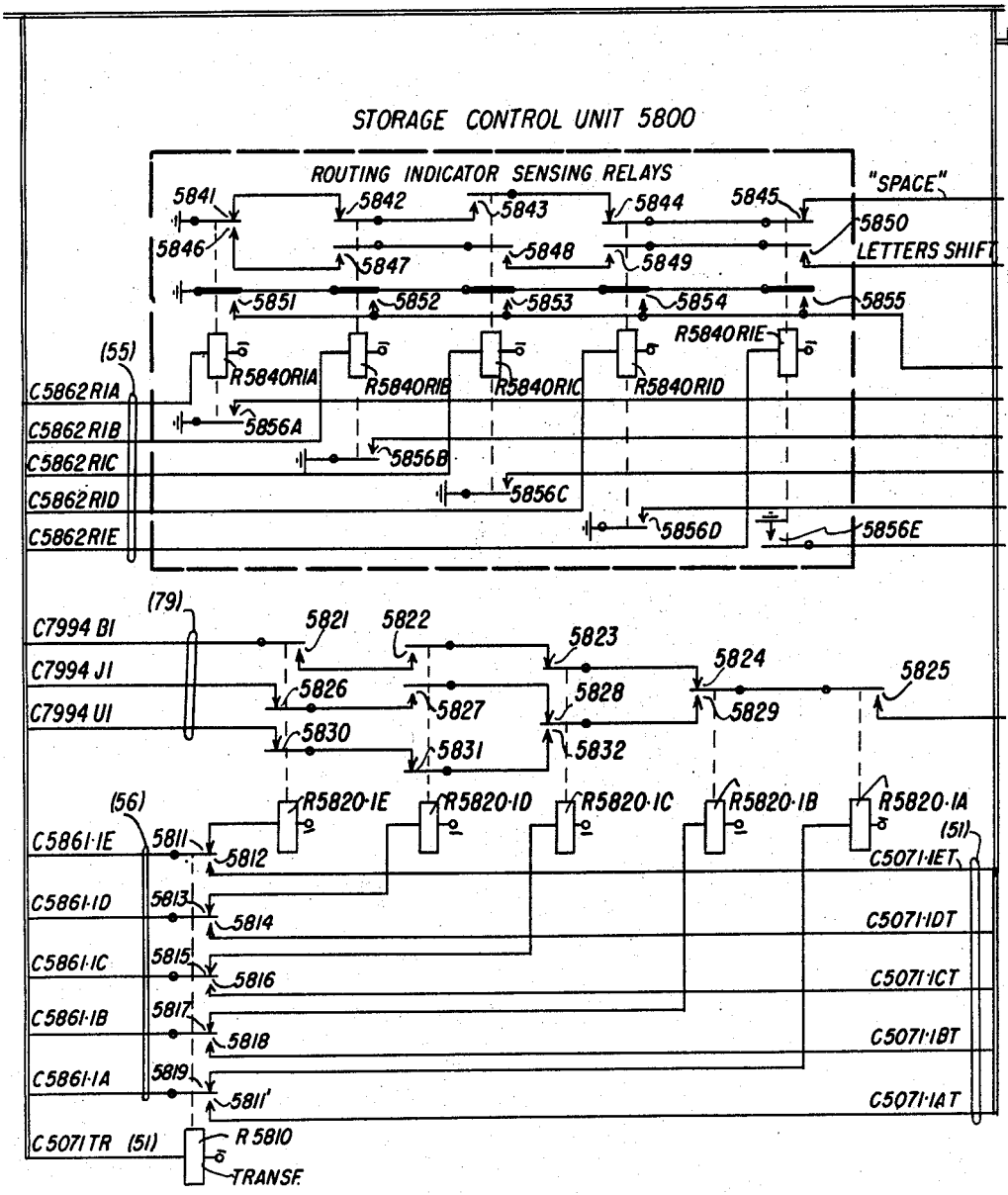

The normally open contacts shown below and to the left of the magnet M5540 in the outgoing line tape storage unit 5501 are connected by way of the conductors C5993CNA to CNE, inclusive, to Fig. 59 where they are respectively connected to the windings of the channel number sensing relays R5930A to E, inclusive. Depending upon the perforations in the tape 5534, the above noted relays will be operated in code combinations in accordance with the code illustrated in Fig. 89 during the sensing of each of the characters. Also, the normally open contacts shown below and to the left of the magnet M5580 in the routing indicator tape storage unit 5502 are connected by way of the conductors C5862RIA to RIE, inclusive, extending to Fig. 58, where they are connected to the windings of the routing indicator sensing relays R5840RIA to RIE, inclusive. Thus, the channel number sensing relays of Fig. 59 and the routing indicators sensing relays of Fig. 58 are respectively controlled in code combinations in accordance with the perforations on the tapes 5534 and 5574 by the respective tape readers 5546 and 5586. The sensing operations of the two groups of relays will be considered separately although it should be kept in mind that they are actually operating simultaneously as the two readers 5546 and 5586 read the respective tapes.

The sensing operations of the channel number sensing relays of Fig. 59 will first be considered. The first perforated symbol on the tape 5534 is a "figures shift" character function which will cause the marking of the conductors C5993CNA, CNB, CND and CNE to operate the corresponding sensing relays R5930A, B, D and E. These relays at their contacts 5931, 5941, 5961 and 5971 complete parallel operating circuits for the relay R5980 and they also complete a circuit including the "figures shift" conductor for operating the figures shift relay R6010. The last-mentioned relay closes only its X contacts 6013 and, thus, prepares a locking circuit for the relay so that it will close the remaining contacts thereon when its initial operating circuit is interrupted. At the end of the sensing cycle of the "figures shift" character function, the operated channel number sensing relays R5930A, B, D and E and the relay R5980 all restore to normal. The relay R6013 fully operates at this time to close its remaining contacts over the locking circuit including the contacts 6013, 6065 and 6044, and ground. At its contacts 6011, the relay R6010 prepares a point in a circuit for operating the relay R6110 and for applying ground potential to the pyramid sets of contacts on the channel number sensing relays R5930A to E, inclusive. Also, at its contacts 6012, the relay R6010 prepares a point in a circuit for operating the space relay R6020 and, at its contacts 6014, it completes a circuit including the "h" conductor extending to Fig. 62 for operating the magnet M6241 of the figures shift switch 6203.

The next three characters appearing on the tape 5534 and sensed by the tape reader 5546 in the outgoing line number tape storage unit 5501 are the three digits representing the identity of the outgoing line over which the message must be transmitted to reach the tributary station UACZZ. The last-mentioned routing indicator appears on the same position of the tape 5574 as its associated three digit number appears on the tape 5534. At the present time, it will be assumed that the hundreds digit 1, the tens digit 0 and the units digit 1 identify the particular outgoing line over which the multiple call message must be transmitted to reach the tributary station UACZZ. Therefore, when the tape reader 5546 senses the code perforations of the hundreds digit 1 the conductor C5593CNA, CNB, CNC and CNE will be grounded in order to operate the channel number sensing relays R5930A, B, C and E. These relays at their contacts 5931, 5941, 5951 and 5971 complete the circuit for operating the relay R5980 and at the upper set of pyramid contacts, they prepare circuits for marking the conductor "1" in the cable C5992 extending to Fig. 61. Consequently, when the relay R5980 operates and closes its contacts 5981, ground potential is extended by way of the contacts 6011, the closed contacts of the upper set of pyramid contacts on the channel number sensing relays, conductor "1" in the cable C5992 extending to Fig. 61, contacts 6114–1, conductor C4872HD1 extending to Fig. 48 in order to operate the hundreds digit 1 relay R4801. This relay is provided with contacts 4802 to 4806, inclusive, which are arranged to apply ground potential to the contacts 3 accessible to the wipers 4814 to 4818 respectively thereby to mark these contacts in code form in accordance with the hundreds digit 1. Only one relay R4801 has been illustrated but it should be understood that corresponding relays representing the hundreds digits 2 to 9, and 0 may also be provided to mark the bank contacts accessible to the wipers 4814 to 4818, inclusive, in accordance with the different hundreds digits 2 to 9 and 0. The relay R4801 upon operating, locks itself over a circuit including its contacts 4807, conductor C6069SU extending to Fig. 60, contacts 6061 and 6044 to ground.

The ground potential at the contacts 5981 on the operated relay R5980 is also extended by way of the contacts 6011, 6015 and 6111 and the lower winding of the relay R6110, to battery. The relay R6110 now operates in a first step to close its X contacts 6113 so that the relay can thereafter operate in its second step to close all of its remaining open contacts when its initial operating circuit is interrupted.

At the end of the sensing of the first hundreds character 1 by the tape reader 5546, the relays R5930A to E, inclusive, and the relay R5980 are restored to normal. At its contacts 5981, the relay R5980 removes the initial operating ground potential from the circuit for the relay R6110 so that the latter relay now operates in its second step over a locking circuit including its lower and upper windings in series, contacts 6113, 6065 and 6044, to ground. At its contacts 6115–1 to 6115–10, inclusive, the relay R6110 now prepares a circuit for connecting the ten conductors "1" to "0" inclusive, in the cable C5992 to the conductors C4684TD1 to TD0 extending to Fig. 47.

The tens digits 0 now sensed by the tape reader 5546 operates the relays R5930B, C and E and the latter relays operate the relay R5980, in the manner previously described. As a result thereof, the ground potential at the contacts 5981 is now connected by way of the contacts 6011, the lower set of pyramid contacts on the operated channel number sensing relays, the "0" conductor in the cable C5992, extending to Fig. 61, contacts 6115–10, 6124–10, conductor C4684TD0 extending to Fig. 47 and the winding of the relay R4710, to battery. The latter relay now operates and immediately locks itself over a circuit including its contacts 4716, conductor C4684SUC extending to Fig. 60, contacts 6061 and 6044, to ground. Thus, the relay R4710 (Fig. 47) is operated to register the tens digit 0 of the outgoing line number 101.

The relays R4720, R4730 and R4740 are substantially identical to the relay R4710 and they in turn will be operated whenever the tens digit 1, 2 or 3 is sensed by the tape reader 5546. Additional relays may also be provided in Fig. 47 corresponding to the tens digits 4 to 9, inclusive, in substantially the same manner as is illustrated. It should be noted, however, that the relay R4710 upon operating, at its contacts 4712, 4713 and 4715 applies ground potential to the conductors C4682TB, TC and TD extending to Fig. 48 thereby to mark the contacts 4 in the bank contacts accessible to the wipers 4814 to 4818, inclusive, of the number transmitter 4810 in accordance with the tens digit 0. It should be understood that the other relays R4720, etc., when operated will individually mark the last-mentioned conductors in accordance with the corresponding tens digit represented by the operated relays. It should also be noted that at its right-hand make contacts, the relay R4710 prepares circuits to ten separate channel relay units, such as the channel relay unit 7900, respectively corresponding to the ten outgoing lines numbered 101 to 109, inclusive, and 100.

At the time the relay R5980 operated in response to the tens digit 0, it also applies ground potential at its contacts 5981 over a circuit including the contacts 6011, 6015, 6112 and 6121 and the lower winding of the relay R6120, to battery. The relay R6120 now operates in its first step to close only its X contacts 6123 in order to prepare the circuit for fully operating the relay to its second step as soon as its initial operating circuit is interrupted. Therefore, as soon as sensing operation of the tens digit 0 is completed by the tape reader 5546, the operated relays of the channel number sensing relays restore to normal and the relay R5980 also restores to normal. When this occurs, the contacts 5981 interrupt the initial operating circuit for the lower winding of the relay R6120 and it now operates in its second step over a circuit including its lower and upper windings in series, contacts 6123, 6065 and 6044, to ground. At its contacts 6125–1 to 6125–10, inclusive, the relay R6120 now connects the ten conductors "1" to "0" in the cable C5992 to the ten units relays R6140U1 to R6140U0, inclusive.

The tape reader 5546 now senses the units digit 1 perforated on the associated tape and thereby completes the operating circuits for the relays R5930A, B, C and E of the channel number sensing relays and the latter relays operate the relay R5980, as previously described. The ground potential at the contacts 5981 is again connected through the upper pyramid set of contacts to the conductor "1" in the cable C5992 extending to Fig. 61 and then by way of the contacts 6115–1, 6125–1 and 6133–1 and the winding of relay R6140U1, to battery. The latter relay now operates and, at its right-hand inner-make contact locks itself over a circuit including the contacts 6061 and 6044, to ground. Also, the ground potential at the contacts 5981 is extended by way of the contact 6011, 6015, 6112, 6122 and 6131, and the lower winding of relay R6130, to battery. This relay also operates in its first step at this time to close only its X contacts 6132. At the end of the sensing of the units digit 1 of the outgoing line number 101, the operated channel relay sensing relays are restored to normal and they in turn restore the relay R5980. At its contacts 5981, the relay R5980 interrupts the initial operating circuit for the relay R6130, whereupon, the latter relay operates in its second step to close all its contacts over a circuit including its lower and upper windings in series, contacts 6132, 6065 and 6044, to ground. At its contacts 6133–1 to 6133–10, inclusive, the relay R6130 disconnects the ten units relays R6140U1 to U0, inclusive, from the ten marking conductors "1" to "0," inclusive, in the cable C5992.

Figure 61:
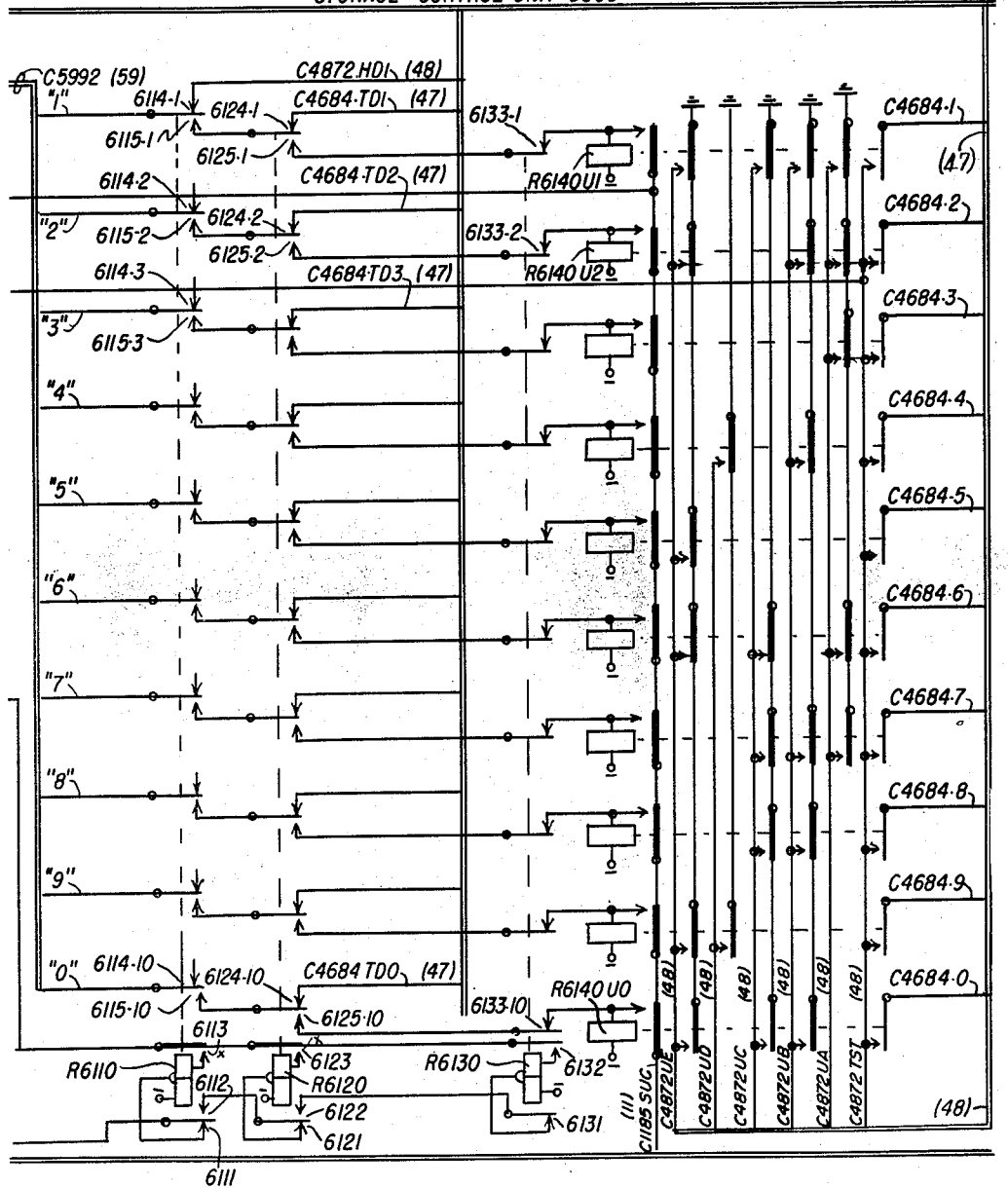

Referring now to Fig. 61, it will be seen that the five conductors C4872UA to UE, inclusive, are connected to various contacts of the units relays R6140U1 to U0, inclusive. Each of the relays, upon operating, will ground the conductors in code form in accordance with the units digit corresponding to the operated units relay. These conductors extend to Fig. 48 where they terminate in the contacts 5 accessible to the wipers 4814 to 4810, inclusive, of the number transmitter 4810. Consequently, depending upon the operated units relay R6140U1 to U0, these conductors will be marked in code form in accordance with the corresponding units digit. In the present case, the units digit relay R6140U1 is operated to mark these conductors, in accordance with the code of Fig. 89, with the units digit 1.

Also, at the outer right-hand make contacts, the relay R6140U1 prepares a point in the circuit including the contacts C4684–1 extending to Fig. 47 for applying ground potential to the conductor C4681SG1 extending to Fig. 79 so that the channel relay unit 7900 will be selected as the particular channel relay unit that was used in connection with the processing of the tributary station routing indicator UACZZ. It being recalled that for purposes of the present description and in order to simplify the drawings, the channel relay unit 7900 has been used in connection with the description of the operation of the multiple call equipment during the processing of the routing indicator UACZZ, as well as in connection with the processing of the routing indicators JWCX, JKXY and UKAY. Actually, however, one channel relay unit is used in connection with the processing of the routing indicator UACZZ and a different channel relay unit is utilized in connection with the processing of the three routing indicators JWCX, JKXY and UKAY.

The tape reader 5546 now senses in succession the three "space" character functions, each of which causes the operation of relays R5930B and R5980, in the manner previously explained. The relay R5930B completes a circuit including the "space" conductor and contacts 6012 for operating the space relay R6020. The relay R6020 immediately locks itself in its operated position over a circuit including contacts 6022, 6062 and 6044, to ground. Although three "space" character functions are sensed in succession by the tape reader 5546, the relay R6020 will normally operate and lock in response to the sensing of the first "space" character and the subsequent "space" characters will merely be absorbed.

As a further result of the operation of the relay R6020, at its contacts 6024, it interrupts the previously traced circuit including the conductor C6082BMA extending to Fig. 55 thereby to interrupt the circuit for the magnet M5540. This terminates further sensing of the tape 5534 by the tape reader 5546. It should be understood that the termination of the reading of the tape reader 5546 will occur before the second and third "space" character functions are sensed by the tape reader 5546.

During the time that the tape reader 5546 is sensing the associated tape in the manner described above, the tape reader 5586 is sensing the tape 5574 to ascertain the routing indicator corresponding to the line number perforated on the tape 5534. As previously noted, the sensing operations by the readers 5546 and 5586 take place simultaneously. The first character sensed by the tape reader 5586 is the "letters shift" character function and as a result thereof, all of the conductors C5862RIA to RIE, inclusive, are grounded in order to operate the relays R5840RIA to RIE, inclusive, in the routing indicator sensing relays. As a result thereof, the ground potential is extended by way of the contacts 5846 to 5850, inclusive, the "letters shift" conductor, contacts 5922 and the winding of the relay R5910, to battery. At its contacts 5912, the relay R5910 connects ground potential by way of the contacts 5928, conductor C3991ST extending to Fig. 56, contacts 5651 and the upper winding of relay R5650, to battery. The relay R5650 operates in its first step to close only its X contacts 5652.

As a further result of the operation of relay R5910, at its contacts 5913, it applies ground potential to the "g" conductor extending to Fig. 62 and the winding of the magnet M6231 of the letters switch 6202, to battery. The letters switch 6202 is provided to count each of the letters shift character functions sensed by the relays in the routing indicators sensing relays of Fig. 58.

At the end of the sensing of the "letters shift" character function by the tape reader 5586, the relays R5480 RIA to RIE, inclusive, are restored and the initial operating ground potential is removed from the winding of the relay R5910. However, at this itme a circuit is now completed from battery by way of the winding of the relay R5910, contacts 5911, winding of relay R5920, contacts 6065 and 6064, to ground, thereby to operate the relay R5920 and to lock the relay R5910 in series therewith. At the contacts 5928, the relay R5920 now removes ground potential from the conductor C3991ST extending to Fig. 56 in order now to permit the relay R5650 to operate in its second step. Accordingly, a circuit is completed from battery by way of the upper and lower windings of the relay R5650 in series, X contacts 5652, conductor C6081SU-2 extending to Fig. 60, contacts 6064 and 6041, to ground. In its second step the relay R5650 opens its contacts 5653A to E, inclusive, and closes its contacts 5654A to E, inclusive, in order now to prepare a point in the circuit for registering the first character of the routing indicator sensed by the tape reader 5586 in the routing indicator tape storage unit 5602. It may be well to mention at this time that the storage routing register 5600 illustrated in Figs. 56 and 57 is substantially the same as the processing routing register 3700 illustrated in Figs. 37 and 38. However, the storage routing register 5600 is arranged so that it will always register a first character of a routing indicator in the register 5602, to register the second character of a routing indicator in the register 5601 and to register, respectively, the third, fourth and fifth character in the registers 5701, 5702, 5703.

The next character sensed by the tape reader 5586 is the character U of the routing indicator UACZZ. Therefore, the conductors C5862RIA to RIE, inclusive, will be marked in code form in accordance with the character U, as shown in Fig. 89, and will operate the relays R5840RIA to RIE, inclusive, accordingly. The last-mentioned relays at their contacts 5856A to E, inclusive, will now mark the conductors C5991A to E, inclusive, extending to Fig. 56 in order to register the character U in code form in the register 5602 of the storage routing register 5600. The operated ones of the relays in the register 5602 are then locked in their operated positions over circuits including their inner upper make contacts to the grounded conductor C6081SU–2. Therefore, the first character U of the routing indicator UACZZ is now registered in the register 5602 of the storage routing register 5600.

As a further result of the operation of the relays R5840RIA to RIE, inclusive, in accordance with the character U, ground potential, at the contacts 5851, 5852 and 5853, is connected by way of the contacts 5929, conductor C5991STEP extending to Fig. 56, contacts 5661, and the upper winding of relay R5660, to battery. The relay R5660 operates in its first step to close only its X contacts 5663 so that the relay will operate in its second step when its initial operating circuit is subsequently interrupted.

The second, third, fourth and fifth characters ACZZ of the routing indicator UACZZ are now sensed in the order named by the tape reader 5586 whereby the relays in the routing indicator sensing relays of Fig. 58 register the respective characters ACZZ of the routing indicator in the register 5601, 5701, 5702 and 5703 in the order named. In this connection, however, it should be understood that at the end of the sensing character U the ground potential is removed from the conductor C5991STEP to permit the relay R5660 to operate in its second step and thereby connect the marking conductors C5991A to E, inclusive, to the relays in the register 5601. When the second character A is sensed, it is registered in the register 5601 and at the end of the sensing of this character the relay R5720 is fully operated to transfer the marking conductors C5991A to E, inclusive, from the register 5601 to the register 5701. The third character C is registered in the register 5701 and thereafter the relay R5730 operates fully to connect-up the register 5702. The register 5702 will register the fourth character Z sensed by the tape reader 5586; the relay R5740 will then operate fully; and, thereafter, the register 5703 will be operated to register the fifth character Z sensed by the tape reader 5586. At the end of the sensing of the fifth character Z, the relay R5750 will fully operate and disconnect the marking conductors C5991A to E, inclusive, from the register 5703.

The next character appearing on the tape 5574 is a "space" character function and as a result thereof, the conductors C5862RIA to RIE, inclusive, will be grounded in accordance with the code in Fig. 89 to operate the relay R5840RIC. At its contacts 5853, the relay R5840RIC will again apply ground potential to the conductor C5991STEP but this performs no control at this time. Also, at the contacts 5843, the relay R5840RIC now completes a circuit including the contacts 5841 to 5845, inclusive, the "space" conductor, and contacts 5921 for operating the space relay R6025. The latter relay upon operating immediately locks itself by way of the contacts 6027, 6062 and 6044, to ground.

At the end of the sensing of the "space" character function appearing on the tape 5574, the marking ground potential is removed from the conductor C5862RIC in order to restore the relay R5840RIC and the latter relay, at its contacts 5843, interrupts a point in the initial operating circuit for the space relay R6025. However, the latter relay remains operated over the above traced locking circuit.

Referring now to Fig. 60, it will be seen that at the contacts 6026, the relay R6025 completes a circuit including the contacts 6021, conductor C4872TRA1 extending to Fig. 48A, contacts 4875, conductor C1180EL2 extending to Fig. 11 and the winding of the reset relay R1160, to battery. The relay R1160 now operates and completes a locking circuit for itself which includes its lower winding, contacts 1163, conductor C1186SUE extending to Fig. 49 and ground at contacts 4942.

Also, at its contacts 6029, the relay R6025 interrupts the previously described circuit including the conductor C6082AMA extending to Fig. 55 thereby to restore the magnet M5580 and terminate further sensing of the tape 5574 by the reader 5586.

Finally, at the contacts 6028, the relay R6025 prepares a point in a test circuit for determining whether or not a ZWL prosign has been registered in the particular channel relay unit, such as 7900, corresponding to the outgoing line number that has been read by the tape reader 5546. However, before this test can be made, the reset relay R1160 will cause the miscellaneous switch 4910 (Fig. 49) to transmit two "carriage return" character functions a "line feed" character function and a "space" character function to the monitor page printer 8750 (Fig. 87) so that the last-mentioned unit will be in condition to start a new line of typing when the line number 101 and the routing indicator UACZZ are subsequently transmitted by the number transmitter 4810 and the routing indicator transmitter 5110.

Referring now to Fig. 11, it will be seen that when the relay R1160 operates, in the manner described above, at its contacts 1161, it applies ground potential to the conductor C1185SUC extending to Fig. 61 in order to retain the tens relay R6140U1 in its locked position in the event the reset relay R6060 is operated to open the locking circuit for the tens relay R6140U1 at its contacts 6061.

Also, at its contacts 1164, the relay R1160 completes an operating circuit for the relay R4930 associated with the miscellaneous switch 4910 (Fig. 49). Referring to Fig. 49, it will be seen that the circuit for operating the relay R4930 includes its upper winding, conductor C1186ES2 extending to Fig. 11, contacts 1164, conductor C1394–ILK extending to Fig. 52, and contacts 5242, to ground. The relay R4930 operates over this circuit and immediately locks itself in its operated position over a circuit including its lower winding, contacts 4934, conductor C1186ES1 extending to Fig. 11, to ground at contacts 1162.

In response to the operation of the relay R4930 associated with the miscellaneous switch 4910, the magnet M4911 is controlled in the manner previously described over a circuit including the contacts 4932, 4941, conductor C4871SWP extending to Fig. 54, contacts 5241 and 5274, to ground, the next time the relay R5240 is operated by the motor driven impulser 5201. It being understood that the motor driven impulser 5201 is continuously operating and, at its contacts 5274 and 5275, is attempting to transmit pulses in the manner previously described. Therefore, the magnet M4911 will now advance its wipers step-by-step over the contacts of the associated contact banks which are prewired to transmit code signals corresponding to two "carriage return" character functions, a "line feed" character function, a "space" character function to the channel multipling unit 8700 where they are repeated by the contacts on the relay R8720–4 to the monitor page printer 8750. These code signals, however, cannot be transmitted to any of the cross-office units, such as 7900, utilized in the processing of the present multiple call message because such channel relay units have their transmission relays, such as R7960, in their restored positions. In this manner the monitor page printer 8750 is controlled to start a new line of page printing.

When the wiper 4919 of the miscellaneous switch 4910 engages the contact 5 in the associated contact bank, the relay R4940 is operated in the manner previously described. At its contacts 4941, the relay R4940 disconnects the magnet M4911 from the previously described pulsing circuit. Also, at its contacts 4942, the relay R4940 removes ground potential from the conductor C1186SUE extending to Fig. 11 thereby to interrupt the locking circuit for the relay R1160 but the relay is held in its operated position over the circuit including its upper winding. Also, at its contacts 4943, the relay R4940 completes a circuit including the contacts 4891 for operating the relay R4870. As soon as the relay R4870 operates, it locks itself over a circuit including its right-hand winding, contacts 4873 and 4889 (in multiple with the operated relay R4890), conductor C4872SU–1 extending to Fig. 60, contacts 6043, 6062 and 6044, to ground. As a further result of the operation of the relay R4870, at its contacts 4875, it interrupts a point in the circuit including the conductor C1180EL2 extending to Fig. 11 thereby to restore the reset relay R1160. The reset relay R1160 (Fig. 11) at its contacts 1162, removes the locking ground potential from the conductor C1186ES1 extending to Fig. 49 thereby to permit the relay R4930 to restore to normal. As a result thereof, the magnet M4911 is self-interruptedly operated in the manner previously explained to advance the wipers 4914 to 4919, inclusive, to the home contact positions illustrated in the drawings. Furthermore, at its contacts 4931', the relay R4930 interrupts the circuit for the relay R4940 which also restores to normal and at its contacts 4932', it interrupts the circuit including conductor C4871SU–2 extending to Fig. 54 to restore the relays R5240 and R5230.

Referring again to Fig. 48A, it will be seen that when the relay R4870 operates as noted above, at its contacts 4874, it completes a circuit including the contacts 4842 for operating the relay R4830 associated with the number transmitter 4810. The relay R4830, at its contacts 4832, connects the magnet M4811 to the previously described pulsing circuit including the conductor C4871SWP extending to Fig. 54, contacts 5241 and 5274 on the motor driven impulser 5201. Thus, the magnet is controlled by the motor driven impulser 5201 to advance its wipers 4814 to 4819, inclusive, step-by-step in a counter-clockwise direction over the associated contact banks. Furthermore, at the contacts 4833 to 4838, inclusive, the relay R4830 connects the wipers 4814 to 4819, inclusive, by way of the conductors C4871A to E, inclusive, and SM and the conductors C5503A to E, inclusive, and SM to the marking transmitter distributor 5502. The wipers 4814 to 4818, inclusive, as they advance step-by-step over the associated contact banks transmit code signals to the marking distributor 5503 and the latter unit, in the manner previously described, repeats the code signals to the channel multipling unit 8700. The relay R8720–4 in the channel multipling unit 8700 repeats the code signals from the number transmitter 4810 to the monitor page printer 8750. However, no channel relay unit, such as 7900, is connected at the present time to any of the signalling conductors in the channel multipling unit 8700 and as a result thereof, the code signals are not repeated to any channel relay unit.

The wipers 4814 to 4818, inclusive, of the number transmitter 4810 transmits the following information to the monitor page printer 8750:

| Bank Contacts | Code Information |
| --- | --- |
| 1 | space. |
| 2 | figures shift. |
| 3 | hundreds digit (1). |
| 4 | tens digit (0). |
| 5 | units digit (1). |
| 6 | letters shift. |

From the foregoing, it will be understood that whenever the numbers transmitter 4810 is connected up for transmission of an outgoing line number, it will first transmit a "space" character function, followed by a "figures shift" character function, then the hundreds, tens and units digit of the number of the outgoing line marked in the banks of the switch, followed by a "letters shift" character function. This information, as previously noted, is printed by the monitor page printer 8750.

As soon as the wiper 4819 engages the contact 7, it completes a circuit for operating the relay R4840 over its lower winding and the conductor C4871SM in series with the magnet M5504 in the marking transmitter distributor 5503 as previously described, but the magnet does not operate. As soon as the relay R4840 operates it locks itself in its operated position over a circuit including its upper winding, contacts 4845, conductor C4872SU–1 extending to Fig. 60, contacts 6043 and 6062 and 6044, to ground. As a further result of the operation of relay R4840, at its contacts 4841, it interrupts the impulsing circuit for the magnet M4811; and at its contacts 4842, it interrupts the circuit for the relay R4830 which now restores to normal. At its contacts 4831, the relay R4830 now completes the self-interrupting circuit for the magnet M4811, whereby the wipers 4814 to 4819 are advanced step-by-step until they again reach the illustrated home contact positions. When this occurs, the off-normal contacts ON4813 are opened in order to terminate the self-interrupting circuit for the magnet M4811.

At its contacts 4843, the relay R4840 applies ground potential to the conductor C4872TST extending to Fig. 61 and then by way of the contacts 6023, 6028 and 6031, conductor C7994ZWL2 extending to Fig. 79, where it is multiply connected with all of the channel relay units, such as 7900. Also, the ground potential applied to the conductor C4872TST is also connected by way of the outer right-hand make contacts of the operated units relay R6140U1 to the conductor C4684-1 extending to Fig. 47, contacts 4717 on the operated relay R4710, conductor C4681SG1 extending to Fig. 79, where it will complete an operating circuit by way of the contacts 7953 for the lower winding of the transmission relay R7960 in the channel relay unit 7900 which, in this example, is assumed to be the channel relay unit corresponding to the outgoing line number 101. The relay R7960 now completes the signalling circuit for the channel relay unit 7900 and its associated cross-office unit. It should be noted, however, that the channel relay unit 7900 is assumed to be the unit that processed the tributary station routing indicator UWCZZ and it therefore did not have the ZWL prosign registered therein. A channel relay unit with a ZWL prosign registered therein will have its relay R7950 in an operated condition to indicate this fact.

As a further result of the operation of relay R4840, at its contacts 4844, it applies ground potential to the conductor C4872TRA2 extending to Fig. 60 where a circuit will be completed for the reset relay R6060 if, at this time, the UBJ relay R6050 is operated or if the ZWL relay R6030 is operated. If the above mentioned relays are not operated at this time, then the ground potential on the conductor C4872TR2 is extended by way of the contacts 6051 and 6033, conductor C5071TRN extending to Fig. 51, contacts 5124 in order to operate the relay R4880. The relay R4880 in turn, at its contacts 4881, completes a circuit including the contacts 4887 for operating the relay R5130 associated with the routing indicator transmitter 5110. However, before describing the operations of the routing indicator transmitter 5110, a consideration will first be given of the storage of the tributary station routing indicator UACZZ in the storage routing register 5600 when it was taken from the routing indicator tape storage unit 5202, as previously described.

Referring now to the storage routing register 5600 (Figs. 56 and 57) it will be recalled that the first character U of the routing indicator UACZZ was stored in the register 5602. When this occurred, the relays R5640 and R5710 were both operated over a circuit including the conductors C6081TR3 extending to Fig. 60 and ground at contacts 6041. The relay R5640, at its ten make contacts, transfers the markings of the operated relays in the register 5602 to the conductors C5861-1A to 1E, inclusive, extending to Fig. 58. In Fig. 58, the conductors C5861-1A to 1E, inclusive, are connected through contacts on the restored transfer relay R5810 to the windings of the relay R5820-1A to 1E, inclusive. Thus, it will be seen that the character stored in the register 5602 will be transferred to the relays R5820-1A to 1E, inclusive, to register the corresponding character. The relays in Fig. 58 are arranged so that they will determine whether the first character of a routing indicator is the character U, B or J. In the present example, it has been assumed that the character U has been registered in the register 5602 and, consequently, the relays R5820-1A, 1B and 1C are now operated. A test will now be made to see whether or not the UBJ relay R6050 (Fig. 60) should operate. This circuit may be traced from battery through the winding of relay R6050, contacts 5825, 5829, 5832, 5831 and 5830, conductor C7994U1 extending to Fig. 79, contacts 7965 on the operated transmission relay R7960 in the channel relay unit 7900 that processed the tributary station routing indicator UACZZ to the contact 3 accessible to the wiper 5234 on the U register 8272. If the channel relay unit 7900 that processed the tributary station routing indicator UACZZ has caused the transmission of the network prosign UUU by the prosign U switch 5010, then the U register 8272 will have its wipers 5233 and 5234 in engagement with the contacts 3 in the associated contact banks. This condition does not exist in the channel relay unit 7900 that processed the single tributary station routing indicator UACZZ and, consequently, the circuit is not completed for the UBJ relay R6050. It should be noted, however, that if such a condition exists, that is, at least two routing indicators having the first character U has been processed by the channel relay unit 7900, then the wiper 5234 will at this time be in engagement with the contact 3 to complete the circuit for operating the UBJ relay R6050. Operation of the relay R6050 will indicate that a network prosign UUU has been transmitted to instruct an addressed relay switching center that it is responsible for the transmission for all of the routing indicators appearing in the original message having the first character U and, consequently, it is not necessary to repeat such routing indicators to that channel relay unit as part of the pilot heading instructions of the message. In its operated position, the relay R6050 will open its contacts 6051 and thereby prevent the transmission of the routing indicator UACZZ by the routing indicator transmitter 5110.

In the present example, however, since the UBJ relay R6050 is not operated when the foregoing test is made therefor, the conductor C4872TRA2 remains connected to the conductor C5071TRN. It will be recalled that the conductor C4872TRA2 was grounded at the contacts 4844 by the operation of relay R4840 after the number transmitter 4810 transmitted the outgoing line number information to the monitor page printer 8750. The ground potential on this conductor is now extended by way of the contacts 6051 and 6033 and conductor C5071TRN extending to Fig. 51 in order to operate the relay R4880 as previously described. The relay R4880 is of the slow-to-operate type to permit the test for the UBJ relay R6050 to be made, in the manner described above. Sufficient time is also provided for making a test for the ZWL relay R6030 before the relay R4880 fully operates.

In other words, the relay R6030 will be operated at this time if the ZWL relay R7950 is operated in the particular channel relay unit 7900 that has been selected by the grounding of the conductor C4681SG1. In the previous description, it was stated that when the conductor C4681SG1 was grounded a circuit including the contacts 7953 was completed for operating the transmission relay R7960 in the channel relay unit 7900 that processed the single routing indicator UACZZ. If, for the purpose of explaining the circuit for operating the ZWL relay R6030, it is assumed that this channel relay unit has its ZWL relay R7950 operated, the ground potential on the conductor C4681SG1 will instead be connected by way of the contacts 7954, conductor C7994ZWL1 extending to Fig. 60 in order to operate the ZWL relay R6030. This relay, at its contacts 6032, completes the circuit for operating the reset relay R6060 in the same manner as occurs when the UBJ relay R6050 operates. In other words, the reset relay R6050 will operate to prevent the transmission of the routing indicator UACZZ through the connected channel relay unit 7900.

However, in the present example, the channel relay unit 7900 that processed the routing indicator UACZZ does not have its ZWL relay R7950 operated and, consequently, the ZWL relay R6030 (Fig. 60) remains in its restored position to permit the circuit to be retained for the slow-to-operate relay R4880 (Fig. 48A).

It is deemed advisable at this time to consider a further test that is made as a result of the operations of both of the space relays R6020 and R6025 in Fig. 60 at the conclusion of the sensing of the associated tapes by the tape readers 5546 and 5586 to sense the line number 101 and the corresponding tributary station routing indicator UACZZ. In this connection, it will be recalled that the channel relay unit 7900 is selected under control of the line number 101 by grounding the conductor C4681SG1 and thereby causes the operation of the transmission relay R7960. This particular unit has been selected because it is the one that processed the routing indicator UACZZ. A second channel relay unit, exactly the same as the relay R7900, was also utilized in processing the three additional routing indicators JWCX, JKXY and UKAY and as a result thereof, that second channel relay unit registered the relay switching center routing indicator JWC in its associated register, such as 8001, and it also caused the operation of its associated ZWL relay R7950 therein. Therefore, at the time relays R6020 and R6025 (Fig. 60) are operated, the channel relay unit 7900 that processed the routing indicator UACZZ has its transmission relay R7960 in an operated position and the second channel relay unit such as 7900, that processed the three above noted routing indicators has its ZWL relay, such as R7950, operated, but its associated transmission relay, such as R7960, is in its restored position. If the routing indicator UACZZ is now transmitted, in the manner to be described hereinafter, to the channel multipling unit 8700, the signals will be repeated to the monitor page printer 8750 and they will also be repeated only to the channel relay unit 7900 that processed the corresponding routing indicator UACZZ. However, at this time it is advisable to also transmit the routing indicator UACZZ to the second channel relay unit, such as 7900, that has its ZWL relay R7950 operated because the ZWL prosign utilized in connection with the second channel relay unit informs the next relay switching center JWC that it is not required to process any of the routing indicators appearing after the prosign ZWL in the pilot heading instructions of the message. In order to accomplish this, it is necessary to also operate the transmission relay R7960 in the second channel relay unit, such as 7900. This is accomplished by operating the relay, such as R7960, in the second channel relay unit, such as 7900, having the associated ZWL relay, such as R7950, in an operated condition, over a circuit including battery, lower winding of the relay R7960 in the second channel relay unit, contacts 7952 on the operated ZWL relay R7950 in that unit, conductor C7994ZWL2 which is multiply connected to the corresponding conductors of all of the channel relay units and is then connected by way of the conductor C7994ZWL2 in the channel relay unit 7900 (Fig. 79) extending to Fig. 60, contacts 6031, 6028 and 6023 and the grounded conductor C4872TST extending to Fig. 48. Accordingly, the transmission relay, such as R7960, in the second channel relay unit that processed the three routing indicators previously indicated is operated to complete the signalling circuit through that channel relay unit and the transmission relay R7960 in the channel relay unit 7900 that processed the routing indicator UACZZ is also operated to complete its signalling circuit.

With the two channel relay units in the above noted operated condition at the time the circuit, including the conductor C4872TRA2 and C5071TRN is completed for operating the slow-to-operate relay R4880, the routing indicator transmitter 5110 will transmit the routing indicator UACZZ through the two above noted channel relay units to their respective cross-office units, such as X3400. The relay R4880 upon operating completes the circuit including the contacts 4881 and 4887 for operating the relay R5130.

Figure 51:
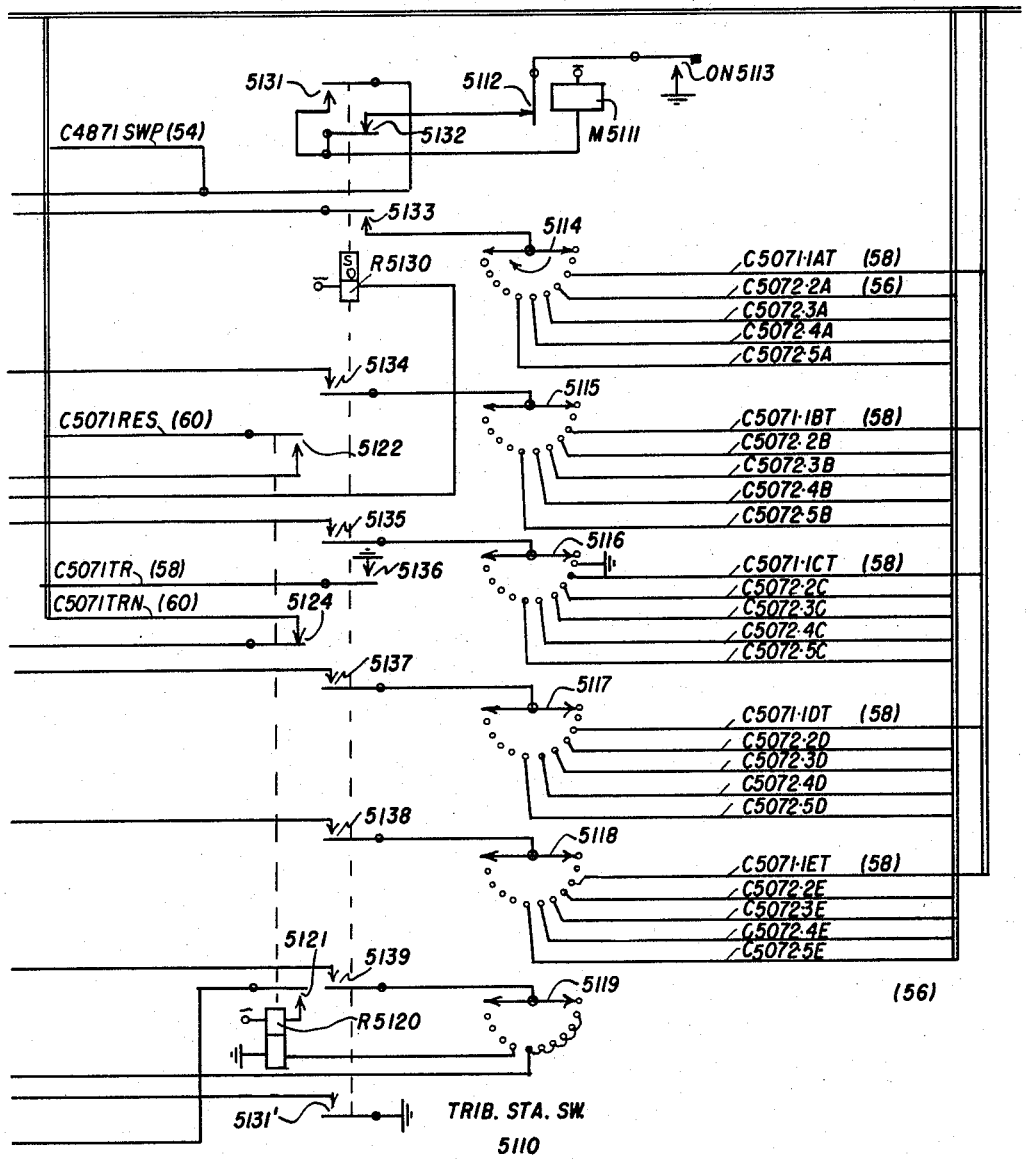

Referring now to Fig. 51 it will be seen that the relay R5130, at its contacts 5131, 5133, 5134, 5135, 5137, 5138 and 5139, connects up the routing indicator transmitter 5110 so that as the wipers of the switch are advanced step-by-step over the associated contacts the routing indicator marked in code form on the conductors terminating in the bank contacts will be transmitted to the channel multipling unit 8700. As a further result of the operation of the relay R5130, at its contacts 5136, it applies ground potential to the conductor C5071TR extending to Fig. 58 thereby to operate the transfer relay R5810. The transfer relay R5810, at its contacts 5812, 5814, 5816, 5818 and 5811', transfers the conductors C5861–1A to 1E, inclusive, from the windings of the relays R5820–1A to 1E, inclusive, to the conductor C5071–1AT to 1ET, inclusive, extending to Fig. 51 where they terminate respectively in the contacts 2 accessible to the wipers 5114 to 5118, inclusive. Therefore, the U character of the routing indicator UACZZ registered in the register 5602 of the storage routing register 5600 is now transferred by way of the conductors C5861–1A to 1E, inclusive, extending to Fig. 58 and then by way of the conductors C5071–1AT to 1ET, inclusive, to the bank contacts accessible to the wipers of the routing indicator transmitter 5110. The second character A of the routing indicator UACZZ registered in the register 5601 of the storage routing register 5600 is transferred by way of the conductors C5072–2A to 2E, inclusive, to Fig. 51 where this character is marked on the contacts 3 accessible to the wipers of the routing indicator transmitter 5110. Finally, the characters CZZ registered respectively in the register 5701, 5702 and 5703 are transferred by way of the conductors C5072–3A to 3E, inclusive, C5072–4A to 4E, inclusive, and C5072–5A to 5E, inclusive, extending to Fig. 51 where they are marked respectively on the contacts 4, 5 and 6 accessible to the wipers of the routing indicator transmitter 5110.

The magnet M5111 of the routing transmitter 5110 is operated over a circuit including its winding, contacts 5131, conductor C4871SWP extending to Fig. 54, and contacts 5241 and 5274 on the motor driven impulser 5201. It should be noted that the relay R5230 and R5240 will be operated when ground potential is applied to the conductor C4871SU–2 by contacts 5131' on relay R5130. Consequently, impulses from the impulser 5201 operate and restore the magnet M5111 to advance the wipers 5114 to 5119 step-by-step in a clockwise direction over the associated contacts. The wipers 5114 to 5119, inclusive, are now connected by way of the conductor C4871A to E, inclusive, and SM extending to Fig. 54 where they are further extended by way of the conductors C5503A to E, inclusive, and SM to the marking transmitter distributor 5503. As the wipers are advanced step-by-step over the contacts 1 to 6, inclusive, the following information is transmitted in code form to the marking transmitter distributor 5503.

| Bank Contracts | Code Information |
| --- | --- |
| 1 | space. |
| 2 | first character (U) of routing indicator. |
| 3 | second character (A) of routing indicator. |
| 4 | third character (C) of routing indicator. |
| 5 | fourth character (Z) of routing indicator. |
| 6 | fifth character (Z) of routing indicator or space. |

From the foregoing, it will be seen that as the wipers of the routing indicators transmitter 5110 are advanced step-by-step over the associated bank contacts, a "space" character is first transmitted and then the five character routing indicator UACZZ is then transmitted. It may be well to mention at this time, however, that if four characters are utilized in a routing indicator a "space" character function will be transmitted when the wipers engage the contacts 6 in the associated contact banks.

The above information, in code form, is transmitted to the marking transmitter distributor 5503 where it is repeated over the conductor C1187SIG1 extending to Fig. 11, contacts 1153, conductor C1188SIG extending to Fig. 87 in order to operate the relays R8710 to R8710-3 in the channel multiplying unit 8700. These relays repeat the code signals through the associated groups of relays, such as 8720, etc., to the signalling conductors, such as C7993SIG1, to each of the channel relay units provided in the relay switching center. Also, the relay R8720-4 repeats the signals to the monitor page printer 8750 where the routing indicator UACZZ will be printed following the outgoing line number 101 with a "space" therebetween. The contacts 8721 will repeat the code signals over the conductor C7993SIG1 extending to Fig. 79 and then by way of the contacts 7961 and 7945, the lower winding of the open line relay R7970, conductor C7992SIG extending to Fig. 83 and then over the previously traced circuit to the magnet XM3411 (Fig. 8) of the cross-office reperforator X3410 in the cross-office unit X3400 associated with the particular cross-office unit 7900.

The second channel relay unit, such as 7900, which was utilized to process the three routing indicators JWCX, JKXY and UKAY has its ZWL relay, such as R7950, and its transmission relay, such as R7960, and its director release relay, such as R7940, operated as previously mentioned. Consequently, the signalling circuit through the said second channel relay unit is also completed from the channel multiplying unit 8700 so that the tributary station routing indicator UACZZ will also be transmitted to a cross-office unit, such as X3400, associated with the second channel relay unit, such as 7900. This second channel relay unit previously transmitted a ZWL prosign to its cross-office unit and, consequently, immediately following the ZWL prosign the routing indicator UACZZ will now appear. The routing indicator following a ZWL prosign will indicate to the next relay switching center (JWC) that is to handle this message, that it need not process the routing indicator UACZZ because a message will be transmitted to the identified tributary station by the relay switching center UAC.

Referring again to Fig. 51 it will be seen that when the routing indicator transmitter 5110 advances its wipers into engagement with the contacts 6, the wiper 5119 will complete a circuit for operating the relay R5120 over its lower winding. The relay R5120 at this time is connected in a series circuit with the winding of the magnet M5504 of the marking transmitter distributor 5503 but, due to the high resistance of the lower winding of the relay R5120, the magnet does not operate. At its contacts 5121, the relay R5120 locks itself in its operated position over a circuit including its upper winding and the grounded conductor C4872SU-1. As a further result of the operation of relay R5120, at its contacts 5122, it now completes a circuit for operating the reset relay R6060 in Fig. 60. This circuit may be traced from battery, winding of relay R6060, conductor C5071RES extending to Fig. 51, contacts 5122, conductor C1186ES3 extending to Fig. 11, contacts 1165 and 1158, to ground. As a further result of the operation of relay R5120, at its contacts 5124, it now interrupts a point in the previously described circuit for the relay R4880 which now restores to normal. At its contacts 4881, the relay R4880 now interrupts the previously described circuit for the relay R5130 which also restores to normal.

Referring again to Fig. 51, it will be seen that the restoration of the relay R5130 disconnects the routing indicators transmitter 5110 from the previously mentioned circuits extending to the marking transmitter distributor 5503. Also, at its contacts 5132, the relay R5130 complete the self-interrupting circuit for the magnet M5111, whereby, the magnet advances its wipers 5114 to 5119 step-by-step in the clockwise direction until the wipers reach the illustrated home contact positions. When this occurs, the off-normal contacts ON5113 are opened in order to terminate further stepping action of the magnet M5111. It should be understood, however, that the off-normal contacts ON5113 are closed whenever the wipers are not in the illustrated home contact positions. As a further result of the restoration of relay R5130, at its contacts 5136, it removes ground potential from the conductor C5171TR extending to Fig. 58 in order now to restore the transfer relay R5810.

Referring now to Fig. 60, it will be seen that when the reset relay R6060 operates under control of the relay R5120 at the end of the transmission of the first routing indicator UACZZ by the routing indicator transmitter 5110, it will control various circuits in order to release certain relays and apparatus that have been utilized in connection with the transmission of the first outgoing line number 101 and its associated routing indicator UACZZ. This relay, subsequently, restores to normal after it has performed its releasing controls so that the next outgoing line number and routing indicator stored on the tapes associated with the outgoing line number tape storage unit 5501 and the routing indicator tape storage unit 5502 may be read by the respective tape readers.

More specifically, the relay R6060 upon operating, at its contacts 6066 and 6067 interrupts a point in each of the parallel circuits including the conductors C6082AMA and BMA extending to the magnets M5580 and M5540 of the tape readers 5586 and 5546, respectively. Also, at its contacts 6068, the relay R6060 applies ground potential to the conductor C8451RS1 extending to Fig. 84 in order to operate the magnet M8410 of the units digit register 8416U. This circuit will be subsequently interrupted by the restoration of the reset relay R6060 to permit the magnet M8410 to restore to normal and advance its wipers 8412 to 8414, inclusive, one step in a clockwise direction. It may be well to mention at this time that the units digit register 8416U and the tens digit register 8416T count the number of routing indicators that are taken from the temporary tape storage in the storage unit 5502. Every time the units switch advances its wipers 10 steps, the magnet M8420 of the tens digit register 8416T is operated and then restored to register the tens digit of the number of routing indicators counted. Actually the total number of routing indicators taken from the tape storage unit 5502 and counted by the units and tens digit registers 8416U and T must equal the number of routing indicators that have been processed and counted by the units and tens digit register 8436U and T. The last-mentioned tens and units digit registers have previously been set in accordance with the total number of routing indicators processed in connection with the present message which, in the present example, is four routing indicators (UACZZ, JWCX, JKXY and UKAY).

As a further result of the operation of the reset relay R6060, at its contacts 6061, it removes the locking ground potential from the conductor extending to the locking make contacts of the units relays R6140U1 to U0, inclusive. Any operated units relay will now restore to normal. Also, at its contacts 6061, the relay R6060 removes ground potential from the conductor C6069SU extending to Fig. 48 thereby to restore the operated hundreds digit relay R4801. This locking conductor will, of course, be connected to similar hundreds digit relays that are provided so that any operated ones of said relays will restore when the ground potential is removed from the conductor C6069SU. Furthermore, at its contacts 6061, the relay R6060 removes ground potential from the conductor C4684SUC extending to Fig. 47 thereby to restore the tens relay R4710 which has been locked to this conductor. Any other tens relay, such as R4720 to R4740, inclusive, will also restore to normal if it is locked to the conductor C4684SUC.

At its contacts 6065, the reset relay R6060 removes ground potential from the locking circuits for the relays R6110, R6120 and R6130 thereby to restore these relays. Also, at the contacts 6065, the relay R6060 removes ground potential from the locking circuit for the relays R5910 and R5920, which also restore to normal; and, it removes ground potential from the locking circuit for the figures shift relay R6010 which also restores to normal. The last-mentioned relay, at its contacts 6014, removes ground potential from the "*h*" conductor extending to Fig. 62 thereby to restore the magnet M6241. The relay R5910, at its contacts 5913, removes ground potential from the "*g*" conductor in order to restore the magnet M6231. Consequently, the magnet of the figures shift switch 6203 and the magnet of the letters shift switch 6202 restore to normal substantially simultaneously in order to advance their wipers one step. The contacts 1 to 10, inclusive, accessible to the wiper 6234 and the corresponding contacts accessible to the wiper 6244 are multiply connected. Therefore, as long as the wipers of the two switches noted remain in engagement with corresponding contacts in the respective banks a circuit is maintained for the slow-to-release alarm relay R6250. In other words, if these relays remain in synchronism during the counting of the figures shift and letters shift characters, the relay R6250 will remain operated and prevent the completion of the circuit for the alarm lamp L6253. If the switches get out of step, the lamp L6253 will be illuminated to indicate this fact to the attendant at the relay switching center. Reset keys K6270 and K6280 are provided for independently operating the respective magnets M6231 and M6241 in order to place wipers of these switches in synchronism with each other.

As a further result of the operation of the reset relay R6060, at its contacts 6062, it removes ground potential from the locking circuit for the space relays R6020 and R6025 which simultaneously restore to normal. At the contacts 6023 and 6028, the last-mentioned relays now interrupt the previously traced circuit including the conductor C7994ZWL2 extending to Fig. 79 and multiply connected to all of the channel relay units, such as 7900, in order now to restore the particular transmission relay, such as R7960, in the second channel relay unit that processed the three routing indicators JWCX, JKXY and UKAY.

Also, at its contacts 6062, the reset relay R6060 removes ground potential from the circuit including the contacts 6043, the conductor C4872SU–1 extending to Fig. 48 in order to restore the relays R4840, R4870, R4890, and R5120 which have been locked to this conductor.

At its contacts 6063 and 6064, the relay R6060 removes ground potential from the conductors C6081SU–1 and SU–2 extending to Fig. 56 in order now to restore the operated relays in the registers 5601, 5602, 5701, 5702 and 5703 and also to restore the operated relays R5650, R5660, R5720, R5730, R5740 and R5750 in the storage routing register 5600. The storage routing register 5600 is now in condition to register the next routing indicator sensed by the tape reader 5586 in the routing indicator tape storage unit 5502.

Referring now to Fig. 48, it will be seen that when the relay R4840 restores to normal in response to the removal of ground from the conductor C4872SU–1, at its contacts 4843, it removes the ground potential from the circuit including the conductor C4872TST extending to Fig. 61 and from the conductor C4684–1, if the unit relay R6140U1 has not already restored to normal. The conductor C4684U1 extends to Fig. 47 where it was connected to the conductor C4681SG1 extending to Fig. 79, contacts 7953 and the winding of the transmission relay R7960. Thus, the circuit is interrupted for the transmission relay R7960 in the particular channel relay unit 7900 that processed the routing indicator UACZZ and it restores to normal. At its contacts 7961, the relay R7960 interrupts a point in the signalling circuit extending through this particular channel relay unit to its associated cross-office unit X3400.

Also, as a result of the restoration of relay R4840, at its contacts 4844, ground potential is removed from the circuit including the conductor C4872TRA2, contacts 6051 and 6033, conductor C5071TRN extending to Fig. 51, contacts 5124 and the winding of the slow-to-operate relay R4880. This circuit is opened in order to prevent reoperation of the relay R4880 incident to the restoration of the relay R5120. The relay R4870 and the relay R4890 (Fig. 48A) both restored to normal at the time the ground potential was removed from the conductor C4872SU–1 and they in turn conditioned various circuits so that the tape storage units 5501 and 5502 may read the next outgoing line number and the next routing indicator appearing on the associated tapes. Finally, the restoration of the relay R5120 (Fig. 51) opens the circuit, at its contacts 5122, for controlling the reset relay R6060 which now slowly restores to normal.

The restoration of the reset relay R6060 in the manner described above again completes, at its contacts 6066 and 6067 the previously described parallel circuits, including the conductors C6062AMA and BMA extending to Fig. 55 thereby to reinitiate the reading operation of the tape readers 5586 and 5546. In the foregoing description it was assumed that the tape reader 5546 sensed the outgoing line number 101 and as a result thereof, the channel relay unit 7900 was selected as the unit that processed the routing indicator UACZZ. The digits 101 of the outgoing line number were transmitted by the number transmitter 4810 and the marking transmitter distributor 5503 to the channel multipling unit 8700 where this information was printed by the monitor page printer 8750. The outgoing line number 101, however, was not repeated to any channel relay unit, but, it was instrumental in selecting the particular channel relay unit 7900 that processed the routing indicator UACZZ. Furthermore, the tape reader 5586 in reading the associated tape caused the routing indicator UACZZ to be stored in the storage routing register 5600. This ultimately resulted in the transmission of the routing indicator UACZZ by the routing indicator transmitter 5110, the marking transmitter distributor 5503 and the channel multipling unit 8700, to the monitor page printer 8750 and also through the signalling circuit of the selected channel relay unit 7900 to its associated cross-office unit X3400. This routing indicator UACZZ was also repeated by the channel multipling unit 8700 to a second channel relay unit, such as 7900, that processed the three routing indicators JWCX, JKXY and UKAY and was marked with a ZWL prosign. Accordingly, the routing indicator UACZZ was repeated through the signalling circuit of the above noted second channel relay unit to its associated cross-office unit where the routing indicator was perforated on the tape, following the perforations on the ZWL prosigns.

The tape reader 5546 having been restarted by the operation of the magnet M5540 now reads the second line number perforated on the associated tape. This line number identifies the outgoing line and, consequently, the corresponding channel relay unit that is to handle the message to be transmitted over the corresponding outgoing line. The tape reader 5586 is simultaneously sensing the second routing indicator appearing on the associated tape which in this case is the routing indicator JWCX. When this routing indicator was first processed it was assumed for convenience in describing the system that it was to be transmitted over an outgoing line 101 and, therefore, the digits 101 were perforated on the tape 5534 associated with the tape reader 5546. It was also assumed that the channel relay unit 7900 was used in processing the routing indicator JWCX. But it should be kept in mind during the following description, that the channel relay unit 7900 and the associated cross-office unit X3400 are not the same two units that are utilized in connection with the processing of the routing indicator UACZZ as described above. Therefore, the following description, with regard to the reading of the associated tapes by the tape reader 5546 and 5586, will be made in conjunction with the channel relay unit 7900 illustrated in Figs. 79 to 82 and the cross-office unit X3400 illustrated in Fig. 8, but it must be remembered that they are not the same units that were used in processing the routing indicator UACZZ.

The tape reader 5546 in the outgoing line number tape storage unit 5501 now senses the "figures shift" character function the digits 101 followed by a "space" character function in the manner previously described to the channel number sensing relays R5930A to E, inclusive, in Fig. 59. Any "space" and "blank" character functions preceding the "figures shift" character function will be absorbed. The relay R6010 responds to the "figures shift" character function to prepare the circuit for the space relay R6020 and to complete the circuit, at its contacts 6014, for operating the magnet M6241 of the figures shift switch 6203. The channel number sensing relays now sense the digits 101 in the order named in order to operate and lock the relay R4801 to register the hundreds digit 1; the relay R6110 operates at this time to transfer the tens marking conductors "0," "1," "2" and "3" in the cable C5992 to the relays R4710 to R4740 in Fig. 47 and in accordance with the tens digit 0, the relay R4710 is operated and locked. This relay, at its left-hand contacts marks the tens digit 0 in the bank contacts accessible to the number transmitter 4810 and, at its right-hand contacts prepares points in the circuit for selecting one of the ten conductors, such as C4681SG1, extending to ten different channel relay units, such as 7900. Thereafter, the relay R6120 operates to transfer the marking conductors "1" to "0" in the cable C5992 to the units relays R6140U1 to U0, inclusive. The units digit 1 now operates the relay R6140U1 thereby to mark this digit in the bank contacts of the number transmitter 4810 over circuits including the conductors C4872UA to UE, inclusive.

After the outgoing line number 101 has been registered the channel number sensing relays R5930A to E, inclusive, respond to the "space" character function and thereby cause the operation of the space relay R6020. The latter relay, at its contacts 6024, opens the circuit for the magnet M5540 to stop the reading of the tape 5544 by the tape reader 5546.

During the time that the tape reader 5546 in the outgoing line number tape storage unit 5501 is reading the tape 5534, the tape reader 5586 in the routing indicator tape storage unit 5502 is reading the tape 5574 and senses the perforations corresponding to a "letters shift" character function, JWCX and a "space" character function in the order named. The relays R5840RIA to RIE, inclusive, respond to the "letters shift" character function in order to operate the relay R5910 and at the end of the sensing of this character function, the relay R5920 operates in series with the relay R5910. The next four characters JWCX control the relay R5840RIA to RIE, inclusive, and transfers these characters in the order named over the conductors C5991A to E, inclusive, to Fig. 56 to the registers in the storage routing register 5600. The first character J is stored in the register 5602, the second character W is stored in the register 5601, the third character C is stored in the register 5701 and the fourth character X is stored in the register 5702. The relays R5840RIA to RIE now respond to the "space" character function in order to operate the space relay R6025 and to register the "space" in the register 5703. The relay R6025, at its contacts 6029, interrupts the circuit for the magnet M5580 of the tape reader 5586 in order to stop further reading of the tape 5574.

As a further result of the operation of the space relay R6025, at its contacts 6026, it now completes a circuit including contacts 6021, conductor C4872TRA1 extending to Fig. 48A, conductor C1180EL2 extending to Fig. 11 in order to operate the reset relay R1160. This relay upon operating completes a circuit, previously described, for operating the relay R4930 whereby the miscellaneous switch 4910 (Fig. 49) is controlled to transmit code signals corresponding to two "carriage return," one "line feed," and a "space" character function, to the marking transmitter distributor 5503 and thus to the channel multipling unit 8700 to control the monitor page printer 8750. In responding to these signals, the monitor page printer is controlled to start a new line of typing, but this information is not repeated to any of the channel relay units, such as 7900.

After the above information is transmitted to the monitor page printer 8750, the relay R4940 operates in order to restore the miscellaneous switch 4910 to normal and in order to complete, at its contacts 4943, the circuit for operating the relay R4870. It being understood that the relay R4890 has previously been operated by ground potential applied to the conductor C4872SU–1 at the time the reset relay R6060 restored to normal, as previously described. As a result of the operation of relay R4870, at its contacts 4874, it completes a circuit for operating the relay R4830 whereby the number transmitter 4810 is controlled to transmit the code signals corresponding to a "space," a "figures shift," the hundreds digit (1), the tens digit (0), the units digit (1) and a "letters shift" character function by way of the marking transmitter distributor 5503 and the channel multipling unit 8700 to the monitor page printer 8750. This information, however, is not repeated to any of the channel relay units, such as 7900.

After the foregoing information is transmitted by the number transmitter 4810, the relay R4840 operates in the manner previously described. This relay interrupts, at its contacts 4842, the circuit for the relay R4830 thereby to cause the number transmitter 4810 to be restored to its normal position. Also, at its contacts 4843, the relay R4840, completes a circuit including the conductor C4872TST extending to Fig. 51, the right-hand make contacts on the operated units relay R6140U1, conductor C4684–1 extending to Fig. 47, contacts 4717 on the operated tens relay R4710, conductor C4681SG1 extending to Fig. 79. The channel relay unit 7900 (Figs. 79 to 82, inclusive) is assumed, at this time, to be the channel relay unit that processed the three routing indicators JWCX, JKXY and UKAY and as a result thereof, the relay switching center routing indicator JWC was registered in its register 8001. It was also determined during the operation of this particular channel relay unit that the prosign ZWL can be used and this prosign was transmitted to its associated cross-office unit X3400 following the multiple call indicator ZVA. Since a ZWL prosign has been used in connection with the processing of the routing indicators noted above, the ZWL relay R7950 in this channel relay unit is in its operated position. Operation of this relay will indicate that it is not necessary to transmit, over the signalling circuit of this channel relay unit to its associated cross-office unit, any of the routing indicators that were originally processed by it as part of the pilot heading information. Therefore, the ground potential applied to the conductor C4681SG1 in Fig. 49, as described above, is further extended through the contacts 7954 of the operated ZWL relay R7950 (instead of being connected to the winding of the transmission relay R7960) and then by way of the conductor C7994ZWL1 extending to Fig. 60 in order to operate the ZWL relay R6030.

Operation of the ZWL relay R6030 at this time will prevent the transmission of the routing indicators JWCX by the routing indicators transmitter 5110 either to the monitor page printer 8750 or to any channel relay unit. As soon as the relay R6030 operates it closes its contacts 6032 and thereby completes a circuit which may be traced from battery through the winding of the reset relay R6060, contacts 6032 and 6051, conductor C4872TRA2 extending to Fig. 48, and the contacts 4844 on the operated relay R4840, to ground. Therefore, the reset relay R6060 operates and performs the various operations previously described whereby all of the operated relays and equipment utilized in conjunction with the reading of the line number by the tape reader 5546 and the reading of the routing indicator JWCX by the tape reader 5586 are restored to normal.

From the foregoing, it will be understood that when a ZWL prosign is registered in the channel relay unit selected for transmission of a particular routing indicator to its associated cross-office unit, the line number of that routing indicator will be sent to the monitor page printer 8750, but the routing indicator will not be transmitted either to the monitor page printer 8750 or to the channel relay unit having the ZWL registered therein. It should be kept in mind, however, that the ZWL prosign appearing in the pilot heading information of a message controls the switching equipment at the next designated relay switching center to transmit all of the routing indicators appearing on the original message and to omit the transmission of the routing indicators appearing immediately after the ZWL prosign. In the present case, the routing indicator UACZZ appears after the prosign ZWL and will thereby control the switching apparatus at the next relay switching center to ignore the routing indicator UACZZ inasmuch as the message to that tributary station is being handled by another relay switching center, and it will control the switching apparatus at the next relay switching center to transmit the message to all of the tributary stations corresponding to the remaining routing indicators listed in the original message.

The reset relay R6060 will subsequently restore to normal and again complete, at its contacts 6066 and 6067, the parallel circuits for reoperating the magnets of the tape readers 5546 and 5586. Also, at the contacts 6068, the relay R6060 completes the circuit including the conductor C8451RS1 extending to Fig. 84 in order to count the second routing indicator taken from the routing indicator tape storage unit 5502. The tape readers, noted above, will again read the respective tapes to determine the line numbers and routing indicators in exactly the same manner as has been described above, except that the third routing indicator is JKXY and the fourth routing indicator is UKAY. The line numbers for each of these routing indicators is again assumed to be the number 101. Therefore, the miscellaneous switch 4910 will first be controlled to transmit the two "carriage return," "line feed" and "space" character functions to the monitor page printer and thereafter the number transmitter 4810 will be controlled to transmit the "space," "figures shift," hundreds digit (1), tens digit (0), units digit (1) and "letters shift" character functions to the monitor page printer 8750. Since the third routing indicator JKXY need not be transmitted through the channel relay unit 7900 having the ZWL prosign registered therein by the operated condition of relay R7950, the reset relay R6060 will again be operated to prevent the transmission of the routing indicator JKXY by the routing indicator transmitter 5110. The apparatus is again restored to normal by the reset relay R6060 and when it in turn restores to normal it will repeat the foregoing described operations in connection with the fourth routing indicator UKAY. The same results are obtained as far as this routing indicator is concerned, since it also encounters the ZWL prosign registration in the channel relay unit 7900. The monitor page printer 8750, however, will be controlled by the miscellaneous switch 4910 to start a new line of printing and it will also be controlled by the number transmitter 4810 to print the number 101.

Each time the reset relay R6060 operates and restores after each routing indicator is taken from the routing indicator tape storage unit 5502 by the tape reader 5586, it controls, at its contacts 6068, a circuit including the conductor C8451RS1 extending to Fig. 84 in order to operate and restore the magnet M8410 to count the number of routing indicators taken from the tape storage unit. In the present example, four routing indicators were taken from tape storage and it is the same number of routing indicators initially processed and counted by the units digit register 8436U. Therefore, the wipers 8412 to 8414, inclusive, of the units digit register 8416U and the wipers 8433 to 8435, inclusive, of the units digit register 8436U are in engagement with the contacts 4 in the respective banks. Also, the wipers 8422 and 8423 of the tens digit register 8416T and the wipers 8442 to 8444, inclusive, of the tens digit register 8436T are in engagement with the contacts 0 in the associated contact banks. When the wipers of these switches match contact positions, ground potential at the contacts 6042 on the operated start reading relay R6040 is extended by way of conductor C8451COMP extending to Fig. 84, wiper 8434, its engaged contact 4, wiper 8414 and its engaged contact 4, wiper 8423 and its engaged contact 0, wiper 8443 and its engaged contact 0, conductor C1180APC extending to Fig. 11 and the winding of the all-pilots-complete relay R1150, to battery. This relay now operates and locks itself by way of its contacts 1155 to ground at contacts 1114. Operation of the relay R1150 is an indication that all of the routing indicators appearing in the original multiple call message have been analyzed and processed to establish the identity of the various outgoing lines over which this message must be repeated to reach the destinations identified by the different routing indicators and that the pilot heading information for each message to be transmitted over each of the identified outgoing lines has been transmitted to and stored in the associated cross-office units such as X3400. However, before describing the controls exercised by the operation of the all-pilots-complete relay R1150, a description will first be given of the automatic control of the feed out of blank tape between the typing reperforator 5545 and its associated tape reader 5546 and between the typing reperforator 5585 and its associated tape reader 5586.

In the outgoing line number tape storage unit 5501, the perforating pins (not shown) on the typing reperforator 5545 are spaced-apart from the sensing pins on the tape reader 5546 a measurable distance under a tight tape condition equal to approximately 60 characters. Also, the spacing between the typing reperforator 5585 and the tape reader 5586 in the routing indicator tape storage unit 5502 is exactly the same. Therefore, when the typing reperforators of the two units noted above are controlled to perforate the associated tapes a slack tape condition exists between the reperforators and their associated tape readers and the tapes are stored, respectively, in the storage bins 5536 and 5576. Also, after the last item or character perforated on the associated tape by the reperforators, the tape is fed from the perforating pins on the reperforators only one character spacing. In order to feed the last perforated character on the tape through its associated tape reader, it is necessary to automatically feed out sufficient tape to permit the last character to pass through the sensing pins on the associated tape reader.

From the foregoing description of the operation of the tape readers 5546 and 5586, it is apparent that during the reading of each line number and each associated routing indicator, the same amount of tape is fed through the respective readers. Actually during the operation of the typing reperforator 5545 in the outgoing line tape storage unit 5501 in accordance with successive line numbers, a "figure shift" character function appears every tenth character spacing. Also, during the operation of the typing reperforator 5585 in the routing indicator tape storage unit 5502 in accordance with successive routing indicators, a "letters shift" character function appears every tenth character spacing. Since the "figures shift" and "letters shift" character functions indicate to the sensing apparatus in the storage control unit 5800 (Figs. 58 to 60) controlled by the tape readers 5546 and 5586, the beginning of the reading of each line number and each routing indicator, the two readers are kept substantially in synchronism during their reading cycles. However, due to the character spacing distance between the reperforators and the associated readers, a tight type condition will be encountered before all of the information that has been perforated on the tape is able to pass through the associated reader. Whenever this condition is encountered on the tapes 5534 and 5574, the tight tape switch contacts 5532 and 5572 will be closed to complete a circuit including the conductor C6082TTS extending to Fig. 60, contacts 6046 (relay R6040 being operated during the time the tape readers 5546 and 5586 are functioning) the winding of the tape feed out relay R6070 and its associated resistor, to battery. The relay R6070 operates over this circuit and, at its contacts 6073, locks itself to ground at its contacts 6047.

In response to the operation of the relay R6070, at its contacts 6076, it interrupts a circuit including the conductors "c" and "b" extending to Fig. 62 to prevent the completion of the self-interrupting circuit of the magnet M6211; and, at its contacts 6072 it interrupts a circuit including the conductors "e" and "f" extending to Fig. 62 to prevent the completion of the self-interrupting circuit for the magnet M6221. At its contacts 6071, the relay R6070 completes a circuit for controlling the magnet M6211 which may be traced from battery, winding of the magnet M6211, off-normal contacts ON6213 (which are only open when the wipers 6214 to 6216, inclusive, reach the normal N or home contact position) conductor "d" extending to Fig. 60, contacts 6071, conductor C5284SWP extending to Fig. 52, and contacts 5274 on the motor driven impulser 5201, to ground.

The continuously operating motor driven impulser 5201, at its contacts 5274, applies ground pulses over the above mentioned circuit and operates and restores the magnet M6211. Each time the magnet operates and restores, it advances its wipers 6214 to 6216, inclusive, one step in a clockwise direction. When the wiper 6215 engages its contacts 10, the next pulse transmitted to the magnet M6211 is also transmitted by way of the wiper 6215 and its engaged contact 10, off-normal contacts ON6223 and the winding of the magnet M6221, to battery. For every ten steps by the wipers of the magnet M6211, the magnet M6221 advances its wipers 6224 and 6225 one step in a clockwise direction. As soon as the wiper 6214 is stepped from its tenth contact position into engagement with the N contact, the off-normal contacts ON6213 are opened and a self-interrupting circuit is completed for the magnet M6211, which includes contacts 6212, wiper 6214 in engagement with the contact N and the winding of the magnet M6211, to battery. Upon operating the magnet M6211 interrupts its own circuit, at its contacts 6212, and upon restoring it advances the wipers into engagement with the contacts 1. When this occurs, the off-normal contacts ON6213 are again closed in order to reestablish the pulsing circuit for the magnet M6211 under control of the motor driven impulser 5201.

From the foregoing, it will be understood that for every ten steps of the wipers by the magnet M6211, the wipers controlled by the magnet M6221 are advanced one step. This counting operation continues until the wiper 6225 engages its contact 5 and the wiper 6216 engages its contact 7. Thus, indicating that 57 pulses have been counted by the tape feed out counting switch 6201. When this occurs, a circuit is completed which may be traced from ground, the wiper 6216 and the engaged contact 7, wiper 6225 and the engaged contact 5, conductor "a" extending to Fig. 60, to the midpoint between the winding of the relay R6070 and its associated resistor and battery. This circuit effectively shunts the tape feed out relay R6070 which now restores to normal.

When the tape feed out relay R6070 initially operated, it also closed its contacts 6077 and 6078 thereby to apply ground potential to the conductors C6082T6A and T6B extending to Fig. 55 in order to operate the clutch magnets M5561 and M5521 respectively of the transmitter distributor 5560 and 5520. Both of the above mentioned magnets now operate and as a result thereof, the contacts shown to the left of the magnets are controlled, in the manner previously described, in order to control the respective reperforator magnets M5570 and M5530. At the beginning of the first cycle of operation of the transmitter distributor 5520, the contacts 5522 are opened in order to remove ground potential from the circuit including the conductor C6082TDB extending to Fig. 60, conductor C6082RPD extending to Fig. 55 and the reperforator magnet M5530. The reperforator magnet now restores to normal to initiate the cycle of operation of the typing reperforator 5545. The contacts shown to the left of the contact 5522 are each closed in a predetermined order but since the conductors connected to these contacts are not grounded at this time, a "blank" character function is automatically transmitted in code form to the reperforator magnet M5530. Therefore, a feed hole is perforated on the associated tape but there are no other perforations thereon in order to indicate a "blank" character function as is shown in Fig. 89. At the end of the first cycle of operation of the transmitter distributor 5520, the contacts 5522 are closed in order to reoperate the magnet M5530. Since the clutch magnet M5521 is retained operated, the above cycle of operation is immediately repeated.

The above described operations with regard to the transmitter distributor 5520 also apply at this time to the transmitter distributor 5560 and as long as the clutch magnet M5561 is retained in its operated position, the contacts 5562 will be periodically opened in order periodically to restore the reperforator magnet M5570 to perforate the "blank" character function.

The timing of the transmitter distributors 5520 and 5560 is such that they will control the associated perforators to perforate approximately 60 "blank" character functions during the time interval that it takes the tape feed out counting switch 6201 to count 57 pulses from the motor driven impulser 5201. Therefore, sufficient tape will be fed out by the typing reperforators 5545 and 5585 to permit the entire last line number and routing indicator stored on the respective tapes to pass through the associated tape readers. This automatic feed-out of tape will prevent any of the characters of either a line number or a routing indicator from being withheld from the sensing pins on the associated tape readers by a tight tape condition.

As soon as the tape feed out relay R6070 is shunted at the end of the counting of 57 pulses by the tape feed out counting switch 6201, the relay restores to normal to interrupt, at its contacts 6077 and 6078, the previously described circuits for the magnets associated with the transmitter distributors 5520 and 5560. At its contacts 6071, the relay R6070 interrupts the pulsing circuit for the counting switch 6201; at its contacts 6073, it interrupts its locking circuit; and, at its contacts 6072 and 6076 it establishes a self-interrupting circuit for the magnets M6211 and M6221 in the counting switch 6201. These magnets will now operate and restore until their respective wipers 6214 and 6224 engage the contact 1. When this occurs, the self-interrupting circuit including these wipers is interrupted inasmuch as the contacts 1 are not multiply connected to the remaining contacts.

All pilots completed

In the foregoing description it was pointed out that when the four routing indicators of the multiple call message stored on the tape 1413 in the multiple call storage unit 1400 is originally analyzed by the multiple call equipment, the units and tens digit registers 8436U and 8436T is successively operated to count the number of routing indicators processed to the different channel relay units, such as 7900. These routing indicators were temporarily stored in the routing indicator tape storage unit 5502 and were subsequently taken from storage in connection with the manufacture of new pilot heading information for each message that is to be transmitted over each of the outgoing lines extending in the direction of the destinations identified by the respective routing indicators. As the routing indicators are taken from the routing indicator tape storage unit 5502, they are counted and registered in the units and tens digit registers 8416U and 8416T.

When the number of routing indicators taken from the tape storage unit 5502 and registered in the units and tens digit registers 8416U and 8416T is equal to the number of routing indicators taken from the multiple call storage unit 1400 for processing, as registered in the units and tens digit registers 8436U and 8436T, a circuit is completed for operating the all-pilots-complete relay R1150 (Fig. 11). This circuit has been previously described and resulted in the application of ground potential on conductor C1180APC (Fig. 84). It should be noted, however, that the ground potential applied to the last-mentioned conductor, which initially operates the all-pilots-complete relay R1150, is also extended from Fig. 11 by way of the conductor C1787APC extending to Fig. 17, contacts 1726 and 1774 and the lower winding of the open line relay R1760 to battery. At its contacts 1763, the relay R1760 prepares a point in the circuit traced hereinafter for controlling the character counter 2030 (Fig. 20); and, at its contacts 1761, it prepares a point in a circuit for operating the relay R1795. Consequently, the multiple call storage unit 1400 is now prepared for subsequent operation under control of its associated transmitter 1430.

Referring again to Fig. 11, it will be seen that as soon as the all-pilots-complete relay R1150 operates, it locks itself by way of its contacts 1155 and 1114, to ground on the operated start relay R1110. Also, at its contacts 1156, the relay R1150 interconnects the conductors C1183CA1 and C1183CA2 extending to Fig. 44 in order to restart the tape reader 1420 in the multiple call storage unit. This circuit may best be traced from ground at the slack tape contacts 1422 on the tape switch 1427 in the tape reader 1420 (Fig. 14) and then by way of the conductor C1402TRS extending to Fig. 19, contacts 1914 and 1725, conductor C1788C2 extending to Fig. 44, contacts 4415 on the operated process complete relay R4410, conductor C1183CA2 extending to Fig. 11, contacts 1156, conductor C1183CA1 extending to Fig. 44, contacts 4412 on the operated process complete relay R4410, conductor C1788C1 extending to Fig. 17, contacts 1724, 1782, 1882, 1864 and 2018 in multiple, and 1892, conductor C1402TRC extending to Fig. 14 and the winding of the clutch magnet M1425, to battery. The clutch magnet M1425 in the tape reader 1420 is thus operated to permit further sensing of the perforations in accordance with the body of the multiple call message (Item 7) on the tape 1413.

As a further result of the operation of the all-pilots-complete relay R1150, at its contacts 1159, it now completes a circuit which may be traced from battery, by way of the relay R1075 (Fig. 10), contacts 1066 and 1159, conductor C1787T2S extending to Fig. 17, contacts 1721', conductor C1402TDS extending to Fig. 14, and contacts 1434, to ground on the tape switch 1432 associated with the transmitter 1430. The relay R1075 now operates and, at its contacts 1076, completes an obvious circuit for operating the slow-to-operate relay R1065. Subsequently, the latter relay operates to interrupt, at its contacts 1066 the shunting circuit around the winding of the relay R1060. As a result thereof, the relay R1060 now operates in series with the relay R1075. As a further result of the operation of relay R1075, at its contacts 1078, it connects ground potential by way of the conductor C1184COM extending to Fig. 79, the winding of relay R7920, conductor C7871PSS extending to Fig. 78, conductor C7872PSS extending to Fig. 83, contacts 8314, wiper 8328, conductor C8330PSS extending to Fig. 8, contacts 805 and 803 and the winding of relay R805, to battery.

The relays R805, R802, the contacts 803, 804 and 805 are part of the signal control unit 801. This signal control unit has been schematically illustrated and it should be understood that when the relays XR3880 and XR3890 (Fig. 8) are operated over the conductor C8330-OGC in the manner previously described, the contacts 804 will be opened and the contacts 805 will be closed in the signal control unit 801. Therefore, when the ground potential is applied over the above traced circuit including the winding of the relay R7920 and the winding of the relay R805, both relays will operate in series. The schematically illustrated relay R802 and its break contact 803) are provided for the purpose of interrupting the series circuit for the relays R805 and R7920 in the event that the cross-office reperforator X3410 fails to feed out tape at a time when signals are being transmitted to the magnet XM3411. When this condition exists to indicate the failure of the feed out of tape by the cross-office reperforator X3410, the relay R7920 in the channel relay unit 7900 will restore to normal and, at its contacts 7921, it will complete an alarm circuit to prevent the transmission of additional signals to the cross-office unit reperforator X3410. Thus, if the channel relay unit 7900 is included in the signalling circuit to the cross-office reperforator X3410 at the time its relay R7920 restores to normal, ground potentials at the contacts 7962' will be extended by way of the contacts 7921, conductor C1184ALM extending to Fig. 10, contacts 1077 and the winding of the alarm relay R1070, to battery. This relay upon operating, at its contacts 1071 will shunt the windings of the relay R1060 and the latter relay will restore and remove the ground potential, at its contacts 1061, from the conductor C1787T2M to stop the transmitter 1430. Also, the alarm relay R1070, at its contacts 1073, will complete the circuit for illuminating the alarm lamp L1074 to indicate the failure of the cross-office reperforator X3410 to feed out the tape.

It will now be assumed that the alarm relay R1070 is not operated and, consequently, the ground potential at the contacts 1061, will be extended by way of the conductor C1787T2M to Fig. 17, contacts 1729, 1798 (or 1778) and 1784, conductor C1402TDC extending to Fig. 14 and the winding of the magnet M1427 of the transmitter 1430. Operation of the magnet M1427 will now start the transmitter 1430 so that it will transmit signals over the conductor C1402TD in accordance with the perforations appearing on the tape 1413.

It will be recalled that the operation of the all-pilots-complete relay R1150, at its contacts 1156, completes the circuit whereby the magnet M1425 of the tape reader 1420 is operated at the same time that the circuit is completed for operating the magnet M1427 of the transmitter 1430. The tape reader 1420 therefore begins to read the subsequent information (body of the message, Item 7) appearing on the tape 1413 following the last routing indicator of Item 6. Therefore, the relays in the sensing unit 1501 are again controlled in accordance with the various characters appearing on the tape 1413 and sensed by the tape reader 1420. As the characters are sensed by the sensing unit 1501, the relay R1570 controls its contacts 1577 to transmit pulses over a circuit including the contacts 1723, conductor C1787PPC extending to Fig. 11, then by way of the contacts 1233 and 1152 to the winding of the magnet M1205 in the message character counter 1201. Also, the impulses at the contacts 1577 are transmitted over a circuit including the contacts 1763 and 1792, to the magnet M2031 in the character counter 2030. The operation of the character counter 2030 has been previously described and it will be understood that it counts 72 characters before the circuit is completed for the relay R2010. In other words, after the tape reader 1420 has counted 72 additional characters on the associated tape, the character counter 1230 will again operate the relay R2010. Also, the magnet M1205 will have been operated and restored 72 times to position its wipers 1207 to 1209, inclusive, in engagement with the contacts 3 and the magnet M1210 will have been operated and restored 7 times to position its wipers into engagement with the contacts 8 to thereby register the units digit 2 in the bank accessible to the wiper 1209 and to register the tens digit 7 in the bank contacts accessible to the wiper 1214. The wipers 1222 and 1223 of the hundreds digit register 1204 will remain in engagement with the first bank contact to register the hundreds digit 0 in the bank accessible to the wiper 1223.

During the time that the tape reader 1420 is sensing the associated tape 1413, the transmitter 1430 is also sensing the tape 1413 and attempts to transmit the corresponding signals over the conductor C1402TD extending to Fig. 19. However, these signals are not repeated over the signalling circuit because the relay R1770 has not as yet operated. Actually, the same number of characters will be sensed by the transmitter 1430 as are sensed by the tape reader 1420 due to the fact that the two units are operating at the same speed. Therefore, the start-of-message indicator (Item 1) of the multiple call message will pass through the transmitter 1430 during the time the 72 characters sensed by the tape reader 1420 and counted by the character counter 2030 and the character counter 1201. Although there are approximately 66 character spacings between the tape reader 1420 and the transmitter 1430, the additional 6 characters, totaling 72, counted by the two counters noted above will cover variations in the tight tape distance between the tape reader 1420 and the transmitter 1430 to insure that the start-of-message indicator is fed through the transmitter 1430 without being transmitted over the signalling circuits. It may be well to mention at this time that the reading of the various characters appearing in the original message by the tape reader 1420 after the all-pilots-complete signal is received, will perform no effective controls although the various sensing relays in the sensing unit 1501 will be controlled in the usual manner, to detect an end-of-message indicator, Item 10, when it is sensed by the tape reader 1420.

Returning again to the relay R2010 (Fig. 20) it will be recalled that this relay operates as a result of the counting of the 72 characters by the character counter 2030. At its contacts 2017, the relay R2010 locks itself to the off-normal contacts on the units and tens switches of the character counter 2030; and, at its contacts 2012 and 2015, it completes the previously described self-interrupting circuits, whereby, the magnets M2031 and M2041 advance their wipers to the illustrated home contact positions. However, at the contacts 2014, the relay R2010, completes a circuit for operating the relay R1795 (Fig. 17) over a circuit which may be traced from battery, the winding of the relay R1795, contacts 2014, 1761 and 1726, and the grounded all-pilots-complete conductor C1787APC. The relay R1795 now operates and, at its contacts 1797, locks itself to ground at contacts 1775. The relay R2010 restores to normal as soon as the wipers of the character counter 2030 restore to normal, in the manner previously described.

As a further result of the operation of relay R1795, at its contacts 1798, it interrupts a point in the previously described circuit including the conductor C1402TDC extending to Fig. 14 thereby to restore the magnet M1427 of the transmitter 1430. The restoration of the magnet M1427 at this time momentarily terminates further sensing of the tape 1413 by the transmitter 1430. At this time the start-of-message indicator (Item 1) of the original message will be one step or character space beyond the sensing pins of the transmitter 1430.

As a further result of the operation of relay R1795, at its contacts 1796, it prepares a point in the circuit for the relay R1790. This relay, however, cannot operate until the character counter 2030 restores to normal. As soon as the character counter 2030 restores to normal, it completes, at the contacts 2037 on the magnet M2031, a circuit including the off-normal contacts ON2037, conductor C1794 extending to Fig. 17, contacts 1796 and the winding of the relay R1790, to battery. This relay now operates and, at its contacts 1791, locks itself by way of the contacts 1726 to the grounded all-pilots-complete conductor C1787APC. As a further result of the operation of the relay R1790, at its contacts 1792, it interrupts a point in the previously described circuit for transmitting pulses to the magnet M2031 of the character counter 2030. Thus, further sensing of characters by the tape reader 1420 will not control the character counter 2030. Also, at its contacts 1793, the relay R1790, completes an obvious circuit for operating the relay R1770. The last-mentioned relay upon operating performs various controls, whereby, subsequent sensing of the tape 1413 by the transmitter 1430 will transmit coded signals to all of the channel relay units, such as 7900, that have been used in processing the routing indicators of the multiple call message and through such units to their respective cross-office units, such as X3400.

As soon as the relay R1770 operates, at its contacts 1775, it interrupts the locking circuit for the relay R1795 to permit that relay to restore to normal; and, at its contacts 1774, it interrupts the circuit for the lower winding of the open line relay R1760. The last-mentioned relay, however, is of the slow-to-release type and will normally remain in its operated position under control of the signalling circuit described hereinafter. As a further result of the operation of relay R1770, at its contacts 1773, it prepares a point in the circuit for the open line alarm relay R1780 which circuit only becomes effective in the event that the signalling circuit through the relay R1760 fails and thus permits the relay to restore to normal and close its contacts 1762. In the event that an open line condition is encountered and the relay R1760 restores, the relay R1780 will operate and lock itself, at its contacts 1781, to ground potential at the alarm release key K1894. Also, at its contacts 1783, the relay R1780 will illuminate the open line alarm lamp L1785 in order to signal this alarm condition to the attendant; and, at its contacts 1784, in interrupts a point in the circuit for the transmitting magnet M1427 in order to terminate further transmission.

As a further result of the operation of relay R1770, at its contacts 1778, it recompletes the operating circuit for the magnet M1427 so that it will again control the transmitter 1430 to transmit signals corresponding to the perforations in the associated tape. As a further result of the operation of relay R1770, at its contacts 1776, it applies ground potential to the conductor C1805AUG extending to Fig. 79, contacts 7941', and the winding of the transmission relay R7960, to battery. It should be noted, however, that the conductor C1805AUG is multiply connected to all of the channel relay units, such as 7900, in the relay switching center in order to operate the corresponding transmission relay in each of the channel relay units that has been used in processing one or more of the routing indicators therethrough in the manner previously described. In such units, the relay R7940 therein is operated to permit the completion, through contacts corresponding to contacts 7941', of the circuit for the transmission relay, such as R7960. The ground potential applied to the conductor C1805AUG to operate the transmission relay R7960 (Fig. 79) is also extended by way of the conductor C5281AUG to Fig. 52 where it is further extended by way of the conductor C1182AUG1 extending to Fig. 11 in order to operate the relay R1175. The relay R1175 upon operating, at its contacts 1176, now completes a circuit including the contacts 1157, conductor C1184COR extending to Fig. 79 and multiply connected to all other channel relay units, contacts 7948, in order to shunt out the resistor 7933. Therefore, the direct ground potential on the conductor C1184COR is now connected by way of the contacts 7948, conductor C7992–OGC extending to Fig. 83, contacts 8312, wiper 8326, conductor C8330–OGC extending to Fig. 8, winding of relay XR3880 to battery and in multiple therewith by way of its lower winding, its make contact, and the winding of the relay XR3890, to battery. By shunting the resistor 7993 in each of the channel relay units, such as 7900, used in processing the routing indicators in the present multiple call message, the associated cross-office units, such as X3400, are controlled by the operation of the relay XR3990 to call for the outgoing line to which the associated cross-office unit is connected through its outgoing selector, such as X4300.

Returning again to the relay R1770 (Fig. 17) it will be seen that as a further result of its operation, at its contacts 1777, it now removes ground potential from the various contacts controlled by the relays in the sensing unit 1501 so that further characters sensed by the tape reader 1420 will not be transmitted over the signalling conductors C1716LA to LE, inclusive, to the address detector 3300, to the precedence sensing unit 6700, or to the prosign sensing unit 2900. Finally, at its contacts 1772, the relay R1770 now completes the signalling circuit for the transmitter 1430, whereby, subsequent signals in accordance with the perforations on the associated tape 1413 will be transmitted through the connected channel relay units, such as 7900, to the cross-office reperforator, such as X3410, provided in each of the associated cross-office units, such as X3400.

The above described signalling circuit may be traced from ground at the contacts shown to the right of the magnet M1427 on the transmitter 1430, then by way of the normally closed contacts 1490, conductor C1402TD extending to Fig. 17, contacts 1772 and 1831, the upper winding of the open line relay R1760, contacts 1732 and 1721, conductor C1787SG2 extending to Fig. 11, contacts 1154 on the operated all-pilots-complete relay R1150, conductor C1188SIG extending to Fig. 87 and the windings of the relays R8710 to R8710–3, inclusive, to battery. Inasmuch as the tape 1413 associated with the transmitter 1430 has been fed through the transmitter an amount equal to the 72 character spacings counted by the character counter 2030, the start-of-message indicator of the present multiple call message has been fed through and is just beyond the sensing pins on the transmitter 1430. Therefore, when the above signalling circuit is completed to the relays in the channel multiple unit 8700 (Fig. 87), the transmitter 1430 will transmit code signals thereover corresponding to Items 2 to 6, inclusive, of the multiple call message. It being remembered that the same items were initially used through the medium of the tape reader 1420 to control the processing of the various routing indicators of Item 6 so that signalling circuits are not completed for the transmitter 1430 through two or more of the used channel relay units, such as 7900, to their associated cross-office units, such as X3400.

In the channel multiple unit 8700, the relays R8710 to R8710–3 repeat the code signals received over the signalling circuit to the respective groups of signalling relays, such as R8720, R8730, R8740 and the latter relays at their respective make contacts repeat the received signals to each of the channel relay units, such as 7900, provided at the relay switching center and the relay R8720–4 repeats the signals to the monitor page printer 8750. Accordingly, the relay R8720, at its contacts 8721 repeats the code signals over a circuit which includes the conductor C7993SIG1 extending to Fig. 79, contacts 7961 in the channel relay unit 7900, contacts 7945, the lower winding of the open line relay R7970, conductor C7992SIG extending to Fig. 83, contacts 8311, wiper 8325, conductor C8330SIG extending to Fig. 8, contacts X3802, and the winding of the magnet XM3411 of the cross-office reperforator X3410 in the cross-office unit X3400. Other similar relays in the channel multipling unit 8700 will also repeat the signals through each of the other used channel relay units having the transmission relay therein, such as R7960, in its operated position and to the associated cross-office unit, such as X3400.

Each of the cross-office reperforators, such as X3410, in the cross-office units, such as X3400, have been previously controlled to perforate the associated tape in accordance with the pilot heading information manufactured by the multiple call equipment and immediately following this pilot heading information, the transmitter 1430 in the multiple call storage unit 1400 now repeats signals to these cross-office units corresponding exactly to the Items 2 to 6, inclusive, of the original message. The last-mentioned signals are also transmitted to the monitor page printer 8750.

Figure 12:
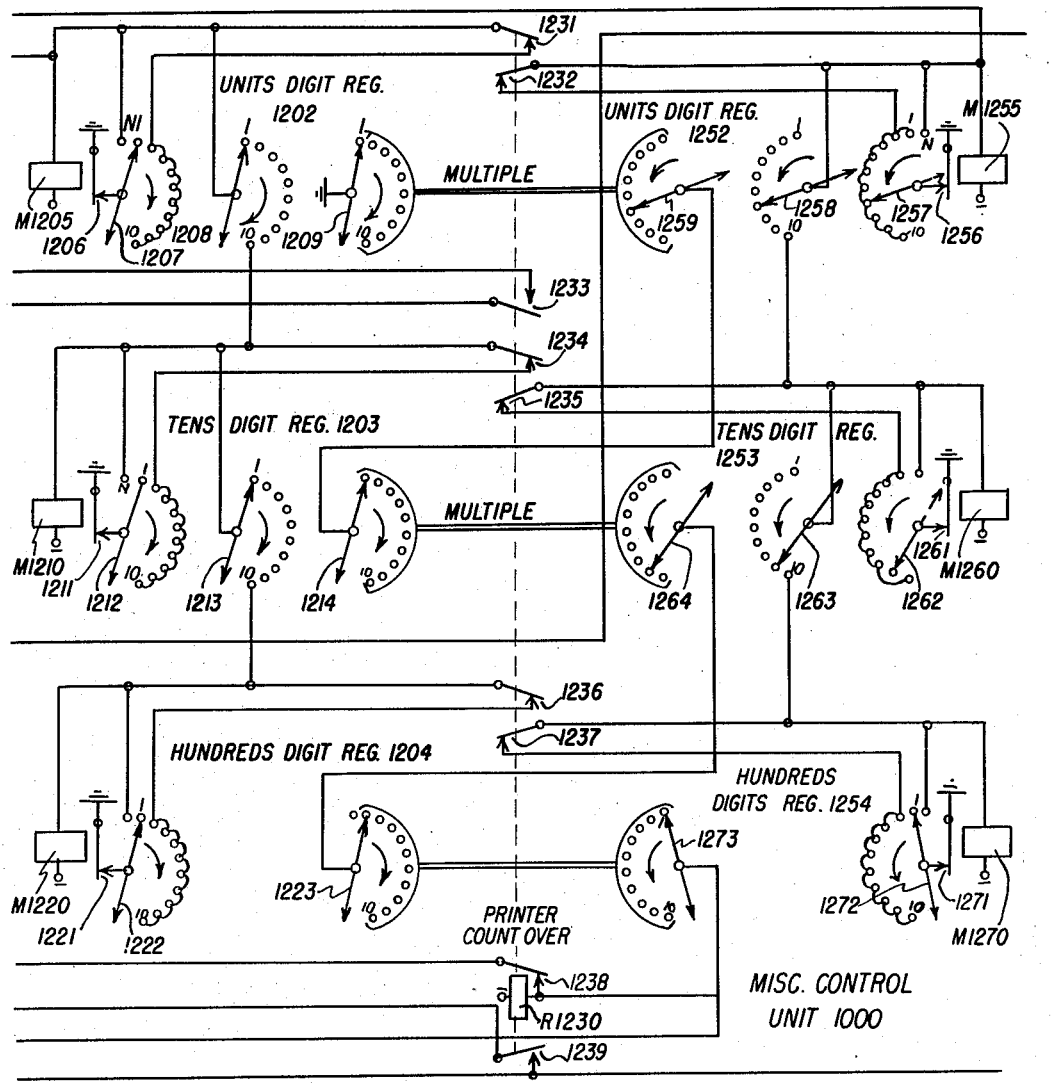

As these signals are being transmitted under control of the transmitter 1430, the tape reader 1420 is also operating to sense the tape 1430 for the purpose of detecting the end-of-message indicator which appears, as Item 10, at the end of the multiple call message being described. Since the tape reader 1420 and the transmitter 1430 are operating in synchronism at this time, the relay R1570 is controlled by the tape reader 1420 in the manner previously described to repeat, at its contacts 1577, impulses over the conductor C1787PPC extending to Fig. 11 to the character counter 1201 (Fig. 12). The character counter 1201 first responded to 72 impulses (counted by the character counter 2030) transmitted over the above described circuit while the start-of-message indicator was being fed through the transmitter 1430 and it is now counting the number of characters sensed by the tape reader 1420 as the transmitter 1430 transmits additional characters over the signalling circuit to each of the connected channel relay units, such as 7900, and to their associated cross-office units, such as X3400. Therefore, at the time the last routing indicator of Item 6 of the multiple call message is transmitted by the transmitter 1430 over the signalling circuit, the tape reader 1420 will have sensed a corresponding number of characters on the associated tape and will have transmitted pulses corresponding in number to the character counter 1201. The wipers of the character counter 1201 should now be in the same contact positions as the wipers of the character counter 1251.

It will be recalled that in the character counter 1251 the wipers of the units digit register 1252 are normally in engagement with the contacts 7 to preregister the units digit 6; that the wipers of the tens digit register 1253 are normally in engagement with the contacts 9 to preregister the tens digit 8; and that the wipers of the hundreds digit register 1254 are normally in engagement with the contacts 1 to preregister the hundreds digit 0. Therefore, the character counter 1251 normally preregisters the number 086. Thereafter, this counter is controlled to count all of the characters of Items 2 to 6, inclusive, of the multiple call message sensed by the tape reader 1420 prior to the time the all-pilots-complete relay R1150 operates and transfers the impulsing circuit to the message character counter 1201 as previously explained under the heading "Operation of the character counter 1251."

When the wipers of the character counters 1201 and 1251 match their respective contact positions, a series circuit will be completed for operating the relay R1230 and thereby terminate further transmission of signals to the monitor page printer 8750. In other words, when the transmitter is in condition to start transmission of the body (Item 7) of the multiple call message to the connected channel relay units, such as 7900, and the associated cross-office units, such as X3400, the monitor page printer 8750 is prevented from operating to print this information.

At the present time the units digit register 1202 is connected to the same contact in its bank as the wiper 1259 of the units digit register 1252. Also, the wiper 1214 of the tens digit register 1203 is now connected to the same bank contact as the wiper 1264 of the tens digit register 1253. Finally, the wiper 1223 of the hundreds digit register 1204 is now connected to the same contact as the wiper 1273 of the hundreds digit register 1254. Each of the corresponding contacts accessible to the above noted wipers are multiply connected between the respective registers so that a circuit will be completed which may be traced from ground through wipers 1209, 1259, 1214, 1264, 1223 and 1273 and the winding of relay R1230, to battery. This relay now operates and, at its contacts 1238, locks itself to ground at contacts 1159′ on the operated all-pilots-complete relay R1150. Also, at its contacts 1231 and 1232, the relay R1290 completes an obvious self-interrupting circuit for the magnets M1205 and M1252 in order now to advance these wipers of the units digit registers 1202 and 1252 to the normal contact positions illustrated in the drawings. At the contacts 1234 and 1235, the relay R1230 also completes an obvious self-interrupting circuit for the magnets M1210 and M1260, whereby, the wipers of the tens digit registers 1203 and 1253 are advanced to the contact positions illustrated in the drawing. Finally, at the contacts 1236 and 1237, the relay R1230 completes the self-interrupting circuits for the magnets M1220 and M1270 whereby the wipers of the hundreds digit registers 1204 and 1254 are advanced to the contact positions illustrated in the drawings. At the contacts 1233, the relay R1230 interrupts a point in the previously described impulsing circuit including the conductor C1787PPC in order now to prevent the magnets of the character counters 1201 and 1251 from operating. Finally, at its contacts 1239, the relay R1230 interrupts the circuit for the monitor page printer relay R1170 which now restores to normal. At its contacts 1171, the relay R1170 applies ground potential to the conductor C1188SIG (MPP) extending to Fig. 87 in order now to shunt the contacts controlled by the relay R8720-4 so that this relay can no longer repeat code signals to the monitor page printer 8750. In other words, there is no necessity of controlling the monitor page printer 8750 to print any part of the multiple call message beyond Item 6 thereof.

Referring again to Fig. 14 it will be understood that the tape reader 1420 and the transmitter 1430 will continue to operate to sense the tape being fed therethrough, but the only function that the tape reader 1420 now performs is to control the relays in the sensing unit 1501 to ultimately detect the end-of-message indicator. The transmitter 1430, however, will continue to transmit the signals corresponding to the remaining Items 7 to 10, inclusive, of the multiple call message.

*Detecting the end-of-message indicator in the multiple call storage unit 1400*

The tape reader 1420 and the transmitter 1430 continue to operate in the manner described above, the former to sense the tape 1413 to find the end-of-message indicator and the latter to transmit signals in accordance with the perforations on the tape stored in the storage bin 1435. The end-of-message indicator perforated on the tape 1413 at the end of the multiple call message (Item 10) comprises a "figures shift" character function followed by seven commas and then a "letters shift" character function.

As soon as the tape reader 1420 senses the "figures shift" character function, it completes the circuit, whereby, the relays R1510, R1520, R1540, R1550 and R1570 in the sensing unit 1501 operate. At the contacts 1518, 1528, 1548, 1558 and 1578, these relays complete the circuit for operating the relay R1560, all in the manner previously described. At the contacts 1576, a circuit is now completed by the relay R1570 which includes contacts 1514, 1524, 1534, 1544 and 1554, the "figures shift" conductor, and the lower winding of the figures shift relay R1580, to battery. The relay R1580 now operates and prepares, at its contacts 1586 and 1588, circuits whereby the register relays R1590-1 to R1590-14, inclusive, will be controlled by subsequent sensing of seven commas by the tape reader 1420. At the end of the sensing of the "figures shift" character function, the relay R1570 will restore to normal to complete, at its contacts 1575, a locking circuit for the upper winding of the figures shift relay R1580. The remaining operated relays in the sensing unit 1501 now restore to normal.

In response to the sensing of the first commas of the end-of-message indicator, the sensing relays R1530, R1540, R1560 and R1570 are operated, in the manner previously explained. At the contacts 1576, the relay R1570 completes a circuit including the contacts 1515, 1525, 1535, 1545 and 1555, the "comma" conductor, contacts 1586 and 1594 and the winding of relay R1590-1, to battery. At this time the locking circuit for the figures shift relay R1580 includes its upper winding, contacts 1585, 1553, 1543, 1533, 1523, 1513 and 1538, in multiple with contacts 1548. At the end of the sensing of the first comma, the relay R1570 first restores to normal to again lock the figures shift relay R1580 in its operated position from ground at contacts 1575. Also, a locking circuit is now completed for the relay R1590-1 which may be traced from battery, winding of the relay R1590-1, contacts 1591, winding of relay R1590-2 (which operates), contacts 1601, 1611 and 1640 (on the operated relay R1590-14), the "Z hold" conductor, contacts 1582 and 1575 to ground.

The next comma sensed by the tape reader 1420 will again control the relays in the sensing units 1501 so that another ground pulse is transmitted over the "comma" conductor by way of the contacts 1588, 1595 and 1604 in order to operate the third counting relay R1590-3. At the end of the sensing of the second comma, the relay R1590-3 locks itself over a circuit including its winding, contacts 1596, winding of relay R1590-4, contacts 1607, 1618 and 1641, the "X hold" conductor, contacts 1584 and 1575, to ground. The relay R1590-4 operates over this circuit and, at its contacts 1602, transfers the locking circuit for the relays R1590-1 and R1590-2 from the "Z hold" conductor to a circuit including the contacts 1607, 1618 and 1641 to the "X hold" conductor.

The third comma sensed by the tape reader 1420 will now operate the fifth counting relay R1590-5 and the latter relay will lock itself in its operated position at the end of the sensing of the third comma in series with the relay R1590-6 which also operates.

The fourth comma sensed by the tape reader 1420 will operate the relay R1590-7 and at the end of the sensing of the fourth comma, the relay R1590-7 will lock itself in its operated position in series with the relay R1590-8.

The fifth comma sensed by the tape reader 1420 will now operate the relay R1590-9 and at the end of the sensing of the fifth comma, the relay R1590-9 will lock itself in series with the relay R1590-10 which also operates.

The sixth comma sensed by the tape reader will now operate the relay R1590-11 and at the end of the sensing of the sixth comma, the relay R1590-11 locks itself in series with the relay R1590-12 which also operates.

The seventh comma sensed by the tape reader 1420 now operates the end-of-message relay R1860 instead of the counting relays R1590-13 and R1590-14 which were controlled previously in response to the sensing of the last character of a start-of-message indicator. The circuit for controlling the end-of-message relay R1860 includes the ground potential applied to the "comma" conductor (by the sensing of the seventh comma) contacts 1588, 1595, 1603, 1608′, 1616, 1623′, 1632, 1582′ and the winding of relay R1860, to battery. The relay R1860 now operates and, at its contacts 1868, locks itself to ground at contacts 1871 on the operated relay R1870.

A "letters shift" character function is now sensed by the tape reader 1420 and although the relays in the sensing unit 1501 respond to this character in the manner previously described, they merely interrupt the locking circuit for the figures shift relay R1580 which restores to normal, and they interrupt the locking circuits for the operated counting relays R1590–1 to R1590–12, inclusive, so that all of these relays now restore to normal.

Before leaving the discussion of the operation of the counting relays R1590–1 to R1590–12, inclusive, in response to the seven commas of an end-of-message indicator and the operation of the end-of-message relay R1860, it should be noted that if any character other than a "comma" is sensed during the sequence of sensing the seven commas of the end-of-message indicator, all of the operated ones of the counting relays, as well as the figures shift relay R1580, will be restored to normal. These counting relays will only be reoperated thereafter in response to the receipt of the proper sequence of a "figures shift" character followed by seven commas. Furthermore, the release of the figures shift relay R1580 and any operated ones of the counting relays R1590–1, etc., is accomplished as a result of the failure to retain the locking circuit for the upper winding of the figures shift relay R1580. The above noted locking circuit is retained during the time the relays R1560 and R1570 are restored between the sensing of the successive commas and it is also retained during the time that the relays in the sensing unit 1501 are operated to sense each of the commas. If any other character is sensed after the figures shift relay R1580 is operated, the relay will automatically restore to normal and thereby interrupt the previously traced locking circuits through the contacts thereof for the operated ones of the counting relays R1590–1, etc. Whenever the above circuits are interrupted incident to the failure to sense seven successive commas after a "figures shift" character, then all of the operated counting relays will automatically restore to normal and they cannot be reoperated unless the complete end-of-message indicators ("figures shift" and seven commas) are received in succession.

Referring now to the end-of-message relay R1860 (Fig. 18) it will be seen that, at its contacts 1866, it interrupts a point in the locking circuit for the counting relays R1590–13 and R1590–14 to permit these relays now to restore to normal. As a further result of the operation of relay R1860, at its contacts 1862, it prepares a point in the circuit traced hereinafter for again controlling the character counter 2030 to count characters or "blanks" subsequently sensed by the tape reader 1420. Also, at its contacts 1863, the relay R1860 prepares a point in the circuit for operating the tape feed out relay R1930 in the event that a tight tape condition is encountered between the reperforator 1410 and the tape reader 1420. Also, at its contacts 1864, the relay R1860 interrupts a point in the multiple circuit including the contacts 2018, and the conductor C1402TRC so that the magnet M1425 of the tape reader 1420 will be interrupted in the event that the relay R2010 is subsequently operated. At its contacts 1865, the relay R1860 prepares a point in the circuit for subsequently operating the end relay R1880. At its contacts 1867, the relay R1860 prepares a point in the circuit for locking the relay R2010 in its operated position in the event the latter relay is subsequently operated.

In the above description it was pointed out that the end-of-message relay R1860, at its contacts 1862, prepares a point in the circuit for controlling the magnet M2031 of the character counter 2030. At the present time, the end-of-message indicator has been fed through the tape reader 1420 and, consequently, steps must now be taken to make sure that there is sufficient tape between the tape reader 1420 and the transmitter 1430 to permit the end-of-message indicator to be fed through the transmitter 1430. Therefore, each of the characters, including "blanks," sensed by the tape reader after the registration of an end-of-message indicator controls the sensing unit 1501 in the usual manner. The relay R1570 operates and restores in response to the sensing of each character and, at its contacts 1577, it now transmits pulses over a circuit including the contacts 1862 to the winding of the magnet M2031. This magnet controls its wipers to count the characters sensed by the sensing unit 1501 and the magnet M2041 is controlled each time the magnet M2031 counts ten characters. Thus, the character counter 2030 operates, in the manner previously explained, to count 72 characters or "blanks" and thus causes the operation of relay R2010. The relay R2010, however, now locks itself in its operated position by way of its contacts 2017 to ground at the contacts 1867 on the operated end-of-message relay R1860. This locking circuit, of course, is in addition to the locking circuit including the off-normal contacts ON2035 and ON2045. As a further result of the operation of relay R2010, it completes, at its contacts 2012 and 2015, the previously described self-interrupting circuit for the magnets M2031 and M2041, whereby, these magnets again advance their wipers to the illustrated home contact positions. As a further result of the operation of relay R2010, at its contacts 2016, it prepares a further point in the circuit for the end relay R1880 so that the last-mentioned relay may operate when a tight tape condition exists between the tape reader 1420 and the transmitter 1430. As a further result of the operation of the relay R2010, at its contacts 2018, it now interrupts a point in the circuit including the conductor C1402TRC extending to Fig. 14, thereby to restore the magnet M1425 and stop the reading of the tape 1413 by the tape reader 1420.

Even though the tape reader 1420 has now been stopped as noted above, the transmitter 1430 will continue to operate and transmit signals corresponding to the characters appearing upon the associated tape 1413 to the different channel relay units, such as 7900, and to their associated cross-office units, such as X3400. After the amount of tape 1413 equal to the 72 characters counted by the character counter 2030, introduced between the tape reader 1420 and the transmitter 1430, has been fed through the transmitter 1430, a tight tape condition in the tape 1413 will ultimately occur between these two units. When this occurs, the end-of-message indicator appearing on the associated tape will have been fed through the transmitter 1430 and, consequently, transmitted over the previously described signalling circuits. As soon as the tight tape condition is encountered between the tape reader 1420 and the transmitter 1430, the tight tape contacts 1433 will be closed to extend ground potential over the conductor C1402TDT extending to Fig. 20, contacts 2016 and 1865 and the winding of the end relay R1880, to battery. The relay R1880 operates over this circuit and, at its contacts 1883, locks itself to the grounded conductor C1402TDT over a circuit which is now independent of the contacts 1865 on the operated end-of-message relay R1860. As a further result of the operation of the end relay R1880, at its contacts 1881, it interrupts the locking circuit for the upper winding of the start relay R1910; at its contacts 1882, it interrupts a further point in the circuit including the conductor C1402TRC for the tape reader clutch magnet M1425; at its contacts 1884, it interrupts a point in the locking circuit for the call common equipment relay R1870 which now restores to normal; and at its contacts 1886 it prepares a point in the circuit for controlling the relay R2020 provided the tape feed out relay R1930 is operated.

As soon as the call common equipment relay R1870 restores to normal, at its contacts 1871, it interrupts the locking circuit for the end-of-message relay R1860 which now restores to normal; at its contacts 1873, it interrupts the circuit for the control relays R1710 and R1720 which also restore to normal; and, at its contacts 1874, it interrupts the circuit for the process lamp L1896 and it removes ground potential from the wiper 2007.

As soon as the end relay R1860 restores to normal, it interrupts, at its contacts 1863, a point in the circuit for controlling the tape feed out relay R1930 which circuit is only effective to control the reperforator 1410 to feed out blank tape in the event that there is insufficient tape between the reperforator 1410 and the tape reader 1420 to permit 72 character spaces to be counted by the character counter 2030, as will be subsequently explained. Also, at the contacts 1867, the relay R1860 now interrupts the locking circuit for the relay R2010 to permit the latter relay to restore to normal. As a result of the restoration of the relay R2010, at its contacts 2016, it now interrupts a point in the locking circuit for the end relay R1880 in order to restore the last-mentioned relay to normal. The restoration of the control relays R1710 and R1720, as noted above, will disconnect the multiple call storage unit 1400 from the multiple call common equipment.

If at the present time the tape between the reperforator 1410 and the tape reader 1420 is in a slack condition, the ground potential at the contacts 1422 on the tape switch 1427 will apply ground potential to the conductor C1402TRS extending to Fig. 19 and then by way of the contacts 1931 and 1913 to the lower winding of the start relay R1910, thus maintaining the last-mentioned relay in its operated position even though its locking circuit for its upper winding has been interrupted. Consequently, a circuit will be completed for the tape reader clutch magnet M1425 incident to the restoration of the end relay R1880 and the relay R2010 so that the tape reader 1420 may start to process a new multiple call message. The controls exercised incident to the restoration of the control relays R1710 and R1720 will be described hereinafter, but a description will first be given of the operations involving the tape feed out relay R1930.

In the foregoing description, it was assumed that there was sufficient blank tape between the reperforator 1410 and the tape reader 1420 to permit the end-of-message indicator (Item 10 of the multiple call message) to be read by the tape reader 1420 and then to be fed through the transmitter 1430 without encountering a tight tape condition between the reperforator 1410 and the tape reader 1420. If the above message, wherein the end-of-message indicator has been sensed by the tape reader 1420, is the last message that has been perforated on the associated tape, a tight tape condition will be encountered between the reperforator 1410 and the tape reader 1420 shortly after the end-of-message indicator has passed through the tape reader 1420. At this stage in the operation of the multiple call storage unit 1400, the end-of-message relay R1860 will be operated; all of the counting relays R1590–1 to R1590–14, inclusive, will be restored; and, the remaining circuits will be in condition to operate the end relay R1880 after the character counter 2030 has counted 72 characters.

If a tight tape condition is encountered between the reperforator 1410 and the tape reader 1420 prior to the restoration of the end-of-message relay R1860, the contacts 1421 on the tape switch 1427 will be closed to complete a circuit including the conductor C1402TRT extending to Fig. 19, contacts 1952 and 1863, for operating the tape feed out relay R1930. Substantially the same circuit may be completed through the contacts 1645 if the tight tape condition is encountered after the registration of a start-of-message indicator by the relay R1590–14. The relay R1930 immediately locks itself over a circuit including its upper winding, contacts 1932 and ground at the off-normal contacts ON2009A on the precedence register 2001. As a further result of the operation of the relay R1930, at its contacts 1934, it completes an operating circuit for the reperforator relay R1930; at its contacts 1937, it applies ground potential to the conductor C1985BTL extending to Fig. 7A; at its contacts 1933, it interrupts the circuit including the conductor C1985-40 extending to Fig. 7A; and, at its contacts 1935, it prepares a point in the circuit for controlling the magnet M2002 of the precedence register 2001 in order to advance the wipers thereof to their normal illustrated positions. The last-mentioned circuit, however, cannot be completed until the call common equipment relay R1870 restores. Actually, the opening of the circuits including the conductor C1980–40 and the application of ground potential to the conductor C1985BTL prevents further seizure of the multiple call storage unit 1400 during the time that blank tape is being produced by the reperforator 1410. As a further result of the operation of relay R1930, at its contacts 1937, it completes the operating circuit for the seizure relay R1950 and the latter relay, at its contacts 1952, interrupts the initial operating circuit for the tape feed out relay R1930. However, the last-mentioned relay is now locked in its operated position under control of the off-normal contacts ON2009A.

As soon as the reperforator relay R1930 operates, it removes, at its contacts 1931, the resistance ground potential from the conductor C1402RPF extending to Fig. 14 and thus controls the perforator magnet M1411 to feed out "blank" tape. The "blank" tape is fed into the associated tape storage bin 1419 and produces a slack tape condition that will again permit the slack tape contacts 1422 on the tape switch 1427 to close and complete the previously described circuit, whereby, the magnet M1425 in the tape reader 1420 is reoperated. The reperforator 1410 continues to perforate "blank" tape and the tape reader 1420 will continue to pass the "blank" tape through its sensing contacts in the usual manner. Each time an additional "blank" character is sensed by the tape reader 1420, the relay R1570 in the sensing unit 1501 will transmit, at its contacts 1577, a pulse to the magnet M2031 of the character counter 2030. Therefore, the "blank" tape will be perforated by the reperforator 1410 as the tape reader 1420 reads the characters and when a sufficient number of characters (72) have been counted by the character counter 2030, a circuit will again be completed for operating the relay R2010. The 72 characters counted by the character counter 2030 will be sufficient to permit the end-of-mesage indicator previously sensed by the tape reader 1420 to be fed through the associated transmitter 1430.

When the relay R2010 operates, it locks itself to ground at contacts 1867; it restores the wipers of the character counter switch 2030 to their normal illustrated contact positions; at the contacts 2018, it interrupts the previously described circuit for restoring the clutch magnet M1425 of the tape reader 1420 so that the tape reader stops its reading operation. Shortly thereafter, the tight tape condition will be encountered between the tape reader 1420 and the transmitter 1430, whereby, the contacts 1433 on the tape switch 1422 will apply ground potential over the conductor C1402TDT extending to Fig. 20 and then by way of the contacts 2016 and 1865 in order to operate the end relay R1880. The end relay R1880 locks itself in its operated position, in the manner previously described; it interrupts, at its contacts 1881, the locking circuit for the start relay R1910 which also restores to normal due to the fact that the circuit for its lower winding has been interrupted at the contacts 1931 on the operated tape feed out relay R1930; at its contacts 1884, the relay R1880 interrupts the circuit for the call common equipment relay R1870 which now restores to normal. As soon as the relay R1870 restores, it completes at its contacts 1872, a circuit including the contacts 1935, 2008 and ON2009 for operating the magnet M2002. The magnet M2002 operates and restores under control of its self-interrupting contacts 2008 until the wipers 2005 to 2007 are advanced to their illustrated home contact positions. When this occurs, the off-normal contacts ON2009 are opened in order to terminate further stepping of the wipers by the magnet M2002, and the off-normal contacts ON2009A are opened in order to now restore the tape feed out relay R1930. The tape feed out relay R1930 upon restoring, at its contacts 1934, interrupts the circuit for the reperforator relay R1980. The latter relay restores to normal and, at its contacts 1981, reapplies the resistance ground potential to the conductor C1402RPF extending to Fig. 14 in order to terminate the "blank" tape feed-out operation of the reperforator 1410. As a further result of the restoration of the relay R1930, at its contacts 1937, it restores the relay R1950 and it removes the busy marking ground potential from the conductor C1985BTL extending to Fig. 7A thereby to mark the multiple call storage unit 1400 available for storing additional multiple call messages and in order to restore the relay R1950.

Incident to the restoration of the end-of-message relay R1860, at its contacts 1867, it interrupts the locking circuit for the relay R2010, whereupon the latter relay restores to normal to interrupt the circuit for the end relay R1880 which also restores to normal. Finally, at the contacts 1872, the call common equipment R1870 interrupts the circuit for the control relays R1710 and R1720 which restore to normal in order to disconnect the multiple call storage unit 1400 from the common multiple call equipment.

From the above description, it will be understood that tape feedout relay R1930 will be operated when the tight tape condition is encountered between the reperforator 1410 and the tape reader 1420. The amount of the "blank" tape fed out by the reperforator 1410 will be governed by the number of characters read by the tape reader 1420 and counted by the character counter 2030 after an end-of-message indicator has caused the operation of the end-of-message relay R1870. It will also be understood from the foregoing description that the entire multiple call message that has been received and reperforated by the reperforator 1410 (except the start-of-message indicator) has now been retransmitted by the transmitter 1430 to the channel multipling unit 8700, where the message is repeated over previously described signalling circuits to each of the used channel relay units, such as 7900, and to each of the associated cross-office units, such as X3400. Consequently, the entire multiple call message that has been received by the reperforator 1410 is now perforated on the tape individual to each of the cross-office reperforators, such as X3410, utilized in processing the multiple call message. It should be noted, however, that the above mentioned message (except for its start-of-message indicator) has been perforated on the tape associated with each of the cross-office reperforators noted above, following the pilot heading information that has been manufactured by the multiple call equipment for transmission over each used outgoing line, instructing subsequent switching centers how the multiple call message must be processed thereat to route it to the ultimate destination.

*Release of the multiple call equipment*

In the foregoing description it was pointed out that in response to the sensing of an end-of-message indicator by the tape reader 1420, a predetermined number of characters or "blanks" are then counted by the character counter 2030 to make certain that the tape 1413 is advanced a sufficient distance to pass the end-of-message indicator thereon through the transmitter 1430. As a result thereof the end relay R1880 operated to restore the call common equipment relay R1870, the end-of-message relay R1860, the control relays R1710 and R1720, the relay R2010 and then the end relay R1880, in the order named. Various other relays in the multiple call storage unit 1400 will also restore to place the unit in condition to respond to subsequent multiple call messages and the common multiple call equipment utilized in processing the previously described message will also restore to normal.

As soon as the call common equipment relay R1870 restores it interrupts, at its contacts 1873, the circuit including the control relays R1710 and R1720 (Fig. 17) and the wiper 2006 on the precedence register 2001. If the wiper 2006 is in engagement with the contacts terminating the conductor C1986NR extending to Fig. 9, ground potential is removed therefrom to release the relays R930 and R910. It should be understood, however, that if the wiper 2006 of the precedence register 2001 is in engagement with any of the contacts terminating the conductors extending to Fig. 9, the relays R930 and R910 will also restore to normal. Also, at the contacts 1874, the relay R1870 removes ground potential from the wiper 2007 in order to restore the operated one of the relays R940NR to R940F, inclusive, corresponding to the precedence of the multiple call message. At the present time the relay R940NR restores to normal.

As soon as the relays R910, R930 and R940NR in Fig. 9 restore to normal, a circuit including the contacts 944 is interrupted in order to open the initial operating circuit for the relay R1020NM; and at the contacts 945, the series circuit including the start relay R920, the interrupter 1 relay R1050 and the interrupter 2 relay R1010 is interrupted in order to restore the three relays noted. The restoration of relay R1050 interrupts, at its contacts 1051, the locking circuit for the relay R1020NM to permit the last-mentioned relay to restore to normal. It should be understood that any one of the relays R1020P to R1020FL will be controlled in the same manner as the relay R1020NM depending upon the particular one of the relays R940NR to R940F that is initially operated upon seizure of the precedence control unit 900. This unit is now fully restored to normal and may be utilized with another multiple call storage unit, such is 1400.

Referring again to the multiple call storage unit 1400, it will be seen that when the control relay R1710 restores to normal it interconnects, at its contacts 1713, the conductors C1402TDC and C1402TDS extending to Fig. 14 so that the transmitter 1430 may reoperate in response to a slack tape condition between the tape reader 1420 and the transmitter 1430. Also, at its contacts 1714LA to LE, inclusive, the relay R1710 disconnects the code signalling conductors C1716LA to LE, inclusive, from the contacts on the relays in the sensing unit 1501. Therefore, the sensing unit 1501 can now be reused to sense the start-of-message indicator of a new message without interfering with the release of the common equipment utilized in processing the message just transmitted.

In response to the restoration of the control relay R1720, at its contacts 1726, it disconnects the grounded all-pilots-complete conductor C1787APC from the locking circuit for the relay R1790, whereupon, the latter relay restores and, at its contacts 1793, interrupts the circuit for the relay R1770 which also restores to normal. As soon as the relay R1770 restores to normal, at its contacts 1776, it removes ground potential from the conductor C1805AUG extending to Fig. 79 in order now to restore the transmission relay R7960 in the channel relay unit 7900 and also the corresponding relays in each of the other channel relay units utilized in processing the multiple call message. The removal of ground potential from the conductor C1805AUG also removes ground potential from the conductor C5282AUG extending to Fig. 52 and then from the conductor C1182AUG extending to Fig. 11 in order to restore the relay R1175. The last-mentioned relay, at its contacts 1176, removes ground potential from the conductor C1184COR extending to Fig. 79 and multiply connected to all of the channel relay units, such as 7900. In Fig. 79, it will be seen that the removal of ground potential from the conductor C1184COR removes the ground potential from the conductor C7992–OGC extending to Fig. 83. It should be understood, however, that the director release relay R7940 will restore to normal shortly and, at its contacts 7949, it will also remove the resistance ground potential from the conductor C7992–OGC extending to Fig. 83. In Fig. 83, the conductor C7992–OGC is further extended by way of the contacts 8312, wiper 8326, conductor C8330–OGC extending to Fig. 8 in order now to restore the relays XR3880 and XR3890 in the cross-office unit X3400. The relay XR3880 in turn, at its contacts X3881 interrupts the circuit for the relay XR3800 and the latter relay, at its contacts X3802, disconnects the cross-office reperforator X3410 from the signalling conductor C8330SIG extending back to the channel relay unit 7900. The same releasing operations are also performed in the other channel relay units, such as 7900, that have been used in processing the multiple call message and the same controls are exercised in the cross-office units, such as X3400, connected to such channel relay units.

Figure 10:
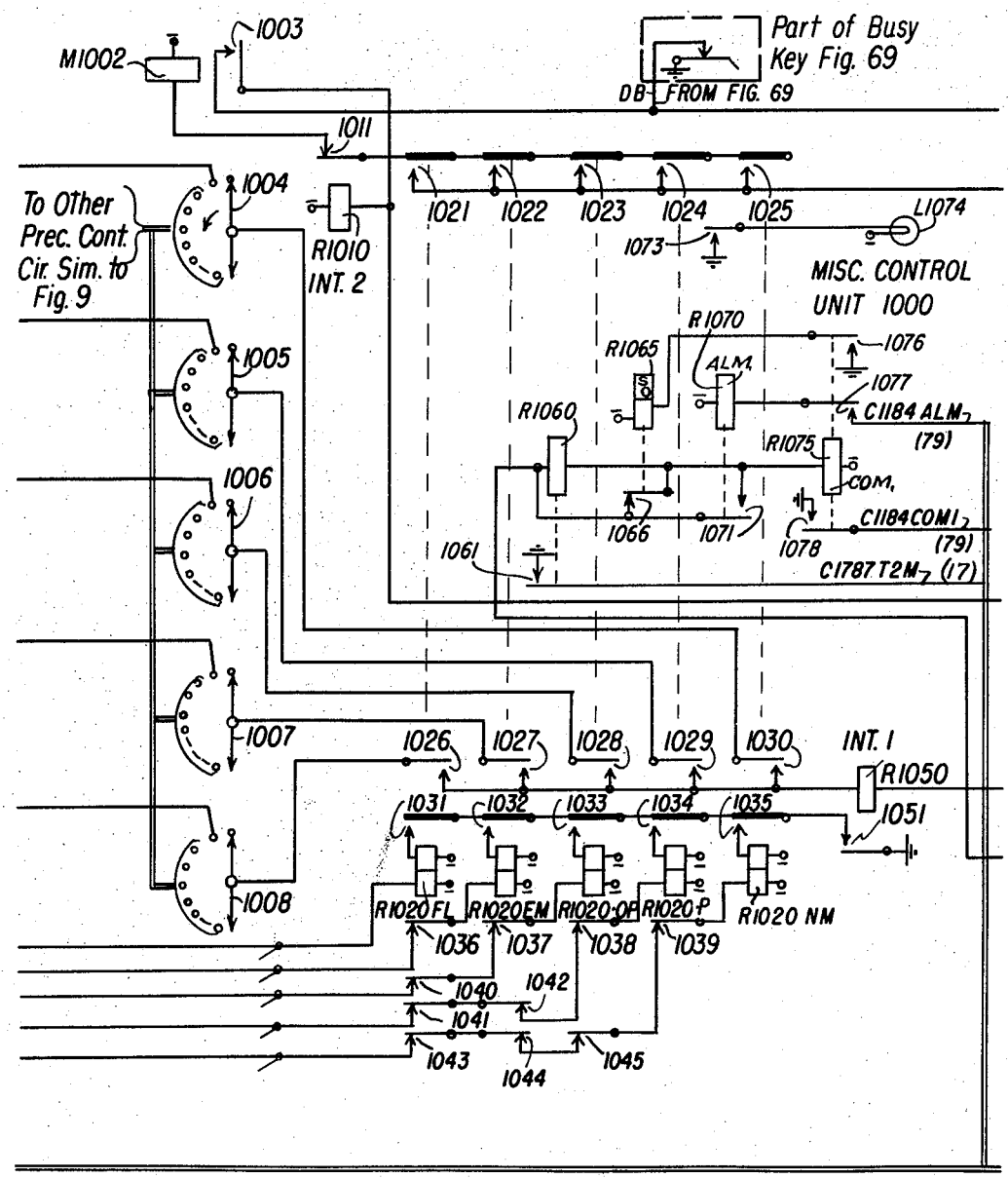

Referring again to Fig. 17, it will also be noted that, at the contacts 1721, the relay R1720 interrupts a further point in the signalling circuit including the conductor C1787SG2; at its contacts 1723, it disconnects the conductor C1787PPC from the character counting contacts 1577 in the sensing unit 1501; at its contacts 1724 and 1725, it interrupts points in the previously traced circuits including the conductor C1402TRT and TRC extending to the tape reader 1420; and, at its contacts 1721′, it interrupts a point in the previously described circuit including the conductor C1787T2S extending to Fig. 11 thereby to restore the relays R1060, R1075 and R1065 in the order named. In Fig. 10, the restoration of the relay R1075 interrupts, at its contacts 1078, the circuit including the conductor C1184COM extending to Fig. 79, in order to restore the relay R7920 in the channel relay unit 7900 and in order to restore the corresponding relays in all of the other channel relay units utilized in connection with the processing of the present multiple call message.

Referring again to Fig. 17, it will be seen that as a further result of the restoration of the relay R1720, at its contacts 1722, it removes ground potential from the conductor C1787ST extending to Fig. 11, thereby to restore, in the order named, the relays R1110, R1120 and R1130. The restoration of the relay R1130, at its contacts 1133, locks the printer-count-over relay R1230 in its operated position. The relay R1110, at its contacts 1116, interrupts the circuit for the delay relay R1370 which also restores to normal. As a further result of the restoration of the relay R1110, at its contacts 1115, it removes ground potential from the conductor C1181GDS1 extending to Fig. 33 thereby to restore the connect relay R3310.

In Fig. 33, it will be seen that the restoration of the relay R3310 disconnects the code signalling conductors C1716LA to LE, inclusive, from the relays in the address sensing unit 3401, the relays in the precedence sensing group 6701, and the relays in the prosign sensing group 2901. As a further result of the restoration of the connect relay R3310, at its contacts 3316, it interrupts the circuit for the release relay R3690 thereby to restore the last-mentioned relay. Also, at the contacts 3316, ground potential is removed from the conductor C1391RLS–HD extending to Fig. 13 thereby to release the seal-up relay R1310 in the miscellaneous control unit 1000.

Referring now to Fig. 36 it should be understood that the relay R3690 is restored to normal after each routing indicator (address) is sensed by the address detector 3300 and stored in the processing routing register 3700. More specifically, after each routing indicator stored in the processing routing register 3700 has been processed and temporarily stored on tape in the routing indicator tape storage unt 5502, the relay R3680 is momentarily operated to interrupt, at its contacts 3681, the circuit for the release relay R3690. The release relay R3690 in turn, at its various make contacts, interrupts the locking circuits for the various operated relays in the processing routing register 3700 to restore that register to its normal position so that it may be reoperated to store another routing indicator. Consequently, when the connect relay R3310 is restored to normal as described above, it interrupts the circuit for the release relay R3690 and the latter relay, at this stage in the operation of the muliple call equipment, merely removes the locking ground potentials from the circuits extending to the processing routing register 3700. Any operated relays in that unit, of course, will now restore to normal, but they are not normally operated at the time the address detector 3300 is released by the restoration of the relay R3310.

At the time the connect relay R3310 restored to normal and removed ground potential from the conductor C1391RLS–HD extending to Fig. 18, it restored the seal-up relay R1310 in the miscellaneous control unit 1000. At its contacts 1314, the relay R1310 removes ground potential from the conductor C1386SU–1 extending to Fig. 77 in order to restore the relay R7730. The latter relay, at its contacts 7731 removes ground potential from the conductor C7731SU–1 extending to Fig. 79 thereby to restore the start relay R7910 in the channel relay unit 7900. Also, the ground potential is removed from corresponding conductors extending to the operated start relays, such as R7910, in each of the channel relay units that have been utilized in processing the multiple call. In the channel relay unit 7900, the restoration of the start relay R7910, at its contacts 7917, interrupts the circuit for the relay R8280 which also restores to normal to complete, at its contacts 8281, 8282 and 8283, the circuits including respectively the off-normal contacts ON8216, ON8226, and ON8236, and the contacts 8212, 8222 and 8232 for controlling the respective magnets M8211, M8221 and M8231. These magnets are self-interruptedly operated to advance their associated wipers into engagement with the illustrated contact positions. When this occurs, the off-normal contacts noted above are opened in order to terminate the self-interrupting circuits for the various magnets. Consequently, the U, B and J registers 8272 to 8274, inclusive, in the channel relay unit 7900 are restored to normal and may again be utilized in processing another multiple call message. The same operations are performed in the corresponding registers in the other channel relay units, such as 7900, utilized in processing the multiple call message.

As a further result of the restoration of the start relay R7910, at its contacts 7915 and 7916, it now completes the self-interrupting circuits for the magnets M8251 and M8261 of the units and tens register 8276 and 8277, whereby, the magnets are operated and restored until the wipers are advanced into engagement with the illustrated home contact positions. In this position, the self-interrupting circuit is terminated and the respective registers are again conditioned to reoperate in response to the processing of another multiple call message. The corresponding registers in the other channel relay units, such as 7900, are also restored to normal as a result of the restoration of the start relay, such as R7910, in such units.

As a further result of the restoration of start relay R7910, at its contacts 7914, it interrupts the locking circuit for the ZWL relay R7950, whereupon, the relay restores to normal if it is in its operated position. Also, the ground potential at the contacts 7914 is removed from the conductor C1389CO extending to Fig. 13 in order to restore the relay R1360 in the miscellaneous control unit 1000. Finally, at its contacts 7911, the start relay R7910 now applies ground potential at the contacts 7943 to the conductor C7992RST extending to Fig. 83 and then by way of the contacts 8318, ON8324 and 8322 in order to operate the magnet M8321. Thus, the self-interrupting circuit is completed for the magnet M8321 to advance its wipers 8325 to 8329, inclusive, step-by-step until they reach the illustrated home contact positions. When this position is reached, the off-normal contacts ON8324 are opened in order to terminate the stepping circuit for the magnet M8321. Also, the off-normal contacts ON8323 are opened, when the wipers engage the illustrated home contact positions, to remove the locking ground potential from the circuit for relay R8310 which also restores to normal to disconnect the cross-office selector switch 8300 from the cross-office unit X3400. As a further result of the opening of the off-normal contacts ON8323, ground potential is removed from the conductor C7992SU extending to Fig. 79 thereby to restore the director release relay R7940 in the channel relay unit 7900. The restoration of the relay R7940 renders the channel relay unit 7900 again selectable by the channel selector switch unit 7700 illustrated in Figs. 77 and 78.

Before leaving the description of the restoration of the channel relay unit 7900, it should be noted that at the time the ground potential is removed from the conductor C7731SU-1 in order to restore the start relay R7910, it also interrupts the circuit for the stick-up relay R8110. The last-mentioned relay is locked in its operated position to the conductor C7731SU-1 and when ground is removed from this conductor the relay restores and, at its contacts 8111, removes ground potential from the locking circuit extending to any one of the operated first, second and third characters register relays in the register 8001 in order now to restore such relays. The restoration of the operated register relays in the register 8001, in turn, interrupts the circuit for the registration complete relay R8220 to permit the last-mentioned relay now to restore. The channel relay unit 7900, as well as all of the other used channel relay units, restores to normal in the manner described and may again be utilized in processing another multiple call message.

Referring again to Fig. 13, it will be seen that when the seal-up relay R1310 restores to normal, as noted above, it interrupts, at its contacts 1315, a circuit including the conductor C1387SU-4 extending to Fig. 65, contacts 6572', and conductor C6381SU-2 extending to Fig. 63 in order to restore the release relay R6320 in the ZWL register unit 6300. The description of the operation of the ZWL register unit 6300 will be described hereinafter but it should be noted that upon the release of the seal-up relay R1310 at the end of the processing of a multiple call message, the release relay R6320 in the ZWL register unit 6300 also restores to normal.

As a further result of the restoration of the seal-up relay R1310, at its contacts 1316, it removes ground potential from the conductor C1388SU-5 extending to Fig. 44 in order to restore any of the operated relays in Fig. 44 that have been locked to this conductor and in order to remove ground potential from the conductor C4497RLS-HD extending to Fig. 72 in order to restore the release 2 relay R7200 in the precedence detector 7100. In Fig. 44, the removal of ground potential from the conductor C1388SU-5 causes the release of the process complete relay R4410 and the latter relay, at its contacts 4417 and 4418 removes ground potentials from the conductor C4497PR extending to Fig. 71 in order to restore the precedence relay R7250 (Fig. 71) and to remove ground potential from the conductor C4498ST extending to Fig. 52 in order to restore the start relay R5210 in the precedence transmission unit 5200.

In the precedence detector 7100 (Figs. 71 to 73, inclusive) the restoration of the relay R7200 at this time will remove the locking ground potential, at its contacts 7201 to 7203, 7209, 7209' and 7207 from the circuits for any of the operated relays in the detectors 7100FE, 7100RR, 7100PP, 7100MA, 7100–OP and 7100NM thereby to restore any operated relays therein. Also, at its contacts 7208, the relay R7200 removes ground potential from the conductor C6902SU-2 extending to Fig. 69 thereby to restore the disconnect relay R6910 in the precedence sensing unit 6700. The restoration of the precedence relay R7250 disconnects the various detectors in the precedence detector 7200 from the conductors C5283MA3 to 7, inclusive, and MA10 extending to the precedence transmission unit 5200.

As a result of the restoration of the disconnect relay R6910 in the precedence sensing unit 6700, ground potential at the contacts 6914 is removed from the conductor C3490SA extending to Fig. 34 in order to restore the address connect relay R3410.

As noted above, the start relay R5210 in the precedence transmission unit 5200 restored to normal under control of the restoration of the process complete relay R4410. As a result of the restoration of the relay R5210, at its contacts 5219, it restores its slave relay R5220 and, at its contacts 5211', it interrupts the locking circuits for the relays R5250 and R5260 which now restore to normal. At the contacts 5254, the relay R5250 removes ground potential from the conductor C4683P3 extending to Fig. 46 in order to prevent operation of the start relay R4650 when the relay R4670 subsequently restores to normal. The precedence transmission unit 5200 (Figs. 52 to 54, inclusive) is now fully restored and may be utilized in processing another multiple call message.

As a further result of the restoration of the relay R5210, at its contacts 5211' it removes ground potential from the conductor C4683SUD extending to Fig. 46 thereby to restore the relay R4670 in the channel selector switch control unit 4600. The latter relay, at its contacts 4675 removes ground potential from the conductor C4684P4 extending to Fig. 60 in order to restore the start reading relay R6040 in the storage control unit 5800. Before describing the circuits controlled in response to the restoration of the relay R6040, further controls exercised incident to the release of the seal-up relay R1310 will be given.

As a further result of the restoration of the relay R1310, at its contacts 1318, it removes ground potential from the conductor C2984DSU extending to Fig. 32 in order to restore any operated ones of the relays R3140, R3145, R3180, R3240 and R3280 in the prosign detector 3100. The manner in which the various relays just mentioned are operated will be explained hereinafter but it is deemed advisable at this time to describe the release of these relays after a multiple call message has been processed and transmitted.

Referring again to the seal-up relay R1310, it will be seen that at its contacts 1319, it interconnects the conductors C1392RU1 and RU2 extending to Fig. 84 and, at its contacts 1319' it interconnects the conductors C1392RT1 and RT2 extending to Fig. 84. In Fig. 84, the interconnection of the conductors C1392RU1 and RU2 completes the self-interrupting circuit for the magnet M8430, whereby, the wipers 8432 to 8435, inclusive, are advanced step-by-step until they engage the normal or N contact positions. In this position, the self-interrupting circuit includes the contacts 8431, wiper 8432 in engagement with the normal or N contact and the winding of the magnet M8430, to battery. The magnet M8430 now operates and restores and thereby advances its wipers 8432 to 8435, inclusive, one step to the position illustrated in the drawings. The wipers of the units digit register 8436U have now been restored to normal and are in a position to be reoperated to count the number of routing indicators processed.

The interconnection of the conductors C1392RT1 and RT2 as noted above, also completes a self-interrupting circuit for the magnet M8440 through its wipers 8442 and when this wiper engages the normal or N contact position, an independent circuit is completed whereby the magnet is operated and restored to advance the wipers 8442 to 8444, inclusive, an additional step into the position illustrated in the drawings. Accordingly, the tens digit register 8436T is now restored to normal and may be utilized in counting the number of routing indicators processed by the multiple call equipment.

Referring now to Fig. 60 it will be seen that when the start reading relay R6040 restores to normal, at its contacts 6041' it interconnects the conductors C8451RS1 and RS2 extending to Fig. 84 in order to complete a self-interrupting circuit for the magnet M8410. This circuit includes the contacts 8411, wiper 8412 in engagement with any one of the multiple connected contacts, conductor C8451RS2 extending to Fig. 60, contacts 6041', conductor C8451RS1 extending to Fig. 84, and the winding of the magnet M8410, to battery. The magnet operates over this circuit and, at its contacts 8411, interrupts its operating circuit and the magnet restores to normal to advance its wipers an additional step. The contacts 8411 are reclosed as soon as the magnet M8410 restores to normal so that the self-interrupting circuit for the magnet continues until the wiper 8412 engages the normal or N contact position. When this contact position is reached, the circuit is again completed for the magnet M8410 by way of the contacts 8411, wiper 8412 in engagement with the N contact, and the winding of the magnet M8410, to battery. Therefore, the wipers 8412 to 8414, inclusive, are advanced into engagement with the illustrated contacts. In this position, the self-interrupting circuit for the magnet M8410 is interrupted and the units digit register 8416U is again in position to start counting the routing indicators of a new message taken from temporary storage in the tape storage unit 5502.

At the contacts 6042', the relay R6040 interconnects the conductors C8451RS3 and RS4 extending to Fig. 84 thereby to complete an identical self-interrupting circuit for the magnet M8420. This magnet operates and restores to advance its wipers 8422 and 8423 step-by-step until they again engage the illustrated contact positions. The tens digit register R8416T is now in a position to start counting the routing indicators taken from temporary tape storage under control of the units digit register 8416U.

As a further result of the restoration of the relay R6040, at its contacts 6048 and 6049, it interrupts points in the previously described circuits including the conductors C6082BMA and C6082AMA extending to Fig. 55 in order to terminate further operation of the tape readers 5546 and 5586 associated respectively with the outgoing line number tape storage unit 5501 and the routing indicator tape storage unit 5502.

At the contacts 6046 and 6047, the relay R6040 interrupts the initial operating circuit and the locking circuit for the tape feed out relay R6070. The last-mentioned relay will normally be in its restored position at the time the relay R6040 is restored to normal, and has therefore, at its contacts 6072 and 6076, completed the circuits whereby the magnets M6211 and M6221 of the tape feed out counting switch 6201 restore the associated wipers to the illustrated positions. It may be well to mention at this time that the letters shift switch 6202 and the figures shift switch 6203 remain in their operated positions and need not be restored to normal inasmuch as they normally function to compare the number of letters shift characters sensed by the relay R5910 with the number of figures shift characters sensed by the relay R6010. As long as the comparison is made, the alarm relay R6250 will remain in its operated position to indicate that the two switches are retained in synchronism.

Referring again to the relay R6040, it will be seen that, at its contacts 6044, it removes a locking ground potential from the circuit including the contacts 6065 in order to restore any one of the relays R5910, R5920, R6010, R6110, R6120 and R6130 if any of these relays are in their operated position at this time. Normally, however, these relays will be restored prior to the time the relay R6040 opens its contacts 6044.

Also, at the contacts 6044, ground potential is removed from the circuit including the contacts 6062 in order to remove the locking ground potential from the circuits for the relays R6020 and R6025 which are normally in their restored positions at this time. At the contacts 6044, the relay R6040 also removes ground potential from the circuit including contacts 6062 and 6043, conductor C4872SU–1 extending to Fig. 48 so that any of the relays in the transmitter control unit 4800 (Figs. 48 to 50, inclusive) which are either locked or operated over this conductor will restore to normal.

At its contacts 6044, the relay R6040 removes locking ground potential from the circuit including the contacts 6061, conductor C4684SUC extending to Fig. 47, in order to restore any one of the relays R4710 to R4740, inclusive, if they are locked to this conductor at this time. Normally, however, these relays will be in their restored positions at the time the relay R6040 restores to normal.

At the contacts 6044, ground potential is also removed from a circuit including the contacts 6061 and the conductor C6069SU extending to Fig. 48 in order to restore the relay R4801 in the event the relay is locked to this conductor at this time. Also, incident to the removal of ground potential from the conductor C6069SU, the locking circuit for any one of the relays R6140U1 to U0, inclusive, is interrupted in order to restore such relays if they are locked to this circuit at the time the relay R6040 restores to normal.

At its contacts 6042, the relay R6040 also removes ground potential from the conductor C8451COMP extending to Fig. 84 so that the circuit including the wipers 8434, 8414, 8423 and 8443, conductor C1180APC extending to Fig. 11 will be interrupted to restore the all-pilots-complete relay R1150. It should be noted, however, that this circuit was initially interrupted at the time the units and tens digit register 8436U and T restored to normal under control of the seal-up relay R1310 (Fig. 13).

Finally, at the contacts 6041, the relay R6040 removes ground potential from the conductors C6081SU–1, SU–2 and TR3 extending to Fig. 56. In Fig. 56, the removal of ground potential from the conductor C6081SU–1 will restore any of the relays, such as R5660, R5720, R5730, R5740 and R5750 that are locked at this conductor. However, normally these relays will be in their restored position at the time the contact 6041 is opened by the relay R6040. In Fig. 56, the removal of ground potential from the conductor C6081SU–2 will cause the restoration of any of the operated relays in the register 5601, 5602, 5701 to 5703, inclusive, and it will also cause the restoration of the relay R5650. These relays, however, will normally be in their restored position as a result of the momentary operation of the reset relay R6060, as previously described, at the time the contacts 6041 are opened. In Fig. 56, the removal of ground potential from the conductor C6081TR3 will restore the relays R5640 and R5710.

Referring now to Fig. 11, it should be noted that when the all-pilots-complete relay R1150 restores to normal as noted above, the miscellaneous unit 1000 will be fully restored to normal and available for use in processing additional multiple call messages.

All of the multiple call equipment utilized in processing the message has now been restored to normal and may be used in processing additional multiple call messages.

*Transmitting the multiple call message from the different cross-office units in the relay switching center UAC*

Referring now to Fig. 1, it should be noted that the original multiple call message transmitted from the relay switching center UEP over the trunk line ABC to the relay switching center UAC and stored on the tape 1413 in the multiple call storage unit 1400 included the following information and will be referred to hereinafter as Message A:

(1) XZXZXZX
(2) ABC (figures) 014 (letters)
(3) NMNM UAC ZVA
(4) NMNM UACZZ JWCX JKXY UKAY (figures) 444
(5) Body of the message
(6) 26
(7) 0145
(8) (figures) ,,,,,,, (letters)

The foregoing message was analyzed in the manner previously described and as a result thereof, two separate cross-office units, such as X3400, were selected that were associated respectively through the outgoing selector, such as X4300 (Fig. 8), with an outgoing line. Each of the outgoing lines has been referred to hereinbefore as the L1 outgoing line but actually the two outgoing lines are the lines EAC and ECX as illustrated in Fig. 1.

In the cross-office unit, such as X3400, associated with the outgoing line EAC the message processed by the multiple call equipment in the relay switching center UAC is stored on the tape X3413 associated with the cross-office reperforator X3410 as follows and will be referred to as Message B:

(1) XZXZXZX
(2) NMNM JWC ZVA ZWL UACZZ
(3) ABC (figures) 014 (letters)
(4) NMNM UAC ZVA
(5) NMNM UACZZ JWCX JKXY UKAY (figures) 444
(6) Body of the message
(7) 26
(8) 0145
(9) (figures) ,,,,,,, (letters)

From the foregoing it will be understood that the multiple call equipment in the relay switching center UAC in processing Message A has absorbed line 1 thereof and has manufactured new pilot heading information as illustrated by lines 1 and 2 in Message B. The remaining information in lines 3 to 9, inclusive of Message B is exactly the same as the information appearing in lines 2 to 8 in the original Message A.

As soon as the outgoing line is available for use in transmitting the above Message B, the number transmitter X4430, the timer T4495, the monitor unit X4450 and the relay XR3940 will be operated in the manner described in the previously described Stiles application so that certain information appearing on the tape will be transmitted by the tape transmitter X3430 over the outgoing line (L1) ECA to the typing reperforator individual to the incoming line circuit at the relay switching center JWC. The message, as transmitted from the relay switching center UAC to the relay switching center JWC, will be stored on the tape in the relay switching center JWC and will include the following information which will be referred to as Message C:

(1) XZXZXZX
(2) EAC (figures) 003 (letters)
(3) NMNM JWC ZVA ZWL UACZZ
(4) ABC (figures) 014 (letters)
(5) NMNM UAC ZVA
(6) NMNM UACZZ JWCX JKXY UKAY (figures) 444
(7) Body of the message
(8) 26
(9) 0145
(10) 0150
(11) (figures) ,,,,,,, (letters)

In transmitting Message C from the cross-office unit X3400 where it was stored in accordance with Message B, the number transmitter X4430 automatically transmitted the information of lines 1 and 2 shown in Message C. Thereafter, the tape transmitter X3430 transmitted the information appearing in lines 3 to 9, inclusive, of Message C and then the timer XT4495 transmitted the information appearing in lines 10 and 11 of Message C. It should be noted that the number transmitter X4430 actually introduces a new start-of-message indicator (XZXZXZX) in line 1 and then transmits the letters EAC identifying the outgoing line extending between the relay switching centers UAC and JWC followed by the digits 003 indicating that the present message is the third message transmitted over the particular outgoing line within a given transmitting period (generally 24 hours). It should also be understood that the timer XT4495 introduces lines 10 and 11 whereby, in line 10, the exact time (0150) is given to indicate when the message was transmitted from the relay switching center UAC and, in line 11, the end-of-message indicator (figures ,,,,,,, letters) is given.

Another cross-office unit, such as X3400, in the relay switching center UAC has been controlled by the multiple call equipment so that it is associated with the outgoing line ECX extending to the tributary station UACZZ (Fig. 1). The message stored in the cross-office reperforator, such as X3410, in the cross-office unit connected to the outgoing line ECX includes the following information which will be referred to as Message D:

(1) XZXZXZX
(2) NMNM UACZZ
(3) ABC (figures) 014 (letters)
(4) NMNM UAC ZVA
(5) NMNM UACZZ JWCX JKXY UKAY (figures) 444
(6) Body of the message
(7) 26
(8) 0145
(9) (figures) ,,,,,,, (letters)

When the outgoing line ECX is available, the cross-office unit associated therewith, will be controlled in the manner described in the previously mentioned Stiles application so that the number transmitter X4430, the timer XT4495 and the tape transmitter X3430 provided in that unit will retransmit the message over the outgoing line ECX to the typing reperforator, such as X330, at the tributary station UACZZ.

The message as it is received and perforated by the typing reperforator at the tributary station UACZZ includes the following information which will be referred to as Message E:

(1) XZXZXZX
(2) ECX (figures) 075 (letters)
(3) NMNM UACZZ
(4) ABC (figures) 014 (letters)
(5) NMNM UAC ZVA
(6) NMNM UACZZ JWCX JKXY UKAY (figures) 444
(7) Body of the message
(8) 26
(9) 0145
(10) 0148
(11) (figures) ,,,,,,, (letters)

In transmitting the message from the relay switching center UAC to the tributary station UACZZ the number transmitter, such as X4430, transmitted the start-of-message indicator of line 1 and the identity of the outgoing line (EXC), followed by the digits 075, of line 2. Thus, Message E includes the information regarding the outgoing line between the relay switching center UAC and the tributary station UACZZ that is used, and the number 075 indicates that this message is the 75th message transmitted over the outgoing line ECX by the relay switching center UAC within a given time period (24 hours). Furthermore, the timer, such as XT4495, transmitted the exact time (0148), appearing in line 10, that the message is transmitted over the above noted outgoing line and then the timer transmitted the end-of-message indictor appearing in line 11 of Message E.

The information appearing in line 3 of Message E is the pilot heading information added to the original message by the multiple call equipment in the relay switching center UAC and identifies the tributary station UACZZ as one of the destinations listed in the original multiple call message illustrated in Message A. From the information appearing in lines 4 and 5 of this message the tributary station UACZZ is informed that the relay switching center UAC originally received the message over a trunk line ABC: that it is the 14th message transmitted during a predetermined time interval; that it is a deferred precedence (NMNM) message; and that it is a multiple call message (ZVA) that is transmitted to all of the tributary stations listed in line 6. Line 8 informs the tributary station UACZZ that the original Message A was transmitted to the relay switching center UAC on the 26th day of the month; line 9 indicates the time (0145) that the message was originally transmitted to the relay switching center UAC; and line 10 indicates the time (0148) that the message was transmitted from the relay switching center UAC.

*Receiving the multiple call message at the relay switching center JWC*

Referring now to Fig. 1 it will be seen that the Message C transmitted from the relay switching center UAC over the outgoing trunk line EAC is received at the relay switching center JWC. The switching apparatus provided at the relay switching center JWC is exactly the same as that provided at the relay switching center UAC. As noted above, the Message C is received at the relay switching center JWC and is perforated on the tape associated with a typing reperforator, such as X330 illustrated in Fig. 7B. However, for the purpose of describing the manner in which the multiple call message is handled when it includes a ZWL prosign, it will now be assumed that the apparatus disclosed in the drawings is the apparatus provided at the relay switching center JWC.

As the Message C is perforated on the tape associated with the typing reperforator X330 (Fig. 7B) it is analyzed and processed in the manner previously described in connection with the switching apparatus provided at the relay switching center UAC. Therefore, when the information shown in lines 1 and 2 of Message C is processed and then the deferred precedence indicator (NMNM), the routing indicator (JWC), and the multiple call indicator (ZVA) of line 3, are processed, the cross-office selector X3300 will be automatically controlled to search for and connect with an available multiple call storage unit, such as 1400 illustrated in Figs. 14 to 20, inclusive. This operation has been described previously and need not be repeated.

After the multiple call storage unit 1400 is associated with the single message apparatus of Figs. 7A and 7B, the entire Message C as perforated on the tape X333 is retransmitted by the incoming line retransmitter X360 to the reperforator 1410 in the multiple call storage unit 1400. Consequently, the Message C, now perforated on the tape 1413 by the reperforator 1410, is processed in substantially the same manner as has been described previously. In other words, the start-of-message indicator of line 1 is sensed by the sensing unit 1501 and registered in the start and end of message detector, illustrated in Fig. 15 and 16. Thereafter, the information in line 2 in Message C is sensed by the tape reader 1420 but for all practicable purposes is merely absorbed by the multiple call storage unit 1400. Thereafter, the deferred indicator NMNM of line 3 is sensed by the tape reader 1420 and this information is repeated to the precedence sensing group 6701 (Fig. 67) whereby the precedence register 6801 controls the precedence detector 7100 (Figs. 71 to 73, inclusive) to register the deferred precedence indictor in the deferred detector 7100NM, in the manner previously described.

After the foregoing information has been registered in the deferred detector 7100NM, the relay switching center routing indicator JWC of line 3 is read by the tape reader 1420 and repeated to the address sensing unit 3401. The last-mentioned unit, under control of the sequence control relay unit 3501, registers the routing indicator JWC in the registers 3701 to 3703, inclusive, in the processing routing register 3700 of Figs. 37 and 38.

The next information sensed by the tape reader 1420 is the multiple call indicator ZVA appearing in line 3 of Message C. This information repeated to the precedence sensing group 6701 and the latter unit controls the multiple address register 6802 in order to register the multiple call indicator ZVA in the multiple address detector 7100-MA (Fig. 72). At the time this information is registered in the multiple address detector 7100MA, the relay R7240 is operated and, at its contacts 7244, completes a circuit including the conductor C2983MA8 extending to Fig. 29 in order to operate the ZVA relay R2960 (Fig. 29). Also the ground potential for operating the relay R2960 is further extended by way of the conductor C2982MA8 extending to Fig. 44 in order to operate the Z1 relay R4485 in the sequence control unit 4100.

Referring now to Fig. 29, it will be seen that when the ZVA relay R2960 operates in the manner described above, it completes a locking circuit for its lower winding which includes the contacts 2965, conductor C2982SUZ extending to Fig. 44, contacts 4442 and 4463 and the grounded conductor C1388SU–5 extending to Fig. 13. Certain of the operations controlled by the ZVA relay R2960 have previously been described under the heading "Conditioning the prosign sensing unit 2900 and the prosign detector 3100 for operation" and reference may be had to this section of specification for such circuit operations.

*Operation of the prosign sensing unit 2900 and the prosign detector 3100*

In the Message C received at the relay switching center JWC, the information in line 3 following multiple call indicator ZVA is the prosign ZWL. This prosign informs the switching apparatus at the relay switching center JWC that it is responsible for the retransmission of the multiple call message to each of the tributary stations appearing in line 6, except the tributary station routing indicator or indicators appearing in line 3 immediately following the prosign ZWL. In the present message, only the routing indicator UACZZ appears after the prosign ZWL and indicates to the relay switching center JWC that it need not transmit a message to the tributary station UACZZ. At least four routing indicators may be listed in line 3 of the message following the prosign ZWL, but it should be understood this number may be varied.

As soon as the Z1 relay R4485 (Fig. 44) operates as previously noted, at its contacts 4486, it removes ground potential from the conductor C4497ZVS extending to Fig. 72 in order now to restore the relays R7230 and R7240 in the multiple address detector 7100MA. As a further result of the operation of relay R4485, at its contacts 4487, it applies ground potential over a circuit including the contacts 4491, conductor C3602MCR extending to Fig. 36 in order to operate the disconnect relay R3680 in the address detector 3300. The last-mentioned relay, at its contacts 3681, operates the release relay R3690 and the latter relay at its various contacts removes locking ground potentials from the conductors extending to the relays in the processing routing register 3700. All operated relays in this unit now restore to normal in order to discard routing indicator JWC registered in the first, second and third registers 3701 to 3703, inclusive. Also, at its contacts 4488, the relay R4485 locks itself to the grounded conductor C2982SUZ and, at its contacts 4489, it completes the operating circuit for the Z2 relay R4490.

The relay R4490 now operates to interrupt, at the contacts 4492, the locking circuit for the Z1 relay R4485 which also restores to normal and, at its contacts 4491 it removes ground potential from the conductor C3602-MCR extending to Fig. 36 in order to restore the disconnect relay R3680. The last-mentioned relay, at its contacts 3681, reoperates the release relay R3690 in order to again condition the address detector 3300 and the processing routing register 3700 to sense the next information read by the tape reader 1420.

Referring now to the prosign sensing unit 2900 it will be recalled that the relays R2910A to E, inclusive, in the prosign sensing group 2901, are controlled over the conductors C2981PA to PE, inclusive, in multiple with the relays R6710PA to PE, inclusive, in the precedence sensing group 6701 and the relays R3420AA to AE, inclusive, in the address sensing unit 3401. Therefore, when the tape reader 1420 reads the prosign ZWL in line 3 of Message C, the three sets of relays noted above are controlled in the manner previously explained. However, the relays in the address sensing unit 3401 and the relays in the precedence sensing group 6701 perform no controls in the associated address detector 3300 and precedence sensing unit 6700. In the prosign sensing group 2901, the Z character of the prosign ZWL operates the relays R2910A and R2910E. Therefore, a circuit is completed including the contacts 2912, 2919, 2927, 2936 and 2944, and the "Z" conductor for operating the relay R3020Z. As a further result of the operation of relays R2910A and E, at their contacts 2917 and 2950, they complete a circuit including the contacts 2973 and 3076 for operating the relay R3080. As a further result of the operation of relay R3020Z, at its contacts 3021, it extends its operating ground potential to the winding of relay R2970 in order to operate the latter relay and, in multiple therewith, it completes a circuit including the contacts 3022 and 3177 for operating the relay R3110 in the ZWL detector 3101. As soon as the relay R2970 operates it interrupts, at its contacts 2973, the initial operating circuit for the relay R3080 and, at its contacts 2974 it completes the operating circuit for the relay R3070. The relay R3070, at its contacts 3071, now completes a locking circuit including the contacts 2971 for the relay R2970 and, at its contacts 3072 to 3075, inclusive, and 3077, it opens points in the locking circuits for the various relays included in the ZWL detector 3101, the UUU detector 3102, the BBB detector 3103, and the JJJ detector 3104. Finally, at its contacts 3076, the relay R3070 interrupts a further point in the circuit for the relay R3080.

At the end of the sensing of the first character Z, the relays R2910A to E restore to normal and, at their contacts 2917 and 2950, the circuit for the relay R3070 is interrupted in order to restore the latter relay. Also, these relays upon restoring remove ground potential from the "Z" conductor thereby to restore the relays R3020Z and R2970. At this time the relay R3110 in the ZWL detector 3101 locks itself over a circuit including the contacts 3111, relay R3115, contacts 3126, 3073, and 2961, to ground. The relay R3115 now operates and, at its contacts 3116, prepares a point in the circuit for operating the relay R3120 provided a W character is now sensed by the tape reader 1420.

The tape reader 1420 now senses the W character of the prosign ZWL and thereby causes the operations of relays R2910A, B and E in the prosign sensing group 2901. These relays complete a circuit including the contacts 2912, 2920, 2928, 2937 and 2945, and the "W" conductor for operating the relay R3030W. As soon as the last-mentioned relay operates it completes, at its contacts 3033, a locking circuit including the contacts 3126 for the relays R3110 and R3115. At the contacts 2917, 2925 and 2950, the relays R2910A, B and E complete the previously described circuit for operating the relay R3080. However, as a further result of the operation of relay R3030W, at its contacts 3031, its initial operating ground is further extended to operate the relay R2970 and is further extended over a circuit including contacts 3032, 3116, and 3128 for operating the relay R3120 in the ZWL detector 3101. The relay R2970 upon operating again interrupts the circuit for the relay R3080, at its contacts 2973, and it again completes, at its contacts 2974, the operating circuit for the relay R3070. The relay R3070 upon operating performs the same controls as previously described, whereby the relay R2970 is locked in its operated position and the locking circuits for certain of the relays in the detectors 3101 to 3104 are interrupted. However, the relay R3030W, at the contacts 3032, retains the locking circuit for the relay R3120 and, at its contacts 3033, it retains the locking circuit for the relays R3110 and R3115.

At the end of the sensing of the character W of the prosign ZWL, the operated relays in the prosign sensing group 2901 restore to normal in the usual manner and in turn cause the restoration of the relay R3070. At the contacts 3071 the relay R3070 applies ground potential to the circuit for retaining the relays R2970, R3030W and R3120 in their operated positions. As soon as the relay R3070 restores to normal, at its contacts 3073, it supplies an additional holding ground to the circuit for the relays R3110 and R3115 in order to retain these relays in their operated positions after the relay R3030W restores to normal. As a further result of the restoration of relay R3070, at its contacts 3075, it now completes a circuit which may be traced from ground, contacts 2961, 3075, and 3137, the winding of relay R3125, contacts 3121, and the winding of relay R3120, to battery. The last-mentioned locking circuit for the relay R3120 is completed incident to the restoration of the relay R3030W and causes the relay R3125 to operate. At its contacts 3126 and 3127, the relay R2125 now transfers the locking circuit for the relays R3110 and R3115 to the above mentioned locking circuit for the relays R3120 and R3125. Also, at its contacts 3129, the relay R3125 prepares a circuit for operating the relay R2130 provided an L character is now sensed by the tape reader 1420.

The tape reader 1420 now senses the L character of the prosign ZWL and in substantially the same manner as has been described above causes the operation of the relay R3010L, R2970 and R3070. The relay R3010L, at its contacts 3012, completes the operating circuit for the relay R3030 and at the end of the sensing of the L character, the relay R3130 locks itself over a circuit including the contacts 3131, the winding of the relay R3135 and the contacts 2167 on the operated ZVA relay R2960, to ground. The relay R3135 operates in series with the relay R3130 and, at its contacts 3139, it completes an obvious circuit for operating the ZWL relay R3140 to indicate that the characters Z, W and L have been sucessfully detected in the proper sequence. As soon as the relay R3140 operates, it locks itself over a circuit including the contacts 3141 to the grounded conductor C2984DSU extending to Fig. 13.

As a further result of the operation of relay R3135, at its contacts 3136, it completes an obvious circuit for operating the detection complete relay R3145. The relay R3145 also locks itself over a circuit including its right-hand winding and its contact 3146 to the grounded conductor C2984DSU extending to Fig. 13. As a further result of the operation of relay R3135, at its contacts 3137, it interrupts the locking circuits for the relays R3110, R3115, R3120 and R3125, whereupon, these relays all restore to normal. Finally, at its contacts 3132, the relay R3135, now completes a circuit which may be traced from ground at the contacts 2966 and then by way of the contacts 3132, conductor C2982RLS1 extending to Fig. 44 in order to operate the release relay R4460 in the sequence control unit 4100. The relay R4460 upon operating, at its contacts 4464, extends the operating ground potential to the winding of the store relay R4450 which also operates. As a further result of the operation of relay R4460, at its contacts 4463, it disconnects the grounded conductor C1388SU–5 from the conductor C2982SUZ extending to Fig. 29 thereby to restore the ZVA relay R2960 in the prosign sensing unit 2900.

When the ZVA relay R2960 restores to normal, at its contacts 2963, it applies ground potential to the conductor C2982AR5 extending to Fig. 44 and then by way of the contacts 4452 and the right-hand winding of the store relay R4450, to battery. The relay R4450 is now locked in its operated position over a circuit which is independent of its initial operating circuit. As a further result of the restoration of the relay R2960, at its contacts 2966, it removes ground potential from the conductor C2982RLS1 extending to Fig. 44 thereby to restore the release relay R4460. As soon as the relay R4460 restores, it again completes, at its contacts 4463 the circuit for applying ground potential to the conductor C2982SUZ extending to Fig. 29 to prepare the locking circuit for the ZVA relay R2960 in the event that it is subsequently reoperated. Also, the ground potential on the conductor C1388SU–5 is reapplied to the conductor C4497RLS-HD extending to Fig. 72 in order to reoperate the release 2 relay R7200 in the precedence detector 7100. It should be noted at this time that when the release relay R4460 initially operated, it released the relay R7200 and caused the restoration of any of the operated relays in the deferred precedence detector 7100NM or any other precedence detector in the precedence detector 7100. As a further result of the restoration of the relay R4460, at its contacts 4462, it controls the circuit including the conductors C1788C1 and C1788C2 extending to Fig. 17. These conductors are included in the circuits for controlling the tape reader 1420 and it will be understood that when the release relay R4460 operates in response to the sensing and registering of the prosign ZWL it stops the tape reader 1420 and when the relay subsequently reoperates, it again starts the tape reader 1420 to read the tape.

Since the ZVA relay R2960 has restored to normal, at its contacts 2967, it removes the holding ground from the locking circuit for the relays R3130 and R3135 in the ZWL detector 3101 so that these relays now restore to normal. The only relays that remain in their operated positions in the prosign sensing unit 2900 and the prosign detector 3100 of Figs. 29 to 32, inclusive, are the ZWL relay R3140 and the detection complete relay R3145. The relay R3140, at its contacts 3142, prepares a point in the circuit including the conductor C2986PP1 extending to Fig. 64 for controlling the ZWL register unit 6300. The detection complete relay R3145, at its contacts 3149, completes a circuit including the conductor C2903 extending to Fig. 29 in order to lock the carriage return relay R2905 in its operated position in the event the relay is subsequently operated and to complete a circuit including the contacts 2906, conductor C2981SA extending to Fig. 33 in order to retain the address connect relay R3410 in its operated position. Finally, at its contacts 3148, the relay R3145 prepares a point in the circuit including the conductor C2985COMP extending to Fig. 65 for operating the relay R6570 in the ZWL comparator unit 6500.

Before continuing with the operations resulting from the registration of the prosign ZWL in the ZWL detector 3100, a description will be given of the operation of the prosign sensing unit 2900 and the prosign detector 3100 in response to the detection of a network prosign UUU, BBB or JJJ. One of the above noted network prosigns may appear in a multiple call message of the type illustrated in Message C in line 3 thereof in place of the ZWL prosign. As pointed out above, the ZWL prosign indicates to the switching apparatus at the designated switching center that it should process all of the tributary station routing indicators appearing in line 6 of the message except the tributary station routing indicators appearing immediately after the prosign ZWL. If it has been found in processing multiple call messages that it is feasible to use one of the network prosigns UUU, BBB or JJJ it will appear in line 3 of the message immediately following the multiple call indicator ZVA in place of the prosign ZWL. Normally, however, there will be no routing indicator appearing after a network prosign. Whenever a network prosign appears on the message in line 3 thereof, it will indicate to the switching apparatus in the designated relay switching center that it only has to process the tributary station routing indicators appearing in line 6 that have the same first character as the three characters appearing in the network prosign. Thus, if the network prosign UUU appears in line 3 of Message C in place of the ZWL prosign, then the relay switching center JWC will only process the routing indicators appearing in line 6 of the message having the first character U and it will not process any of the routing indicators having the first characters B or J.

It will now be assumed that the network prosign UUU appears immediately after the multiple call routing indicator ZVA in line 3 of Message C. Therefore, the ZVA relay R2960 (Fig. 29) will be in its operated position and locked to the grounded conductor C2982SUZ. When the tape reader 1420 senses the first character U of the network prosign UUU, the relays R2910A, B and C in the prosign sensing group 2901 will be operated in the manner previously explained. A circuit is now completed which may be traced from ground, contacts 2945, 2938, 2930, 2921 and 2913, and the "U" conductor in order to operate the relay R3060U. The operation of the relays R3060U completes, at its contacts 3063, the operating circuit for the relay R3150 in the UUU detector 3102. It should be understood that the relay R2970 and R3070 operate in the same manner as has been described previously in detecting and registering the ZWL prosign in the ZWL detector 3101. At the end of the sensing of the first U character, the relay R3150 locks in series with the relay R3155 over a circuit including the contacts 3072 and 2961, to ground. The next time the tape reader 1420 senses a U character, the relay R3060U will again operate to now complete the operating circuit for the relay R3160 and at the end of the sensing of the second U character, the relay R3160 locks itself, by way of its contacts 3161, in series with the relay R3165 which also operates. The sensing of the third U character reoperates the relay R3060U to complete the operating circuit for the relay R3170 in the UUU detector 3102. Since the three U characters of the network prosign UUU have now been detected in proper sequence, the relay R3170 completes, at its contacts 3173, the operating circuit for the UUU register relay R3180. The last-mentioned relay locks itself by way of its contacts 3182 to the grounded conductor C2984DSU extending to Fig. 13. Also, at the contacts 3171, the relay R3170 completes the operating circuit for the detection complete relay R3145 which also locks itself in its operated position to the grounded conductor C2984DSU. As a further result of the operation of relay R3170, at its contacts 3175, the ground potential at the contacts 2968 on the operated ZVA relay R2960 is connected to the conductor C2982RLS2 extending to Fig. 44 in order to operate the release relay R4460 as previously described. As previously noted, the relay R4460 removes ground potential from the conductor C2982SUZ in order to restore the ZVA relay R2960. Also, the relay R4460, at its contacts 4462, stops the reading operation of the tape reader 1420. The detection and registration of the network prosign UUU, however, prevents operation of the store relay R4450. Finally, the relay R3180, at its contacts 3181, applies ground potential to the conductor C2985U extending to Fig. 66 in order to operate the relay R6610U in the ZWL comparator unit 6500. The last-mentioned unit is thus prepared to test each of the routing indicators appearing in line 6 of Message C and prevents the processing of those indicators having the first character B or J.

The operations of the BBB detector 3103 and the JJJ detector 3104 are exactly the same as has been described above in connection with the operation of the UUU detector 3102 except that they only respond to the successive detection of the three characters identifying the detectors 3103 and 3104.

As soon as the ZVA relay R2960 restores to normal as noted above, at its contacts 2968, it removes ground potential from the circuit including contacts 3175 and the conductor C2982RLS2 extending to Fig. 44, in order again to restore the release relay R4460. The latter relay controls the circuit for the tape reader 1420 so that reading of the tape will again be started. As a further result of the restoration of the ZVA relay R2960, at its contacts 2967, it removes the locking ground potential from the relay R3170 thereby to restore the latter relay.

*Registering the tributary station routing indicator appearing after the prosign ZWL*

The ZWL prosign is registered by the ZWL relay R3140 in the ZWL detector 3101 in the manner described above. The completion of the registration of this information in the prosign detector 3100 controls various relays in Fig. 44 of the sequence control unit 4100, whereby, the tape reader 1420 is temporarily stopped from reading the associated tape to allow certain relays in the prosign sensing unit 2900 and the prosign detector 3100 to restore to normal. When this is accomplished, the release relay R4460 (Fig. 44) is also restored to normal and, at its contacts 4462, recompletes the circuit for the tape reader 1420 so that it will continue to read the associated tape. By referring to line 3 in Message C, it will be noted that the next item of information to be sensed by the tape reader 1420 is the tributary station routing indicator UACZZ. As this routing indicator is sensed by the tape reader 1420, the relays in the address sensing unit 3401 respond in the manner previously described to control the relays in the sequence control relay unit 3501 and to cause the five characters of the routing indicator UACZZ to be registered respectively in the registers 3701 to 3705, inclusive, in the processing routing register 3700. After the last character is sensed by the tape reader, a "space" character function is sensed which controls the address sensing unit 3401 to operate the relay R3420AC. When this occurs, a circuit is completed for operating the address received relay R3540 which may be traced from battery, winding of the relay R3540, contacts 3473, 3462, 3451, 3439, 3427 and 3545, conductor C3551-5CA extending to Fig. 37, and contacts 3856, to ground. The relay R3540 immediately locks itself by way of its contacts 3542 to ground at contacs 3691'. Also, at its contacts 3541, the relay R3540 now extends ground potential by way of the conductor C3492AR4 extending to Fig. 44 in order to operate the AR relay R4470. This indicates that the address or routing indicator has been received. As soon as the relay R4470 operates it interrupts, at its contacts 4473, the circuit for the tape reader 1420 which now stops reading the associated tape. As a further result of the operation of relay R4470, at its contacts 4474, it now completes a circuit including the contact 4453, conductor C2982AR2 extending to Fig. 31, contacts 3142 on the operated ZWL relay R3140, conductor C2986PP1 extending to Fig. 64, contacts 6414, and the winding of the relay R6420, to battery. The relay R6420 in the ZWL register unit 6300 now operates.

From the foregoing, it will be understood that the registration of the routing indicator UACZZ immediately following the registration of the prosign ZWL will cause the operation of the relay R6420 in the ZWL register unit 6300. In Fig. 64, the relay R6420, at its contacts 6423, completes a circuit including the contacts 6415 for operating the connect relay R6310 and in multiple therewith, the relay R6385. At this point it should be noted that the ZWL register unit 6300 is provided with five sets of register relays, each set corresponding to the relays R6330–1A to 1E, inclusive. Also, the relay R6310 is provided with four sets of make contacts corresponding to the contacts 6310–1A to 1E, inclusive. Each of the above noted sets of contacts and relays are utilized in registering the first four characters of a five character routing indicator. The relay R6385 is provided with five make contacts designated 6386–1A to 5E, inclusive, which are connected respectively to relays in the last register corresponding to the relays R6330–1A to 1E, inclusive. If only a four character routing indicator is registered in the processing routing register 3700 the relay R6305 will operate in multiple with the relay R6505 (Fig. 65) to disconnect the relay R6385 so that the relay R6310 will connect-up the first four registers in Fig. 63. The conductors C4161–1A to 1E, 2A to 2E, 3A to 3E, 4A to 4E, 5A to 5E are multiply connected to at least three other ZWL register units (not shown) which are exactly the same as the ZWL register unit 6300. These conductors are also multiply connected to the corresponding conductors shown along the left edge of Fig. 65 in the ZWL comparitor unit 6500. Finally, these conductors also extend to Fig. 41 where they are connected to the conductors C3771–1A to 1E, 2A to 2E, 3A to 3E, 4A to 4E, 5A to 5E, extending to Fig. 37 where they terminate in the respective registers 3701 to 3705, inclusive.

At the time the relay R6420 in the ZWL register unit 6300 is operated and controls the operation of relays R6310 and R6385, the release relay R6320 is in its operated position. The circuit for operating the relay R6320 may be traced from battery, winding of the relay R6320, conductor C6381SU–2 extending to Fig. 65, contacts 6572', conductor C1587SU–4 extending to Fig. 13, and contacts 1315 on the operated seal-up relay R1310, to ground.

As a further result of the operation of relay R4470, as described above, at its contacts 4471, it completes a circuit for transferring the routing indicator UACZZ registered in the processing routing register 3700 to the routing indicator register relays in the ZWL register unit 6300. The circuit for performing this operation includes the conductor C2982AR5 (grounded at the contacts 2963 on the restored ZVA relay R2960) contacts 4471 and 4451, conductor C4495TR1 extending to Fig. 38 in order to operate the transfer 1 relay R3810, and in multiple therewith, the conductor C3601TR1 extending to Fig. 36, contacts 3653, conductor C3601TR2 extending to Fig. 37, and the winding of the transfer 2 relay R3730, to battery. Thus, the transfer 1 relay R3810 and the transfer 2 relay R3730 are operated. It should be understood, however, that if the characters registered in the registers 3701 and 3702 are reversed, in the manner previously described, the relay R3740 instead of the relay R3730 will be operated. As soon as the above noted transfer relays are operated, the marking ground potentials controlled by the operated relays in the register 3701 to 3705, inclusive, are applied to the conductors C3771–1A to 1E, 2A to 2E, 3A to 3E, 4A to 4E, 5A to 5E, extending to Fig. 41, where they are multipled to the conductors C4161–1A to 1E, 2A to 2E, 3A to 3E, 4A to 4E and 5A to 5E extending to Fig. 63, through the closed contacts on the relays R6310 and R6385, to the routing indicator register relays in the ZWL register unit 6300. The first register comprising the five relays R6330–1A to 1E, inclusive, will be operated in accordance with the first character U of the routing indicator UACZZ, and the remaining four registers (schematically illustrated) will be operated in accordance with the remaining four characters of the routing indicator. The operated ones of the 25 relays constituting the five registers noted above, will be locked in their operated positions to ground potential at the contacts 6321 to 6325, inclusive, on the release relay R6320. Thus, the routing indicator UACZZ registered in the processing routing register 3700 is now transferred to the ZWL register unit 6300. As a result of the operations of any one or more of the routing indicator register relays in the ZWL register unit 6300, ground potential at contacts, such as 6332, completes the operating circuit for the relay R6430. As soon as the relay R6430 operates it completes, at its contacts 6431, a circuit including ground, contacts 6412, 6421 and 6431, conductor C6381RLS1 extending to Fig. 65, contacts 6573, conductor C3603MCR extending to Fig. 36 in order to operate the disconnect relay R3680. This relay performs the various functions previously described whereby the relay R3690 restores to normal and thereby releases the operated relays in the processing routing register 3700 in order to discard the routing indicator UACZZ registered therein. Also, the address received relay R3540 is restored and, at its contacts 3541, interrupts the circuit for the relay R4470 in the sequence control unit 4100.

The relay R4470 now restores to normal and, at its contacts 4471, interrupts the previously described circuit including the conductor C4495TR1 thereby to restore the transfer relays R3730 and R3810 in the processing routing register 3700. Also, at its contacts 4474, the relay R4470 removes ground potential from the conductor C2982AR2 extending to Fig. 31 and then by way of the contacts 3142, conductor C2986PP1 extending to Fig. 64 and the winding of relay R6420 to battery. Since the initial operating circuit for the relay R6420 is now interrupted, the relay locks itself in its operated position over a circuit including its contacts 6422, winding of relay R6410, and ground at contacts 6326 on the operated release relay R6320.

As soon as the relay R6410 operates it interrupts, at its contacts 6412, the above traced circuit including the conductor C6381RLS1 thereby to restore the disconnect relay R3680 and, in turn, the release relay R3690 in the address detector 3300. In this manner, the address detector and the processing routing register are restored to normal and are in condition to receive and register an additional routing indicator.

As a further result of the operation of the relay R6410, at its contacts 6415, it interrupts the circuit for the relays R6310 and R6385 thereby to disconnect the routing indicator register relays in the ZWL register unit 6300 from the associated marking conductors C4161–1A to 5E, inclusive. Also, at its contacts 6413, the relay R6410 now transfers the conductor C2986PP1 from the winding of the relay R6420 to the circuit extending to the schematically illustrated second ZWL register unit 6302.

In the present system there are four ZWL register units. The first unit is shown in detail in Figs. 63 and 64 and is designated as the ZWL register unit 6300. The second, third and fourth ZWL register units are designated respectively 6302, 6303 and 6304 and they have been schematically illustrated in Fig. 63. Therefore, it will be understood that the conductor C2986PP1 is tranferred at the contacts 6413 to the conductor C6416, extending to the second ZWL register 6302 so that the relay, corresponding to relay R6420, in the second ZWL register will be operated the next time the conductor C2986PP1 is grounded. In this manner, the second ZWL register unit 6302 may be controlled to register a second routing indicator which may be listed in line 3 of Message C. The same transfer is made between the second and third ZWL register units 6302 and 6303 and also between the third and fourth ZWL register units 6303 and 6304. Thus, only four routing indicators may be listed in line 3 of Message C following the prosign ZWL.

Finally, at its contacts 6411, the relay R6410 prepares a point in the circuit for operating the start relay R6440 when the conductor C6381ST is subsequently grounded in the ZWL comparitor unit 6500.

As a further result of the restoration of the relay R4470, at its contacts 4473, it again completes the previously described circuit for starting the tape reader 1420 to read the next item of information appearing on the associated tape. In the present Message C, the tape reader 1420 will now start to read the information appearing in line 4. The information appearing in lines 4, 5 and 6 of Message C is exactly the same as the information appearing in lines 2, 3 and 4 of Message A. In other words, the Message A that was originally received at the relay switching center UAC, after processing in that relay switching center, is transmitted to and received at the relay switching center JWC in accordance with Message C. It should be understood that the multiple call equipment illustrated in the drawings that is also provided at the relay switching center JWC will respond to the information appearing in lines 4 and 5 of Message C in the manner previously described in connection with the operation of the multiple call equipment at the relay switching center UAC.

As the information in line 4 of Message C is read by the tape reader 1420, the multiple call equipment will, in effect, absorb the various items of information. However, when the deferred precedence indicator NMNM appearing in line 5 is read (a second time) it is again registered in the deferred detector 7100NM in the precedence detector 7100, in the manner previously described. Thereafter, the tape reader 1420 senses the routing indicator UAC and this information is registered in the registers 3701, 3702 and 3703 of the processing routing register 3700 under control of the address detector 3300, in the manner previously explained. Following the above information, the tape reader 1420 reads the multiple call indicator ZVA. This indicator was also read previously when the tape reader 1420 sensed the information appearing in line 3 of Message C. In response to the reading of the multiple call indicator ZVA in line 5 of Message C, the precedence sensing unit 6700 responds, in the manner previously described, and under control of the multiple address register 6802 registers the multiple call indicator ZVA in the multiple call address register 7100MA in the precedence detector 7100.

In response to the registration of the multiple call indicator ZVA in the multiple address detector 7100MA, the relays R7230 and R7240 are locked in their operated positions to the grounded conductor C4497ZVS extending to Fig. 44. Also, the relay R7240, at its contacts 7244, applies ground potential to the conductor C2983MA8 extending to Fig. 29 in order again to operate the ZVA relay R2960. The operating ground potential on the conductor C2983MA8 for the relay R2960 is also extended over the conductor C2982MA8 to Fig. 44 in order to operate the Z1 relay R4485. Both the relays R2960 and the relay R4485 lock in their operated positions to the grounded conductor C2982SUZ.

The operation of the Z1 relay R4485 removes ground potential, at its contacts 4486, from the conductor C4297ZVS extending to Fig. 72 thereby to restore the operated relays R7230 and R7240 in the multiple address detector 7100MA. The relay R7240 in turn removes ground, at its contacts 7244, from the initial operating ground for the relays R4485 and R2960 from the conductor C2983MA8. As a further result of the operation of relay R4485, at its contacts 4487, it now applies ground potential to the conductor C3602MCR in order to again operate the disconnect relay R3680 in the address detector 3300. The latter relay, at its contacts 3681, restores the release relay R3690 so that all of the operated relays in the processing routing register 3700 again restore to normal. This discards the routing indicator UAC which has been temporarily stored in the last-mentioned register.

As a further result of the operation of the Z1 relay R4485 it completes, at its contacts 4489, a circuit for operating the Z2 relay R4490. The last-mentioned relay is normally shunted by ground potential on the conductor C3602SUB but when the address detector 3300 is restored to normal in response to the restoration of the relay R3690, the shunting ground potential is removed from the conductor C3602SUB to permit the relay R4490 to operate. As soon as the relay R4490 operates it interrupts, at its contacts 4492, the locking circuit for the Z1 relay R4485 which now restores to normal; and, at its contacts 4491 it removes ground potential from the conductor C3602MCR in order to again restore the disconnect relay R3680. The latter relay, at its contacts 3681, again completes the circuits for operating the relay R3690 thereby to prepare the address detector 3300 and the processing routing register 3700 to respond to another routing indicator.

Referring again to the ZVA relay R2960 it should be noted that, at its contacts 2963, it removes ground potential from the conductor C2982AR5 extending to Fig. 44 thereby to restore the relay R4450 and any other relay that may be locked to this conductor.

The tape reader 1420 now senses the various items of information appearing in line 6 of Message C. The deferred precedence indicator NMNM is sensed in the same manner as has ben previously described and controls the precedence sensing group 6701 and the precedence register 6801 in the usual manner. However, the disconnect relay R6910 is in its operated position inasmuch as the deferred precedence indicator NMNM was registered in the deferred detector 7100NM under control of the information included in line 5 of Message C. The disconnect relay R6910 prevents the precedence sensing unit 6700 from again controlling the deferred detector 7100NM and as a result thereof, the relays in the precedence sensing unit 6700 merely perform their usual operations and in fact absorb the characters NMNM of the deferred precedence indicator in line 6 of Message C.

The next item appearing in line 6 of Message C is the routing indicator UACZZ. This routing indicator, as previously noted, is exactly the same as the routing indicator appearing in line 3 of Message C. It is now necessary to compare the two routing indicators to determine whether or not it is necessary to process the same in the multiple call equipment of the relay switching center JWC.

In response to the sensing of the routing indicator UACZZ in line 6 of Message C, the address detector 3300 operates in the usual manner and registers the five characters UACZZ in five registers 3701 to 3705, inclusive, in the processing routing register 3700. At the end of the sensing of the five characters, the "space" character function is sensed in the usual manner and causes the operation of relay R3420AC in the address sensing unit 3401. At its contacts 3451, the relay R3420AC completes the circuit for the address received relay R3540. It is noted that the conductor C3551–5CA has been grounded at the contacts 3855 by the relay R3850 in the processing routing register 3700. The relay R3540 locks itself in its operated position and, at its contacts 3541, completes the circuit including the conductor C3492AR4 extending to Fig. 44 thereby to operate the relay R4470.

At its contacts 4473, the relay R4470 interrupts the circuit for the tape reader 1420 thereby to stop reading of the associated tape. Also, at its contacts 4476, the relay R4470 completes a circuit for operating the RIL relay R4440 which may be traced from battery, the right-hand winding of the relay R4440 contacts 4476, conductor C2982AR6 extending to Fig. 32, to ground at the contacts 2968 on the operated ZVA relay R2960. At its contacts 4443, the relay R4440 locks itself in its operated position over a circuit including the contacts 4433 and 4414, and the grounded conductor C1388SU–5.

As a further result of the operation of relay R4470, at its contacts 4475, ground potential is extended over the conductor C2982PRI extending to Fig. 29, contacts 2962 on the operated ZVA relay R2960, contacts 3148, conductor C2985COMP extending to Fig. 65, and the winding of the relay R6570, to battery.

Before proceeding with the operations controlled by the relay R6570 in the ZWL comparator unit 6500, it is noted that when the RIL relay R4440 operates its prepares, at its contacts 4441, a circuit for operating the RS relay R4430 and, at its contacts 4442, it interrupts a point in the circuit for connecting the ground potential on the conductor C1388SU–5 to the conductor C2982SUZ extending to Fig. 29 thereby to restore the ZVA relay R2960. As soon as the last-mentioned relay restores to normal, at its contacts 2963, it applies ground potential to the conductor C2982AR5 extending to Fig. 44 and then by way of the contacts 4441 in order to operate the RS relay R4430. The latter relay, at its contacts 4432, locks itself to the grounded conductor C1388SU–5. Also, at its contacts 2968, the relay R2960 removes ground potential from the conductor C2982AR6 extending to Fig. 44 in order to interrupt the initial operating circuit for the right-hand winding of the relay R4440. The latter relay now restores due to the fact the locking circuit including its left-hand winding has been interrupted at the contacts 4433 on the operated RS relay R4430. Since the RS relay R4440 is now operated, the ground potential at the contacts 4475 is extended by way of the contacts 4435, conductor C2982PR2 extending to Fig. 29, contacts 3148, and the conductor C2985COMP extending to Fig. 65, in order to retain the relay R6570 operated after the restoration of the ZVA relay R2960.

As soon as the relay R6570 operates it completes, at its contacts 6571, an obvious circuit for operating the relay R6560 and in multiple therewith, the relay R6565. The latter relay, however, with be disconnected from the above mentioned circuit, if the relay R6505 is in its operated position. In the previous description it was noted that the relay R6505 is operated in multiple with the relay R6305 whenever a four character routing indicator instead of a five character routing indicator is registered in the processing routing register 3700. The relay R6560 is provided with four sets of contacts, such as 6561A to E, inclusive, in order to connect up the four sets of conductors C4161–1A to 1E, 2A to 2E, 3A to 3E and 4A to 4E to the four sets of register relays, such as R6510–1A to 1E. Finally, the relay R6565 is provided with a set of make contacts 6566–5A to 5E in order to connect the conductors C4161–5A to 5E to the corresponding set of relays in the fifth or last register. The 25 conductors C4161–1A to 5E, inclusive, are respectively connected to the corresponding conductors in the four ZWL register units 6300, 6302, 6303 and 6304 and then extended to Fig. 41 where they are connected respectively to the 25 conductors C3771–1A to 5E extending to Fig. 37, and which terminate in the five registers 3701 to 3705, inclusive, in the processing routing register 3700.

As a further result of the operation of the relay R6570, at its contacts 6572, it extends ground potential over the conductor C4496TR1 extending to Fig. 44 and then over the conductor C4495TR1 extending to Fig. 38 in order to operate the transfer 1 relay R3810 in multiple with the transfer 2 relay R3730 in the processing routing register 3700. When the last-mentioned relays are operated, the five characters of the routing indicator UACZZ are transferred to the five sets of relays R6510–1A to 5E, inclusive, in the ZWL comparator unit 6500.

In Fig. 65, the first character U of the routing indicator UACZZ is registered in the first set of relays R6510–1A to 1E, inclusive, and consequently the relays R6510–1A, 1B and 1C are operated in accordance with the code illustrated in Fig. 89 to register the character U. The remaining four sets of similar relays are also operated, in code form, in accordance with the respective characters A, C, Z, Z. Therefore, the ZWL comparator unit 6500 has now registered the same routing indicator UACZZ as has previously been registered in the first ZWL register unit 6300. It will be noted that the five register relays in the ZWL comparator unit 6500 are provided with four sets of make and break contacts 6511–12, 6513–14, 6515–16 and 6517–18. The conductors connected to the first set of make-break contacts 6511 and 6512 extend to the corresponding make and break contacts 6333–6334 provided on the corresponding relay in the ZWL register unit 6300. Each of the five relays R6510–1A to 1E are provided with four sets of make-break contacts corresponding to those illustrated on the relay R6510–1A and the first set of make-break contacts on each of these relays is also connected to corresponding make-break contacts associated with the relays R6310–1B to 1E in the ZWL register unit 6300. The second, third and fourth sets of make-break contacts shown to the right of the relays R6510–1A to 1E are connected in exactly the same manner to the corresponding contacts on the register relays provided in the schematically illustrated second, third and fourth ZWL registers 6302 to 6304, inclusive. The remaining 20 relays and associated contacts for the last four sets of register relays, such as R6510–1A to R6510–1E, inclusive, are connected in the same manner to the corresponding sets of contacts (not shown) on the last four registers in each of the ZWL register units 6300, 6302, 6303 and 6304.

As a further result of the registration of the tributary station routing indicator UACZZ in the ZWL comparator unit 6500, ground potential at the make contacts, such as 6519, provided on each of the 25 register relays R6510–1A to 5E, inclusive, will apply ground potential to the start circuit including the winding of the start relay R6640 in the ZWL comparator unit 6500 and including in multiple therewith the conductor C6381ST extending to Fig. 64, contacts 6411 and the winding of the start relay R6440 in the ZWL register unit 6300. It should be noted that the conductor C6381ST is multiply connected to the three remaining ZWL register units 6302 to 6304 in order to also operate the start relay, such as R6440, in the last-mentioned register units.

At the present time a comparison will be made between the particular routing indicator registered in the ZWL comparator unit 6500 and as many as four different routing indicators that may be registered in the four different ZWL register units 6300, 6302, 6303, and 6304. The comparison may be carried on simultaneously inasmuch as the ZWL register units are connected respectively to the four different sets of make-break contacts shown to the right of the 25 register relays in the ZWL comparator unit 6500.

Referring now to the ZWL comparator unit 6500, it will be noted that when the start relay R6640 operates, it completes a circuit for the magnet M6625. This circuit may be traced from battery through the winding of the magnet M6625, contacts 6626, 6641, 6651 and the off-normal contacts ON6646, to ground. The magnet M6625 now operates and immediately interrupts its operating circuit, at its contacts 6626. Incident to the restoration of the magnet M6625, it advances it wipers 6628 to 6633, inclusive, in a counter-clockwise direction from the illustrated home contact positions into engagement with the contacts 1. When this occurs, the off-normal contacts ON6645 and ON6647 are closed and the contacts ON6646 are open. At the contacts ON6647, an obvious circuit is completed for operating the ONC relay R6650, which locks itself by way of its contacts 6654 to ground at contacts 6644 on the operated start relay R6640. The stepping of the wiper 6628 to 6633, inclusive, by the magnet M6625 is now terminated but when the comparison is completed by the ZWL comparator unit 6500 and the start relay R6640 restores to normal, a self-interrupting circuit will be completed for the magnet M6625 which includes battery, winding of the magnet M6625, contacts 6626, off-normal contacts ON6645, and ground at contacts 6643. The magnet M6625 will then be operated and restored under control of its contacts 6626 until the wipers have advanced step-by-step back to the illustrated home contact positions. When this occurs, the off-normal contacts ON6645 are opened to terminate further stepping of the wipers under control of the magnet M6625 and the off-normal contacts ON6647 are opened in order to restore the relay R6650.

In the present Message C, the prosign ZWL has been used and has prepared the ZWL register unit 6300 and the ZWL comparator unit 6500 to compare a routing indicator temporarily stored in the ZWL comparator unit 6500 with the four routing indicators temporarily stored respectively in the four ZWL register units 6300, 6302, 6303 and 6304. In this type of a comparison, the magnet M6625, the start relay R6640, and the ONC relay R5650 perform the operations described above to advance the wipers 6628 to 6633, inclusive, into engagement with the contacts 1 but they serve no useful purpose at this time. This equipment is effective, however, when a message involving the network prosigns UUU, BBB or JJJ is being considered in the ZWL comparator unit 6500.

Referring now to the ZWL register unit 6300 and bearing in mind that the three remaining ZWL register units 6302, 6303 and 6304 simultaneously perform the same operations, if routing indicators are temporarily stored therein it will be seen that when the start relay R6440 operates, at its contacts 6441, it completes a circuit including the contacts 6451, conductor C6381–ON extending to Fig. 65 and the winding of the slow-to-operate and slow-to-release ON relay R6595, to battery. Also, at its contacts 6444, the relay R6440 completes a circuit for operating the magnet M6341. This circuit may be traced from battery, winding of magnet M6341, contacts 6342, 6444, 6455 and ON6345, to ground. The magnet now operates and, at its contacts 6342, interrupts its initial circuit to cause the magnet M6342 to restore and advance its wiper 6344 one step in a counterclockwise direction from the normal home contact position into engagement with the contact 1. When this occurs, the off-normal contacts ON6345 are opened and the off-normal contacts ON6346 and ON6347 are closed. As soon as the contacts ON6346 are closed, a circuit is completed for operating the relay R6650 which immediately locks itself by way of its contacts 6353 to ground at contacts 6342. Also, at its contacts 6451, it interrupts a point of the initial circuit for applying ground potential to the conductor C6381–ON and, at its contacts 6452, it provides an alternate circuit including the contacts 6343 for applying ground potential to the above mentioned conductor. If the magnet M6341 continues to operate and restore, the ground potential at the contacts 6343, will maintain the ON relay R6595 operated over the circuit including the conductor C6381–ON.

In the present Message C, the routing indicator UACZZ has been registered in the register relays of the ZWL register unit 6300 and the same routing indicator is, at the present time, temporarily stored in the register relays of the ZWL camparator unit 6500. Therefore, with respect to the first character U, the relays R6330–1A, 1B and 1C are operated and the relays R6510–1A, 1B and 1C are operated. When the wiper 6344 engages the contact 1, a circuit will be completed for operating the magnet M6341 which may be traced from battery, winding of the magnet M6341, contacts 6342 and 6445, wiper 6344 and the engaged contact 1, contact 6333, conductor C6381–1 extending to Fig. 65, contacts 6511, conductor C6381COM extending to Fig. 64, contacts 6446 and 6432, to ground. The magnet operates over this circuit and immediately restores as soon as the operating circuit is interrupted at its contacts 6342. Thus, the wiper 6344 is now stepped into engagement with the contacts 2 and 3 where similar circuits are completed through corresponding contacts on the operated relays R6320–1B and R6510–1B and operated relays R6320–1C and R6510–1C. As the wiper 6344 is advanced step-by-step over the remaining contacts in the associated contact banks, it will engage contacts terminating conductors extending through break contacts on the unoperated relays R6330–1D and R6330–1E and corresponding break contacts on the relays R6510–1D and R6510–1E. In other words, as long as the register relays in the ZWL register unit 6300 and the register relays in the ZWL comparator unit 6500 register the same routing indicator, the magnet M6341 will continue to operate and restore and advance its wiper 6344 step-by-step over the contacts in the associated contact bank. Each time the magnet operates it completes, at its contacts 6343, the circuit for the ON relay R6595 and the latter relay, due to its slow-to-release characteristics, remains operated during the stepping of the wiper 6344.

When the wiper 6344 advances into engagement with its home contact position, the off-normal contacts ON6345 are closed and the off-normal contacts ON6346 and ON6347 are open. At the contacts ON6345, ground potential is now extended by way of the contacts 6354, conductor C6381REL extending to Fig. 65 in order to operate the REL relay R6590 in the ZWL comparator unit 6500.

In the present Message C, only the ZWL register unit has been utilized and the remaining three ZWL register units 6302 to 6304 remain in their restored positions. Therefore, when the rotary stepping action of the wiper 6344 under control of the magnet M6341 is terminated, the contacts 6343 remains open to remove ground potential from the conductor C6381-ON in order to restore the ON relay R6395 in the ZWL comparator unit 6500. Since the wiper 6344 has completed a full stepping cycle the REL relay R6590 will be operated before the relay R6595 restores to normal.

It may be well to mention at this time, however, that if other routing indicators are registered in the second, third and fourth ZWL register units 6302 to 6304, the same test, described above, by the wipers, such as 6344, and the magnets, such as M6341, will be made in each of the other units. The contacts of the remaining three units, as previously noted, are connected respectively to the second vertical row of make-break contacts, such as 6513 and 6513; the third vertical row of contacts, such as 6515 and 6516, and the fourth vertical row of contacts, such as 6517 and 6518, controlled by the five sets of relays corresponding to the relays R6510–1A to 1E, inclusive. Therefore, the last three units 6302 to 6304, inclusive, are simultaneously tested to make the comparison between the routing indicator UACZZ registered in the ZWL comparator unit 6500 with the routing indicator registered in the four ZWL register units. Inasmuch as a successful comparison has been made between the first ZWL register unit 6300 and the ZWL comparator unit 6500, the remaining ZWL register units cannot be successfully compared since different routing indicators would normally be registered in the last-mentioned units. With this arrangement in mind, it is apparent that the magnets, such as M6341, provided in the second, third, and fourth ZWL register units will stop stepping their associated wipers before they complete the full cycle of 25 successive steps. In any event the termination of stepping operation of each of the wipers, such as 6344, under control of the associated magnets, such as M6341, will remove the ground potential from the conductor C6381-ON and thereby permit the relay R6595 to restore to normal.

As soon as the relay R6595 restores to normal and closes its contacts 6596, the ground potential at the contacts 6648 on the operated start relay R6640 is extended by way of the contacts 6596, 6591 and 6571', conductor C3603MCR extending to Fig. 36 in order to operate the disconnect relay R3680 in the address detector 3300. This relay, as previously described, will restore the release relay R3690 and the latter relay will restore the address receive relay R3540 as well as the operated relays in the processing routing register 3700. Thus, the routing indicator UACZZ stored in the registers 3701 to 3705, inclusive, will be discarded.

The discarding of the routing indicator UACZZ from the processing routing register 3700 has been accomplished by the successful comparison of the routing indicator stored in the ZWL comparator unit 6500 with the routing indicator stored in one of the ZWL register units. If the successful comparison is not made, as described previously, the REL relay R6590 will not be operated prior to the restoration of relay R6595. With the relay R6590 in its restored position, the ground potential at the contacts 6648 will be extended by way of the contacts 6596 and 6592, and the winding of the PRO relay R6580, to battery. The relay R6580 will then operate and extend the ground potential at the contact 6648 by way of the contacts 6581 and 6578, conductor C4279PRO extending to Fig. 42 in order to operate the process relay R4250 in the sequence control unit 4100. Also, the routing indicator UACZZ stored in the processing routing register 3700 will not be discarded in response to this condition. The process relay R4250 will instead control the multiple call equipment to process the routing indicator UACZZ, in the manner described previously in connection with the processing of the message in the relay switching center UAC.

Referring again to the address received relay R3540 in the address detector 3300, which restores to normal at the same time the routing indicator UACZZ is discarded by the restoration of the processing routing register 3700, it is noted that, at its contacts 3541, it removes ground potential from the conductor C3492AR4 extending to Fig. 44 thereby to restore the relay R4470. At its contacts 4473, the relay R4470 completes the circuit for again starting the tape reader 1420 to continue to read the associated tape. Also, at its contacts 4475, the relay R4470 removes ground potential from the circuit including conductor C2982PR2 extending to Fig. 29, contacts 3148, and conductor C2985COMP extending to Fig. 65 in order to restore the relay R6570. At its contacts 6571, the relay R6570 interrupts the circuits for the relays R6560 and R6565 thereby to disconnect the five sets of registers in the ZWL comparator unit 6500 from the 25 conductors C4161–1A to 5E, inclusive. Also, at the contacts 6572, the relay R6570 removes ground potential from the conductor C4496TR1 extending to Fig. 44 and then from the conductor C4995TR1 extending to Fig. 38 thereby to restore the transfer 1 and 2 relays R3810 and R3730. The last-mentioned relays disconnect the registers 3701 to 3705, inclusive, from the corresponding registers in the ZWL comparator unit 6500.

When all of the register relays in the ZWL comparator unit 6500 have restored to normal, ground potential at the make contacts, such as 6519, is removed from the winding of the start relay R6640 which restores to normal and from the conductor C6381ST extending to Fig. 65 in order to restore the start relay R6440 in the ZWL register unit 6300, as well as any of the start relays provided in the second, third and fourth ZWL register units 6302 to 6304, inclusive. The restoration of the start relay R6640 controls the magnet M6625 and the relay R6650 in the manner previously described, whereby, the wipers 6628 to 6633, inclusive, are advanced step-by-step from the contacts 1 to the illustrated home contact positions. It should also be noted, however, that at the contact 6648, the relay R6640 removes the ground potential from the previously described circuit including the conductor C3603MCR extending to Fig. 36 in order to restore the disconnect relay R3680 to again prepare the address detector 3300 and the processing routing register 3700 to respond to the next routing indicator read by the tape reader 1420.

Referring to the start relay R6440 in the ZWL register unit 6300, it will be seen that when this relay restores to normal, at its contacts 6442, it interrupts the circuit for the relay R6450 thereby to restore the latter relay. At its contacts 6443, the start relay R6440 will complete a circuit including the off-normal contacts 6347, contacts 6342 and the magnet M6341, whereby, the magnet will be self-interruptedly operated to advance its wipers to the illustrated home contact position if they have not been previously advanced to this position during the comparison test described above. At the contacts 6446, the start relay R6440 removes ground potential from the conductor C6381COM to prepare the circuits for making the comparison test of the next routing indicator registered in the ZWL comparator unit 6500.

As soon as the relay R6450 restores to normal, it disconnects, at its contacts 6454, ground potential from the conductor C6381REL extending to Fig. 65 in order to restore the REL relay R6590. At the present time the ZWL comparator unit 6500 has fully restored to normal; the routing indicator UACZZ remains stored in the ZWL register unit 6300; the magnet M6341 and its wiper 6344 are in condition to again test the associated bank contacts to compare the next routing indicator subsequently registered in the ZWL comparator unit 6500; the relays R6410, 6420 and 6430 remain operated; and the relays R6440 and R6450 are in their restored positions.

The next routing indicator sensed by the tape reader 1420 is the routing indicator JWCX appearing in line 6 of Message C. This routing indicator is now registered in the registers 3701 to 3704, inclusive, in the processing routing register 3700; the address received relay R3540 is again operated to control the operation of the relay R4470 and thus stop the reading of the tape by the tape reader 1420; and ground potential at the contacts 4475 is extended by way of the conductor C2982PR2 to Fig. 29 and then to the conductor C2985COMP in order to re-operate the relay R6570 in the ZWL comparator unit 6500. The operation of the last-mentioned relay again controls the transfer relays R3810 and R3730 in the processing routing register 3700 in order to transfer the routing indicator JWCX from the register in that unit to the registers in the ZWL comparator unit 7500. It should be noted, however, that inasmuch as only four characters are included in the routing indicator JWCX, the register 3705 is not operated. Therefore, a ground potential at the contacts 3857 is extended by way of the contacts 3844', conductor C3772-4C extending to Fig. 63 in order to operate the relay R6305 (which is of no importance at this time) and, in multiple therewith, to operate the relay R6505. The last-mentioned relay, at its contacts 6506, disconnects the relay R6565 from the circuit controlled by the contacts 6571. At this time the relay R6560 will connect-up the first four registers in the ZWL comparator unit 6500 to the first four registers 3701 to 3704 in the processing routing register 3700.

As soon as the foregoing transfer is completed, the operated register relays in the ZWL comparator unit 6500 will again complete the previously described start circuits for the relays R6640 and R6440. The last-mentioned relay is operated in multiple with the corresponding start relays in the remaining three ZWL register units 6301 to 6304, inclusive. The test is now started for comparing the characters JWCX registered in the ZWL comparator unit 6500 with the characters UACZZ registered in the ZWL register unit 6300. As previously noted, the remaining ZWL register units have not been operated.

The registration of the letter J in the first register of the ZWL comparator unit 6500 causes the operation of the relays R6510-1A, 1B and 1D. The registration of the character U in the first register of the ZWL register unit 6300 has operated the relays R6330-1A, 1B and 1C. Therefore, as the wiper 6344 advances over its first and second contacts, the previously described circuit for controlling the magnet M6341 will be completed through contacts on the operated relays R6330-1A, R6510-1A, R6330-1B and R6510-1B. When the wiper engages contact 3, however, the circuit will include the conductor C6381-3 extending to Fig. 65 inasmuch as the relay R6330-1C is operated but this conductor is connected to the make contact on the restored relay R6510-1C in the ZWL comparator unit 6500. Since a comparison is not made in this position of the wiper 6344, the magnet M6341 cannot be operated. Therefore, the wiper remains in engagement with the contact 3. At its contacts 6343, the magnet M6341 now opens the circuit including the contact 6452 and the conductor C6381-ON extending to Fig. 65 thereby to restore the relay R6595. It is noted that no circuit has been completed for operating the REL relay R6590. As soon as the relay R6595 restores to normal, ground potential, at the contacts 6648, is extended by way of the contacts 6596 and 6592, in order to operate the PRO relay R6580. Operation of the last-mentioned relay extends the ground potential at the contacts 6648 over a circuit including the contacts 6581 and 6578, to the conductor C4279PRO extending to Fig. 42 thereby to operate the process relay R4250. Operation of the process relay will control the multiple call equipment in the manner previously described, whereby, the routing indicator JWCX now stored in the processing routing register 3700 is processed so that a channel relay unit, such as 7900, will be connected to a cross-office unit, such as X3400, which is connected to the outgoing line extending in the direction of the tributary station JWCX.

The manner in which routing indicators, such as JWCX, are processed in the multiple call equipment has been previously described under the heading "Transferring the routing indicator registered in the register 3700 to the tape storage unit 5502" and the following headings.

When the particular routing indicator JWCX has been processed in the manner indicated above, the address receive relay R4540 in the address detector 3300 will be restored and will thereby interrupt, at its contacts 3541, the previously described circuit for the relay R4470. The latter relay, at its contacts 4473, again completes the circuit for controlling the tape reader 1420 to start reading the associated tape and, at its contacts 4475, it again removes ground potential from the conductor C2982PR2 extending to Fig. 29 so that the relay R6570 restores to normal to condition the ZWL comparator unit 6500 to register the next routing indicator.

The next two routing indicators JKXY and UKAY appearing in line 6 in Message C will each be compared, in the manner previously described, with the UACZZ routing indicator registered in the ZWL register unit 6300. The comparison cannot be completed and, therefore, the operations are again performed which have been described above in connection with the comparison made between the JWCX and UACZZ routing indicators. Each of the routing indicators JKXY and UKAY registered in the processing routing register 3700 will therefore be processed by the multiple call equipment in the same manner as the routing indicator JWCX is processed.

Referring now to the prosign sensing group 2901, it will be seen that when the "figures shift" character function appearing in line 6 of Message C is sensed by the tape reader 1420, it will operate the relays R2910A, B, D and E. At the contacts 2916, 2924, 2933, 2941 and 2943, a circuit including the "figures shift" conductor; conductor C2982RIL2 extending to Fig. 44, and contacts 4434 is completed for operating the process complete relay R4410. The relay R4410 immediately locks itself over a circuit including its right-hand winding and contacts 4413, to the grounded conductor C1388SU-5. Also, at its contacts 4411 and 4416, it interrupts the circuit including the conductor C1788C1 and C1788C2 thereby to again stop the tape reader 1420 from reading the associated tape. Also, at its contacts 4418, the relay R4410 applies ground potential to the conductor C4498ST extending to Fig. 52 in order to operate the start relay R5210 in the precedence transmission unit 5200. Finally, at its contacts 4417, the relay R4410 applies ground potential to the conductor C4497PR extending to Fig. 71 in order to operate the precedence relay R7250 (Fig. 71).

The operations of the start relay R5210 in the precedence transmission unit 5200 and the precedence relay R7250 in the precedence detector 7100 have been previously described. The detailed operations controlled by the sensing of the "figures shift" character function have been previously described under the heading "Sensing the 'figures shift' character function following the last routing indicator appearing on the message stored in the multiple call storage unit" and the following headings.

After the multiple call equipment in the relay switching center JWC has processed the multiple call message for transmission over the outgoing lines extending in the direction of the tributary stations JWCX, JKXY and UKAY, it being understood that the tributary station routing indicator UACZZ has not been processed, the seal-up relay R1310 (Fig. 13) in the miscellaneous control unit 1000 will be restored to normal to remove certain holding ground potentials from various seal-up conductors, whereby, the multiple call equipment will be restored to normal. It should be noted that at the contacts 1318, the restoration of the seal-up relay R1310 removes ground potential from the conductor C2984DSU extending to Fig. 32 in order to restore any of the relays in the prosign detector 3100 that are locked to this conductor. It should also be noted that at the contacts 1315, the relay R1310 removes ground potential from the circuit including conductor C1387SU–4 extending to Fig. 65, contacts 6572' and conductor C6381SU–2 extending to Fig. 63 thereby to restore the release relay R6320 in the ZWL register unit 6300 and the corresponding relays in any of the remaining ZWL register units. The restoration of the relay R6320 removes the holding ground potentials from the operated register relays, such as 6330–1A to 1E, inclusive, so that all of these relays restore to normal; and, at its contacts 6326, the relay R6320 removes the holding ground potential from the circuit for relays R6410 and R6420 to restore these relays to normal. All of the multiple call equipment at the relay switching center JWC has now restored to normal and three different messages will be transmitted over outgoing lines extending in the direction of the tributary stations JWCX, JKXY and UKAY.

The message transmitted from the relay switching center JWC over the outgoing line DCB to the tributary station JWCX will be referred to as Message C1 and will appear as follows:

(1) XZXZXZX
(2) DCB (figures) 990 (letters)
(3) NMNM JWCX
(4) EAC (figures) 003 (letters)
(5) NMNM JWC ZVA ZWL UACZZ
(6) ABC (figures) 014 (letters)
(7) NMNM UAC ZVA
(8) NMNM UACZZ JWCX JKXY UKAY (figures) 444
(9) Body of message
(10) 26
(11) 0145
(12) 0150
(13) 0155
(14) (figures) , , , , , , , (letters)

The message transmitted from the relay switching center JWC over the outgoing line DCA toward the tributary station JKXY by way of the relay switching centers BKE, BLF and JKX will be referred to as Message C2 and will appear as follows:

(1) XZXZXZX
(2) DCA (figures) 005 (letters)
(3) NMNM JKXY
(4) EAC (figures) 003 (letters)
(5) NMNM JWC ZVA ZWL UACZZ
(6) ABC (figures) 014 (letters)
(7) NMNM UAC ZVA
(8) NMNM UACZZ JWCX JKXY UKAY (figures) 444
(9) Body of message
(10) 26
(11) 0145
(12) 0150
(13) 0153
(14) (figures) , , , , , , , (letters)

The message that is transmitted from the relay switching center JWC over the outgoing line DCC toward the tributary station UKAY by way of the relay switching centers JWW, BKP and UKA will be referred to as Message C3 and will appear as follows:

(1) XZXZXZX
(2) DCC (figures) 052 (letters)
(3) NMNM UKAY
(4) EAC (figures) 003 (letters)
(5) NMNM JWC ZVA ZWL UACZZ
(6) ABC (figures) 014 (letters)
(7) NMNM UAC ZVA
(8) NMNM UACZZ JWCX JKXY UKAY (figures) 444
(9) Body of message
(10) 26
(11) 0145
(12) 0150
(13) 0159
(14) (figures) , , , , , , , (letters)

In view of the foregoing, it will be seen that the single message which was received at the relay switching center JWC was processed by the multiple call equipment as a ZWL message in which the tributary station routing indicator UACZZ is disregarded and in which three separate messages in three separate directions are transmitted in the direction of the three tributary stations JWCX, JKXY and UKAY. It may be well to mention that when the messages are received at the relay switching centers BKE and JWW over their respective interconnecting lines DCA and DCC the switching equipment at these relay switching centers will respond to the information appearing in lines 1, 2 and 3 of the messages. When the information appearing in line 3 of the message is read by the tape readers at each of the centers, it will cause the apparatus thereat to handle the message as a single address message and will not call into use the multiple call equipment. In other words, the message in being handled as a single address message will be processed in the same manner as is disclosed and described in the previously noted Stiles application. The same operations will be performed in each of the relay switching centers BLF and JKX to finally route the message to the tributary station JKXY and they will also be performed at the relay switching centers BKP and UKA to route the message to the tributary station UKAY.

*Sensing and detecting a network prosign UUU, BBB or JJJ*

In the previous description beginning with the heading "Receiving the multiple call message at the relay switching center JWC" and the following headings, it was pointed out that the multiple call Message C was processed as a ZWL message. In other words, as is indicated in line 3 of Message C, the multiple call indicator ZVA is followed by the prosign ZWL indicating that the switching center JWC need not process any of the routing indicators appearing immediately after the ZWL prosign. This ZWL prosign is automatically placed on the message as part of the pilot heading information by the multiple call equipment provided at the relay switching center UAC and is utilized when the equipment determines that it is advisable to instruct a subsequent relay switching center not to process one or more (a maximum of 4 in the present system) of the tributary station routing indicators appearing immediately after the ZWL prosign. Therefore, when the routing indicators appearing in line 6 of Message C are analyzed by the multiple call equipment in the relay switching center JWC only those routing indicators not appearing in line 3 of the message will be processed and retransmitted.

However, in making the pilot heading information for the message transmitted to the relay switching center JWC, the multiple call equipment in the relay switching center UAC may find that a network prosign may be substituted for the ZWL prosign in line 3 of Message C, in which case no routing indicator will appear immediately thereafter. The network prosign may be either the three characters UUU, BBB or JJJ. If the UUU network prosign appears after the multiple call indicator ZVA in line 3 of Message C, the multiple call equipment at the relay switching center JWC will only process the routing indicators appearing in line 6 of the message that have the first letter U. Any routing indicators having the first letter B or J will not be processed. The same results will occur in the event that the network prosigns BBB or JJJ are utilized and they will respectively control the multiple call equipment to process routing indicators appearing in line 6 of the message that have respectively the first letter B or J.

Under the heading "Operation of the prosign sensing unit 2900 and the prosign detector 3100" a description was given of the operation of the UUU detector 3102, the BBB detector 3103, and the JJJ detector 3104 in the event that any one of the corresponding network prosigns appears after the multiple call indicator ZVA in line 3 of Message C. For example, when the network prosign UUU is sensed by the prosign sensing group 2901, it results in the operation of the relays R3170 and R3180 in the UUU detector 3102 and in the operation of the detection complete relay R3145. The relays R3180 and R3145 lock in their operated positions to the grounded conductor C2984DSU extending to Fig. 13. Also, the relay R3170, at its contact 3175, connects the ground potential at the contacts 2968 on the operated ZVA relay R2960 to the conductor C2982RLS2 extending to Fig. 44 in order to operate the RLS relay R4460. The operation of relay R4460 at this time performs the same controls as has been previously described in connection with the registration of the ZWL indicator by the relay R3135. It is noted, however, that the RLS relay R4460 is operated over the conductor C2982RLS2 instead of over the conductor C2982RLS1. Therefore, the store relay R4450 is not operated when a network prosign, such as UUU, is registered in the prosign detector 3100. At the contacts 4463, the relay R4460 removes the holding ground potential from the conductor C2982SUZ extending to Fig. 29 in order to release the ZVA relay R2960 which now restores to normal. Also, the RLS relay R4460, at its contacts 4462, interrupts the circuit for controlling the tape reader 1420 to stop reading of the associated tape, but as soon as the ZVA relay R2960 restores to normal and interrupts its contacts 2968, ground potential is removed from the conductor C2982RIL in order to restore the RLS relay R4460. This restarts the tape reader 1420 in the usual manner so that the information appearing in lines 4, 5 and 6 of Message C will be read in the manner previously described.

As the tape reader 1420 senses the information appearing in line 5 of Message C, the deferred precedence indicator NMNM will again be registered in the precedence detector 7100; the routing indicator UAC will be registered in the processing routing register 3700 and the multiple call prosign ZVA will cause the operation of the ZVA relay R2960 all in the manner previously described.

Since the network prosign UUU is now registered in the UUU detector 3102 by the operated condition of the relays R3180 and R3145, the equipment will be controlled to process the routing indicator UACZZ of line 6 of Message C. It should be understood, however, that this routing indicator is being used at the present time merely as an example in order to illustrate the operation of the equipment in the relay switching center JWC when the network prosign UUU is registered. Actually, as has been previously described, the routing indicator UACZZ has been processed and routed directly to the tributary station UACZZ from the relay switching center UAC.

When the routing indicator UACZZ is registered in the processing routing register 3700 in the usual manner, the address receive relay R3540 will again operate and in turn cause the operation of the relay R4470 (Fig. 44). The relay R4470 stops the tape reader 1420 by opening its contacts 4473 and, at its contacts 4476, it completes the operating circuit for the RIL relay R4440 from the conductor C2982AR6 which has been grounded by the contacts 2968, on the reoperated ZVA relay R2960. Also, at the contacts 4475, the relay R4470 applies ground potential to the conductor C2982PRI extending to Fig. 29 and then by way of the contacts 2962 and 3148, conductor C2985COMP extending to Fig. 65 in order to operate the relay R6570. It should be noted, that the ZWL register unit 6300, as well as the remaining three ZWL register units 6302 to 6304 remain in their restored position because the prosign ZWL has not been used.

As soon as the relay R6570 operates it completes, at its contacts 6571, the previously described circuits for operating the relays R6560 and R6565 in order to connect the five sets of register relays corresponding to the relays R6510–1A to 1E, inclusive, to the five sets of registers 3701 to 3705, inclusive, in the processing routing register 3700. As a further result of the operation of the relay R6570, at its contacts 6572, it applies ground potential to the conductor C4496TR1 extending to Fig. 44 and then by way of the conductor C4495TR1 extending to Fig. 38 in order to operate the transfer 1 and 2 relays R3810 and R3730. When the last-mentioned relays are operated, the routing indicator UACZZ registered in the registers 3701 to 3705, inclusive, are transferred to and registered in the corresponding register relays in the ZWL comparator unit 6500. Incident to the operation of the register relays in the ZWL comparator unit 6500, ground potential at the contacts, such as 6519, on the operated ones of the registered relays complete the previously described circuits for operating the start relay R6640. No control, however, is completed for operating the start relay R6550 in the ZWL register unit 6300 due to the fact that the last-mentioned unit is not used in connection with the registration of a network prosign, such as UUU.

Returning again to the UUU register relay R3180, it will be noted that, at its contacts 3181, it completes a circuit including the conductor C2985U extending to Fig. 66 in order to operate the relay R6610U. The latter relay, at its contacts 6623, completes the operating circuit for the UBJ, relay R6575 and, at its contacts 6620, 6621 and 6622, it prepares points in the circuit for controlling the magnet M6625.

The start relay R6640 upon operating completes, at its contacts 6641, an operating circuit for the magnet M6625 which may be traced from battery, winding of the magnet M6625, contacts 6626, 6641, 6651 and ON6646, to ground. The magnet M6625 operates and then immediately restores under control of its contacts 6626 to advance its wipers 6628 to 6633 one step in a counter-clockwise direction from the illustrated home contact position into engagement with the contacts 1. The off-normal contacts ON6646 are now opened to prevent reoperation of the magnet M6625 and the contacts ON6647 are closed to complete the operating circuit for the control relay R6650. The latter relay, at its contacts 6654 locks itself to ground at the contacts 6644. It should be noted that before the relay R6650 operates to open its contact 6655, the ground potential at the contacts 6648 on the operated start relay R6640 is extended by way of the contacts 6655 to operate the relay R6695. The last-mentioned circuit is opened as soon as the control relay R6650 operates but due to the slow-to-release characteristics of relay R6595, it remains in its operated position for a short period of time.

The wipers 6628, to 6633, inclusive, will now be advanced step-by-step to determine whether or not the first character of the routing indicator registered in the ZWL comparator unit 6500 corresponds to the letters comprising the prosign UUU. In other words, the operation of the relay R6610U and the registration of the first character U of a routing indicator in the register comprising the relays R6510–1A to 1E, inclusive, should automatically control the magnet M6625 to complete a cycle of rotation of its associated wipers. The U character registered in the ZWL comparator unit 6500 has caused the operation of the relays R6510–1A, 1B and 1C. Therefore, ground potential at the contacts 6576 on the operated relay R6575 is now extended through the make contact, such as 6511, on the operated relays R6510–1A, 1B and 1C to the contacts 1, 2 and 3 accessible to the wiper 6631. The wiper 6631 is now in engagement with the contact 1 so that the ground potential is further extended by way of the contacts 6622, 6642 and 6626 to the winding of the magnet M6625 which now operates and restores to advance its wipers into engagement with the contacts 2. The wiper 6631 in engagement with the contacts 2 and 3 will again complete the above mentioned circuit for the magnet M6625 so that the wipers 6628 to 6633 are advanced into engagement with the contacts 4. When this contact position is engaged by the wiper 6628, ground potential at the contacts 6621 is now extended by way of the wiper 6628, contacts 6620, 6642, 6626 and the magnet M6625, to battery. The magnet M6625 is now self-interruptedly operated as the wiper 6628 engages the remaining contacts in the associated contact bank so that all of the wipers are advanced step-by-step in the counter-clockwise direction back to the illustrated home contact position. When this occurs, the circuit for stepping the magnet M6625 is terminated. Also, when the wipers are returned to the illustrated home contact positions, the off-normal contacts ON6645 and ON6647 are opened and the contacts ON6646 are closed. At the contacts ON6646, ground potential is now extended by way of the contacts 6652 in order to operate the release relay R6690. It should be noted that the stepping action of the magnet M6625 is substantially continuous and that upon each operation, a circuit is completed by way of the contacts 6627 and 6653 for retaining the relay R6595 in its operated position. However, when the stepping action of the magnet M6625 is terminated, the above mentioned circuit is opened and the relay R6595 slowly restores to normal. As soon as the relay R6595 restores it completes, at its contacts 6596, a circuit including ground, contacts 6648, 6596, 6591 and 6577, conductor C4279PRO extending to Fig. 42 in order to operate the process relay R4250. The operation of the process relay R4250, as previously described, controls the multiple call equipment to process the routing indicator registered in the processing routing register 3700.

Referring again to the ZWL comparator unit 6500, it should be noted that the wiper 6631 and the wiper 6628 in combination provide stepping circuits for the magnet M6625. When a U character is registered in the relays R6510–1A to 1E and the U relay R6610U is in its operated position, the contacts 6620, to 6622, inclusive, provides circuits for controlling the magnet M6625. The contacts 6622 through the associated wiper 6631, will complete the circuit for the magnet M6625 in the first, second and third steps of the wiper 6631 provided a U character is registered by the relays R6510–1A to 1E, inclusive. Thereafter, the contacts 6620 and 6621 will provide the stepping circuits for the magnet M6625 when the wiper 6628 is in engagement with the contacts 4, etc., in the associated contact bank. The same arrangement is provided between the wipers 6629 and 6632 when the B relay R6610B is operated and a B character is registered in the relays R6510–1A to 1E. Also, the wipers 6630 and 6633 in combination with the J relay R6610J will control the magnet M6625 provided a J character is registered in the relays R6510–1A to 1E.

If the U relay R6610U is operated in response to the sensing of a network prosign UUU and some other character is subsequently registered in the relays R6510–1A to 1E, inclusive, then the stepping circuit for the magnet M6625 will be opened before the associated wipers have made a complete revolution back to the home contact position. In the latter event, the off-normal contacts ON6645 and ON6647 will remain closed and the off-normal contacts ON5646 will remain opened. Furthermore, a circuit cannot be completed for the REL relay R6590 and the circuit for the relay R6595 is terminated when the magnet M6625 no longer intermittently applies ground potential, at its contacts 6627, to the circuit for the relay R6595. As soon as the latter relay restores to normal the ground at contacts 6648 is extended by way of the contacts 6596 and 6592 in order to operate the PRO relay R6580. The latter relay now extends the ground at contacts 6648 over a circuit including contacts 6581 and 6579, conductor C3603MCR extending to Fig. 36 in order to operate the disconnect relay R3680 in the address detector 3300 in the manner previously described. The operation of the disconnect relay R3680 releases the associated processing routing register 3700 to discard the routing indicator stored therein.

From the foregoing explanation it will be understood that when a network prosign UUU is registered in the prosign detector 3100 and a routing indicator having the first character U is subsequently registered in the processing routing register 3700 and in the relays R6510–1A to 1E, the ZWL comparator unit 6500 will be controlled to operate the process relay R4250. Operation of the relay R4250 will control the multiple call equipment to process the routing indicator stored in the processing routing register 3700. On the other hand, if some other routing indicator having a first character which does not correspond to the character U of the network prosign UUU, then the comparison cannot be made in the ZWL comparator unit 6500 and that routing indicator will be discarded from the processing routing register 3700 due to the operation of the disconnect relay R3680. It should also be understood that if either one of the remaining two network prosigns BBB or JJJ have been registered in the prosign detector 3100, then only routing indicators having the first character B or J will be processed, and any routing indicator having a first character that does not correspond to the characters in the network prosign will not be processed.

At the present time it has been assumed that the network prosign UUU has been registered in the prosign detector 3100 and that as a result thereof, the routing indicator UACZZ will be processed in response to the operation of the process relay R4250 in the manner described hereinbefore under the heading "Sensing the routing indicators identifying the tributary stations to which the present multiple call message must be transmitted" and in the following headings. However, as illustrated in line 6 of Message C, the routing indicator JWCX and JKXY will be discarded due to the fact that the first letter of these two tributary station routing indicators does not correspond to the U character of the network prosign UUU registered in the prosign detector 3100. The final routing indicator UKAY appearing in line 6 of Message C will, however, be processed in the same manner as the routing indicator UACZZ described above.

After the final routing indicator UKAY in line 6 of Message C has been processed, the "figures shift" character function will be sensed by the tape reader 1420, in the usual manner, and it will control the relays in the prosign sensing group 2901. The operation of the relays R2910A, B, D and E in accordance with the "figures shift" character function will complete the circuit including the contacts 2916, 2924, 2933, 2941 and 2948, the "figures shift" conductor, conductor C2982RIL2 extending to Fig. 44, contacts 4434 (the RS relay R4430 having been operated) and the left-hand winding of the process complete relay R4410, to battery. The operation of the process complete relay R4410 controls various circuits in the manner previously described to indicate that all of the routing indicators appearing in line 6 of Message C have been processed (or discarded if the first letters thereof do not correspond to the registered network prosign characters) and that the manufacture of the pilot heading instructions may be started.

After the different pilot heading instructions have been transmitted and the information appearing in lines 2 to 10, inclusive, of Message C has been transmitted to the connected channel relay units and associated cross-office units, in the manner previously described, the seal-up relay R1310 (Fig. 13) will restore to normal. The seal-up relay R1310 upon restoring, at its contacts 1318, removes ground potential from the conductor C2984DSU extending to Fig. 32 thereby to release the relay R3180 and the detection complete relay R3145 in the prosign detector 3100. Also, the restoration of the seal-up relay R1310 controls the relays of the remaining equipment utilized in connection with the multiple call message having the network prosign UUU in the same manner as has been described previously.

*Routing a stored multiple call message to intercept*

It will be recalled that a multiple call message, upon being received at a relay switching center, is first stored in the incoming line circuit X400 of Fig. 7B and it is then retransmitted by the retransmitter X360, through the cross-office selector X3300, to the reperforator 1410 in one of the multiple call storage units, such as 1400. After the entire message is stored in the latter unit, the incoming line circuit X400 and other apparatus illustrated in Figs. 7A and 7B are restored to normal.

In the multiple call storage unit 1400, the message is processed in the manner previously described. During the processing of the message, the multiple call storage unit 1400 is connected to the common multiple call processing equipment by the operated relays R1710 and R1720. As each routing indicator is processed it is stored on tape in the routing indicator tape storage device 5502 and channel relay units, such as 7900, are connected to cross-office units, such as X3400, which, in turn, are associated with outgoing lines corresponding to the associated channel relay units. After this operation is completed, the multiple call equipment will manufacture and transmit new pilot heading information to each of the cross-office units that have been selected. However, before the pilot heading information can be transmitted, the start relay R5210 in the precedence transmission unit 5200 must be operated. The latter relay cannot be operated until all of the necessary channel relay units, such as 7900, have been connected to associated cross-office units, such as X3400, and when this occurs, a shunting ground potential is removed from the conductor C5283CG thereby permitting the start relay R5210 to operate and start the transmission of pilot heading instructions to each of the connected channel relay units and their associated cross-office units.

If any trouble is encountered in the operation of the multiple call equipment while a message is being processed, the entire message stored on the tape 1413 in the multiple call storage unit 1400 is routed to an intercept operator position. The manner in which the message is routed to the intercept position depends upon the stage of operation in the processing of the message stored on the tape 1413. In other words, if the multiple call storage unit 1400 is connected to the common equipment under control of the relays R1710 and R1720 but the start relay R5210 has not been operated in the precedence transmission unit 5200, the message will be routed to intercept. If the multiple call storage unit 1400 has not been connected to the associated common equipment by the relays R1710 and R1720, the message will also be routed to intercept. If the start relay R5210 is in its operated position at the time the trouble occurs, a cancel transmission code signal will first be transmitted to each of the connected cross-office units, such as X3400, to cancel that portion of the message that has been stored in each of such units, and then the entire message stored on the tape 1413 is routed to the intercept operator position.

When trouble has occurred in the processing of the multiple call message, the intercept operator actuates the intercept key K1715 (Fig. 17) which completes a circuit, including the contacts 1711, for operating the intercept relay R1750 in multiple with the relay R1820, if the control relays R1710 and R1720 have not been operated to connect the common equipment to the multiple call storage unit 1400. The entire message will be routed to the intercept operator position in response to the operation of relays R1750 and R1820 in the manner to be described hereinafter.

The last-mentioned relays may also be operated under two different additional conditions. One of the last-mentioned conditions occurs in the event the common equipment has been associated with the multiple call storage unit 1400 and the relays R1710 and R1720 are operated. In the latter event, the actuation of the intercept key K1715 extends ground potential by way of the contacts 1712, conductor C1789CT3 extending to Fig. 52 and then by way of the contacts 5222 (assuming that the start relay R5210 and its slave relay R5220 are in their restored position) conductor C1789CT2 extending to Fig. 17 and contacts 1723 in order to operate the intercept relay R1750 in multiple with the relay R1820. The ground potential on the conductor C1789CT3 is also extended by way of the contacts 5222, conductor C1182CT2 extending to Fig. 11 in order to operate the cut relay R1140 in the miscellaneous control unit 1000 (Fig. 11). The operation of the latter relay at this time, at its contacts 1152, will prevent the precedence control circuit allotter 1001 from operating to associate the precedence control unit 900 with the multiple call storage unit 1400.

From the foregoing, it will be noted that the relays R1750 and R1820 in the multiple call storage unit 1400 are operated under a first condition if the multiple call storage unit 1400 has not been associated with the common equipment and they will also operate under a second condition if the multiple call storage unit 1400 is associated with the common equipment, but the common equipment has not as yet started to transmit the pilot heading information to the various connected cross-office units. The third condition controlled by the intercept key K1715 occurs if the start relay R5210 and its slave relay R5220 have been operated to indicate that the transmission of the pilot heading information has been initiated. Under the latter condition, it is necessary to first transmit the cancel transmission information to each of the connected cross-office units, such as X3400, before the relays R1750 and R1820 are operated to route the message to the intercept position.

When this condition exists, the operation of the intercept key K1715 applies ground potential by way of the contacts 1712, conductor C1789CT3 extending to Fig. 52, contacts 5221 on the operated slave relay R5220, conductor C1789CT1 extending to Fig. 17, contacts 1727 and the winding of the cancel transmission relay R1810, to battery. The relay R1810 now operates and locks, by way of its contacts 1814, to ground at contacts 1821. As a further result of the operation of relay R1810, at its contacts 1813, it completes a circuit including the contacts 1726 and 1774 for retaining the open line relay R1760 in its operated position and, in multiple therewith, it applies ground potential to the conductor C1787APC extending to Fig. 11 in order to operate the all-pilots-complete relay R1150. The operation of the last-mentioned relay and the controls exercised thereby have been previously described and its operation at the present time, as a result of an intercept control, simulates the operation of the multiple call equipment that occurs after the pilot heading information has been transmitted to each of the connected cross-office units, such as X3400. It should be understood, however, that the intercept key K1715 is operated before the all-pilots-complete sgnal is transmitted to the relay R1150 by the normal operation of the multiple call common equipment.

As a further result of the operation of relay R1810, at its contacts 1811, it applies ground potential to the conductor C1403CT2 extending to Fig. 14 in order to operate the motor start relay R1460 in the cancel transmission transmitter 1450. Also, at its contacts 1816, the relay R1810 connects ground by way of the upper winding of the relay R1840, contacts 1835 and 1816, conductor C1403CT1 extending to Fig. 14 and the resistor 1456, to battery, in the cancelled transmission transmitter 1450. The relay R1840 now operates and, at its contacts 1841 connects the upper winding of the relay R1850 to the above mentioned circuit by way of the lower winding of relay R1840. The relay R1850 now operates and locks itself in its operated position over a circuit including battery through its lower winding, contacts 1854, conductor C1403CT3 extending to Fig. 14, the "blank" cam contacts 1472, and the winding of the clutch magnet M1472, to ground, in the cancelled transmission transmitter 1450. As a further result of the operation of relay R1850, at its contacts 1853, it connects direct ground potential to the conductor C1403CT3 to prevent any other multiple call storage unit, such as 1400, from seizing the cancel transmission transmitter 1450.

Referring again to the relay R1810, it will be seen that as a further result of its operation, at its contacts 1817, it illuminates the cancelled transmission lockout lamp L1818; and, at its contacts 1815, it applies ground potential to the conductor C1805AUG extending to Fig. 79 in order to operate the transmission relay, such as relay R7960, in each of the channel relay units, such as 7900, that have been utilized in conjunction with the processing of the multiple call message, in order to establish transmission paths through each of the seized channel relay units. Finally, at its contacts 1812, the relay R1810 completes a circuit including the contacts 1851 for operating the relay R1830. The latter relay now locks itself in its operated position over a circuit including its contacts 1833 and ground at contacts 1812. As a further result of the operation of relay R1830, it opens its contacts 1835 in order now to restore the relay R1840 and it prepares, at its contacts 1834, a circuit for operating the relay R1750 in multiple with the relay R1820. The last-mentioned circuit controls the third condition under which the relays R1750 and R1820 may be operated to control the intercepting switch 1800 to route the message to an intercept operator position.

As a further result of the operation of relay R1830, it connects the cancelled transmission transmitter contacts 1480 to a circuit including the conductor C1403CT4 extending to Fig. 18, contacts 1832, the upper winding of the open line relay R1760, contacts 1732, 1721, conductor C1787SG2 extending to Fig. 11, and contacts 1154, conductor C1188SIG extending to Fig. 87, whereby, the relays R8710 to R8710–3 in the channel multiple unit 8700 will repeat the signals transmitted by the cancel transmission transmitter 1450 through each of the used channel relay units, such as 7900, to the cross-office reperforator, such as X3410, in each of the associated cross-office units and also to the monitor page printer 8750.

Referring now to the cancel transmission transmitter 1450 it should be noted that this transmitter is similar to the transmitter 1430 and that it is common to all of the multiple call storage units, such as 1400. Also, it should be understood that the cancel transmission transmitter 1450 is arranged so that it will control its contacts 1480 to transmit, over the above described circuit to all of the used channel relay units and associated cross-office units, the code signals corresponding to the words "CAN TRAN." In other words, when the cancel transmission transmitter 1450 is controlled in the manner described above, it will transmit the information noted above to each of the perforators in each of the used cross-office units, such as X3400, so that the latter units can clear whatever portion of the message is stored therein by transmitting the same over the associated outgoing line to the next relay switching center. At the end of the incomplete message, the "CAN TRAN" information appearing thereon will instruct the next switching center that whatever portion of the message that has been received thereat is cancelled and should be disregarded.

As soon as the start relay R1460 in the cancel transmission transmitter 1450 closes its contacts 1461, the motor 1455 is operated. The tape storage reel 1450 carries an endless perforated tape having the above information perforated thereon in code form. The coded information on the perforated tape will control the transmitting contact 1480 in the normal manner to transmit the information "CAN TRAN" over the above traced circuit to each of the used cross-office units, such as X3400. As soon as the foregoing information has been transmitted by the cancel transmission transmitter 1450, a "blank" character function, which is perforated on the tape carried on the reel 1470, is sensed and mechanically controls the contacts 1472 to interrupt the circuit including the clutch magnet M1471. Since this circuit includes, in series, the lower winding of the relay R1850, the latter relay now restores to normal and the clutch magnet M1471 restores to normal to terminate further transmission by the cancel transmission transmitter 1450.

The restoration of the relay R1850 removes ground potential from the conductor C1403CT1, at its contacts 1853, thereby to again render the cancel transmission transmitter 1450 selectable by any other multiple call storage unit, such as 1400. As a further result of the rstoration of relay R1850, at its contacts 1852, it now completes a circuit including the contacts 1834 for operating the relays R1750 and R1820. At this time the relay R1820, at its contacts 1821, interrupts the locking circuit for the relay R1810 thereby to restore the latter relay. The relay R1810 in turn, at its contacts 1812, interrupts the locking circuit for the relay R1830 which also restores to normal. The relay R1830 in restoring to normal, at its contacts 1834, interrupts the original operating circuit for the relay R1750 and R1820 but the latter relays are now locked in their operated positions over a circuit including the contacts 1752 and ground at contacts 1871 on the operated call common equipment relay R1870.

Referring again to the relay R1820 it will be noted that, at its contacts 1822, it interrupts a point in the circuit for the control relays R1710 and R1720, whereupon, the last-mentioned relay also restore to normal. The restoration of the relay R1720 interrupts, at its contacts 1722, the circuit including the start conductor C1787ST extending to Fig. 11 thereby to initiate the release of the common equipment which has been connected to the multiple call storage unit 1400, all in the manner previously described. Since the remaining controls exercised by the relays R1710 and R1720 upon their restoration have been described hereinbefore, they will not be repeated at this time.

The operations for routing the message stored on the tape 1430 to the intercept operator position will now be described. It should be remembered, however, that the relays R1750 and R1820 will be directly controlled by momentary operation of the intercept key K1715 in the event that transmission of the pilot heading information has not been started by relays R5210 and R5220 as described above.

Referring to the relay R1750, it will be seen that, at its contacts 1751, it retains the relay R1790 operated. As a further result of the operation of relay R1750, at its contacts 1754, it connects the lower winding of the relay R1740 to the wiper 1801 on the intercept switch 1800 and, at its contacts 1755, it completes a circuit including ground at the contacts 1742 and 1746 for operating the magnet M1846 on the intercept switch 1800. Therefore, the magnet will close its contacts 1847 to complete the circuit for the interrupter relay R1745 and the latter relay, at its contacts 1746, interrupts the circuit for the magnet M1846 which now restores to normal and advances its wipers one step in a counter-clockwise direction into engagement with the contacts 1 in the associated contact banks. This stepping action will continue until the wiper 1801 engages a contact having battery potential applied thereto for the purpose of operating the relay R1740.

At this time it should be noted that the conductor C1804BTL1 to 6, C1804-OGC1 to 6 and C1804SIG1 to 6 are connected respectively to six intercept cross-office units, such as the unit 8335 schematically illustrated in Fig. 83. The intercept cross-office units, such as 8335, are substantially the same as the cross-office unit X3400 schematically illustrated in Fig. 8, but they are provided at an intercept operator position where the tape produced by the reperforators, such as M8360, may be read by the operator who will take the necessary action to see to it that the intercepted message will be properly routed to the destinations indicated by the routing indicators therein.

For the purpose of this description, it will be assumed that when the wiper 1801 engages the contact 1 in the associated contact bank and that the corresponding intercept cross-office unit is idle. When this occurs, ground potential through the lower winding of the relay R1740 is extended by way of the contacts 1754, wiper 1801, conductor C1804BTL1 extending to Fig. 83 and the winding of the seizure relay R8355, to battery. The seizure relay R8355 operates in series with the relay R1740 and it completes a circuit (not shown) for conditioning the associated reperforator for subsequent operation.

As soon as the relay R1740 operates it interrupts, at its contacts 1742, the circuit for the magnet M1846 thereby to terminate further stepping of the wipers of the intercept switch 1800. Also, at its contacts 1741, the relay R1740 completes a circuit including ground, winding of the relay R1730, contacts 1741, upper winding of relay R1740, contacts 1754, wiper 1801, and battery potential applied to the conductor C1804BTL1. The relay R1730 now operates in multiple with the relay R1740 and, at its contacts 1735, completes a circuit including the contacts 1753, wiper 1802, conductor C1804-OGC1 extending to Fig. 83, in order to operate the relay R8340 and, in multiple therewith, the relay R8345.

As a further result of the operation of relay R1730, at its contacts 1734, it interconnects the conductors C1402TDC and C1402TDS extending to Fig. 14 in order to operate the magnet M1427 of the transmitter 1430, provided a slack tape condition exists between the tape reader 1420 and the transmitter 1430. In other words, the transmitter 1430 will now start to transmit the entire message appearing on the tape 1413.

As a further result of the operation of relay R1730, at its contacts 1733, it interconnects the conductor C1402TRC and the conductor C1402TRS extending to Fig. 14 thereby to control the magnet M1425 in the tape reader 1420, provided a slack tape condition exists between the reperforator 1410 and the tape reader 1420. Consequently, the tape reader 1420 will now continue to read the associated tape in the usual manner.

Finally, at its contacts 1732, the relay R1730, disconnects the signalling circuit including the upper winding of the relay R1760 from the signalling conductor C1787SG2 extending to the multiple call common equipment and, at its contacts 1731, it connects the signalling circuit by way of the wiper 1803 to the conductor C1804SIG1 extending to the intercept cross-office unit 8335. Therefore, all of the information appearing on the tape 1413, as fed through the transmitter 1430, will be transmitted over the signalling circuit to the reperforator M8360 in the intercept cross-office unit 8335. This signalling circuit may be traced from ground at the transmitter contacts, such as 1490, in the transmitter 1430, conductor C1402TD extending to Fig. 17, contacts 1772 and 1831, upper winding of the relay R1760, contacts 1731, wiper 1803, conductor C1804SIG1 extending to Fig. 83, contacts 8351, and the winding of the reperforator magnet M8360, to battery.

Attention is directed to the fact that in the above traced signalling circuit, the relay R1770 is in its operated position to close its contacts 1772. It should be noted that the relay R1770 is held under control of the relay R1790 in the manner previously described.

As the tape reader 1420 continues to read the tape of the message that is being routed to intercept by the transmitter 1430, the character counter 2030 functions in the previously described manner and when the end-of-message indicator is sensed by the tape reader, the end-of-message relay R1860 operates. Thereafter, the tape reader 1420 will continue to read "blank" tape in order again to control the character counter 2030 and after 72 blank characters have been counted sufficient blank tape is provided between the tape reader 1420 and the transmitter 1430 to feed the end-of-message indicator through the transmitter 1430. The end relay R1880 will subsequently operate and thereby cause the restoration of the call common equipment relay R1870 in the manner previously described.

The entire message, as it originally appeared on the tape 1413, has now been transmitted, by the transmitter 1430 to the reperforator magnet M8360 in the intercept cross-office unit 8335 in order to produce a perforated tape which contains the entire message for use by the intercept operator.

Incident to the restoration of the call common equipment relay R1870, as noted above, at its contacts 1871, it performs the previously described release controls and it also removes the locking ground from the circuits including the windings of the relays R1750 and R1820 thereby to restore the last-mentioned relays. The restoration of the relay R1750, at its contacts 1751, opens the locking circuit for the relay R1790 and the relay R1790, at its contacts 1792, opens the circuit for the relay R1770 which also restores to normal. As a further result of the restoration of relay R1750, at its contacts 1753, it interrupts the previously described circuit including the conductor C1804-OGC1 in order to release the relays R8340 and R8345 in the intercept cross-office unit 8335. Also, at its contacts 1754, the relay R1750 interrupts the circuit for the relays R1730 and R1740, which also restore to normal, and the seizure relay R8355 in the cross-office unit 8335 to restore the latter relay. Finally, at its contacts 1756, the relay R1750 completes a self-interrupting circuit for the magnet M1846, whereby the latter magnet advances the wipers 1801 to 1803 of the intercept switch 1800 to their illustrated home contact positions.

The self-interrupting circuit for the magnet M1846 may be traced from battery, winding of the magnet M1846, contacts 1756, off-normal contacts ON1849, and contacts 1848, to ground. Each time the magnet M1846 operates over this circuit it opens its contacts 1846 thereby causing the magnet to restore to normal to advance its wipers an additional step in a counter-clockwise direction. The stepping action of the wipers 1801 to 1803 under control of the magnet M1846 continues until the wipers reach the illustrated home contact position, at which time the off-normal contacts ON1849 are opened in order to interrupt the circuit for the magnet M1846.

Referring now to Fig. 83, it will be seen that the reperforator magnet M8360, which is the same as the magnet XM3411 on the cross-office unit X3400, produces a perforated tape containing the entire multiple call message as received at the multiple call storage unit 1400. The intercept operator may now analyze the tape and determine the destinations of the message as indicated by the different tributary station routing indicators. By means of the intercept manual forwarding unit 8365, the intercept operator may control the associated out-going selector 8370 to select the different outgoing lines extending from the present relay switching center and proceed to retransmit the multiple call message that has been routed to her position in the direction of the different destinations appearing on the associated tape.

From the foregoing description it will be understood that the intercept operator position includes at least six intercept cross-office units, such as 8335, and six associated intercept manual forwarding units, such as 8365. Each of the latter units is provided with an outgoing selector, such as 8370, having access to all of the lines outgoing at the illustrated relay switching center. It should also be understood that each of the above noted intercept cross-office units, such as 8335, is accessible by means of an intercept switch, such as 1800, to each of the multiple call storage units, such as 1400, provided at the relay switching center. In this manner, whenever the multiple call message received by a multiple call storage unit cannot be processed through the associated multiple call common equipment in the normal manner previously described, then the message will automatically be routed to an intercept cross-office unit, such as 8335, at the intercept position so that the operator thereat can take necessary action to forward the message to each of the destinations listed in the multiple call message.

The intercept cross-office units, such as 8335, are also accessible to the cross-office selector switches, such as 8300, provided in the relay switching center so that whenever a cross-office selector switch is unable to connect with an appropriatae cross-office unit, such as X3400, in processing a multiple call message, its wipers will automatically be controlled to connect with an intercept cross-office unit, such as 8335. In the latter event, the multiple call message processed through one of the channel relay units, such as 7900, that would normally go to an associated cross-office unit, such as X3400, through an associated cross-office selector switch, such as 8300, will instead be directed into one of the intercept cross-office units, such as 8335. Under this condition, however, the message produced on the tape by the reperforator M8360 in the intercept cross-office unit 8335 will include the pilot heading information as well as the original message in the normal manner. Therefore, the operator at the intercept position will be informed, by reading the message, that it is only necessary for her to see to it that the multiple call message received at her position is retransmitted to the particular outgoing line extending in the direction of the destinations identified by the particular routing indicator or routing indicators processed through the channel relay unit that was unable to connect with a cross-office unit, such as X3400.

*Routing a multiple call message to intercept when an unassigned routing indicator appears in the message*

As previously pointed out, the relay switching center is provided with as many channel relay units, such as 7900, as are necessary to handle the multiple call message traffic. These channel relay units may be selected one or more times during the processing of any one multiple call message depending upon the number of routing indicators in the message that must be transmitted over the particular outgoing lines corresponding respectively to the channel relay units. Each channel relay unit, such as 7900, in response to its first seizure is connected by way of its associated cross-office selector switch, such as 8300, to an available cross-office unit, such as X3400, and the outgoing selector, such as X4300, in the selected cross-office unit is connected to the particular outgoing line over which the message must be transmitted to ultimately reach the destination identified by the routing indicator being processed through the corresponding channel relay unit. If this same channel relay unit is selected two or more times in processing other routing indicators, the destinations identified by the two or more additional routing indicators will also be reached over the particular selected outgoing line. Under certain conditions, however, in preparing the original multiple call message, an unassigned routing indicator may be inadvertently included in the message. To take care of this condition, the relay switching center is provided with an additional channel relay unit which is assigned exclusively for intercept service and is therefore referred to as an intercept channel relay unit. In the present system, the intercept channel relay unit 7740 is schematically illustrated in Fig. 77 and it should be understood that it is exactly the same as the channel relay unit 7900 illustrated in Figs. 79 to 82, inclusive, except that the circuit for the test relay R7930 has been modified as illustrated in the intercept channel relay unit 7740.

In order more clearly to illustrate the connections of the various circuits in the intercept channel relay unit 7740, the same designations have been given as those appearing on the corresponding apparatus and connections in the channel relay unit 7900, except that the suffix INT, representing intercept, has been added to the corresponding designations.

It will be recalled that during the processing of the multiple call message stored in the multiple call storage unit 1400, the address detector 3300 is controlled in accordance with each of the routing indicators; each routing indicator is then independently stored in the processing routing register 3700; the routing indicator is then transferred from the last mentioned register to the routing translator X2900 where circuits are completed for controlling the channel converter unit 4500 all in the manner previously described. As long as the routing indicators registered in the processing routing register 3700 identify existing tributary stations or relay switching centers, the routing translator X2900, through its associated patch panel X3200, will select a relay in the channel converter unit 4500, such as the relay R4530C1, that corresponds to a particular channel relay unit, such as 7900, that must be used in connection with the processing of the particular routing indicator. However, if a routing indicator is registered in the processing routing register 3700 that does not correspond to an existing tributary station or relay switching center, a circuit will be completed for the intercept relay R4520 in the channel converter unit 4500.

Referring to the routing translator X2900, Figs. 3 to 6, inclusive, it will be seen that if the first three characters of either a four or five character routing indicator registered in the routing translator X2900 are acceptable characters a circuit is completed in the usual manner to ground the corresponding jack in the three character jack panel X3270. If the grounded jack corresponds to an unassigned relay switching center, it may be interconnected with one of the intercept jacks on the line jack panel X3220 by means of a patch cord, such as the patch cord 3231. Therefore, the ground potential, applied to the unassigned three character jack on the jack panel X3270, will be interconnected by means of the patch cord X3231 to the intercept jack on the line jack panel X3220 and extended therefrom by way of the contacts X3282, conductor XC3201–I interconnected with conductor C4592–I extending to Fig. 45 thereby to operate the intercept relay R4520. It should be noted that the relay R4510 will be operated to close its contacts 4511–I at this time. From the foregoing it will be understood that if an unassigned routing indicator is registered in the routing translator X2900, it will cause the operation of the intercept relay R4520 in the channel converter unit 4500.

It should also be noted that if the first three characters of a four or five character routing indicator correspond to an existing relay switching center, but the remaining characters of either the four or the five character routing indicator correspond to an unassigned tributary station in the designated relay switching center, the multiple call message will be routed in the normal way to the designated relay switching center. When the message is received at the designated switching center it will be routed to intercept as soon as a determination is made that the routing indicator is unassigned.

It also may be well to mentioned at this time that another condition under which the message will be routed to intercept occurs when the received multiple call message is one of the high precedence types and the outgoing line extending to certain of the destinations identified by one or more of the routing indicators has been shut down during the night hours. For this purpose there is provided in Fig. 6 a plurality of night intercept keys, such as the keys XK3291L1 to XK3291L100 corresponding respectively to each of, for example, 100 outgoing lines. If the outgoing line L1, for example, is closed down for night service, the key XK3291L1 is operated to close its contacts X3211 and X3212. Any patch cord interconnecting the jacks on the line jack panel X3220 corresponding to the L1 outgoing line and any jack on the 3, 4 or 5 character jack panels X3270, X3250 or X3260 will now extend ground potential (when selected by the routing translator X2900) by way of the contacts X3211, X3121, and X3282, conductor XC3201–I and C4592–I in order to operate the intercept relay R4520 in the channel converter unit 4500. The night intercept relay XR3120 will operate over a circuit which may be traced from battery, winding of relay XR3120, contacts X3212, contacts 28 on the connect key XK2905, conductor C7104NS extending to Fig. 71. In Fig. 71 this conductor may be grounded, at the contacts 7172, if the priority precedence PP is registered in the priority detector 7100PP; or at the contacts 7356 if the operational immediate precedence OPOP is registered in the detector 7100–OP; or at the contacts 7146 if the flash precedence is registered in the detector 7100FE; or at contacts 7156 if the emergency precedence is registered in the detector 7100FE. In other words, a high precedence message must be registered if the night intercept facilities are to become effective to route a message to the intercept operator position as described hereinafter.

From the foregoing description it will be understood that the routing translator X2900 will cause the operation of the intercept relay R4520 in the channel converter unit 4500 in the event an unassigned routing indicator identifying a non-existing relay switching center is registered; and it will also be operated in the event that a high precedence message of the operational immediate, priority, flash or emergency is registered in the precedence detector and the outgoing line over which the message is to be transmitted is shut down, for example, for the night hours.

As noted above, the intercept relay R4520 is operated in the event an unassigned routing indicator is registered in the processing routing register 3700 and in turn in the translator X2900. However, as pointed out in connection with a description of operation wherein an unassigned routing indicator is registered, it is necessary to interconnect all of the jacks representing unassigned routing indicators to the intercept jacks on the line jack panel X3320. If a great number of unassigned jacks are provided in the three character jack panel X3270, a corresponding number of patch cords must be provided to interconnect them to the intercept jacks on the line jack panel X3220. Therefore, it is advisable to avoid interconnecting the intercept jacks on the line jack panel X3220 with jacks corresponding to unassigned routing indicators and instead use such interconnections for routing indicators that identify existing relay switching centers that cannot be reached, due to some trouble, over the outgoing lines. In other words, the intercept jacks in the latter case would be used for only emergency purposes instead of ordinary operating conditions. In order to route unassigned routing indicators registered in the processing routing register 3700 to the intercept channel relay unit 7740 without utilizing patch cords between the jack panel X3270 and the intercept jacks on the line jack panel X3220, the circuits are arranged so that if the translator X2900 fails to operate one of the relays, such as R4530C1 to C25 in the channel converter unit 4500, the routing indicator will automatically be routed to the intercept channel relay unit 7740. In the present system this is accomplished under control of the test relay R4220 in the sequence control unit 4100. The relay R4220 is normally operated when the routing translator X2900 is connected and returns ground potential on the conductor C4291TEST. Normally, the routing translator X2900 will translate the routing indicator stored therein and causes the operation of one of the relays R4530C1 to C25 in the channel converter unit 4500. The operated one of the last-mentioned relay will, in turn, apply ground potential to the conductor C4352CON extending to Fig. 43 in order to operate the connect relays R4330 and R4340. The relay R4330 in turn, at its contacts 4338, removes ground potential from various circuits and, in particular, from the circuit that will operate the relay R4240. If the routing translator X2900 does not control the above circuits in the manner described within the restoring time of the slow-to-release delay relay R4230, the contact 4234 will be closed to complete a circuit from battery, winding of relay R4240, contacts 4234, 4226 and 4338, to ground. As soon as the relay R4240 operates it locks itself, at its contacts 4243, to the above traced circuit and, at its contacts 4242, it applies ground potential to the conductor C4278–IN2 extending to Fig. 45 in order to operate the intercept relay R4520. Therefore, the intercept relay R4520 is operated under a further condition in the event that the routing translator X2900 fails to return a translation to the channel converter unit 4500 within the predetermined elapsed time interval it takes for the delay relay R4230 to restore to normal.

Referring now to Fig. 45 it will be seen that as soon as the intercept relay R4520 operates, under any one of the conditions previously described, it immediately locks itself in its operated position over a circuit including its lower winding and its contacts 4524 to the grounded conductor C4401SU. Also, at its contacts 4522, the relay R4520 applies ground potential to the conductor C4352CON extending to Fig. 43 in order to operate the connect relays R4330 and R4340 associated with the line number storage control switch 4301. The contacts 4523–1 to 9, inclusive, on the intercept relay R4520 are strapped to the hundreds conductor C4352HR, the group of tens conductor C4352T1 to T5 and the group of units conductor C4352U1 to U5 to mark these conductors in accordance with an arbitrary three digit code identifying the intercept channel relay unit 7740. In the present example, it may be assumed that the above mentioned hundreds, tens and units conductors are marked, in code form, in accordance with the number 100. The conductors C4352HR, C4352T1 to T5 and C4352U1 to U5 extend to Fig. 43 where they are connected to the bank contacts accessible to the wipers 4312 to 4316 of the line number storage control switch 4301. Thus, the number 100 will be marked in the bank contacts of the last-mentioned switch.

As a further result of the operation of the intercept relay R4520, at its contacts 4521, it connects the grounded conductor C4582COM to the conductor C4581COM1-INT extending to Fig. 77. Referring first to Fig. 25 it will be seen that the conductor C4582COM is grounded at contacts 2514 on the operated relay R2510. The relay R2510 will be in its operated position at this time under control of one or more of the operated translator 1 common relays R2404A to E, in the multiple call translator 2100. The last-mentioned translator is operated in multiple with the translator X2900 under control of the operated relays in the processing routing register 3700. The ground potential on the conductor C4582COM is extended by way of the contacts 4521 to the conductor C4581COM1-INT extending to Fig. 77 where it terminates in the intercept channel relay unit 7740 in the same manner as the conductor C4581COM1 terminates in the channel relay unit 7900. Thus, the intercept channel relay unit 7740 is operated in the same manner as has been described previously in connection with the operation of the channel relay unit 7900. In response to the seizure of the intercept channel relay unit 7740, its start relay R7910-INT operates in the same manner as the start relay R7910 in the channel relay unit 7900.

Referring now to the start relay R7910-INT in the intercept channel relay unit 7740, it will be noted that as soon as this relay operates, it closes its contacts 7912-INT to prepare a point in the circuit including the contacts 7946-INT and the conductor C7871TG1-INT for operating the relay R7810. As a further result of the operation of the start relay R7910-INT, a circuit is completed which may be traced from ground, contacts 7947-INT, 7931-INT and 7913-INT conductor C7871CGS-INT and the winding of the start relay R7830, to battery. The latter relay now operates and, at its contacts 7833, completes an operating circuit for the relay R7865 which may be traced from ground, winding of relay R7865, contacts 7833, wiper 7853, conductor C7871TG-INT and the previously traced circuit for operating the relay R7810. The test relay R7865 operates in series with the relay R7810 and, at its contacts 7866, prevents operation of the magnet M7851. However, if the magnet M7851 has stepped the wipers from the home contact position, the above mentioned circuit cannot be completed until the wiper 7813 again engages its home contact position. Also, at its contacts 7867, the relay R7865 locks itself over a circuit which is independent of the contacts 7833, and finally, at its contacts 7868, it completes the operating circuit for the switching relay R7840. The latter relay closes its various contacts in order to prepare circuits for interconnecting the intercept channel relay unit 7740 to the conductors extending to the cross-office selector switch relay control unit 7500.

As soon as the relay R7810 operates, as noted above, it completes, at its contacts 7812, an obvious circuit for operating the relay R7820 whereby the latter relay now completes the circuits for interconnecting the intercept channel relay unit 7740 and the cross-office selector switch relay control unit 7500. Also, at its contacts 7812, ground potential is applied to the conductor C7871TG2-INT in order to operate the test relay R7930-INT whereby the latter relay, at its contacts 7831-INT interrupts the circuit for the start relay R7830 which now restores to normal if no other channel relay unit has grounded the conductor C7871CGS. As a further result of the operation of relay R7810, at its contacts 7811, it applies ground potential to the conductor C7581-INT3 extending to Fig. 76 in order to operate the intercept relay R7650 over a circuit including its right hand winding.

It may be well to mention at this time that under normal conditions of operation, when no intercept is involved, the start relay R7830, together with the test relay R7865, is operated by one or more of the channel relay units, such as 7900, and the magnet M7851 operates its wipers so that the channel relay unit selector 7850 will connect the channel relay units, one at a time, to the cross-office selector switch relay control unit 7500. However, when the intercept relays R7810 and R7820 and the start relay R7830 are operated under control of the intercept channel relay unit 7740, the wipers of the channel relay unit selector switch 7850 engage the home contact positions to connect the intercept channel relay unit 7740 with the cross-office selector switch relay control unit 7500.

Referring again to the switching relay R7840 it should be noted that at its contacts 7842', it applies ground potential to the conductor C3981Z2 extending to Fig. 39 in order to operate the start relay R3920 in the channel register 3900. The latter relay, at its contacts 3921, operates the test relays R3930 which immediately locks itself to the grounded conductor C3981Z2. As a further result of the operation of relay R7840, at its contacts 7845, it applies ground potential to the conductor C7581GDS1 extending to Fig. 75 in order to operate the seizure relay R7520 in the cross-office selector switch control unit 7500.

Furthermore, at its contacts 7841', the switching relay R7840 now extends ground potential by way of the contacts 7825, conductor C3981-INT extending to Fig. 40, contacts 4071 and the winding of the relay R4005, to battery. It should be understood that the contacts 4071 are closed at this time due to the fact that the connect relay R4070 has been operated by the test relay R3930. The relay R4005 in operating completes, at its contacts 4007, a circuit for operating the disconnect relay R3940. The relay R3940 in turn, at its contacts 3941, opens the circuit for the connect relay R4070 which now restores to normal. As soon as the contacts 4071 are open, the relay R4005 locks itself over a circuit including the contacts 4006, relay R4030 and ground on the conductor C3981Z2. Although the series relay R4030 in operating completes, at its contacts 4031, a circuit for operating the relay R4020, the latter relay performs no important controls in connection with the intercept feature being described.

Referring again to the disconnect relay R3940, it will be seen that, at its contacts 3942, it applies ground potential to the conductor C3983CSL extending to Fig. 75 in order to operate the start relay R7510. In addition to performing, all of the controls that have been previously described in connection with the operation of the cross-office selector switch relay control unit 7500, the start relay R7510 now completes a circuit including the contacts 7513, 7525', and 7653 for locking the intercept relay R7650 in its operated position.

The circuit operations controlled by the intercept relay R7650 will now be described. At its contacts 7652, the relay R7650 applies ground potential to the conductor C7401G4 extending to Fig. 74 and then by way of the contacts 7446 in order to operate the channel test relay R7450. It will be recalled that the last-mentioned relay is normally operated under control of one of the channel marking relays, such as R7410-1 to 39, inclusive. However, when interception is involved, the intercept relay R7650 operates the relay R7450 directly. The operation of the channel test relay R7450 prepares a channel testing switch 7470 to perform a testing cycle, whereby, the intercept channel relay unit 7740 is connected to one of the intercept cross-office units, such as 8335.

As a further result of the operation of relay R7650 at its contacts 7659, it extends ground potential by way of the contacts 7551 and 7531, conductor C7401TMM extending to Fig. 74, contacts 7459' and the winding of the magnet M7475, to battery, in order to operate the magnet. Also, at its contacts 7655, the relay R7650 connects the right-hand winding of the test relay R7550 by way of the conductor C7401B1 extending to Fig. 74 where it is multiply connected to the contacts 45 to 50, inclusive (X strap omitted), accessible to the wiper 7471 of the channel testing switch 7470.

At its contacts 7658, the relay R7650 disconnects ground potential from the previously described circuit including the conductor C6903PG extending to Fig. 69 thereby to prevent, at this time, reoperation of the precedence testing relays R6940 and R6950. At its contacts 7659', the relay R7650 connects ground potential by way of the contacts 7522, conductor C7581GR1 extending to Fig. 78, contacts 7847 and 7824, conductor C7872GR–INT in order to operate the relay R7720 associated with the intercept cross-office unit selector 7701. The operation of the last-mentioned relay prepares circuits, whereby, the intercept channel relay unit 7740 may be connected to one of the intercept cross-office units, such as 8335. At its contacts 7657, the intercept relay R7650 disconnects battrey potential from the circuit of the timing relay R7540 thereby to prevent the timing relay from operating at this time. The remaining contacts on the intercept relay R7650 merely prepare points in circuits that become effective hereinafter.

Referring now to the channel testing switch 7470, it will be seen that when the magnet M7475 operates, it immediately connects ground potential, at its contacts 7477, to the circuit including the contacts 7458, conductor C7401T–INT extending to Fig. 75, winding of the interrupter relay R7530, contacts 7527, conductor C7581PPL extending to Fig. 78, contacts 7843 and 7823, conductor C7872PPL–INT, contacts 7722 and the winding of the magnet M7710, to battery. The interrupter relay R7530 and the magnet M7710 operate over the above described circuit. The relay R7530, at its contacts 7531, interrupts the previously described circuit including the conductor C7401TMM in order now to restore the magnet M7475. The magnet M7475 upon restoring advances its wipers 7471 to 7474 one step in a counter-clockwise direction into engagement with the contacts 1. Also, at its contacts 7477, the magnet M7475 interrupts the previously described series circuit for the interrupter relay R7475 and the magnet M7710. Restoration of the magnet M7710 advances its wipers 7714 to 7717, one step in a counter-clockwise direction into engagement with the contacts 1. The above described self-interrupting stepping circuit for controlling the magnet M7475 and the magnet M7710 is repeated until the wipers controlled by the respective magnets have been advanced into engagement with the contacts 45 in the associated contact banks. At this point it should be noted that the contacts 45 to 50, inclusive, accessible to the wipers 7714 to 7717 of intercept cross-office unit selector 7701 are connected to six different intercept cross-office units, such as the unit 8335 illustrated in Fig. 83. Also, the contact positions 45 to 50 accessible to the wiper 7471 of the channel testing switch 7470 correspond respectively to the six intercept cross-office units, such as 8335.

Referring to Fig. 77, it should be noted that as soon as the magnet M7710 advances its wipers 7714 to 7717, inclusive, from their illustrated home contact positions into engagement with the contacts 1, the off-normal contacts ON7712 and ON7713 are closed and they remain closed until the wipers are again advanced into engagement with the illustrated home contact positions. Thus, the off-normal contacts ON7713 complete a locking circuit, including the contacts 7726, for the relay R7720 and they also apply ground potential to the conductor C7992SU–INT to prepare an operating circuit for the relay R7940–INT in the intercept channel relay unit 7740 in the same manner as explained in connection with the operation of the relay R7940 in the channel relay unit 7900. Also, the off-normal contacts ON7712 prepare a point in the circuit for controlling the magnet M7710 to return its wipers to the illustrated home contact positions when the intercept channel relay unit 7740 is released.

In the channel testing switch 7470, the off-normal contacts ON7479' are closed as soon as the wipers of the switch are advanced from their illustrated home contact positions in order to complete the operating circuit for the transfer relay R7460. The relay R7460 upon operating locks itself by way of the contacts 7462 to the grounded conductor C7401SU–1 extending to Fig. 76 and then by way of the contacts 7651 on the operated intercept relay R7650, to ground at contacts 7515 on the operated start relay R7510. Also, at its contacts 7461, the relay R7460 prepares a point in the circuit including the conductor C7401–INT2 extending to Fig. 76, contacts 7654 and 7641 for operating the counting relay R7630. The last-mentioned circuit, however, will not be completed until the wipers of the channel testing switch 7470 are again returned to their normal home contact positions to close the off-normal contact ON7479.

When the wipers of the channel testing switch 7470 and the wipers of the intercept cross-office unit selector 7701 engage the contacts 45 in the associated contact banks, a test is made to determine whether the intercept cross-office unit 8335 is busy. This test circuit may be traced from ground at the right-hand winding of the test relay R7550, contacts 7655, conductor C7401B1 extending to Fig. 74, wiper 7471 in engagement with the contact 45, contacts 7451, conductor C7401BTL1 extending to Fig. 75, contacts 7523, conductor C7581BTL extending to Fig. 78, contacts 7841 and 7821, conductor C7871BTL–INT, contacts 7721, wiper 7714 in engagement with the contacts 45, conductor C7551BTL extending to Fig. 83 and the winding of the seizure relay R8355, to battery, in the intercept cross-office unit 8335. If the intercept cross-office unit 8335 is idle, the relay R7550 will operate in series with the seizure relay R8355. However, if the intercept cross-office unit 8335 is busy, the conductor C7751BTL will be grounded and will prevent the operation of the test relay R7550. In the latter case, the test relay R7550 will remain in its restored position and will not open, at its contacts 7551, the stepping circuit for the magnet M7475. The magnet may reoperate and perform the same test over the contacts 46. It being understood that reoperation of the magnet M7475 will cause the magnet M7710 to advance its wipers into engagement with the contacts 46 so that a second intercept cross-office unit, such as 8335, will be tested.

If all of the intercept cross-office units, such as 8335, are busy the wipers of the channel testing switch 7470, and the wipers of the intercept cross-office unit selector 7701 will return to the illustrated home contact positions. When this occurs, all of the off-normal contacts will assume the positions illustrated in the drawings of Figs. 74 and 77. The off-normal contacts ON7479 now apply ground potential over a circuit including contacts 7461, conductor C7401–INT2 extending to Fig. 76, contacts 7654 and 7641 in order to operate the counting relay R7630. The magnet M7475 and the magnet M7710 continue to operate and restore in the manner previously described to rotate their wipers a second time over the associated bank contacts to search for an idle intercept cross-office unit, such as 8335. As soon as the off-normal contacts ON7479 are opened, in response to the first step of the wipers 7471 to 7474 in the second cycle, the ground potential is removed from the above circuit for operating the counting relay R7630. The relay R7630, however, locks itself over a circuit including contacts 7631 and the winding of relay R7640 to ground at contacts 7513. Relay R7640 now operates and prepares a circuit for operating the alarm relay R7645 in the event an idle intercept cross-office unit, such as 8335, is not found during the second cycle of operation of the channel testing switch 7470 and the intercept cross-office selector 7701. In the latter event, the off-normal contacts ON7479 will again be closed at the end of the second cycle of operation and will complete the circuit for operating the alarm relay R7645. The latter relay locks itself by way of the contacts 7647, 7653, 7525′ and 7513, to ground. Also, at its contacts 7646, a circuit is completed for transmitting an alarm signal to the alarm lamp L7648 to indicate that the channel testing switch 7470 has not found an available intercept cross-office unit in conjunction with the intercept cross-office unit selector 7701. The last mentioned units of equipment, however, will continue to rotate their wipers to search for an available intercept cross-office unit.

If the intercept cross-office unit 8335 is idle, the seizure relay R8355 operates in series with the test relay R7550. The operation of the test relay R7550 interrupts, at its contacts 7551, the stepping circuit for the magnet M7475 in order to terminate further stepping of the associated wipers. Also, at its contacts 7552, the test relay R7550 immediately connects the winding of the relay R7545 in series with the seizure relay R8355 in the intercept cross-office unit 8335. The relay R7545 now operates and, at its contacts 7546, completes a circuit including the contacts 7664′, contacts 7526, conductor C7581DR extending to Fig. 78, contacts 7842 and 7822, conductor C7871DR–INT extending to the intercept channel relay unit 7740, whereby, the open line relay, such as R7970, is operated. When the open line relay (such as R7970) in the intercept channel relay unit 7740 operates, it closes contacts (such as 7972) to complete the circuit for operating the relay R7940–INT in the intercept channel relay unit 7740. The last mentioned circuit includes the ground potential at the off-normal contacts ON7713, conductor C7992SU–INT and contacts, such as 7972, in order to operate a relay R7940–INT. In the intercept channel relay unit 7740, the relay R7940–INT referred to above has been schematically illustrated and it corresponds to the relay R7940 in the channel relay unit 7900. Operation of the relay R7940–INT performs the same functions as those performed in response to the operation of relay R7940 in the channel relay unit 7900. The relay R7940–INT, at its contacts 7946–INT, opens the previously traced circuit for the relays R7810 and R7865, whereupon, these relays restore to normal. The relay R7865 interrupts the circuit for the switch relay R7840 which also restores to normal and disconnects the cross-office selector switch relay control unit 7500 from the intercept channel relay 7740. The relay R7810, upon restoring, interrupts the circuit for the relay R7820 which also restores to normal. At the present time the intercept channel relay unit 7740 is now connected to the intercept cross-office unit 8335 over circuits including the wipers 7714 to 7717 on the intercept cross-office unit selector 7701.

Since the intercept channel relay unit 7740 is exactly the same as the channel relay unit 7900 illustrated in Figs. 79 to 82, inclusive, it should be understood that it operates in exactly the same manner. It should also be noted that the intercept cross-office unit selector 7701 is substantially identical to the cross-office selector switch 8300 individually associated with the channel relay unit 7900. However, the intercept cross-office unit selector 7701 connects the intercept channel relay unit 7740 to an intercept cross-office unit 8335, whereas, the cross-office selector switch 8300 interconnects the channel relay unit 7900 with a cross-office unit, such as X3400, illustrated in Fig. 8. However, in the event the cross-office selector switch 8300 cannot obtain access to a cross-office unit, such as X3400, it will then be controlled to select one of the intercept cross-office units, such as 8335.

Referring again to the channel converter unit 4500, it will be recalled that when the intercept relay R4520 operates and closes the contacts 4522, it completes the circuit for operating the connect relays R4330 and R4340 associated with the line number storage control switch 4301. The operations of the foregoing relays will control the line number storage control switch 4301 and the routing indicator storage control switch 4101 so that the line number 100, marked by the contacts on the relay R4520, will be transmitted to and stored on tape in the outgoing line number tape storage unit 5501 in the manner previously described. Also, the routing indicator tape storage control switch 4101 will operate in the manner previously described to store the routing indicator registered in the processing routing register 3700 on tape in the routing indicator storage unit 5502. Thereafter, the routing indicator will be discarded from the processing routing register 3700 and the next routing indicator appearing on the tape will be read by the tape reader 1420 in the multiple call storage unit 1400.

Each routing indicator will be processed in the manner described above, whereby, it is stored in the routing indicator tape storage unit 5502 and an appropriate line number is stored in the outgoing line number tape storage unit 5501 in the usual manner. Also, in processing each of the routing indicators the channel relay units, such as 7900, will be selected and in turn connected to appropriate cross-office units, such as X3400, that are, in turn, connected to the appropriate outgoing line. All of the foregoing operations are exactly the same as has been previously described.

If additional routing indicators are processed through the intercept channel relay unit 7740, the latter unit will again operate in the manner described above. However, it should be noted that this unit will function in exactly the same manner as the channel relay unit 7900 that has been described in detail hereinbefore.

After all of the routing indicators listed in the multiple call message have been read by the tape reader 1400 and processed, as previously described, the multiple call equipment will then start transmitting the pilot heading information for each connected cross-office unit including the intercept cross-office unit 8335. The first portion of the pilot information transmitted to all connected cross-office units, such as X3400, and including the intercept cross-office unit 8335, is transmitted simultaneously and includes the start-of-message indicator and the particular precedence of the multiple call message being handled.

The next phase in the operation of the multiple call equipment is to select each of the routing indicators and each of the line numbers stored respectively in the routing indicator tape storage unit 5502 and in the outgoing line number tape storage unit 5301. As each line number and its associated routing indicator is taken from the above noted tape storage units, the corresponding channel relay unit will be connected up under control of the particular line number transmitted by the line number tape storage unit 5501 and the corresponding routing indicator will be transmitted by the routing indicator tape storage unit 5502 to the storage routing register 5600. The latter unit, in turn, transfers the routing indicator stored therein to the routing indicator transmitter 5110 where it is repeated to the markable transmitter distributor 5503. The markable transmitter distributor 5503 transmits the routing indicator, as well as its lines number, to the channel multipling unit 8700. The last mentioned unit, in responding to the signals of the particular routing indicator, repeats these signals over one of the signalling conductors to the channel relay unit, such as 7900, or to the intercept channel relay unit 7740 if the latter unit corresponds to the associated line number. The signals are also transmitted through the particular channel relay unit to the associated cross-office unit all in the manner previously described. If, however, the intercept channel relay unit 7740 is the one connected up to receive the signals mentioned above, they will control the reperforator M8360 in the intercept cross-office unit 8335. Each routing indicator and its line number is also repeated by the channel multipling unit 8700 to the monitor page printer 8750 in the manner previously explained.

After each routing indicator has been individually transmitted from the routing indicator tape storage unit 5502 to the corresponding channel relay units, such as 7900, and the associated cross-office units, such as X3400, and also, if necessary, to the intercept channel relay unit 7740 and its associated intercept cross-office unit 8335, the entire message as it appears on the tape 1413 is then transmitted by the transmitter 1430 in the multiple call storage unit 1400 to all connected channel relay units and associated cross-office units, including the intercept channel relay unit and its associated cross-office unit, in exactly the same manner as has been previously described.

It may be well to mention at this time, however, that when the intercept channel relay unit 7740 has been seized only once during the processing of the message the resulting pilot heading information subsequently transmitted to the reperforator magnet M8360 in the intercept cross-office unit 8335 will include a single routing indicator identifying the intercepted routing indicator. However, if the intercept channel relay unit 7740 is seized two or more times during the processing of the routing indicators of a message, the pilot heading information will include the usual multiple call indicator for example, as follows:

NMNM UAC ZVA

A list of the routing indicators that have been intercepted appears after the multiple call indicator ZVA. The intercept operator that handles the messages perforated on the associated tapes by the reperforators in the intercept cross-office units, such as 8335, will read the tape and then control her intercept manual forwarding units, such as 8365, so that the entire message may be transmitted over an outgoing selector, such as 8370, to the outgoing line extending in the direction of the destinations identified by the routing indicators appearing as part of the pilot heading information of the message.

As mentioned above, the intercept channel relay unit 7740 may be used two or more times to process intercepted messages in the same manner that the regular channel relay units, such as 7900, may be used two or more times to process routing indicators that are to be transmitted over the same outgoing line. In order to select such channel relay units one at a time to find out the particular three character relay switching center routing indicator stored in its register 8001, the channel relay selector switch control unit 4600 is provided. The operation of this unit has been previously described in detail, whereby, the channel relay selector switch 4601, by means of its wipers 4614 to 4616, inclusive, searches for and selects, one at a time, only those channel relay units that have the conductor, such as C4681SEL1 grounded. This conductor is grounded by the corresponding channel relay unit whenever the unit has been utilized two or more times in processing routing indicators that must be transmitted over the same outgoing line. Since the intercept channel relay unit 7740 may also be utilized two or more times in processing routing indicators that are to be transmitted to intercept, the channel selector switch control unit 4600 must also be able to select the last-mentioned unit.

Referring now to Fig. 46, it will be seen that the conductor C4681SEL-INT, the conductor C4681TR-INT and the conductor C4681RL-INT are connected respectively to contacts 4671, 4676 and 4677 on the relay R4670. These conductors in turn are connected to the intercept channel relay unit 7740 (Fig. 77) in exactly the same manner as the corresponding conductors C4681SEL-1, C4681TR-1 and C4681RL-1 are connected to the channel relay unit 7900. If the conductor C4681SEL-INT is grounded to indicate that the intercept channel relay unit 7740 has been utilized two or more times in processing routing indicators to be routed to intercept, a circuit will be completed by way of the contacts 4671 and 4661, wiper 4614 in engagement with its home contact position, contacts 4621 and the winding of the test relay R4630, to battery. As soon as the test relay R4630 operates it interrupts, at its contacts 4632, the circuit for the magnet M4610 thereby to prevent operation thereof. Also, at its contacts 4631, the relay R4630 prepares a circuit including the contacts 4652 and 4631, wiper 4615 in engagement with its home contact position, contacts 4664 and 4676, conductor C4681TR-INT extending to the intercept channel relay unit 7740. At its contacts 4633, the relay R4630 prepares a circuit including the conductor C4635SC, wiper 4616 in engagement with its home contact position, contacts 4665 and 4677, conductor C4681RL-INT extending to the intercept channel relay unit 7740. In this way the intercept channel relay unit 7740 that has been utilized two or more times in processing routing indicators, is selected through the normal home contact positions on the wipers 4614 to 4616, inclusive, of the channel relay selector switch 4601 in the channel selector switch control unit 4600. The manner in which the intercept channel relay unit 7740 operates in response to its selection by the channel selector switch 4600 is exactly the same as the manner in which the channel relay unit 7900 is operated when it is selected by the unit 4600. These operations have been described in detail in connection with the operation of the channel relay unit 7900 and need not be repeated.

In the foregoing description of the operation of the apparatus as a result of the registration of an unassigned routing indicator in the processing routing register 3700, it was pointed out that the intercept channel relay unit 7740 and an associated intercept cross-office unit 8335 are selected for routing the unassigned routing indicator to the intercept operator position. It was further pointed out that the intercept channel relay unit 7740 is exactly the same as the channel relay unit 7900 illustrated in Figs. 79 to 82. Therefore, the intercept channel relay unit 7740 is provided with a register, such as the register 8001, for registering the three characters of a relay switching center as determined by the operation of the multiple call translator 2100. Normally, the first, second and third character decoding relays 2101 to 2103, inclusive, in the multiple call translator 2100 will be operated in accordance with the first three characters of the routing indicator registered in the processing routing register 3700. Since it has been assumed that these characters identify an unassigned relay switching center, the decoding relays 2101 to 2103, upon operating, will be unable to operate one of the relays in the relays of Group A (Fig. 26) since unassigned routing indicator relays are not provided in this group of relays. Under this condition, a chain circuit cannot be completed through one or more of the relays in Groups A, B, C and D (Fig. 26) in the manner previously described. Each of the relays in Group D, such as the JWC relay R2680, is provided with make contacts corresponding to the contacts 2684', whereby, the operation of a Group D relay will apply ground potential to the conductor C2691X extending to Fig. 28 in order to operate the relay R2820. Since no relay in the relays of Group D will be operated when an unassigned routing indicator is being translated by the multiple call translator 2100, the relay R2820 remains in its restored position and no three character routing indicator corresponding to a relay switching center will be registered in the register, such as 8001, provided in the intercept channel relay unit 7740. A circuit will be completed which may be traced from ground at contacts 2513 on the operated relay R2510, conductor C8161REG extending to Fig. 81. It should be noted, however, that the following circuit is completed through the intercept channel relay unit 7740 instead of through the channel relay unit 7900 but for the purpose of this description, it is better to describe the circuit through the channel relay unit 7900. Therefore, the ground potential on the conductor C8161REG (Fig. 81) is further extended by way of the contacts 8136 and 8132 and conductor C8161REG1 extending to Fig. 25 in order to operate the channel unit control relay R2510. The latter relay upon operating, at its contacts 2526, completes a circuit including the conductor C2528 extending to Fig. 28 for operating the relay R2830. At this time, the relay R2820, at its contacts 2831, connects ground potential by way of the contacts 2821 (relay R2820 restored) in order to operate the emergency relay R2840, and the ground potential is further extended by way of the conductor C2601EM to Fig. 26 in order to operate the emergency relay R2685. The last-mentioned relay is provided with a plurality of contacts, such as 2686, for connecting conductors, such as C8162COM1, from each of the channel relay units to a relay in Group D, such as the JWC relay R2680, corresponding to the next relay switching center reached over the outgoing line that corresponds to the associated channel relay unit. With regard to the intercept channel relay unit 7740, the conductor C8162COM1-INT is connected by way of the contacts 2688 in order to operate the UAC relay R2695. The UAC relay R2695 is individual to the intercept channel relay unit 7740 and its upper set of three make contacts are connected respectively through the jack panel 2701D to the jacks U, A and C provided respectively on the jack panels 2761D, 2762D and 2763D. It may be well to mention at this time that the conductor C8162-COM1-INT is grounded through the intercept channel relay unit 7740 each time its register, such as the register 8001, is connected up for receiving the registration of the three characters of a relay switching center.

As a further result of the operation of the UAC relay R2695, at its inner lower make contacts, it connects resistance ground potential to the conductor C2691DC extending to Fig. 28 and thereby operates the relay R2810-4. At its lower make contacts, the UAC relay R2695 applies ground potential to the conductor C2691X extending to Fig. 28 in order now to operate the relay R2820. The last-mentioned relay, at its contacts 2823, locks the emergency relay R2840 in its operated position and it also applies ground potential to the conductor C2601EM in order to retain the relay R2685 in its operated position. A circuit is also completed, in response to the operation of relay R2820, which may be traced from ground, contacts 2831, 2822 and 2842 for operating the Group D switching relay R2740. The last-mentioned relay, at its various make contacts, connects the jacks on the jack panels 2761D, 2762D and 2763D to the Group D encoding relays (Fig. 28) and the last-mentioned relays in turn mark the conductors C2871A to E, C2872A to E and C2873A to E in accordance with the three characters UAC in the manner previously described. These conductors are connected through make contacts on the transfer relay R2330 to the conductors C8051–1A to 1E, 2A to 2E and 3A to 3E extending to the register relays in the register, such as the register 8001, in the intercept channel relay unit 7740. Consequently, the characters UAC identifying the present relay switching center are registered in the intercept channel relay unit 7740. When this registration is completed, the registration complete relay, such as R8120, in the intercept channel relay unit 7740 is operated and completes a circuit (at contacts such as 1821) for operating the registration complete relay R2530 in the multiple call translator 2100. Subsequent operation of the last-mentioned unit is exactly the same as has been previously described.

From the foregoing description of operation of the multiple call translator 2100, it will be appreciated that whenever the intercept channel relay unit 7740 is utilized in intercepting an unassigned routing indicator, a three character routing indicator, such as UAC, will be registered in the register, such as 8001, provided in the intercept channel relay unit 7740. Therefore, the three character routing indicator identifying the relay switching center handling the multiple call message that has been routed to intercept will appear on the tape produced by the reperforator magnet, such as M8360, in the intercept cross-office unit, such as 8335, provided at the intercept operator position. The intercept operator may now dispose of the message routed to her position in the manner described hereinbefore and if it is determined that the routing indicators listed after the local switching center routing indicator UAC, identify tributary stations that have not been assigned, she may check with the station that originated the message to determine whether or not an error was made in the listed tributary station routing indicators appearing in the original message.

While there has been described what is at the present considered to be the preferred embodiment of the invention, it will be understood that various modifications may be made therein which are within the true spirit and scope of the invention.

What is claimed is:

1. In an automatic telegraph switching system, a switching center, a plurality of stations, each of said stations identified by different address codes, outgoing lines extending from said switching center, means in said switching center recording an original telegraph message, said original message including a list of address codes identifying different ones of said stations that are to receive said original message, processing apparatus in said switching center, a plurality of message storage units, each common to said outgoing lines and to said processing apparatus, means in said processing apparatus controlled by said address codes for determining the outgoing lines over which said original message must be retransmitted to reach each of the stations identified by the address codes in said original message and for associating one of said message storage units with each one of said determined outgoing lines, means in said processing equipment for registering in each message storage unit associated with a determined outgoing line the address code or codes that determined the corresponding outgoing line, means associated with said original message recording means for simultaneously retransmitting said original message to register the same in each of said storage units associated with determined outgoing lines, and a transmitter individual to each of said recording units responsive to the registration therein of an address code and a telegraph message for individually retransmitting the information registered by the associated recording unit over the associated outgoing line.

2. In an automatic telegraph switching system a switching center, a plurality of stations, means in said switching center recording a multiple address telegraph message received thereat, said message including a list of different address codes identifying certain of said stations as called stations that must receive said message, said address codes each comprising individually differing pluralities of characters, processing apparatus in said switching center, a first register in said processing apparatus for registering said address codes one after another, outgoing lines over which said message may be retransmitted to route said message toward each of said called stations identified by said address codes, means controlled by each address code registered in said first register for determining the appropriate outgoing line to route the message toward the corresponding station, means common to each outgoing line and to said processing apparatus for retransmitting said multiple address message once over each of said determined outgoing lines regardless of the number of address codes that determine the same outgoing line, and means for preceding the retransmission of each message over each outgoing line with each address code that determined the corresponding outgoing line, whereby said multiple address message is retransmitted over each determined outgoing line and is preceded by the address code or codes of differing pluralities of characters respectively identifying the called station or stations that must receive the message over the corresponding outgoing line.

3. In an automatic telegraph switching system, a switching center, a plurality of stations, means in said switching center recording an original telegraph message received thereat, said message including a list of address codes identifying certain of said stations as called stations that must individually receive said message, said address codes comprising variable numbers of characters, processing apparatus in said switching center, a first register in said processing apparatus for registering said address codes one after another, outgoing lines over which said message may be retransmitted to route said message toward each of said called stations identified by said address codes, means controlled by each address code registered in said first register for determining the appropirate outgoing line over which said message must be routed toward the corresponding station, means controlled responsive to the registration in said first register of an address code having less than a predetermined number of characters therein for preventing said last-mentioned means from determining an outgoing line therefor, means for retransmitting said original message once over each of said determined outgoing lines regardless of the number of address codes that determine the same outgoing line, and means for preceding each retransmission of said original message with the one or more address codes that determined the corresponding outgoing line.

4. In a telegraph switching system, a switching center having message recorders, switching means responsive to each of a plurality of address identifying codes that precede a received message to identify a corresponding plurality of destinations, a plurality of outgoing lines extending from said switching center, a plurality of message recorders common to each of said outgoing lines, means controlled by said switching means in accordance with each one of said address identifying codes for determining the outgoing line to be used in order ultimately to reach the destination corresponding to said one address identifying code, means for associating a different one of said message recorders with each determined outgoing line, means governed in accordance with each of said determined outgoing lines for individually transmitting to each of the associated message recorders pilot heading information including one or more of said address identifying codes identifying destinations that will ultimately be reached over the associated outgoing lines, means controlled for transmitting to each message recorder associated with said determined outgoing lines all of said address identifying codes preceding said received message and said message and means associated with each of said recorders for thereafter retransmitting over its associated outgoing line said pilot heading information and all of said address identifying codes and said message stored therein.

5. In an automatic telegraph switching system, a first switching center, other switching centers, local telegraph stations accessible to each of said switching centers, each of said stations identified by a different address code and each of said switching centers identified by a different predetermined code, means in said first switching center recording a multiple address telegraph message received thereat, said message including a list of address codes identifying certain ones of said stations, processing apparatus in said first switching center controlled by said address codes included in said message identifying stations accessible to said first switching center of retransmitting said multiple address message as a single address message to each one of said stations, means including said processing apparatus controlled by said address codes included in said message identifying stations accessible to one of said other switching centers for determining the identity of said one other switching center, means for transmitting the predetermined code identifying said other switching center and for transmitting said multiple address message as a multiple address message to said other one switching center, means at any intermediate switching center having a different predetermined code through which said message must be retransmitted controlled by said one switching center code included in said message for retransmitting said multiple address message as a single address message in the direction of said one switching center identified by said predetermined code, and means at said one identified switching center for processing said multiple address message received thereat to retransmit said received message as a single address message to each station accessible to said one identified switching center that is identified by an address code listed in said message and for retransmitting said received message as a multiple call message to still another identified switching center for processing if two or more additional address codes in said original message identify stations accessible to said last-mentioned switching center, whereby each station in the system identified by an address code listed in said multiple address message received at said first switching center will individually receive said message.

6. In an automatic telegraph switching system, a first switching center, other switching centers each identified by an individually corresponding telegraph code, called telegraph stations to which certain of said other centers have access and which are identified by an individually corresponding telegraph code including a code of the switching center having access thereto, means in said first switching center recording an original multiple address telegraph message received thereat, said message including a list of address codes identifying different called stations that are individually to receive said message, processing apparatus in said first switching center controlled by said address codes included in said original message for determining the identity of each switching center that is to receive said multiple address message for further processing and retransmission, wherein the retransmitted multiple address message may possibly also employ a first prosign code for instructing any identified switching center to process and retransmit a multiple address message received thereat to all of said stations identified by said address codes appearing in said original message except to those particular stations identified by address codes following another prosign code or a last prosign code for instructing any identified switching center to process and retransmit a multiple address message received thereat to only the ones of said stations identified by address codes and including the code of the identified switching center, means for determining whether or not it is possible to employ a prosign code as part of a retransmitted multiple address message, means governed by said determining means responsive to the determination that it is possible to employ said other prosign code for retransmitting said original message as a multiple address message to said identified switching center whereby said identified switching center processes and retransmits said original message to only those stations listed in said original message that are not associated with said other prosign code, and means governed by said determining means responsive to the determination that it is not possible to employ said other prosign code and that it is possible to employ said last prosign code for retransmitting said original message as a multiple address message to said identified switching center to identify only the address codes listed in said original message having a first character corresponding to said like characters in said last prosign code that must be processed by processing apparatus at said identified switching center whereby said identified switching center processes and retransmits said original message only to those stations listed in said original message having a first character corresponding to the like characters in said last prosign code.

7. An automatic telegraph switching system as set forth in claim 6, wherein said determining means determines that it is not possible to employ either said other prosign code or said last prosign code, and means controlled by said determining means responsive to said determination that it is not possible to employ either said other or said last prosign code for retransmitting said original message as a multiple address message to said identified switching center preceded by a list of only the particular address codes that must be processed by processing apparatus at said identified switching center, whereby said identified switching center processes and retransmits said original message only to those stations identified by address codes appearing in said list received at said identified switching center preceding said original message.

8. In an automatic telegraph switching system, a first switching center, other switching centers, called stations, each of said stations identified by a different address code and each of said switching centers identified by a different predetermined code, means in said first switching center recording an original multiple address telegraph message received thereat, said message including a list of address codes identifying different called stations that are individually to receive said message, processing apparatus in said first switching center controlled by said address codes included in said original message for determining the identity of each of said other switching centers that is to receive said multiple address message for further processing and retransmission, a prosign code consisting of a group of characterers for instructing any identified other switching center to process and retransmit a multiple address message received thereat to all of said stations identified by said address codes appearing in said original message except to those stations identified by address codes listed immediately following said prosign code, means for determining whether or not it is possible to employ said prosign code as part of a retransmitted message, and means governed by said determining means responsive to the determination that it is possible to employ said prosign code for retransmitting said original message as a multiple address message to said identified other switching center preceded by said prosign code and a list of address codes that need not be processed by the apparatus provided in said identified switching centers.

9. An automatic telegraph switching system as set forth in claim 8, including means governed by said determining means responsive to the determination that it is not possible to employ said prosign code for retransmitting said original message as a multiple address message to said identified other switching center preceded by a list of only the address codes that must be processed by apparatus provided at said identified switching center to route said message to corresponding stations.

10. In an automatic telegraph switching system, a first switching center, a plurality of stations, each of said stations identified by a different address code, outgoing lines extending from said first switching center, means in said switching center recording an original telegraph message received thereat, said message including a list of address codes identifying different stations that are individually to receive said message, processing apparatus in said first switching center controlled by said address codes included in said original message for determining the identity of each outgoing line over which said original message must be retransmitted in order to route the original message to the station identified by the corresponding address code, first counting means for counting the total number of address codes appearing in said message, second counting means individual to each outgoing line for counting the number of address codes that identify the associated outgoing line, means for comparing the said number of address codes counted by said first counting means and the said number of address codes counted by any of said second counting means, a prosign register having registered therein a prosign code associated with address codes identifying stations reached over a particular one of said outgoing lines, means controlled in the event said comparing means determines that a plurality of the address codes appearing in said message identify said particular outgoing line for selecting said prosign register, means controlled in response to said selection of said prosign register for transmitting said prosign code followed by said original message over said particular outgoing line to instruct another switching center to route the message received thereat to only the stations identified by said address codes appearing in said original message that identified said particular outgoing line.

11. An automatic telegraph switching system as set forth in claim 10, wherein said comparing means controls said prosign register selecting means each time the difference between said total number of address codes appearing in a message and the number of address codes that identify the same outgoing lines is less than a predetermined number greater than one.

12. In an automatic telegraph switching system as set forth in claim 10, including a first register operated by said first counting means, a second register operated by any one of said second counting means, a patch panel between said first and second registers having interconnections for controlling said prosign register selecting means only in response to the registration of a number in said second register that differs from the number registered in said first register by less than a predetermined number greater than one.

13. In an automatic telegraph switching system, a first switching center, other switching centers, called telegraph stations, each of said stations identified by a different address code and each of said switching centers identified by a different predetermined code, means in said first switching center recording an original multiple address telegraph message received thereat, said message including a list of address codes individually corresponding to different called stations, processing apparatus in said first switching center controlled by said address codes included in said original message for determining the identity of each switching center that is to receive said multiple address message for further processing and retransmission, a register preregistering a prosign code consisting of a group of predetermined characters for instructing any identified switching center to process and retransmit a multiple address message received thereat to only the said stations identified by address codes appearing in said original message that containing a particular character corresponding to said characters in said prosign code, means for determining whether or not it is possible to employ said prosign code as part of a retransmitted multiple address message, and means governed by said determining means responsive to a determination that it is possible to employ said prosign code for retransmitting said original message as a multiple address message to said identified switching center preceded by said prosign code registered in said register in order to identify only the address codes listed in said original message having said particular character and that must be processed by processing apparatus at said identified switching center to route said message to corresponding stations.

14. An automatic telegraph switching system as set forth in claim 13, wherein said determining means determines that it is not possible to employ said prosign code whenever all of said address codes listed in said original message having said particular character corresponding to said characters in said prosign code are not to be processed by the same identified switching center, and means controlled by said determining means responsive to said determination that it is not possible to employ said prosign code for retransmitting said original message as a multiple address message to said identified switching center preceded by a list of only the particular address codes that must be processed by processing apparatus provided said identified switching center to route said message only to corresponding stations.

15. In an automatic telegraph switching system, a switching center, a plurality of stations, means in said switching center recording a multiple address telegraph message received thereat, said message including a first group of address codes identifying certain of said stations and including a second group of address codes identifying all of said stations in said first group and additional stations, processing apparatus in said switching center, a first register in said processing apparatus operated to register all of said address codes in said first group, a second register in said processing apparatus operated to register each of said address codes in said second group one at a time, means for simultaneously comparing each address code registered in said second register with all of said address codes registered in said first register, means controlled as a result of an unsuccessful comparison for transmitting said received message from said switching center to the station identified by the corresponding address code registered in said second register, and means controlled as a result of a successful comparison for preventing transmission of said received message from said switching center to the station identified by the corresponding address code registered in said second register.

16. In an automatic telegraph switching system, a first switching center identified by a predetermined code, a plurality of stations identified by different plural character address codes, outgoing lines extending from said switching center to said stations, means in said first switching center recording a telegraph message received thereat having a multiple address message heading; said multiple address message heading including said predetermined code identifying said first switching center, an additional predetermined code identifying said message as a multiple address message, a special predetermined code associated with a group of address codes, a list of all of the different address codes including ones in said group of address codes identifying called stations that must individually receive said message, and the body of said message; processing apparatus in said first switching center, means for controlling said processing apparatus in accordance with said first switching center identifying code and said multiple address identifying code to prepare said processing apparatus to respond to each of said address codes included in said multiple address message, a first register in said processing apparatus, means controlled by said special predetermined code for selecting said first register and for registering therein said special predetermined code, a second register in said processing apparatus, means thereafter controlled for registering in said second register one at a time each of said different address codes in said list, means for comparing each of said plural character address codes registered in said second register with said special predetermined code registered in said first register to affirm or disaffirm that said one address code corresponds to the one of said group of address codes associated with said special determined code, first means controlled in response to each disaffirming comparison operation of said comparing means for operating said second register to abandon the compared address code registration therein, second means controlled responsive to each affirming comparison operation of said comparing means for determining the particular outgoing line over which the station identified by the compared address code may be reached, and means for transmitting over each of said determined outgoing lines the address code identifying the corresponding station that may be reached thereover and said multiple address message heading and said list of all of said address codes and the body of said message.

17. An automatic telegraph switching system as set forth in claim 16, wherein said special predetermined code comprises a plurality of identical characters and said predetermined group of address codes associated therewith includes only said address codes in said list having a first character corresponding identically to said plurality of identical characters in said special predetermined code.

18. An automatic telegraph switching system as set forth in claim 17 wherein said comparison means operate to compare the first character of each address code registered in said second register with the characters of said special predetermined code registered in said first register, and wherein said system further comprises means for releasing said comparison means and for operating said first means in response to a non-matching character comparison, and additional means for releasing said comparison means and for operating said second means in response to a matching character comparison.

19. In an automatic telegraph switching system, a switching center, an outgoing line, an operator position, a storage device in said switching center storing a telegraph message waiting to be restransmitted, means normally operated to retransmit said stored message to said outgoing line, means selectively operative to prevent operation of said last-mentioned means, means controlled responsive to said selective operation of said preventing means prior to said normal operation of said retransmitting means for retransmitting said stored message to said operator position, a cancel transmission transmitter storing a cancel transmission message, and means controlled responsive to a partial transmission of said telegraph message to said outgoing line by said retransmitting means prior to said operation of said preventing means for stopping further retransmission of said telegraph message to said outgoing line and for controlling said cancel transmission transmitter to transmit said cancel transmission message to said outgoing line and for thereafter retransmitting said stored telegraph message to said operator position.

20. In an automatic telegraph switching system, a switching center, outgoing lines extending from said switching center, an operator position, a storage device having stored therein a multiple address telegraph message waiting to be retransmitted over one or more of said outgoing lines in the direction of each of the addresses appearing in the message, a first group of recording units, a second group of recording units, processing means normally operative to process said stored message to determine the particular outgoing lines over which said stored message must be retransmitted to reach the address appearing in said message and for associating respectively one recording unit in said first group with each one of said determined outgoing lines so that each determined outgoing line is individually associated with a first group recording unit, transmitting means in said storage device normally controlled thereafter to transmit said stored message to said first group recording units associated with said outgoing lines, a cancel transmission transmitter operative to transmit signals indicative of the cancellation of said message recorded in said first group recording units, means in said storage device operated under control of an operator at said position for selecting one of said recording units in said second group if said processing means has not determined all of said outgoing lines and for connecting said cancel transmission transmitter to said processing means if said processing means has determined all of said outgoing lines, means in said cancel transmission transmitter operated responsive to said connection thereof to said processing means for transmitting said signals to said first group recorders associated with said determined outgoing lines and for thereafter operating said selecting means to select said one second group recording unit, and means controlled in response to said selection of said one second group recording unit for controlling said storage device transmitting means to transmit said message to said second group recording unit instead of to said first group recording units associated with said outgoing lines.

21. In a telegraph switching system arranged to automatically retransmit each telegraph message having a plurality of address identifying codes and any one of a plurality of different precedence codes, each one of said plurality of precedence codes identifying a particular different priority rating of the corresponding message, a plurality of storage units for storing messages waiting to be retransmitted, means controlled in accordance with the precedence code of a first received message for selecting one of said storage devices and for registering therein the precedence code of said first message and for storing in said one selected storage device the entire first received message and controlled in accordance with subsequently received messages having the same precedence as said first message for storing in said one selected storage device the entire message of each of said subsequently received messages, and processing means for processing and retransmitting said messages stored in said one selected storage device one at a time in accordance with each of the address identifying codes therein.

22. In a telegraph switching system arranged to automatically retransmit each multiple address message having a plurality of address codes and any one of a plurality of different precedence codes, each one of said plurality of address codes identifying a particular telegraph station to which the message must be transmitted, each one of said plurality of precedence codes identifying a particular different priority rating of the corresponding message, a plurality of storage units for storing messages waiting to be processed for retransmission, means controlled in accordance with a first message of each different precedence code for selecting a different one of said storage devices and for registering therein the corresponding precedence code and for storing therein the entire corresponding message, said last-mentioned means thereafter storing each entire subsequent message in the particular storage device having registered therein the particular precedence of each of said subsequent messages, whereby each storage device that has a particular precedence code registered therein is selected to store all subsequent messages having the same precedence code, processing apparatus common to said storage devices for processing said stored messages for retransmission, means for associating said common processing apparatus with said storage device having stored therein one or more messages having the precedence code of the highest priority rating and then with each of the remaining storage devices having stored therein one or more messages having the precedence code of the next highest priority rating until said common processing apparatus has been associated with all of said storage devices and the messages stored therein have been processed, and means for retransmitting each processed message in accordance with each of the address identifying codes therein.

23. In an automatic telegraph switching system, a switching center, a tape perforator at said switching center, a supply of continuous tape for said tape perforator, means for operating said tape perforator to perforate said tape in code form in accordance with each character included in each telegraph message received at said switching center, means controlled after each message is perforated on said tape for operating said tape perforator to automatically feed-out tape, means controlled by said tape perforator for registering the amount of said tape fed-out by said tape perforator, and means controlled in response to the registration of a predetermined amount of said tape for terminating said automatic tape feed-out operation of said tape perforator.

24. In an automatic telegraph switching system, a switching center, a tape perforator at said switching center, a supply of continuous tape for said tape perforator, means for operating said tape perforator to perforate said tape in code form in accordance with each character included in a telegraph message received at said switching center and for advancing said tape a character space in response to each character, means controlled after said message is perforated on said tape for operating said tape perforator to automatically advance said tape a character space at a time to automatically feed-out tape, a tape feed-out character counter, means controlled by said tape perforator for operating said character counter to count the number of character spaces said tape is advanced during said tape feed-out operation, and means controlled by said character counter in response to counting a predetermined number of said character spaces for terminating said automatic tape feed-out operation of said tape perforator.

25. In an automatic telegraph switching system, a switching center, a tape perforator at said switching center, a supply of continuous tape for said tape perforator, means for operating said tape perforator to perforate said tape in code form in accordance with each character included in each telegraph message received at said switching center, means controlled after each of said messages is perforated on said tape for operating said tape perforator to automatically feed-out tape, means controlled by said tape perforator for registering the amount of said tape feed-out by said tape perforator, means controlled in response to the registration of a predetermined amount of said tape for terminating said automatic tape feed-out operation of said tape perforator, whereby a predetermined amount of blank tape is inserted between successive messages perforated on said tape, a transmitter, means for feeding said tape through said transmitter to retransmit each of said messages, and means controlled between said retransmission of successive messages by said transmitter for absorbing a said blank tape inserted by said tape perforator between successive messages.

26. In an automatic telegraph switching system, a switching center, a tape perforator at said switching center, a supply of continuous tape for said tape perforator, means for operating said tape perforator to perforate said tape in code form in accordance with each character included in a telegraph message received at said switching center and for advancing said tape a character space in response to each character, means controlled after said message is perforated on said tape for operating said tape perforator to automatically advance said tape a character space at a time to automatically feed-out tape, a tape feed-out character counter, means controlled by said tape perforator for operating said character counter to count the number of character spaces said tape is advanced during said tape feed-out operation, means controlled by said character counter in response to counting a predetermined number of said character spaces for terminating said automatic tape feed-out operation of said tape perforator, a transmitter controlled by said perforated tape to retransmit each of said messages, and means controlled after each message is retransmitted for controlling said transmitter to disregard said predetermined number of character spaces inserted on said tape by said tape feed-out operation.

27. In an automatic telegraph switching system, a transmitter for transmitting a received telegraph message, a signalling circuit over which said message is transmitted by said transmitter, means controlled by a received message for operating said transmitter to retransmit said received message over said signalling circuit, a normally operated slow-to-release relay, means for including said relay in said signalling circuit and holding said relay operated over said circuit during retransmission of said message, and means controlled by said relay in response to an interruption in said signalling circuit of sufficient duration to restor said relay during retransmission of said message for controlling said transmitter operating means to terminate further retransmission of said message over said signalling circuit.

28. In an automatic telegraph switching system, a tape perforator operated in response to an incoming telegraph message for producing a tape record thereof, a tape reader for reading said message recorded on said tape, a transmitter for retransmitting said message recorded on said tape, a signalling circuit over which said message recorded on said tape is retransmitted by said transmitter, means controlled by said tape perforator operating said tape reader to read said tape, means controlled by said tape reader during said reading of said tape for operating said transmitter to retransmit said message recorded on said tape over said signalling circuit, a normally operated relay, means for connecting said relay to said signalling circuit and holding said relay operated during retransmission of said message over said signalling circuit, and means controlled by said relay in response to an interruption in said signalling circuit during retransmission of said message of sufficient duration to restore said relay for controlling said tape reader operating means to terminate further reading of said message by said tape reader and for controlling said transmitter operating means to prevent further retransmission of said message over said signalling circuit.

29. In an automatic telegraph switching system, a first switching center, telegraph stations, outgoing lines extending from said switching center, means in said switching center recording an original telegraph message received thereat; said original message including a plurality of address codes identifying different ones of said stations as called stations that must receive said message and the body of the message; a plurality of first storage units common to said outgoing lines and said recording means, an intercept storage unit, processing apparatus in said switching center controlled by each of said address codes one at a time for determining each outgoing line over which said original message must be retransmitted to reach each of said called stations and for associating one of said first storage units with each of said determined outgoing lines, means controlled in the event that an outgoing line determined by one or more of said address codes is unavailable for selecting said intercept storage unit, means in said processing apparatus for transmitting to each of said first storage units associated with determined outgoing lines and to said intercept storage unit the individual address code or codes that determined the corresponding outgoing line and said intercept storage unit, and means for thereafter transmitting said entire original message to all of said first storage units associated with determined outgoing lines and to said intercept storage unit, whereby each of said first storage units stores the entire original message preceded by the address code or codes of the stations that must receive the message over the corresponding outgoing line and whereby said intercept storage unit stores the entire original message preceded by the address code or codes of the stations that determined the unavailable outgoing line.

30. In an automatic telegraph switching system, a switching center, telegraph stations, outgoing lines extending from said switching center, means in said switching center operated to record telegraph messages received thereat; each of said messages including either a high precedence code or a low precedence code identifying the priority rating of the received message, a plurality of address codes identifying called ones of said stations that must receive said message, and the body of said message; a plurality of message storage units, an intercept storage unit, processing apparatus in said switching center controlled by said precedence code and each of said address codes included in a received message for determining each of the outgoing lines over which said message must be retransmitted to reach each of said called stations corresponding to said address codes and for selecting and individually associating one of said message storage units with each of said determined outgoing lines, means controlled in the event that an outgoing line determined by one or more of said address codes is unavailable and said message is of said high precedence for selecting said intercept storage unit, means controlled in the event that an outgoing line determined by one or more of said address codes is unavailable and said message is of said low precedence for selecting and associating one of said message storage units with said unavailable outgoing line, means in said processing apparatus for transmitting said precedence code of said message to each of said selected storage units and said selected intercept unit, means for thereafter transmitting to each of said selected storage and intercept units the address code or codes from which the unit was selected, and means for thereafter transmitting the entire received message to each of said selected storage and intercept units, whereby the information stored in each of said selected storage units associated with an available outgoing line is immediately retransmitted over said available outgoing line and information stored in each of said selected storage units associated with an unavailable outgoing line is retained pending availability of an unavailable outgoing line and information stored in said selected intercept unit is made available to an intercept operator for retransmission to the addressed telegraph station.

31. In an automatic telegraph switching system, a first switching center, telegraph stations, outgoing lines extending from said switching center, means in said switching center recording an original telegraph message received thereat, said original telegraph message including a plurality of address codes identifying different ones of said stations as called stations that must receive said message and the body of the message, a plurality of first storage units common to said outgoing lines, an intercept storage unit, processing apparatus in said switching center controlled by each address code one at a time for determining each outgoing line over which said original message must be retransmitted to reach each of said called stations identified by said address codes and for associating one of said first storage units with each of said determined outgoing lines, means in said processing apparatus controlled by an address code included in said original message which does not identify any telegraph station in said system for selecting said intercept storage unit, means in said processing apparatus for transmitting to each of said first storage units associated with determined outgoing lines only the individual address code or codes that determined the corresponding outgoing lines and for transmitting to said intercept storage unit only said address code that does not identify any telegraph station in said system, and means for thereafter transmitting said entire original message to all of said first storage units associated with determined outgoing lines and to said intercept storage unit, whereby each of said first storage units stores for retransmission over the corresponding outgoing line the entire original message preceded by the address code or codes of only the stations that must receive the message and whereby said intercept storage unit stores for record purposes the entire message preceded by said address code that does not identify any telegraph station in said system.

32. In an automatic telegraph switching system, a switching center, means at said switching center storing a received telegraph message, an outgoing line extending from said switching center, means controlled by said message stored in said storing means for selecting said outgoing line, a message storage device associated with said outgoing line, a plurality of registers, each of said registers preregistering in code different items of information pertaining to the handling of said message at another center reached over said outgoing line, means for selecting said registers one at a time, a markable transmitter, means responsive to said selection of each of said registers for controlling said transmitter to transmit said items of information preregistered therein to said outgoing line, means controlled after the items of information stored in said selected registers have been transmitted for disconnecting said transmitter, and additional means controlled by said storing means for retransmitting said stored message to said outgoing line.

33. In an automatic telegraph switching system, a switching center, a plurality of outgoing lines extending from said switching center, a plurality of message recorders for storing information transmitted thereto, switching means responsive to a plurality of address identifying codes included in a single multiple address message received at said switching center, means controlled by said switching means for determining each outgoing line to be used in order ultimately to reach each destination corresponding to each address identifying code and for individually associating respectively one of said message recorders with each one of said determined outgoing lines, a markable transmitter, means for selectively marking said markable transmitter to transmit to each of said associated recorders pilot heading information including the particular address identifying code or codes to be retransmitted over the outgoing line with which said particular recorder is associated to reach the destination or destinations corresponding to said particular address identifying code or codes, means for thereafter simultaneously transmitting to each of said associated recorders all of said address identifying codes included in said multiple address message and said message, and means associated with each of said recorders for thereafter retransmitting over its associated outgoing line said pilot heading information and all of said address identifying codes and said message stored therein.

34. In a telegraph system of the type having a plurality of switching centers each having access to individually corresponding stations and wherein one of said switching centers receives an original message having a plurality of address codes each corresponding to a different station and preceded by a multiple address code indicating the presence of said plurality of address codes, the improvement comprising sensing means at said one switching center operated in response to the receipt of said original message for sensing said plurality of address codes and said multiple address code in said original message, a plurality of selecting means at said one switching center operated in response to the operation of said sensing means for selecting a first and a second of said switching centers having access respectively to the stations corresponding to certain address codes, transmitting means at said one switching center connected to each of said operated selecting means, and means controlled by said connected selecting means for operating said transmitting means to retransmit said message including said multiple address code to said selected first switching center having access to a plurality of said certain stations indicated by their respective corresponding address codes in said original message and to retransmit the message including only a single address code to said second selected switching centers having access to said one address code identifying said one station accessible to said second switching center.

35. In a telegraph system having a switching center wherein a received message includes a first predetermined code having associated therewith a plurality of address codes individually corresponding to different stations and a second predetermined code indicating that certain ones of said address codes individually correspond to only certain ones of said stations, the improvement comprising sensing means operated in response to the receipt of said message for sensing said first predetermined code, said plurality of address codes, and said second predetermined code in said message; selecting means operated in response to the sensing of said second code for selecting said certain stations corresponding to said certain address codes and for preventing the selection of the remaining stations corresponding to the remaining plurality of address codes in said message, transmitting means connected to said operated selecting means, and means controlled by said connected selecting means for operating said transmitting means to retransmit said message to each of said selected certain stations corresponding to said certain address codes identified by said second predetermined code.

References Cited in the file of this patent

UNITED STATES PATENTS

| | | |
|---|---|---|
| 2,194,663 | Kleinschmidt | Mar. 26, 1940 |
| 2,229,480 | Spencer | Jan. 21, 1941 |
| 2,300,050 | Leonard et al. | Oct. 27, 1942 |
| 2,352,060 | Wusteney | June 20, 1944 |
| 2,571,182 | Baldwin | Oct. 16, 1951 |
| 2,635,139 | Branson | Apr. 14, 1953 |
| 2,654,797 | Knandel | Oct. 6, 1953 |
| 2,667,533 | Zenner | Jan. 26, 1954 |
| 2,669,602 | Salmon | Feb. 16, 1954 |
| 2,672,501 | Swan | Mar. 16, 1954 |
| 2,672,508 | Lang | Mar. 16, 1954 |
| 2,714,626 | Locke | Aug. 2, 1955 |
| 2,735,884 | Blanton | Feb. 21, 1956 |
| 2,738,376 | Vernam | Mar. 13, 1956 |
| 2,759,043 | Long | Aug. 14, 1956 |
| 2,766,318 | Bacon | Oct. 9, 1956 |
| 2,805,283 | Stiles | Sept. 3, 1957 |